US012599798B2

(12) United States Patent
Conboy

(10) Patent No.: US 12,599,798 B2
(45) Date of Patent: *Apr. 14, 2026

(54) ENVIRONMENTALLY-CLEAN FIRE INHIBITING BIOCHEMICAL LIQUID COMPOSITIONS FOR FORMING THIN ALKALI METAL SALT CRYSTALLINE COATINGS ON COMBUSTIBLE SURFACES TO BE PROTECTED AGAINST FIRE

(71) Applicant: Mighty Fire Breaker LLC, Lima, OH (US)

(72) Inventor: Stephen Conboy, Carlsbad, CA (US)

(73) Assignee: MIGHTY FIRE BREAKER LLC, Lima, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,862

(22) Filed: Oct. 28, 2023

(65) Prior Publication Data
US 2024/0252867 A1 Aug. 1, 2024

Related U.S. Application Data

(63) Continuation of application No. 17/167,084, filed on Feb. 4, 2021, now Pat. No. 11,865,390, which is a
(Continued)

(51) Int. Cl.
*A62D 1/00* (2006.01)
*A62C 3/02* (2006.01)
(Continued)

(52) U.S. Cl.
CPC .............. *A62D 1/0035* (2013.01); *A62C 3/02* (2013.01); *C09K 21/02* (2013.01); *A62C 3/0242* (2013.01);
(Continued)

(58) Field of Classification Search
CPC ........ A62D 1/0035; A62D 1/005; A62C 3/02; A62C 3/0242; A62C 3/0271; A62C 27/00; A62C 3/0207; A62C 3/0278; C09K 21/02
See application file for complete search history.

(56) References Cited

U.S. PATENT DOCUMENTS 25,358 A 9/1859 Wilder
625,871 A 5/1899 Busha
(Continued)

FOREIGN PATENT DOCUMENTS

AU 629404 B2 10/1992
AU 5986501 11/2001
(Continued)

OTHER PUBLICATIONS

US 8,460,513 B2, 06/2013, Sealey (withdrawn)
(Continued)

*Primary Examiner* — Andrew J. Oyer
(74) *Attorney, Agent, or Firm* — THOMAS J. PERKOWSKI, ESQ. PC

(57) ABSTRACT
An environmentally-clean fire inhibiting liquid biochemical composition for application on combustible surfaces to inhibit fire ignition and flame spread in the presence of fire. The environmentally-clean fire inhibiting liquid biochemical composition including a dispersing agent realized in the form of a quantity of water, for dispersing metal ions dissolved in water; a fire inhibiting agent in the form of at least one alkali metal salt of a nonpolymeric saturated carboxylic acid, for providing metal ions dispersed in the water when the alkali metal salt of a nonpolymeric saturated carboxylic acid is dissolved in the quantity of water; and a coalescing agent in the form of an organic compound containing three carboxylic acid groups, or salt/ester derivatives thereof, specifically triethyl citrate (TEC), an ester of
(Continued)

Formation of A Tripotassium Citrate (TPC) Salt Crystalline Structures On A Combustible Surface Sprayed Or Coated With An Aqueous TCP-TEC Solution (TCP + TEC +H2O) According To The Principles of The Present Invention citric acid, for dispersing and coalescing the metal ions when the fire inhibiting liquid composition is applied to combustible surfaces to be protected against fire, while water molecules in the water evaporate to the environment during drying, and the metal ions cooperate to form thin alkali metal salt crystalline coatings on the combustible surfaces. The alkali metal salt of nonpolymeric saturated carboxylic acid may be selected from the group consisting of: alkali metal salts of citric acid; alkali metal salts of oxalic acid; alkali metal salts of gluconic acid; and alkali metal salts of tartaric acid. The alkali metal salt of nonpolymeric saturated carboxylic acid may be selected from the group consisting of the alkali salt of lithium, the alkali salt of sodium, the alkali salt of potassium, the alkali salt of cesium and the alkali salt of rubidium. Preferably, the alkali metal salt of nonpolymeric saturated carboxylic acid is an alkali salt of potassium, namely tripotassium citrate (TPC).

24 Claims, 114 Drawing Sheets

Related U.S. Application Data continuation-in-part of application No. 16/914,067, filed on Jun. 26, 2020, now Pat. No. 11,395,931, and a continuation-in-part of application No. 16/805,811, filed on Mar. 1, 2020, now Pat. No. 11,400,324, and a continuation-in-part of application No. 16/449,389, filed on Jun. 22, 2019, now abandoned, and a continuation-in-part of application No. 16/029,861, filed on Jul. 9, 2018, now Pat. No. 11,836,807, and a continuation-in-part of application No. 15/829,944, filed on Dec. 3, 2017, now Pat. No. 10,919,178.

(51) Int. Cl.
  *A62C 27/00* (2006.01)
  *C09K 21/02* (2006.01)
(52) U.S. Cl.
  CPC ............ *A62C 3/0271* (2013.01); *A62C 27/00* (2013.01); *A62D 1/005* (2013.01)

(56) References Cited

U.S. PATENT DOCUMENTS

| | | | |
|---|---|---|---|
| 867,560 A | 10/1907 | Fremont |
| 960,250 A | 6/1910 | Beenken |
| 989,655 A | 4/1911 | Sicka |
| 1,003,854 A | 9/1911 | Adams |
| 1,009,620 A | 11/1911 | Adams |
| 1,185,154 A | 5/1916 | Wilds |
| 1,278,716 A | 9/1918 | Mork |
| 1,278,718 A | 9/1918 | Morrison |
| 1,293,377 A | 2/1919 | Donaldson |
| 1,451,896 A | 4/1923 | Turner |
| 1,468,163 A | 9/1923 | Matson |
| 1,469,957 A | 10/1923 | Rich |
| 1,504,454 A | 8/1924 | Thomas |
| 1,532,443 A | 4/1925 | Sammis |
| 1,561,193 A | 11/1925 | Spring |
| 1,580,816 A | 4/1926 | Dunn |
| 1,585,146 A | 5/1926 | Himberger |
| 1,634,462 A | 7/1927 | Hallauer |
| 1,665,995 A | 4/1928 | Wiley |
| 1,708,867 A | 4/1929 | Bronander |
| 1,786,963 A | 12/1930 | Schoenberger |
| 1,817,342 A | 8/1931 | Beecher |
| 1,819,722 A | 8/1931 | Sugimura |
| 1,871,096 A | 8/1932 | Torseth |
| 1,897,318 A | 2/1933 | Mcilvaine |

| | | | |
|---|---|---|---|
| 1,907,153 A | 5/1933 | Greider |
| 1,945,457 A | 1/1934 | Warr |
| 1,948,880 A | 2/1934 | Hamm |
| 1,953,331 A | 4/1934 | Armstrong |
| 1,973,734 A | 9/1934 | Thomas |
| 1,978,807 A | 10/1934 | Merritt |
| 1,995,874 A | 3/1935 | Van De Mark |
| 2,119,962 A | 6/1938 | Raleigh |
| 2,150,188 A | 3/1939 | Rippey |
| 2,246,616 A | 6/1941 | Cherry |
| 2,247,608 A | 7/1941 | De Groff |
| 2,336,648 A | 12/1943 | Sparks |
| 2,349,980 A | 5/1944 | Moore |
| 2,359,573 A | 10/1944 | Mackay |
| 2,671,454 A | 3/1954 | Williams |
| 2,886,425 A | 5/1959 | Seibert |
| 2,931,083 A | 4/1960 | Sidenmark |
| 3,040,816 A | 6/1962 | Slough |
| 3,108,136 A | 10/1963 | De Pree |
| 3,164,511 A | 1/1965 | Elmendorf |
| 3,196,108 A | 7/1965 | Nelson |
| 3,229,769 A | 1/1966 | Bashaw |
| 3,238,129 A | 3/1966 | Veltman |
| 3,274,105 A | 9/1966 | Mevel |
| 3,304,675 A | 2/1967 | Graham-Wood |
| 3,305,431 A | 2/1967 | Peterson |
| 3,309,824 A | 3/1967 | Barrett |
| 3,328,231 A | 6/1967 | Sergovic |
| 3,334,045 A | 8/1967 | Nelson |
| 3,350,822 A | 11/1967 | Nachazel |
| 3,362,124 A | 1/1968 | Cravens |
| 3,369,056 A | 2/1968 | Schwarzer |
| 3,383,274 A | 5/1968 | Craig |
| 3,400,766 A | 9/1968 | Foley |
| 3,409,550 A | 11/1968 | Gould |
| 3,427,216 A | 2/1969 | Quinn |
| 3,442,334 A | 5/1969 | Spero |
| 3,457,702 A | 7/1969 | Brown |
| 3,468,092 A | 9/1969 | Chalmers |
| 3,470,062 A | 9/1969 | Ollinger |
| 3,478,861 A | 11/1969 | Elmendorf |
| 3,484,372 A | 12/1969 | Birchall |
| 3,501,419 A | 3/1970 | Bridgeford |
| 3,506,479 A | 4/1970 | Breens |
| 3,508,872 A | 4/1970 | Stuetz |
| 3,509,083 A | 4/1970 | Winebrenner |
| 3,511,748 A | 5/1970 | Heeb |
| 3,539,423 A | 11/1970 | Simison |
| 3,558,485 A | 1/1971 | Skvarla |
| 3,584,412 A | 6/1971 | Palmer |
| 3,607,811 A | 9/1971 | Hovd |
| 3,609,074 A | 9/1971 | Rainaldi |
| 3,621,917 A | 11/1971 | Rosen |
| 3,635,290 A | 1/1972 | Schneider |
| 3,639,326 A | 2/1972 | Kray |
| 3,650,820 A | 3/1972 | DiPietro |
| 3,661,809 A | 5/1972 | Pitts |
| 3,663,267 A | 5/1972 | Moran |
| 3,698,480 A | 10/1972 | Newton |
| 3,703,394 A | 11/1972 | Hemming |
| 3,730,890 A | 5/1973 | Nelson |
| 3,734,191 A | 5/1973 | Johnson |
| 3,738,072 A | 6/1973 | Adrian |
| 3,752,234 A | 8/1973 | Degginger |
| 3,755,163 A | 8/1973 | Broll |
| 3,755,448 A | 8/1973 | Merianos |
| 3,763,238 A | 10/1973 | Adams |
| 3,795,637 A | 3/1974 | Kandler |
| 3,809,223 A | 5/1974 | Kendall |
| 3,827,869 A | 8/1974 | Von Bonin |
| 3,899,855 A | 8/1975 | Gadsby |
| 3,934,066 A | 1/1976 | Murch |
| 3,935,343 A | 1/1976 | Nuttall |
| 3,944,688 A | 3/1976 | Inman |
| 3,984,334 A | 10/1976 | Hopper |
| 3,994,110 A | 11/1976 | Ropella |
| 4,013,599 A | 3/1977 | Strauss |
| 4,037,665 A | 7/1977 | Hopper |
| 4,049,556 A | 9/1977 | Tujimoto |

(56)                 References Cited

U.S. PATENT DOCUMENTS

| | | | |
|---|---|---|---|
| 4,049,849 A | 9/1977 | Brown |
| 4,065,413 A | 12/1977 | Macinnis |
| 4,076,862 A | 2/1978 | Kobeski |
| 4,092,281 A | 5/1978 | Bertrand |
| 4,104,073 A | 8/1978 | Koide |
| 4,153,466 A | 5/1979 | Smith |
| 4,168,175 A | 9/1979 | Shutt |
| 4,172,858 A | 10/1979 | Clubley |
| 4,176,071 A | 11/1979 | Crouch |
| 4,176,115 A | 11/1979 | Hartman |
| 4,184,449 A | 1/1980 | Louderback |
| 4,184,802 A | 1/1980 | Cook |
| 4,194,979 A | 3/1980 | Gottschall |
| 4,197,913 A | 4/1980 | Korenowski |
| 4,198,328 A | 4/1980 | Bertelli |
| 4,209,561 A | 6/1980 | Sawko |
| 4,226,727 A | 10/1980 | Tarpley, Jr. |
| 4,228,202 A | 10/1980 | Tjaennberg |
| 4,234,044 A | 11/1980 | Hollan |
| 4,237,182 A | 12/1980 | Fulmer |
| 4,248,976 A | 2/1981 | Clubley |
| 4,251,579 A | 2/1981 | Lee |
| 4,254,177 A | 3/1981 | Fulmer |
| 4,265,963 A | 5/1981 | Matalon |
| 4,266,384 A | 5/1981 | Orals |
| 4,272,414 A | 6/1981 | Vandersall |
| 4,285,842 A | 8/1981 | Herr |
| 4,344,489 A | 8/1982 | Bonaparte |
| 4,346,012 A | 8/1982 | Umaba |
| 4,364,987 A | 12/1982 | Goodwin |
| 4,382,884 A | 5/1983 | Rohringer |
| 4,392,994 A | 7/1983 | Wagener |
| 4,394,108 A | 7/1983 | Cook |
| 4,419,256 A | 12/1983 | Loomis |
| 4,419,401 A | 12/1983 | Pearson |
| 4,514,327 A | 4/1985 | Rock |
| 4,530,877 A | 7/1985 | Hadley |
| 4,560,485 A | 12/1985 | Szekely |
| 4,563,287 A | 1/1986 | Hisamoto |
| 4,572,862 A | 2/1986 | Ellis |
| 4,578,913 A | 4/1986 | Eich |
| 4,595,414 A | 6/1986 | Shutt |
| 4,622,361 A | 11/1986 | Gill |
| 4,652,383 A | 3/1987 | Tarpley, Jr. |
| 4,659,381 A | 4/1987 | Walters |
| 4,661,398 A | 4/1987 | Ellis |
| 4,663,226 A | 5/1987 | Vajs |
| 4,666,960 A | 5/1987 | Spain |
| 4,688,643 A | 8/1987 | Carter |
| 4,690,859 A | 9/1987 | Porter |
| 4,714,652 A | 12/1987 | Poletto |
| 4,720,414 A | 1/1988 | Burga |
| 4,724,250 A | 2/1988 | Schubert |
| 4,725,382 A | 2/1988 | Lewchalermwong |
| 4,725,383 A | 2/1988 | Hayashi |
| 4,737,406 A | 4/1988 | Bumpus |
| 4,740,527 A | 4/1988 | von Bonin |
| 4,743,625 A | 5/1988 | Vajs |
| 4,755,397 A | 7/1988 | Eden |
| 4,756,839 A | 7/1988 | Curzon |
| 4,770,794 A | 9/1988 | Cundasawmy |
| 4,776,403 A | 10/1988 | Lejosne |
| 4,810,741 A | 3/1989 | Kim |
| 4,822,524 A | 4/1989 | Strickland |
| 4,824,483 A | 4/1989 | Bumpus |
| 4,824,484 A | 4/1989 | Metzner |
| 4,852,656 A | 8/1989 | Banahan |
| 4,861,397 A | 8/1989 | Hillstrom |
| 4,871,477 A | 10/1989 | Dimanshteyn |
| 4,879,320 A | 11/1989 | Hastings |
| 4,888,136 A | 12/1989 | Chellapa |
| 4,895,878 A | 1/1990 | Jourquin |
| 4,901,763 A | 2/1990 | Scott |
| 4,909,328 A | 3/1990 | DeChant |
| 4,913,835 A | 4/1990 | Mandel |
| 4,965,296 A | 10/1990 | Hastings |
| 4,986,363 A | 1/1991 | Nahmiaj |
| 4,986,805 A | 1/1991 | Laramore |
| 4,993,495 A | 2/1991 | Burchert |
| 5,021,484 A | 6/1991 | Schreiber |
| 5,023,019 A | 6/1991 | Bumpus |
| 5,032,446 A | 7/1991 | Sayles |
| 5,039,454 A | 8/1991 | Policastro |
| 5,053,147 A | 10/1991 | Kaylor |
| 5,055,208 A | 10/1991 | Stewart |
| 5,062,996 A | 11/1991 | Kaylor |
| 5,070,945 A | 12/1991 | Nahmias |
| 5,091,097 A | 2/1992 | Pennartz |
| 5,105,493 A | 4/1992 | Lugtenaar |
| 5,130,184 A | 7/1992 | Ellis |
| 5,156,775 A | 10/1992 | Blount |
| 5,162,394 A | 11/1992 | Trocino |
| 5,182,049 A | 1/1993 | von Bonin |
| 5,185,214 A | 2/1993 | Levan |
| 5,214,867 A | 6/1993 | Weatherly |
| 5,214,894 A | 6/1993 | Glesser-Lott |
| 5,239,007 A | 8/1993 | Le-Khac |
| 5,250,200 A | 10/1993 | Sallet |
| 5,283,998 A | 2/1994 | Jong |
| 5,284,700 A | 2/1994 | Strauss |
| 5,318,504 A | 6/1994 | Edenbaum |
| 5,333,426 A | 8/1994 | Varoglu |
| 5,356,568 A | 10/1994 | Levine |
| 5,371,986 A | 12/1994 | Guditis |
| 5,383,749 A | 1/1995 | Reisdorff |
| 5,391,246 A | 2/1995 | Stephens |
| 5,393,437 A | 2/1995 | Bower |
| 5,405,661 A | 4/1995 | Kim |
| 5,422,484 A | 6/1995 | Brogi |
| 5,491,022 A | 2/1996 | Smith |
| 5,507,350 A | 4/1996 | Primlani |
| 5,509,485 A | 4/1996 | Almagro |
| 5,518,638 A | 5/1996 | Buil |
| 5,534,164 A | 7/1996 | Guglielmi |
| 5,534,301 A | 7/1996 | Shutt |
| 5,560,429 A | 10/1996 | Needham |
| 5,582,759 A | 12/1996 | Bursey, Jr. |
| 5,590,717 A | 1/1997 | McBay |
| 5,605,767 A | 2/1997 | Fuller |
| 5,609,915 A | 3/1997 | Fuller |
| 5,626,787 A | 5/1997 | Porter |
| 5,631,047 A | 5/1997 | Friloux |
| 5,688,843 A | 11/1997 | Inaoka |
| 5,709,821 A | 1/1998 | von Bonin |
| 5,729,936 A | 3/1998 | Maxwell |
| 5,734,335 A | 3/1998 | Brogi |
| 5,738,924 A | 4/1998 | Sing |
| 5,746,031 A | 5/1998 | Burns |
| 5,765,333 A | 6/1998 | Cunningham |
| 5,778,984 A | 7/1998 | Suwa |
| 5,815,994 A | 10/1998 | Knight |
| 5,817,369 A | 10/1998 | Conradie |
| 5,833,874 A | 11/1998 | Stewart |
| 5,834,535 A | 11/1998 | Abu-Isa |
| 5,840,413 A | 11/1998 | Kajander |
| 5,849,210 A | 12/1998 | Pascente |
| 5,857,623 A | 1/1999 | Miller |
| 5,894,891 A | 4/1999 | Rosenstock |
| 5,918,680 A | 7/1999 | Sheinson |
| 5,929,276 A | 7/1999 | Kirkovits |
| 5,931,233 A | 8/1999 | La Bonte |
| 5,934,347 A | 8/1999 | Phelps |
| 5,945,025 A | 8/1999 | Cunningham |
| 5,948,148 A | 9/1999 | Cuevas |
| 5,968,669 A | 10/1999 | Liu |
| 6,000,189 A | 12/1999 | Breuer |
| 6,024,889 A | 2/2000 | Holland |
| 6,029,751 A | 2/2000 | Ford |
| 6,042,639 A | 3/2000 | Valso |
| 6,073,410 A | 6/2000 | Schimpf |
| 6,090,877 A | 7/2000 | Bheda |
| 6,142,238 A | 11/2000 | Holt |
| 6,146,544 A | 11/2000 | Guglielmi |
| 6,146,557 A | 11/2000 | Inata |

(56) References Cited

U.S. PATENT DOCUMENTS

| | | | |
|---|---|---|---|
| 6,150,449 | A | 11/2000 | Valkanas |
| 6,153,682 | A | 11/2000 | Bannat |
| 6,164,382 | A | 12/2000 | Schutte |
| 6,167,971 | B1 | 1/2001 | Van Lingen |
| 6,173,791 | B1 | 1/2001 | Yen |
| 6,189,623 | B1 | 2/2001 | Zhegrov et al. |
| 6,202,755 | B1 | 3/2001 | Hardge |
| 6,209,655 | B1 | 4/2001 | Valkanas |
| 6,245,842 | B1 | 6/2001 | Buxton |
| 6,271,156 | B1 | 8/2001 | Gleason |
| 6,289,540 | B1 | 9/2001 | Emonds |
| 6,296,781 | B1 | 10/2001 | Amiran |
| 6,309,746 | B1 | 10/2001 | Broutier |
| 6,311,781 | B1 | 11/2001 | Jerke |
| 6,318,473 | B1 | 11/2001 | Bartley |
| 6,364,026 | B1 | 4/2002 | Doshay |
| 6,385,931 | B1 | 5/2002 | Risser |
| 6,387,300 | B1 | 5/2002 | Bosserman |
| 6,398,136 | B1 | 6/2002 | Smith |
| 6,401,487 | B1 | 6/2002 | Kotliar |
| 6,401,830 | B1 | 6/2002 | Romanoff |
| 6,406,755 | B1 | 6/2002 | Kindt |
| 6,415,571 | B2 | 7/2002 | Risser |
| 6,418,752 | B2 | 7/2002 | Kotliar |
| 6,423,129 | B1 | 7/2002 | Fitzgibbons, Jr. |
| 6,423,251 | B1 | 7/2002 | Blount |
| 6,427,779 | B1 | 8/2002 | Richman |
| 6,436,306 | B1 | 8/2002 | Jennings |
| 6,442,912 | B1 | 9/2002 | Phillips |
| 6,444,718 | B1 | 9/2002 | Blount |
| 6,453,636 | B1 | 9/2002 | Ritz |
| 6,461,542 | B1 | 10/2002 | Smith |
| 6,464,903 | B1 | 10/2002 | Blount |
| 6,470,805 | B1 | 10/2002 | Woodall |
| 6,491,254 | B1 | 12/2002 | Walkinshaw |
| 6,502,421 | B2 | 1/2003 | Kotliar |
| 6,517,748 | B2 | 2/2003 | Richards |
| 6,524,653 | B1 | 2/2003 | Jones |
| 6,557,374 | B2 | 5/2003 | Kotliar |
| 6,558,684 | B1 | 5/2003 | Sutherland |
| 6,560,991 | B1 | 5/2003 | Kotliar |
| 6,565,923 | B1 | 5/2003 | Cheng |
| 6,581,878 | B1 | 6/2003 | Bennett |
| 6,608,123 | B2 | 8/2003 | Galli |
| 6,613,391 | B1 | 9/2003 | Gang |
| 6,620,348 | B1 | 9/2003 | Vandersall et al. |
| 6,622,966 | B1 | 9/2003 | Mcconnell, Sr. |
| 6,629,392 | B1 | 10/2003 | Harrel |
| 6,702,032 | B1 | 3/2004 | Torras, Sr. |
| 6,706,774 | B2 | 3/2004 | Muenzenberger |
| 6,713,411 | B2 | 3/2004 | Cox |
| 6,725,941 | B2 | 4/2004 | Edwards |
| 6,736,989 | B2 | 5/2004 | Stewart |
| 6,772,562 | B1 | 8/2004 | Dadamo |
| 6,777,469 | B2 | 8/2004 | Blount |
| 6,780,991 | B2 | 8/2004 | Vandersall et al. |
| 6,796,382 | B2 | 9/2004 | Kaimart |
| 6,800,352 | B1 | 10/2004 | Hejna |
| 6,802,994 | B1 | 10/2004 | Kegeler |
| 6,810,964 | B1 | 11/2004 | Arnot |
| 6,810,965 | B2 | 11/2004 | Matsukawa |
| 6,811,731 | B2 | 11/2004 | Archer |
| 6,828,437 | B2 | 12/2004 | Vandersall |
| 6,846,437 | B2 | 1/2005 | Vandersall |
| 6,852,853 | B2 | 2/2005 | Vandersall |
| 6,869,669 | B2 | 3/2005 | Jensen |
| 6,878,795 | B2 | 4/2005 | Marcinko |
| 6,881,247 | B2 | 4/2005 | Batdorf |
| 6,881,367 | B1 | 4/2005 | Baker |
| 6,889,776 | B2 | 5/2005 | Cheung |
| 6,897,173 | B2 | 5/2005 | Bernard |
| 6,905,639 | B2 | 6/2005 | Vandersall |
| 6,930,138 | B2 | 8/2005 | Schell |
| 6,982,049 | B1 | 1/2006 | Mabey |
| 7,018,571 | B1 | 3/2006 | Camarota |
| 7,028,783 | B2 | 4/2006 | Celorio-Villasenor |
| 7,029,612 | B2 | 4/2006 | Moriarty |
| 7,036,449 | B2 | 5/2006 | Sutter |
| 7,070,704 | B2 | 7/2006 | Kang |
| 7,082,999 | B2 | 8/2006 | Arnot |
| 7,083,000 | B2 | 8/2006 | Edwards |
| 7,089,862 | B1 | 8/2006 | Vasquez |
| 7,140,449 | B1 | 11/2006 | Ebner |
| 7,147,061 | B2 | 12/2006 | Tsutaoka |
| 7,164,468 | B2 | 1/2007 | Correia Da Silva Vilar |
| 7,210,537 | B1 | 5/2007 | Mcneil |
| 7,261,165 | B1 | 8/2007 | Black |
| 7,264,796 | B2 | 9/2007 | Hejna |
| 7,273,634 | B2 | 9/2007 | Fitzgibbons, Jr. |
| 7,323,248 | B2 | 1/2008 | Ramsey |
| 7,331,399 | B2 | 2/2008 | Multer |
| 7,337,156 | B2 | 2/2008 | Wippich |
| 7,341,113 | B2 | 3/2008 | Fallis |
| 7,407,993 | B2 | 8/2008 | Harrison |
| 7,413,145 | B2 | 8/2008 | Hale |
| 7,478,680 | B2 | 1/2009 | Sridharan |
| 7,479,513 | B2 | 1/2009 | Reinheimer |
| 7,482,395 | B2 | 1/2009 | Mabey |
| 7,487,841 | B1 | 2/2009 | Gonci |
| 7,504,449 | B2 | 3/2009 | Mazor |
| 7,560,041 | B2 | 7/2009 | Yoon |
| 7,585,566 | B2 | 9/2009 | Colvin |
| 7,587,875 | B2 | 9/2009 | Kish |
| 7,588,087 | B2 | 9/2009 | Cafferata |
| 7,614,456 | B2 | 11/2009 | Twum |
| 7,626,076 | B2 | 12/2009 | Shin |
| 7,670,513 | B2 | 3/2010 | Erdner |
| 7,673,696 | B1 | 3/2010 | Gunn |
| 7,686,093 | B2 | 3/2010 | Reilly |
| 7,744,687 | B2 | 6/2010 | Pablo |
| 7,748,662 | B2 | 7/2010 | Hale |
| 7,754,808 | B2 | 7/2010 | Goossens |
| 7,766,090 | B2 | 8/2010 | Mohr |
| 7,767,010 | B2 | 8/2010 | Curzon |
| 7,785,409 | B2 | 8/2010 | Atkinson |
| 7,785,712 | B2 | 8/2010 | Miller |
| 7,789,165 | B1 | 9/2010 | Yen |
| 7,810,724 | B2 | 10/2010 | Skaaksrud |
| 7,815,157 | B2 | 10/2010 | Knight |
| 7,820,736 | B2 | 10/2010 | Reinheimer |
| 7,824,583 | B2 | 11/2010 | Gang |
| 7,828,069 | B2 | 11/2010 | Lee |
| 7,832,492 | B1 | 11/2010 | Eldridge |
| 7,837,009 | B2 | 11/2010 | Gross |
| 7,849,542 | B2 | 12/2010 | DeFranks |
| 7,863,355 | B2 | 1/2011 | Futterer |
| 7,886,836 | B2 | 2/2011 | Haaland |
| 7,886,837 | B1 | 2/2011 | Helfgott |
| 7,897,070 | B2 | 3/2011 | Knocke |
| 7,897,673 | B2 | 3/2011 | Flat |
| 7,900,709 | B2 | 3/2011 | Kotliar |
| 7,934,564 | B1 | 5/2011 | Stell |
| 7,955,711 | B2 | 6/2011 | Castillo |
| 7,975,774 | B2 | 7/2011 | Akcasu |
| 8,006,447 | B2 | 8/2011 | Beele |
| 8,080,186 | B1 | 12/2011 | Pennartz |
| 8,084,523 | B2 | 12/2011 | Lopez |
| 8,088,310 | B2 | 1/2012 | Orr |
| 8,141,649 | B2 | 3/2012 | Kotliar |
| 8,148,315 | B2 | 4/2012 | Baker |
| 8,168,304 | B2 | 5/2012 | Zhang |
| 8,171,677 | B2 | 5/2012 | Flint |
| 8,206,620 | B1 | 6/2012 | Bolton |
| 8,217,093 | B2 | 7/2012 | Reinheimer |
| 8,226,017 | B2 | 7/2012 | Cohen |
| 8,263,231 | B2 | 9/2012 | Mesa |
| 8,273,813 | B2 | 9/2012 | Beck |
| 8,276,679 | B2 | 10/2012 | Bui |
| 8,281,550 | B1 | 10/2012 | Bolton |
| 8,286,405 | B1 | 10/2012 | Bolton |
| 8,291,990 | B1 | 10/2012 | Mohr |
| 8,344,055 | B1 | 1/2013 | Mabey |
| 8,366,955 | B2 | 2/2013 | Thomas |
| 8,403,070 | B1 | 3/2013 | Lowe |

(56) References Cited

U.S. PATENT DOCUMENTS

| | | | |
|---|---|---|---|
| 8,409,479 B2 | 4/2013 | Alexander |
| 8,453,752 B2 | 6/2013 | Katsuraku |
| 8,457,013 B2 | 6/2013 | Essinger |
| 8,458,971 B2 | 6/2013 | Winterowd |
| 8,465,833 B2 | 6/2013 | Lee |
| 8,534,370 B1 | 9/2013 | Al Azemi |
| 8,586,657 B2 | 11/2013 | Lopez |
| 8,603,231 B2 | 12/2013 | Wagh |
| 8,607,272 B2 | 12/2013 | Walter |
| 8,646,540 B2 | 2/2014 | Eckholm |
| 8,647,524 B2 | 2/2014 | Rueda-Nunez |
| 8,662,192 B2 | 3/2014 | Dunster |
| 8,663,427 B2 | 3/2014 | Sealey |
| 8,663,774 B2 | 3/2014 | Fernando |
| 8,663,788 B2 | 3/2014 | Oh |
| 8,668,988 B2 | 3/2014 | Schoots |
| 8,685,206 B2 | 4/2014 | Sealey |
| 8,691,005 B2 | 4/2014 | Moriarty |
| 8,698,634 B2 | 4/2014 | Guedes Lopes Da Fonseca |
| 8,715,540 B2 | 5/2014 | Curzon |
| 8,746,355 B2 | 6/2014 | Demmitt |
| 8,746,357 B2 | 6/2014 | Butz |
| 8,757,280 B2 | 6/2014 | Cordani |
| 8,778,213 B2 | 7/2014 | Guo |
| 8,789,769 B2 | 7/2014 | Fenton |
| 8,801,536 B2 | 8/2014 | O'Shea, III |
| 8,808,850 B2 | 8/2014 | Dion |
| 8,820,421 B2 | 9/2014 | Rahgozar |
| 8,871,053 B2 | 10/2014 | Sealey |
| 8,871,058 B2 | 10/2014 | Sealey |
| 8,871,110 B2 | 10/2014 | Guo |
| 8,891,005 B2 | 11/2014 | Sasaki |
| 8,893,814 B2 | 11/2014 | Bui |
| 8,944,174 B2 | 2/2015 | Thomas |
| 8,973,669 B2 | 3/2015 | Connery |
| 8,980,145 B2 | 3/2015 | Baroux |
| 9,005,396 B2 | 4/2015 | Baroux |
| 9,005,642 B2 | 4/2015 | Mabey |
| 9,027,303 B2 | 5/2015 | Lichtinger |
| 9,072,228 B1 | 7/2015 | Carelli |
| 9,089,730 B2 | 7/2015 | Shalev |
| 9,109,390 B1 | 8/2015 | Cavuoti |
| 9,109,649 B2 | 8/2015 | Bohle |
| 9,120,570 B2 | 9/2015 | Hoisington |
| 9,174,074 B2 | 11/2015 | Medina |
| 9,187,674 B2 | 11/2015 | Ulcar |
| 9,199,108 B2 | 12/2015 | Guo |
| 9,248,325 B2 | 2/2016 | Lewis |
| 9,249,021 B2 | 2/2016 | Mundheim |
| 9,265,978 B2 | 2/2016 | Klaffmo |
| 9,302,749 B1 | 4/2016 | D Offay et al. |
| 9,314,947 B2 | 4/2016 | Moriarty |
| 9,321,808 B2 | 4/2016 | Seneci |
| 9,323,116 B2 | 4/2016 | You |
| 9,328,317 B2 | 5/2016 | Peng |
| 9,339,671 B1 | 5/2016 | Raj |
| 9,382,153 B2 | 7/2016 | Fisher |
| 9,409,045 B2 | 8/2016 | Berezovsky |
| 9,420,169 B2 | 8/2016 | Uemura |
| 9,425,111 B2 | 8/2016 | Park |
| 9,426,984 B2 | 8/2016 | Pascal |
| 9,458,366 B2 | 10/2016 | Blomgreen |
| 9,498,787 B2 | 11/2016 | Fenton |
| 9,499,677 B2 | 11/2016 | Dukes |
| 9,534,072 B2 | 1/2017 | Gurke |
| 9,597,538 B2 | 3/2017 | Langselius |
| 9,604,960 B2 | 3/2017 | Liu |
| 9,605,888 B2 | 3/2017 | Shin |
| 9,616,590 B2 | 4/2017 | Birkeland |
| 9,618,434 B2 | 4/2017 | Mizuta |
| 9,663,943 B2 | 5/2017 | Dimakis |
| 9,706,858 B2 | 7/2017 | Johnson |
| 9,715,352 B2 | 7/2017 | Craddock |
| 9,776,029 B2 | 10/2017 | Izumida |
| 9,777,500 B1 | 10/2017 | Reisdorff |
| 9,782,944 B2 | 10/2017 | Martin |
| 9,792,500 B2 | 10/2017 | Pennypacker |
| 9,803,228 B2 | 10/2017 | Wu |
| 9,809,685 B2 | 11/2017 | Erbes |
| 9,818,524 B2 | 11/2017 | Vaesen |
| 9,822,532 B2 | 11/2017 | Sherry |
| 9,851,718 B2 | 12/2017 | Booher |
| 9,852,993 B2 | 12/2017 | Park |
| 9,856,197 B2 | 1/2018 | Zubrin |
| 9,861,954 B2 | 1/2018 | Chung |
| 9,920,250 B1 | 3/2018 | Vuozzo |
| 9,931,648 B2 | 4/2018 | Fenton |
| 9,956,446 B2 | 5/2018 | Connery |
| 9,986,313 B2 | 5/2018 | Schwarzkopf |
| 9,988,563 B2 | 6/2018 | Holvoet |
| 10,016,643 B2 | 7/2018 | Smith |
| 10,041,251 B2 | 8/2018 | King |
| 10,131,119 B2 | 11/2018 | Freres |
| 10,166,419 B2 | 1/2019 | Springell |
| 10,260,232 B1 | 4/2019 | Conboy |
| 10,290,004 B1 | 5/2019 | Conboy |
| 10,332,222 B1 | 6/2019 | Conboy |
| 10,430,757 B2 | 10/2019 | Conboy |
| 10,464,294 B2 | 11/2019 | Freres |
| 10,472,169 B1 | 11/2019 | Parker, Jr. |
| 10,550,483 B2 | 2/2020 | Khosla |
| 10,653,904 B2 | 5/2020 | Conboy |
| 10,662,114 B2 | 5/2020 | Lettkeman |
| 10,695,597 B2 | 6/2020 | Conboy |
| 10,717,880 B2 | 7/2020 | Dries |
| 10,814,150 B2 | 10/2020 | Conboy |
| 10,844,223 B2 | 11/2020 | Holvoet |
| 10,899,038 B2 | 1/2021 | Conboy |
| 10,919,178 B2 | 2/2021 | Conboy |
| 10,960,249 B2 | 3/2021 | Hulbert |
| 10,960,251 B1 | 3/2021 | Hulbert |
| 10,995,221 B2 | 5/2021 | Lu |
| 11,025,560 B2 | 6/2021 | Singleton, IV |
| 11,142,698 B2 | 10/2021 | Kim |
| 11,247,087 B2 | 2/2022 | Mcdonald |
| 11,395,931 B2 | 7/2022 | Conboy |
| 11,395,934 B2 | 7/2022 | Hulbert |
| 11,400,324 B2 | 8/2022 | Conboy |
| 11,420,084 B2 | 8/2022 | Hulbert |
| 11,534,643 B2 | 12/2022 | Hulbert |
| 11,554,279 B2 | 1/2023 | Hulbert |
| 11,578,487 B2 | 2/2023 | Johnson |
| 11,602,658 B2 | 3/2023 | Hulbert |
| 11,607,570 B2 | 3/2023 | Hulbert |
| 11,628,324 B2 | 4/2023 | Hulbert |
| 11,633,636 B2 | 4/2023 | Conboy |
| 11,638,844 B2 | 5/2023 | Conboy |
| 11,642,555 B2 | 5/2023 | Conboy |
| 11,679,290 B2 | 6/2023 | Robles |
| 11,697,039 B2 | 7/2023 | Conboy |
| 11,697,040 B2 | 7/2023 | Conboy |
| 11,697,041 B2 | 7/2023 | Conboy |
| 11,794,044 B2 | 10/2023 | Conboy |
| 11,807,782 B2 | 11/2023 | Lu |
| 11,819,723 B2 | 11/2023 | Hulbert |
| 11,826,592 B2 | 11/2023 | Conboy |
| 11,836,807 B2 | 12/2023 | Conboy |
| 11,865,390 B2 | 1/2024 | Conboy |
| 11,865,391 B2 | 1/2024 | Hulbert |
| 11,865,392 B2 | 1/2024 | Hulbert |
| 11,865,394 B2 | 1/2024 | Conboy |
| 11,883,703 B2 | 1/2024 | Hulbert |
| 11,911,643 B2 | 2/2024 | Conboy |
| 11,975,231 B2 | 5/2024 | Hulbert |
| 12,053,658 B2 | 8/2024 | Hulbert |
| 12,109,446 B2 | 10/2024 | Hulbert |
| 12,168,152 B2 | 12/2024 | Conboy |
| 12,188,230 B2 | 1/2025 | Johnson |
| 12,208,296 B2 | 1/2025 | Conboy |
| 12,214,233 B2 | 2/2025 | Conboy |
| 12,214,236 B2 | 2/2025 | Hulbert |
| 12,214,237 B2 | 2/2025 | Hulbert |
| 12,221,576 B2 | 2/2025 | Rodríguez |
| 12,226,661 B2 | 2/2025 | Conboy |

(56)                References Cited

U.S. PATENT DOCUMENTS

| | | |
|---|---|---|
| 2001/0000911 A1 | 5/2001 | Stewart |
| 2001/0025712 A1 | 10/2001 | Pagan |
| 2001/0029706 A1 | 10/2001 | Risser |
| 2001/0029750 A1 | 10/2001 | Kotliar |
| 2002/0005288 A1 | 1/2002 | Haase |
| 2002/0011593 A1 | 1/2002 | Richards |
| 2002/0023762 A1 | 2/2002 | Kotliar |
| 2002/0045688 A1 | 4/2002 | Galli |
| 2002/0079379 A1 | 6/2002 | Cheung |
| 2002/0096668 A1 | 7/2002 | Vandersall |
| 2002/0110696 A1 | 8/2002 | Slimak |
| 2002/0111508 A1 | 8/2002 | Bergrath |
| 2002/0125016 A1 | 9/2002 | Cofield |
| 2002/0130294 A1 | 9/2002 | Almagro |
| 2002/0139056 A1 | 10/2002 | Finnell |
| 2002/0157558 A1 | 10/2002 | Woodall |
| 2002/0168476 A1 | 11/2002 | Pasek |
| 2003/0018695 A1 | 1/2003 | Kagaya |
| 2003/0022959 A1 | 1/2003 | Blount |
| 2003/0029622 A1 | 2/2003 | Clauss |
| 2003/0047723 A1 | 3/2003 | Santoro |
| 2003/0051886 A1 | 3/2003 | Adiga |
| 2003/0064779 A1 | 4/2003 | Suda |
| 2003/0066990 A1 | 4/2003 | Vandersall |
| 2003/0132425 A1 | 7/2003 | Curzon |
| 2003/0136879 A1 | 7/2003 | Grabow |
| 2003/0146843 A1 | 8/2003 | Dittmer |
| 2003/0155133 A1 | 8/2003 | Matsukawa |
| 2003/0159836 A1 | 8/2003 | Kashiki |
| 2003/0160111 A1 | 8/2003 | Multer |
| 2003/0168225 A1 | 9/2003 | Denne |
| 2003/0170317 A1 | 9/2003 | Curzon |
| 2003/0212177 A1 | 11/2003 | Vandersall |
| 2003/0213005 A1 | 11/2003 | Alphey |
| 2004/0003569 A1 | 1/2004 | Frederickson |
| 2004/0038730 A1 | 2/2004 | Suda |
| 2004/0051086 A1 | 3/2004 | Pasek |
| 2004/0055765 A1 | 3/2004 | Dillman |
| 2004/0089458 A1 | 5/2004 | Jones |
| 2004/0099178 A1 | 5/2004 | Jones |
| 2004/0109853 A1 | 6/2004 | McDaniel |
| 2004/0134378 A1 | 7/2004 | Batdorf |
| 2004/0163825 A1 | 8/2004 | Dunster |
| 2004/0166246 A1 | 8/2004 | Holcomb |
| 2004/0173783 A1 | 9/2004 | Curzon |
| 2004/0175407 A1 | 9/2004 | McDaniel |
| 2004/0194657 A1 | 10/2004 | Lally |
| 2004/0209982 A1 | 10/2004 | Horacek |
| 2004/0231252 A1 | 11/2004 | Benjamin |
| 2004/0239912 A1 | 12/2004 | Correia Da Silva Vilar |
| 2004/0256117 A1 | 12/2004 | Cheung |
| 2005/0009965 A1 | 1/2005 | Schell |
| 2005/0009966 A1 | 1/2005 | Rowen |
| 2005/0011652 A1 | 1/2005 | Hua |
| 2005/0017131 A1 | 1/2005 | Hale |
| 2005/0022466 A1 | 2/2005 | Kish |
| 2005/0045739 A1 | 3/2005 | Multer |
| 2005/0058689 A1 | 3/2005 | Mcdaniel |
| 2005/0066619 A1 | 3/2005 | McDonald |
| 2005/0090201 A1 | 4/2005 | Lengies |
| 2005/0103506 A1 | 5/2005 | Warrack |
| 2005/0103507 A1 | 5/2005 | Brown |
| 2005/0126794 A1 | 6/2005 | Palmer |
| 2005/0139363 A1 | 6/2005 | Thomas |
| 2005/0161235 A1 | 7/2005 | Chuprin |
| 2005/0167920 A1 | 8/2005 | Rose |
| 2005/0182345 A1 | 8/2005 | Termanini |
| 2005/0229809 A1 | 10/2005 | Lally |
| 2005/0235598 A1 | 10/2005 | Liggins |
| 2005/0241731 A1 | 11/2005 | Duchesne |
| 2005/0263298 A1 | 12/2005 | Kotliar |
| 2005/0269109 A1 | 12/2005 | Maguire |
| 2005/0274312 A1 | 12/2005 | Sutter |
| 2005/0279972 A1 | 12/2005 | Santoro |
| 2006/0037277 A1 | 2/2006 | Fitzgibbons |
| 2006/0039753 A1 | 2/2006 | Leonberg |
| 2006/0048466 A1 | 3/2006 | Darnell |
| 2006/0056379 A1 | 3/2006 | Battin |
| 2006/0060668 A1 | 3/2006 | Gunter |
| 2006/0083920 A1 | 4/2006 | Schnabel |
| 2006/0113513 A1 | 6/2006 | Nilsson |
| 2006/0124322 A1 | 6/2006 | Goldburt |
| 2006/0131035 A1 | 6/2006 | French |
| 2006/0134265 A1 | 6/2006 | Beukes |
| 2006/0157668 A1 | 7/2006 | Erdner |
| 2006/0162941 A1 | 7/2006 | Sridharan |
| 2006/0167131 A1 | 7/2006 | Mabey |
| 2006/0168906 A1 | 8/2006 | Tonyan |
| 2006/0174968 A1 | 8/2006 | De Luna |
| 2006/0175067 A1 | 8/2006 | Cover |
| 2006/0196681 A1 | 9/2006 | Adiga |
| 2006/0208236 A1 | 9/2006 | Gang |
| 2006/0213672 A1 | 9/2006 | Mohr |
| 2006/0260824 A1 | 11/2006 | Dillman |
| 2007/0007021 A1 | 1/2007 | Regan |
| 2007/0020476 A1 | 1/2007 | Kintzley |
| 2007/0026214 A1 | 2/2007 | Bullock |
| 2007/0034823 A1 | 2/2007 | Hagquist |
| 2007/0084554 A1 | 4/2007 | Miller |
| 2007/0085060 A1 | 4/2007 | Santoro |
| 2007/0089431 A1 | 4/2007 | DuBrucq |
| 2007/0090322 A1 | 4/2007 | Yoon |
| 2007/0119334 A1 | 5/2007 | Atkinson |
| 2007/0122616 A1 | 5/2007 | Lawson |
| 2007/0125880 A1 | 6/2007 | Palle |
| 2007/0176156 A1 | 8/2007 | Mabey |
| 2007/0193753 A1 | 8/2007 | Adiga |
| 2007/0194289 A1 | 8/2007 | Anglin |
| 2007/0197112 A1 | 8/2007 | Mazor |
| 2007/0227085 A1 | 10/2007 | Mader |
| 2007/0232731 A1 | 10/2007 | Knocke |
| 2007/0246609 A1 | 10/2007 | Smetannikov |
| 2007/0256842 A1 | 11/2007 | Mohr |
| 2007/0266649 A1 | 11/2007 | Overmyer |
| 2007/0278463 A1 | 12/2007 | Ratzsch |
| 2007/0289709 A1 | 12/2007 | Chong |
| 2007/0289752 A1 | 12/2007 | Beck |
| 2007/0295046 A1 | 12/2007 | Cassan |
| 2008/0000649 A1 | 1/2008 | Guirguis |
| 2008/0012229 A1 | 1/2008 | Rose |
| 2008/0030074 A1 | 2/2008 | Duong |
| 2008/0050565 A1 | 2/2008 | Gross |
| 2008/0050578 A1 | 2/2008 | Sinclair |
| 2008/0054230 A1 | 3/2008 | Mabey |
| 2008/0099580 A1 | 5/2008 | Gunter |
| 2008/0099736 A1 | 5/2008 | Clarke |
| 2008/0115949 A1 | 5/2008 | Li |
| 2008/0128145 A1 | 6/2008 | Butz |
| 2008/0145548 A1 | 6/2008 | Bracher |
| 2008/0166484 A1 | 7/2008 | Smith |
| 2008/0168798 A1 | 7/2008 | Kotliar |
| 2008/0176141 A1 | 7/2008 | Pan |
| 2008/0179067 A1 | 7/2008 | Ho |
| 2008/0184642 A1 | 8/2008 | Sebastian |
| 2008/0201787 A1 | 8/2008 | Shin |
| 2008/0202772 A1 | 8/2008 | Twum |
| 2008/0202775 A1 | 8/2008 | Bordallo Alvarez |
| 2008/0217086 A1 | 9/2008 | Ferreira Neves |
| 2008/0236846 A1 | 10/2008 | Gamble |
| 2008/0265223 A1 | 10/2008 | Sopheap |
| 2008/0276556 A1 | 11/2008 | Flint |
| 2008/0289831 A1 | 11/2008 | Kaimart |
| 2008/0314601 A1 | 12/2008 | Cafferata |
| 2009/0014507 A1 | 1/2009 | D Amato |
| 2009/0039660 A1 | 2/2009 | Gonzalez |
| 2009/0044484 A1 | 2/2009 | Berger |
| 2009/0065646 A1 | 3/2009 | Hale |
| 2009/0075539 A1 | 3/2009 | Dimanshteyn |
| 2009/0090520 A1 | 4/2009 | Lee |
| 2009/0107064 A1 | 4/2009 | Bowman |
| 2009/0120653 A1 | 5/2009 | Thomas |
| 2009/0126948 A1 | 5/2009 | DeSanto |
| 2009/0126951 A1 | 5/2009 | Baek |
| 2009/0145075 A1 | 6/2009 | Oakley |

(56) References Cited

U.S. PATENT DOCUMENTS

| 2009/0188567 A1 | 7/2009 | Mchugh |
| 2009/0194605 A1 | 8/2009 | Lepeshinsky |
| 2009/0212251 A1 | 8/2009 | Taylor |
| 2009/0215926 A1 | 8/2009 | Kozlowski |
| 2009/0216163 A1 | 8/2009 | Evans |
| 2009/0249556 A1 | 10/2009 | Dermeik |
| 2009/0255605 A1 | 10/2009 | Filion |
| 2009/0264560 A1 | 10/2009 | Warnes |
| 2009/0266025 A1 | 10/2009 | Toas |
| 2009/0280345 A1 | 11/2009 | Maynard |
| 2009/0301001 A1 | 12/2009 | Kish |
| 2009/0313748 A1 | 12/2009 | Guedes Lopes Da Fonseca |
| 2009/0313931 A1 | 12/2009 | Porter |
| 2009/0314500 A1 | 12/2009 | Fenton |
| 2009/0326117 A1 | 12/2009 | Benussi |
| 2010/0000743 A1 | 1/2010 | Cohen |
| 2010/0018725 A1 | 1/2010 | Ramos Rodriguez |
| 2010/0032175 A1 | 2/2010 | Boyd |
| 2010/0062153 A1 | 3/2010 | Curzon |
| 2010/0069488 A1 | 3/2010 | Mabey |
| 2010/0175897 A1 | 7/2010 | Crump |
| 2010/0176353 A1 | 7/2010 | Hanna |
| 2010/0181084 A1 | 7/2010 | Carmo |
| 2010/0200819 A1 | 8/2010 | Mans Fibla |
| 2010/0218959 A1 | 9/2010 | Adiga |
| 2010/0252648 A1 | 10/2010 | Robinson |
| 2010/0263886 A1 | 10/2010 | Rahgozar |
| 2010/0267853 A1 | 10/2010 | Edry |
| 2010/0269449 A1 | 10/2010 | Bush |
| 2010/0269735 A1 | 10/2010 | Shichtel |
| 2010/0281784 A1 | 11/2010 | Leo |
| 2010/0314138 A1 | 12/2010 | Weatherspoon |
| 2010/0326677 A1 | 12/2010 | Jepsen |
| 2011/0000142 A1 | 1/2011 | Bui |
| 2011/0005163 A1 | 1/2011 | Timmerman |
| 2011/0005780 A1 | 1/2011 | Rennie |
| 2011/0015411 A1 | 1/2011 | Goto |
| 2011/0061336 A1 | 3/2011 | Thomas |
| 2011/0073331 A1 | 3/2011 | Xu |
| 2011/0089386 A1 | 4/2011 | Berry |
| 2011/0091713 A1 | 4/2011 | Miller |
| 2011/0123809 A1 | 5/2011 | Riebel |
| 2011/0146173 A1 | 6/2011 | Michael |
| 2011/0162295 A1 | 7/2011 | Cottier |
| 2011/0197530 A1 | 8/2011 | Bahnmiller |
| 2011/0203813 A1 | 8/2011 | Fenton |
| 2011/0224317 A1* | 9/2011 | O'Leary ................... C08J 9/08 521/70 |
| 2011/0266486 A1 | 11/2011 | Orr |
| 2011/0284250 A1 | 11/2011 | Thomas |
| 2011/0296769 A1 | 12/2011 | Collins |
| 2011/0315406 A1 | 12/2011 | Connery |
| 2012/0045584 A1 | 2/2012 | Dettbarn |
| 2012/0046419 A1 | 2/2012 | Chung |
| 2012/0067600 A1 | 3/2012 | Bourakov |
| 2012/0073228 A1 | 3/2012 | Fork |
| 2012/0121809 A1 | 5/2012 | Vuozzo |
| 2012/0138319 A1 | 6/2012 | Demmitt |
| 2012/0145418 A1 | 6/2012 | Su |
| 2012/0168185 A1 | 7/2012 | Yount |
| 2012/0199781 A1 | 8/2012 | Rueda-Nunez |
| 2012/0241535 A1 | 9/2012 | Carriere |
| 2012/0256143 A1 | 10/2012 | Ulcar |
| 2012/0258327 A1 | 10/2012 | Mcarthur |
| 2012/0279731 A1 | 11/2012 | Howard, Sr. |
| 2012/0295996 A1 | 11/2012 | Wang |
| 2012/0308631 A1 | 12/2012 | Shirley |
| 2012/0312562 A1 | 12/2012 | Woehrle |
| 2013/0000239 A1 | 1/2013 | Winterowd |
| 2013/0001331 A1 | 1/2013 | Palle |
| 2013/0101839 A1 | 4/2013 | Dion |
| 2013/0111839 A1 | 5/2013 | Efros |
| 2013/0149548 A1 | 6/2013 | Williams |
| 2013/0181158 A1 | 7/2013 | Guo |
| 2013/0239848 A1 | 9/2013 | Fisher |
| 2013/0264076 A1 | 10/2013 | Medina |
| 2013/0288031 A1 | 10/2013 | Labock |
| 2013/0312985 A1 | 11/2013 | Collins |
| 2013/0328322 A1 | 12/2013 | Julian |
| 2014/0027131 A1 | 1/2014 | Kawiecki |
| 2014/0041289 A1 | 2/2014 | Mingolello |
| 2014/0079942 A1 | 3/2014 | Lally |
| 2014/0090310 A1 | 4/2014 | Greene |
| 2014/0123572 A1 | 5/2014 | Segall |
| 2014/0130435 A1 | 5/2014 | Paradis |
| 2014/0193201 A1 | 7/2014 | Stauffer |
| 2014/0202716 A1 | 7/2014 | Klaffmo |
| 2014/0202717 A1 | 7/2014 | Klaffmo |
| 2014/0206767 A1 | 7/2014 | Klaffmo |
| 2014/0209330 A1 | 7/2014 | Statter |
| 2014/0215937 A1 | 8/2014 | Zhou |
| 2014/0216770 A1 | 8/2014 | Gibson |
| 2014/0231106 A1 | 8/2014 | Lewis |
| 2014/0239123 A1 | 8/2014 | Hoisington |
| 2014/0245693 A1 | 9/2014 | Efros |
| 2014/0245696 A1 | 9/2014 | Anderson |
| 2014/0246509 A1 | 9/2014 | Fenton |
| 2014/0284067 A1 | 9/2014 | Klaffmo |
| 2014/0284511 A1 | 9/2014 | Klaffmo |
| 2014/0284512 A1 | 9/2014 | Klaffmo |
| 2014/0290970 A1 | 10/2014 | Izumida |
| 2014/0295164 A1 | 10/2014 | Parker |
| 2014/0299339 A1 | 10/2014 | Klaffmo |
| 2014/0322548 A1 | 10/2014 | Boldizsar |
| 2014/0338930 A1 | 11/2014 | Smith |
| 2014/0366598 A1 | 12/2014 | Carmo |
| 2014/0371381 A1 | 12/2014 | Holvoet |
| 2015/0020476 A1 | 1/2015 | Winterowd |
| 2015/0021053 A1 | 1/2015 | Klaffmo |
| 2015/0021055 A1 | 1/2015 | Klaffmo |
| 2015/0052838 A1 | 2/2015 | Ritchie |
| 2015/0071978 A1 | 3/2015 | Chang |
| 2015/0076842 A1 | 3/2015 | Bendel |
| 2015/0129245 A1 | 5/2015 | Weber |
| 2015/0147478 A1 | 5/2015 | Shutt |
| 2015/0167291 A1 | 6/2015 | Bundy |
| 2015/0175841 A1 | 6/2015 | Parker |
| 2015/0224352 A1 | 8/2015 | Klaffmo |
| 2015/0314564 A1 | 11/2015 | Mancini |
| 2015/0321033 A1 | 11/2015 | Statter |
| 2015/0322668 A1 | 11/2015 | Quinn |
| 2015/0335926 A1 | 11/2015 | Klaffmo |
| 2015/0335928 A1 | 11/2015 | Klaffmo |
| 2015/0352385 A1 | 12/2015 | Fenton |
| 2015/0354199 A1 | 12/2015 | Segall |
| 2015/0368560 A1 | 12/2015 | Pascal |
| 2016/0024260 A1 | 1/2016 | Moriarty |
| 2016/0024779 A1 | 1/2016 | Clus |
| 2016/0030789 A1 | 2/2016 | Cordani |
| 2016/0051850 A1 | 2/2016 | Menard |
| 2016/0059960 A1 | 3/2016 | Fearn |
| 2016/0082298 A1 | 3/2016 | Dagenhart |
| 2016/0096053 A1 | 4/2016 | Beechy |
| 2016/0107014 A1 | 4/2016 | Klaffmo |
| 2016/0132714 A1 | 5/2016 | Pennypacker |
| 2016/0137853 A1 | 5/2016 | Lopez |
| 2016/0216091 A1 | 7/2016 | Erickson |
| 2016/0243789 A1 | 8/2016 | Baroux |
| 2016/0280827 A1 | 9/2016 | Anderson |
| 2016/0313120 A1 | 10/2016 | Shishalov |
| 2016/0329114 A1 | 11/2016 | Lin-Hendel |
| 2017/0007865 A1 | 1/2017 | Dor-El |
| 2017/0008764 A1 | 1/2017 | Labuto |
| 2017/0029632 A1 | 2/2017 | Couturier |
| 2017/0056698 A1 | 3/2017 | Pai |
| 2017/0059343 A1 | 3/2017 | Spinelli |
| 2017/0072236 A1 | 3/2017 | Cordani |
| 2017/0080404 A1 | 3/2017 | Chung |
| 2017/0081844 A1 | 3/2017 | Dimakis |
| 2017/0120089 A1 | 5/2017 | Fisher |
| 2017/0121965 A1 | 5/2017 | Dettbarn |
| 2017/0138049 A1 | 5/2017 | King |
| 2017/0157441 A1 | 6/2017 | Smith |
| 2017/0180829 A1 | 6/2017 | Schwarzkopf |

(56) References Cited

U.S. PATENT DOCUMENTS

| | | |
|---|---|---|
| 2017/0182341 A1 | 6/2017 | Libal |
| 2017/0210098 A1 | 7/2017 | Moore |
| 2017/0226424 A1 | 8/2017 | Moon |
| 2017/0294093 A1 | 10/2017 | Smith |
| 2017/0321418 A1 | 11/2017 | Tremblay |
| 2018/0023283 A1 | 1/2018 | Dunster |
| 2018/0086896 A1 | 3/2018 | Appel |
| 2018/0087270 A1 | 3/2018 | Miller |
| 2018/0089988 A1 | 3/2018 | Schwarzkopf |
| 2018/0119421 A1 | 5/2018 | Pospisil |
| 2018/0202051 A1 | 7/2018 | Kinlen |
| 2018/0331386 A1 | 11/2018 | Koh |
| 2019/0003943 A1 | 1/2019 | King |
| 2019/0023398 A1 | 1/2019 | Albanna |
| 2019/0083835 A1 | 3/2019 | Mariampillai |
| 2019/0091424 A1 | 3/2019 | Haruta |
| 2019/0168033 A1 | 6/2019 | Conboy |
| 2019/0168036 A1 | 6/2019 | Conboy |
| 2019/0169838 A1 | 6/2019 | Conboy |
| 2019/0262637 A1 | 8/2019 | Statter |
| 2019/0308044 A1 | 10/2019 | Chattaway |
| 2019/0330531 A1 | 10/2019 | Wiehn |
| 2019/0382661 A1 | 12/2019 | Kim |
| 2020/0109253 A1 | 4/2020 | Appel |
| 2020/0181328 A1 | 6/2020 | Clark |
| 2020/0206969 A1 | 7/2020 | Pans |
| 2020/0238116 A1 | 7/2020 | Payton |
| 2020/0254290 A1 | 8/2020 | Robles |
| 2020/0406075 A1 | 12/2020 | Conboy |
| 2021/0052928 A1 | 2/2021 | Kim |
| 2021/0154502 A1 | 5/2021 | Conboy |
| 2021/0189245 A1 | 6/2021 | Rodriguez |
| 2021/0213311 A1 | 7/2021 | Austrheim |
| 2021/0379429 A1 | 12/2021 | Darnell |
| 2021/0387376 A1 | 12/2021 | Trefes |
| 2022/0008773 A1 | 1/2022 | Conboy |
| 2022/0016461 A1 | 1/2022 | Conboy |
| 2022/0017772 A1 | 1/2022 | Tai |
| 2022/0054876 A1 | 2/2022 | Conboy |
| 2022/0126144 A1 | 4/2022 | Conboy |
| 2022/0134151 A1 | 5/2022 | Conboy |
| 2022/0241629 A1 | 8/2022 | Raymond |
| 2022/0362596 A1 | 11/2022 | Wolf |
| 2022/0362600 A1 | 11/2022 | Conboy |
| 2023/0129221 A1 | 4/2023 | Wolf |
| 2023/0132525 A1 | 5/2023 | Hulbert |
| 2023/0203811 A1 | 6/2023 | Johnson |
| 2023/0398393 A1 | 12/2023 | Hulbert |
| 2024/0252869 A1 | 8/2024 | Conboy |
| 2024/0257265 A1 | 8/2024 | Conboy |
| 2024/0264571 A1 | 8/2024 | Shoshani |
| 2024/0286310 A1 | 8/2024 | Ni |
| 2024/0366982 A1 | 11/2024 | Conboy |
| 2025/0121235 A1 | 4/2025 | Hulbert |
| 2025/0144460 A1 | 5/2025 | Conboy |
| 2025/0262793 A1 | 8/2025 | Ni |

FOREIGN PATENT DOCUMENTS

| | | | |
|---|---|---|---|
| AU | 2001259865 | | 2/2007 |
| AU | 2005220194 | | 4/2007 |
| AU | 2005220196 | | 4/2007 |
| AU | 2002240521 | | 12/2007 |
| AU | 2002241169 | | 7/2008 |
| AU | 2011244837 | | 5/2012 |
| AU | 2011280137 | | 1/2013 |
| AU | 2019240416 | | 10/2020 |
| CA | 2023624 | C | 3/1997 |
| CA | 2212076 | | 7/1997 |
| CA | 2294254 | | 1/1999 |
| CA | 2406118 | | 10/2001 |
| CA | 2408944 | | 11/2001 |
| CA | 2442148 | | 10/2002 |
| CA | 2409879 | | 4/2003 |
| CA | 2593435 | | 8/2006 |
| CA | 2653817 | | 12/2007 |
| CA | 2705140 | | 5/2009 |
| CA | 2974796 | | 7/2010 |
| CA | 2811358 | | 1/2013 |
| CA | 2792793 | | 4/2013 |
| CA | 2846076 | | 9/2014 |
| CA | 2862380 | | 4/2015 |
| CA | 2868719 | | 6/2015 |
| CA | 2933553 | | 6/2015 |
| CA | 3094694 | A1 | 9/2019 |
| CN | 1397613 | | 2/2003 |
| CN | 101293752 | | 10/2008 |
| CN | 101434760 | | 5/2009 |
| CN | 201815036 | | 5/2011 |
| CN | 202045944 | | 11/2011 |
| CN | 102300610 | | 12/2011 |
| CN | 102337770 | | 2/2012 |
| CN | 202892722 | | 4/2013 |
| CN | 103562079 | | 2/2014 |
| CN | 103813835 | | 5/2014 |
| CN | 104540556 | | 4/2015 |
| CN | 108060358 | | 5/2018 |
| DE | 1302520 | B | 10/1970 |
| DE | 3525684 | | 10/1986 |
| EP | 0059178 | A1 | 9/1982 |
| EP | 0059178 | B1 | 5/1985 |
| EP | 173446 | A1 | 3/1986 |
| EP | 173446 | B1 | 3/1986 |
| EP | 0199131 | A2 | 10/1986 |
| EP | 0140866 | B1 | 6/1987 |
| EP | 0263570 | A1 | 4/1988 |
| EP | 426178 | | 5/1991 |
| EP | 2505326 | | 10/2012 |
| EP | 2898925 | | 7/2015 |
| EP | 2902077 | | 8/2015 |
| EP | 2505326 | B1 | 3/2017 |
| EP | 19167771NWA1 | | 10/2019 |
| GB | 429207 | A | 5/1935 |
| GB | 831720 | A | 3/1960 |
| GB | 832691 | | 4/1960 |
| GB | 1112553 | | 5/1968 |
| GB | 2153193 | | 8/1985 |
| GB | 2301122 | | 11/1996 |
| GB | 2370766 | | 7/2002 |
| GB | 2370769 | A | 7/2002 |
| GB | 2375047 | | 11/2002 |
| GB | 2386835 | | 10/2003 |
| GB | 2486959 | A | 7/2012 |
| GB | 2533262 | | 6/2016 |
| GB | 2549980 | | 11/2017 |
| GB | 2555067 | | 4/2018 |
| JP | 2019058279 | A | 4/2019 |
| KR | 101675486 | | 5/2012 |
| KR | 102216096 | | 2/2021 |
| TW | 1471153 | | 2/2015 |
| TW | 201714639 | | 5/2017 |
| WO | 8607272 | A1 | 12/1986 |
| WO | 8704145 | | 7/1987 |
| WO | 1988000482 | A1 | 1/1988 |
| WO | 8801536 | A1 | 3/1988 |
| WO | 9010668 | | 9/1990 |
| WO | 9100327 | | 1/1991 |
| WO | 9105585 | | 5/1991 |
| WO | 9109390 | A1 | 6/1991 |
| WO | 9109649 | A1 | 7/1991 |
| WO | 9300963 | | 1/1993 |
| WO | 9302749 | A1 | 2/1993 |
| WO | 9321808 | A1 | 11/1993 |
| WO | 9323116 | A1 | 11/1993 |
| WO | 9420169 | A1 | 9/1994 |
| WO | 9425111 | A1 | 11/1994 |
| WO | 9604960 | A1 | 2/1996 |
| WO | 9605888 | A1 | 2/1996 |
| WO | 9618434 | A1 | 6/1996 |
| WO | 9706858 | A2 | 2/1997 |
| WO | 9706858 | A3 | 4/1997 |
| WO | 9715352 | A1 | 5/1997 |
| WO | 9803228 | A1 | 1/1998 |
| WO | 9809685 | A1 | 3/1998 |

(56)　　　　References Cited

FOREIGN PATENT DOCUMENTS

| | | | |
|---|---|---|---|
| WO | 9818524 | A1 | 5/1998 |
| WO | 9852993 | A1 | 11/1998 |
| WO | 9856197 | A1 | 12/1998 |
| WO | 1999013022 | | 3/1999 |
| WO | 1999041012 | | 8/1999 |
| WO | 0006667 | A2 | 2/2000 |
| WO | 2000009326 | | 2/2000 |
| WO | 0022255 | | 4/2000 |
| WO | 0029067 | A1 | 5/2000 |
| WO | 0006667 | A3 | 8/2000 |
| WO | 0107116 | A1 | 2/2001 |
| WO | 0139599 | A2 | 6/2001 |
| WO | 0145932 | | 6/2001 |
| WO | 0166669 | | 9/2001 |
| WO | 0208015 | A1 | 1/2002 |
| WO | 0228484 | A1 | 4/2002 |
| WO | 0228708 | A2 | 4/2002 |
| WO | 0139599 | A3 | 5/2002 |
| WO | 0243812 | A2 | 6/2002 |
| WO | 0244305 | A2 | 6/2002 |
| WO | 0244305 | A3 | 8/2002 |
| WO | 2002072713 | | 9/2002 |
| WO | 2002078865 | | 10/2002 |
| WO | 0228708 | A3 | 1/2003 |
| WO | 03015873 | A2 | 2/2003 |
| WO | 0243812 | A3 | 3/2003 |
| WO | 03024618 | A1 | 3/2003 |
| WO | 2003018695 | A1 | 3/2003 |
| WO | 03015873 | A3 | 5/2003 |
| WO | 03057317 | A1 | 7/2003 |
| WO | 03072201 | A1 | 9/2003 |
| WO | 03073128 | A1 | 9/2003 |
| WO | 2003093395 | | 11/2003 |
| WO | 2004000422 | A1 | 12/2003 |
| WO | 2004000758 | | 12/2003 |
| WO | 2004108528 | A2 | 12/2004 |
| WO | 2005014115 | A1 | 2/2005 |
| WO | 2005046800 | A1 | 5/2005 |
| WO | 2004108528 | A3 | 6/2005 |
| WO | 2005049144 | A2 | 6/2005 |
| WO | 2005054407 | A1 | 6/2005 |
| WO | 2005058423 | A1 | 6/2005 |
| WO | 2005119868 | | 12/2005 |
| WO | 2006006829 | | 1/2006 |
| WO | 2006010667 | | 2/2006 |
| WO | 2006013180 | | 2/2006 |
| WO | 2006017566 | A2 | 2/2006 |
| WO | 2006032130 | A1 | 3/2006 |
| WO | 2006036084 | A1 | 4/2006 |
| WO | 2006045167 | A1 | 5/2006 |
| WO | 2006053514 | A1 | 5/2006 |
| WO | 2006017566 | A3 | 6/2006 |
| WO | 2006056379 | A2 | 6/2006 |
| WO | 2006072672 | | 7/2006 |
| WO | 2006079899 | A2 | 8/2006 |
| WO | 2006081156 | | 8/2006 |
| WO | 2006081596 | | 8/2006 |
| WO | 2006097962 | | 9/2006 |
| WO | 2006056379 | A3 | 10/2006 |
| WO | 2006126181 | | 11/2006 |
| WO | 2007001403 | | 1/2007 |
| WO | 2007008098 | A1 | 1/2007 |
| WO | 2007027170 | A1 | 3/2007 |
| WO | 2007030982 | | 3/2007 |
| WO | 2007033450 | A1 | 3/2007 |
| WO | 2007048149 | | 5/2007 |
| WO | 2007065112 | | 6/2007 |
| WO | 2007092985 | A1 | 8/2007 |
| WO | 2007138132 | A1 | 12/2007 |
| WO | 2007140676 | | 12/2007 |
| WO | 2008031559 | | 3/2008 |
| WO | 2008045460 | A2 | 4/2008 |
| WO | 2008071825 | A2 | 6/2008 |
| WO | 2008071825 | A3 | 7/2008 |
| WO | 2008100348 | | 8/2008 |
| WO | 2008104617 | A1 | 9/2008 |
| WO | 2008111864 | A1 | 9/2008 |
| WO | 08118408 | | 10/2008 |
| WO | 2008150157 | | 12/2008 |
| WO | 2008150265 | | 12/2008 |
| WO | 2008155187 | | 12/2008 |
| WO | 2009004105 | A1 | 1/2009 |
| WO | 2009012546 | A1 | 1/2009 |
| WO | 2009020251 | | 2/2009 |
| WO | 2009022995 | A2 | 2/2009 |
| WO | 2005049144 | A3 | 3/2009 |
| WO | 2009022995 | A3 | 4/2009 |
| WO | 2009042847 | | 4/2009 |
| WO | 2009057104 | | 5/2009 |
| WO | 2009061471 | | 5/2009 |
| WO | 2009086826 | | 7/2009 |
| WO | 2009097112 | | 8/2009 |
| WO | 2009121682 | A1 | 10/2009 |
| WO | 2009139668 | A1 | 11/2009 |
| WO | 2009150478 | A1 | 12/2009 |
| WO | 2009150478 | A4 | 3/2010 |
| WO | 2010028416 | | 3/2010 |
| WO | 2010028538 | A1 | 3/2010 |
| WO | 2010041228 | | 4/2010 |
| WO | 2010046696 | | 4/2010 |
| WO | 2010061059 | | 6/2010 |
| WO | 2010066066 | | 6/2010 |
| WO | 2010078559 | | 7/2010 |
| WO | 2010082073 | | 7/2010 |
| WO | 2010083890 | A1 | 7/2010 |
| WO | 2010089604 | | 8/2010 |
| WO | 2010104286 | | 9/2010 |
| WO | 2010123401 | A1 | 10/2010 |
| WO | 2010139124 | | 12/2010 |
| WO | 2011015411 | A1 | 2/2011 |
| WO | 2011016773 | | 2/2011 |
| WO | 2011025310 | A2 | 3/2011 |
| WO | 2011034334 | A2 | 3/2011 |
| WO | 2011042609 | | 4/2011 |
| WO | 2011042761 | A1 | 4/2011 |
| WO | 2011049424 | A2 | 4/2011 |
| WO | 2011034334 | A9 | 5/2011 |
| WO | 2011054345 | | 5/2011 |
| WO | 2011078727 | A1 | 6/2011 |
| WO | 2011078728 | A1 | 6/2011 |
| WO | 2011025310 | A9 | 7/2011 |
| WO | 2011025310 | A3 | 9/2011 |
| WO | 2011116450 | | 9/2011 |
| WO | 2011049424 | A3 | 11/2011 |
| WO | 2011148206 | A1 | 12/2011 |
| WO | 2012002777 | A2 | 1/2012 |
| WO | 2012021146 | A1 | 2/2012 |
| WO | 2012028155 | A1 | 3/2012 |
| WO | 2012031762 | | 3/2012 |
| WO | 2012002777 | A3 | 5/2012 |
| WO | 2012060491 | | 5/2012 |
| WO | 2012071577 | A2 | 5/2012 |
| WO | 2012076905 | | 6/2012 |
| WO | 2012078916 | | 6/2012 |
| WO | 2012071577 | A3 | 8/2012 |
| WO | 2012147677 | | 11/2012 |
| WO | 2012149634 | A1 | 11/2012 |
| WO | 2012164478 | | 12/2012 |
| WO | 2013003097 | | 1/2013 |
| WO | 2013030497 | A1 | 3/2013 |
| WO | 2013060848 | A1 | 5/2013 |
| WO | 2013062295 | | 5/2013 |
| WO | 2013068260 | | 5/2013 |
| WO | 2013098859 | | 7/2013 |
| WO | 2013140671 | A1 | 9/2013 |
| WO | 2013145207 | | 10/2013 |
| WO | 2013179218 | | 12/2013 |
| WO | 2014001417 | | 1/2014 |
| WO | 2014025929 | | 2/2014 |
| WO | 2014084749 | A1 | 6/2014 |
| WO | 2014115036 | | 7/2014 |
| WO | 2014115038 | A2 | 7/2014 |
| WO | 2014127604 | A1 | 8/2014 |
| WO | 2014152528 | | 9/2014 |

(56)  References Cited

FOREIGN PATENT DOCUMENTS

| | | | |
|---|---|---|---|
| WO | 2014115038 | A3 | 10/2014 |
| WO | 2014155208 | A1 | 10/2014 |
| WO | 2014179482 | | 11/2014 |
| WO | 2014179904 | | 11/2014 |
| WO | 2015020388 | | 2/2015 |
| WO | 2015051917 | | 4/2015 |
| WO | 2015055862 | | 4/2015 |
| WO | 2015061905 | | 5/2015 |
| WO | 2015076842 | A1 | 5/2015 |
| WO | 2015089467 | | 6/2015 |
| WO | 2015094014 | | 6/2015 |
| WO | 2015104006 | | 7/2015 |
| WO | 2015126854 | | 8/2015 |
| WO | 2015131631 | | 9/2015 |
| WO | 2015134810 | A1 | 9/2015 |
| WO | 2015153843 | | 10/2015 |
| WO | 2015168456 | | 11/2015 |
| WO | 2015172619 | | 11/2015 |
| WO | 2016004801 | | 1/2016 |
| WO | 2016005650 | | 1/2016 |
| WO | 2016071715 | | 5/2016 |
| WO | 2016075480 | | 5/2016 |
| WO | 2016088026 | | 6/2016 |
| WO | 2016131060 | | 8/2016 |
| WO | 2016159897 | A1 | 10/2016 |
| WO | 2016175379 | A1 | 11/2016 |
| WO | 2016186450 | | 11/2016 |
| WO | 2017014782 | | 1/2017 |
| WO | 2017015585 | | 1/2017 |
| WO | 17019566 | | 2/2017 |
| WO | 2017016142 | A1 | 2/2017 |
| WO | 2017016143 | A1 | 2/2017 |
| WO | 2017031520 | A1 | 3/2017 |
| WO | 2017070375 | A1 | 4/2017 |
| WO | 2017070375 | A8 | 6/2017 |
| WO | 2017090040 | A1 | 6/2017 |
| WO | 2017094918 | | 6/2017 |
| WO | 2017103321 | A1 | 6/2017 |
| WO | 2017116148 | A1 | 7/2017 |
| WO | 2017157406 | A1 | 9/2017 |
| WO | 2017179953 | A1 | 10/2017 |
| WO | 2017208272 | A1 | 12/2017 |
| WO | 2018006000 | | 1/2018 |
| WO | 2018134704 | | 7/2018 |
| WO | 2020163788 | | 8/2020 |
| WO | 2024102391 | | 5/2024 |
| WO | 2025160100 | A1 | 7/2025 |
| WO | 2025250410 | | 12/2025 |

OTHER PUBLICATIONS

Plumis, "Automist vs. Alternatives", Jan. 2016, (pp. 1-4).
Plumis, Plumis Declaration of Testing and Conformity with Applicable Standards (Automist SmartScan), Jan. 2017, (pp. 1-3).
Plumis, "Registered Details Fact Sheet: Automist Fixed Wall Head", Jan. 2017, (pp. 1).
Pongsathron Issarayungyuen, Wiwat Pichayakorn, Thawatchai Phaechamud, "Cast Natural Rubber Films Comprising Triethyl Citrate" Nov. 15, 2013 (5 Pages).
Potassium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/potassium-salts/ (6 Pages).
Preeti Singh, R. Kumar, S. N. Sabapathy, A. S. Bawa, Comprehensive Reviews in Food Science and Food Safety, Functional and Edible Uses of Soy Protein Products Aug. 2, 2007 (15 Pages).
Preliminary Investigation (PI-0284) by Caltrans Division of Research , Innovation and System Information, DRSI, Surface Applications of Fire Retardants Requested by Kenneth Murray, Division of Maintenance, Nov. 11, 2020, California Department of Transportation, 2020 (25 Pqges).

Press Release "Perimeter Solutions Acquires LaderaTech and FORTIFY-Brand Fire Retardant Technology", Perimeter Solutions, St. Louis Missouri, May 7, 2020 (2 Pages).
Press Release by Perimeter Solutions, Inc,. published Oct. 8, 2020, "Perimeter Solutions and CCSAA Group Partner to Provide Wildfire Defense", Perimeter Solutions, LP, (2 Sheets).
Press Release captioned "Perimeter Solutions's Phos-Chek® Fortify® Now Qualified by USDA Forest Service for Application as a Proactive Wildfire Solution", Oct. 5, 2021, Perimeter Solutions LP, (3 Pages).
Procore Technologies, Inc, Brochure for Procore® Cloud-Based Construction Management Software, Nov. 2018, (11 Pages).
Procore Technologies, Inc, Brochure for Procore® Construction Operating System and Cloud-Based Construction Management System , 2018, (15 Pages).
Produce Brochure for PCC-2020064 Phos-Chek® Preventive Wildfire Solutions Using Phos-Chek® Long-Term Retardants—Phos-Chek® Fortify Fire Retardant and Phos-Chek® LC95/259-FX Fire Retardant Technology, Perimeter Solutions, LP, 2020, (2 Sheets).
Product Application Bulletin for F-500 Encapsulator Multi-Purpose Fire Suppression Agent for Class A, Class B and Class D Type Fires, Hazard Control Technologies, Inc. (HCT), Fayetteville, Georgia 2015 (2 Pages).
Product Brochure "Facts—Formulating Better Tasting Infant Formula—Jungbunzlauer—from Nature to Ingredients®", Jungbunzlauer Suisse AG, Basel, Switzerland, (8 Pages), 2015.
Product Brochure "Product Range Bio-Based Ingredients—Jungbunzlauer—from Nature to Ingredients®", Jungbunzlauer Suisse AG, Basel, Switzerland, (16 Pages), 2017.
Product Brochure "Special Salts—Functional Minerals—Jungbunzlauer—from Nature to Ingredients®", Jungbunzlauer Suisse AG, Basel, Switzerland, (8 10 Pages), 2017.
Product Brochure PCC-2019057-0 for PHOS-CHECK® Airbase and Mobile Services Guide, by Perimeter Solutions, LP, 2020, (12 Sheets).
Product Brochure "Hi-Fog Water Mist Fire Protection—Fire Protection for Buildings—HI-FOG® High-Presure Water Mist", Marioff Corporation Oy, 2017, (12 Pages).
Product Brochure (V5B) for F-500 Encapsulator Agent Technology—Multi-Purpose Fire Suppression Agent for Class A, Class B and Class D Type Fires, Hazard Control Technologies, Inc. (HCT), Fayetteville, Georgia 2015 (6 Pages).
Product Brochure for "259-Fx Long-Term Fire Retardant Low Viscosity (LV) Powder Concentrate by Phos-Chek" (PCC-2019036-2), Perimeter Solutions LP, 2023 (3 Pages).
Product Brochure for "Ground Applied Phos-Chek Long-Term Fire Retardant" (PCC-2019019-0), Perimeter Solutions LP, 2020 (6 Pages).
Product Brochure for "Phos-Chek 259-Fx Long-Term Fire Retardant Low Viscosity (LV) Powder Concentrate" (PCC-2019036-v4), Perimeter Solutions LP, 2023 (3 Pages).
Product Brochure for "Phos-Chek Preventive Wildfire Solutions" (PCC-2020064), Perimeter Solutions LP, 2020 (2 Pages).
Product Brochure for Citrofol, Jungbunzlauer Suisse AG, Jan. 9, 2020 (6 Pages).
Product Brochure for FIRE-TROL® 934 and FIRE-TROL 936 Long-Term Fire Retardants Used in Wildfire Control Ground Applications, by ICL France—ICL Biogemea S.A.S, Revision 12, updated Mar. 29, 2013 , (1 Page).
Product Brochure for First Alert® Tundra™ AF400 Fire Extinguishing Spray, BRK Brands, Inc. Aurora, Illinois, 2007 (2 Pages).
Product Brochure for First Alert® Tundra™ AF400 Fire Extinguishing Spray, BRK Brands, Inc. Aurora, Illinois, 2020 (3 Pages).
Product Brochure for Komodo®-Pro 0-0-16 Plus Micronutrients, by Solutions 4Earth, LLC, Anderson NV, Apr. 2017 (1 Page).
Product Brochure for Komodo®-Pro Premium Potassium Chloride-Free Fertilizer, by Solutions 4Earth, LLC, Anderson NV, Apr. 2017 (2 Pages).
Product Brochure for Longray Model: TS-18 Truck-Mounted ULV Cold Fogger, Shenzhen Longray Technology Co., Ltd., Shenzhen, China, 2013, (1 Page Total).

(56) References Cited

OTHER PUBLICATIONS

Product Brochure for Longray Model: TS-50 Truck-Mounted/ Wheeled Battery-Powered ULV Cold Fogger, Shenzhen Longray Technology Co., Ltd., Shenzhen, China, 2013, (1 Page Total).

Product Brochure for Longray Model: TS-95 Truck-Mounted Thermal Fogging Machine, Shenzhen Longray Technology Co., Ltd., Shenzhen, China, 2013, (1 Page Total).

Product Brochure for Longray Model:TS 35A[E} Hand-Held Thermal Foggier Machine, Shenzhen Longray Technology Co., Ltd., Shenzhen, China, 2013, p. 1 of Fogger Brochure, (16 Pages Total).

Product Brochure for Micro-Blaze Out® Class A/B Fire Fighting Agent (i.e. Microbial Wettinig Agent) Concentrated Water Additive (1-3%), Containing Foaming Agents and Emulsifiers, Verde Environmental, Inc. Houston Texas, 2021, (2 Pages).

Product Brochure for PHOS-CHEK® Wildfire Home Defense Authorizd Service Provider Program, Perimeter Solutions, LP, 2020, (1 Sheet).

Product Brochure for Surfactant-Loaded-Citrate, Jungbunzlauer Suisse AG, Jan. 2018 (8 Pages).

Product Brochure PCC-2019014-0 for Phos-Chek® Code—Combined On Demand Equipment (Code)—Mobile Multi-Chemical System, by Perimeter Solutions, LP, 2020, (4 Sheets).

Product Brochure PCC-2019019-0 for Phos-Chek® Ground Applied Long-Term Fire Retardant Groun Application, by Perimeter Solutions, LP, 2020, (6 Sheets).

Product Brochure PCE-2019052-0 for Phos-Chek® PC Avenger All-Terrain Mobile Unit, Published by Perimeter Solutions, LP, 2019, (12 Sheets).

Product Brochure PCE-2019058-0 for Phos-Check® Fabricated Equipment Solutions, by Perimeter Solutions, LP., 2019, (4 Sheets).

Product Catalogue for Foam Tech Brand of Anti-Fire Chemicals, FoamTech Antifire Company, Kundli, India, Aug. 2021 (9 Pages).

Product Information about Jungbunzlauer brand Tripotassium Citrate, captured at https://www.jungbunzlauer.com/en/products/special-salts/ tripotass, Jungbunzlauer Suisse AG, Basel, Switzerland, (3 Pages), 2020.

Product Information for Bio For, Bioex Sas, Mar. 12, 2019, (2 Pages).

Product Information for Phos-Chek 1% Fluorine Free Class A/B Foam Concentrate, Perimeter Solutions, Jan. 2019 (2 Pages).

Product Information for Phos-Chek MVP-F (0.95 lb/Gal) Dry Concentrate Gum-Thickened, Medium Viscocity, Fugitive Color, USDA Forest Service, May 2016 (1 Page).

Product Label for Phos-Chek® Wildfire Home Defense Long-Term Fire Retardant Concentrated Formula (0.75 Makes 5 Gallons) and Easy Mixing and Spraying Instructions, Perimeter Solutions, LP, 2020, (2 Sheets).

Product Overview (V3) for F-500 Encapsulator Agent (EA) Technology—Multi-Purpose Fire Suppression Agent for Class A, Class B and Class D Type Fires, Hazard Control Technologies, Inc. (HCT), Fayetteville, Georgia 2017 (2 Pages).

Product Overview of Phos-Chek Wildfire Home Defense, Mfg. No. LC-95W, ICL Performance Products, St Louis Missouri, 2020, (1 Page).

Product Properties Information about Jungbunzlauer brand Tripotassium Citrate, captured at https://www.jungbunzlauer.com/en/products/ special-salts/tripotass, Jungbunzlauer Suisse AG, Basel, Switzerland, (2 Pages), 2020.

Safety Data Sheet for Citroflex 4 , Vertellus Performance Materials Inc., Jul. 12, 2012 (9 Pages).

Safety Data Sheet for Citroflex A-2, Vertellus LLC, Nov. 30, 2010 (9 Pages).

Safety Data Sheet for Citroflex A-4, Vertellus LLC, Jun. 29, 2018 (8 Pages).

Safety Data Sheet for Dayglor ECO-21 Corona Magneta Pigment™, Day Glo Color Corp., Cleveland, Ohio, Aug. 9, 2022 (7 Page).

Safety Data Sheet for Dayglor ECO-2100FR Corona Magneta Pigment™, Day Glo Color Corp., Cleveland, Ohio, Aug. 9, 2022 (7 Page).

Safety Data Sheet for Fortress™ FR-100 Fire Retardant, Fortress North America, LLC, Rocklin, California , Jul. 10, 2020 (3 Pages).

Safety Data Sheet for Fortress™ FR-200 Fire Retardant, Fortress North America, LLC, Rocklin, California , Jul. 19, 2020 (3 Pages).

Safety Data Sheet for Fortress™ FR-600 Fire Retardant, Fortress North America, LLC, Rocklin, California , Feb. 8, 2022 (3 Pages).

Safety Data Sheet for Fortress™ FR-700 Fire Retardant, Fortress North America, LLC, Rocklin, California , Apr. 19, 2022 (3 Pages).

Safety Data Sheet for Iron Oxide Pigment Red (E172), CAS 1309-37-1 Diion Trioxide-32-1, Manufacturer: LGC Limited, Teddington, United Kingdom, Printing Date Jul. 6, 2016, Revision Aug. 26, 2014 (7 Pages).

Safety Data Sheet for Komodo Pro Fertilizer (No. R30528) Prepared on Feb. 9, 2017 by Solutions 4 Earth LLC, Henderson NV, Feb. 2017 (4 Pages).

Safety Data Sheet for Lankem BioLoop 68L, Lankem Ltd, May 3, 2020 (7 Pages).

Safety Data Sheet for Lankem BioLoop 84L, Lankem Ltd, Feb. 18, 2018 (7 Pages).

Safety Data Sheet for M-Fire AAF31 Job Site Spray, M-Fire Holdings LLC., Jan. 2018 (7 Pages).

Safety Data Sheet for Phos-Chek 1% AFF—[Aquafilm AF-1U], Auxquimia, Jul. 7, 2014 (13 Pages ).

Safety Data Sheet for Phos-Chek 1% Fluorine Free, Perimeter Solutions, Sep. 13, 2019 (6 Pages).

Safety Data Sheet for PHOS-CHEK WD-881's Fish Toxicity Values, Perimeter Solutions, May 2019 (2 Pages).

Safety Data Sheet for Phos-Chek® LC95W Solution (AST10150. 173), Perimeter Solutions, St. Louis, Missouri, Jun. 10, 2015 (5 Pages).

Safety Data Sheet for Polyphase PW40, Troy Corporation, Aug. 23, 2018 (14 Pages ).

Safety Data Sheet for Potassium Oxalate Monohydrate (CAS RN 6487-48-5), by Fisher Scientific Company, Revised Dec. 24, 2024 (7 Pages).

Safety Data Sheet for Sodium Benzoate, Lab Grade, CAS 532-32-1, Manufacturer: AquaPhoenix Scientific, Hanover, PA, SDS Created by Global Safety Management, Inc. Effective Date Dec. 28, 2014, Last Updated Mar. 19, 2015 (6 Pages).

Safety Data Sheet for The Amazing Docter Zymes Eliminator, The Amazing Doctor Zymes, Laytonville, CA, Revision Jul. 10, 2017 (2 Pages).

Safety Data Sheet for The Amazing Doctor Zymes Eliminator, The Amazing Doctor Zymes, Jul. 10, 2017 (2 Pages).

Safety Data Sheet for TROY PolyPhase PW40, Troy Corporation, Revised Aug. 23, 2018 (2018).

Safety Report titled "Safety Risks to Emergency Responders from Lithium-ion Battery Fires in Electric Vehicles", National Transportation Safety Board, Nov. 13, 2020 (80 Pages).

Sam Baker, "Fire Retardants That Protect The Home", LA Times, Nov. 25, 2007, https://www.latimes.com/business/realestate/la-re-fire25nov25-story.html, (4 Pages).

Scientific Opinion by EFSA Panel on Food Additives and Nutrient Sources added to Food (ANS), comprising Maged Yo"unes, Peter Aggett, et al., "Evaluation of di-magnesium malate, used as a novel food ingredient and as a source of magnesium in foods for the general population, food supplements, total diet replacement for weight control and food for special medical purposes", published in EJ EFSA Journal, EFSAEFSA Journal 2018; 16(6):5292 (24 Pages).

Scott T. Handy, "Applications of Ionic Liquids in Science and Technology", Published by InTech, Rijeka, Croatia, 2011, (528 Pages).

Scott T. Hardy, "Applications of Ionic Liquids in Science and Technology", Sep. 2011, (pp. 1-528).

Screenshot of webpage for Lankem Bioloop Surfactants, Lankem Ltd, captured on Feb. 7, 2021 at https://www.lankem.com/bioloop-surfactants (1 Pag 1).

Screenshot of webpage for Lankem Products, Lankem Ltd, captured on Feb. 7, 2021 at https://www.lankem.com/products (1 Page ).

SDS for GreenFire Pro Defense Wetting Agent, by Fire Suppression Innovations, Placentia CA, Aug. 16, 2022 (4 Pages).

(56) References Cited

OTHER PUBLICATIONS

Sellsheet for Green Design Engineering (GDE)—Earth-Friendly Solutions for Sustainable Results™—by Profile Products LLC, Mar. 2014, Profile Products, LLC, Buffalo Grove, Illinois, (2 Pages).

SFPE, Peter Johnson, "Fire Safety Engineering Education—Part of a Certification Framework", Jan. 2012, (pp. 1-11).

Siemens, "Transforming Timbers into Houses", Jan. 2013, (pp. 1-3).

Simplex Aerospace, "Spray Systems Overview", Jan. 2016, (pp. 1-3).

SNS-DC™ All Natural Disease and Fungal Control Application & Use Guide, Sierra Natural Science, Inc. Salinas, CA, , 2020 (7 Pages).

Sodium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/sodium-salts/ (7 Pages).

Specification Data Sheet for Instant & Non Instant Whey Protein Concentrate 80%, The Milky Whey Inc., Jan. 2021 (1 Page).

Specification Document for Fire Suppressant Foam for Wildland Firefighting (Class A Foam), U. S. Department of Agriculture Forest Service, Jun. 1, 2007 (31 Pages).

Specification Document for Water Enhancers for Wildland Firefighting, U.S. Department of Agriculture Forest Service, Jun. 1, 2007 (24 Pages).

Specification for Fire Suppressant Foam for Wildland Firefighting (Class A Foam), 5100-307b, Jun. 1, 2007, (Amendments Inserted into the Text, May 17, 2010) U.S. Department of Agriculture Forest Service (31 Pages).

Specification for Water Enhancers for Wildland Firefighting, 5100-306b, Sep. 2018 Superseding Specification 5100-306a, Jun. 1, 2007, U.S. Department of Agriculture Forest Service (24 Pages).

Spiritos Properties, "Mass Timber—101 and Beyond", Apr. 2017, (pp. 1-17).

Spraying Systems Co., "Industrial Hydraulic Spray Products", Jan. 2015, (pp. 1-220).

State of California Environmental Protection Agency, "Chemicals Known to the State to Cause Cancer or Reproductive Toxicity", Jan. 2017, (pp. 1-22).

Status of REACH Registration for Jungbunzlauer Products before the European Chemicals Agency (ECHA), No. 12.19, by Jungbunzlauer Suisse AG, Basel Switzerland, Aug. 10, 2020 (2 Pages).

Stefania Marzorati *, Luisella Verotta and Stefano P. Trasatti, Green Corrosion Inhibitors from Natural Sources and Biomass Wastes, Molecules 2019, 24, 48 (24 Pages).

Stephen Preece, Paul Mackay, Adam Chattaway, "The Cup Burner Method—Parametric Analysis of the Factors Influencing the Reported Extinguishing Concentrations of Inert Gases", Jan. 2001, (pp. 1-13).

Stephen Quarles and Ed Smith, "The Combustibility of Landscape Mulches" (SP-11-04), University of Nevada Cooperative Extension, 2011 (8 Pages).

ASTM International, "Standard Practice for Calculating Bending Strength Design Adjustment Factors For Fire-Retardant-Treated Plywood Roof Sheathing", Oct. 2015, (pp. 1-6).

ASTM International, "Standard Test Method for Evaluating the Effects of Fire-Retardant Treatments and Elevated Temperatures on Strength Properies of Fire-Retardant treated Lumber", Jul. 2010, (pp. 1-6).

ASTM International, "Standard Test Method for Evaluating the Flexural Properties of Fire-retardant Treated Softwood Plywood Exposed to Elevated Temperatures", May 2001, (pp. 1-7).

ASTM International, "Standard Test Method for Extended Duration Surface Burning Characteristics of Building Materials (30 min Tunnel Test)," Aug. 2011, (pp. 1-4).

ASTM International, "Standard Test Method for Hygroscopic Properties of Fire-Retardant Wood and Wood-Based Products", Jul. 2013, (pp. 1-3).

ASTM International, "Standard Test Methods for Fire Tests of Building Construction and Materials", Oct. 2000, (pp. 1-24).

Australian Building Codes Board, "Ncc 2019, Fire Safety Verification Method", Jan. 2018, (pp. 1-95).

Autodesk, Inc., "Autodesk® BIM 360 Docs: A Cloud-Based Document Management Service for Construction Project and Project Teams," 2016 (1 Pages).

Autodesk, Inc., "Autodesk® BIM 360 Docs: A Cloud-Based Document Management Service for Construction Project and Project Teams," 2017 (2 Pages).

Autodesk, Inc., "Autodesk® BIM 360 Docs: A Cloud-Based Document Management Service for Construction Project and Project Teams," 2017 (3 Pages).

Autodesk, Inc., Sander Lijbers, AEC Industry Manager, Presentation at CADAC BIM Congres 2015 on Autodesk® BIM 360®, 2015 (33 Pages).

Bank Insurance, Michael D. White, "How Benjamin Franklin Became the 'Father of Insurance'", Dec. 1998, (pp. 1-3).

Benzinga, "Megola Inc. Files Application to Underwriter Laboratories for Certification", May 2010, (pp. 1-3).

Bergman et al. The Carbon Impacts of Wood Products. Forest Products Journal vol. 64, No. 7/8. 2014.

Bete, "PJ: Fine Atomization", Nov. 2017, (pp. 1).

Bete, "Bete Announces High-Performance Nozzles for Fire Protection Systems", Nov. 2017, (pp. 1-2).

Bete, "Low Flow", Nov. 2017, (pp. 1).

Bete, "MicroWhirl: Fine Atomization", Nov. 2017, (pp. 1).

Bete, "P: Fine Atomization", Nov. 2017, (pp. 1).

Bete, "UltiMist", Nov. 2017, (pp. 1).

Binu Kundukad , Gayathri Udayakumar, Erin Grela, Dhamanpreet Kaur, Scott A. Rice, Staffan Kjelleberg, Patrick S. Doyle, Weak acids as an alternative anti-microbial therapy, Elsevier B. V., Biofilm 2, 2020 100019 (8 Pages).

Binu Kundukad, Gayathri Udayakumar, Erin Grela, Dhamanpreet Kaur, Scott A. Rice, Staffan Kjelleberg, Patrick S. Doyle, Elsevier, "Biofilm: Weak acids as an alternative anti-microbial therapy" Januray 15, 2020 (8 Pages).

Blog Article titled, "Cleaning and Killing Black Mold with Common, Non-Toxic, Household Products" captured on Feb. 1, 2021 at https://www.lifemaideasy.com/cleaning-and-killing-black-mold-w (pp. 1-9).

Blog on LifeMaidEasy.com, Cleaning and Killing Black Mold With Common, Nontoxic, Household Product, posted Mar. 17, 2020, https://www.lifemaideasy.com/post/cleaning-and-killing-black-mold-with-common-non-toxic-household-products, Mar. 17, 2020 (9 Pages).

Bo Madsen and E. Kristofer Gamstedt, Review Article "Wood versus Plant Fibers: Similarities and Differences in Composite Applications", Hindawi Publishing Corporation Advances in Materials Science and Engineering vol. 2013, Article ID 564346, (14 pages).

Boss Products, "EcoMAXX Brochure", Apr. 2016, (pp. 1-2).

Brian R. Donner, "Dry Chemical Suppression for Lithium Compounds" Jan. 2012 (32 Pages).

Brief Profile on Tripotassium Citrate, by European Chemicals Agency (ECHA), Official Journal of the European Union, Jun. 13, 2022 (18 Pages).

Briefing "Assessing Aerial Suppresion Drop Effectiveness", Issue 38, Sep. 2009, Fire Note Background Briefs, published jointly by theBushfire Cooperative Research Centre (Bushfire CRC ) and the Australasian Fire and Emergency Service Authorities Council (AFAC) (4 Pages).

Brochure for Clore Wildfire Defense, Clore Corp., Aug. 2024 (2 Pages).

Brochure for AkroFoam Master Stream Nozzle with Pickup Tube Style 4475, Akron Brass Company, Apr. 2021 (2 Pages).

Brochure for Chemguard NFF 3×3 UL201 Non-Fluorinated Alcohol Resistant Firefighting Foam Concentrate, Johnson Controls, Jan. 14, 2021 (4 Pages).

Brochure for GreenFire Pro Defense Wetting Agent, by Fire Suppression Innovations, Placentia CA, Jul. 2022 (2 Pages).

Brochure for Jungbunzlauer Range of Products, Jungbunzlauer Suisse AG, May 7, 2020 (20 Pages).

Brochure for SKUM Firefighting Foam Concentrates and Hardware, Johnson Controls, Oct. 2019 (8 Pages).

Bruker, "S1 Titan Brochure", Nov. 2017, (pp. 1-8).

(56)          References Cited

OTHER PUBLICATIONS

C. I. Onwulata, R. P. Konstance, P. M. Tomasula, American Dairy Science Association, "Minimizing Variation in Functionality of Whey Protien Concentrates from Different Sources" Sep. 25, 2003 (8 Pages).

Calcium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/calcium-salts/ (6 Pages).

Calgary Herald, Andrea Cox, "Homebuilder Wants Buyers to be in the Pink", Oct. 2011, (pp. 1-6).

Callisonrtkl, "Seattle Mass Timber Tower, Feasibility Study: Design and Construction Analysis " Aug. 2016, (pp. 1-34).

Canada Department of Forest and Rural Development, Ottawa, Canada, "The Sprayer-Duster As A Tool For Forest Fire Control", D. G. Fraser, Forestry Branch Departmental Publication No. 1167, 1967 (19 Pages).

Canadian Interagency Forest Fire Centre (CIFFC) Products Meeting the Canadian Specification for Longh-Term Retardants (Meeting Qualifying Performance Requiremens for Long-Term Fire Retardants and Pretreatment Produts, US Forest Service 5100-304d, Canadian Interagency Forest Fire Centre (CIFFC) , Fire & Aviation MAnagement, May 5, 2024 (2 Pages).

Carol Walker, Executive Director of RMIIA, "Wildfire & Insurance: Insurance Communications Challenges a& Opportunities", https://www.iii.org/sites/default/files/docs/pdf/cc_presentation_carole_walker_111416.pdf , Oct. 2016, (8 Pages).

Carole Walker, Director Rmiia, Presentation—"Wildfire & Insurance: Insurance Communications Challenges & Opportunities", Sep. 2018 (8 Pages).

Cease Fire, "CFCA 900 Clean Agent Fire Supression System Unit Specifications", Nov. 2017, (pp. 1).

Cease Fire, "Why Choose Waterless Fire Suppression", Sep. 2018, (pp. 1-2).

CFR—Code of Federal Regulations, Title 21 Food and Drugs, vol. 1, Salts iof Fatty Acids, As Food Additive, US FDA, Oct. 17, 2023 (1 Page).

Chapter 9.2: Solubility and Structure—Chemistry LibreTexts, captured on Oct. 6, 2024, at https://chem.libretexts.org/Courses/Prince_Georges_Community_College/CHEM_2000%3A_Chemistry_for_Engineers_(Sinex)/Unit_3%3A_States_of_Matter/Chapter_9%3A_Solutions/Chapter_9.2%3A_Solubility_and_Structure, (12 Pages).

Charlotte Pipe and Foundry Company, "Technincal Bulletin: Understanding Flame Spread Index (FSI) and Smoke Developed Index (SDI) Ratings", Jan. 2016, (pp. 1-2).

Chemical Online, "Mse Enviro-Tech Corp. Introduces Dectan", May 2007, (pp. 1).

Chemical Specialties Inc., "D-Blaze Fire Retardant Treated Wood, The New Generation Building Material", Mar. 2004, (pp. 1-2).

Chemistry LibreTexts Entry for Properties of Esters , https://chem.libretexts.org/Bookshelves/Organic_Chemistry/Supplemental_Modules_(Organic_Chemistry)/Esters/Properties_of_Esters , captured Sep. 26, 2024 (4 Pages).

Cheryl Hogue, "Seeing Red: Controversy Smolders over Federal Use of Aerially Applied Fire Retardants", Aug. 29, 2021, ACS vol. 89, No. 35, pp. 11-15, published at http://pubsapp.acs.org/cen/coverstory/89/8935cover.html, (6 PAges).

Chip Tuson, Ohio State News, "World's First "Intelligent" Sprayer", Aug. 2, 2018, https://news.osu.edu/the-worlds-first-intelligent-sprayer/, (4 Pages).

Christopher E. Chwedyk, Burnham, "Re-examining Residential high-Rise Sprinklers: Where Does Chicago Stand?", Aug. 2017, (pp. 1-4).

Clean Production Action, "GreenScreen Certified: Standard for Firefighting Foam" Apr. 1, 2021 (28 Pages).

Clean Production Action, "GreenScreen Certified: Standard for Firefighting Foam" Feb. 25, 2020 (48 Pages).

Clive Buckley and David Rush, Ministry of Defence, "Water Mist Developments for the Royal Navy", Apr. 1996, (pp. 1-14).

CMA Robotics, "GR 650", Nov. 2017, (pp. 1-2).

CMA Robotics, "GR 6100-HW-S", Nov. 2017, (pp. 1-2).

CMA Robotics, "GR 6100-HW", Nov. 2017, (pp. 1-2).

CMA Robotics, "GR 630", Nov. 2017, (pp. 2).

Coastal Forest Products, "CP-LAM 2.0E Design Properties & Floor Beams", Nov. 2017, (pp. 1-5).

Coastal Forest Products, "Multi-Ply CP-LAM Beam Assembly", Nov. 2017, (pp. 1-5).

Col Michael Receniello, "Fire Suppression Systems (FSS) Enhance Tactical Wheeled Vehicle (TWV) Survivability", Jul. 2010, (pp. 1-3).

Conception R.P. Inc., "The Cutting Edge of Finger Jointing", Feb. 2005, (pp. 1-16).

Conrad Forest Products, "Bluwood: The Color of Protection", http://www.conradfp.com/building-products-bluwood.php, Nov. 2017, (pp. 1-8).

Cornell Law School, "26 U.S. Code § 45Q—Credit for Carbon Dioxide Sequestration", Dec. 2014, (pp. 1-3).

Corrected Notice of Allowability dated Dec. 21, 2020 for U.S. Appl. No. 15/829,943 (pp. 1-2).

Corrected Notice of Allowability dated Dec. 23, 2020 for U.S. Appl. No. 16/449,389 (pp. 1-4).

Corrected Notice of Allowability dated Jan. 7, 2021 for U.S. Appl. No. 15/829,944 (pp. 1-2).

Cosmetics Info, "Citric Acid and its Salts and Esters" Jan. 15, 2021 (3 Pages).

Costas Emmanuel Synolakis and Georgios Marios Karagiannis, Wildfire risk management in the era of climate change, PNAS Nexus, May 2024, 3, (12 Pages).

CSE Inc, "AC479: Proposed AC for Wood Structural Panels with Factory-Applied Fire-Retardant Coating", Feb. 2017, (pp. 1-101).

Csiro, "Certificate for Conformity: Fike Micromist, Pre-engineered Water Mist Fire Suppression System", Jan. 2012, (pp. 1-5).

Custom Product Technical Data Sheet for Dayglo® ECO-2100ER Corona Magneta Pigment™—Rev. 1.00_2023 10.12, Day Glo Color Corp., Cleveland, Ohio, 2023 (1 Page).

CutSheet for GreenFire Pro Defense Wetting Agent, by Fire Suppression Innovations, Placentia CA, Jul. 1, 2022 (2 Pages).

Cyril N. Hinshelwood, "Chemical Kinetics in the Past Few Decades", Nobel Lecture, Dec. 1956, (pp. 1-11).

D. Roosendams, K. Van Wingerden, M.N. Holme and P. Hoorelbeke, "Experimental Investigation of Explosion Mitigating Properties of Aqueous Potassium Carbonate Solutions", Journal of Loss Prevention in the Process Industries, vol. 46, Feb. 20, 2017 (19 Pages).

D. Roosendans, K. Van Wingerden, M. H. Holme, and P. Hoorelbeke, "Experimental Investigation of Explosion Mitigating Properties of Aqueous Potassium Carbonate Solutions," Journal of Loss Prevention in the Process Industries, vol. 46, 2017 (19 Pages).

D. Roosendans, K. Van Wingerden, M. N. Holme, P. Hoorelbeke, Elsevier, "Experimental investigation of explosion mitigating properties of aqueous potassium carbonate solutions" Feb. 14, 2017 (19 Pages).

D. Roosendans, K. Van Wingerden, M.N. Holme, P. Hoorelbeke, "Experimental investigation of explosion mitigating properties of aqueous potassium carbonate solutions" Feb. 20, 2017 (19 Pages).

D.G. Fraser, "Break the Flame Chain Reaction", Jun. 1962, (pp. 1-3).

D.J. Spring, D.N. Ball, "Alkali Metal Salt Aerosols As Fire Extinguishants" , Jan. 1998 (7 Pages).

D.Jones Joseph Jebaraja, N. Rajesh Jesudoss Hynesb* , Basanth Navin Kc, Corrosion Inhibition in Magnesium by using Green Inhibitor, IOP Conf. Series: Materials Science and Engineering 1258 (2022) 012035, (9 Pages).

Danfoss Semco Fire Protection, "Deck Foam Fire Fighting System", Aug. 2016, (pp. 1-4).

Danfoss Semco Fire Protection, "Dry Powder Fire Fighting System", Aug. 2016, (pp. 1-4).

Danfoss Semco Fire Protection, "High Pressure CO2 Fire Fighting System", Aug. 2016, (pp. 1-4).

Danfoss Semco Fire Protection, "Sem-Safe: High-Pressure Water Mist System", Feb. 2014, (pp. 1-8).

(56)     References Cited

OTHER PUBLICATIONS

Daniel Madrzykowski, National Institute of Standards and Technology, "Water Additives for Increased Efficiency of Fire Protection and Suppression", Jan. 1998, (pp. 1-6).
Data Sheet for 36 Chemguard 36 Gallon 2 Foam Station, Tyco Fire Protection Products, Jan. 2018 (4 Pages).
Data Sheet for Ansul AFP6B 6% Fluoroprotein Foam Concentrate, Johnson Controls, Jan. 2019 (2 Pages).
Data Sheet for Ansul AFP6B 6% Fluoroprotein Foam Concentrate, Tyco Fire Protection Products, Jan. 2019 (2 Pages).
Data Sheet for ANSUL Foam Testing/ Foam Test Kit, Johnson Controls, Jan. 2020 (1 Page).
Data Sheet for Chemguard 3% Fluoroprotein Foam Concetrate, Chemguard, Sep. 2005 (2 Pages).
Data Sheet for Chemguard CFP3B 3% Fluoroprotein Foam Concentrate, Tyco Fire Protection Products, Jan. 2019 (2 Pages).
Data Sheet for Chemguard S-550 High Performance Nonionic Fluorosurfactant, Tyco Fire Protection Products, (1 Page), 2018.
Data Sheet for Chemguard S-760P High Performance Anionic Fluorosurfactant, Tyco Fire Protection Products, Jan. 2018 (1 Page).
Data Sheet for Chemguard S-761P High Performance Anionic Fluorosurfactant, Tyco Fire Protection Products, Jan. 2018 (1 Page).
Data Sheet for Chemguard S-764P High Performance Anionic Fluorosurfactant, Tyco Fire Protection Products Jan. 2018 (2 Pages)2.
Global CSS Institute, "The Global Status of CSS: 2017", Oct. 2017, (pp. 1-43).
Globe Advisors, "Study of Insurance Costs for Mid-Rise Wood Frame and Conrete Residential Buildings", Jan. 2016, (pp. 1-61).
Globenewswire, "Shazamstocks.com Announces Profile Launch of MSE Enviro-Tech Corp.", Feb. 2008, (pp. 1-3).
Gokhan Balik, "The Use of Air Atomizing Nozzles to Produce Sprays with Fine Droplets", Apr. 2014, (pp. 1-7).
Green Building Advisor, Martin Holladay, "Is OSB Airtight?", Aug. 2015, (pp. 1-4).
Green Corrosion Inhibitors from Natural Sources and Biomass Wastes, by Stefania Marzorati , Luisella Verotta and Stefano P. Trasatti, Molecules 2019, vol. 24, Dec. 2018 (24 Pages).
Greentech Media, "Can Updated Tax Credits Bring Carbon Capture Into the Mainstream?", Feb. 2018, (pp. 1-8).
Group 1: Hydrogen and the Alkali Metals—Chemistry LibreTexts, captured on Oct. 6, 2024 at https://chem.libretexts.org/Bookshelves/Inorganic_Chemistry/Supplemental_Modules_and_Websites_(Inorganic_Chemistry)/Descriptive_Chemistry/Elements_Organized_by_Block/1_s-Block_Elements/Group_1%3A_The_Alkali_Metals (2 Pages).
GS Environment, "STAT-X Condensed Aerosol Fire Suppression Systems", Nov. 2017, (pp. 1-6).
Guomin Zhao, Guanghji Xu, Shuang Jin, Qingsong Zhang and Zhongxian Liu, Fire-Entinguishing Efficiency of Superfine Powders under Different Injection Pressures, Hindawi International Journal of Chemical Engineering, vol. 2019, Article ID 2474370, May 19, 2019, (8 Pages).
Guomin Zhao, Guangji Xu, Shuang Jin, Qinsong Zhang, Zhongxian Liu, International Journal of Mechanical Engineering, "Fire-Extinguishing Efficiency of Superfine Powders Under Different Injection Temperatures" May 2, 2019 (8 Pages).
H. A. Krebs, W. A. Johnson, "36 The role of citric acid in intermediate metabolism in animal tissues" Aug. 25, 1980 (9 Pages ).
H. Wang, L. A. Johnson, T. Wang, "Preparation of Soy Protein Concentrate amd Isolate from Extruded-Expelled Soybean Meals" Jul. 2004 (6 Pages).
Hansentek, Model 120 Spark Detector Brochure, Nov. 2017, (pp. 1-2).
Hardwood Plywood & Veneer Association, "Report on Surface Burning Characteristics Determined by ASTM E 84 Twenty-Five Foot Tunnel Furnace Test Method", Jan. 2008, (pp. 1-7).
Hartindo, "AF31 Air Bombing Screenshots", Nov. 2017, (pp. 1-4).

Hartindo; Clean Anti Fire Chemicals—Dectan; as published Nov. 9, 2016 retrieved from https://web.archive.org/web/ 20161109011047/http://hartindo.co.id/products/dectan/ (2 pages).
History of Dr. Paul Lohmann, published by Dr. Paul Lohmann GmbH & Co. KGaA Hauptstrasse 2 • 31860 Emmerthal Germany, captured on Oct. 6, 2024 at https://www.lohmann-minerals.com/company/history/ (17 Pages).
Holzforschung Austria, "Construction with Cross-Laminated Timber in Multi-Storey Buildings: Focus on Building Physics", Apr. 2013, (pp. 1-160).
Holzforshung Austria, "Short Report: Renewal of the abridged report on the fire resistance REI 60 according to EN 13501-2 of Stora Enso CLT as load-carying cross-laminated timber wall elements 80 mm unplanked and planked with plaster boards", Dec. 2012, (pp. 1-5).
Honeywell, "Viewguard PIR", Jan. 2007, (pp. 1-2).
Hoover Inc., "Code References: Fire-Retardant-Treated Wood", Mar. 2014, (pp. 1-2).
Hoover Inc., "Exterior Fire-X Treated Wood: Material Safety Data Sheet", Oct. 2005, (pp. 1-9).
Hoover Inc., "Exterior-Fire X", Nov. 2017, (pp. 1).
Hoover Inc., "Fasteners for Pyro-Guard: Interior Fire Retardant Treated Wood Products", Oct. 2013, (pp. 1).
Hoover Inc., "Guidelines For Finishing and Use of Adhesives with Pyro-Guard Fire Retardant Treated Wood", Jan. 2014, (pp. 1).
Hoover Inc., "LEED and FSC Chain of Custody Information", Feb. 2016, (pp. 1).
Hoover Inc., "Pyro-Guard Storage, Handling, and Installation Recommendations", Jan. 2014, (pp. 1).
Hoover Inc., "Pyro-Guard, Exterior Fire-X", Dec. 2017, (pp. 1-12).
Hoover Inc., "Pyro-Guard", Nov. 2017, (pp. 1).
Hoover Inc., "Specification for Pyro-Guard: Interior Fire Retardant Treated Wood", Apr. 2014, (pp. 1).
Hoover Wood Products, "Exterior Fire-X Material Safety Data Sheet", Oct. 2005, (pp. 1-5).
Hoover, "2hr Fire Resistant Load Bearing Wall", Nov. 2017, (pp. 1). https://www.youtube.com/watch?v=YMgd5sAxG1o—wood finger joint production line, published Jun. 27, 2016.
Huang Yingsheng, Zhang Wencheng, Dai Xiaojing, Zhao Yu, "2012 International Symposium on Safety Science and Technology: Study on water-based fire extinguishing agent formulations and properties", Elsevier Procedia Engineeering, vol. 45 (6 Pages).
Huang Yinsheng, Zhang Wencheng, Dai Xiaojing, and Zhao Yu, "2012 International Symposium on Safety Science and Technology Study on water-based fire extinguishing agent formulations and properties", Published by Elsevier Ltd. Selection and/or peer-review under responsibility of the Beijing Institute ofTechnology, 2012, (6 Pages).
Hughes Associates Europe, "The Water Mist Technology Future; How the Test and Approval Process May Affect the next Developments", Jan. 2015, (pp. 1-23).
Hui Zhang, Rice University, "Effect of Oils, Soap and Hardness on the Stability of Foams" Sep. 2003, (221 Pages).
Hy-Tech, "Insulating Ceramic Microspheres", Nov. 2017, (pp. 1-3).
Hy-Tech, "ThermaCels: Insulating Ceramic Additive for Paint", Nov. 2017, (pp. 1-2).
Hyeon Kim, Young Seok Ji, Shaheed Ur Rehman, Min Sun Choi, Myung Chan Gye, Hye Hyun Yoo, "Pharmacokinetics and Metabolism of Acetyl Triethyl Citrate, a Water-Soluble Plasticizer for Pharmaceutical Polymers in Rats" Apr. 3, 2019 (13 Pages).
Hyun-Min Yang, The role of Organic and Eco-Friendly Inhibitors on the Corrosion Mitigation of Steel in Acidic Environments—A State-of-Art Review, Molecules 2021, 26, 3473 (20 Pages).
ICC Evaluation Service Inc., "FirePro", Nov. 2005, (pp. 1-4).
ICC Evaluation Service Inc., "ICC-ES Listing Report: FX Lumber Guard/FX Lumber Guard XT Fire-Retardant Coatings", Oct. 2016, (pp. 1-3).
ICC Evaluation Service Inc., "ICC-ES Report: Pyro-Guard Fire Retardant-Treated Wood", Dec. 2016, (pp. 1-8).
ICL Performance Products LP, "Material Safety Data Sheet", Jul. 2014, (pp. 1-6).
Industrial Fire Journal, "Rising to the Challenge", Sep. 2017, (pp. 1-2).

(56) References Cited

OTHER PUBLICATIONS

Inland Marine Underwriters Association, "CLT and Builder's Risk", May 2017, (pp. 1-26).
Installation & Quick Start Guide for SoprayLogger E3B, Sheridan, Wyoming, Mar. 21, 2019, AgTerra Technologies, Inc., (17 Pages).
Installation and Quick Start Guide for the SprayLogger BackPack Lite, by AgTerra Technologies, Inc., Sheridan, Wyoming, Mar. 2019 (11 Pages).
Fike, "MicroMist: The Self Contained Fire Protection Alternative", Aug. 2012, (pp. 1-2).
Fike, "Mini Monitor Module", Apr. 2014, (pp. 1-2).
Fike, "Prolnert: Inert Gas Fire Protection System", May 2012, (pp. 1-6).
Fike, "Prolnert® 2 Agent Storage Cylinder IG-IG-55" Jan. 2016, (pp. 1-7).
Fike, "Single Hazard Panel SHP PRO", Dec. 2009, (pp. 1-2).
Fike, "Specification—Micromist Fire Suppression System with Cheetah Xi Control Panel", Dec. 2012, (pp. 1-10).
Fike, "Specification—Micromist Fire Suppression System with SHP-Pro Control Panel", Dec. 2009, (pp. 1-9).
Fire Engineeering, Len Garis, Karin Mark, "Tall Wood Buildings: Maximizing Their Safety Potential", Jan. 2018, (pp. 1-12).
Fire Engineering, "Charred Wood and Fire Resistance", Oct. 2016, (pp. 1-6).
Fire Engineering, Phillip Paff, "Mass Timber Construction in High-Rise Residential Structures: How Safe is it?", Jan. 2018, (pp. 1-9).
Fire Fighting Foam Coalition, "Best Practice Guidance for Use of Class B Firefighting Foams" May 2016 (8 Pages).
Fire Protection Research Foundation, Robert Gerard, David Barber, "Fire Safety Challenges of Tall Wood Buildings", Dec. 2013, (pp. 1-162).
Fire Retardant Coatings of Texas, "FlameStop Screenshots", Nov. 2017, (pp. 1-2).
Fire Retardant Coatings of Texas, "FX Flame Guard Screenshot", Nov. 2017, (pp. 1).
Fire Retardant Coatings of Texas, "FX Lumber Guard Screenshot", (pp. 1).
Fire Retardant Coatings of Texas, "FX Lumber Guard XT: Technical Data Submittal Sheet", Aug. 2018, (pp. 1).
Fire Retardant Coatings of Texas, "FX Lumber Guard", Nov. 2015, (pp. 1).
Fire Retardant Coatings of Texas, "FX Lumber Guard", Sep. 2016, (pp. 1).
Fire Retardant Coatings of Texas, "Product Certifications & Featured Products Screenshots", Nov. 2017, (pp. 1-4).
Fire Retardant Coatings of Texas, "Product Certifications Screenshot", Nov. 2017, (pp. 1).
Fire Retardant Coatings of Texas, "Safety Data Sheet (SDS)" Mar. 2016, (pp. 1-7).
Fire Retardant Coatings of Texas, "Safety Data Sheet Screenshot", Nov. 2017, (pp. 1).
Fire Retardant Coatings of Texas, M. Mueller, "Architects", Oct. 2016, (pp. 1-5).
Fire Retardant Coatings of Texas, M. Mueller, "Residential Home Builders", Oct. 2016, (pp. 1-5).
Fire Safe Council, "Get Ready For Fire Season—Fire Safe Your Home", Nov. 2017, (pp. 1).
Fire Terminology, Glossary Containing Fire Terms, by National Park Service, USDA Forest Service, captured at https://www.fs.fed. us/nwacfire/home/terminology.html on Mar. 28, 2021, (14 Pages).
Firefly AB, "Firefly EXIMO Brochure", Nov. 2017, (pp. 1-8).
Firefly AB, "Firefly Spark Detection: Higher Safety with Patented Technology", Jan. 2018, (pp. 1-12).
Firefly AB, "Firefly Training Brochure", Nov. 2017, (pp. 1-4).
Firefy AB, "Firefly Conveyer Guard: Fire Protection Solution for Conveyers", Nov. 2017, (pp. 1-4).
Firesafe, "History of Fire Extinguishers" Dec. 18, 2019 (12 Pages).
Firetect, "Safe-T-Guard Product Data Sheet", Apr. 2008, (pp. 1-6).
Flamestop, "Flamestop I-DS: Fire Retardant for Foam, Thatch, and Porous Materials", Jan. 2017, (pp. 1-3).

Flamestop, "Flamestop II: Fire Retardant Spray for Wood", Jan. 2017, (pp. 1-3).
Flamestop, "Learn About Flamestop Inc.", Jan. 2017, (pp. 1-3).
Flexterra Brochure "Profile Flexterra® HP-FGM High Performance Erosion Control Medium", HP-02-02/18, Feb. 2018, Profile Products, LLC, (4 Pages).
FLIR, "A65/A35/A15/A5 Brochure", Sep. 2014, (pp. 1-2).
FLIR, "Application Story: FLIR Arms Intelligent Power Inspection Robot with 'Hot Eye'", Nov. 2017, (pp. 1-2).
FLIR, "Application Story: Impact Thermal Imaging Camera From FLIR Continuously Monitors Packaging Quality", Nov. 2017, (pp. 1-2).
FLIR, "FC-Series R: Fixed Network thermal Cameras", Nov. 2017, (pp. 1-2).
FLIR, "FLIR A315/A615", Jan. 2018, (pp. 1-8).
FLIR, "FLIR A65", Jan. 2018, (pp. 1-7).
FLIR, "FLIR AA315 f", Jan. 2018, (pp. 1-4).
FLIR, "FLIR C3 Brochure", Dec. 2016, (pp. 1-2).
FLIR, "FLIR FC-Series R (Automation)", Jan. 2018, (pp. 1-5).
FLIR, "FLIR K2 Brochure", May 2015, (pp. 1-2).
FLIR, "FLIR KF6 Datasheet", Jan. 2016, (pp. 1-2).
FLIR, "FLIR One Pro Series Datasheet", Jun. 2018, (pp. 1-2).
FLIR, "FLIR One Pro Series: Professional-Level Thermal Imaging for Your Smartphone", Jun. 2018, (pp. 1-2).
FLIR, "FLIR Saros: Multi-Spectral Intrusion Solution", Jan. 2018, (pp. 1-3).
Web Pages Showing a Buckeye™ Wet Chemical Fire Extinguisher containing Potassium Citrate, Buckeye Fire Equipment Company, Kings Mountain, North Carolina, published at http://buckeyefire. com/products/liquid-agent-fire-systems/ captured on Jun. 16, 2021, (3 Pages).
Web Pages Showing Invatech Italia 868 Backpack Duster Mister Fogger Unit, Invatech Italia, Sumas, Washington, published at https://invatechitalia.com/?gclid=EAlalQobChMIxKuVyu6c-8QIVGYblCh12ggwOEAAYASAAEglkefD_BWE captured onJun. 16, 2016, (11 Pages).
Webpage for TriFone BRAVO 600 Line of Sprayers, hhspray.com, H&H Farm Machine Company, Jan. 2020 (4 Pages).
Website Decription of Clore Wildfire Defense, Clore Corp., captured at https://clorefr.com/clore-wildfire-defense on Aug. 6, 2024 (4 Pages).
Website Pages from Fire Break Protection Systems Inc., captured from https://www.dnb.com/business-directory/company-profiles. fire_break_protection_systems.04a9c4cc966d5ffce0e52d19515a79a7. html on Mar. 8, 2021, Fire Break Protection Systems, Simi Valley, California, (6 Pages).
Website Pages from Frontline Wildfire Defense Systems, System Brochure, captured from https://www.frontlinewildfire.com/ on Mar. 8, 2021, Frontline Wildfire Defense Systems, Wildomar, California, (5 Pages).
Website Pages from Perimeter Solutions Inc. regarding Phoschek® Fortify® Fire Retardant, Perimeter Solutions Inc., captured at https://www.perimeter-solutions.com/fire-safety-fire-retardants/phos-chek-fortify/ on Jun. 15, 2021, (5 Pages).
Wei-Tao Luo, Shun-Bing Zhu, Jun-Hui Gong, Zheng Zhao, "Research and Development of Fire Extinguishing Technology for Power Lithium Batteries", 2017 8th International Conference on Fire Science and Fire Protection Engineering (on the Development of Performance-based Fire Code), Elsevier, Procedia Engineering, Dec. 2017 (7 Pages).
Western Wood Preservers Institute, "Fire Retardant Wood and the 2015 International Building Code", Jan. 2015, (pp. 1-2).
Western Wood Products Association, "Flame-spread Ratings & Smoke-Developed Indices; Conformance with Model Building codes", Nov. 2017, (pp. 1-2).
Weyerhauser, Renee Strand, "Mid-Rise, Wood-Framed, Type III Construction—How to Frame the Floor to Wall Intersection at Exterior Walls", Apr. 2016, (pp. 1-8).
White Paper for Johnson Controls, "Types of firefighting foam agents: Properties and applications", Jan. 2020 (4 Pages).
Whitepaper Brochure by Perimter Solutions—"Long-Term Fire Retardants: History, Innovation and Preparing for the Future of Wildfires", Perimeter Solutions LP, Jan. 2022 (20 Pages).

(56) References Cited

OTHER PUBLICATIONS

Wikipedia Article on Fluorocarbon, Wikipedia.org, captured Apr. 11, 2021 at https://en.wikipedia.org/wiki/Fluorocarbon (11 Pages).

Wikipedia Article on Greek Fire, Wikipedia.org, captured Jan. 28, 2021 at https://en.wikipedia.org/wiki/Greek_fire (14 Pages).

Wikipedia article on Potassium Citrate, Wikipedia .org captured May, 6, 2020 at https://en.wikipedia.org/wiki/Potassium_citrate (2 Pages).

Wikipedia Entry for Diammoniun Phosphate, published at https://en.wikipedia.org/wiki/Diammonium_phosphate , Retrieved May 7, 2022 (3 Pages).

Wikipedia Entry for Potassium Citrate, published at https://en.wikipedia.org/wiki/Potassium_citrate, Last Edited Jul. 19, 201, Retrieved May 6, 2022 (3 Pages).

Wikipedia Entry for Sodium Benzoate Aug. 14, 2024, Wikipedia.org, (8 Pages).

Wikipedia for Potassium Citrate, published on https://en.wikipedia.org/wiki/Potassium_citrate, Jun. 17, 2021, Wikipedia.org, (3 Pages).

Wikipedia, "Phos-Chek Screenshots", Nov. 2017, (pp. 1-3).

Wikpedia Article on Per- and Polyfluoroalkyl Substances, Wikipedia.org, captured Apr. 11, 2021 at https://en.wikipedia.org/wiki/Per-_and_polyfluoroalkyl_substances, (26 Pages).

Wildfire Defense Systems, Inc., Web Brochure on WDSFire Wildfire Reporting Dashboard Service For Wildfire Risk During an Active Wildfire, 2017, (2 Pages).

Wildfire Defense Systems, Inc., Web Brochure on WDSPRo Mobile Application For Wildfire Hazard Property Assessment, 2017, (3 Pages).

William R. Smythe, "The Spectrum of Fluorine", Apr. 1921 (7 Pages).

Wood Environment & Infrastructure Solutions UK Ltd., "The use of P15 Fas and fluorine-free alternatives in fire-fighting foams" Jun. 2020 (534 Pages).

Wood Works, "The Case for Cross Laminated Timber", Jan. 2016, (pp. 1-212).

Woodworking Network, "Megola to Buy Wood-Protecting Hartindo AF21 Fire Inhibitor", Aug. 2011, (pp. 1-2).

Woodworks, "Carbon Calculator and Estimator App", Jul. 2018 , (pp. 1-12).

Woodworks, "Carbon Calculator: Reference & Notes", Jan. 2016, (pp. 1-8).

Woodworks, "Carbon Estimator", Jul. 2018, (pp. 1).

Woodworks, "Case Study: UW West Campus Student Housing", Jan. 2013, (pp. 1-8).

Woodworks, "Design Example: Five-Story Wood-Frame structure Over Podium Slab", Sep. 2016, (pp. 1-79).

Woodworks, "Options for Brick Veneer on Mid-Rise Wood-Frame Buildings", Oct. 2015, (pp. 1-8).

Woodworks, "Wood Brings the Savings Home", Jan. 2013, (pp. 1-8).

Xlam, "Technical: XLam Panel Specifications", Jan. 2018, (p. 11).

Yang Xuebing, "Change in the Chinese Timber Structure Building Code", Jan. 2006, (pp. 1-11).

Yavuz HK, Ozcan MM, Lemiasheuski VK, "The Effect of Some Chemical Additives on the Foaming Performance of the Pasteurized Liquid Egg White" Jan. 31, 2018 (4 Pages).

Yi-Yuan Shao, Kuan-Hung Lin, Yu-Ju Kao, Journal of Food Quality, "Modification of Foaming Properties of Commercial Soy Protein Isolates and Concentrates by Heat Treatments" Aug. 10, 2016 (12 Pages).

Yong-Liang Xu, Lan-Yun Wang, Don-Lin Liang, Ming-Gao Yu, Ting-Xiang Chu, "Experimental and Mechanism Study of Electrically Charged Water Mist for Controlling Kerosene Fire in a Controlled Space", Apr. 2014, (pp. 1-7).

Yuri B. Vysotsky, Elena Kartashynska, Dieter Vollhardt, Valentin B. Fainerman, "Surface pKa of Saturated Carboxylic Acids at the Air/Water Interface" A Quantum Chemical Approach Jun. 5, 2020 (10 Pages).

Zhen Wang, "Optimization of Water Mist Droplet size in Fire Supression by Using CFD Modeling", Dec. 2015, (pp. 1-68).

Zhen Wang, "Optimization of Water Mist Droplet Size in Fire Suppression by Using CFD Modeling", Masters of Science Degree Thesis, Graduate College of the Oklahoma State University, Oklahome, Dec. 2015, (68 Pages).

Zinc Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/zinc-salts/ (6 Pages).

"Colorless Long Term Fire Retardant—Successful Applications", Phos-Chek® Home Defese Long Term Fire Retardant, ICL Performance Products LP, 2014, (1Page).

"Mulch—Fire in California", University of California Cooperative Extension (UCCE)—Fire in California, published at https://ucanr.edu/sites/fire/Prepare/Landscaping/Mulch/, captured on Jun. 20, 2021, (3 Pages).

"What is Foliar Spray: Learn About Different Types of Foliar Spraying", http://www.gardeningknowhow.com, Aug. 6, 2020 (2 Pages).

11.3 Alcohols, Acids, and Esters—Chemistry LibreTexts, captured on Oct. 6, 2024 at https://chem.libretexts.org/Courses/Grand_Rapids_Community_College/CHM_110%3A_Chemistry_of_the_Modern_World_(Neils)/11%3A_Organic_Chemistry/11.3_Alcohols%2C_Acids%2C_and_Esters (9 Pages).

2 Technical Data Sheet for Lankem BioLoop 84L, Lankem Ltd, Feb. 2018 (12 Pages).

2012 CLT Handbook, Christian Dagenais, Robert H. White, Kuma Sumathipala, "Chapter 8—Fire", Nov. 2012, (pp. 1-55).

2012 International Symposium on Safety Science and Technology Study on Water-based Fire Extinguishing Agent Formulations and Properties by Yinsheng Huang, Wencheng Zhang , Xiaojing Dai , and Yu Zhao , Procedia Engineering, vol. 45, pp. 649-654, 2012 (6 Pages).

2017 Model 3 Emergency Response Guide for Tesla 400 Volt Lithium-ion Battery, Tesla Inc., Aug. 2018 (37 Pages).

2017 Product Brochure of Agricultural Solutions from Sierra Natural Science, Inc., Sierra Natural Science, Inc., Salina CA, 2017, (9 Pages).

2021 Model S Emergency Response Guide for Tesla Model S Electric Vehicles with Lithium Ion Battery, Version 001, Tesla Inc., 2021 (32 Pages).

21.7: Chemistry of Esters—Chemistry LibreTexts, captured on Oct. 6, 2024 at https://chem.libretexts.org/Workbench/LCDS_Organic_Chemistry_OER_Textbook _-_Todd_Trout/21%3A_Carboxylic_Acid_Derivatives-_Nucleophilic_Acyl_Substitution_Reactions/21.07%3A_Chemistry_of_Esters (6 Pages).

3M, "From Our Labs to Your Life", Jan. 2016, (pp. 1-12).

3M, "Novec 1230 : Specification", Jan. 2018, (pp. 1-10).

3M, "Novec 1230 Fire Protection Fluid," Jan. 2018, (pp. 1-11).

3M, "Novec 1230 Fire Protection Fluid: Helping Protect Critical Military Assets Through Sustainable Fire Protection Technology", Aug. 2014, (pp. 1-2).

3M, "Novec 1230 Fire Protection Fluid", Jan. 2017, (pp. 1-4).

3M, Building and Commerical Services Division, "Brochure for 3M FireDam™ Spray 200 Sealing Agent", 2009,(2 Pages).

60 Data Sheet for Hydro Blanket BFM, Profile Products, Feb. 2017 (1 Pages).

9.8: Esters: Structures and Names—Chemistry LibreTexts, captured on Oct. 6, 2024 at https://chem.libretexts.org/Courses/Sacramento_City_College/SCC%3A_Chem_309_-_General_Organic_and_Biochemistry_(Bennett)/Text/09._Organic_Functional_Groups%3A_Structure_and_Nomenclature/9.08%3A_Esters%3A_Structures_and_Names (3 Pages).

A. A. Shindia, G. A. El-Sherbeny, A. E. El-Esawy and Y. M. M. M. Sheriff, Production of Gluconic Acid by Some Local Fungi, Mycobiology 34(1): 22-29 (2006) (8 Pages).

A. A. Shindia, G. A. El-Sherbeny, A. E. El-Esawy and Y. M. M. M. Sheriff, Production of Gluconic Acid by Some Local FungiProduction of Gluconic Acid by Some Local Fungi, The Korean Society of Mycology, Mycobiology 34(1): 22-29 (2006), (8 Pages).

A. Poshadri, Aparna Kuna, "Microencapsulation Technology: A Review" Jan. 2010 (17 Pages).

(56) References Cited

OTHER PUBLICATIONS

A.M. Kaja, K. Schollbach, S. Melzer, S.R. Van Der Laan, H.J.H. Brouwers, Qingliang Yu, Hydration of potassium citrate-activated BOF slag, Nov. 13, 2020 (11 Pages).

Adewale Giwa ete al , Green dispersants for oil spill response: A comprehensive review of recent advances, Marine Pollution Bulletin, vol. 193, Aug. 2023, 115118 (6 Pages).

Agacad, "Wood Framing", Jan. 2016 (pp. 1-4).

Aida Adlimoghaddam, Mohammad G. Sabbir, Bendeict C. Albensi, Frontiers in Molecular Neuroscience, "Ammonia as a Potential Neurotoxic Factor in Alzheimer's Disease" Aug. 2016 (11 Pages).

AIG, "AIG Global Property Construction Risk Engineering", Nov. 2017, (pp. 1-6).

Alagappa Rammohan, James A. Kaduk, Crystallographic Communications, "Crystal structure of anhydrous tripotassium citrate from laboratory X-ray powder diffraction data and DFT comparison" Jul. 14, 2016 (9 Pages).

Alexander Kremsmair, Johannes H. Harenberg, Kuno Schwarzer, Andreas Hess and Paul Knochel , Preparation and reactions of polyfunctional magnesium and zinc organometallics in organic synthesis, Published by the Royal Society of Chemistry Chem. Sci., 2021, 12, 6011-6019 |(9 Pages).

Allison Soult, Ph.D. (Department of Chemistry, University of Kentucky), 3.3: The Dissolving Process—Chemistry LibreTexts, captured on Oct. 6, 2024 at https://chem.libretexts.org/Courses/Brevard_College/CHE_104%3A_Principles_of_Chemistry_11/03%3A_Solutions_and_Colloids/3.03%3A_The_Dissolving_Process, (4 Pages).

Amendment under Article 34 (2)(b) filed by Mighty Fire Breaker LLC in PCT Application No. PCT/US2022/015004 on May 27, 2023 (37 Pages).

Amerex, "Safety Data Sheet: Deionized Water, Pressurized Water Extinguisher", Mar. 2018, (pp. 1-8).

American Chemical Society, "Seeing Red: Controversy smolders over federal use of aerially applied fire retardants", Aug. 2011, (p. 1-6).

American Wood Council, "2015 NDS Changes", Jul. 2015, (pp. 1-66).

American Wood Council, "Design for Code Acceptance: Flame Spread Performance of Wood Products Used for Interior Finish", Apr. 2014, (pp. 1-5).

American Wood Preservers' Association, "Standard Method of Determining Corrosion of Metal in Contact With Treated Wood", Jan. 2015, (pp. 1-4).

Andrew Buchanan, Birgit Ostman, Andrea Frangi, "Fire Resistance of Timber Structures", Mar. 2014, (pp. 1-20).

Andrew Crampton, "Cross Laminated Timber: The Future of Mid-Rise Construction," Jun. 2016, (pp. 1-5).

Andrzej Jankowski, Radosław Balwiariz, Dominik Marciniak, Dariusz Łukowiec, Janusz Pluta, "Influence of Spray Drying Manufacturing Parameters on Quality of Losartan Potassium Microspheres", Acta Poloniae Pharmaceutica and Drug Research, vol. 71, No. 5, 2014 , (9 Pages).

Angus Fire Ltd., "TankMaster: Which Foam to Use for Hydrocarbon Tank Fires" Jan. 2004 (23 Pages )17.

Anna Wiegand, Gioia Fischer, Harald Seeger, Daniel Fuster, Nasser Dhayat, Oliver Bonny, Thomas Ernandez, Min-Jeong Kim, Carsten A. Wagner, Nilufar Mohebbi, Clinical Kidney Journal, "Impact of potassium citrate on urinary risk profile, glucose and lipid metabolism of kidney stone formers in Switzerland" Aug. 19, 2019 (12 Pages).

Anthony C. Yu, Hector Lopez Hernandez, Andrew H. Kim, Lyndsay M. Stapleton, Reuben J. Brand, Eric T. Mellor, Cameron P. Bauer, Gregory D. McCurdy, Albert J. Wolff III, Doreen Chan, Craig S. Criddle, Jesse D. Acosta, and Eric A. Appel, "Wildfire prevention through prophylactic treatment of high-risk landscapes using viscoelastic retardant fluids," Proceedings of The National Academy of Science (PNAS), published Sep. 30, 2019, https://www.pnas.org/content/117/2/1233, (10 Pages).

Anthony E. Finnerty, "Water-Based Fire Extinguishing Agents", US Army Research Laboratory, Aberdeen Proving Ground, Maryland, 1995 (12 Pages).

Applicant's Reply to Written Opinion filed in Application No. PCT/US2022/015004 on May 27, 2023 (24 Pages).

Arch Wood Protection Inc., "Dricon: Application Guide", Jan. 2016, (pp. 1-28).

Archpaper Antonio Pacheco, "Katerra's Approach Could Make Factory Construction a Model for the Future", Apr. 2018, (pp. 1-4).

Article 34 Amendment and Reply to Written Opinion (RWO) filed in PCT/US22/15004 filed on May 27, 2023 (112 Pages).

Article on Carboxylic Acid, Britannica Online Encyclopedia, captured Jan. 24, 2021 at https://www.britannica.com/print/article/95261 (41 Pages)9.

Asia Pacific Fire, "Approaching the Flame Fire Fighting", Jun. 2017, (pp. 1-2).

ASTM International, "Standard Practice for Calculating Design Value Treatment Adjustment Factors for Fire-Retardant-Treated Lumber", Apr. 2016, (pp. 1-7).

MGB Achitecture & Design, "The Case for Tall Wood Buildings: How Mass Timber Offers A Safe, Economical, and Environmentally Friendly Altermative for Tall Building Structures", Feb. 2012, (pp. 1-240).

Michelle D. King, Jiann C. Yang, Wnedy S. Chien and William L. Grosshandler, "Evaporation of A Small Water Droplet Containing An Additive" Proceedings of the ASME National Heat Transfer Conference, Baltimore, Aug. 1997 (6 Pages).

Mike H. Freeman, Paul Kovacs, "Metal and Fastener Corrosion in Treated Wood from an Electrochemical—Thermodynamic Standpoint", Jan. 2011, (pp. 1-22).

Mike Kirby, Fire Rescue, "Nozzles Types, Pros and Cons", Jun. 2012, (pp. 1-7).

Mineral Salt Product from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/ (4 Pages).

Minimax Fire Products White Paper The Cost-benefit Advantages of Replacing Halon with 725 PSI MX 1230 Clean Agent Fire Suppression Systems, MiniMax Fire Products, 2014, (7 Pages).

Minimax, "The Cost-Benefit Advantages of Replacing Halon with 725 PSI MX 1230 Clean Agent Fire Suppression Systems", Mar. 2014, (pp. 1-7).

Mitsui Home America, "Mitsui Homes Inc. Website and Screenshots", Dec. 2012, (pp. 1-38).

Mohamed Fayek Abdrabbo, Ayoub Mostafa Ayoub,Mohamed Aly Ibrahim and Abdelsalam M. Shara Feldin, "The Effect of Water Mist Droplet Size and Nozzle Flow Rate on Fire Extinction in Hanger by Using FDS", Journal of Civil & Environmental Eng. 2016, vol. 6, Issue 2, (12 Pages).

Mohammadmahdi Ghiji, Vasily Novozhilov, Khalid Moinuddin, Paul Joseph, Ian Burch, Brigitta Suendermann, Grant Gamble, MDPI, "A Review of Lithium-Ion Battery Fire Suppression" Oct. 1, 2020 (30 Pages).

Moince M. Fiume et al., "Safety Assesment of Citric Acid, Inorganic Citrate Salts, and Alkyl Citrate Esters as Used in Cosmetics" Jan. 2014 (31 Pages).

Morflex Inc., "Pharmaceutical Coatings Bulletin 102-4: Influence Of Triethyl Citrate On The Properties Of Tablets Containing Coated Pellets" Jan. 1996 (10 Pages ).

MSDS for Potassium Citrate published at https://hazard.com//msds/mf/baker/baker/files/p5675.htm , Nov. 6, 1997, (4 Pages).

MSDS for Potassium Citrate, MSDS No. P5675 prepared on Nov. 6, 1997 by J. T. Baker of Strategic Services Division of Mallinckrodt Baker, Inc. (4 Pages).

Mylene Merlo, "San Diego Wildfires, Parts 1, 2, 3 and 4: Myths and Reality", Jun. 2, 2014,http://www.mylenemerlo.com/blog/san-diego-wildfires-myths-reality/ , (42 Pages).

N. M. Kovalchuk, A. Tybala, V. Starov, O. Matar, N. Ivanova, "Fluoro- vs hydrocarbon surfactants: Why do they differ in wetting performance?" Advances in Colloid and Interface Science, vol. 210, Aug. 2014, (7 Pages ).

(56)     References Cited

OTHER PUBLICATIONS

National Academy Press, "Fire Suppression Substitutes and Alternatives to Halon for U.S. Navy Applications", Jan. 1997, (pp. 1-111).
National Enhanced Oil Recovery Initiative (Neori), "Recommended Modifications To The 45Q Tax Credit For Carbon Dioxide Sequestration", Feb. 2012, (12 Pages).
National Fire Protection Association, "Standard for Fire Retardant-Treated Wood and Fire-Retardant Coatings for Building Materials", Jan. 2015, (pp. 1-16).
National Fire Protection Inc., "FM-200 / HFC-227ea: Clean Agent Fire Suppression", Jan. 2016, (pp. 1-5).
National Instruments, "IMAQ Vision Concepts Manual", Oct. 2000, (pp. 1-313).
National Refrigerants Inc., "R123 Safety Data Sheet", May 2015, (pp. 1-8).
National Research Council of Canada, Zhigang Liu, Andrew K. Kim, Don Carpenter, Fountain Fire Protection Inc., Ping-Li Yen, "Portable Water Mist Fire Extinguishers as an Alternative for Halon 1211", Apr. 2001, (pp. 1-5).
National Wildfire Coordinating Group, "Foam Vs Fire: Class A Foam for Wildland Fires" Oct. 1993 (36 Pages)6.
Natural Fire Solutions, "Website Screenshots", Nov. 2017, (pp. 1-4).
Navair, "Natops U.S. Navy Aircraft Emergency Rescue Information Manual", Jan. 2009, (pp. 1-288).
Navair, "Natops U.S. Navy Aircraft Firefighting Manual", Oct. 2003, (pp. 1-200).
Ncasi, Brad Upton, Reid Miner, Kirsten Vice, "The Greenhouse Gas and Carbon Profile of the Canadian Forest Products Industry", Oct. 2007, (pp. 1-41).
Nelson Pine, "How LVL is Made", Nov. 2017, (pp. 1).
Newstar Chemicals, Hartindo Anti Fire Products, Nov. 2017, (pp. 1).
Newszak, "Hfc-227Ea Fire Extinguishers Market Outlook 2023: Top Companies, Trends and Future Prospects Details for Business Development", Sep. 2018, 5 pages.
NFPA Journal, Jesse Roman, "Build. Burn. Repeat?", Feb. 2018, (pp. 1-9).
NFPA, "Certified Fire Protection Specialist: Candidate Handbook", Apr. 2018, (pp. 1-34).
NFPA, "Standard on Water Mist Fire Protection Systems", Feb. 2006, (pp. 1-135).
Nordson Corporation, "Airless Spray Systems: The Efficient Choice for Many Liquid Painting Applications", Jan. 2004 (pp. 1-8).
North American Green, Inc., Installation Guide for HydroMax™ Hydraulic Erosion Control Products, Dec. 2017, http://www.nagreen.com, (2 Pages).
Notice of Allowance dated Jun. 5, 2023 for U.S. Appl. No. 17/497,948 )pp. 1-8).
Notice of Allowance dated Apr. 10, 2019 for U.S. Appl. No. 15/866,454 (pp. 1-5).
Notice of Allowance dated Dec. 1, 2020 for U.S. Appl. No. 15/829,943 (pp. 1-7).
Notice of Allowance dated Dec. 8, 2020 for U.S. Appl. No. 15/829,944 (pp. 1-9).
Notice of Allowance dated Feb. 11, 2021 for U.S. Appl. No. 16/449,389 (pp. 1-7).
Notice of Allowance dated Jan. 18, 2019 for U.S. Appl. No. 15/921,617 (pp. 1-7).
Notice of Allowance dated May 13, 2019 for U.S. Appl. No. 15/874,874 (pp. 1-5).
Notice of Allowance dated Oct. 29, 2020 for U.S. Appl. No. 16/449,389 (pp. 1-5).
NRC CNRC, "Fire Performance of Houses. Phase I. Study of Unprotected Floor Assemblies in Basement Fire Scenarios. Summary Report", Dec. 2008, (pp. 1-55).
NRCC, Zhigang Liu, Andrew K. Kim, "A Review of Water Mist Fire Suppression Technology: Part II—Application Studies", Feb. 2001, (pp. 1-29).

Nutrient Source Specifics Sheet for Monoammonium Phoshate (MAP), International Plant Nutrition Institute (IPNI), Norcross, Georgia, Ref#10069, 2019, (1 Page).
NY Times, "Building with Engineered Timber", Jun. 2012, (pp. 1-3).
OCV Control Valves, "Engineering / Technical Section", Jun. 2013, (pp. 1-12).
OCV Control Valves, "Solenoid Control Valve Series 115", May 2017, (pp. 1-6).
Stephen Vesper, Nathan Sienkiewicz, Ian Struewing, David Linz and Jingrang Lu, Prophylactic Addition of Glucose Suppresses Cyanobacterial Abundance in Lake Water, Life 2022, 12, p. 38. (13 Pages).
Stora Enso, "CLT—Cross Laminated Timber: Fire Protection", Jan. 2016, (pp. 1-51).
Stora Enso, "CLT Engineer: The Stora Enso CLT Design Software User Manual," Jan. 2016, (pp. 1-118).
Stora Enso, "Stora Enso CLT Technical Brochure", Feb. 2017, (pp. 1-32).
Structural Building Components Association, "Fire Retardants and Truss Design", Jan. 2015, (pp. 1-48).
Structural Building Components Association, "Research Report: Lumber Use in Type III-A Buildings", Jul. 2016, (pp. 1-8).
Studiengemeinschaft Holzleimbau, "Building with Cross Laminated Timber", Jan. 2011, (pp. 1-36).
Surfire Services Limited, "UltraGuard: The personal protection system from Surefire", Nov. 2017, (pp. 1-3).
Swiss Krono, "Swiss Krono OSB: Prefabricated Construction" Nov. 2017, (pp. 1-6).
Tarek Alshaal and Hassan Ragab El-Ramady, "Foliar Application: From Plant to Biofortification", The Environment, Biodiversity and Soil Security, vol. 1, pp. 71-83, Jul. 2017 (14 Pages).
Taylor et al. EPD-Environmental Product Declarations for Wood Products—An Application of Life Cycle Information About Forest Products. Forest Products Journal, vol. 61, No. 3, pp. 192-201; 2011.
Technical Brief "Jungbunzlauer Tripotassium Citrate: Environmental and Health Friendlky Flame Retardant in Wood Application", Jungbunzlauer Suisse AG, Basel, Switzerland, (2 Pages).
Technical Brochure titled "FACTS: Formulating Better Tasting Infant Formula", No. 150, by Jungbunzlauer Suisse AG, Basel Switzerland, 2015 (8 Pages).
Technical Brochure titled "Lactics", No. 130, by Jungbunzlauer Suisse AG, Basel Switzerland, 2016 (8 Pages).
Technical Brochure titled "Product Range: Bio-Based Ingredients", No. 217, by Jungbunzlauer Suisse AG, Basel Switzerland, 2017 (16 Pages).
Technical Brochure titled "Specialty Salts: Functional Minerals", No. 038, by Jungbunzlauer Suisse AG, Basel Switzerland, 2017 (16 Pages).
Technical Bulletin for Phos-Chek® Retardants for Wildfire Control IC/SCS-312 by Monsanto, Monsanto Company, 1964 (7 Pages).
Technical Data Sheet for Dayglor Eco Pigments™—Rev. 1.00_2023 08.11, Day Glo Color Corp., Cleveland, Ohio, 2023 (2 Page).
Technical Data Sheet for Lankem BioLoop 68L, Lankem Ltd, May 2020 (2 Pages).
Technical Evaluation Report for Citric Acid, OMRI for the USDA, Feb. 17, 2015 (31 Pages).
Technical Evaluation Report for Citroflex 2 (Triethyl Citrate), OMRI for the USDA, Nov. 5, 2014 (15 Pages).
Technical Paper titled "Jungbunzlauer Tripotassium Citrate: Environmental and Health Friendly Flame Retardant in Wood Application", Product Group Special Salts, by Jungbunzlauer Suisse AG, Basel Switzerland, Aug. 10, 2020 (2 Pages).
Technical Product Information Sheet for Tripotassium Citrate Monohydyrate, Cargill Acidulants, Eddyville, IA, USA, Nov. 30, 2010 (1 Page).
Technical Specification Sheet for Mono-Ammonium Phosphate (12-61-0) Fertilizer, by Haifa Chemicals Ltd., Haifa Bay, Isreal, May 7, 2020 (2 Pages).
Technical Specifications for Diammonium Phosphate (DAP), Nutrient Source Specifics No. 17, International Plant Nutrition Institute (IPNI), Norcross, Georgia, Ref# 11040, May 2020 (1 Page).

(56)  References Cited

OTHER PUBLICATIONS

Technical Specifications for Monoammonium Phosphate (MAP,) Nutrient Source Specifics No. 9, International Plant Nutrition Institute (IPNI), Norcross, Georgia, Ref# 10069, May 2020 (1 Page).

Technical Specifications of MonoAmmonium Phosphate (MAP), published at Mosaic Crop Nutrition Resource Library, https://www.cropnutrition.com/resource-library/monoammonium- . . . May 5, 2020 (2 Pages).

Teco, "Wood-Based Structural-Use Panels and Formaldehyde Emissions", May 2009, (pp. 1-3).

Ted A. Moore, Joseph L. Lifke, Robert E. Tapscott, "In Search of an Agent for the Portable Fire Extinguisher", Jan. 1996, (pp. 1-12).

Ten Questions to Ask Before Testing a Dye or Pigment Disperson in Your Product, Chromtech Inc., Canton, Michigan, Sep. 2024 (3 Pages).

Teresa Dobbins, "Electrostatic Spray Heads Convert Knapsack Mistblowers to Electrostatic Operation", International Pest Control, Sep./Oct. 1995, vol. 37, No. 5, (4 Pages ).

Tersa Berninger, Natalie Dietz, and Oscar Gonzalez Lopez of Jungbunzlauer Ladenburg GmbH , "Water-Soluble Polymers in Agriculture: Xanthan Gum as Eco-Friendly Aternative to Synthetics", Microbial Biotechnology, published by Society for Applied Microbiology and John Wiley & Sons Ltd., Jun. 2021 (16 Pages).

Tesla Battery Emergency Response Guide for Lithium Ion, TS-00040027 Revision 1.8, Tesla Inc., 2020 (14 Pages).

The University of Chicago, Salen Churi, Harrison Hawkes, Noah Driggs, "Internet of Things: Risk Manager Checklist, U.S.", Dec. 2016, (pp. 1-23).

Thierry Carriere, Jim Butz, Sayangdev Naha and Angel Abbud-Madrid, "Fire Suppression Tests Using A Hand-Held Water Mist Extinguisher Designed For Space-Craft Applications", SUPDET 2012 Conference Proceedings, Mar. 5-8, 2012, Phoenix, AZ, (3 Pages).

Thierry Carriere, Jim Butz, Sayangdev Naha, Angel Abbud-Madrid, "Fire Supression Tests Using a Handheld Water Mist Extinguisher Designed for Spacecraft Application", Mar. 2012, (pp. 1-3).

Thomas Schroeder, Klaus Kruger, Felix Kuemmerlen, "Fast Detection of Deflagrations Using Image Processing", Jan. 2012, (pp. 1-113).

Tom Toulouse, Lucile Rossi, Turgay Celik, Moulay Akhloufi, "Automatic Fire Pixel Detection Using Image Processing: A Comparative Analysis of Rule-Based and Machine Learning-Based Methods", Jun. 2016, (pp. 1-8).

Toxicological and Environmental Safety Brochure on PHOS-CHeK® Fire Retardants For the Use in Preventing and Controll Fires in Willand Fuels, ICL Performance Products LP, 2008 (8 Pages).

Trackabout, "Asset Tracking Industry Selection Guide", Nov. 2017, (pp. 1-8).

Trackabout, "Follow-On Tracking", Jan. 2013, (pp. 1-2).

Training Manual for Thermo-Gel® POK Nozzle Backpack System, Thermo Technologies, LLC, Bismarck, North Dekota, 2020, (55 Pages).

Treated Wood "D-Blaze Fire Retardant Treated Wood: The New Generation Building Material", Mar. 2004, (pp. 1-2).

Treated Wood, "D-Blaze: Fire Retardant Treated Wood", Jan. 2015, (pp. 1-13).

Treated Wood, "Fire Retardant Treated Wood For Commercial and Residential Structures", Jan. 2012, (pp. 1-73).

Treated Wood, "TimberSaver", Nov. 2017, (pp. 1-6).

Treehugger, Lloyd Alter, "Katerra to Build Giant New CLT Factory in Spokane, Washington", Sep. 2017, (pp. 1-16).

Treehugger, Lloyd Alter, "Wood Frame Construction is Safe, Really", Dec. 2014, (pp. 1-5).

Trusjoist, Weyerhauser, "Fire-Rated Assemblies and Sprinkler Systems", May 2017, (pp. 1-24).

Turbo Technologies, Inc. "Specifications for Turbo Turf's HY-750-HE Hybrid Hydroseeder", https://turboturf.com/hy-750-he/, Jan. 2018, (4 Pages).

LA Times, Sam Byker, "Fire Retardants That Protect the Home", Nov. 25, 2007, (pp. 1-4).

Labat Environmental, "Ecological Risk Assessment of Wildland Fire-Fighting Chemicals: Long-Term Fire Retardants", Fire and Aviation Management US Forest Service, Boise, ID, Dec. 2013, (110 Pages).

Tacovidou et al. The use of smart technologies in enabling construction components reuse: A viable method or a problem creating solution? Journal of Environmental Management 216 (2018) 214-223. Online May 5, 2017.

Leader Group S.A.S, "Foam Proportioning: Multi-Flow Inductors" Oct. 2020 (15 Pages).

Ledinek, "X-Press", Nov. 2017, (pp. 1-5).

Legal Information about Jungbunzlauer brand Tripotassium Citrate, captured at https://www.jungbunzlauer.com/en/products/special-salts/tripotass, Jungbunzlauer Suisse AG, Basel, Switzerland, (2 Pages), 2020.

Lendlease, Jeff Morrow, "More with Less: An Overview of the 1st CLT Hotel in the U.S.", Apr. 2016, (pp. 1-45).

Leyla-Cann Sögütoglu, Michael Steiger, Jelle Houben, Daan Biemans, Hartmut R. Fischer, Pim Dinkers, Henk Huinink, Olaf C. G. Adan, Crystal Growth & Design, "Understanding the Hydration Process of Salts: The Impact of a Nucleation Barrier" Feb. 14, 2019 (10 Pages).

List of Corrosion Inhibitors a Surface Protection from Polygon Chemie AG, Olten 4600, Switzerland, 2023 (5 Pages).

Lon H. Ferguson and Christopher A. Janicak, "Fundamentals of Fire Protection for the Safety Professional", Governmenta Institutes, The Rowman & Littlefield Publishing Group, Inc., 2005 (341 Pages).

Louisiana-Pacific, "FlameBlock: Assemblies and Applications", Aug. 2017, (pp. 1-8).

Lousiana-Pacific, "LP Solutions Software", Mar. 2012, (pp. 1-8).

LP Building Products, "Material Safety Data Sheet", May 2014, (pp. 1-4).

LSU Agcenter Wood Durability Laboratory, Eco Building Products, "Eco Red Shield: Technical Specifications—Strength Testing", Aug. 2011, (pp. 1-21).

M. F. M. Ibrahim, H. G. Abd El-Gawad and A. M. Bondok, "Physiological Impacts of Potassium Citrate and Folic Acid on Growth, Yield, and Some Viral Diseases of Potato Plants", Middle East Journal of Agriculture, col. 4, Issue 3, Jul.-Sep. 2015 (13 Pages).

M.L Vitosh, J.W. Johnson, D.B. Mengel, Michigan State University, Ohio State University, Purdue University, "Tri-state Fertilizer Recommendation for Corn, Soybeans, Wheat, and Alfalfa" Jul. 1995 (24 Pages ).

Magnesium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/magnesium-salts/ (8 Pages).

MagTech, "MagTech OSB", Nov. 2017, (pp. 1-2).

Mamoru Kohno, "Outline of the Fire Resistance Verification Method in the Building Standard Law of Japan", May 2000, (pp. 1-7).

Marioff, "Fire Fighting Excellence: HI-FOG Water Mist Fire Protection", Jan. 2017, (pp. 1-8).

Marioff, "Hi-Fog for Buildings", Jan. 2014, (pp. 1-16).

Marioff, "Hi-Fog System Components", Nov. 2017, (pp. 1-2).

Marioff, "Hi-Fog Water Mist Fire Protection: Fire Protection for Buildings", Jan. 2017, (pp. 1-12).

Marioff, Hi-Fog Electric Pump Unit, Jan. 2016, (pp. 1-2).

Marisa Alviar-Agnew, 9.7: Carboxylic Acids and Esters—Chemistry LibreTexts, captured on Oct. 6, 2024 at https://chem.libretexts.org/Bookshelves/Introductory_Chemistry/Chemistry_for_Changing_Times_(Hill_and_McCreary)/09%3A_Organic_Chemistry/9.08%3A_Carboxylic_Acids_and_Esters, (7 Pages).

Mark L. Robin, FS World, "Fire Detection & Suppression", Apr. 2011, (pp. 1-10).

Marketwire, "Megola Inc. Signs 'Hartindo AF21' Licensing Agreement with Eco Blu Products, Inc.", Nov. 2009, (pp. 1-2).

Marketwired, "Megola Announces AF21 Test Results", Aug. 2007, (pp. 1-2).

Marketwired, "Megola Continues Sales of Hartindo AF21 to EcoBlu Products, Inc.", Dec. 2010, (pp. 1-2).

(56)         References Cited

OTHER PUBLICATIONS

Marketwired, "Megola Obtains Class A Rating for Hartindo AF31", Nov. 2007, (pp. 1-2).

Marketwired, Megola Updates on Hartindo AF21, a Total Fire Inhibitor, Aug. 2010, (pp. 1-3).

Marketwired, "MSE Enviro-Tech Corp.'s AF31 Fire Extinguishing Agent Addresses Need for More Effective Forest Fire Fighting Technology", Jul. 2007, (pp. 1-2).

Marketwired, "WoodSmart Solutions, Inc. Tests Hartindo AF21 in BluWood Solution", Nov. 2007, (pp. 1-2).

Marleyeternit, "JB FireSafe Scaffold Boards", Jan. 2016, (pp. 1-2).

Material Safety Data Sheet for Fire Terminator Sachet (Class F / K Fires) by Fire Terminator International Pte Ltd, Singapore 408 704, dated May 25, 2022 (4 Pages).

Material Safety Data Sheet for FT JN1010-Green Firefighting Solution for Class A/B/C/D Fires, by Fire Terminator International Pte Ltd, Singapore 408 704, dated May 21, 2022 (4 Pages).

Material Safety Data Sheet for FT JN669-Green Firefighting Solution for Forest/Peat Fires, by Fire Terminator International Pte Ltd, Singapore 408 704, dated May 25, 2022 (4 Pages).

Material Safety Data Sheet for FT Slam (Class A/B/C Fires) by Fire Terminator International Pte Ltd, Singapore 408 704, dated May 25, 2022 (4 Pages).

Material Safety Data Sheet (MSDS) for FIRE-TROL® 936 Fire Retardant Used in Wildfire Control, by ICL France—ICL Biogemea S.A.S, Revision 09, updated Mar. 29, 2013 , (4 Pages).

Material Safety Data Sheet (MSDS) for Purple K Dry Chemical Fire Extinguishant, AMEREX Corporation, Trussville, AL, Sep. 2003 (7 Pages).

Material Safety Data Sheet for Ansul 3% Fluorprotein Foam Concentrate, Tyco Fire Protection Products, Oct. 7, 2011 (4 Pages).

Material Safety Data Sheet for D96026 Chromtint Green 2726 Concentrated Colorant, Chromatech Inc., Canton Michigan CAS No. Blend, Jan. 4, 2011 (6 Pages).

Material Safety Data Sheet for Hartindo AF31 Eco Fire Break, Eco Building Products, Inc., Feb. 4, 2013, (4 Pages).

Material Safety Data Sheet for Knockdown Class A Foam, National Foam Inc., Oct. 1, 2007 (8 Pages).

Material Safety Data Sheet for Purple K Dry Chemical Fire Extinguishant, Amerex Corporation, Sep. 2003 (7 Pages).

Matthew E. Benfer, Joseph L. Ffey, "valuation of Water Additives for Fire Control and Vapor Mitigation—Two and Three Dimensional Class B Fire Tests" Mar. 15, 2015 (34 Pages).

Maureen Puettmann, Woodlife Environmental Consultants, LLC, Dominik Kaestner, Adam Taylor, University of Tennessee, "Corrim Report—Module E Life Cycle assessment of Oriented Strandboard (OSB) Production", Oct. 2016, (pp. 1-71).

Megola, "RE: File No. 0-49815—Response to Comments—Form 10K for Fiscal Year Ended Jul. 31, 2009", Sep. 2010, (pp. 1-4).

Metroscape, "Building the Future: New Technology and the Changing Workforce", Jan. 2017, (pp. 1-32).

Metsawood, "Kerto LVL Screenshot", Nov. 2017, (pp. 1).

FLIR, "Integration AX8 & A-B Overview", Oct. 2017, (pp. 1-9).

FLIR, "IR Automation Guidebook: Temperature Monitoring and Control with IR Cameras", Jan. 2018, (pp. 1-68).

FLIR, "M100/M200 Series: Installation & Operation Instructions", Oct. 2017, (pp. 1-112).

FLIR, "M100/M200 Series: Quick Start Guide", Oct. 2017, (pp. 1-5).

FLIR, "Thermal Imaging for Machine Vision and Industrial Safety Applications", Aug. 2014, (pp. 1-12).

FLIR, "User's Manual: FLIR A3xx Series", May 2016, (pp. 1-126).

FLIR, "VUE Pro: Thermal Camera for SUAS", Jul. 2009, (pp. 1-2).

FLIR, FLIR "AX8 Brochure", Nov. 2017, (pp. 1-2).

FM Appovals, "Approval Standard for Heavy Duty Mobile Equipment Protection Systems", Aug. 2015, (pp. 1-79).

FM Approvals, "American National Standard for Water Mist Systems", Nov. 2017, (pp. 1-191).

FM Approvals, "Approval Standard for Automatic Sprinklers for Fire Protection", Feb. 2018, (pp. 1-119).

FM Approvals, "Approval Standard for Clean Agent Extinguishing Systems", Apr. 2013, (pp. 1-74).

FM Approvals, "Approval Standard for Combustible Gas Detectors", Jan. 2018, (pp. 1-21).

FM Approvals, "Approval Standard for Explosion Suppression Systems", Feb. 2018, (pp. 1-57).

FM Approvals, "Approval Standard for Heat Detectors for Automatic Fire Alarm Signaling", Jan. 2018, (pp. 1-29).

FM Approvals, "Approval Standard for Hybrid (Water and Inert Gas) Fire Extinguishing Systems", Nov. 2011, (pp. 1-196).

FM Approvals, "Approval Standard for Hydrocarbon Leak Detectors", Oct. 2012, (pp. 1-18).

FM Approvals, "Approval Standard for Pressure Actuated Waterflow Switches", Aug. 1970, (pp. 1-6).

FM Approvals, "Approval Standard for Quick Response Storage Sprinklers for Fire Protection", Feb. 2018, (pp. 1-87).

FM Approvals, "Approval Standard for Radiant Energy-Sensing Fire Detectors for Automatic Fire Alarm Signaling", Jan. 2018, (pp. 1-17).

FM Approvals, "Approval Standard for Residential Automatic Sprinklers for Fire Protection", Aug. 2009, (pp. 1-68).

FM Approvals, "Approval Standard for Smoke Actuated Detectors for Automatic Alarm Signaling", Jan. 2012, (pp. 1-25).

FM Approvals, "Approval Standard for Spark Detection and Extingushing Systems", Nov. 2015, (pp. 1-32).

FM Approvals, "Approval Standard for Sprinkler Valve Supervisory Devices - Standard Security and Enhanced Security", Dec. 2017, (pp. 1-17).

FM Approvals, "Approval Standard for Video Image Fire Detectors for Automatic Fire Alarm Signaling", Dec. 2011, (pp. 1-22).

FM Approvals, "Approval Standard for Water Mist Systems", Apr. 2016, (pp. 1-314).

FM Approvals, "FM Approvals: History", Jan. 2018, (pp. 1-7).

FM Approvals, Ansi, "American National Standard for Radiant Energy-Sensing Fire Detectors for Automatic Fire Alarm Signaling", Feb. 2014, (pp. 1-16).

FM Approvals, Approval Standard for Automatic and Open Water-Spray Nozzles for Installation in Permanently Piped Systems, Feb. 2010, (pp. 1-23).

FM Approvals, Approval Standard for Public Mode Visible Signaling Appliances for Automatic Fire Alarm Signaling, Nov. 2016, (pp. 1-18).

FM Approvals"Approval Standard for Audible Notification Appliances for Automatic Fire Alarm Signaling", Nov. 2003, (pp. 1-16).

Forest and Wood Products Australia, Andrea Jane Leys PHD, "How is Carbon Stored in Trees and Wood Products?", Jan. 2012, (pp. 1-10).

Forest Products Laboratory, Robert H. White, Mark A. Dietenberger, "Chapter 17: Fire Safety", Feb. 1999, (pp. 1-17).

FP Innovations, M. Mohammad, "Connections in CLT Assemblies", Sep. 2011, (pp. 1-59).

Fpinnovations, "A Synthesis of Research on Wood Products & Greenhouse Gas Impacts 2nd Edition", Octoer 2010, (pp. 123).

Fpinnovations, "CLT Handbook: Cross-Laminated Timber", Jan. 2013, (pp. 1-572).

Frank Rustincovitch, US Environmental Protection AuaryENCY, "Environmental Impact Guidelines: For New Source Phosphate Fertilizer Manufacturing Facilities" Oct. 1981 (227 Pages).

Frank Wigglesworth Clarke, The Constitution of Natural Silicates, Department of the Interior, United States Geological Survey, Bullentin 588, Washington, Government Printing Office (128 Pages).

G. S. Grigoryan, Z. G. Grigorya, A. Ts. Malkhasyan, Yerevan State University, "Obtaining Esters of Citric Acid with High Aliphatic Alcohols" Jan. 2017 (4 Pages).

Gabrielle Kassel, What is Soy Protein Isolate and Is It Bad For You? Jan. 24, 2020 (4 Pages).

General Information Sheet for Chemguard Class "A" Foam, Chemguard, Sep. 2005 (2 Pages).

General Information Sheet for Chemguard Foam Products, Chemguard, Sep. 2005 (6 Pages).

General Information Sheet for Chemguard Foam System Solutions, Johnson Controls, Jan. 2020 (12 Pages).

(56)                    References Cited

OTHER PUBLICATIONS

General Information Sheet for WD881 Class A Foam Concentrate, Perimeter Solutions Jan. 2019 (5 Pages).

General Information Sheet for Wildland Fire Chemical Products: Toxicity and Enviro nmental Concerns, Wildland Fire Chemical Systems, USDA WFS, Jan. 17, 2007 (2 Pages).

Gerhard Schickhofer, Andreas Ringhofer, "The Seismic Behaviour of Buildings Erected in Solid Timber", Aug. 2012, (pp. 1-124).

Gerry Parlevliet and Steven McCoy, "Organic Grapes and Wine: A Guide to Production", Department of Primary Industries and Regional Development, Govt. of Australia, Bullentins 4000—Research Publications, Jul. 2001, (41 Pages).

Ghafoor, A.; Khan, F.A.; Khorsandi, F.; Khan, M.A.; Nauman, H.M.; Farid, M.U., Development and Evaluation of a Prototype Self-Propelled Crop Sprayer for Agricultural Sustainability in Small Farms, Sustainability 2022, 14, 9204 (22 Pages).

Gizmodo, Esther Inglis-Arkell, "The Deadliest Ways to Try to Put Out a Fire", May 2015, (pp. 1-3).

Glenalmond Timber Company, "IWS FR Fire Retardant Treated Wood: Corrosion Information", Nov. 2017, (pp. 1).

Office Action (Final Rejection) dated Jun. 21, 2023 for U.S. Appl. No. 17/167,084 (pp. 1-5).

Office Action (Final Rejection) dated Jun. 21, 2023 for U.S. Appl. No. 17/233,461 (pp. 1-5).

Office Action (Non-Final Rejection) dated Feb. 1, 2023 for U.S. Appl. No. 17/167,084 (pp. 1-8).

Office Action (Non-Final Rejection) dated Feb. 1, 2023 for U.S. Appl. No. 17/233,461 (pp. 1-7).

Office Action (Non-Final Rejection) dated Feb. 16, 2023 for U.S. Appl. No. 17/176,670 (pp. 1-99).

Office Action (Non-Final Rejection) dated Feb. 16, 2023 for U.S. Appl. No. 17/176,670 (pp. 1-12).

Office Action (Non-Final Rejection) dated Jun. 5, 2024 for U.S. Appl. No. 18/492,649 (pp. 1-10).

Office Action (Non-Final Rejection) dated Jun. 5, 2024 for U.S. Appl. No. 18/492,642 (pp. 1-9).

Office Action (Non-Final Rejection) dated Jun. 28, 2022 for U.S. Appl. No. 16/029,861 (pp. 1-11).

Office Action (Non-Final Rejection) dated Aug. 28, 2024 for U.S. Appl. No. 18/432,017 (pp. 1-10).

Office Action (Non-Final Rejection) dated Sep. 9, 2024 for U.S. Appl. No. 18/432,018 (pp. 1-12).

Office Action (Non-Final Rejection) dated Sep. 20, 2024 for U.S. Appl. No. 18/432,014 (pp. 1-9).

Office Action (Non-Final Rejection) dated Sep. 23, 2024 for U.S. Appl. No. 18/432,020 (pp. 1-11).

Office Action (Non-Final Rejection) dated Oct. 6, 2022 for U.S. Appl. No. 17/497,945 (pp. 1-6).

Office Action (Non-Final Rejection) dated Oct. 6, 2022 for U.S. Appl. No. 17/497,946 (pp. 1-6).

Office Action (Non-Final Rejection) dated Oct. 6, 2022 for U.S. Appl. No. 17/497,962 (pp. 1-5).

Office Action (Non-Final Rejection) dated Oct. 11, 2022 for U.S. Appl. No. 17/497,948 (pp. 1-5).

Office Action (Non-Final Rejection) dated Oct. 27, 2022 for U.S. Appl. No. 17/497,943 (pp. 1-9).

Office Action (Non-Final Rejection) dated Oct. 27, 2022 for U.S. Appl. No. 17/497,952 (pp. 1-8).

Office Action (Non-Final Rejection) dated Oct. 27, 2022 for U.S. Appl. No. 17/497,953 (pp. 1-9).

Office Action (Non-Final Rejection) dated Nov. 10, 2022 for U.S. Appl. No. 17/497,942 (pp. 1-8).

Office Action (Non-Final Rejection) dated Nov. 10, 2022 for U.S. Appl. No. 17/497,949 (pp. 1-7).

Office Action (Notice of Allowance and Fees Due (PTOL-85)) dated Feb. 13, 2023 for U.S. Appl. No. 17/497,941 (pp. 1-9).

Office Action (Notice of Allowance and Fees Due (PTOL-85)) dated Feb. 13, 2023 for U.S. Appl. No. 17/497,955 (pp. 1-8).

Office Action (Notice of Allowance and Fees Due (PTOL-85)) dated Mar. 1, 2023 for U.S. Appl. No. 17/497,943 (pp. 1-7).

Office Action (Notice of Allowance and Fees Due (PTOL-85)) dated Mar. 13, 2023 for U.S. Appl. No. 17/497,942 (pp. 1-8).

Office Action (Notice of Allowance and Fees Due (PTOL-85)) dated Mar. 25, 2022 for U.S. Appl. No. 16/805,811 (10 Pages).

Office Action (Notice of Allowance and Fees Due (PTOL-85)) dated Mar. 27, 2023 for U.S. Appl. No. 17/497,945 (pp. 1-8).

Office Action (Notice of Allowance and Fees Due (PTOL-85)) dated Mar. 30, 2023 for U.S. Appl. No. 17/497,952 (pp. 1-8).

Office Action (Notice of Allowance and Fees Due (PTOL-85)) dated Apr. 26, 2023 for U.S. Appl. No. 17/497,946 (pp. 1-8).

Office Action (Notice of Allowance and Fees Due (PTOL-85)) dated Apr. 27, 2023 for U.S. Appl. No. 17/497,949 (pp. 1-8).

Office Action (Notice of Allowance and Fees Due (PTOL-85)) dated May 10, 2023 for U.S. Appl. No. 17/497,953 (pp. 1-8).

Office Action (Notice of Allowance and Fees Due (PTOL-85)) dated May 17, 2023 for U.S. Appl. No. 17/497,962 (pp. 1-9).

Office Action (Notice of Allowance and Fees Due (PTOL-85)) dated Jun. 5, 2023 for U.S. Appl. No. 17/497,948 (pp. 1-8).

Office Action (Notice of Allowance and Fees Due (PTOL-85)) dated Jul. 14, 2023 for U.S. Appl. No. 17/869,777 (pp. 1-9).

Office Action (Notice of Allowance and Fees Due (PTOL-85)) dated Jul. 19, 2023 for U.S. Appl. No. 17/167,084 (pp. 1-7).

Office Action (Notice of Allowance and Fees Due (PTOL-85)) dated Sep. 3, 2024 for U.S. Appl. No. 18/496,866 (pp. 1-7).

Office Action (Notice of Allowance and Fees Due (PTOL-85)) dated Sep. 12, 2023 for U.S. Appl. No. 17/233,461 (pp. 1-7).

Office Action (Notice of Allowance and Fees Due (PTOL-85)) dated Sep. 20, 2023 for U.S. Appl. No. 16/029,861 (pp. 1-9).

Office Action (Notice of Allowance and Fees Due (PTOL-85)) dated Oct. 6, 2023 for U.S. Appl. No. 17/591,592 (pp. 1-10).

Office Action (Notice of Allowance and Fees Due (PTOL-85)) dated Oct. 11, 2022 for U.S. Appl. No. 17/497,941 (10 Pages ).

Office Action (Notice of Allowance and Fees Due (PTOL-85)) dated Oct. 12, 2022 for U.S. Appl. No. 17/497,955 (pp. 1-9).

Office Action (Notice of Allowance and Fees Due (PTOL-85)) dated Oct. 20, 2023 for U.S. Appl. No. 17/591,592 (pp. 1-8).

Office Action (Notice of Allowance and Fees Due (PTOL-85)) dated Nov. 1, 2023 for U.S. Appl. No. 17/167,084 (pp. 1-7).

Office Action (Notice of Allowance and Fees Due (PTOL-85)) dated Nov. 13, 2023 for U.S. Appl. No. 17/233,461 (pp. 1-7).

Office Action (Notice of Allowance and Fees Due (PTOL-85)) dated Nov. 27, 2023 for U.S. Appl. No. 17/591,592 (pp. 1-10).

Office Action dated Mar. 2, 2023 for U.S. Appl. No. 16/029,861 (pp. 1-8).

Office Action dated Apr. 17, 2024 for U.S. Appl. No. 18/482,901 (pp. 1-6).

Office Action dated May 9, 2024 for U.S. Appl. No. 18/487,044 (pp. 1-7).

Office Action dated Dec. 22, 2022 for U.S. Appl. No. 17/869,777 (pp. 1-10).

Data Sheet for Chemguard S-764P-12A High Performance Anionic Fluorosurfactant, Tyco Fire Protection Products, Jan. 2018 (2 Pages ).

Data Sheet for FLOWmix, Leader Group, Jun. 2018 (2 Pages).

Data Sheet for Leader Mix, Leader Group, Jun. 2018 (2 Pages).

Data Sheet for Purple K Dry Suppressing Agent, Tyco Fire Protection Products, Jan. 2018 (1 Page ).

Data Sheet for SNS-D2 C Alltural Disease and Fungal Control Application & Use Guide, Sierra Natural Science, Jan. 2020 (pp. 1-7).

Data Sheet for Towalex Fffp Arc 3×6, Incendium Fire Solutions, Nov. 2014 (2 Pages ).

Data Sheet for Williams Fire & Hazard Control Inline Foam Eductors, Williams Fire & Hazard Control, Januray 2019 (1 Page).

Datasheet for Tearra-Blend® withg Tacking Agent 3® Hydraulic Mulch, Oct. 2017, Profile Products, LLC, Buffalo Grove, Illinois, (1 Pages).

DCI Engineers, "Cross-Laminate Timber", May 2016, (pp. 1-5).

Dealer News, "SiteOne Introduces New LESCO Smart Guided Precision Spray System", Nov. 5, 2018, https://www.rurallifestyledealer.com/articles/7715-siteone-introduc , (4 Pages).

(56) References Cited

OTHER PUBLICATIONS

Defence Research and Development Canada, John A. Hiltz, "Additives for Water Mist Fire Suppression Systems—A Review", Nov. 2012, (pp. 1-40).
Department of Financial Services, "Certification of Insurance Fire Protection System Contractor, State of Florida," Aug. 2007, (pp. 1).
Department of Homeland Security, "Class A Foam for Structural Firefighting", Dec. 1996, (pp. 1-62).
Department of the Navy, "Military Specification: Lumber and Plywood", Jun. 1984, (pp. 1-16).
Diversified Protection Systems Inc., "Fire Protection Protection Presentation", Jan. 2004, (pp. 1-35).
Dr. Anthony E. Finnerty, U.S. Army Research Laboratory, "Water-Based Fire-Extinguishing Agents", Jan. 1995, (pp. 1-12).
Dr. Inge Krämer, BASF, "Acronal PRO & Joncryl: Water based Resins for Metal Protection" Oct. 3, 2011, (21 Pages).
DRJ, "AAF21 Fire Treated Wood Protection Coating Applied to Lumber", Sep. 2017, (pp. 1-8).
DRJ, "Technical Evaluation Report: Eco Red Shield Fire Treated Wood Protection Coating", Apr. 2016, (pp. 1-8).
Drjohnson Lumber Company, "Cross Laminated Timbers: Mass Timber Construction", Jan. 2016, (pp. 1).
DuPont, "Some facts you should know about NOVEC 1230 and ECARO-25 . . . ", Oct. 2004, (pp. 1-2).
DuPont, Mark L. Robin, "DuPont Fire Extinguishants: Comparison Testing of FE-25 and Automatic Sprinklers in a Simulated Data Processing/Telecommunications Facility", Jul. 2008, (pp. 1-20).
Eco Building Products Inc, "Eco Red Shield Material Safety Data Sheet : Wood Dust", Jun. 2005, (pp. 1-2).
Eco Building Products, "Affiliate Program Screenshots", Apr. 2013, (pp. 1-3).
Eco Building Products, "Eco Disaster Break: Class A Fire Rated, UV Resistant, High Performance, Non-Toxic, Acrylic Coating", Feb. 2013, (pp. 1).
Eco Building Products, "Safety Data Sheet: Eco Red Shield", May 2016, (pp. 1-6).
Eco Building Products, "Technical Bulletin: Corrosive Effects From Eco Red Shield Coatings", Jan. 2011, (pp. 1).
Elsevier, Chao Man, Zhu Shunbing, Jia Litao, Wu Xiaoli, "Surfactant-containing Water Mist Suppression Pool Fire Experiemental Analysis", Oct. 2010, (pp. 1-7).
Elsevier, Qiang Chen, Jun-Cheng Jiang, Fan Wu, Meng-Ya Zou, "Performance Evaluation of Water Mist with Mixed Surfactant Additives Based on Absorption Property", Dec. 2017, (pp. 1-9).
Elsevier, Zhang Tianwei, Liu Hao, Han Zhiyue, Du Zhiming, Wang Yong, " Research Paper: Active Substances Study in Fire Extinguishing by Water Mist with Potassium Salt Additives Based on Thermoanalysis and Thermodynamics", May 2017, (pp. 1-10).
EPA's Safer Choice Criteria for Processing Aids and Additives, US Environmental Protection Agency (EPA) Safer Choice Program, published at https://www.epa.gov/saferchoice/safer-choice-criteria-processing-aids-and-additives , US EPA, Aug. 7, 2024 (5 Pages).
Erdal Ozkan, Ohio State University Professor and Extension Agriculture Engineer, "One-of-a-kind Intelligent Sprayer Being Developed in Ohio", Jun. 20, 2018, https://www.michfb.com/MI/Farm-News/One-of-a-kind-Intelligent-sprayer-being-developed-in-Ohio/, (6 Pages).
Ester Inglis-Arkell, "The Deadliest Ways to Try To Put Out A Fire," GIZMODO published at https://gizmodo.com/the-deadliest-ways-to-try-to-put-out-a-fire , Aug. 20, 2018, (3 Pages).
Eva Snejdrova and Milan Dittrich, Pharmaceutical Application of Plasticized Polymers, https://www.researchgate.net/publication/221929431_Pharmaceutical_Applications_of_Plasticized_Polymers, Mar. 2012, (23 Pages).
Exova Warringtonfire, "Ad-hoc tests on watermist systems utilising the principles of the procedure defined in Draft BS 8458: 2014: Annex B", Sep. 2015, (pp. 1-19).
Exova Warringtonfire, "BS 8458:2015: Annex C" Jan. 2016, (pp. 1-22).

Exova Warringtonfire, Test on a watermist system utilising the principles of the procedure defined in BS 9252: 2011: Annex S (21 pages).
Fact Sheet for PFOA & PFOS, EPA, Nov. 2016 (5 Pages).
Fike, "Cheetah Xi: Intelligent Suppression Control System", Sep. 2012, (pp. 1-6).
Fike, "DuraQuench: A New Era in Water-Based Fire Protection", Sep. 2015, (pp. 1-2).
Fike, "DuraQuench: Pumped Water Mist System", Sep. 2015, (pp. 1-8).
Fike, "Even in the Age of Cloud Computing, Data Center Downtime Can Spell Disaster", Aug. 2016. (pp. 1-2).
Fike, "Fire Alarm Solutions: Ready for the Future Fike Fire Panels", May 2007, (pp. 1-2).
Fike, "Intelligent Graphic Annunciators", Mar. 2009, (pp. 1-2).
Fike, "Intelligent Ionization Detector", Mar. 2014, (pp. 1-2).
Fike, "Intelligent Manual Pull Station", Jun. 2014, (pp. 1-2).
Fike, "Intelligent Non-Relay Photoelectric Duct Housing", Jun. 2014, (pp. 1-2).
Fike, "Intelligent Photoelectric Detector", Mar. 2014, (pp. 1-2).
Fike, "Micromist Suppression System Data Sheet", Sep. 2005, (pp. 1-2).
Fike, "Micromist System Package Data Sheet", Sep. 2005, (p. 1-2).
Product Selection Guide for BASF Resins, BASF, Feb. 2019 (77 Pages).
Profile Products LLC, "GHS Safety Data Sheet: ConTack", Jan. 2017, (pp. 1-6).
Profile Products LLC, "Certificate of Compliance, Terra-Blend with Tacking Agent 3", Jan. 2016, (pp. 1).
Profile Products LLC, "Earth-Friendly Solutions for Sustainable Results", Feb. 2014, (pp. 1-2).
Profile Products LLC, "Flexterra HP-FGM", Feb. 2018, (pp. 1-4).
Profile Products LLC, "Hydraulically-Applied Erosion Control Bonded Fiber Matrix" Mar. 2017 (5 Pages).
Profile Products LLC, "Profile Products Base Hydrualic Mulch Loading Chart and Application Guide", Oct. 2011, (pp. 1).
Profile Products LLC, "Profile Soil Solutions Software: Getting Started", Nov. 2017, (pp. 1-21).
Profile Products LLC, "Terra-Blend with Tacking Agent 3", Oct. 2017, (pp. 1).
Profile, "Product Screenshots", Nov. 2017, (pp. 1-5).
Profile® Products Base Hydraulic Mulch Loading Chart and Application Guide (ESP-02), Oct. 2011, Profile Products, LLC, Buffalo Grove, Illinois, (1 Page).
Qai Laboratories, "Test Report #T1003-1: FX Lumber Guard", Apr. 2015, (pp. 1-10).
Quick Start Guide for the SnapMapper, by AgTerra Technologies, Inc, Sheridan, Wyoming, Mar. 29, 2019 (8 Pages).
R. W.. Walker, "Free Radicals in Combustion Chemistry", Science Progress Oxford, 1990, vol. 74, No. 2, pp. 163-188, (22 Pages).
Ramage et al.; The Wood from the Trees: The Use of Timber in Construction; Renewable and Sustainable Energy Reviews 68 ( 2017) 333-359; published Oct. 2016.
Raute, "LVL Technology Screenshot on Web", (pp. 1).
RDR Technologies, "BanFire Screenshot", Nov. 2017, (pp. 1).
RDR Technologies, "Fire Retardant Spray for Artificial Tree and Decorations", Nov. 2017, (pp. 1).
RDR Technologies, Fire Retardant Coatings of Texas, "FX Lumber Guard Screenshots", Nov. 2017, (pp. 1-2).
Realfire® Realtors Promoting Community Wildfire Awareness, Eagle County, Colorado, "Wildfire Reference Guide: A Guide For Realtors® To Assist Home Sellers & Buyers With Understanding Wildfire", http: www.REALFire.net , Mar. 2017 (8 Pages).
Reed Construction Data, "Osmose Inc., FirePro Fire Retardant", Jan. 2004, (pp. 1-3).
Replacement Claims filed by Mighty Fire Breaker LLC in PCT Application No. PCT/US2022/015004 on May 27, 2023 (24 Pages).
Researchgate, Kayyani C. Adiga, "Ultra-fine Water Mist as a Total Flooding Agent: A Feasibility Study", Jan. 2014, (pp. 1-13).
Rethink Wood, "Designing for Fire Protection: Expanding the Possibilities of Wood Design", Aug. 2015, (pp. 1-8).

(56)     References Cited

OTHER PUBLICATIONS

Rethink Wood, "Evaluating the Carbon Footprint of Wood Buildings: Reducing Greenhouse Gases with High-Perfromance Structures", Apr. 2015, (pp. 1-8).

Rethink Wood, "Mid-Rise Wood Construction", Apr. 2015, (pp. 1-12).

RFID Journal, Ask The Experts Forum, "How Is RFID Being Used in the Construction Industry?", Jun. 27, 2013, (2 Pages).

Robert H. White, Erik V. Nordheim, "Charring Rate of Wood for ASTM E 119 Exposure", Feb. 1992, (pp. 1-2).

Robert L. Darwin, Hughes Associates Inc., "Aircraft Carrier Flight and Hangar Deck Fire Protection: History and Current Status", Jan. 2001, (pp. 1-102).

Robert L. Darwin, Hughes Associates Inc., Frederick W. Williams, Navy Technology Center for Safety and Survivability, "Overview of the Development of Water-Mist Systems for U.S. Navy Ships", Apr. 1999, (pp. 1-8).

Robert Zalosh, Gregory Gallagher, "Water Mist Sprinkler Requirements for Shipboard Fire Protection", May 1996, (pp. 1-97).

Role of Organic and Eco-Friendly Inhibitors on the Corrosion Mitigation of Steel in Acidic Environments—A State- of-Art Review, by Hyun-Min Yang, Molecules 2021, vol. 26, Jun. 2021 (20 Pages).

Roseburg Forest Products, "Roseburg EWP Commerical Design and Installation Guide", Mar. 2017, http://www.roseburg.com., (pp. 1-48).

Roseburg Forest Products, "Wood I-Joists", Jan. 2016, (pp. 1-6).

Rossi Jean-Louis, Marcelli Thierry, Chatelon François Joseph, Université de Corse, Systèmes Physiques pour l'Environnement UMR-CNRS 6134, Corte, France Morvan Dominique, Simeoni Albert, Rossi Jean-Louis, Marcelli Thierry, and Chatelon François Joseph, "Fuelbreaks: a Part of Wildfire Prevention", published in Global Assessment Report on Disaster Risk Reduction 2019, as a Contributing Paper, United Nations Office for Disaster Risk Reduction, Jul. 2019, (25 Pages).

Rossroof Group, "Tilcor: High Performance Roofing Systems", Nov. 2017, (pp. 1-2)).

Rubner Holzbau, "Timber Engineering in the 21st Century", Jan. 2017, (pp. 1-21).

Rubner Holzbau, "Wood Culture 21: Construction Expertise for Architects, Designers and Building Owners", Jul. 2017, (pp. 1-23).

Ryan S. Mcmullen, "Research of Alkali Metal-Ammonia Microjets Published in Journal Science" Jun. 4, 2020 (9 Pages).

S. Chen, A. Nussinovitch, The Role of Xanthan Gum in Traditional Coatings of Easy Peelers, Food Hydrocolloids, vol. 14, Issue 4, Jul. 2000, pp. 319-326, (7 Pages).

S. Foghmoes, T. Klemensø1, K. Brodersen, J. J. Bentzen and M. Della Negra, "Citrate- and glycerol triesters as novel dual-functional dispersants and plasticisers for ceramic processing", Department of Energy Conversion and Storage, Technical University of Denmark, Frederiksborgvej 399, DK-4000 Roskilde, Denmark, 2018 Elsevier (24 Pages).

S.T Lebow, J. E. Winandy, "Effect of fire-retardant treatment on plywood pH and the relationship of pH to strength properties" Jan. 8, 1997 (14 Pages ).

Safety Data Sheet for Chemguard DirectAttack Foam Concentrate, Tyco Fire Protection Products, Jan. 2018 (2 Pages).

Safety Data Sheet for First Alert® Tundra™ EZ Fire Spray™ Mixture, BRK Brands, Inc. Aurora, Illinois, Jun. 18, 2020 (6 Pages).

Safety Data Sheet for Purple K Dry Chemical (Fire Extinguishing Agent—Pressurized and Nonb-Pressurized) containing Potassium Bicarbonate and Calcium Ca, Badger Fire Protection, Ruckersville, VA, Nov. 23, 2015 (10 Pages).

Safety Data Sheet by NEXREG Compliance Inc. for Phos-Chek® Fortify Solution, Perimeter Solutions LP, Apr. 21, 2021 (5 Pages).

Safety Data Sheet fo KV-Lite Forming Fluoro Pr10 otein (FFFP) Foam Concentrate 3 & 6%, M/S K.V. Fire Chemicals PVT. LTD, Dec. 2009 (3 Pages).

Safety Data Sheet for Angus Fire FP 70 Foam, Angus Fire Ltd, Dec. 3, 2014 (9 Pages).

Safety Data Sheet for Bio Fluopro 3E, Bioex SAS, Nov. 11, 2005 (2 Pages).

Safety Data Sheet for Chemguard: Direct Attack Class A Foam, Tyco Fire Protection Products, Feb. 22, 2016 (8 Pages).

Office Action dated Apr. 2, 2020 for U.S. Appl. No. 15/829,940 (pp. 1-8).

Office Action dated Apr. 2, 2020 for U.S. Appl. No. 15/829,941 (pp. 1-8).

Office Action dated Dec. 9, 2020 for U.S. Appl. No. 16/805,811 (pp. 1-9).

Office Action dated Feb. 6, 2020, for U.S. Appl. No. 15/866,451 (pp. 1-9).

Office Action dated Feb. 26, 2019 for U.S. Appl. No. 15/952,183 (pp. 1-12).

Office Action dated Jan. 25, 2019 for U.S. Appl. No. 15/829,945 (pp. 1-7).

Office Action dated Jun. 1, 2018 for U.S. Appl. No. 15/829,914 (pp. 1-7).

Office Action dated Jun. 1, 2018 for U.S. Appl. No. 15/829,948 (pp. 1-13).

Office Action dated Mar. 18, 2020 for U.S. Appl. No. 16/449,389 (pp. 1-5).

Office Action dated Mar. 26, 2020 for U.S. Appl. No. 15/829,943 (pp. 1-8).

Office Action dated Mar. 27, 2020 for U.S. Appl. No. 15/829,944 (pp. 1-8).

Office Action dated May 31, 2019 for U.S. Appl. No. 15/866,451 (pp. 1-6).

Office Action dated Nov. 24, 2021 for U.S. Appl. No. 16/914,067 (10 Pages).

Office Action dated Nov. 9, 2018 for U.S. Appl. No. 15/866,456 (pp. 1-11).

Office Action dated Oct. 10, 2019 for U.S. Appl. No. 16/055,001 (pp. 1-9).

Office Action dated Oct. 11, 2018 for U.S. Appl. No. 15/866,454 (pp. 1-12).

Office Action dated Oct. 12, 2018 for U.S. Appl. No. 15/874,874 (pp. 1-15).

Office Action dated Oct. 5, 2021 for U.S. Appl. No. 16/805,811 (10 Pages ).

Office Action mailed Sep. 19, 2019 for U.S. Appl. No. 15/911,172 (pp. 1-8).

Online Britannica Entry for Chromphore, https://www.britannica.com/science/chromophore , captured Sep. 26, 2024 (4 Pages).

Online Britannica Entry for Carboxylic Acid, https://www.britannica.com/science/carboxylic-acid, captured Mar. 16, 2024 (15 Pages).

Online Product Advertisement titled "What is K-Rich™? A High analysis pH-buffered liquid potassium complexed with citric acid", Agricultural Solutions Inc., https://www.agsolcanada.com/individual-product-info/nts-k-rich, Aug. 5, 2020, (7 Pages).

Online Wikipedia Entry for Alkali , https://en.wikipedia.org/wiki/Alkali , captured Apr. 12, 2023 (3 Pages).

Online Wikipedia Entry for Alkali Metals, https://en.wikipedia.org/wiki/Alkali_metal, captured Apr. 12, 2023 (48 Pages).

Online Wikipedia Entry for Carboxylic Acid, https://en.wikipedia.org/wiki/Carboxylic_acid , captured Apr. 2, 2023 (10 Pages).

Online Wikipedia Entry for Chromophore , https://en.wikipedia.org/wiki/Chromophore, captured Sep. 26, 2024 (5 Pages).

Online Wikipedia Entry for Ester, https://en.wikipedia.org/wiki/Ester, captured Feb. 15, 2024 (15 Pages).

Online Wikipedia Entry for List of Carboxylic Acids, https://en.wikipedia.org/wiki/List_of_carboxylic_acids , captured Feb. 13, 2023 (10 Pages).

Online Wikipedia Entry for Saturated and Unsaturated Compounds , https://en.wikipedia.org/wiki/Saturated_and_unsaturated_compounds, captured Mar. 16, 2023 (3 Pages).

OSB, "Trust Joist 2JI 210 Screenshot", Jan. 2012, (pp. 1).

Paint & Coatings Industry, "Making the Transition: Coalescing for Latex Paint" Feb. 29, 2000 (8 Pages).

Panasonic Corporation, "PIR Motion Sensor 'PaPIRs'", Jul. 2017, (pp. 1-9).

Patol, "500 Series: Model 5410 Infra-Red Transit Heat Sensor Infosheet", Nov. 2017, (pp. 1-2).

(56) References Cited

OTHER PUBLICATIONS

Patrick Mackary, UK Journal of Pharmaceutal and Biosciences, "Principles of Salt Formation", Aug. 2, 2014, (4 Pages).

Pau Loke Show, Kehinde Opeyemi Oladele, Qi Yan Siew, Fitri Abdul Aziz Zakry, John Chi-Wei Lan, Tau Chuan Ling, Frontiers in Life Science, "Overiview of citric acid production from aspergillus niger" Apr. 20, 2015 (14 Pages).

PCT Third Party Observation submitted in PCT/US2022/015004 (Applicant: Mighty Fire Breaker LLC) on May 24, 2023 under PCT Administrative Instructions Part 8 by Anonymous Third Party (2 Pages).

PCT Third Party Observation submitted in PCT/US2022/015005 (Applicant: Mighty Fire Breaker LLC) on May 24, 2023 under PCT Administrative Instructions Part 8 by Anonymous Third Party (2 Pages).

Pendu Manufacturing, Inc., North Holland, PA, Slide Show of Youtube Video of a Pendu Automated Wood Board Dip Tank System in Operation, Feb. 8, 2012, (30 Pages).

Pentair, "Hypro—SHURflo: Agriculture Products Catalog", Mar. 2013, (pp. 1-28).

Philip D. Evans, Hiroshi Matsunaga, Alan F. Preston, Cameron M. Kewish, "Wood Protection for Carbon Sequestration—a Review of Existing Approaches and Future Directions", Current Forestry Reports (2022) vol. 8, pp. 181-198 (18 Pages).

Phos-Chek, "Protect Your Home From Wildfire", Nov. 2017, (pp. 1-4).

Phos-Chek® LC95W Safety Data Sheet, Version 1.1, Issue Date Mar. 18, 2019, Published by Perimeter Solutions, LP, (5 Sheets).

Pillar Technologies Inc., "Pillar Technologies Presentation", Jul. 2018, (pp. 1-16).

PLabat-Anderson Incorporated, "Human Health Risk Assessment: Wildland Fire-Fighting Chemical" Prepared for Missoula Technology and Development Center USDA Forest Service, Missoula, MT, Mar. 17, 2003 (37 Pages).

Plumis, "Austomist Tap Mount: The discreet watermist sprinkler alternative ideal for kitchen fire protection", Jan. 2017, (pp. 1-2).

Plumis, "Autmist Smartscan: The smarter, modern alternative to a fire sprinkler system", Jan. 2017, (pp. 1-2).

Plumis, "Automist Fixed Wall Head Handbook", Jan. 2017, (pp. 1-30).

Plumis, "Automist Personal Protection System Handbook", Jan. 2016, (pp. 1-18).

Plumis, "Automist Personal Protection System: The plug & play mobile watermist fire sprinkler", Jan. 2016, (pp. 1-2).

Plumis, "Automist Smartscan Handbook" Jan. 2017, (pp. 1-66).

Insurance Institute for Business & Home Safety (IBHS), Oct. 22, 2018, "Colorado Property & Insurance WildfirePreparedness Guide", 2018 (2 Pages).

Insurance Institute for Business & Home Safety, "Protect Your Property from Wildfire", Jan. 2011, (pp. 1-40).

Intelligent Wood Systems, "IWS FR Fire Retardant Treated Wood Corrosion Information", Jan. 2016, (pp. 1).

Intelligent Wood Systems, "Treated Timber—Consumer Information", Nov. 2016, (pp. 1-15).

Intelligent Wood Systems, "Treated Timber—Customer Information", Nov. 2016, (pp. 1-8).

International Fire Chiefs Association, "Guidelines for Managing Private Resources on Wildland Fire Incidents", Jan. 2016, (pp. 1-2).

International Preliminary Report on Patentability (IPRP) and Applicant's ART34 Amendment Claims 1-98, issued in PCT/US22/15004 dated Aug. 31, 2023 (30 Pages).

International Search Report (ISR) and Written Opinion of The International Searching Authority (WO) dated Jun. 8, 2022 issued in PCT International Patent Application No. PCT/US22/15004 filed Feb. 2, 2022 by Applicant, M-Fire Holdings LLC, Assigned to Mighty Fire Breaker LLC, (37 Pages).

International Search Report (ISR) issued in PCT/US22/15055 dated Jul. 18, 2022 (6 Pages).

Intertek, "Building & Construction Information Bulletin: Introduction to ASTM E84 & Frequently Asked Questions", Jun. 2017, (pp. 1-2).

Intertek, "Report of Testing 7'×7' Floor/Ceiling Assembly", Aug. 2013, (pp. 1-6).

Intertek, "Report of Testing FX Lumber Guard (Dimensional Lumber)", Apr. 2015, (pp. 1-10).

Intertek, "Report of Testing FX Lumber guard Fire Retardant Coating Applied to I-Joists in a Floor Celing Assembly", Aug. 2014, (pp. 1-6).

Intertek, "Report of Testing FX Lumber Guard Fire Retardant for I-Joist, Truss Joist (TJI), FLoor Joist, Ceiling Joist, amd OSB", Mar. 2013, (pp. 1-9).

Intertek, "Report of Testing FX Lumber Guard on SPF Lumber", Jun. 2012, (pp. 1-6).

Intertek, "Report of Testing FX Lumber Guard", Aug. 2015, (pp. 1-6).

Intertek, "Report of Testing FX Lumber Guard", Nov. 2014, (pp. 1-9).

Iron Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/iron-salts/ (7 Pages).

J. Craig Voelkert, "Fire and Fire Extinguishment: A Brief Guide to Fire Chemistry and Extinguishment Theory for Fire Equipment Service Technicians", Jan. 2015, (28 Pages).

J. G. Quintiere, QDOT LLC, "Literature Review: Packaging Technique to to Defeat Fires and Explosions due to Lithium-ion and Related High-Energy-Density Batteries" Mar. 2020 (64 Pages).

J. W. Hastie, "Molecular Basis of Flame Inhibition" Jul. 19, 1973 (22 Pages).

J28 . W. Hastie, "Molecular Basis of Flame Inhibitition", Journal of Research of the National Bureau of Standards—A Physics and Chemistry, vol. 77A, No. 6, Nov.-Dec. 1973, (22 Pages).

James Hardie Technology, "HardieBacker: With Moldblock Technology", Jan. 2012, (pp. 1-10).

James Hardie Technology, "30-Year Limited Warranty", Oct. 2011, (pp. 1-8).

James R. Butz, Technologies Inc, Richard Carey, David Taylor Research Center, "Application of Fine Water Mists to Fire Suppression", Nov. 2017, (pp. 1-11).

Jerrold E. Winandy, Qingwen Wang, Robert E. White, "Fire-Retardant-Treated Strandboard: Properties and Fire Performance", May 2007, (pp. 1-10).

Jesse Roman, "Build. Burn. Repeat?", NFPA Journal, NFPA.org, Jan./Feb. 2018 , (9 Pages).

Jim Clark, Group 1_ Properties of Alkali Metals—Chemistry LibreTexts, captured on OC (tober 6, 2024 T https://chem.libretexts.org/Bookshelves/Inorganic_Chemistry/Supplemental_Modules_and_Websites_(Inorganic_Chemistry)/Descriptive_Chemistry/Elements_Organized_by_Block/1_s-Block_Elements/Group_1%3A_The_Alkali_Metals/1Group_1%3A_Physical_Properties_of_Alkali_Metals (3 Pages).

John Packer, NZ Institute of Chemistry, "Chemistry in Fire Fighting", Oct. 2017, (6 Pages).

Johnson Controls , "Aqueous Film-Forming Foam (AFFF) Concentrates: Aspirated Versus Nonaspirated AFFF" Jan. 2020 (4 Pages)6.

Johnson Controls, "SaboFoam: Firefighting Foam Suppression Technology" Jan. 2019 (6 Pages).

Josef Hainzl, "High Pressure Water Mist for Protection of High Rise Buildings", Nov. 2016, (pp. 1-3).

Joseph W. Mitchell and Oren Patashnik, "Firebrand Protection as the Key Design Element for Structure Survival during Catastrophic Wildland Fires", M-bar Technologies & Consulting, published at https://www.slideserve.com/mari/firebrand-protection-as-the-key-design-element-for-structure-survival-during-catastrophic-wildland-fires , uploaded on Aug. 22, 2013, (15 Pages).

Joseph W. Mitchell, M-Bar Technologies and Consulting, "Wind-Enabled Ember Dousing: A Comparison of Wildland Fire Protection Strategies", Aug. 2008, (pp. 1-53).

(56)　　　　　References Cited

OTHER PUBLICATIONS

Joseph W. Mitchell, Oren Patashnik, "Firebrand Protection as the Key Design Element for Structure Survival During Catastrophic Wildland Fires", Aug. 2006, (pp. 1-15).
Joseph W. Mitchell, PhD, "Wind-Enabled Ember Dousing: A Comparison of Wildland Fire Protection Strategeies" Prepared for Ramona Fire Recovery Center, M-bar Technologies and Consulting, LLC, Aug. 12, 2008, (53 Pages).
Josephine Christina, Youngsoo Lee, Jounral of Food Science, "Modification of Sodium Release Using Porous Corn Starch and Lipoproteic Matrix" Jan. 22, 2016 (9 Pages).
Journal of Civil & Environmental Engineering, Mohamed Fayek Abdrabbo et al., "The Effect of Water Mist Droplet Size and Nozzle Flow Rate on Fire Extinction in Hanger by Using FDS", Oct. 2010, (pp. 1-12).
Jungbunzlauer Products That Comply with California Proposition 65, by Jungbunzlauer Suisse AG, Basel Switzerland, Jan. 3, 2020 (1 Page).
Jungbunzlauer Suisse AG, "Trisodium Citrate Anhydrous" Feb. 2021 (4 Pages ).
Jungbunzlauer White Paper "Jungbunzlauer Tripotassium Citrate: Environmental and health friendly flame retardant in wood application", Product Group Special Salts, Tripotassium Citrate, Protection TPC Fire Retardant Wood, published on Jungbunzlauer Website 2019 (2 Pages).
Jungbunzlauer, "Facts: Citrofol as coalescent agent" Jan. 2019 (12 Pages).
Jungbunzlauer, "Wood treatment—TPC as fire retardant" Jan. 2019 (11 Pages ).
Kallesoe Machinery A/S, "System Solutions for Laminated Wood Products", Nov. 2017, (pp. 1-3).
Kallesoe Machinery, "CLT Production Line", Nov. 2017, (pp. 1-5).
Keith Klassen, "Aspirating Foam Nozzles", Oct. 20, 2011 (6 Pages).
Khrystyna Regata, Christoph Bannwarth, Stehan Grimme and Michael Allan, "Free electrons and ionic liquids: study of excited states by means of electron-energy loss spectroscopy and the density functional theory multireference configuration interaction method", Phys. Chem. Chem Phys. 2015, 17 15771, (10 Pages).
Khrystyna Regeta, Christoph Bannwarth, Stefan Grimme, Michael Allan, Royal Society of Chemistry, "Free Electrons and Ionic Liquids: study of excited states by means of electron-energy loss spectroscopy and the density functional theory multireference configuration interaction method", May 2015, (pp. 1-10).
Kjayyani C. Adiga, Researchgate, "Ultra-fine Water Mist as a Total Flooding Agent: A Feasibility Study", Jan. 2014, (pp. 1-13).
Kostas D. Kalabokidis, "Effects of Wildfire Suppression Chemicals on People and the Environment—A Review", Sep. 2000, (pp. 1-9).
Tyco Fire Products, "AquaMist: Watermist Fire Protection", Jan. 2013, (pp. 1-7).
Tyco Fire Products, "AquaMist", Jan. 2016, (pp. 1-5).
Tyco Fire Products, "Ultra Low Flow AQUAMIST Solution for Protecting Office Spaces, False Ceilings and False Floors—VdS Approval Criteria", May 2016, (pp. 1-6).
Tyco Fire Protection Products, "Alcohol Resistant—Aqueous Film-Forming Foam (AR-AFFF) Concentrates" Jan. 19, 2016 (2 Pages).
Tyco Fire Protection Products, "Chemguard: Foam Concentrates and Hardware" Jan. 2019 (7 Pages).
Tyco Fire Protection Products, "Foam Systems—Acceptable Materials of Construction" Jan. 2018 (2 Pages).
Tyco Fire Protection Products, "Storage of Foam Concentrates: Recommended4 Storage, Handling and Inspection of Foam Concentrates" Jan. 2018 (3 Pages).
Tyco, "AquaMist Introduction" by Steve Burton, Certfied Fire Engineer, Tyco Fire Protection Products, Nov. 2015, (pp. 1-108).
Tyco, "Gaseous Fire Suppression Systems", Sep. 2013, (pp. 1-16).
Tyco, "Novec 1230: Gaseous Fire Suppression Solution", Feb. 2013, (pp. 1).
Tzoulis et al. Emerging Traceability Technologies as a Tool for Quality Wood Trade. Procedia Technology 8 ( 2013 ) 606-611.

U.S. Department of Agriculture, "Aerial Application of Fire Retardant", May 2011, (pp. 1-370).
U.S. Department of Agriculture, "Carbon Storage and Accumulation in United States Forest Ecosystems", Aug. 1992, (pp. 1-55).
U.S. Department of Energy, "Method for Calculating Carbon Sequestration by Trees in Urban and Suburban Settings", Apr. 1998, (pp. 1-16).
UL Greenguard Certification Test Report for AF21 Clean Fire Inhibitor, M-Fire Suppression Inc., May 29, 2018 (23 Pages).
Underwriters Laboratories Inc., "BPVV R7002 Lumber, Treated", Jan. 2011, (pp. 1-5).
Underwriters Laboratories Inc., BUGV R7003 Treated Plywood, Oct. 2011, (pp. 1-4).
Underwriters Laboratories Inc., "Greenguard Certification Test for Eco Building Products, Inc.: Eco Red Shield—01", Mar. 2015, (pp. 1-21).
Underwriters Laboratories, "Project 90419—Greenguard and Greenguard Gold Annual Certification Test Results", Mar. 2015, (pp. 1-21).
Underwriters Laboratories, "Report on Structural Stability of Engineered Lumber in Fire Conditions", Sep. 2008, (pp. 1-178).
United Nations, "Globally Harmonized System of Classification and Labelling of Chemicals (GHS)", Oct. 2011, (pp. 1-568).
US Department of Agriculture Forest Service Specification 5100-304d, Long-Term Retardant, Wildland Firefighting, USDA Forest Service, Jan. 7, 2020, (32 Pages).
US International Trademark Commission, "Citric Acid and Certain Citrate Salts from Canada and China (Investigation Nos. 701-TA-456 and 731-TA-1152 (Final)", ITC Publication No. 4076, Washington, DC, May 2009 (184 Pages).
USDA Forest Service "Guidelines for Aerial Delivery of Retardant or Foam Near Waterways", USDA Forest Service, Apr. 2000 (2 Pages).
USDA Forest Service List of Long-Term Retardant for Wildland Fire Management—Aerial Applications—Qualified by US Forest Service in Accordance with Forest Service Specification 5100-301d, US Forest Service, Washington Office, Fire & Aviation Management, May 5, 2024 (2 Pages).
USDA Forest Service List of Long-Term Retardant for Wildland Fire Management—Pretreatment—Product Qualified by US Forest Service in Accordance with Forest Service Specification 5100-301d, US Forest Service, Washington Office, Fire & Aviation Management, Aug. 5, 2023 (1 Page).
USDA Forest Service Product Information on Fortress FR-700 Pretreatment Retardant Usingf Magnesium Cloride, Gum Thickened, Medium Viscosity, Uncolored, USDA Forest Service, May 2023 (1 Page).
USDA Forest Service Product Information on Phos-Chek 259-F (1.14 lb/gal) Retardant for Aerial or Ground Application, Gum Thickened, Low Viscosity, Fugitive Colored, USDA Forest Service, Sep. 2024 (1 Page).
USDA Forest Service Product Information on Phos-Chek 259-F (1.60 lb/gal) Retardant for Aerial or Ground Application, Gum Thickened, Low Viscosity, Fugitive Colored, USDA Forest Service, Sep. 2024 (1 Page).
USDA Forest Service Product Information on Phos-Chek 259-R (1.14 lb/gal) Retardant for Aerial or Ground Application, Gum Thickened, Low Viscosity, Iron Oxide Colored, USDA Forest Service, Sep. 2024 (1 Page).
USDA Forest Service Product Information on Phos-Chek 259-R (1.60 lb/gal) Retardant for Aerial or Ground Application, Gum Thickened, Low Viscosity, Iron Oxide Colored, USDA Forest Service, Sep. 2024 (1 Page).
USDA Forest Service Product Information on Phos-Chek D75-R and D75-F Retardant for Aerial or Ground Application, Gum Thickened, High Viscosity, Iron Oxide and Fugitive Colored, USDA Forest Service, Sep. 2024 (1 Page).
USDA Forest Service Product Information on Phos-Chek Fortify Pretreatment Retardant, Gum Thickened, Low Viscosity, Colorless, USDA Forest Service, Nov. 2021 (1 Page).
USDA Forest Service Product Information on Phos-Chek G75-F and G75-W Retardant for Aerial or Ground Application, Gum

(56)            References Cited

OTHER PUBLICATIONS

Thickened, Low Viscosity, Fugitive Colored and Uncolored, USDA Forest Service, Sep. 2024 (1 Page).

USDA Forest Service Product Information on Phos-Chek LC-95A-R (5.5:1) Retardant for Aerial or Ground Application, Gum Thickened, Low Viscosity, Iron Oxide Colored, USDA Forest Service, Sep. 2024 (1 Page).

USDA Forest Service Product Information on Phos-Chek LCE20W Pretreatment Retardant, Gum Thickened, Low Viscosity, Colorless, USDA Forest Service, Nov. 2021 (1 Page).

USDA Forest Service Product Information on Phos-Chek LV-R and MV-R (3.5:1) Retardant for Aerial or Ground Application, Fluid Concentrate, Gum Thickened, Iron Oxide Colored, USDA Forest Service, Sep. 2024 (1 Page).

USDA Forest Service Product Information on Phos-Chek® Fortify—Pre-Mixed Pretreatment Retardant, Gum Thickened, Low Viscosity, Colorless, USDA Forest Service, Nov. 2021 (1 Page).

USDA Forest Service Product Information on Phos-Chek® LCE20W—Pre-Mixed Pretreatment Retardant, Gum Thickened, Low Viscosity, Colorless, USDA Forest Service, Nov. 2021 (1 Page).

USDA Forest Service, "Mass Laminated Timber in the United States: Past, Present, and Future", Nov. 2017, (pp. 1-13).

USDA, "Hygrothermal Performance of Mass Timber Construction", Nov. 2015, (pp. 1-21).

USDA, Natural Resources Conservation Service, Denver Colorado, "2012 Fact Sheet on HydroMulching", 2012, (2 Pages).

Vesper, S.; Sienkiewicz, N.; Struewing, I.; Linz, D.; Lu, J., Prophylactic Addition of Glucose Suppresses Cyanobacterial Abundance in LakeWater. Life 2022, 12, 385. (13 Pages).

Victaulic, "Victaulic Vortex 1000 Fire Supression System", Feb. 2011, (pp. 1-2).

Victaulic, "Victaulic Vortex 1500 Fire Suppression System", Jun. 2016, (pp. 1-3).

Victoria J. Nikiforova, Pieter Giesbertz, JanWiemer, Bianca Bethan, Ralf Looser, Volker Liebenberg, Patricia Ruiz Noppinger, Hannelore Daniel, and Dietrich Rein, Research Article "Glyoxylate, a New Marker Metabolite of Type 2 Diabetes", Hindawi Publishing Corporation, Journal of Diabetes Research, vol. 2014, Article ID 685204, (9 Pages).

Victualic, William, Reilly, "Dual Agent Extinguishing System: Victualic Vortex", Apr. 2008, (pp. 1-6).

Vivian Merk, Munish Chanana, Tobias Keplinger, Sabyasachi Gaand and Ingo Burgert, "Hybrid wood materials with improved fire retardance by bio-inspired mineralisation on the nano- and submicron level", Green Chemistry, 2015, vol. 17 , pp. 1423-1428 (6 Pages).

Vivian Merk, Munish Chanana*, Sabyasachi Gaan and Ingo Burgert, "Mineralization of wood by calcium carbonate insertion for improved flame retardancy", Holzforschung, vol. 70, No. 9, pp. 867-876 (10 Pages).

W. Gill Giese, Slide Show on "Potassium in the Vineyard and Winery", New Mexico State University, Viticulture Extension , Nov. 2016, (25 Pages).

"Acid vs. Base—What's the Difference ?", published in This vs. That , at https://thisvsthat.io/acid-vs-base , Dec. 14, 2025, Bit Flip LLC, (6 Pages).

"Divalent vs. Monovalent—What's the Difference?", published in This vs. That , at https://thisvsthat.io/divalent-vs-monovalent Mar. 16, 2025, Bit Flip LLC, (4 Pages).

"Flame-retardant coatings for wood surfaces" by European Coatings on Jan. 2, 2024 at https://www.european-coatings.com/news/application-areas/flame-retardant-coatings-for-wood-surfaces/ , published by Vincentz Network GmbH & Co., Hannover Germany (4 Pages).

"Flame-retardant coatings for wood surfaces", published on Jul. 5, 2024 at https://www.european-coatings.com/news/application-areas/flame-retardancy-of-acrylic-emulsion-resin-intumescent-coatings-added-with-alkaline-lignin-on-plywood/ by European Coatings, captured on Nov. 23, 2024, published by Vincentz Network GmbH & Co., Hannover Germany, previously published in Journal of Coatings Technology and Research, vol. 21, 2024 (5 Pages.

"Toxicological Profile for Formaldehyde" (Jul. 1999), U.S. Department of Health and Human Services, Public Health Service Agency for Toxic Substances and Disease Registry, Division o Toxicology/Toxicology Information Branch, Atlanta, Georgia USA (pp. 468).

A Specification Guide To Flame Retardant Wood Panels (Part 5: The Features abnd Benefits of Smartply Max FR B OSB and Premier FR MDF), by Medite Smartply Innovative Wood Products, 2021 (16 Pages).

Anupama Sapkota, "Ester vs. Ether—Definition, 12 Major Differences, Examples", published in Science Info at https://scienceinfo.com/ester-vs-ether/ , captured on Jan. 19, 2025 (12 Pages).

Asha at Wood Based Panels International (WBPI), "MDI—a simple equation for OSB production?", published at https://www.wbpionline.com/analysis/mdi-a-simple-equation-for-osb-production/ by WBPI, on May 16, 2012 (8 Pages).

BASF MDI Handbook North America (For MDI-Based Polyurethane Chemicals) published in 2019 by BASF Corporation, Wyandotte, Michigan USA, (35 Pages).

Brochure on Huntsman® I-BOND® MDI-Based Polyurethane Wood Resins for Use in the Man ufacture of Composite Wood Products ( V1), published by Huntsman Corporation, The Woodlands, Texas USA, 2022 (5 Pages).

Canadian Code Compliance Evaluation (CCMC) No. 12009-R, issued Aug. 31, 1989 and Modified Nov. 8, 2023 for Rubinater 1840 MDI-Based Resin Binder by Huntsman International LLC, Woodlands, Texas, for OSB and Waferboard, in Compliance with NBC 2015 (10 Pages).

Carmen-Alice Teaca and Fuiga Tanasa. "Wood Surface Modification—Classic and Modern Approaches in Wood Chemical Treatment by Esterification Reactions", Coatings, MDPI, Coatings 2020, vol. 10, p. 629, (31 Pages).

Chandrabhan Verma, Eno E. Ebenso, M.A. Quraishi, "Corrosion inhibitors for ferrous and non-ferrous metals and alloys in ionic sodium chloride solutions: A review", Journal of Molecular Liquids, vol. 248, Dec. 2017, pp. 927-942 (9 Pages).

Che Zhang, A thesis titled "Evaluation of Bio/pMDI Wood Adhesives" presented to the University of Waterloo in fulfillment of the thesis requirement for the degree of Master of Applied Science in Chemical Engineering, University of Waterloo Waterloo, Ontario, Canada, 2018 (68 Pages).

Che Zheng, 2018 Master's Thesis of at the University of Waterloo titled "Evaluation of Bio/pMDI Wood Adhesives", Chemical Engineering Department, University of Waterloo, Waterloo, Ontario, Canada, 2018 (68 Pages).

Design for Code Acceptance—Flame Spread Performance of Wood Products Used For Interior Finish, American Wood Council, Leesburg, VA, 2019 (7 Pages).

Dieffenbacher "Let's Build Your Plant—Products and Solutions for the Wood-Based Panel Industry" (2020), a Product and Solutions Catalog and Planning and Design Guidebook, by Dieffenbacher GmbH, Eppingen, Germany, May 2020 (73 Pages).

Dr Chris Phanopoulos, "Polyurethanes and Isocyanates used as adhesives in Composite Wood Products", I-BOND® Products, Huntsman Corporation, The Woodlands, Texas (52 Pages).

Dr. Alexey Peshkovsky, "Making Stable Emulsions—A Guide to Formulation and Processing Conditions Optimization" (2015), Industrial Sonomechanics, LLC, Miami, Florida USA 2015 (22 Pages).

DRJ® Listing and Technical Evaluation Report No. Jan. 2010 for No. Burn® Plus and No. Burn® Plus Seal Spray Fire Protected Lumber and SCL Used as an Air Barrier Material and Water Resistance, Issued Oct. 23, 2020 and Revised Mar. 13, 2025, DRJ Engineering, LLC (24 Pages).

English Translation of Office Action No. 5212 dated Apr. 11, 2025 and issued in Columbian National Stage Patent Application Based on International Application No. PCT/US2022/015004 (17 Pages).

English Translation of Response to Second Office Action No. 16697 filed on Dec. 12, 2025 in Columbian National Stage Patent Application Based on International Application No. PCT/US2022/015004 (13 Pages).

English Translation of Second Office Action No. 16697 filed on Apr. 28, 2025 in Columbian National Stage Patent Application Based on International Application No. PCT/US2022/015004 (17 Pages).

(56)　　References Cited

OTHER PUBLICATIONS

Environmental Product Declaration (EPD) dated Jul. 7, 2023 covering Burnblock® Fire Retardants (i.e. Burnblock JG30, Burnblock MM50 and Burnblock DM3 Powders) containing Ammonium phosphates 5-95%, Citrate 5-95%, and Sodium Benzoate 2-10%., manufactured by Burnblock ApS, Copenhagen, Denmark, (14 Pages).

Environmental Product Declaration per ISO 14025 (Declaration No. EPDIE-19-17) by Medite Smartply on Nov. 11, 2019, for SMARTPLY Oriented Stand Boards (OSB), EPD Ireland (43 Pages).

Euroepan-Search Report Including European Supplemental Search Report and European Opinion issued in European Patent Application No. 22750358.8 on Dec. 10, 2024 (Dec. 10, 2024), which is a National Stage Entry of International Patent Application No. PCT/US2022/015004 ( 8 Pages).

European Search Opinion (EPO Form 1703) (Form dated Apr. 15, 2024 issued in EPO Patent Application No. EP22750358.8 (5 Pages).

Huntsman Product Brochure titled "A Commitment to the Future—Composite Wood Products" describing I-BOND® MDI-Based Polymeric Resin Products for Various Composite Wood Products, manufactured by Huntsman Polyurethanes, Huntsman Corporation, Woodlands, Texas USA 2019 (7 Pages).

Information Disclosure Statement filed in Columbian National Stage Application based on International Application No. PCT/US2022/015004 (463 Pages).

International Search Report (ISR) and Written Opinion (WO) issued in International Patent Application No. PCT/US2025/012489, dated Jul. 9, 2025 (49 Pages).

International Search Report (ISR) and Written Opinion (WO) issued in International Patent Application No. PCT/US2025/030054, dated Sep. 15, 2025 (98 Pages).

International Search Report (ISR) and Written Opinion (WO) issued in International Patent Application No. PCT/US2025/030057, dated Sep. 24, 2025 (157 Pages).

International Search Report (ISR) and Written Opinion (WO) issued in International Patent Application No. PCT/US2025/030268, dated Sep. 17, 2025 (42 Pages).

Ivan Sumerskii, Pia Solt, Hendrikus W. G. van Herwijnen, Irina Sulaeva1, Ters Thomas, Thomas Rosenau, and Antje Potthast, "Lignin-Containing PMDI-Binder for Wood Particle Board Production", Lenzinger Berichte 97m 2022, pp. 109-122 (14 Pages).

JBL Brochure #078 titled "Facts—Citrofol® As a carrier fluid for microbials", by Jungbunzlauer Suisse Ag, CH-4002 Basel, Switzerland, 2024 (10 Pages).

JBL Brochure #088 titled "Into the future with biopolymers—Shaping polymer properties with bio-based additives", by Jungbunzlauer Suisse AG, CH-4002 Basel, Switzerland, 2023 (2 Pages).

JBL Brochure #142 titled "Facts—Citrofol® As Coalescent agent", by Jungbunzlauer Suisse Ag, CH-4002 Basel, Switzerland, 2019 (12 Pages).

Kelvin M. Chapman, A Doctoral Thesis titled "A Study of Two Aspects of Medium Density Fiberboard Manufacture" submitted in fulfilment of the requirements for the degree of Doctor of Philosophy in Chemical and Process Engineering to the University of Canterbury, Canterbury, England, Mar. 2004 (189 Pages).

Letter (dated Aug. 15, 2025) Accompanying Subsequently Filed Items filed in European Patent Application No. EP22750359.6 which is an Regional Phase Entry Application from International Application No. PCT/US2022/015005 (15 Pages).

Letter (dated Jul. 4, 2025) Accompanying Subsequently Filed Items filed in European Patent Application No. EP22750358.8 which is an Regional Phase Entry Application from International Application No. PCT/US2022/015004 (21 Pages).

M.B. Oliveira, J.A.P. Coutinho, and A.J. Queimada, "Surface tensions of esters from a combination of the gradient theory with the CPA EoS", published by Elsevier B.V. in Fluid Phase Equilibria, vol. 303, 2011, pp. 56-61 (6 Pages).

Material Safety Data Sheet for Fire Terminator FT JN669 Fire Extinguishing Agent for Forest/Peat Fires, by Fire Terminator International PTE Ltd., Singapore, Dec. 21, 2020 (4 Pages).

Mats Sundin, Master's Thesis titled "Design of Blow Line Resin Injector for MDF Production", Master of Science Programme, Mechanical Engineering, Lulea University of Technology, Sundsvall, Sweden 2007 (67 Pages).

Mitsura Abe, Yukiko Enomoto, Matsako Seki and Tsunehisa Miki, "Esterification of Solid Wood for Plastic Forming", Bioresources.com, vol. 15, No. 3, 2020, pp. 6282-6298 (pp. 17).

Mohamed, A.; Visco, D.P., Jr.; Bastidas, D.M. , "Sodium Succinate as a Corrosion Inhibitor for Carbon Steel Rebars in Simulated Concrete Pore Solution", Molecules, Dec. 10, 2022, vol. 27, p. 8776 (23 Pages).

Mulik Abaker Ibrahim and Fauzi Febrianto, "Properties of Oriented Strand Board (OSB) Made from Mixing Bamboo", published in ARPN Journal of Science and Technology, vol. 3, No. 9, Sep. 2013, pp. 937-962 (27 Pages).

Office Action (Non-Final Rejection) dated Apr. 22, 2025 for U.S. Appl. No. 18/496,864 (pp. 1-8).

Office Action (Non-Final Rejection) dated Apr. 22, 2025 for U.S. Appl. No. 18/496,896 (pp. 1-7).

Office Action (Non-Final Rejection) dated Apr. 30, 2025 for U.S. Appl. No. 18/423,274 (pp. 1-6).

Office Action (Non-Final Rejection) dated May 2, 2025 for U.S. Appl. No. 18/496,865 (pp. 1-6).

Office Action (Non-Final Rejection) dated May 6, 2025 for U.S. Appl. No. 18/423,279 (pp. 1-6).

Office Action (Non-Final Rejection) dated Dec. 10, 2024 for U.S. Appl. No. 18/482,901 (pp. 1-6).

Office Action (Non-Final Rejection) dated Dec. 11, 2024 for U.S. Appl. No. 18/492,649 (pp. 1-9).

Office Action (Non-Final Rejection) dated Dec. 12, 2024 for U.S. Appl. No. 18/492,642 (pp. 1-6).

Office Action (Notice of Allowance and Fees Due (PTOL-85)) dated Mar. 12, 2025 for U.S. Appl. No. 18/496,866 (pp. 1-7).

Office Action (Notice of Allowance and Fees Due (PTOL-85)) dated Jun. 9, 2025 for U.S. Appl. No. 18/482,901 (pp. 1-7).

Office Action (Notice of Allowance and Fees Due (PTOL-85)) dated Jun. 10, 2025 for U.S. Appl. No. 18/492,649 (pp. 1-9).

Office Action (Notice of Allowance and Fees Due (PTOL-85)) dated Aug. 12, 2025 for U.S. Appl. No. 18/492,642 (pp. 1-7).

Office Action (Notice of Allowance and Fees Due (PTOL-85)) dated Oct. 24, 2024 for U.S. Appl. No. 18/432,018 (pp. 1-10).

Office Action (Notice of Allowance and Fees Due (PTOL-85)) dated Oct. 30, 2024 for U.S. Appl. No. 18/432,014 (pp. 1-9).

Office Action (Notice of Allowance and Fees Due (PTOL-85)) dated Oct. 30, 2024 for U.S. Appl. No. 18/432,020 (pp. 1-10).

Office Action (Notice of Allowance and Fees Due (PTOL-85)) dated Nov. 14, 2024 for U.S. Appl. No. 18/432,020 (pp. 1-10).

Office Action (Notice of Allowance and Fees Due (PTOL-85)) dated Nov. 14, 2024 for U.S. Appl. No. 18/487,044 (pp. 1-7).

Office Action (Notice of Allowance and Fees Due (PTOL-85)) dated Nov. 22, 2024 for U.S. Appl. No. 18/496,866 (pp. 1-7).

Office Action (Notice of Allowance and Fees Due (PTOL-85)) dated Nov. 26, 2024 for U.S. Appl. No. 18/432,014 (pp. 1-9).

Office Action (Notice of Allowance and Fees Due (PTOL-85)) dated Nov. 29, 2024 for U.S. Appl. No. 18/432,017 (pp. 1-9).

Office Action No. 5212 dated Apr. 11, 2025 and issued in Columbian National Stage Patent Application Based on International Application No. PCT/US2022/015004, Portugese (13 Pages).

Olena Myronycheva, Maro Sehlstedt-Persson, Olov Karlsson and Dick Sandberg, "Growth of Mold and Rot Fungi on Copper-Impregnated Scots Pine Sapwood: Influence of Planing Depth and Incolulation Pattern", Bioresources.com, vol. 13, No. 4, 2018, pp. 8787-8801 (pp. 15).

Pankaj Kumar, Krister Holmberg, Isha Soni, Nasarul Islam, Manish Kumar, Pooja Shandilya, Mika Sillanpa, and Vinay Chauhan, "Advancements in ionic liquid-based corrosion inhibitors for sustainable protection strategies: from experimental to computational insights", published in Advances in Colloid and Interface Science, vol. 333 (2024), by Elsevier B. V., Sep. 17, 2024 (36 Pages).

Product Brochure for Smartply® Max FR/FR Build Flame Retardant Panel, by Medite Smartply Innovative Timber Products, Ireland UK, Nov. 20, (4 Pages).

(56) References Cited

OTHER PUBLICATIONS

Product Data Sheet for I-Bond® OSB FC 4312 MDI-Based Polymeric Resin, manufactured by Huntsman Polyurethanes, Jan. 26, 2015 (2 Pages).

Response to Office Action No. 5212 filed on Apr. 28, 2025 in Columbian National Stage Patent Application Based on International Application No. PCT/US2022/015004, Portugese (206 Pages).

Response to Second Office Action No. 16697 filed on Dec. 12, 2025 in Columbian National Stage Patent Application Based on International Application No. PCT/US2022/015004, Portuguse (196 Pages).

Richa Bansal, Harish C. Barshilia, and Krishna K. Pandey, "Nanotechnology in wood science: Innovations and applications", published in International Journal of Biological Macromolecules vol. No. 262 (2024), Feb. 2024 (25 Pages).

Rynehvee Tan, "The Use of P-MDI Resin in MDF Manufacture—A Report Submitted in Partial Fulfillment of the Requirements for the Degree of Bachelor of Science in Wood Products Processing", The Faculty of Forestry, University of British Columbia, Wood 493, Vancouver, CA, Apr. 12, 2012 (18 Pages).

Safety Data Sheet (SDS) for D-Blaze™ Fire Retardant Pressure Treated Wood using Phospho-Ammonium Boron Complex, produced by Viance Llc, Charlotte, North Carolina generated Feb. 2, 2015 (9 Pages).

Safety Data Sheet (SDS) for Wood Dust, by West Fraser, Quesnel, BC Canada, generated Apr. 20, 2016 (5 Pages).

Safety Data Sheet (SDS) Version 1.2 for Ranger MDF, by West Fraser, Blue Ridge, Alberta Canada, generated May 22, 2022 (14 Pages).

Safety Data Sheet (SDS) Version 1.2 for Westpine MDF, by West Fraser, Quesnel, British Columbia Canada, generated Jun. 1, 2022 (12 Pages).

Safety Data Sheet (SDS) Version 1.7 for Norbord OSB (including OSB Branded West Fraser), by West Fraser, Toronto, Ontario Canada, generated Apr. 11, 2021 (11 Pages).

Safety Data Sheet (SDS) Version 2.0 for Plywood, by West Fraser, Quesnel, BC Canada, generated May 22, 2022 (11 Pages).

Safety Data Sheet for Greenfire™ Pro Defense, by Fire Suppression Innovations, Placentia, California, Feb. 2024, (5 Pages).

Safety Data Sheet No. 003 Version 2 for Plywood by West Fraser, Edmonton BC, dated May 22, 2015 (11 Pages).

Sahriyanti Saad, Yusram Massijaya, and Yusuf Sudo Hadi, "Physical and Mechanical Properties of OSB Made from Bamboo", University of Hasanuddin, published by Indonesian Wood Research Society (IWORS), Bali, Indoensia 2010 (5 Pages).

Second Office Action No. 16697 filed on Apr. 28, 2025 in Columbian National Stage Patent Application Based on International Application No. PCT/US2022/015004, Portuguse (17 Pages).

Seng Hua Lee, Paridah Md Tahir, Wei Chen Lum, Li Peng Tan, Paiman Bawon, Byung-Dae Park, Syeed Saiful Azry Osman Al Edrus, and Ummi Hani Abdullah, "A Review on Citric Acid as Green Modifying Agent and Binder for Wood", Polymers 2020, vol. 12(8), 1692 (21 Pages).

Supplementary European Search Report issued in EPO Patent Application No. EP22750358.8 dated Nov. 30, 2024 (2 Pages).

T D Cahyono and Syahidah "Citric acid, an environmentally friendly adhesive and wood impregnation material-review of research", IOP Conference Series, Materials Science and Engineering, Aug. 19, 2019 (7 Pages).

T. S. McCracken, "PMDI Prepolymers For Enhanced Curing For Production Of Wood Composite Panels", COVESTRO, Pittsburgh, PA, https://www.coatingsworld.com, Coatings World, Jan. 7, 2019 (6 Pages).

Technical Data Sheet for Hexion Formaldehyde 35% with 7% Methanol, by Hexion Inc., Nov. 1, 2023 (1 Page).

The Specifiers Guide—OSB Edition—for Oriented Strand Board (OSB) by Hanson Playwood Limited, West Yorkshire, UK, 2020 (8 Pages).

USDA Forest Service Specification Titled "Long-Term Retardant, Wildland Firefighting Specification 5100-304d dated Jan. 7, 2020", US Department of Agriculture Forest Service, Jan. 7, 2020 (32 Pages).

Valentina D. Ciobanu, Octavia Zeleniuc, Adela-Eliza Dumitrascu, Badea Lepadatescu and Bogdan Iancu, "The Influence of Speed and Press Factor on Oriented Strand Board Performance in Continuous Press", Bioresources.com, vol. 9, No. 4, 2014, pp. 6805-6816 (pp. 12).

Webpage Overview on "A Chipboard Production—Forming Line", manufactured/configured by Hochsmann using Dieffenbacher wood technology equipment, published at https://wtp.hoechsmann.com/en/lexikon/41143/chipboard_production_f Captured on Mar. 8, 2025, Hochsmann GmbH, Klipphausen, Germany (5 Pages).

Webpages by Hexion Inc. describing Binding Resins for Oriented Strand Board (OSB), Hexion Inc, captured at www.hexion.com on Nov. 10, 2024 (9 Pages).

Webpages Describing "Binding Resins for Oriented Strand Board (OSB)—Fine-Tuned Resin Formulations for OSB Mills" published by Hexion, Inc. at https://www.hexion.com/our-products/products-by-application/adhesives/wood-adhesives/oriented-strand-board captured on Dec. 13, 2024, Columbus, Ohio, USA (7 Pages).

Website Pages Describing Production of "3-Ply Vertically Pressed Bamboo Panels", published at https://www.mesunbamboo.com/about-us/production/ by Mesun Bamboo, Zhejiang, China, Captured on Dec. 13, 2025 (10 Pages).

West Fraser Bulletin titled "OSB Information Sheet for Residential Floor, Wall & Roof Applications", West Fraser, Toronto, Ontario, Canada , Aug. 4, 2023 (3 Pages).

White Paper # 115/Bulletin titled "Engineered Wood:Stay Ahead of the Curve in Production Efficiency, Compliance and Profit" by Spraying Systems Co., Wheaton, Illinois, www.spray.com/panelspraybulletin, 2015 (6 Pages).

Wikipedia Article on Phenol, captured at https://en.wikipedia.org/wiki/Phenol, on Nov. 10, 2024, (6 Pages).

Wikipedia Article on Phenolic Acid, captured at https://en.wikipedia.org/wiki/Phenolic_acid, on Nov. 10, 2024, (2 Pages).

Wikipedia Article on Polyvinyl Acetate, captured at https://en.wikipedia.org/wiki/Polyvinyl_acetate, on Nov. 10, 2024, (5 Pages).

Yasuharu Nakayama, "Polymer blend systems for water-borne paints", Kansai Paint Company Ltd., 4-17-1 Higashi-yawata, Hiratsuka, Kanagawa, Japan, Progress in Organic Coatings vol. 33 (1998) pp. 108-116, Elsevier Publishers (9 Pages).

Zhu, X.; Ali, R.N.; Song, M.; Tang, Y.; Fan, Z. Recent Advances in Polymers for Potassium Ion Batteries. Polymers 2022, 14, 5538 (26 Pages).

* cited by examiner

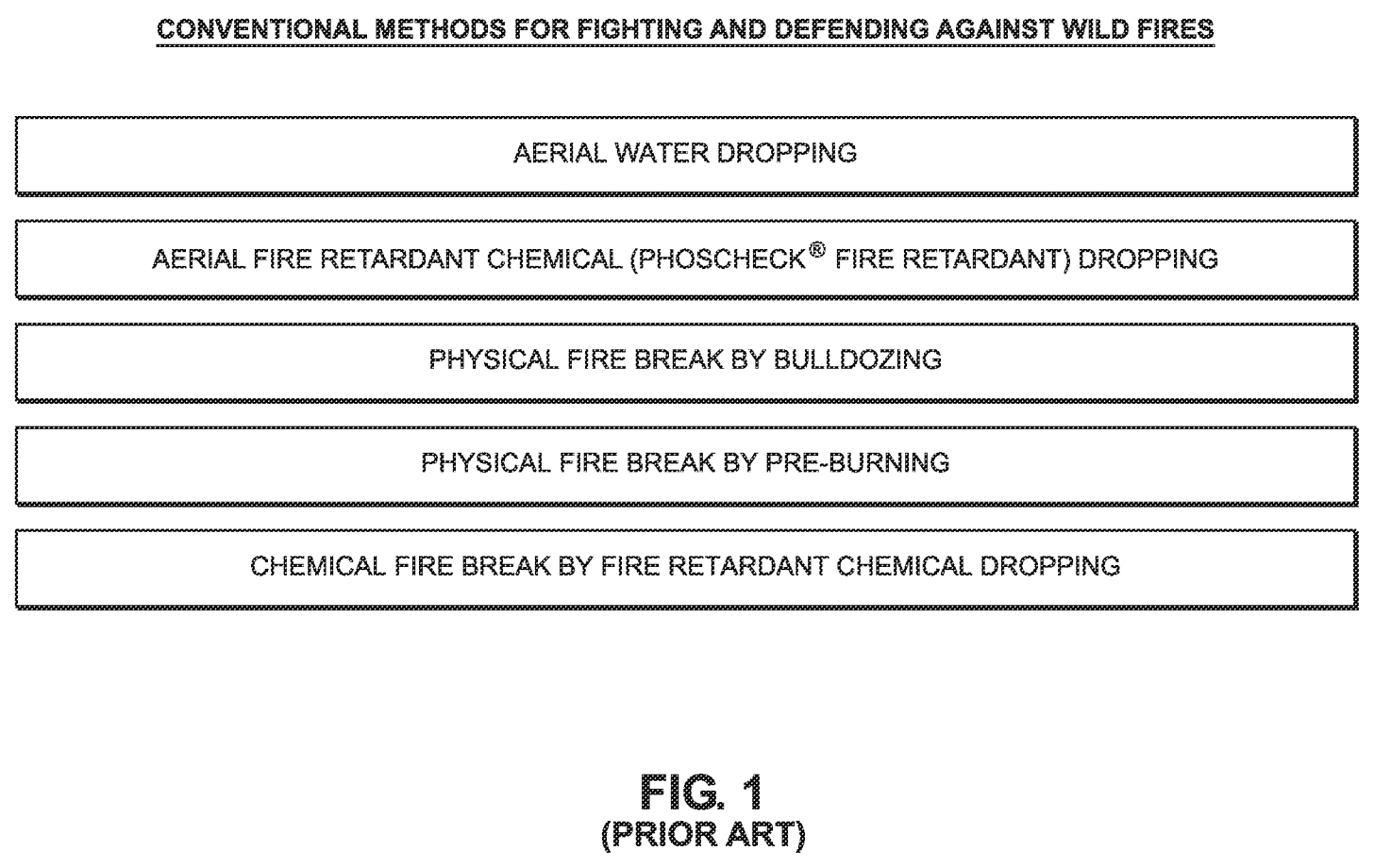

CONVENTIONAL METHODS FOR FIGHTING AND DEFENDING AGAINST WILD FIRES

AERIAL WATER DROPPING

AERIAL FIRE RETARDANT CHEMICAL (PHOSCHECK® FIRE RETARDANT) DROPPING

PHYSICAL FIRE BREAK BY BULLDOZING

PHYSICAL FIRE BREAK BY PRE-BURNING

CHEMICAL FIRE BREAK BY FIRE RETARDANT CHEMICAL DROPPING

FIG. 1
(PRIOR ART)

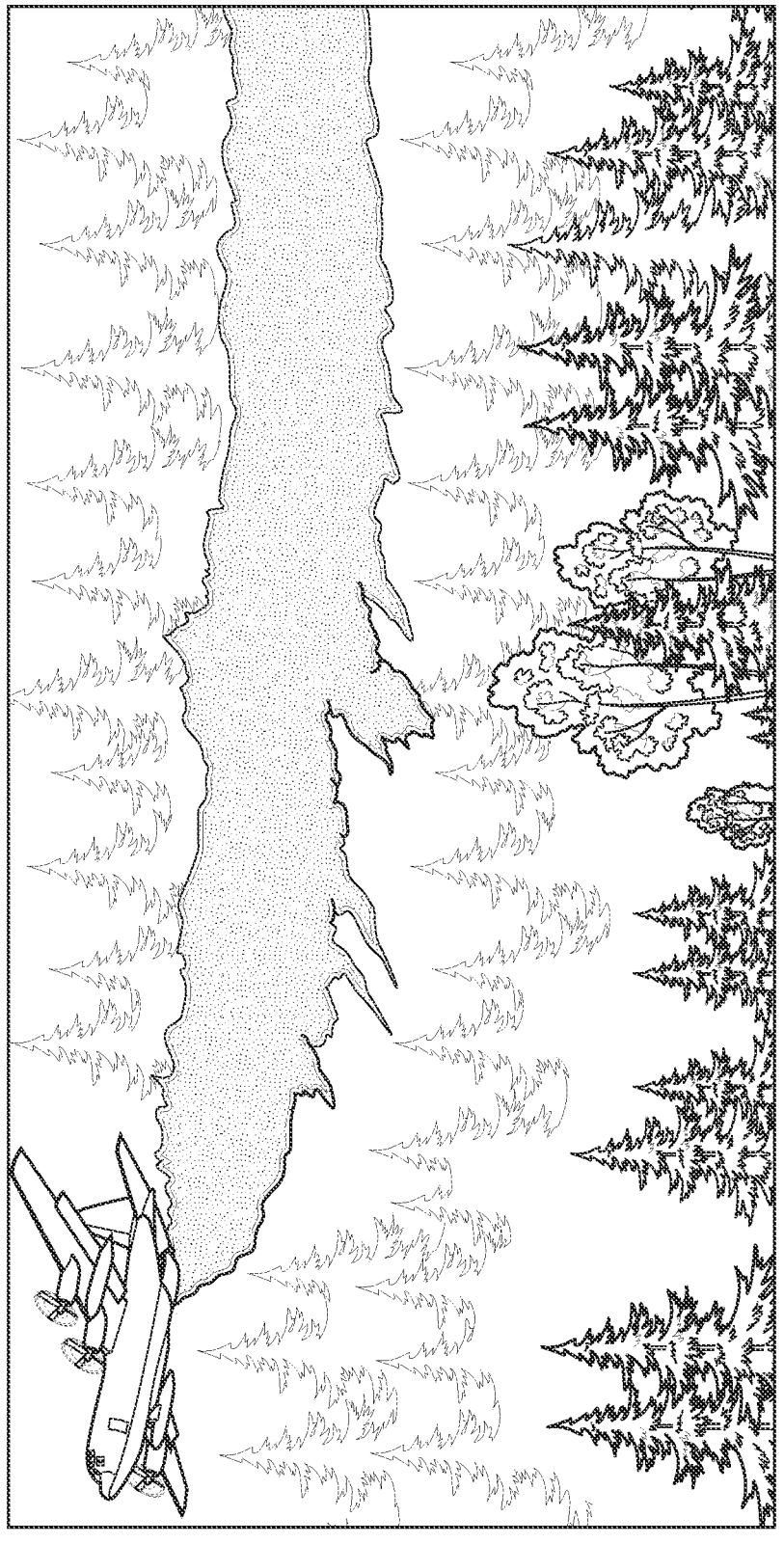
FIG. 2B1
(PRIOR ART)

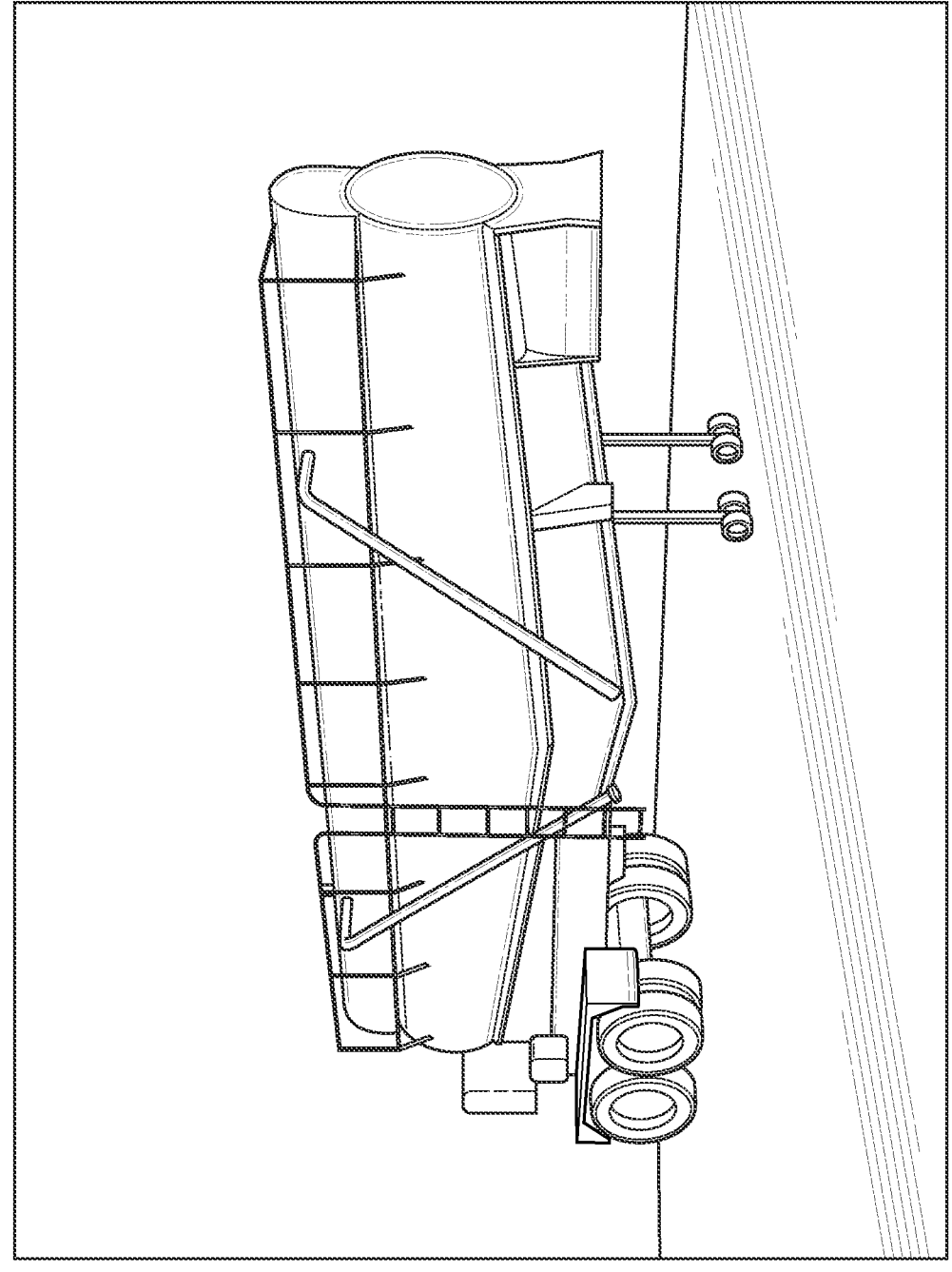
FIG. 2B2
(PRIOR ART)

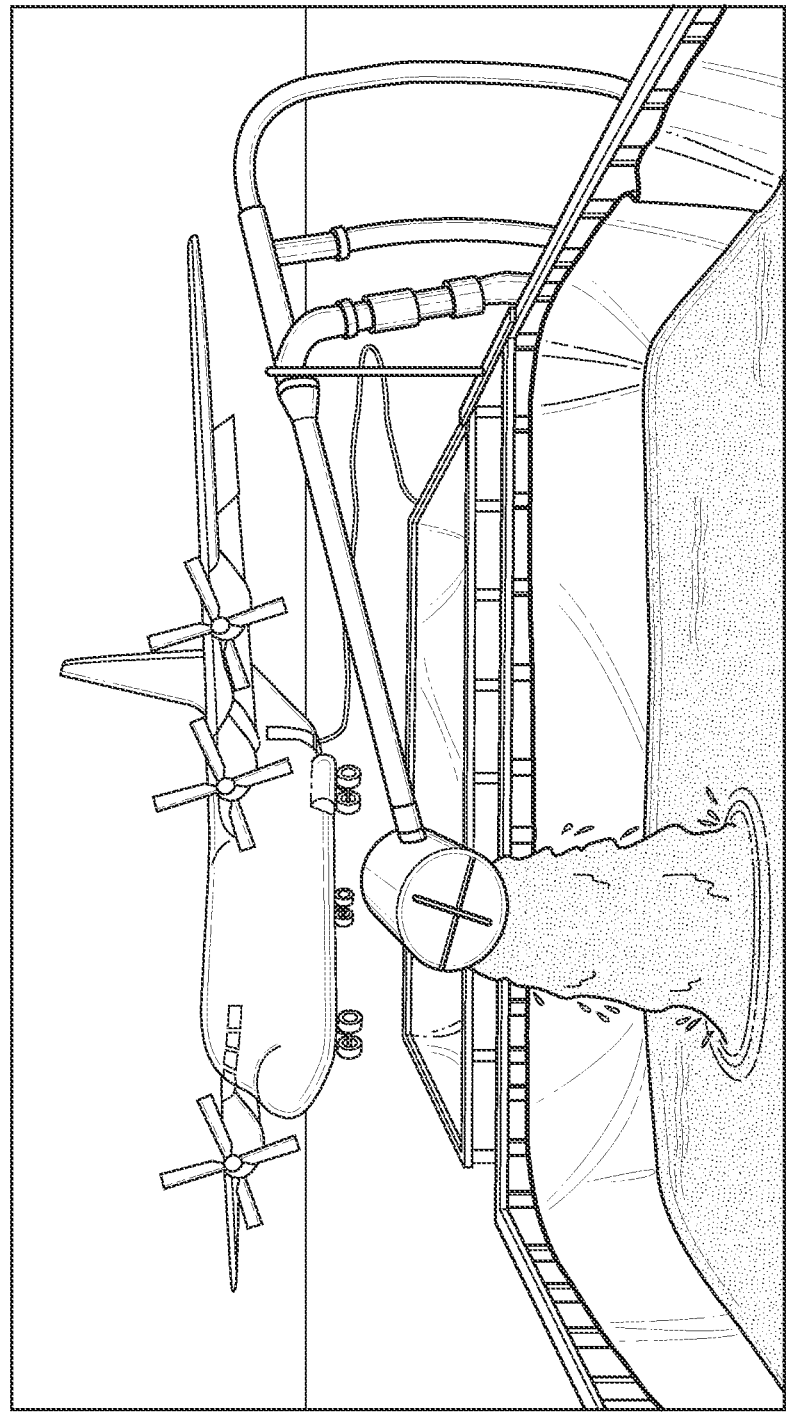
FIG. 2B3
(PRIOR ART)

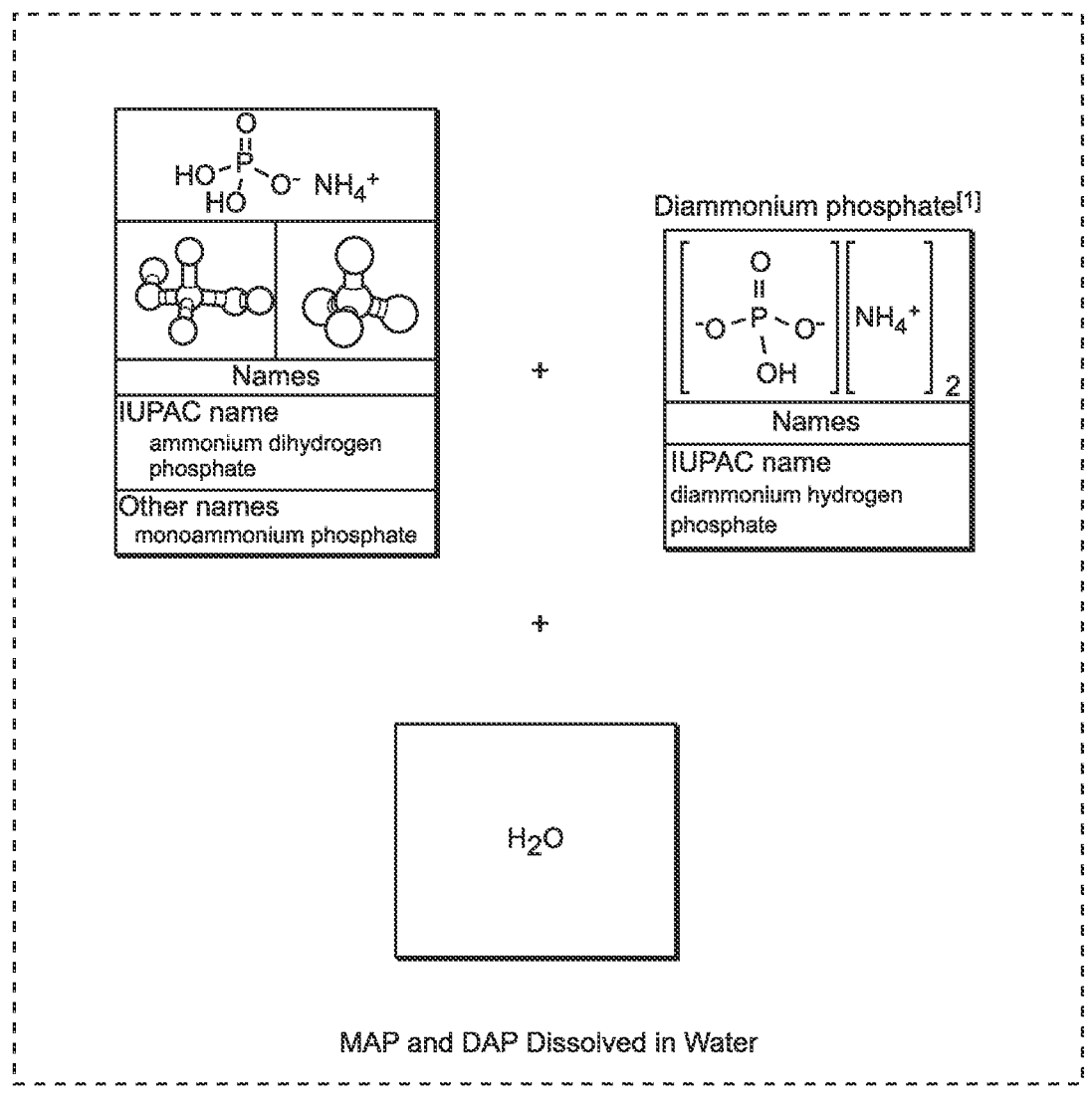
(PRIOR ART)
FIG. 2B4
(PRIOR ART)

(PRIOR ART)

14C

14C1

MOBILE COMPUTING DEVICES DEPLOYED ON THE SYSTEM NETWORK OF THE PRESENT INVENTION

CAL FIRE™ APP 15

12
Anti-Fire
Spray
Management
App

11

TCP/IP
WWW

10

GENERAL SYSTEM ARCHITECTURE
OF MOBILE CLIENT SYSTEM

WILDFIRE INHIBITOR BIOCHEMICAL COMPOSITION KIT FOR USE IN
PROACTIVELY FIRE-PROTECTING COMBUSTABLE SURFACES
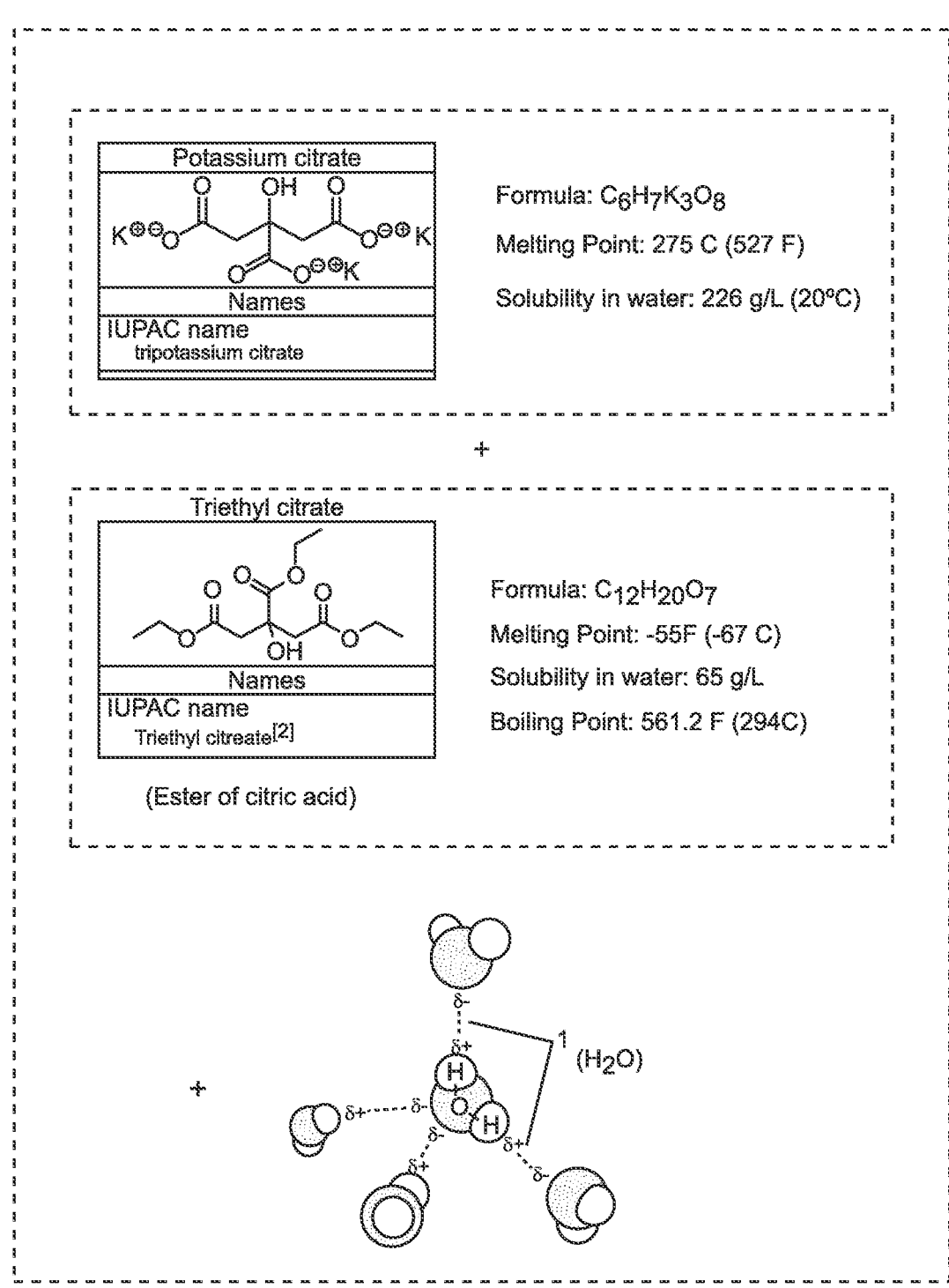
FIG. 6A1

WILDFIRE INHIBITOR BIOCHEMICAL COMPOSITION KIT FOR USE IN
PROACTIVELY FIRE-PROTECTING COMBUSTABLE SURFACES
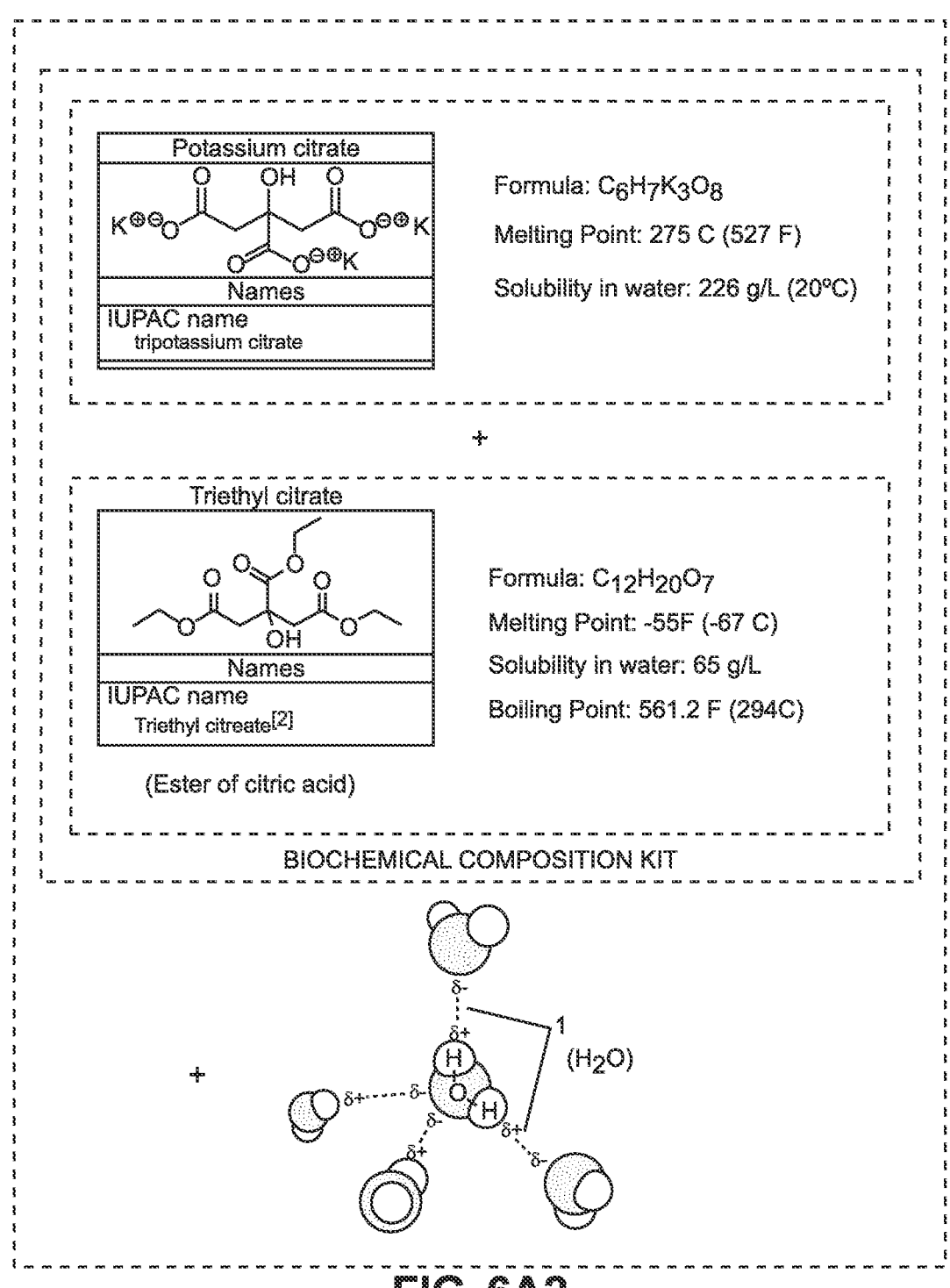
FIG. 6A2

WILDFIRE INHIBITOR BIOCHEMICAL COMPOSITION FOR PROACTIVELY
PROTECTING WOOD PRODUCTS
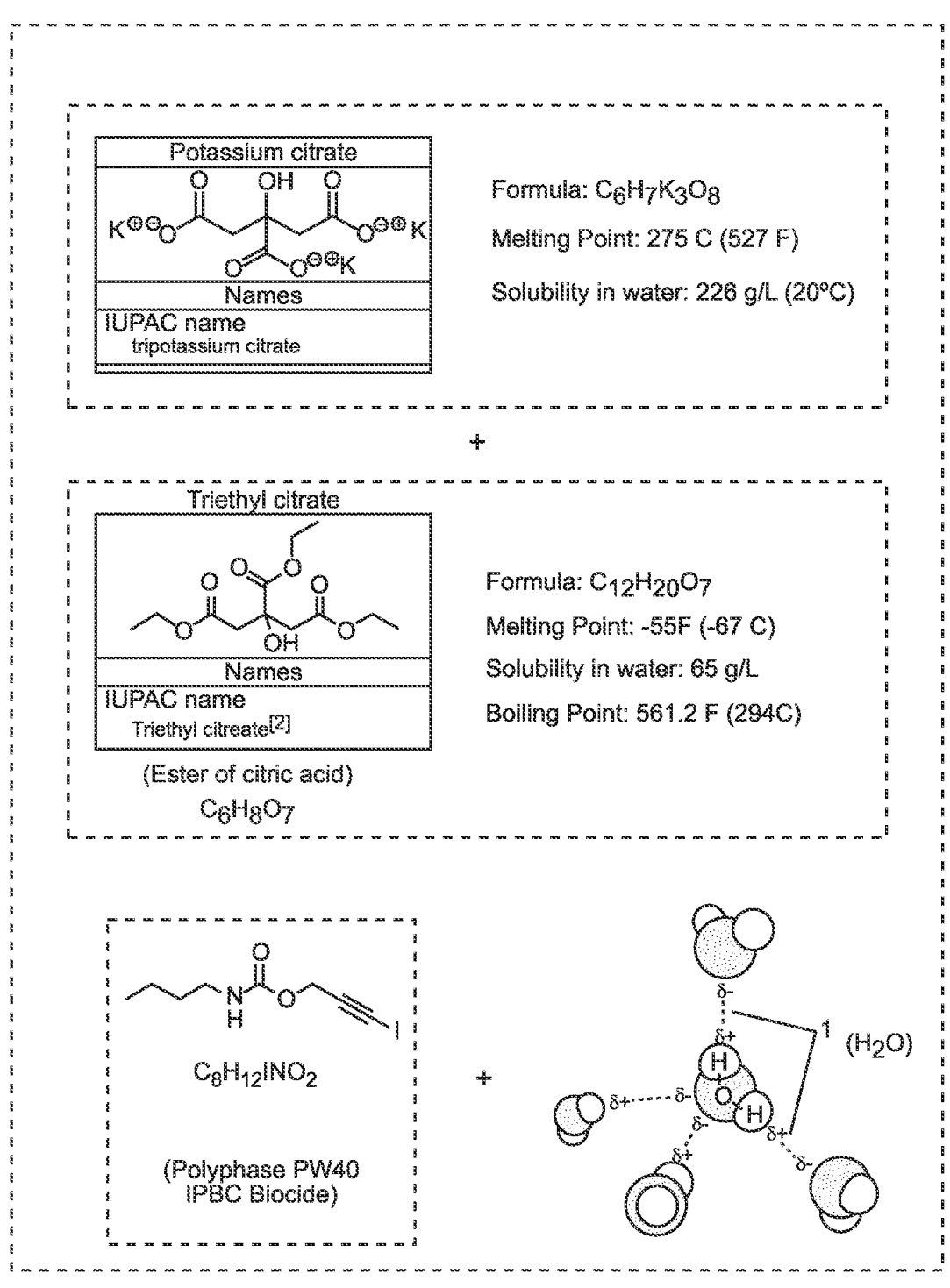
FIG. 6B1

FIRE INHIBITOR BIOCHEMICAL COMPOSITION KIT FOR PROACTIVELY
PROTECTING WOOD PRODUCTS
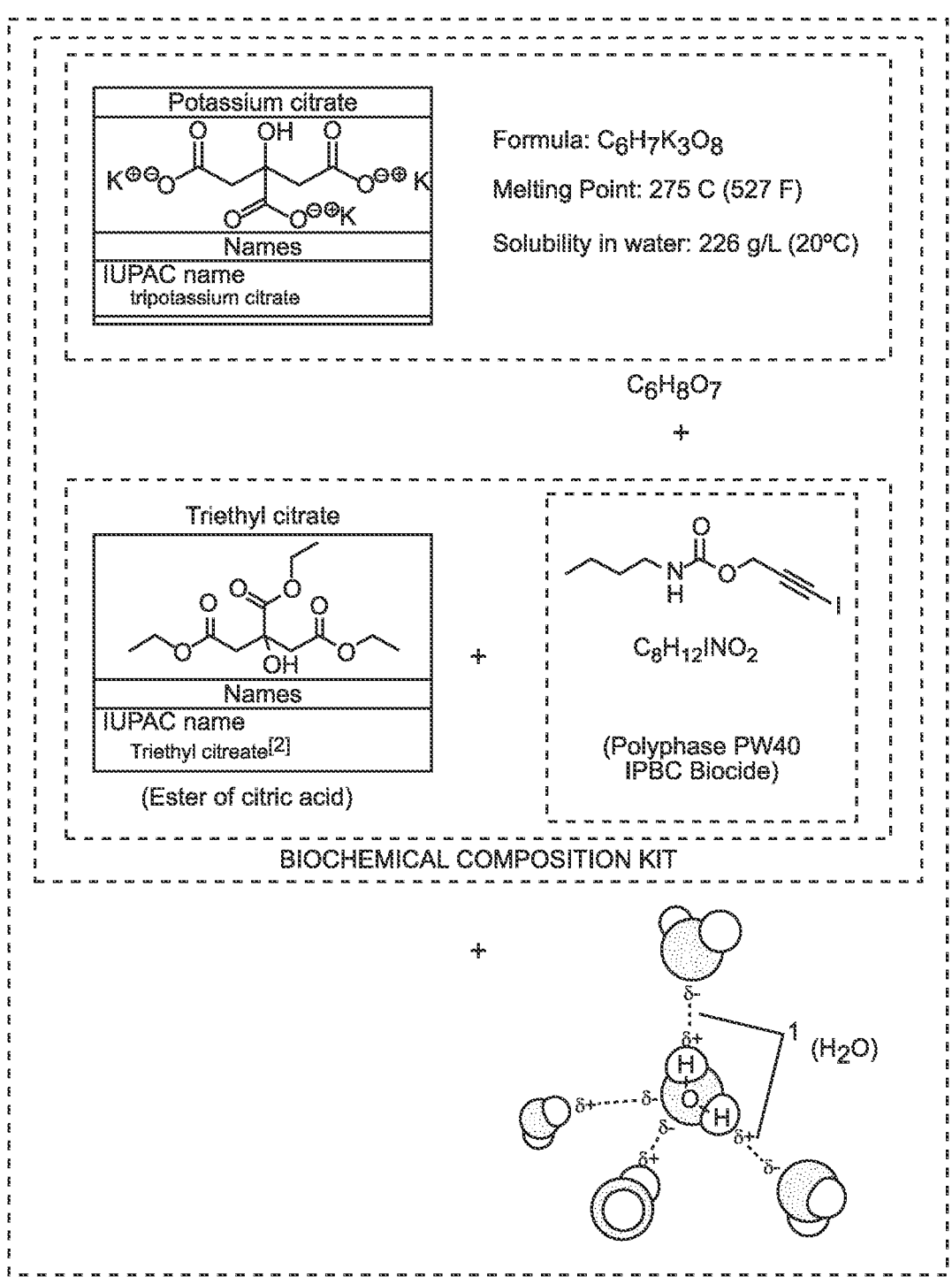
FIG. 6B2

FIRE INHIBITOR BIOCHEMICAL COMPOSITION FOR PROACTIVELY
PROTECTING WOOD PRODUCTS
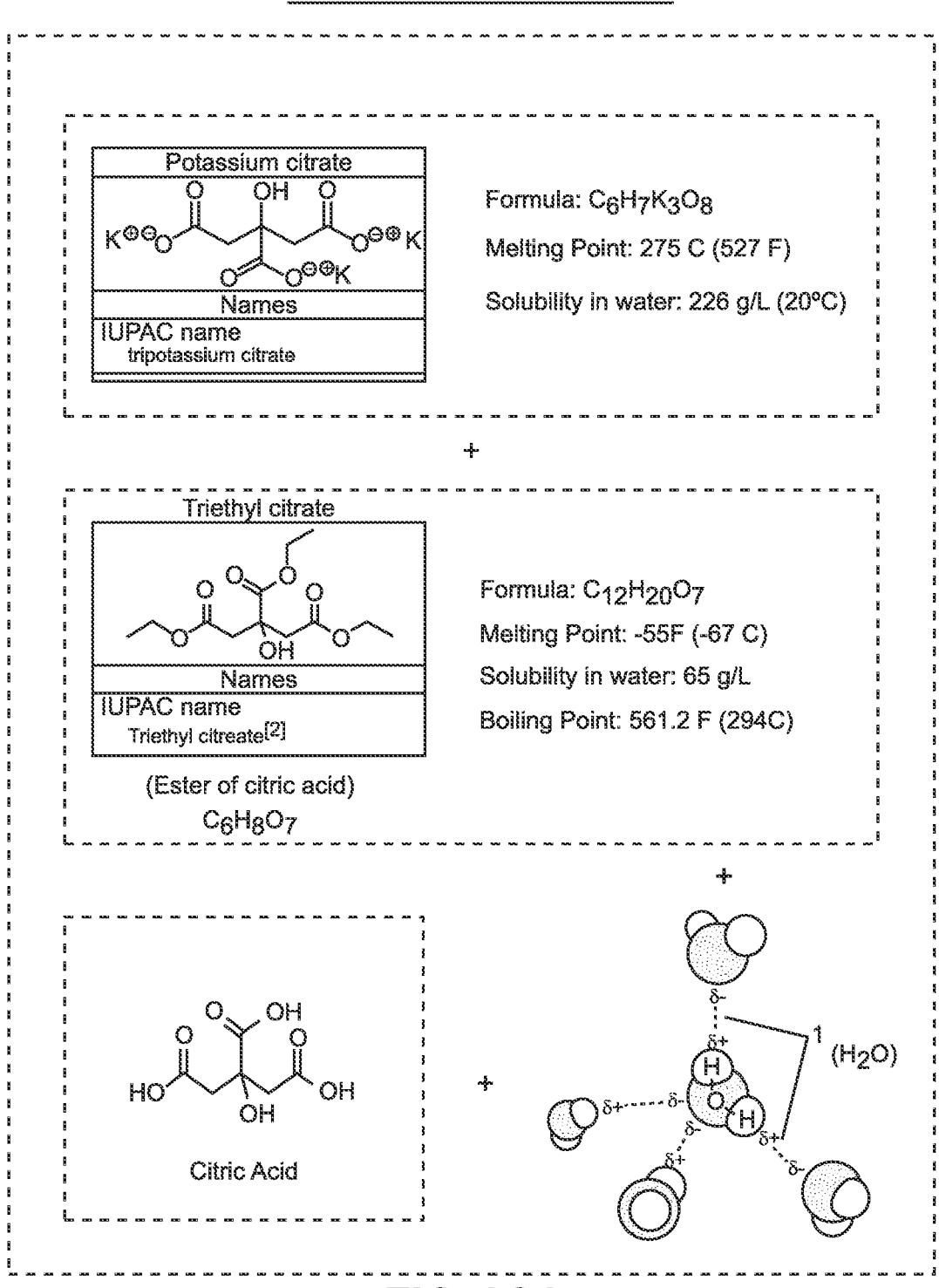
FIG. 6C1

FIRE INHIBITOR BIOCHEMICAL COMPOSITION KIT FOR PROACTIVELY
PROTECTING WOOD PRODUCTS
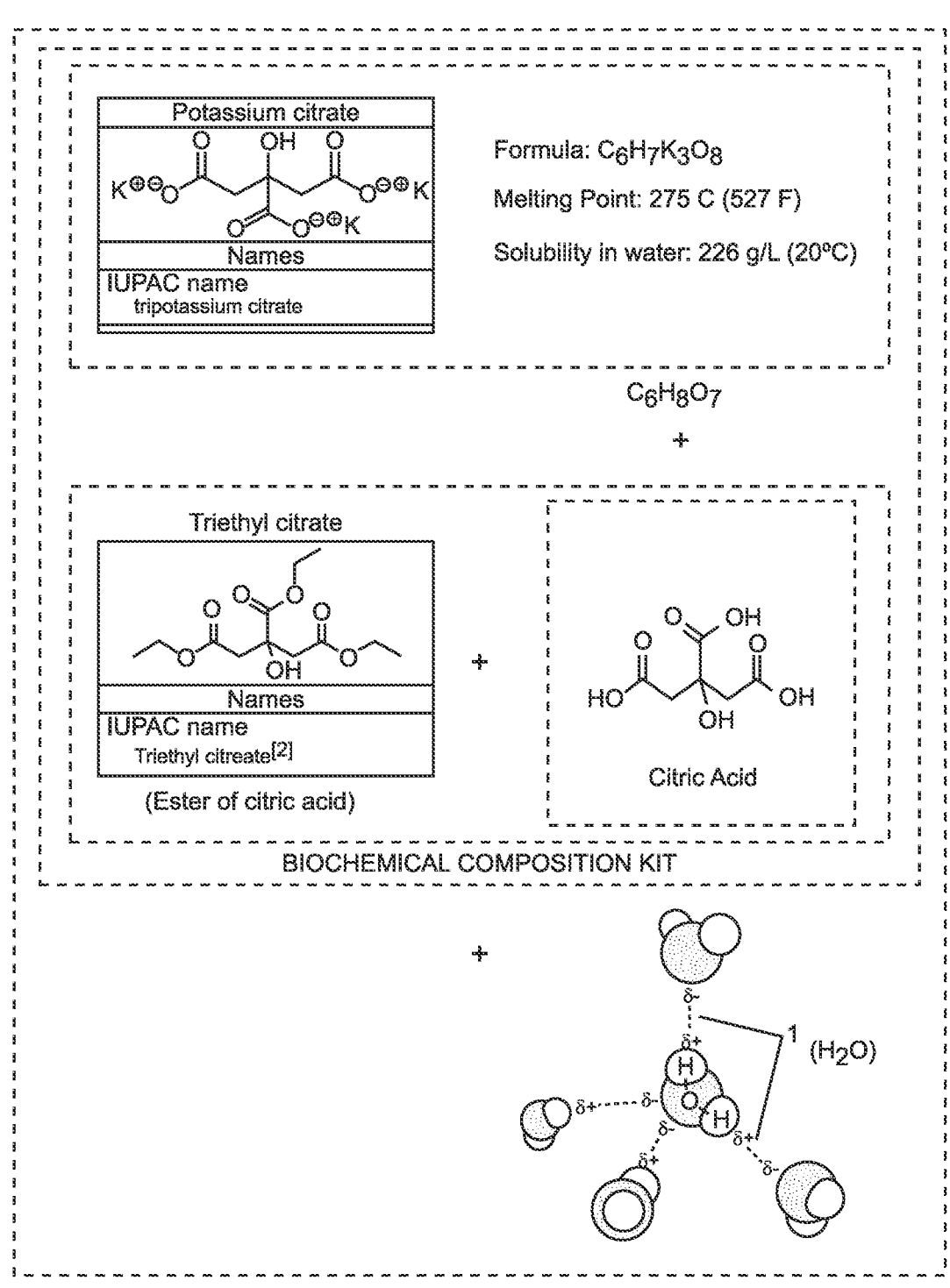
FIG. 6C2

The asymmetric unit of the title compound, showing the atom numbering. Atoms are represented by 50% probability spheroids.

The crystal structure of $K_3C_6H_5O_7$, view down the c axis, with coordination spheres of the potassium cations in polyhedral representation.

GPS-TRACKED MOBILE ANTI-FIRE (AF) CHEMICAL LIQUID SPRAY SYSTEM

Remote Mobile Computing System

11

Wireless BT Link (20H3)

20C

20D

20E

20A2

20A1

20B

20

GPS-TRACKED MOBILE ANTI-FIRE (AF) CHEMICAL LIQUID SPRAY SYSTEM

GPS-TRACKED MANNED OR AUTONOMOUS VEHICLE FOR SPRAYING ANTI-FIRE (AF) CHEMICAL LIQUID ON GROUND SURFACES TO CREATE FIRE BREAK REGIONS IN HIGH RISK AREAS

GPS-TRACKED MANNED OR AUTONOMOUS VEHICLE FOR SPRAYING ANTI-FIRE (AF) CHEMICAL LIQUID ON GROUND SURFACES TO CREATE FIRE BREAK REGIONS ON HIGH RISK AREAS

Figure 10B:
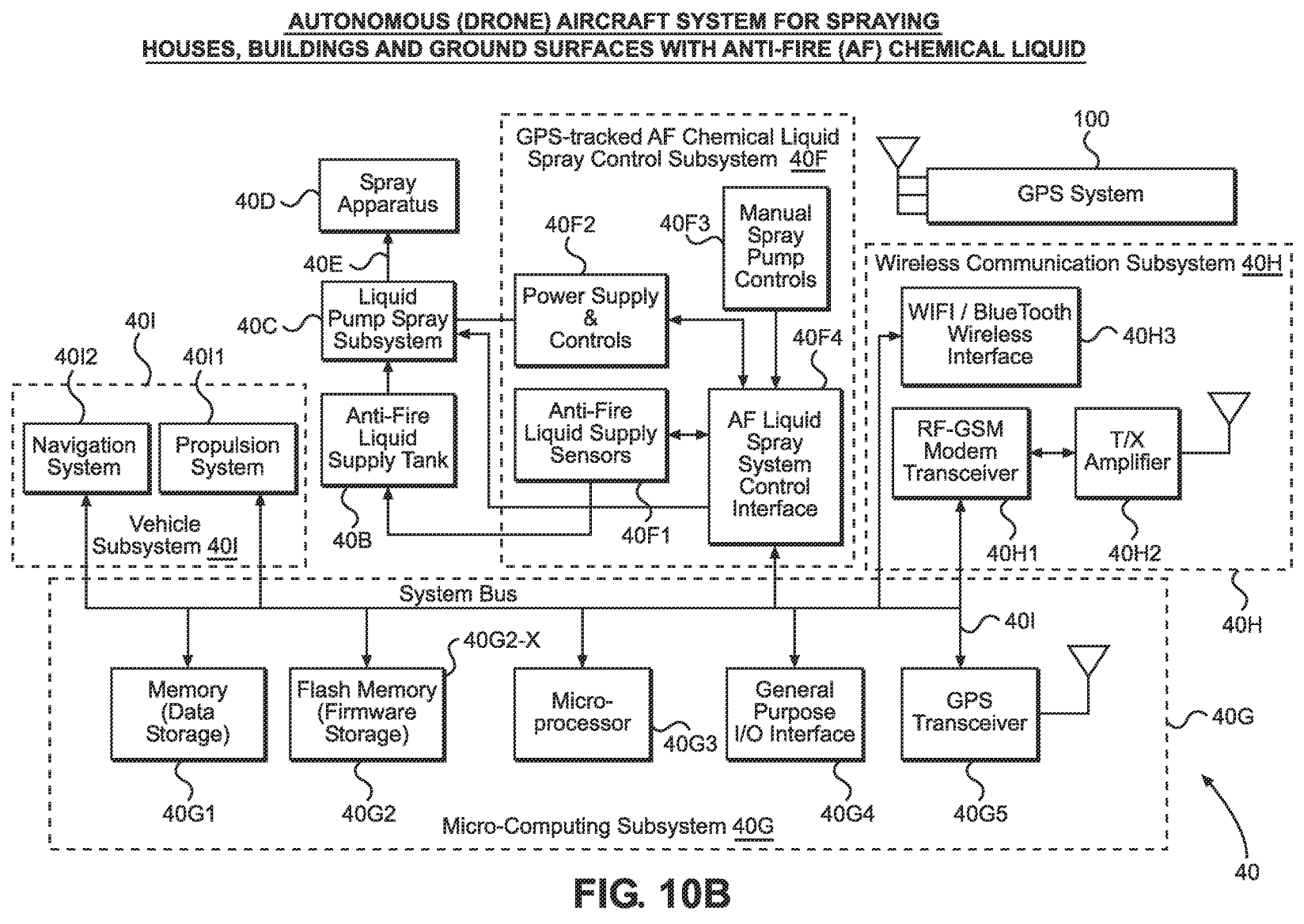

AUTONOMOUS (DRONE) AIRCRAFT SYSTEM FOR SPRAYING
HOUSES, BUILDINGS AND GROUND SURFACES WITH ANTI-FIRE (AF) CHEMICAL LIQUID

GPS System — 100

Wireless Communication Subsystem 40H

WIFI / BlueTooth Wireless Interface — 40H3

T/X Amplifier — 40H2

RF-GSM Modem Transceiver — 40H1

40H

GPS-tracked AF Chemical Liquid Spray Control Subsystem 40F

Manual Spray Pump Controls — 40F3

AF Liquid Spray System Control Interface — 40F4

Power Supply & Controls — 40F2

Anti-Fire Liquid Supply Sensors — 40F1

40I

GPS Transceiver — 40G5

General Purpose I/O Interface — 40G4

Micro-processor — 40G3

Micro-Computing Subsystem 40G

Spray Apparatus — 40D

Liquid Pump Spray Subsystem — 40C

Anti-Fire Liquid Supply Tank — 40B

40E

System Bus — 40G2-X

Flash Memory (Firmware Storage) — 40G2

Memory (Data Storage) — 40G1

Propulsion System — 40I1

Navigation System — 40I2

Vehicle Subsystem 40I

Figure 11B:
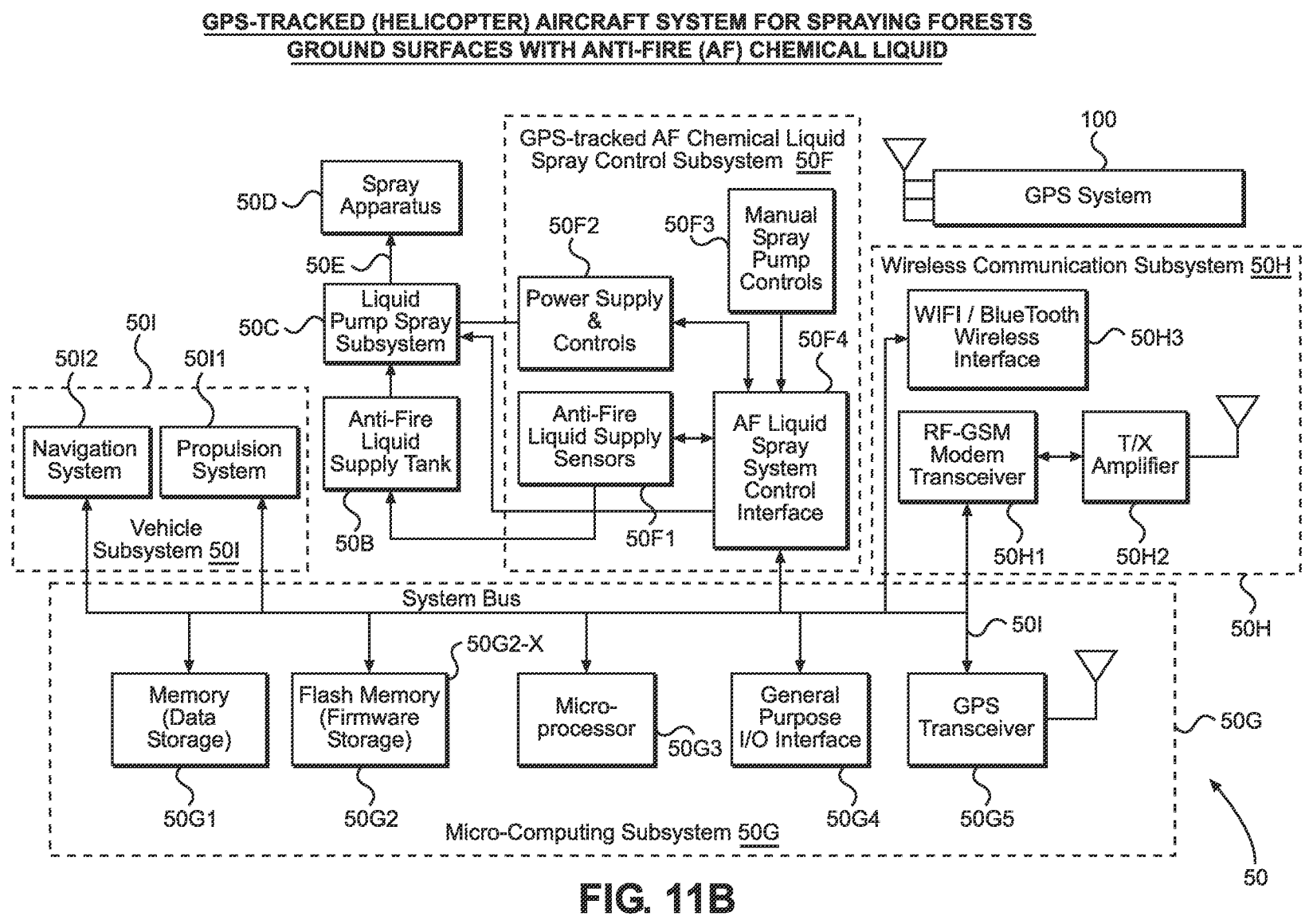

GPS-TRACKED (HELICOPTER) AIRCRAFT SYSTEM FOR SPRAYING FORESTS
GROUND SURFACES WITH ANTI-FIRE (AF) CHEMICAL LIQUID

GPS System 100

Wireless Communication Subsystem 50H

WIFI / BlueTooth Wireless Interface 50H3

T/X Amplifier 50H2

RF-GSM Modem Transceiver 50H1

50H

50I

GPS Transceiver 50G5

GPS-tracked AF Chemical Liquid Spray Control Subsystem 50F

Manual Spray Pump Controls 50F4

50F3

AF Liquid Spray System Control Interface 50F1

Power Supply & Controls 50F2

Anti-Fire Liquid Supply Sensors

General Purpose I/O Interface 50G4

Micro-processor 50G3

Micro-Computing Subsystem 50G

System Bus 50G2-X

Spray Apparatus 50D

Liquid Pump Spray Subsystem 50C

Anti-Fire Liquid Supply Tank 50B

50E

Flash Memory (Firmware Storage) 50G2

Propulsion System 50I1

Navigation System 50I2

Vehicle Subsystem 50I

50I

Memory (Data Storage) 50G1

GPS-TRACKED ALL TERRAIN VEHICLE (ATV) SYSTEM FOR SPRAYING
GROUND SURFACES WITH ANTI-FIRE (AF) CHEMICAL LIQUID

GPS-TRACKED ALL TERRAIN VEHICLE (ATV) SYSTEM FOR SPRAYING
GROUND SURFACES WITH ANTI-FIRE (AF) CHEMICAL LIQUID

FIG. 12B

GPS-TRACKING BACKPACK-MOUNTED ATOMOZING SPRAY CANNONS

GPS-TRACKING BACKPACK-MOUNTED ATOMOZING SPRAY CANNONS

GPS-TRACKED BACKPACK-MOUNTED ATOMIZING SPRAY CANNONS FOR SPRAYING
GROUND SURFACES WITH ANTI-FIRE (AF) CHEMICAL LIQUID

FIG. 13C

ATOMIZING LIQUID SPRAY MICRODROPLETS ENTRAINED IN A FORCEFUL AIR
STREAM PROJECTED OUT OF THE TURBINE-FAN DRIVEN CANNON STRUCTURE

GPS-TRACKED ATOMIZING SPRAY CANNON SYSTEM FOR SPRAYING
GROUND SURFACES WITH LIQUID ANTI-FIRE (AF) CHEMICAL LIQUID

FIG. 14D

ELECTRIC TURBINE FAN DRIVEN CANNON SPRAYING SYSTEM

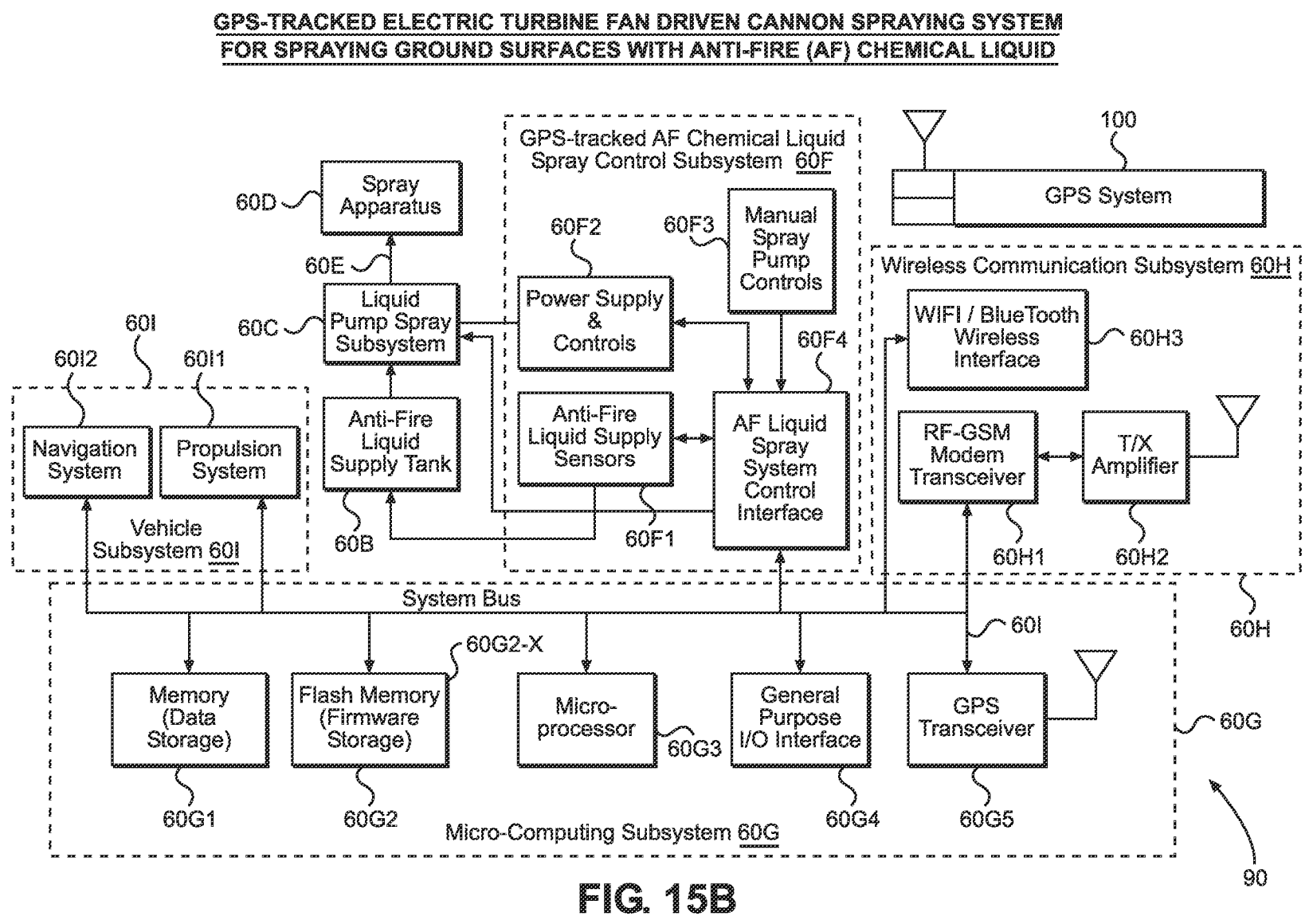

GPS-TRACKED ELECTRIC TURBINE FAN DRIVEN CANNON SPRAYING SYSTEM
FOR SPRAYING GROUND SURFACES WITH ANTI-FIRE (AF) CHEMICAL LIQUID

FIG. 15B

PORTABLE FIRE EXTINGUISHER FOR PRODUCING CLEAN-CHEMISTRY FREE-RADICAL CHEMICAL-REACTION INTERRUPTING MISTING CLOUD FOR FIRE SUPPRESSION

Clean-Chemistry
Free-Radical
Chemical-Reaction
Interrupting Mist Cloud
For Suppressing
Fire Combustion
and Smoke Development GPS-TRACKED PORTABLE FIRE EXTINGUISHING SYSTEM FOR SPRAYING
GROUND SURFACES WITH ANTI-FIRE (AF) CHEMICAL LIQUID

FIG. 16B

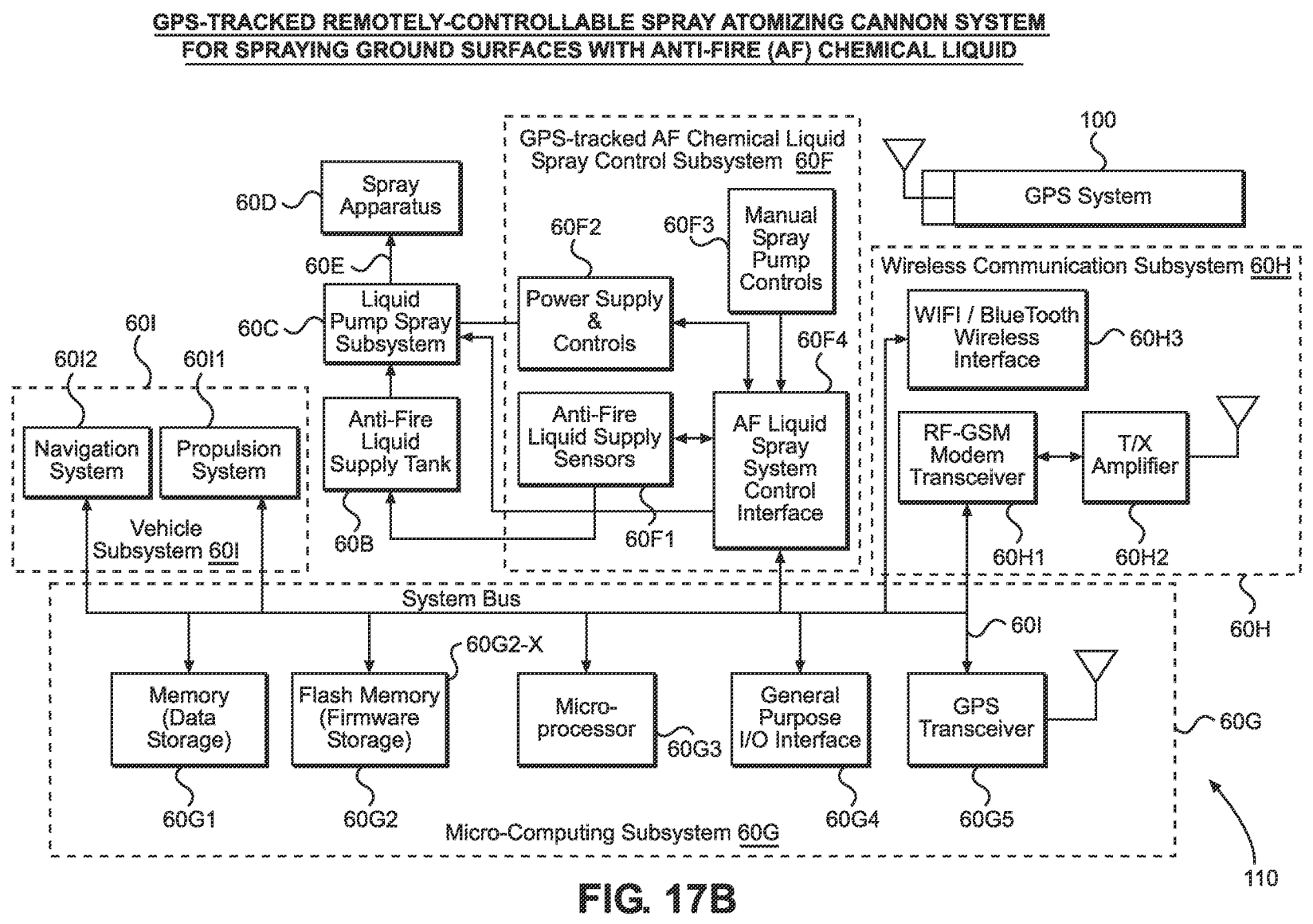

GPS-TRACKED REMOTELY-CONTROLLABLE SPRAY ATOMIZING CANNON SYSTEM
FOR SPRAYING GROUND SURFACES WITH ANTI-FIRE (AF) CHEMICAL LIQUID

GPS System    100

Wireless Communication Subsystem 60H    60H

WiFi / BlueTooth Wireless Interface    60H3

T/X Amplifier    60H2

RF-GSM Modem Transceiver    60H1

GPS Transceiver    60G5    60I

GPS-tracked AF Chemical Liquid Spray Control Subsystem 60F

Manual Spray Pump Controls    60F4    60F3

AF Liquid Spray System Control Interface    60F1

Power Supply & Controls    60F2

Anti-Fire Liquid Supply Sensors

General Purpose I/O Interface    60G4

Micro-processor    60G3

Spray Apparatus    60D

Liquid Pump Spray Subsystem    60E    60C

Anti-Fire Liquid Supply Tank    60B

System Bus    60G2-X

Flash Memory (Firmware Storage)    60G2

Propulsion System    60I1

Vehicle Subsystem 60I    60I

Navigation System    60I2

Memory (Data Storage)    60G1

Micro-Computing Subsystem 60G    110

FIG. 17B

SCHEMA FOR NETWORK DATABASE SUPPORTED BY SYSTEM NETWORK OF THE PRESENT INVENTION

GRAPHICAL USER INTERFACE SUPPORTED BY MOBILE APPLICATION FOR USE BY
REGISTERED USERS (E.G. PROPERTY PARCEL OWNERS, CONTRACTORS

GRAPHICAL INTERFACE SUPPORTED BY THE MOBILE APPLICATION SHOWING A
USER UPDATING THE REGISTRATION PROFILE AS A TASK ON THE SYSTEM NETWORK

GRAPHICAL USER INTERFACE OF THE MOBILE APPLICATION SHOWING A USER
RECEIVING A MESSAGE REQUEST FROM THE COMMAND CENTER

GRAPHICAL USER INTERFACE SUPPORTED BY THE MOBILE APPLICATION SHOWING
A USER RECEIVING A REQUEST / NOTICE OF ORDER TO WILD-FIRE SPRAY-PROTECT

11

Figure 19D:
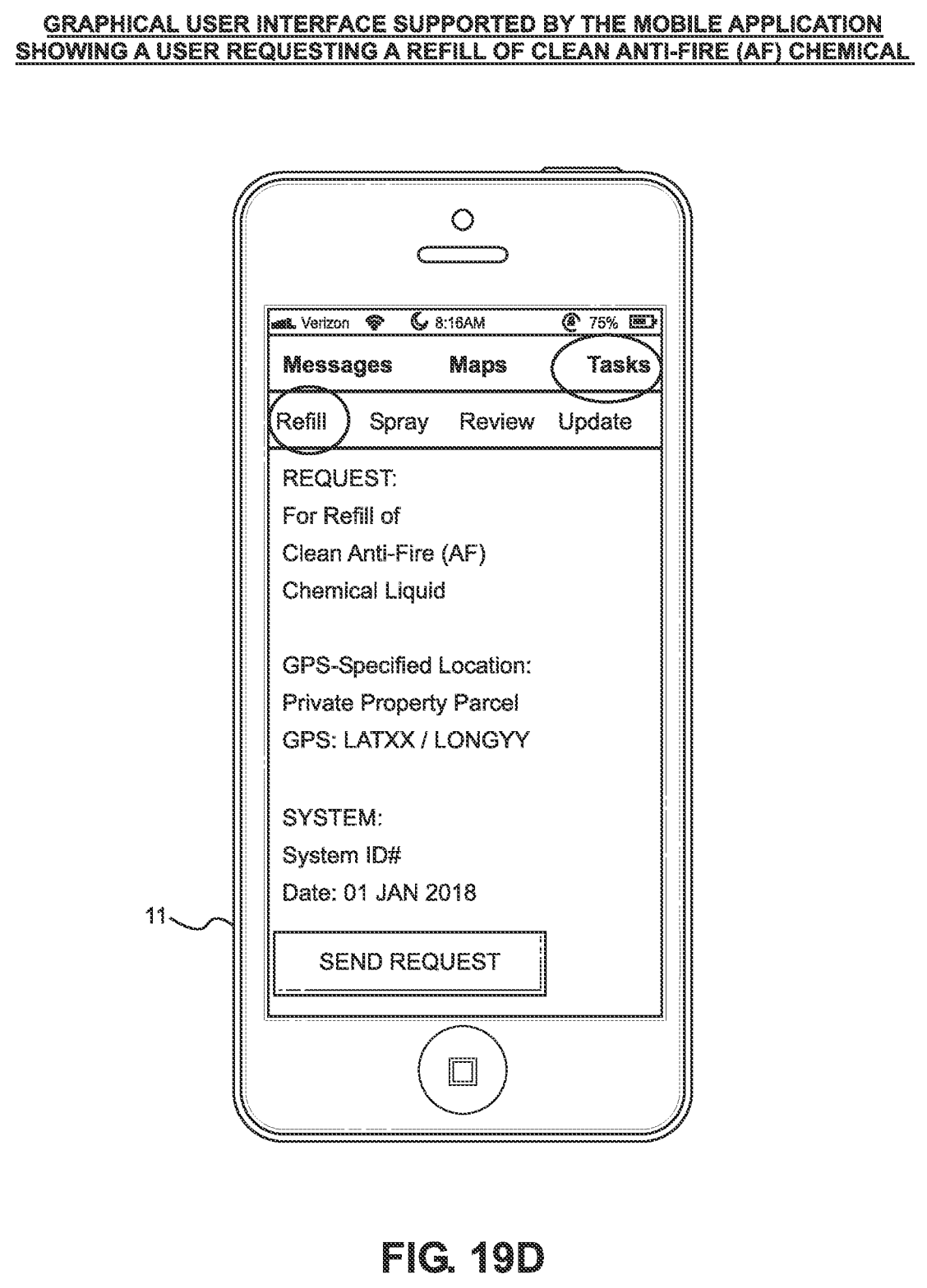

GRAPHICAL USER INTERFACE SUPPORTED BY THE MOBILE APPLICATION
SHOWING A USER REQUESTING A REFILL OF CLEAN ANTI-FIRE (AF) CHEMICAL

Verizon    8:16AM    75%

Messages    Maps    Tasks

Refill    Spray    Review    Update

REQUEST:

For Refill of

Clean Anti-Fire (AF)

Chemical Liquid

GPS-Specified Location:

Private Property Parcel

GPS: LATXX / LONGYY

SYSTEM:

System ID#

Date: 01 JAN 2018

SEND REQUEST

GRAPHICAL USER INTERFACE SUPPORTED BY MOBILE APPLICATION FOR USE
BY COMMAND CENTER ADMINISTRATORS

Figure 20A:
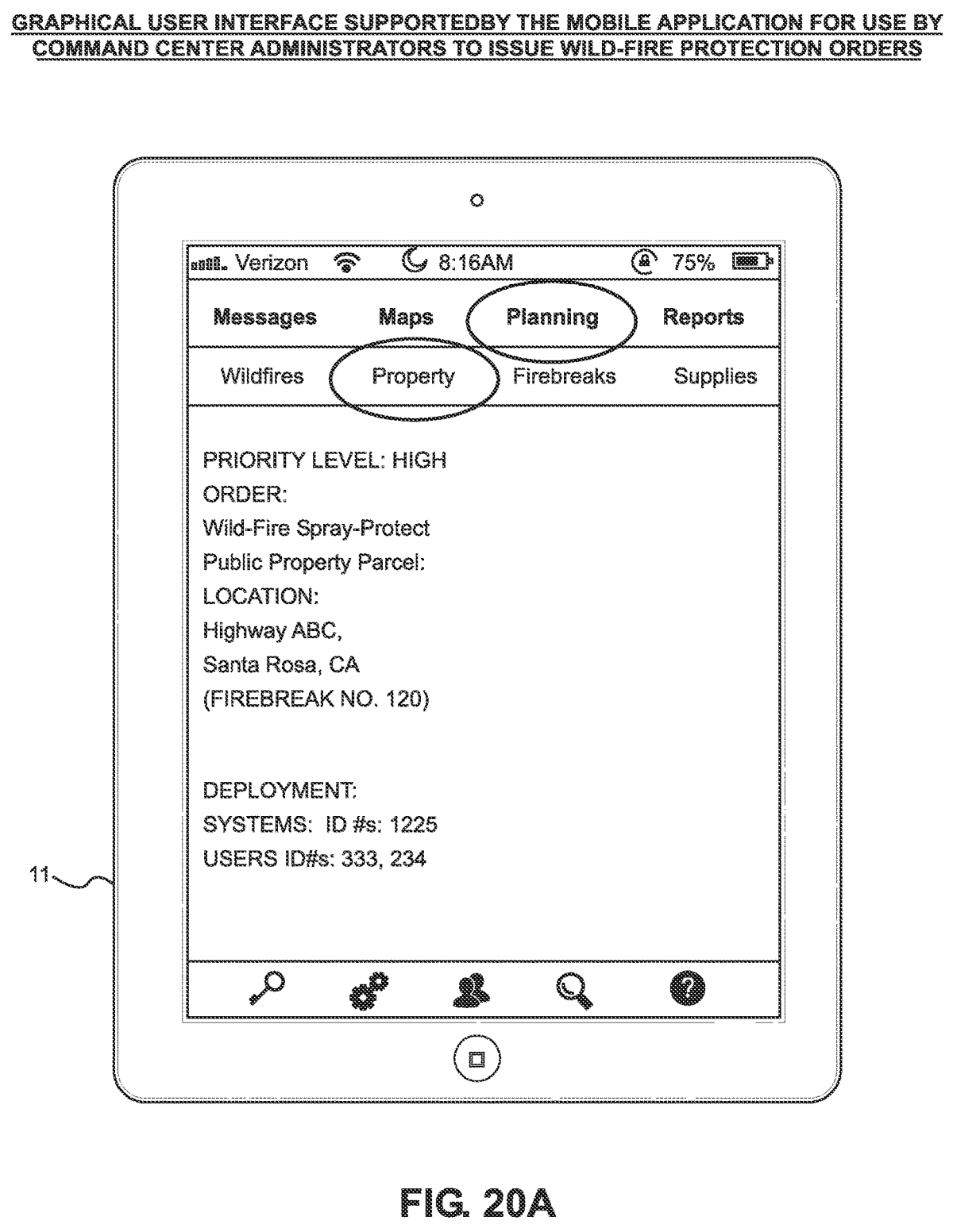

GRAPHICAL USER INTERFACE SUPPORTEDBY THE MOBILE APPLICATION FOR USE BY
COMMAND CENTER ADMINISTRATORS TO ISSUE WILD-FIRE PROTECTION ORDERS aull. Verizon  🛜  ☾ 8:16AM        🔒 75% 🔋

Messages      Maps      Planning      Reports

Wildfires      Property      Firebreaks      Supplies

PRIORITY LEVEL: HIGH
ORDER:
Wild-Fire Spray-Protect
Public Property Parcel:
LOCATION:
Highway ABC,
Santa Rosa, CA
(FIREBREAK NO. 120)

DEPLOYMENT:
SYSTEMS:  ID #s: 1225
USERS ID#s: 333, 234

GRAPHICAL USER INTERFACE SUPPORTED BY MOBILE APPLICATION FOR USE BY COMMAND
CENTER ADMINISTRATORS TO ISSUE WILD-FIRE PROTECTION ORDERS

GRAPHICAL USER INTERFACE SUPPORTED BY MOBILE APPLICATION FOR USE BY
COMMAND CENTER ADMINISTRATORS

| Messages | Maps | Planning | Reports |
| --- | --- | --- | --- |
| Wildfires | Property | Firebreaks | Supplies |

ORDER:

Wild-Fire Spray-Protect

Public Property Parcel:

LOCATION:

Highway ABC,

Santa Rosa, CA (FIREBREAK NO. 120)

PRIORITY LEVEL: HIGH

DEPLOYMENT:

SYSTEMS: ID #s: 1225

USER ID#s: 333, 234

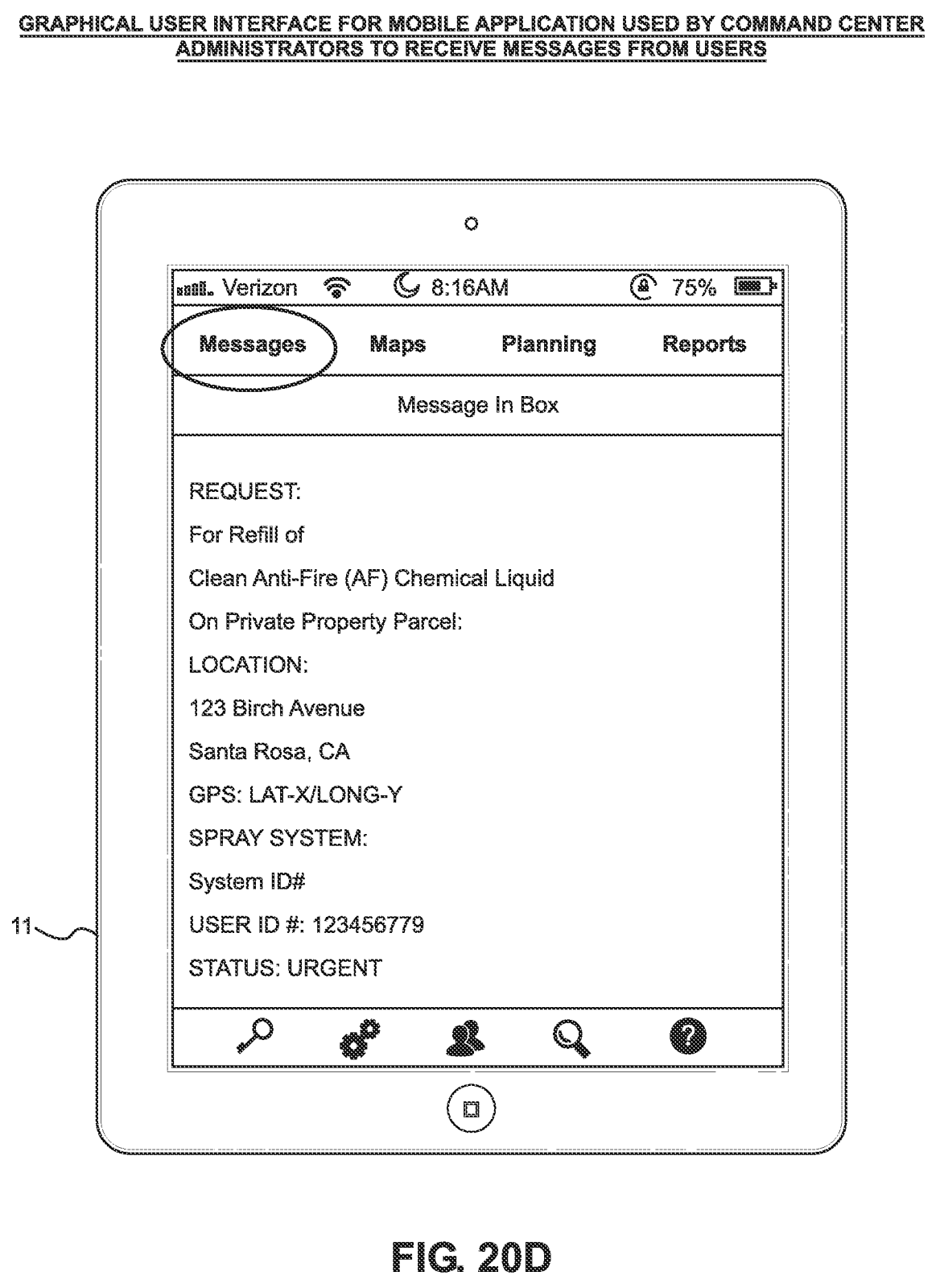

GRAPHICAL USER INTERFACE FOR MOBILE APPLICATION USED BY COMMAND CENTER
ADMINISTRATORS TO RECEIVE MESSAGES FROM USERS

REQUEST:

For Refill of

Clean Anti-Fire (AF) Chemical Liquid

On Private Property Parcel:

LOCATION:

123 Birch Avenue

Santa Rosa, CA

GPS: LAT-X/LONG-Y

SPRAY SYSTEM:

System ID#

USER ID #: 123456779

STATUS: URGENT

FIG. 20D

EXEMPLARY ANTI-FIRE SPRAY PROTECTION MAP GENERATED BY THE SYSTEM NETWORK
SHOWING HOUSES AND STRUCTURES SPRAYED AND NOT-SPRAYED WITH ANTI-FIRE (AF) LIQUID
AS OF RECORD DATE 15 DECEMBER 2017

Not
Actively
AF-Spray
Protected

Actively
AF-Spray
Protected

EXEMPLARY ANTI-FIRE (AF) SPRAY PROTECTION TASK REPORT
GENERATED BY THE SYSTEM FOR COUNTY, STATE ON 15 DECEMBER 2017

| AF Liquid Spray Order # | GPS Addresses | Street Addresses, Town, County | Building Structure (Y/N) | Last Appln. Date | Spray Equip. | SMS | Supervisor ID |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

FIG. 23

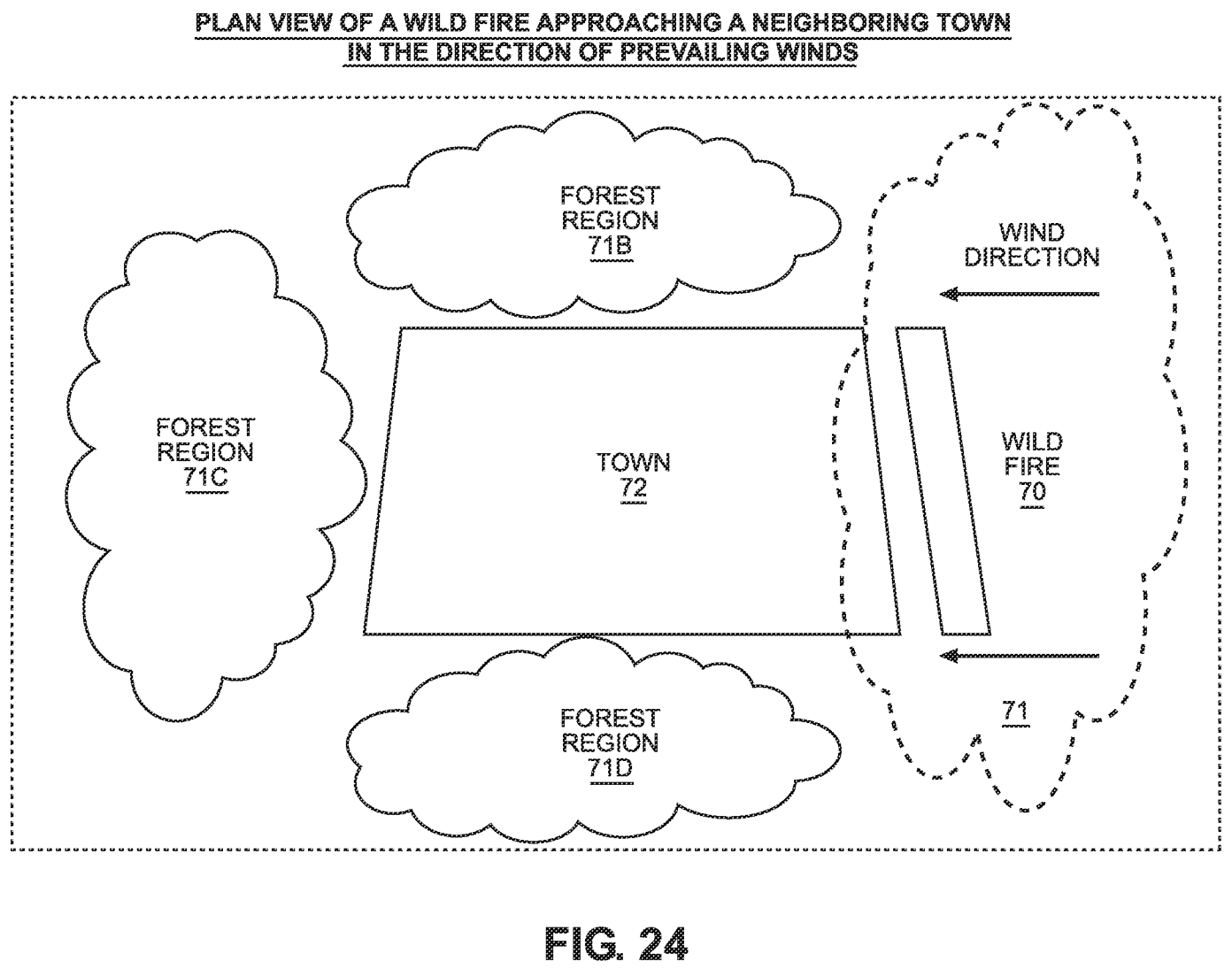

PLAN VIEW OF A WILD FIRE APPROACHING A NEIGHBORING TOWN
IN THE DIRECTION OF PREVAILING WINDS

WIND DIRECTION

WILD FIRE 70

71

FOREST REGION 71B

TOWN 72

FOREST REGION 71D

FOREST REGION 71C

FIG. 24

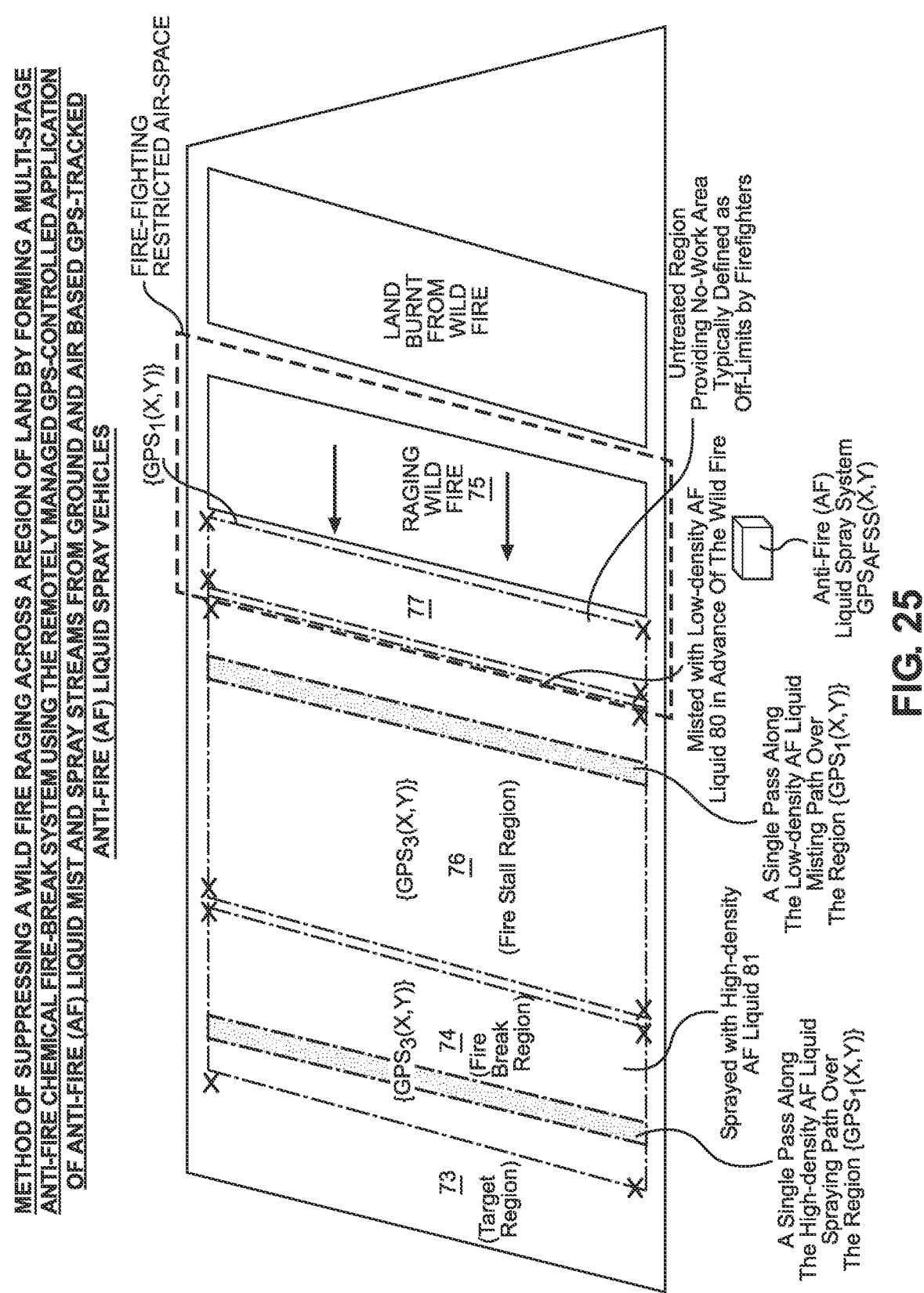

METHOD OF SUPPRESSING A WILD FIRE RAGING ACROSS A REGION OF LAND BY FORMING A MULTI-STAGE ANTI-FIRE CHEMICAL FIRE-BREAK SYSTEM USING THE REMOTELY MANAGED GPS-CONTROLLED APPLICATION OF ANTI-FIRE (AF) LIQUID MIST AND SPRAY STREAMS FROM GROUND AND AIR BASED GPS-TRACKED ANTI-FIRE (AF) LIQUID SPRAY VEHICLES

FIRE-FIGHTING RESTRICTED AIR-SPACE

{GPS₁(X,Y)}

LAND BURNT FROM WILD FIRE

RAGING WILD FIRE 75

77

{GPS₃(X,Y)} 76 (Fire Stall Region)

{GPS₃(X,Y)} 74 (Fire Break Region)

73 (Target Region)

Untreated Region Providing No-Work Area Typically Defined as Off-Limits by Firefighters Misted with Low-density AF Liquid 80 in Advance Of The Wild Fire Anti-Fire (AF) Liquid Spray System GPS AFSS(X,Y)

A Single Pass Along The Low-density AF Liquid Misting Path Over The Region {GPS₁(X,Y)}

Sprayed with High-density AF Liquid 81

A Single Pass Along The High-density AF Liquid Spraying Path Over The Region {GPS₁(X,Y)}

FIG. 25

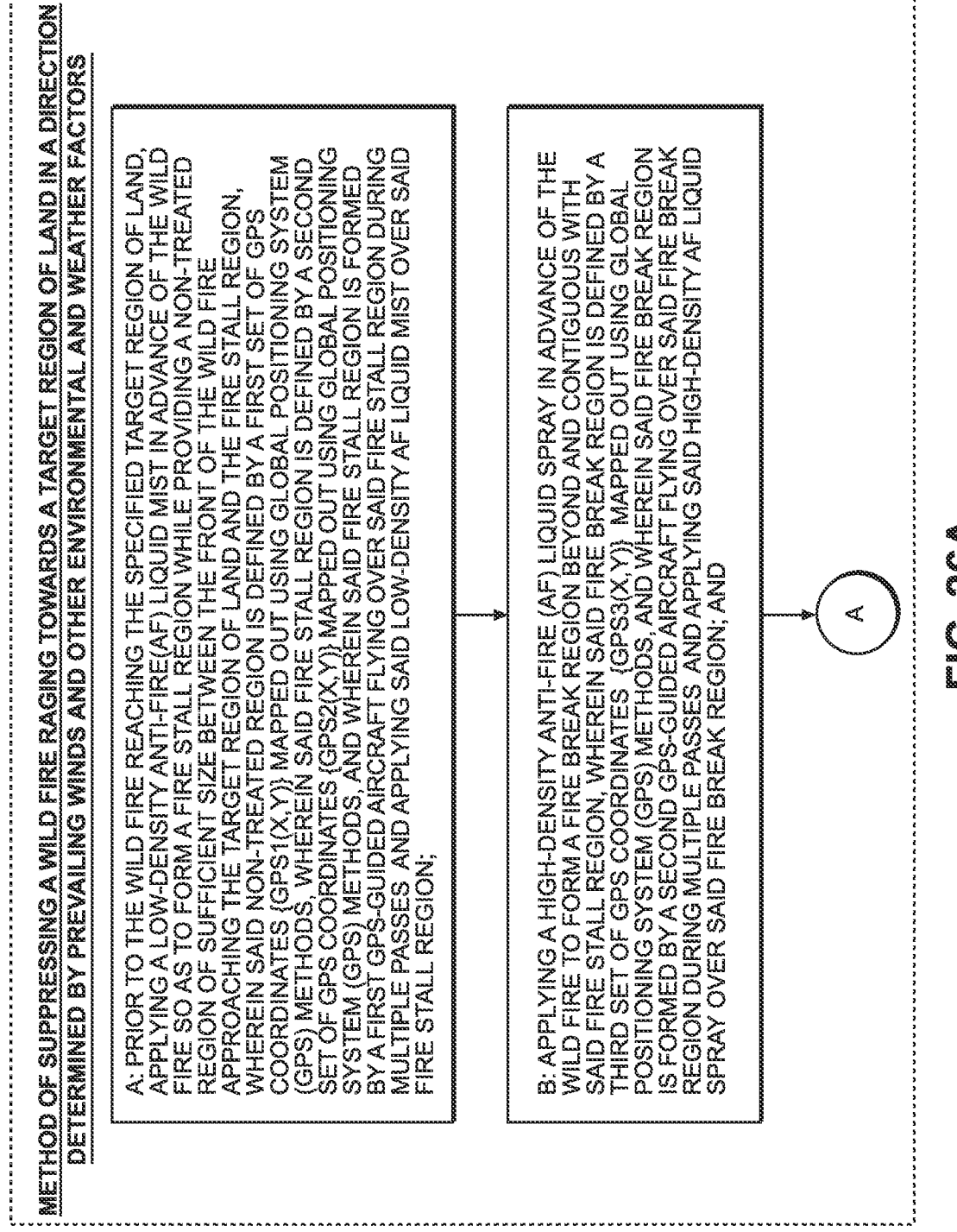

METHOD OF SUPPRESSING A WILD FIRE RAGING TOWARDS A TARGET REGION OF LAND IN A DIRECTION DETERMINED BY PREVAILING WINDS AND OTHER ENVIRONMENTAL AND WEATHER FACTORS

A: PRIOR TO THE WILD FIRE REACHING THE SPECIFIED TARGET REGION OF LAND, APPLYING A LOW-DENSITY ANTI-FIRE (AF) LIQUID MIST IN ADVANCE OF THE WILD FIRE SO AS TO FORM A FIRE STALL REGION WHILE PROVIDING A NON-TREATED REGION OF SUFFICIENT SIZE BETWEEN THE FRONT OF THE WILD FIRE APPROACHING THE TARGET REGION OF LAND AND THE FIRE STALL REGION, WHEREIN SAID NON-TREATED REGION IS DEFINED BY A FIRST SET OF GPS COORDINATES {GPS1(X,Y)} MAPPED OUT USING GLOBAL POSITIONING SYSTEM (GPS) METHODS, WHEREIN SAID FIRE STALL REGION IS DEFINED BY A SECOND SET OF GPS COORDINATES {GPS2(X,Y)} MAPPED OUT USING GLOBAL POSITIONING SYSTEM (GPS) METHODS, AND WHEREIN SAID FIRE STALL REGION IS FORMED BY A FIRST GPS-GUIDED AIRCRAFT FLYING OVER SAID FIRE STALL REGION DURING MULTIPLE PASSES AND APPLYING SAID LOW-DENSITY AF LIQUID MIST OVER SAID FIRE STALL REGION;

B: APPLYING A HIGH-DENSITY ANTI-FIRE (AF) LIQUID SPRAY IN ADVANCE OF THE WILD FIRE TO FORM A FIRE BREAK REGION BEYOND AND CONTIGUOUS WITH SAID FIRE STALL REGION, WHEREIN SAID FIRE BREAK REGION IS DEFINED BY A THIRD SET OF GPS COORDINATES {GPS3(X,Y)} MAPPED OUT USING GLOBAL POSITIONING SYSTEM (GPS) METHODS, AND WHEREIN SAID FIRE BREAK REGION IS FORMED BY A SECOND GPS-GUIDED AIRCRAFT FLYING OVER SAID FIRE BREAK REGION DURING MULTIPLE PASSES AND APPLYING SAID HIGH-DENSITY AF LIQUID SPRAY OVER SAID FIRE BREAK REGION; AND

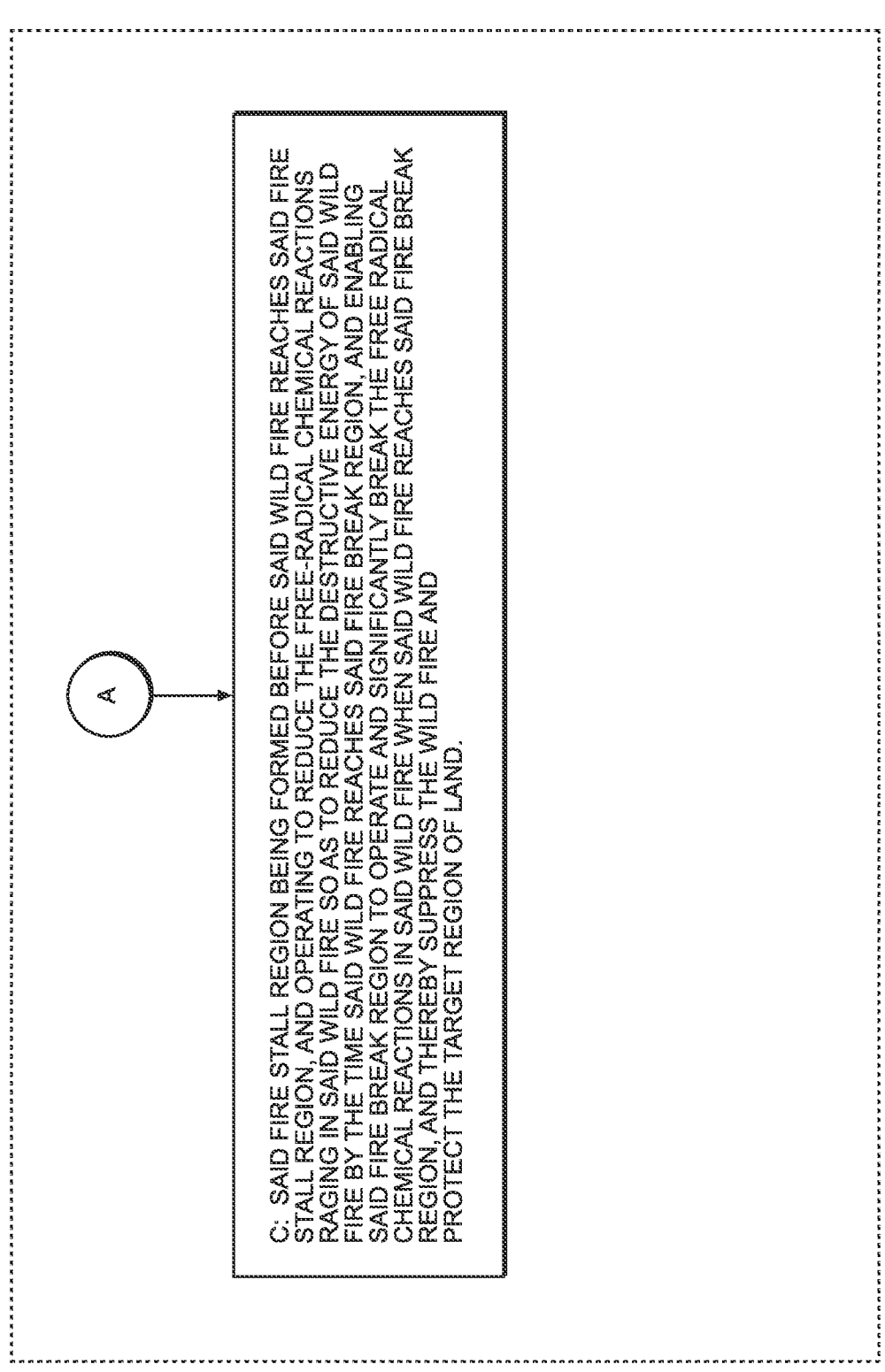

C: SAID FIRE STALL REGION BEING FORMED BEFORE SAID WILD FIRE REACHES SAID FIRE STALL REGION, AND OPERATING TO REDUCE THE FREE-RADICAL CHEMICAL REACTIONS RAGING IN SAID WILD FIRE SO AS TO REDUCE THE DESTRUCTIVE ENERGY OF SAID WILD FIRE BY THE TIME SAID WILD FIRE REACHES SAID FIRE BREAK REGION, AND ENABLING SAID FIRE BREAK REGION TO OPERATE AND SIGNIFICANTLY BREAK THE FREE RADICAL CHEMICAL REACTIONS IN SAID WILD FIRE WHEN SAID WILD FIRE REACHES SAID FIRE BREAK REGION, AND THEREBY SUPPRESS THE WILD FIRE AND PROTECT THE TARGET REGION OF LAND.

FIG. 26B

METHOD OF REDUCING THE RISKS OF DAMAGE TO PRIVATE PROPERTY DUE TO WILD FIRES BY REMOTELY MANAGED GPS-CONTROLLED APPLICATION OF ANTI-FIRE (AF) LIQUID SPRAY FROM GROUND AND AIR BASED GPS-TRACKED ANTI-FIRE (AF) LIQUID SPRAY VEHICLES

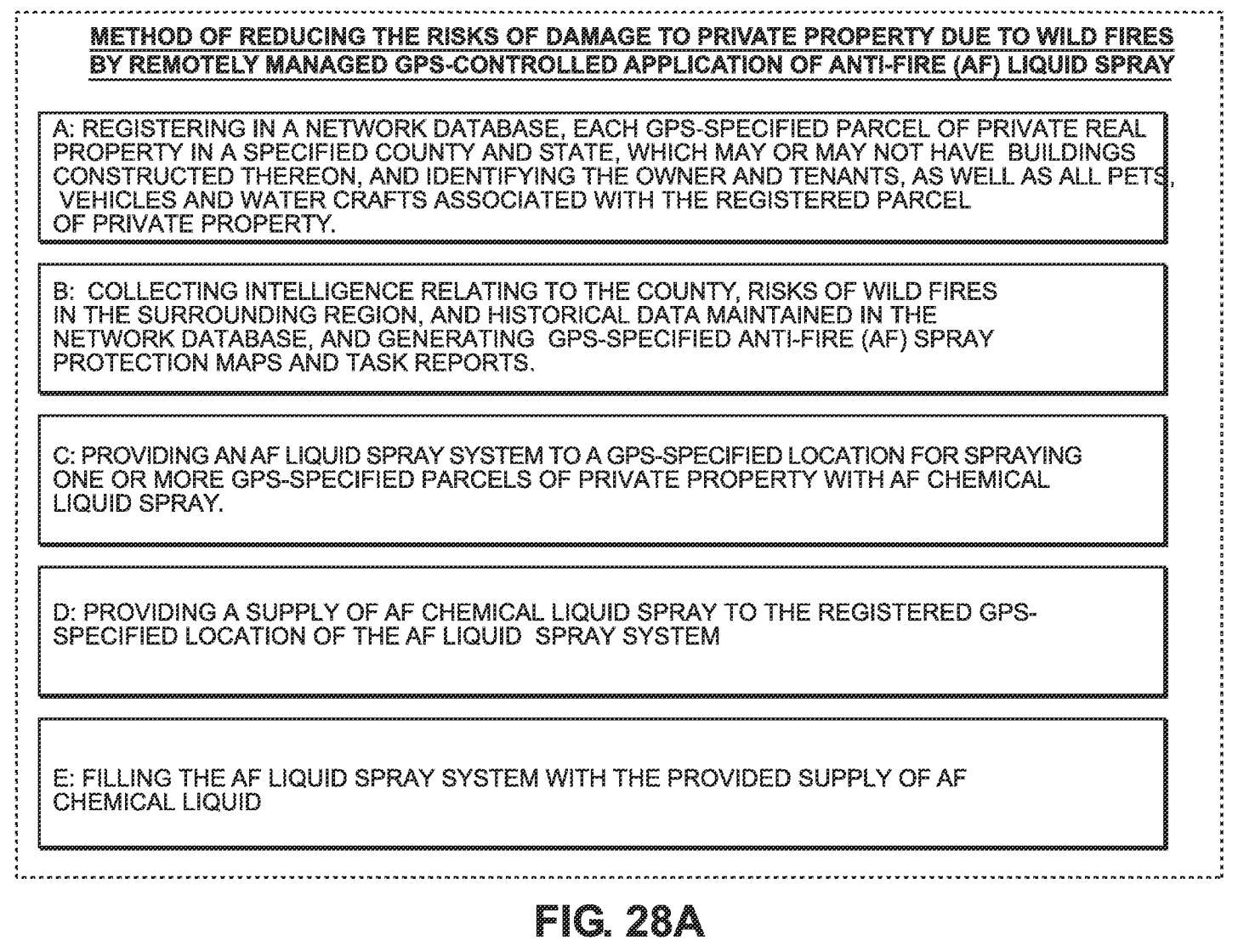

METHOD OF REDUCING THE RISKS OF DAMAGE TO PRIVATE PROPERTY DUE TO WILD FIRES BY REMOTELY MANAGED GPS-CONTROLLED APPLICATION OF ANTI-FIRE (AF) LIQUID SPRAY

A: REGISTERING IN A NETWORK DATABASE, EACH GPS-SPECIFIED PARCEL OF PRIVATE REAL PROPERTY IN A SPECIFIED COUNTY AND STATE, WHICH MAY OR MAY NOT HAVE BUILDINGS CONSTRUCTED THEREON, AND IDENTIFYING THE OWNER AND TENANTS, AS WELL AS ALL PETS, VEHICLES AND WATER CRAFTS ASSOCIATED WITH THE REGISTERED PARCEL OF PRIVATE PROPERTY.

B: COLLECTING INTELLIGENCE RELATING TO THE COUNTY, RISKS OF WILD FIRES IN THE SURROUNDING REGION, AND HISTORICAL DATA MAINTAINED IN THE NETWORK DATABASE, AND GENERATING GPS-SPECIFIED ANTI-FIRE (AF) SPRAY PROTECTION MAPS AND TASK REPORTS.

C: PROVIDING AN AF LIQUID SPRAY SYSTEM TO A GPS-SPECIFIED LOCATION FOR SPRAYING ONE OR MORE GPS-SPECIFIED PARCELS OF PRIVATE PROPERTY WITH AF CHEMICAL LIQUID SPRAY.

D: PROVIDING A SUPPLY OF AF CHEMICAL LIQUID SPRAY TO THE REGISTERED GPS-SPECIFIED LOCATION OF THE AF LIQUID SPRAY SYSTEM

E: FILLING THE AF LIQUID SPRAY SYSTEM WITH THE PROVIDED SUPPLY OF AF CHEMICAL LIQUID

FIG. 28A

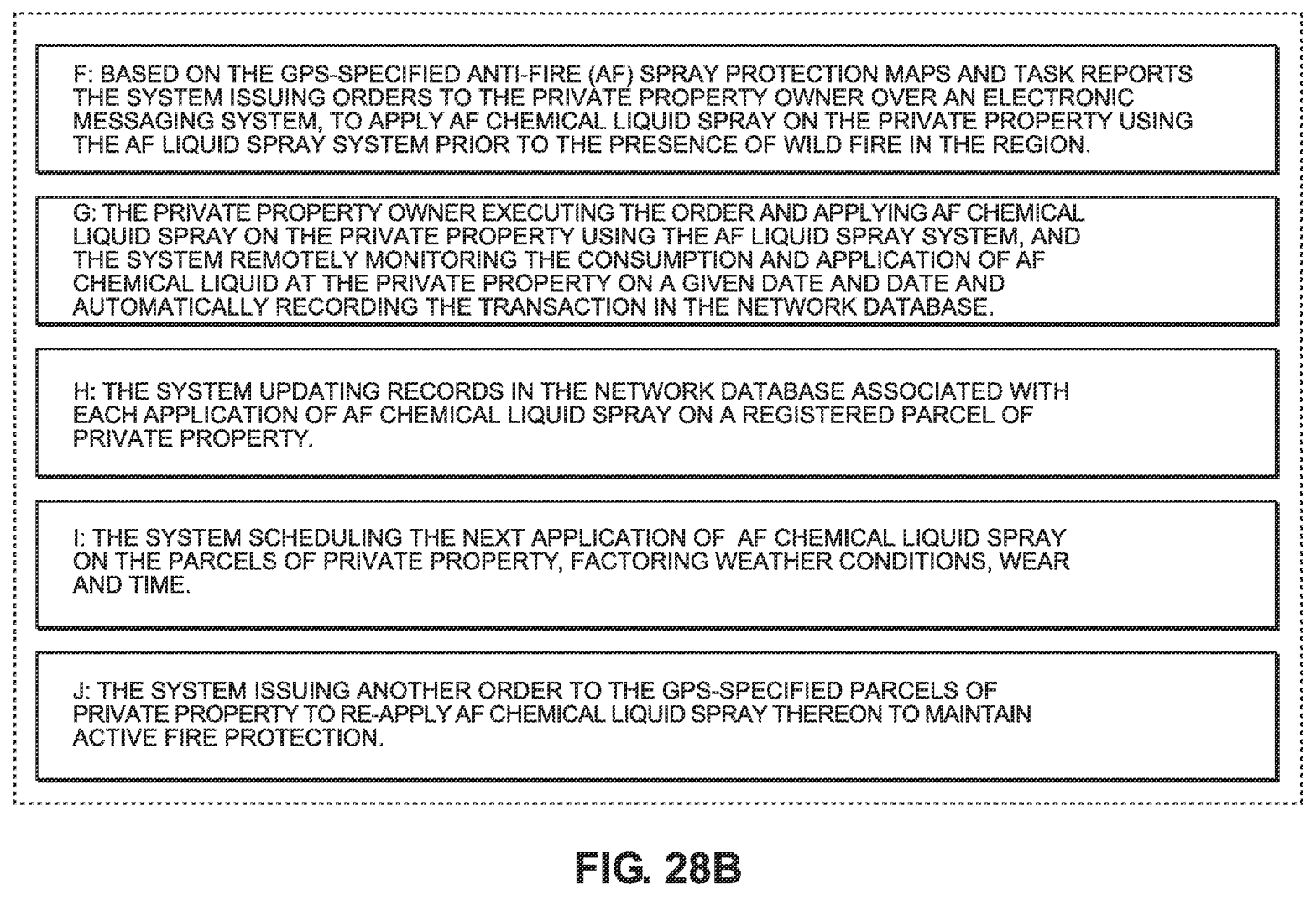

F: BASED ON THE GPS-SPECIFIED ANTI-FIRE (AF) SPRAY PROTECTION MAPS AND TASK REPORTS THE SYSTEM ISSUING ORDERS TO THE PRIVATE PROPERTY OWNER OVER AN ELECTRONIC MESSAGING SYSTEM, TO APPLY AF CHEMICAL LIQUID SPRAY ON THE PRIVATE PROPERTY USING THE AF LIQUID SPRAY SYSTEM PRIOR TO THE PRESENCE OF WILD FIRE IN THE REGION.

G: THE PRIVATE PROPERTY OWNER EXECUTING THE ORDER AND APPLYING AF CHEMICAL LIQUID SPRAY ON THE PRIVATE PROPERTY USING THE AF LIQUID SPRAY SYSTEM, AND THE SYSTEM REMOTELY MONITORING THE CONSUMPTION AND APPLICATION OF AF CHEMICAL LIQUID AT THE PRIVATE PROPERTY ON A GIVEN DATE AND DATE AND AUTOMATICALLY RECORDING THE TRANSACTION IN THE NETWORK DATABASE.

H: THE SYSTEM UPDATING RECORDS IN THE NETWORK DATABASE ASSOCIATED WITH EACH APPLICATION OF AF CHEMICAL LIQUID SPRAY ON A REGISTERED PARCEL OF PRIVATE PROPERTY.

I: THE SYSTEM SCHEDULING THE NEXT APPLICATION OF AF CHEMICAL LIQUID SPRAY ON THE PARCELS OF PRIVATE PROPERTY, FACTORING WEATHER CONDITIONS, WEAR AND TIME.

J: THE SYSTEM ISSUING ANOTHER ORDER TO THE GPS-SPECIFIED PARCELS OF PRIVATE PROPERTY TO RE-APPLY AF CHEMICAL LIQUID SPRAY THEREON TO MAINTAIN ACTIVE FIRE PROTECTION.

FIG. 28B

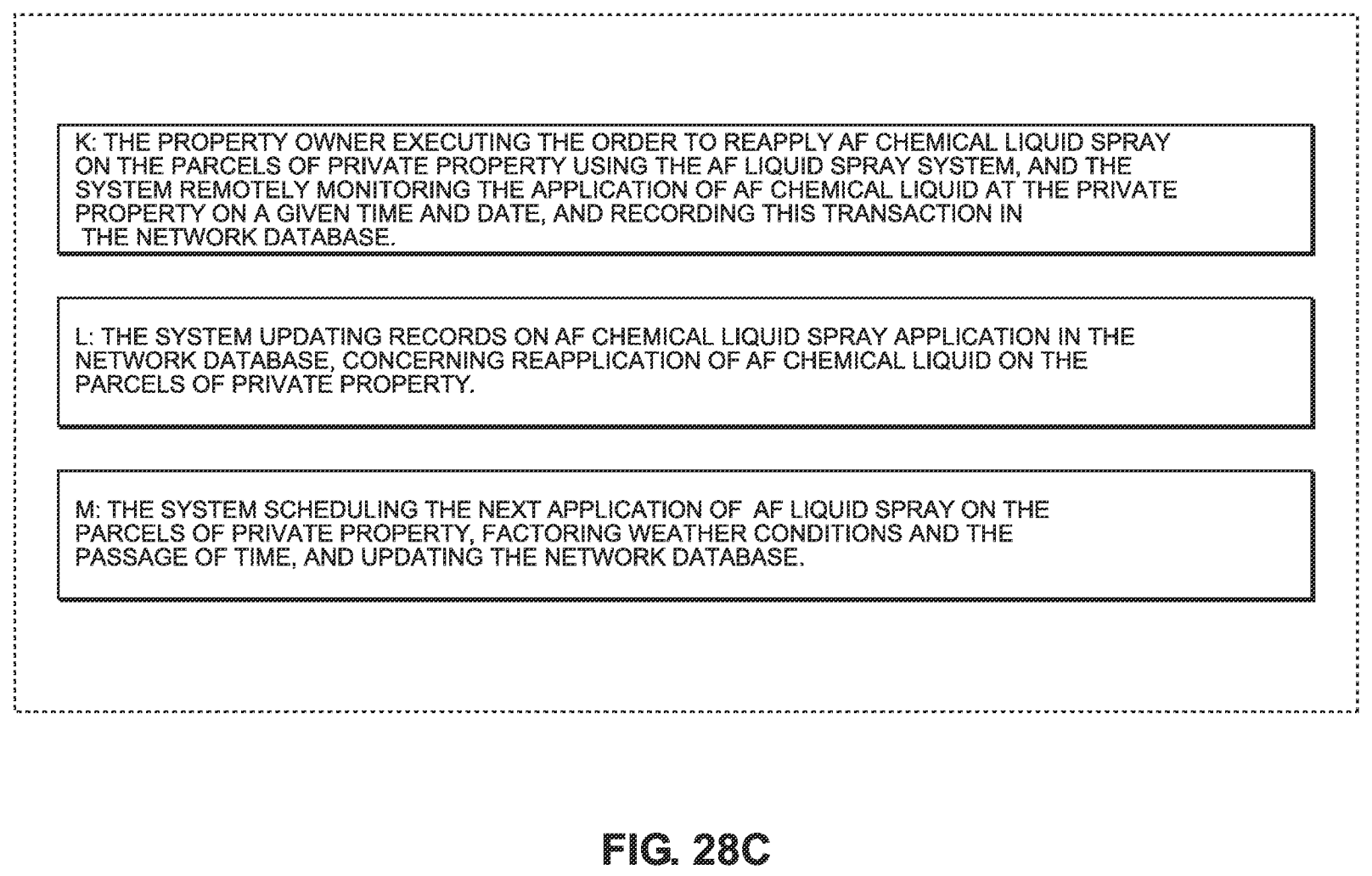

K: THE PROPERTY OWNER EXECUTING THE ORDER TO REAPPLY AF CHEMICAL LIQUID SPRAY ON THE PARCELS OF PRIVATE PROPERTY USING THE AF LIQUID SPRAY SYSTEM, AND THE SYSTEM REMOTELY MONITORING THE APPLICATION OF AF CHEMICAL LIQUID AT THE PRIVATE PROPERTY ON A GIVEN TIME AND DATE, AND RECORDING THIS TRANSACTION IN THE NETWORK DATABASE.

L: THE SYSTEM UPDATING RECORDS ON AF CHEMICAL LIQUID SPRAY APPLICATION IN THE NETWORK DATABASE, CONCERNING REAPPLICATION OF AF CHEMICAL LIQUID ON THE PARCELS OF PRIVATE PROPERTY.

M: THE SYSTEM SCHEDULING THE NEXT APPLICATION OF AF LIQUID SPRAY ON THE PARCELS OF PRIVATE PROPERTY, FACTORING WEATHER CONDITIONS AND THE PASSAGE OF TIME, AND UPDATING THE NETWORK DATABASE.

FIG. 28C

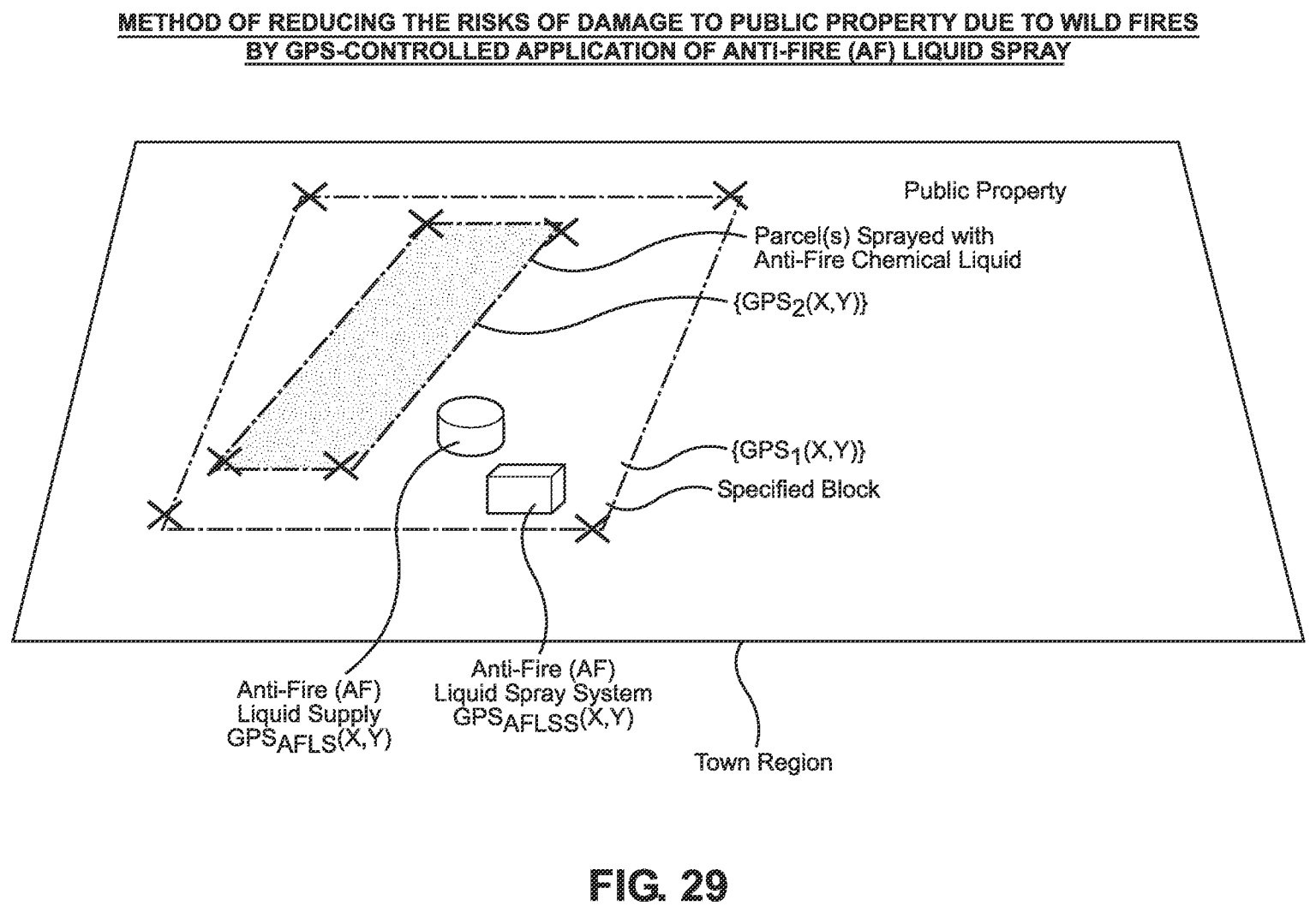

METHOD OF REDUCING THE RISKS OF DAMAGE TO PUBLIC PROPERTY DUE TO WILD FIRES
BY GPS-CONTROLLED APPLICATION OF ANTI-FIRE (AF) LIQUID SPRAY

Public Property

Parcel(s) Sprayed with
Anti-Fire Chemical Liquid

{GPS₂(X,Y)}

{GPS₁(X,Y)}
Specified Block

Town Region

Anti-Fire (AF)
Liquid Spray System
GPS AFLSS(X,Y)

Anti-Fire (AF)
Liquid Supply
GPS AFLS(X,Y)

FIG. 29

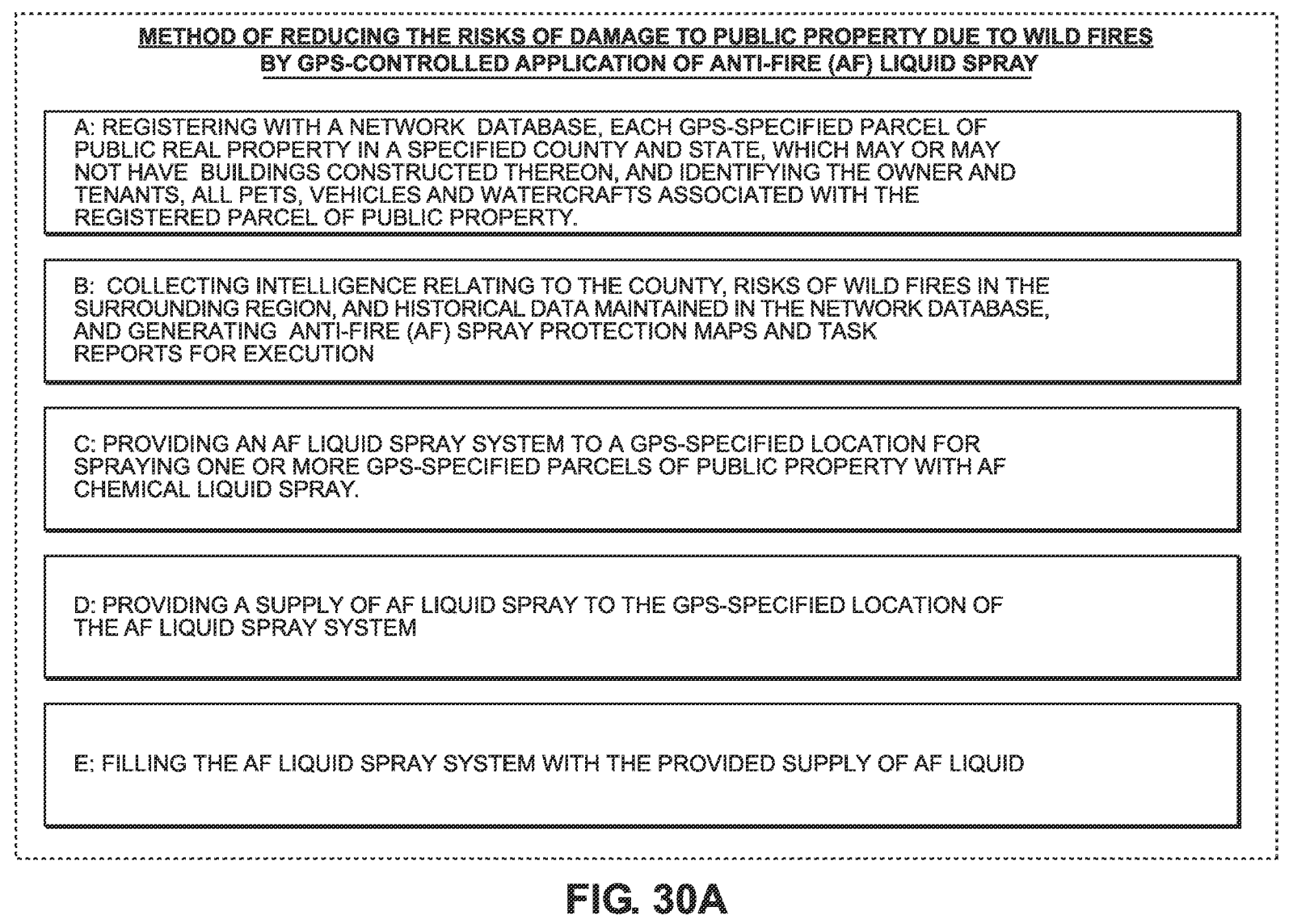

METHOD OF REDUCING THE RISKS OF DAMAGE TO PUBLIC PROPERTY DUE TO WILD FIRES BY GPS-CONTROLLED APPLICATION OF ANTI-FIRE (AF) LIQUID SPRAY

A: REGISTERING WITH A NETWORK DATABASE, EACH GPS-SPECIFIED PARCEL OF PUBLIC REAL PROPERTY IN A SPECIFIED COUNTY AND STATE, WHICH MAY OR MAY NOT HAVE BUILDINGS CONSTRUCTED THEREON, AND IDENTIFYING THE OWNER AND TENANTS, ALL PETS, VEHICLES AND WATERCRAFTS ASSOCIATED WITH THE REGISTERED PARCEL OF PUBLIC PROPERTY.

B: COLLECTING INTELLIGENCE RELATING TO THE COUNTY, RISKS OF WILD FIRES IN THE SURROUNDING REGION, AND HISTORICAL DATA MAINTAINED IN THE NETWORK DATABASE, AND GENERATING ANTI-FIRE (AF) SPRAY PROTECTION MAPS AND TASK REPORTS FOR EXECUTION

C: PROVIDING AN AF LIQUID SPRAY SYSTEM TO A GPS-SPECIFIED LOCATION FOR SPRAYING ONE OR MORE GPS-SPECIFIED PARCELS OF PUBLIC PROPERTY WITH AF CHEMICAL LIQUID SPRAY.

D: PROVIDING A SUPPLY OF AF LIQUID SPRAY TO THE GPS-SPECIFIED LOCATION OF THE AF LIQUID SPRAY SYSTEM

E: FILLING THE AF LIQUID SPRAY SYSTEM WITH THE PROVIDED SUPPLY OF AF LIQUID

FIG. 30A

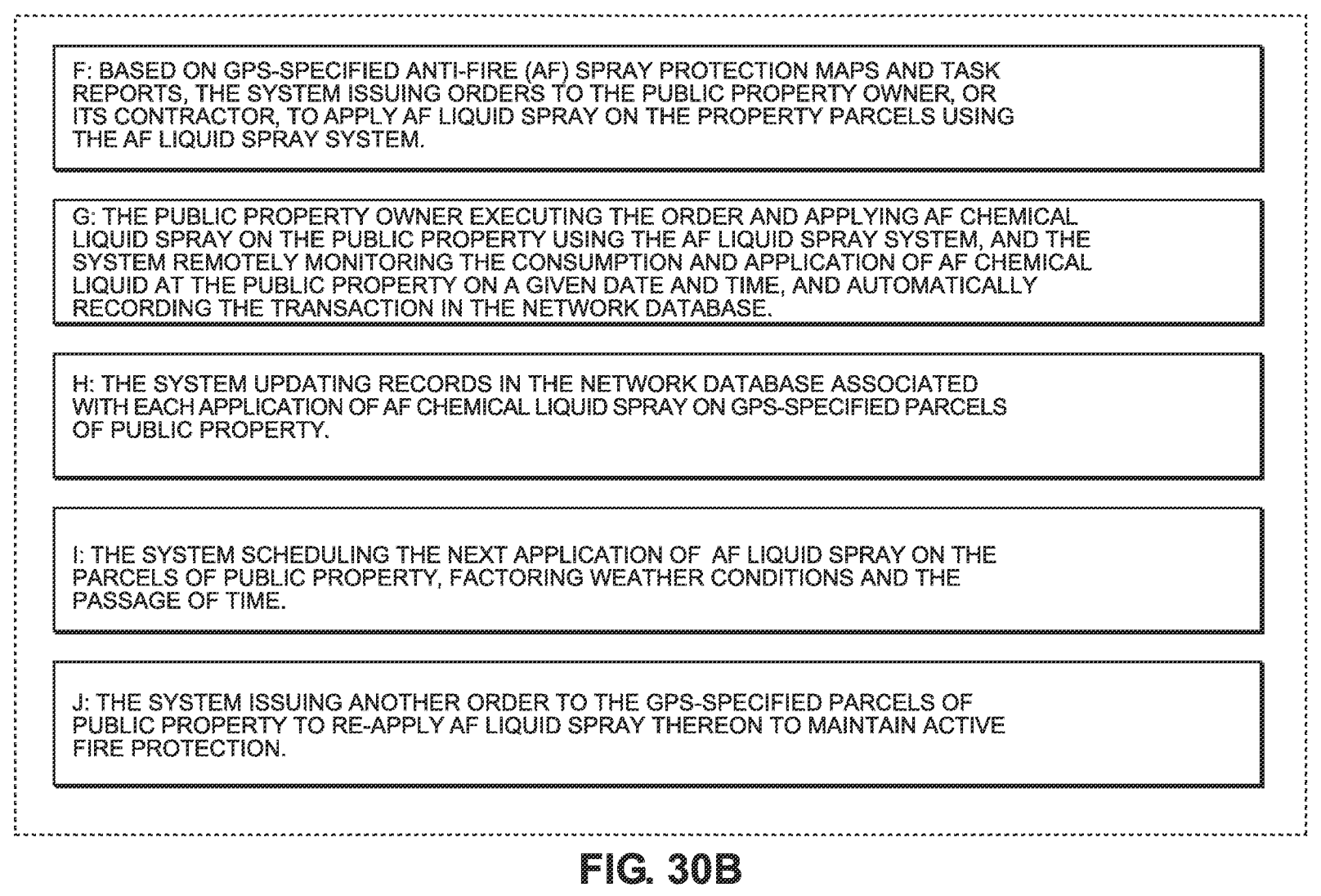

F: BASED ON GPS-SPECIFIED ANTI-FIRE (AF) SPRAY PROTECTION MAPS AND TASK REPORTS, THE SYSTEM ISSUING ORDERS TO THE PUBLIC PROPERTY OWNER, OR ITS CONTRACTOR, TO APPLY AF LIQUID SPRAY ON THE PROPERTY PARCELS USING THE AF LIQUID SPRAY SYSTEM.

G: THE PUBLIC PROPERTY OWNER EXECUTING THE ORDER AND APPLYING AF CHEMICAL LIQUID SPRAY ON THE PUBLIC PROPERTY USING THE AF LIQUID SPRAY SYSTEM, AND THE SYSTEM REMOTELY MONITORING THE CONSUMPTION AND APPLICATION OF AF CHEMICAL LIQUID AT THE PUBLIC PROPERTY ON A GIVEN DATE AND TIME, AND AUTOMATICALLY RECORDING THE TRANSACTION IN THE NETWORK DATABASE.

H: THE SYSTEM UPDATING RECORDS IN THE NETWORK DATABASE ASSOCIATED WITH EACH APPLICATION OF AF CHEMICAL LIQUID SPRAY ON GPS-SPECIFIED PARCELS OF PUBLIC PROPERTY.

I: THE SYSTEM SCHEDULING THE NEXT APPLICATION OF AF LIQUID SPRAY ON THE PARCELS OF PUBLIC PROPERTY, FACTORING WEATHER CONDITIONS AND THE PASSAGE OF TIME.

J: THE SYSTEM ISSUING ANOTHER ORDER TO THE GPS-SPECIFIED PARCELS OF PUBLIC PROPERTY TO RE-APPLY AF LIQUID SPRAY THEREON TO MAINTAIN ACTIVE FIRE PROTECTION.

FIG. 30B

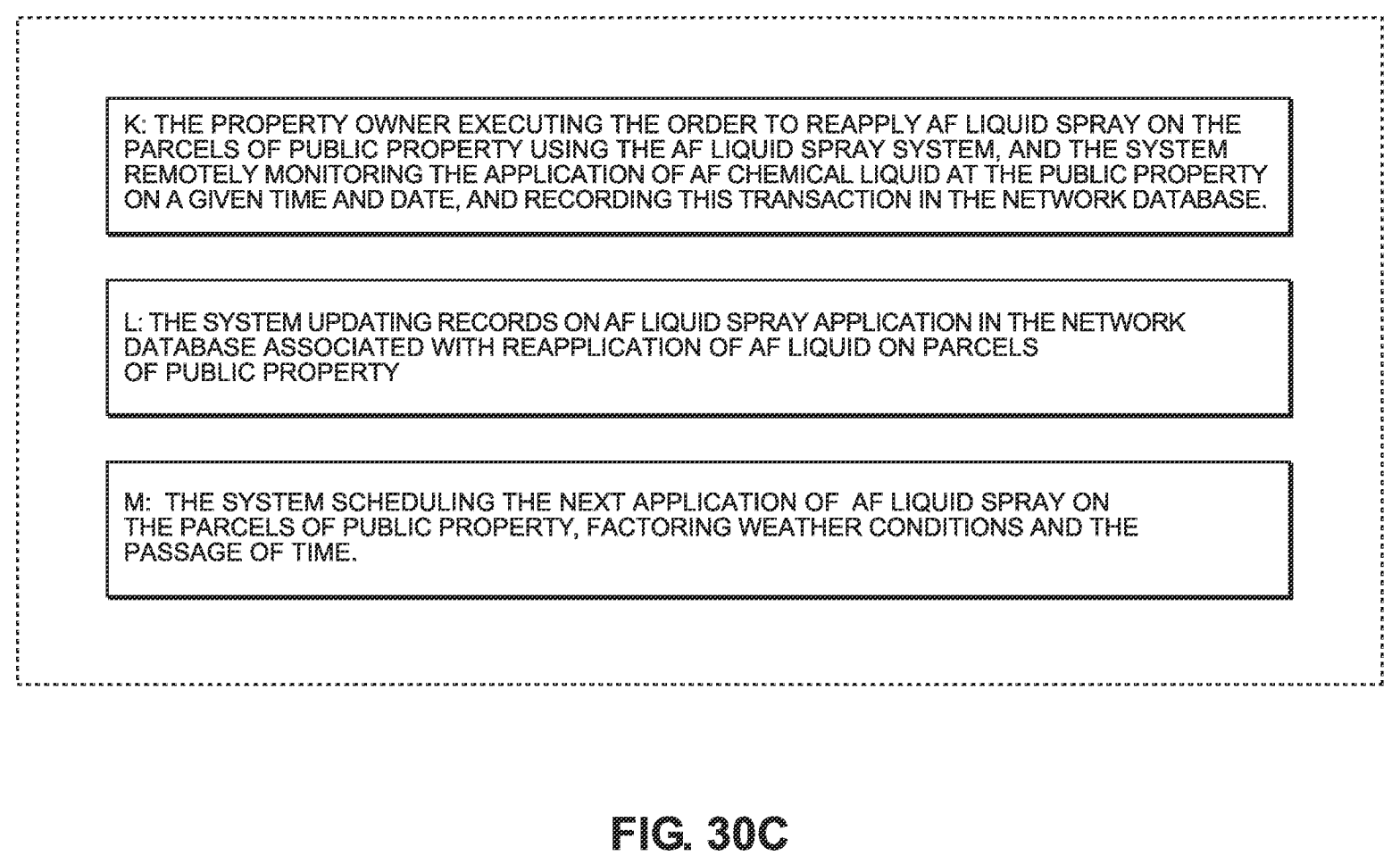

K: THE PROPERTY OWNER EXECUTING THE ORDER TO REAPPLY AF LIQUID SPRAY ON THE PARCELS OF PUBLIC PROPERTY USING THE AF LIQUID SPRAY SYSTEM, AND THE SYSTEM REMOTELY MONITORING THE APPLICATION OF AF CHEMICAL LIQUID AT THE PUBLIC PROPERTY ON A GIVEN TIME AND DATE, AND RECORDING THIS TRANSACTION IN THE NETWORK DATABASE.

L: THE SYSTEM UPDATING RECORDS ON AF LIQUID SPRAY APPLICATION IN THE NETWORK DATABASE ASSOCIATED WITH REAPPLICATION OF AF LIQUID ON PARCELS OF PUBLIC PROPERTY

M: THE SYSTEM SCHEDULING THE NEXT APPLICATION OF AF LIQUID SPRAY ON THE PARCELS OF PUBLIC PROPERTY, FACTORING WEATHER CONDITIONS AND THE PASSAGE OF TIME.

FIG. 30C

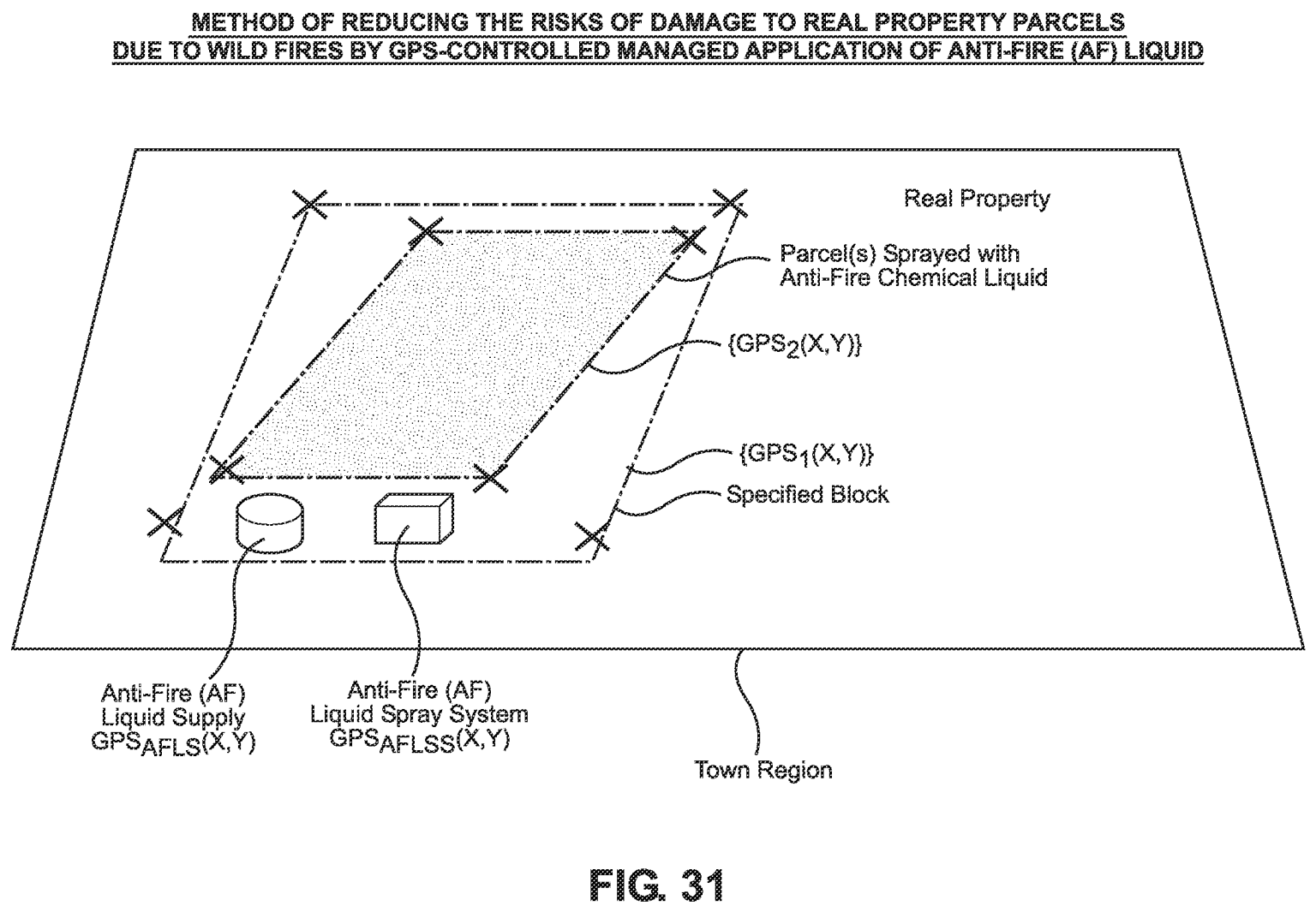

METHOD OF REDUCING THE RISKS OF DAMAGE TO REAL PROPERTY PARCELS
DUE TO WILD FIRES BY GPS-CONTROLLED MANAGED APPLICATION OF ANTI-FIRE (AF) LIQUID

Real Property

Parcel(s) Sprayed with
Anti-Fire Chemical Liquid

{GPS₂(X,Y)}

{GPS₁(X,Y)}
Specified Block

Town Region

Anti-Fire (AF)
Liquid Spray System
GPSAFLSS(X,Y)

Anti-Fire (AF)
Liquid Supply
GPSAFLS(X,Y)

FIG. 31

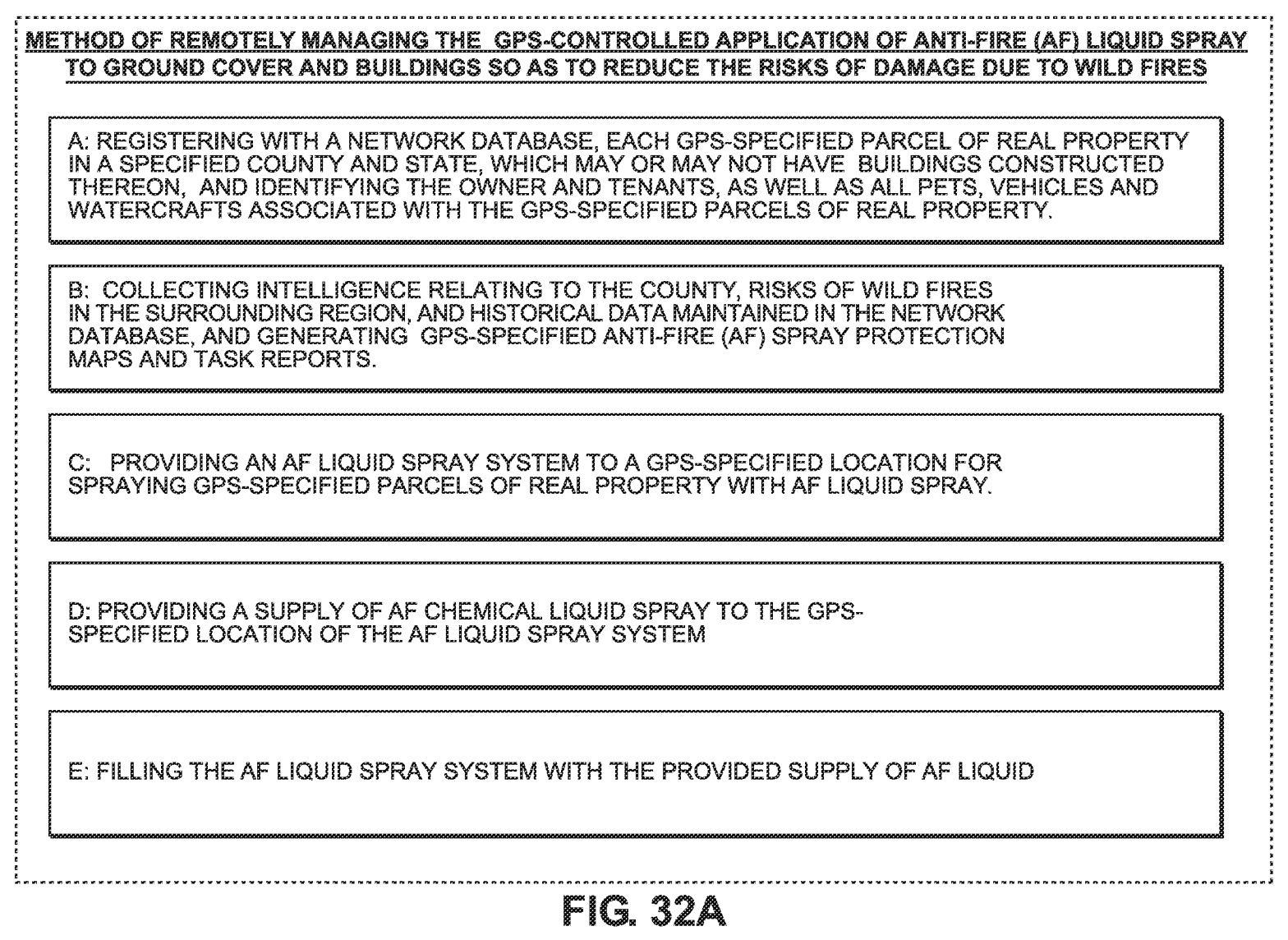

METHOD OF REMOTELY MANAGING THE GPS-CONTROLLED APPLICATION OF ANTI-FIRE (AF) LIQUID SPRAY TO GROUND COVER AND BUILDINGS SO AS TO REDUCE THE RISKS OF DAMAGE DUE TO WILD FIRES

A: REGISTERING WITH A NETWORK DATABASE, EACH GPS-SPECIFIED PARCEL OF REAL PROPERTY IN A SPECIFIED COUNTY AND STATE, WHICH MAY OR MAY NOT HAVE BUILDINGS CONSTRUCTED THEREON, AND IDENTIFYING THE OWNER AND TENANTS, AS WELL AS ALL PETS, VEHICLES AND WATERCRAFTS ASSOCIATED WITH THE GPS-SPECIFIED PARCELS OF REAL PROPERTY.

B: COLLECTING INTELLIGENCE RELATING TO THE COUNTY, RISKS OF WILD FIRES IN THE SURROUNDING REGION, AND HISTORICAL DATA MAINTAINED IN THE NETWORK DATABASE, AND GENERATING GPS-SPECIFIED ANTI-FIRE (AF) SPRAY PROTECTION MAPS AND TASK REPORTS.

C: PROVIDING AN AF LIQUID SPRAY SYSTEM TO A GPS-SPECIFIED LOCATION FOR SPRAYING GPS-SPECIFIED PARCELS OF REAL PROPERTY WITH AF LIQUID SPRAY.

D: PROVIDING A SUPPLY OF AF CHEMICAL LIQUID SPRAY TO THE GPS-SPECIFIED LOCATION OF THE AF LIQUID SPRAY SYSTEM

E: FILLING THE AF LIQUID SPRAY SYSTEM WITH THE PROVIDED SUPPLY OF AF LIQUID

FIG. 32A

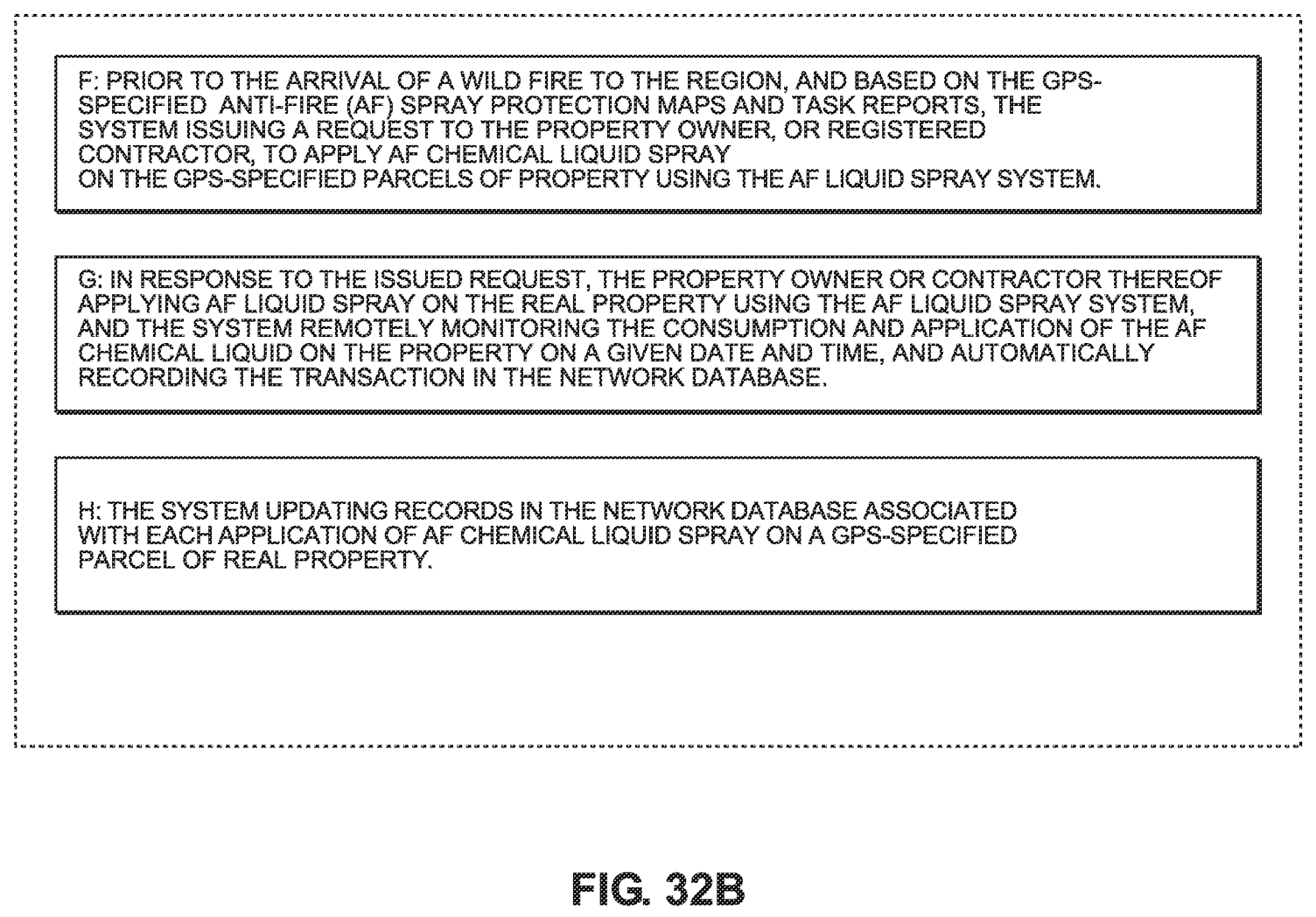

F: PRIOR TO THE ARRIVAL OF A WILD FIRE TO THE REGION, AND BASED ON THE GPS-SPECIFIED ANTI-FIRE (AF) SPRAY PROTECTION MAPS AND TASK REPORTS, THE SYSTEM ISSUING A REQUEST TO THE PROPERTY OWNER, OR REGISTERED CONTRACTOR, TO APPLY AF CHEMICAL LIQUID SPRAY ON THE GPS-SPECIFIED PARCELS OF PROPERTY USING THE AF LIQUID SPRAY SYSTEM.

G: IN RESPONSE TO THE ISSUED REQUEST, THE PROPERTY OWNER OR CONTRACTOR THEREOF APPLYING AF LIQUID SPRAY ON THE REAL PROPERTY USING THE AF LIQUID SPRAY SYSTEM, AND THE SYSTEM REMOTELY MONITORING THE CONSUMPTION AND APPLICATION OF THE AF CHEMICAL LIQUID ON THE PROPERTY ON A GIVEN DATE AND TIME, AND AUTOMATICALLY RECORDING THE TRANSACTION IN THE NETWORK DATABASE.

H: THE SYSTEM UPDATING RECORDS IN THE NETWORK DATABASE ASSOCIATED WITH EACH APPLICATION OF AF CHEMICAL LIQUID SPRAY ON A GPS-SPECIFIED PARCEL OF REAL PROPERTY.

FIG. 32B

MOBILE VEHICLE FOR MIXING AND SPRAYING CLEAN FIRE AND SMOKE INHIBITING SLURRY
ON GROUND SURFACES TO CREATE FIRE BREAKS AND SMOTHER AMBERS AND ASH, AND IN OTHER APPLICATION

APPARATUS FOR APPLYING FIRE AND SMOKE INHIBITING COMPOSITIONS ON GROUND SURFACES BEFORE THE INCIDENCE OF WILD-FIRES, AND ALSO THEREAFTER, UPON SMOLDERING AMBERS AND ASHES TO REDUCE SMOKE AND SUPPRESS FIRE RE-IGNITION

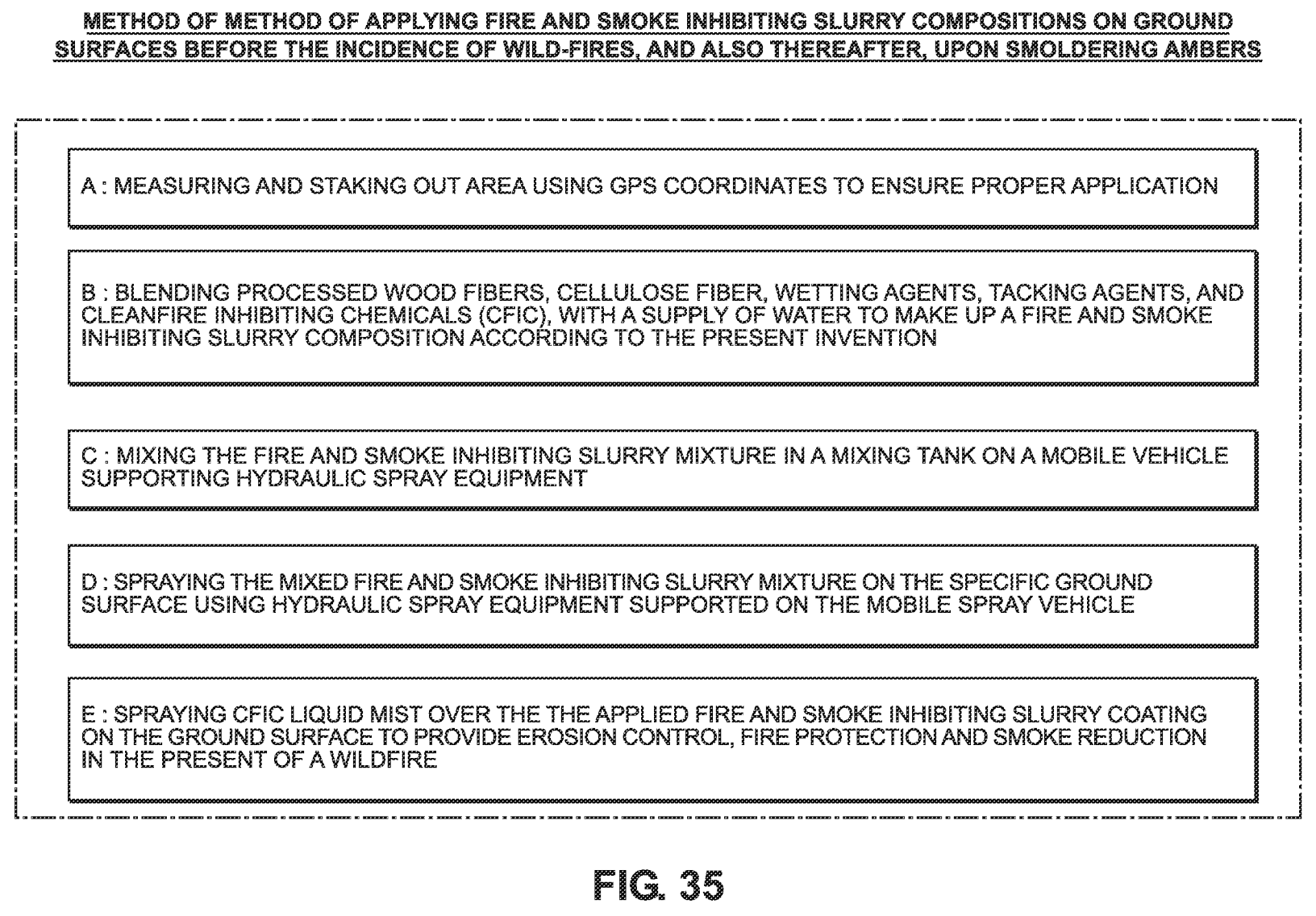

METHOD OF METHOD OF APPLYING FIRE AND SMOKE INHIBITING SLURRY COMPOSITIONS ON GROUND SURFACES BEFORE THE INCIDENCE OF WILD-FIRES, AND ALSO THEREAFTER, UPON SMOLDERING AMBERS

A : MEASURING AND STAKING OUT AREA USING GPS COORDINATES TO ENSURE PROPER APPLICATION

B : BLENDING PROCESSED WOOD FIBERS, CELLULOSE FIBER, WETTING AGENTS, TACKING AGENTS, AND CLEANFIRE INHIBITING CHEMICALS (CFIC), WITH A SUPPLY OF WATER TO MAKE UP A FIRE AND SMOKE INHIBITING SLURRY COMPOSITION ACCORDING TO THE PRESENT INVENTION

C : MIXING THE FIRE AND SMOKE INHIBITING SLURRY MIXTURE IN A MIXING TANK ON A MOBILE VEHICLE SUPPORTING HYDRAULIC SPRAY EQUIPMENT

D : SPRAYING THE MIXED FIRE AND SMOKE INHIBITING SLURRY MIXTURE ON THE SPECIFIC GROUND SURFACE USING HYDRAULIC SPRAY EQUIPMENT SUPPORTED ON THE MOBILE SPRAY VEHICLE

E : SPRAYING CFIC LIQUID MIST OVER THE THE APPLIED FIRE AND SMOKE INHIBITING SLURRY COATING ON THE GROUND SURFACE TO PROVIDE EROSION CONTROL, FIRE PROTECTION AND SMOKE REDUCTION IN THE PRESENT OF A WILDFIRE

FIG. 35

A BASE HYDRAULIC MULCH LOADING CHART FOR MAKING
THE FIRE AND SMOKE INHIBITING SLURRY MIXTURE OF THE PRESENT INVENTION

| Water (gal) | Mulch Fiber (50-lb bales) | Mulch Fiber (lb) | 1,500 Sq ft | 1,500 lb/acre Acres | 2,000 Sq ft | 2,000 lb/acre Acres | 2,500 Sq ft | 2,500 lb/acre Acres |
|---|---|---|---|---|---|---|---|---|
| 100 | 1 | 50 | 1,452 | 0.033 | 1,089 | 0.025 | 871 | 0.020 |
| 300 | 3 | 150 | 4,356 | 0.099 | 3,267 | 0.075 | 2,614 | 0.060 |
| 500 | 5 | 250 | 7,260 | 0.166 | 5,445 | 0.125 | 4,356 | 0.100 |
| 700 | 7 | 350 | 10,164 | 0.233 | 7,623 | 0.175 | 6,098 | 0.140 |
| 900 | 9 | 450 | 13,068 | 0.299 | 9,801 | 0.225 | 7,841 | 0.180 |
| 1,100 | 11 | 550 | 15,972 | 0.366 | 11,979 | 0.275 | 9,583 | 0.220 |
| 1,300 | 13 | 650 | 18,876 | 0.433 | 14,157 | 0.325 | 11,326 | 0.260 |
| 1,500 | 15 | 750 | 21,780 | 0.499 | 16,335 | 0.375 | 13,068 | 0.300 |
| 1,700 | 17 | 850 | 24,684 | 0.566 | 18,513 | 0.425 | 14,810 | 0.340 |
| 1,900 | 19 | 950 | 27,588 | 0.633 | 20,691 | 0.475 | 16,553 | 0.380 |
| 2,100 | 21 | 1,050 | 30,492 | 0.699 | 22,869 | 0.525 | 18,295 | 0.420 |
| 2,300 | 23 | 1,150 | 33,396 | 0.766 | 25,047 | 0.575 | 20,038 | 0.460 |
| 2,500 | 25 | 1,250 | 36,300 | 0.833 | 27,225 | 0.625 | 21,780 | 0.500 |
| 2,700 | 27 | 1,350 | 39,204 | 0.899 | 29,403 | 0.675 | 23,522 | 0.540 |
| 2,900 | 29 | 1,450 | 42,108 | 0.966 | 31,581 | 0.725 | 25,265 | 0.580 |

FIG. 36

CFIC-BASED FIRE BREAK REGION 105 CREATED AROUND NEIGHBORHOOD OF HOUSES WITH APPLICATION OF FIRE AND SMOKE INHIBITING SLURRY MIXTURE OF THE PRESENT INVENTION

Figure 38:
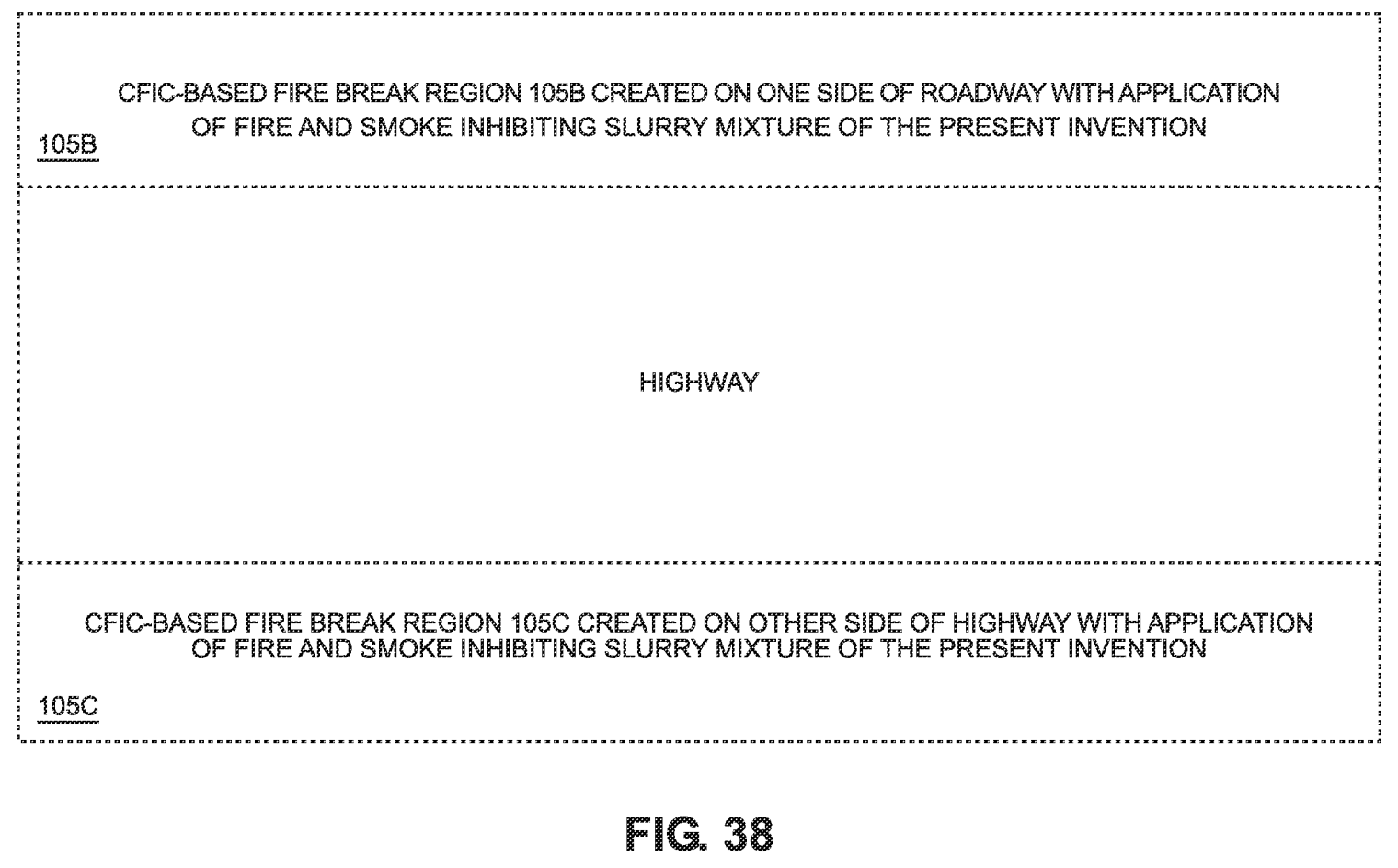

CFIC-BASED FIRE BREAK REGION 105B CREATED ON ONE SIDE OF ROADWAY WITH APPLICATION OF FIRE AND SMOKE INHIBITING SLURRY MIXTURE OF THE PRESENT INVENTION

105B

HIGHWAY

CFIC-BASED FIRE BREAK REGION 105C CREATED ON OTHER SIDE OF HIGHWAY WITH APPLICATION OF FIRE AND SMOKE INHIBITING SLURRY MIXTURE OF THE PRESENT INVENTION

FIRE & SMOKE
INHIBITING SLURRY
BLANKET (102)

WIRELESS PASSIVE INFRARED (PIR) THERMAL IMAGING FIRE-OUTBREAK AND ARSON-ATTACK SENSOR

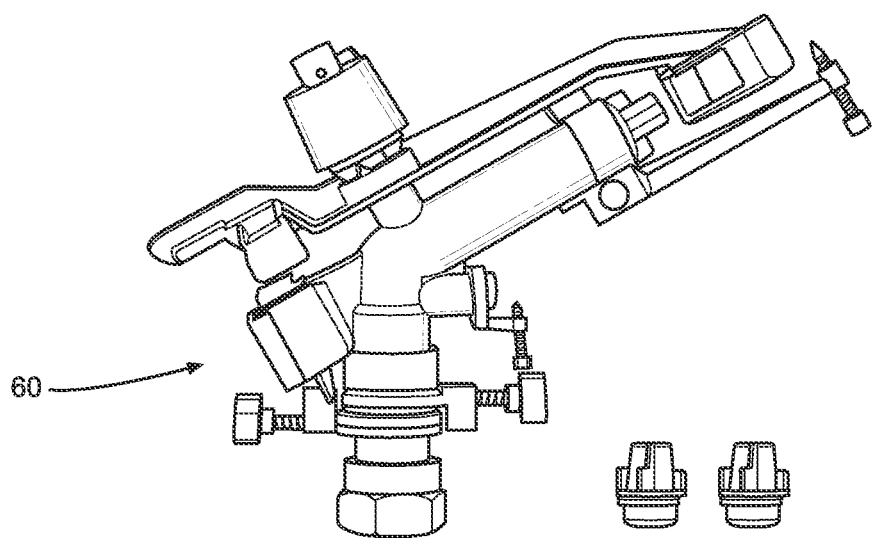
60
FIG. 42F1
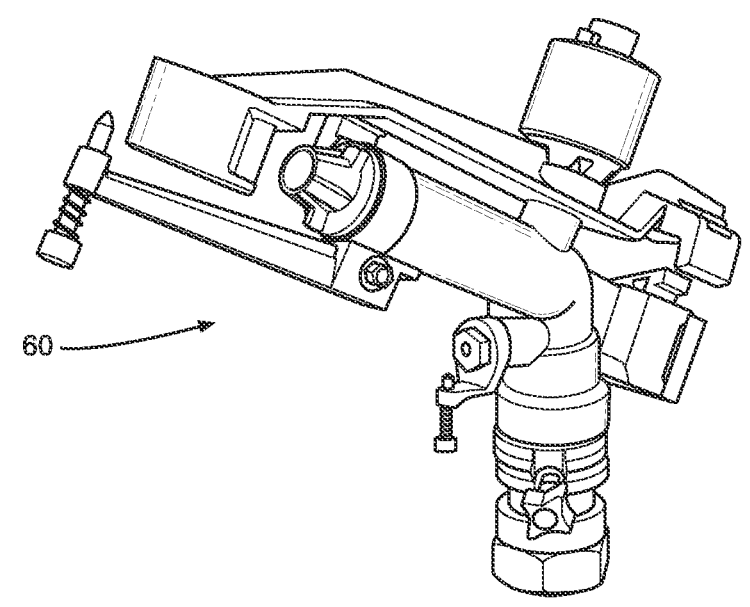
60
FIG. 42F2

THE CLEAN-BIOCHEMISTRY FIRE BREAK SPRAYED BY SPRINKLER HEAD ON BUILDING CREATES AND MAINTAINED PROACTIVE FIRE DEFENSE COVERAGE AGAINST ADVANCING WILDFIRES

Figure 43:
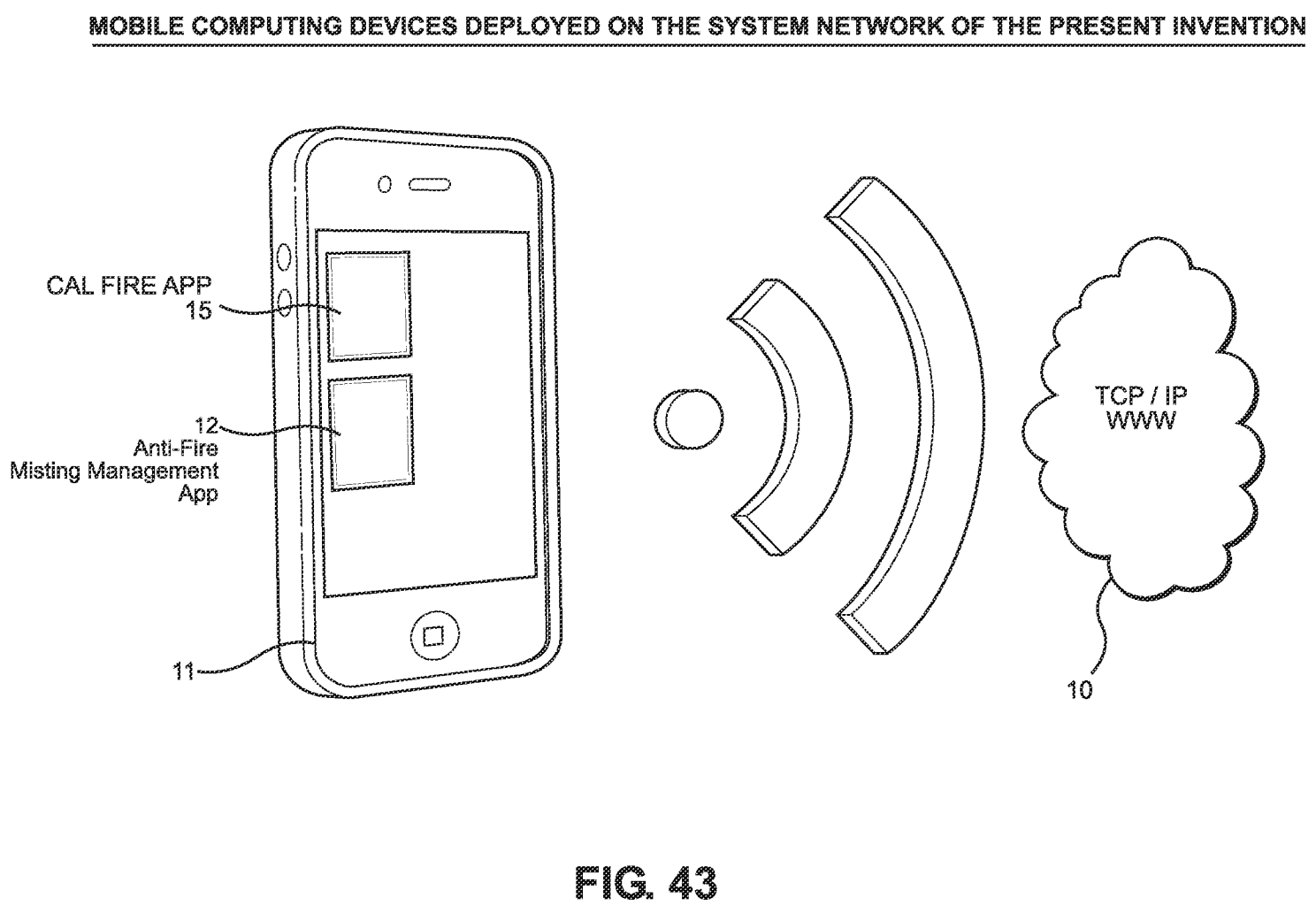

MOBILE COMPUTING DEVICES DEPLOYED ON THE SYSTEM NETWORK OF THE PRESENT INVENTION

TCP / IP
WWW

10

CAL FIRE APP
15

12
Anti-Fire
Misting Management
App

JUST-IN-TIME WOOD-FRAMED BUILDING FACTORY SYSTEM SUPPORTING MULTIPLE PRODUCTION LINES FOR PRODUCING PRE-FABRICATED CLASS-A FIRE-PROTECTED MASS TIMBER COMPONENTS  AS NEEDED TO CONSTRUCT CUSTOM AND PRE-SPECIFIED MASS TIMBER BUILDINGS ORDERED BY CUSTOMERS

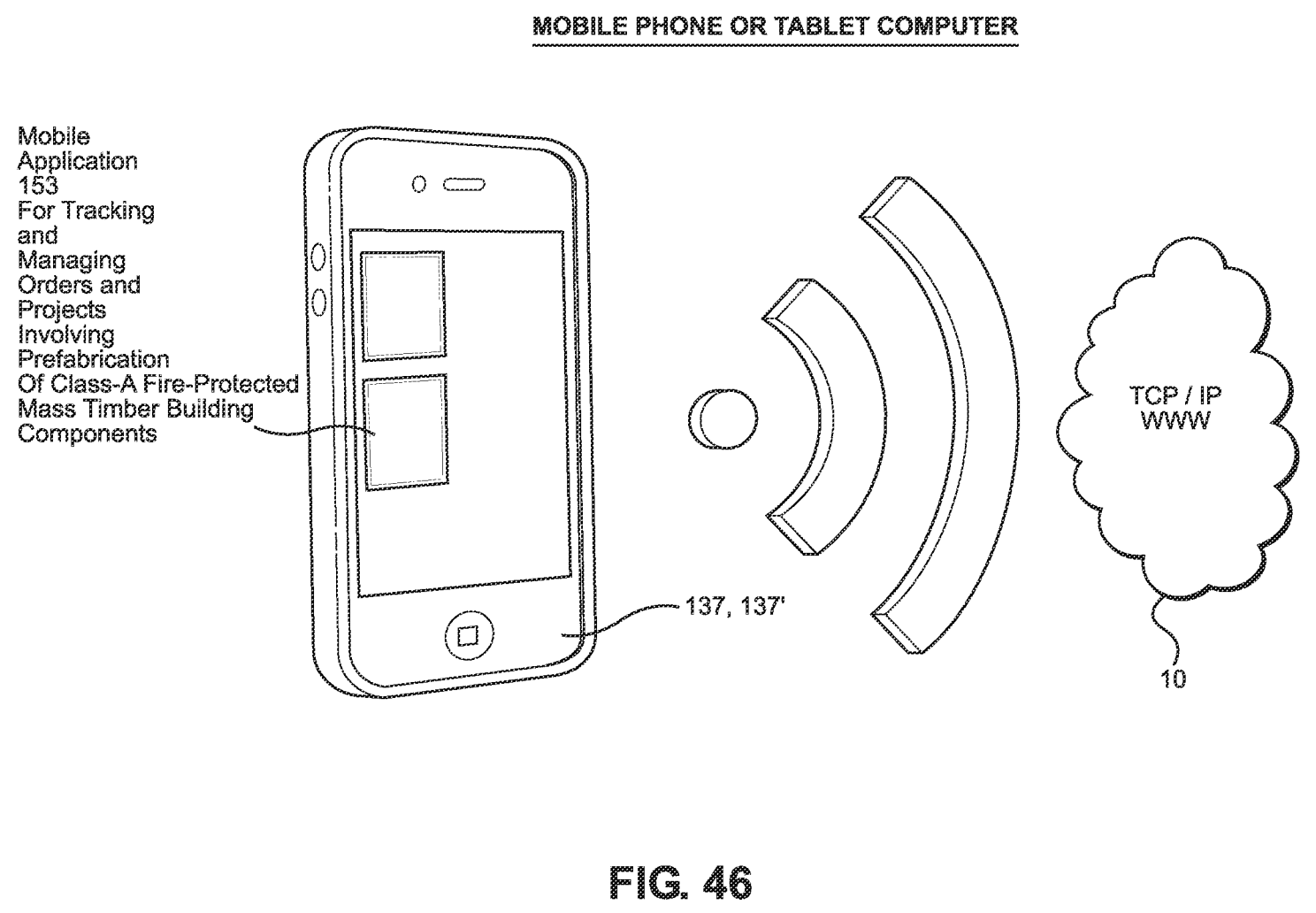

MOBILE PHONE OR TABLET COMPUTER

TCP/IP
WWW

10

137, 137'

Mobile
Application
153
For Tracking
and
Managing
Orders and
Projects
Involving
Prefabrication
Of Class-A Fire-Protected
Mass Timber Building
Components

FIG. 46

SCHEMA FOR NETWORK DATABASE SUPPORTED BY SYSTEM NETWORK OF THE PRESENT INVENTION

154

GRAPHICAL USER INTERFACE OF A MOBILE APPLICATION
FOR USE BY PREFABRICATED BUILDING CUSTOMERS

GRAPHICAL USER INTERFACE OF THE MOBILE APPLICATION FOR USE BY
PROJECT ADMINISTRATORS, MANAGERS, FABRICATORS AND TECHNICIANS

CLASS-A FIRE PROTECTED CARBON-QUANTIZED FINGER-JOINTED LUMBER PRODUCTS ACCORDING TO THE PRESENT INVENTION

29

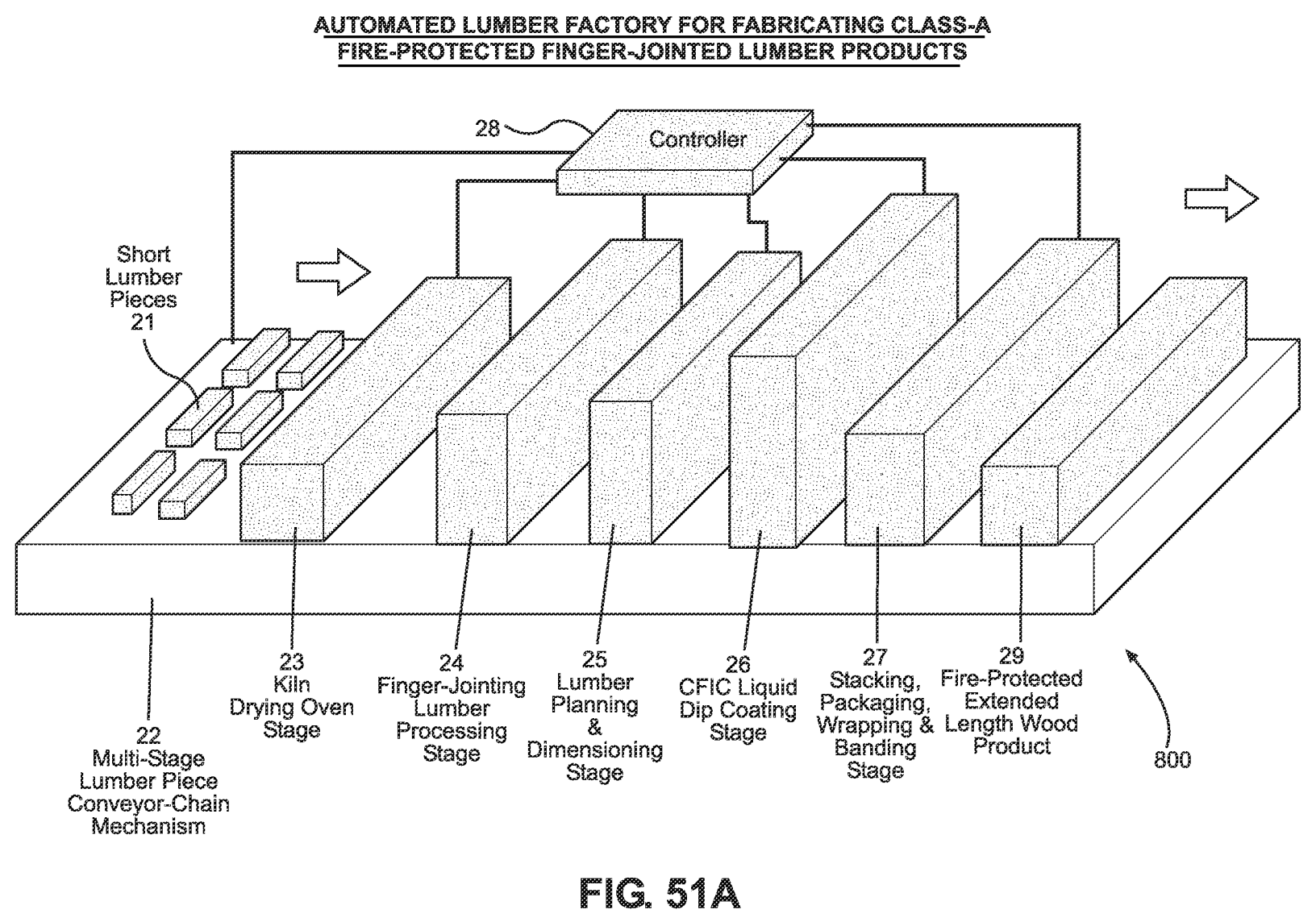

AUTOMATED LUMBER FACTORY FOR FABRICATING CLASS-A
FIRE-PROTECTED FINGER-JOINTED LUMBER PRODUCTS

800

Controller

28

Short
Lumber
Pieces
21

23
Kiln
Drying Oven
Stage

24
Finger-Jointing
Lumber
Processing
Stage

25
Lumber
Planning
&
Dimensioning
Stage

26
CFIC Liquid
Dip Coating
Stage

27
Stacking,
Packaging,
Wrapping &
Banding
Stage

29
Fire-Protected
Extended
Length Wood
Product

22
Multi-Stage
Lumber Piece
Conveyor-Chain
Mechanism

FIG. 51A

METHOD OF PRODUCING CARBON-QUANTIZED CLASS-A FIRE-PROTECTED
FINGER-JOINTED LUMBER IN AN AUTOMATED LUMBER FACTORY

A: IN AN AUTOMATED LUMBER FACTORY, SUPPORTING A HIGH-SPEED FIRE-PROTECTED LUMBER PRODUCTION LINE, PROVIDING A RESERVOIR TANK WITH A LARGE SUPPLY OF CLEAN FIRE-INHIBITING CHEMICAL (CFIC) LIQUID THAT IS CONTINUOUSLY SUPPLIED TO THE AUTOMATED HIGH-SPEED CFIC LIQUID DIP-INFUSING STAGE OF THE LUMBER FACTORY, INSTALLED BETWEEN (I) A LUMBER PLANING/DIMENSIONING STAGE, AND (II) AN AUTOMATED STACKING, PACKAGING, WRAPPING AND BANDING STAGE INSTALLED AT THE END OF THE FIRE-PROTECTED LUMBER PRODUCTION LINE IN THE LUMBER FACTORY.

B: CONTINUOUSLY LOADING A SUPPLY OF UNTREATED SHORT-LENGTH LUMBER ONTO THE HIGH-SPEED CONVEYOR-CHAIN TRANSPORT MECHANISM INSTALLED ALONG THE FIRE-PROTECTED LUMBER PRODUCTION LINE

C: CONTINUOUSLY LOADING THE UNTREATED SHORT-LENGTH LUMBER INTO THE KILN-DRYING OVEN STAGE OF THE FIRE-PROTECTED LUMBER PRODUCTION LINE SO TO PRODUCE KILN-DRIED SHORT-LENGTH LUMBER FOR SUPPLY TO THE FINGER-JOINTING PROCESSING STAGE

D: CONTINUOUSLY SUPPLYING KILN-DRIED SHORT-LENGTH LUMBER INTO THE FINGER-JOINTING LUMBER PROCESSING STAGE, AND PRODUCING EXTENDED-LENGTH FINGER-JOINTED LUMBER

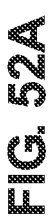

FIG. 52A

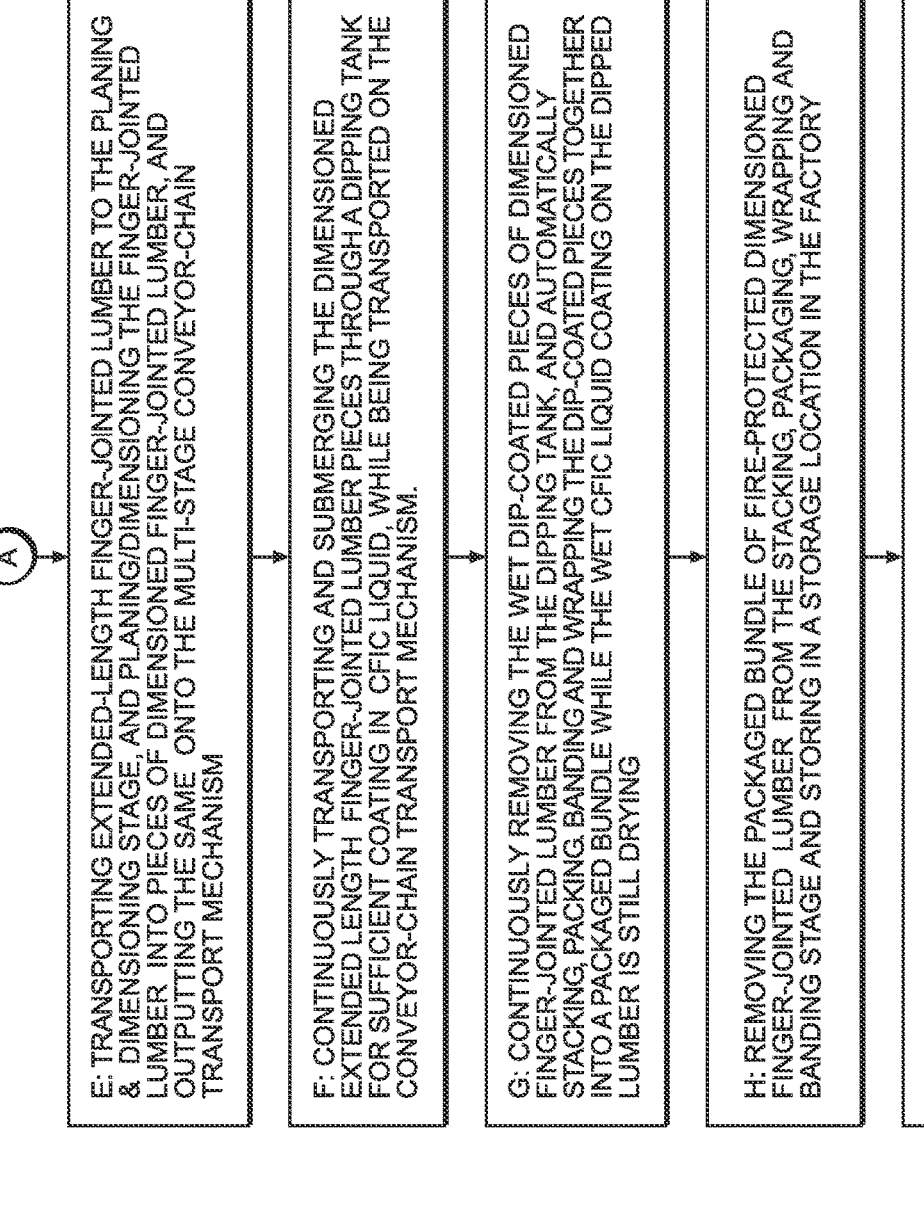

E: TRANSPORTING EXTENDED-LENGTH FINGER-JOINTED LUMBER TO THE PLANING & DIMENSIONING STAGE, AND PLANING/DIMENSIONING THE FINGER-JOINTED LUMBER INTO PIECES OF DIMENSIONED FINGER-JOINTED LUMBER, AND OUTPUTTING THE SAME ONTO THE MULTI-STAGE CONVEYOR-CHAIN TRANSPORT MECHANISM

F: CONTINUOUSLY TRANSPORTING AND SUBMERGING THE DIMENSIONED EXTENDED LENGTH FINGER-JOINTED LUMBER PIECES THROUGH A DIPPING TANK FOR SUFFICIENT COATING IN CFIC LIQUID, WHILE BEING TRANSPORTED ON THE CONVEYOR-CHAIN TRANSPORT MECHANISM.

G: CONTINUOUSLY REMOVING THE WET DIP-COATED PIECES OF DIMENSIONED FINGER-JOINTED LUMBER FROM THE DIPPING TANK, AND AUTOMATICALLY STACKING, PACKING, BANDING AND WRAPPING THE DIP-COATED PIECES TOGETHER INTO A PACKAGED BUNDLE WHILE THE WET CFIC LIQUID COATING ON THE DIPPED LUMBER IS STILL DRYING

H: REMOVING THE PACKAGED BUNDLE OF FIRE-PROTECTED DIMENSIONED FINGER-JOINTED LUMBER FROM THE STACKING, PACKAGING, WRAPPING AND BANDING STAGE AND STORING IN A STORAGE LOCATION IN THE FACTORY

I: PAINTING THE ENDS OF EACH PACKAGED BUNDLE OF FIRE-PROTECTED DIMENSIONED FINGER-JOINTED LUMBER THAT IS PRODUCED FROM THE PRODUCTION LINE, USING A PAINT CONTAINING CLEAN FIRE-INHIBITED CHEMICALS (CFIC), AND APPLYING TRADEMARKS AND LOGOS TO THE FIRE-TREATED FINGER-JOINTED LUMBER

FIG. 52B

CLASS-A FIRE-PROTECTED CARBON-QUANTIZED TIMBER (CLT) PRODUCTS
ACCORDING TO THE PRESENT INVENTION

AUTOMATED LUMBER FACTORY FOR FABRICATING FIRE-PROTECTED
CARBON-QUANTIZED CROSS-LAMINATED TIMBER (CLT) PRODUCTS

AUTOMATIC CROSS-LAMINATED TIMER
(CLT) DIP-COATING STAGE

Figure 55A:
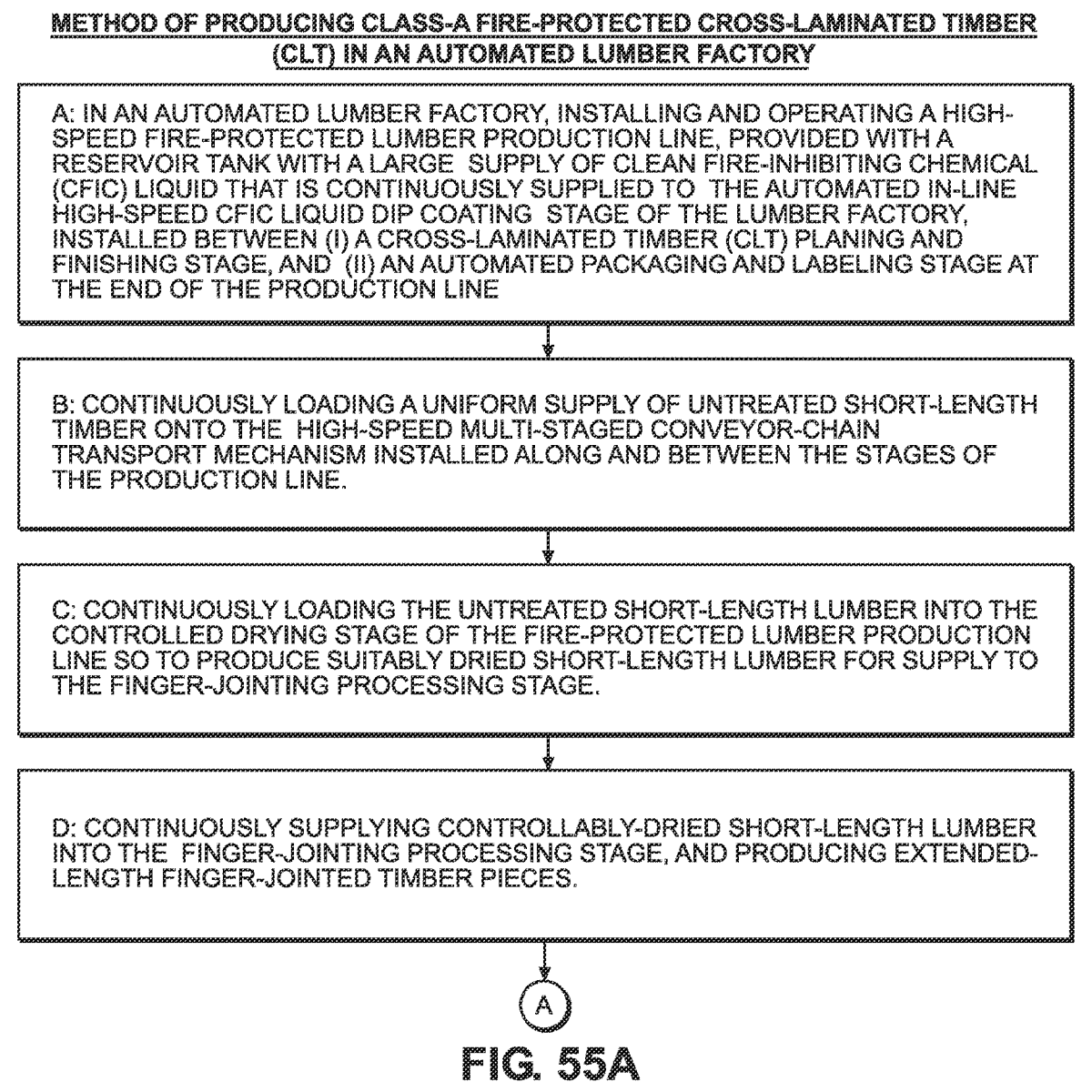

METHOD OF PRODUCING CLASS-A FIRE-PROTECTED CROSS-LAMINATED TIMBER (CLT) IN AN AUTOMATED LUMBER FACTORY

A: IN AN AUTOMATED LUMBER FACTORY, INSTALLING AND OPERATING A HIGH-SPEED FIRE-PROTECTED LUMBER PRODUCTION LINE, PROVIDED WITH A RESERVOIR TANK WITH A LARGE SUPPLY OF CLEAN FIRE-INHIBITING CHEMICAL (CFIC) LIQUID THAT IS CONTINUOUSLY SUPPLIED TO THE AUTOMATED IN-LINE HIGH-SPEED CFIC LIQUID DIP COATING STAGE OF THE LUMBER FACTORY, INSTALLED BETWEEN (I) A CROSS-LAMINATED TIMBER (CLT) PLANING AND FINISHING STAGE, AND (II) AN AUTOMATED PACKAGING AND LABELING STAGE AT THE END OF THE PRODUCTION LINE

B: CONTINUOUSLY LOADING A UNIFORM SUPPLY OF UNTREATED SHORT-LENGTH TIMBER ONTO THE HIGH-SPEED MULTI-STAGED CONVEYOR-CHAIN TRANSPORT MECHANISM INSTALLED ALONG AND BETWEEN THE STAGES OF THE PRODUCTION LINE.

C: CONTINUOUSLY LOADING THE UNTREATED SHORT-LENGTH LUMBER INTO THE CONTROLLED DRYING STAGE OF THE FIRE-PROTECTED LUMBER PRODUCTION LINE SO TO PRODUCE SUITABLY DRIED SHORT-LENGTH LUMBER FOR SUPPLY TO THE FINGER-JOINTING PROCESSING STAGE.

D: CONTINUOUSLY SUPPLYING CONTROLLABLY-DRIED SHORT-LENGTH LUMBER INTO THE FINGER-JOINTING PROCESSING STAGE, AND PRODUCING EXTENDED-LENGTH FINGER-JOINTED TIMBER PIECES.

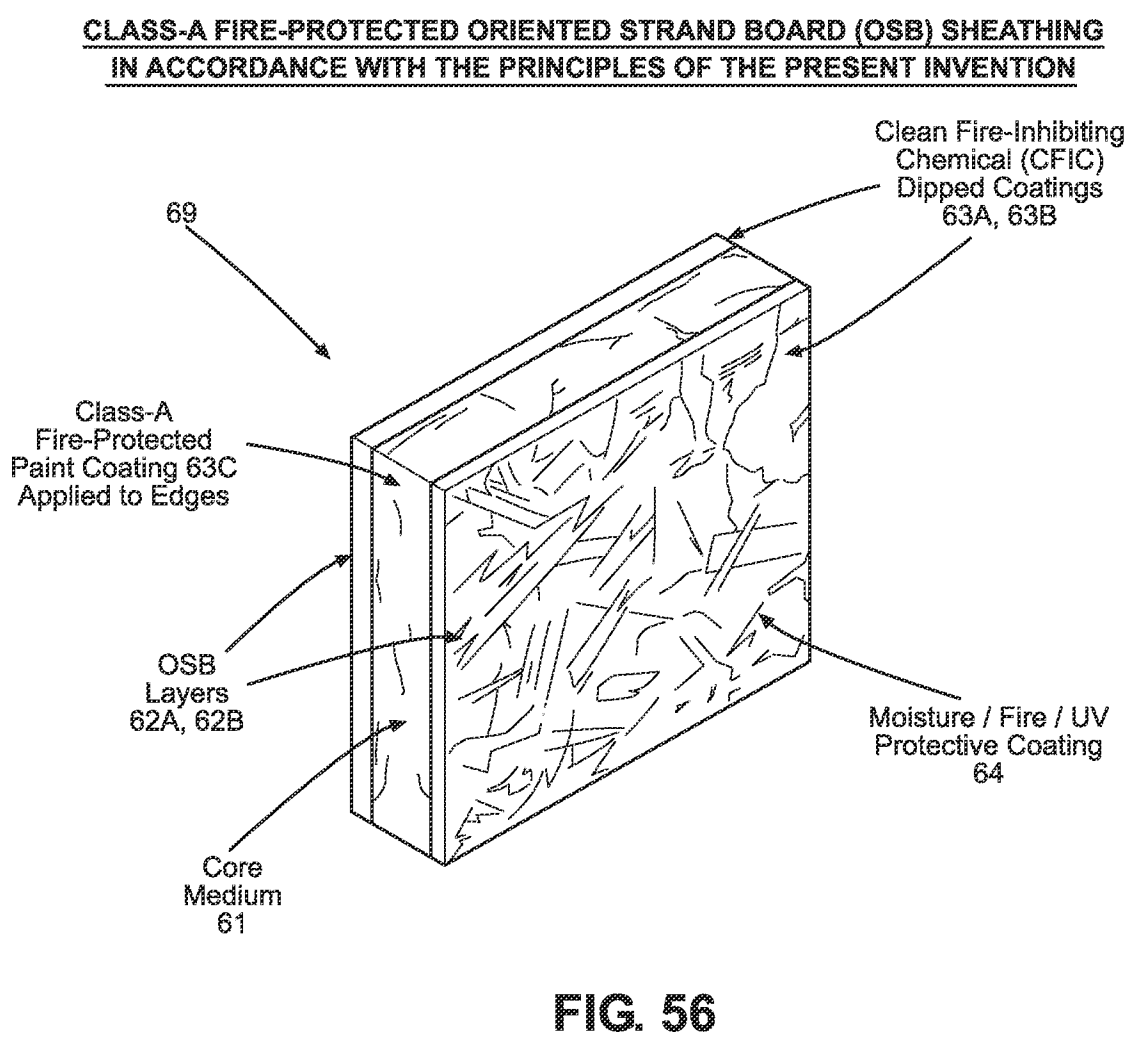

CLASS-A FIRE-PROTECTED ORIENTED STRAND BOARD (OSB) SHEATHING
IN ACCORDANCE WITH THE PRINCIPLES OF THE PRESENT INVENTION

Clean Fire-Inhibiting
Chemical (CFIC)
Dipped Coatings
63A, 63B

Moisture / Fire / UV
Protective Coating
64

69

Class-A
Fire-Protected
Paint Coating 63C
Applied to Edges

OSB
Layers
62A, 62B

Core
Medium
61

FIG. 56

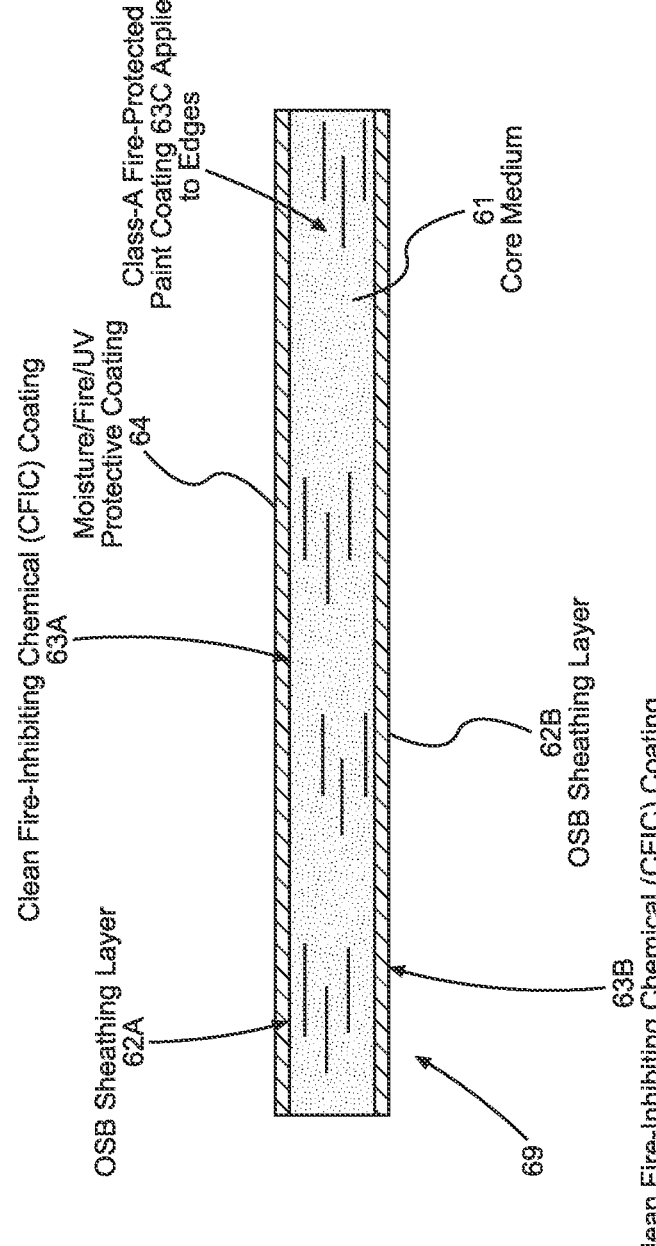

CLASS-A FIRE-PROTECTED CARBON-QUANTIZED ORIENTED STRAND BOARD (OSB) SHEATHING IN ACCORDANCE WITH THE PRINCIPLES OF THE PRESENT INVENTION

Clean Fire-Inhibiting Chemical (CFIC) Coating 63A

Moisture/Fire/UV Protective Coating 64

Class-A Fire-Protected Paint Coating 63C Applied to Edges

61 Core Medium

OSB Sheathing Layer 62A

62B OSB Sheathing Layer

63B

Clean Fire-Inhibiting Chemical (CFIC) Coating

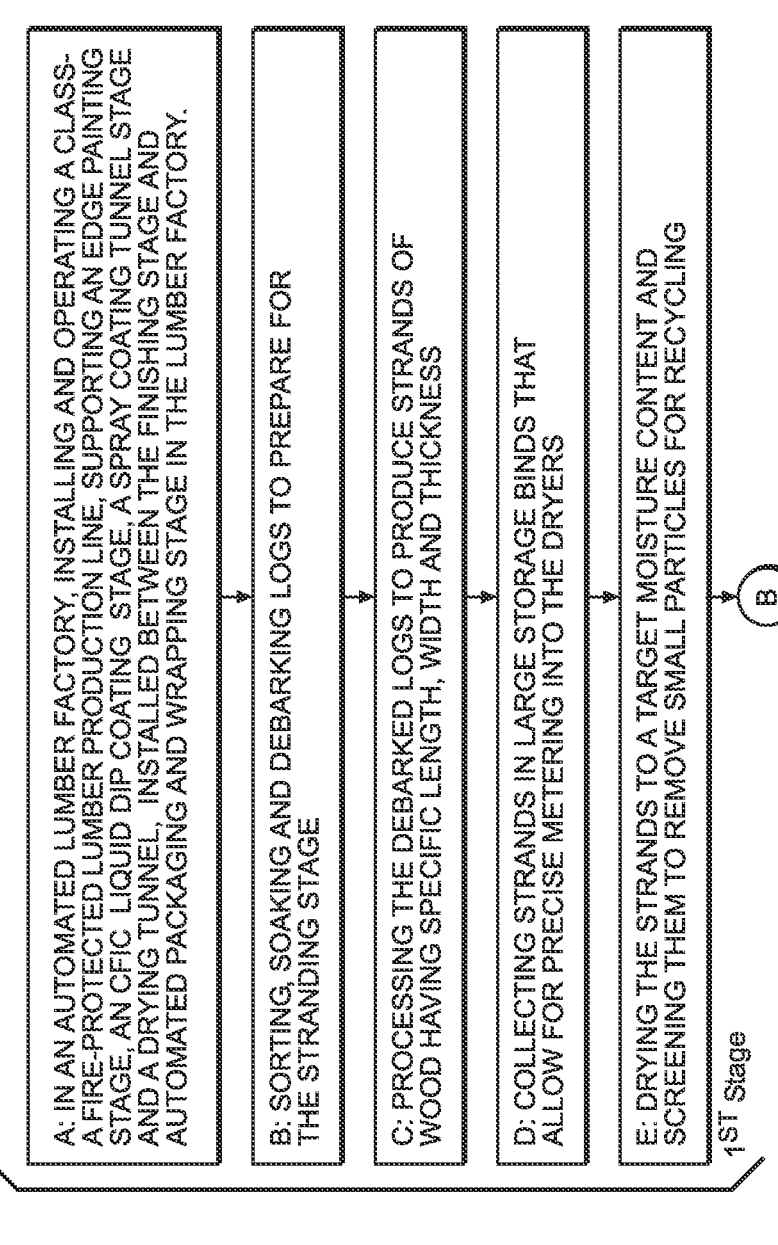

METHOD OF PRODUCING CLASS-A FIRE-PROTECTED CARBON-QUANTIZED OSB SHEATHING IN AN AUTOMATED LUMBER FACTORY

A: IN AN AUTOMATED LUMBER FACTORY, INSTALLING AND OPERATING A CLASS-A FIRE-PROTECTED LUMBER PRODUCTION LINE, SUPPORTING AN EDGE PAINTING STAGE, AN CFIC LIQUID DIP COATING STAGE, A SPRAY COATING TUNNEL STAGE AND A DRYING TUNNEL, INSTALLED BETWEEN THE FINISHING STAGE AND AUTOMATED PACKAGING AND WRAPPING STAGE IN THE LUMBER FACTORY.

B: SORTING, SOAKING AND DEBARKING LOGS TO PREPARE FOR THE STRANDING STAGE

C: PROCESSING THE DEBARKED LOGS TO PRODUCE STRANDS OF WOOD HAVING SPECIFIC LENGTH, WIDTH AND THICKNESS

D: COLLECTING STRANDS IN LARGE STORAGE BINDS THAT ALLOW FOR PRECISE METERING INTO THE DRYERS

E: DRYING THE STRANDS TO A TARGET MOISTURE CONTENT AND SCREENING THEM TO REMOVE SMALL PARTICLES FOR RECYCLING

1ST Stage

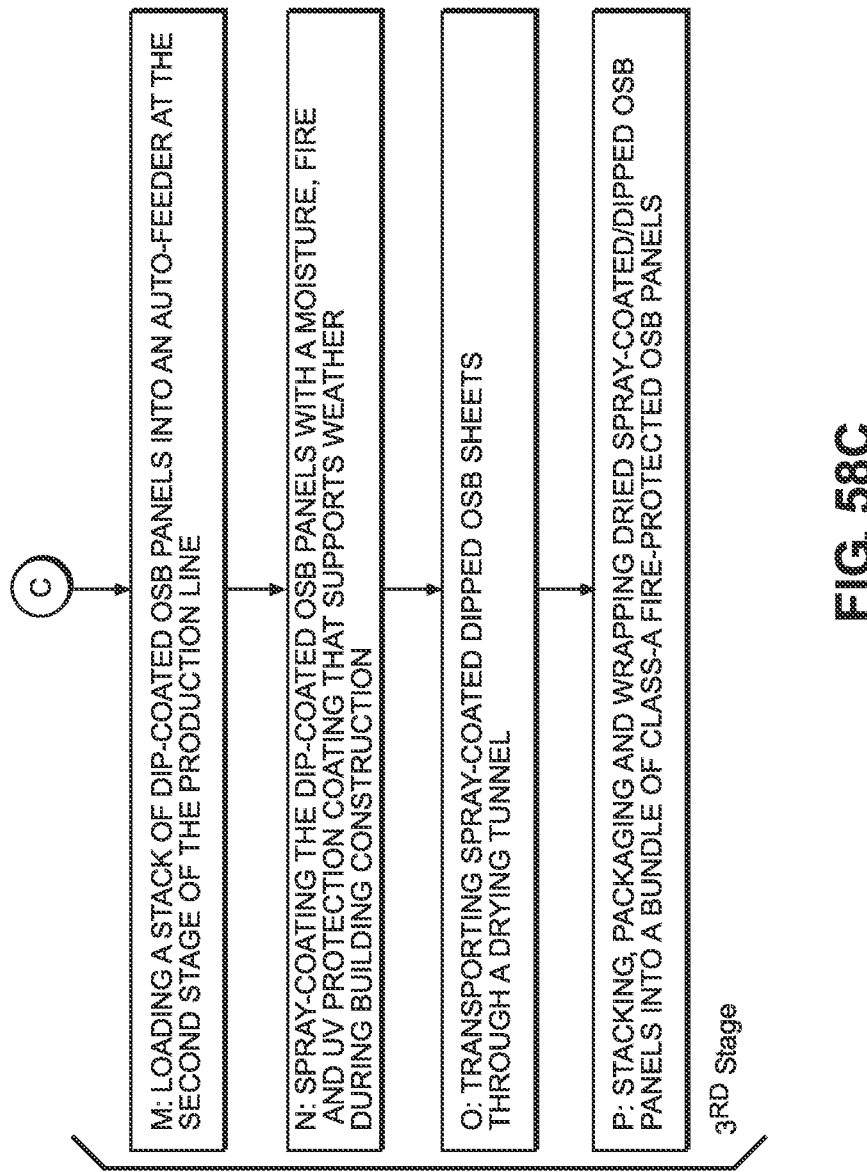

M: LOADING A STACK OF DIP-COATED OSB PANELS INTO AN AUTO-FEEDER AT THE SECOND STAGE OF THE PRODUCTION LINE

N: SPRAY-COATING THE DIP-COATED OSB PANELS WITH A MOISTURE, FIRE AND UV PROTECTION COATING THAT SUPPORTS WEATHER DURING BUILDING CONSTRUCTION

O: TRANSPORTING SPRAY-COATED DIPPED OSB SHEETS THROUGH A DRYING TUNNEL

P: STACKING, PACKAGING AND WRAPPING DRIED SPRAY-COATED/DIPPED OSB PANELS INTO A BUNDLE OF CLASS-A FIRE-PROTECTED OSB PANELS

3RD Stage

FIG. 58C

AUTOMATED LUMBER FACTORY FOR FABRICATING
CLASS-A FIRE-PROTECTED CARBON-QUANTIZED OSB PRODUCTS

AUTOMATED CFIC DIP-COATING STAGE
(2ND STAGE IN FIG. 33)

AUTOMATED SPRAY-COATING STAGE AND DRYING TUNNEL STAGE
(3RD STAGE IN FIG. 33)

ENVIRONMENTALLY-CLEAN FIRE INHIBITING BIOCHEMICAL LIQUID COMPOSITIONS FOR FORMING THIN ALKALI METAL SALT CRYSTALLINE COATINGS ON COMBUSTIBLE SURFACES TO BE PROTECTED AGAINST FIRE

RELATED CASES

The present Patent Application is a Continuation of co-pending Application patent application Ser. No. 17/167,084 filed Feb. 4, 2021, which is a Continuation-in-Part (CIP) of U.S. patent application Ser. No. 16/805,811 filed Mar. 1, 2020, now U.S. Pat. No. 11,400,324 granted 2 Aug. 2022; U.S. patent application Ser. No. 16/449,389 filed Jun. 22, 2019, now abandoned; U.S. patent application Ser. No. 15/829,944 filed Dec. 3, 2017, now U.S. Pat. No. 10,919,178 granted 16 Feb. 2021; U.S. patent application Ser. No. 16/914,067 filed Jun. 26, 2020, now U.S. Pat. No. 11,395,931 granted 26 Jul. 2022; and U.S. patent application Ser. No. 16/029,861 filed Jul. 9, 2018; wherein each said US Patent Application is incorporated herein by reference as if fully set forth herein.

BACKGROUND OF INVENTION

Field of Invention

The present invention is directed towards improvements in science and technology applied in the defense of human and animal life and property, against the ravaging and destructive forces of fire caused by lightning, accident, arson and terrorism.

Brief Description of the State of Knowledge in the Art

Throughout the ages, mankind has had a complex relationship with fire. On one hand, mankind has feared fire for its power to damage and destroy property and life during warfare and acts of terrorism. On the other hand, mankind has worshipped before fire giving thanks to the power of fire to generate heat energy to keep us warm, cook foods to provide nourishment, make medicines to heal, make tools to abridge labor, and power machines to do physical work. Thus, there has been a great need to discover new and improved ways of controlling the ignition and spread of fire, and prevent the accidental and intentional damage and destruction of property and life by fire.

While most fear the thought of wildfire raging in a forest, in modern times, there is general agreement throughout the forest management industry that wildfires have positive ecological and environmental functions when they occur deep in the forests, far away from human inhabitants and human society at large. However, when wildfires rage close to where people are living and working in towns and communities, there is strong agreement that such wildfires need to be brought under quick control and containment to minimize the risk of damage to property and lives, and mitigate the production of air, water and other forms of environmental pollution caused by wildfires.

Unfortunately, over the past century, tens of millions of people have developed and settled towns, counties and neighborhoods in regions that today are called the Wildfire Urban Interface (WUI), which are at high risk to wildfires, and this is impacting home owners and property insurance industry. In order for man to live and survive a sustainable future in the urban-wildfire interface, human society must quickly adapt in order to survive the destructive effects of wildfires.

Currently, conventional methods of wildfire fighting defense are proving inadequate because demographics have changed where people live and work relative to presence of wildfire:

Making firebreaks with bulldozers and shovels have not viable in most urbanized communities;

Making firebreaks with backfires provide ineffective and often dangerous as wildfires themselves;

Dropping PhosChek® AMP from 5000 Feet in urban areas is dangerous and not viable or effective in wildfire defense;

Thinning forests of dead trees and debris is effective in urban regions, especially near power poles, buildings and structures.

Current methods of wildfire defense and fighting are becoming unsustainable because the financial losses due to wildfire are exceeding what the insurance industry is willing to insure, as the damage caused by wildfire to the environment is typically catastrophic and total destruction.

FIG. 1 provides a table summarizing the primary conventional methods currently being used when fighting and defending against wild fires and forest fires, alike: aerial water dropping illustrated in FIG. 2A; aerial fire retardant chemical (e.g. PhosChek® Fire Retardant) dropping illustrated in FIGS. 2B1, 2B2 and 2B3; physical fire break by bulldozing, to stall the advance of wild fire; physical fire break by pre-burning, to stall the advance of wild fire; and chemical fire breaks by dropping fire retardant chemical such as PhosChek® chemical over land, to stall the advance of wild fire. While these methods are used, the results have not been adequate in most instances where wild fires rage across land under strong winds.

Except for spraying fire retardant foams and gels, all of the methods described above are generally "reactive" in nature, because they are either applied or practiced in response to the presence or incidence of wildfire, in effort to suppress and extinguish the wildfire, rather than proactively inhibiting wildfire from igniting combustible material along a wildfire's tracks moving in the direction of prevailing winds. Consequently, Phoschek® water airdrops are generally reactive methods, because these methods are applied too often when it's too late to suppress and extinguish a wildfire, and at best, airdropping this water-based fire retardant generates enormous quantities of smoke and noxious ammonia gases as well. Also, Phoschek® airdrops are very risky when applied to wildfires raging in wildfire urban interface (WUI) regions where people are living and working, because airdrops involve many tons of water falling to earth at high speed and with great force. This is little surprise when one understands the composition of this phosphorous-based chemical blended with tons of water.

Composition of Phoschek™ Fire Retardant: MAP, DAP, Gum Thickener & Coloring Agent PhosChek® MVP-F is a dry concentrate formulation that uses a combination of monoammonium phosphate [MAP; $NH_4H_2PO_4$] and diammonium phosphate [DAP; $(NH_4)_2HPO_4$] as the fire retardant salts. PhosChek® MVP-F fire retardant also contains a gum thickener to provide a medium viscosity product for improved drop characteristics. The formulation contains a coloring agent having an alarming red color. The color fades over time with exposure to sunlight. A quick look at the chemical composition of the MAP and DAP components of PhosChek® fire retardant will be illuminating.

Monoammonium phosphate (MAP) is soluble in water and crystallizes as the anhydrous salt in the tetragonal system, as elongated prisms or needles. It is practically insoluble in ethanol. Solid monoammonium phosphate (MAP) can be considered stable in practice for temperatures up to 200° C., when it decomposes into gaseous ammonia NH3 and molten phosphoric acid H3PO4. At 125° C. the partial pressure of ammonia is 0.05 mm Hg. A solution of stoichiometric monoammonium phosphate is acidic (pH 4.7 at 0.1% concentration, 4.2 at 5%).

According to the diammonium phosphate MSDS from CF Industries, Inc., decomposition starts as low as 70° C. "Hazardous Decomposition Products: Gradually loses ammonia when exposed to air at room temperature. Decomposes to ammonia and monoammonium phosphate at around 70° C. (158° F.). At 155° C. (311° F.), DAP emits phosphorus oxides, nitrogen oxides and ammonia."

When airdropped from planes, the gum thickener contained in PhosChek® fire retardant binds MAP and DAP to water to provide mass and help drop the water onto the raging wildfire in effort to extinguish it. When airdropping, most firefighters understand that they have lost control of the wildfire, and that the target wildfire is destined to rage across property populated with buildings structures including homes, then Phoschek® airdrops are made on targeted property of home owners and towns—which can be observed by the red-colored Phoschek® fire retardant coating all over ground surfaces, in effort to protect the targeted property against wildfire.

Many photographs are posted on the WWW showing the airdropping of Phoschek® fire retardant from airplanes. However, these firefighting operations should be viewed as a last ditch effort to save property and lives from a raging wildfire.

Airdropping Phoschek® infused water over wildfires is not a proactive measure of any sort, and it's often too late, too expensive, and too in-effective to be continued as a best practice to contain and subdue wildfires raging across the WUI regions of America.

Also, the use of water-based phosphorous-rich fire retardants, and pick & shovel and bulldozer methods for defending against wildfires, does not represent technological advancement, progress and firefighter and environmental safety, within the rapidly expanding wildfire urban interface (WUI) regions of America and around the world. The world must do significantly better in response to the growing threat of climate-change driven wildfires, mixed with the challenges of a viral pandemic.

Smoke-Induced Asthma is Now Presenting a Great Health Risk to Wildfire Fighters and Citizens Alike This past year, the Centers for Disease Control and Prevention (CDC) stated "when wildfires burn either in your area or many miles away, they produce smoke that may reach your community. Wildfire smoke is a mixture of gases and fine particles from burning trees and other plant materials. This smoke can hurt your eyes, irritate your respiratory system, and worsen chronic heart and lung diseases."

Also, Asthma and Allergy Foundation of America (AAFA) stated that "each year, wildfires rage across the U.S. producing smoke in the air containing tiny particles that affect air quality. These particles can irritate your eyes, nose, throat and lungs. Poor air quality can worsen asthma symptoms. Children and those with respiratory disease like asthma are at high risk for asthma episodes when the air quality is poor Wildfires do not only affect those in the immediate fire area. Smoke can blow many miles away and impact people hundreds of miles away."

The American Lung Organization stated that "wildfires, including grassland fires and forest fires, are an ongoing concern where there is dry, hot weather. During a wildfire, people throughout the surrounding area may suffer the effects of the smoke. Talk with your doctor about how to prepare for this smoke, especially if you or someone in the family fits into one of these categories: works outdoors; is under age 18 or over age 65; or has asthma, COPD or other lung diseases, chronic heart disease, or diabetes. Monitor your breathing and exposure to the smoke."

Clearly, the message from these health and health policy organizations is to "protect yourself from wildfire smoke", and that includes those wildfire fighters trying to contain and suppress raging wildfires all across the WUI regions across our Nation. Also, it is well known that, in high doses, irritants, such hydrochloric acid, sulfur dioxide and ammonia, will induce occupational asthma, and this is something that wildfire fighters should be thinking about as well. On this point, it should be noted that Phoschek® fire retardant, when used to fight against raging forest fires rapidly decomposes at 200C into gaseous ammonia NH3 and molten phosphoric acid H3PO4. Thus, when such phosphorous agents are dropped onto wildfires, in effort to suppress or quell wildfire, decomposition into gaseous ammonia will only increase the toxic effects of smoke production from wildfires.

Increased Risks of Covid-19 with Asthma

It is no secret that individuals with asthma are at substantially higher risks when exposed or infected by the Covid-19 virus. For those with asthma, there is great fear that they will have a worse outcome or be more likely to get SARS-CoV-2 (the virus that causes COVID-19). While there is currently no evidence of increased infection rates in those with asthma, the Centers for Disease Control and Prevention has stated that patients with moderate-severe asthma could be at greater risk for more severe disease.

In the May 6, 2020 N Y Times article "Will Smoke From Controlled Burns Hurt Covid-19 Patients?", Cal Fire spokesman, Scott McLean, said "What is Covid-19? A respiratory issue". And then continued by stating "We're not naïve to that, but we have to provide for the well-being of the public." The NY Times article also reported that "Forest Service officials said they were concerned that assembling a work force to conduct the burns would expose traveling employees to the virus and potentially contribute to its spread. They also raised doubts about how their fire crews could tend to burns while also abiding by social distancing directives. They said they would continue to use other methods—such as removing brush by hand and with heavy machinery that reduce combustible forest fuel without generating smoke."

Searching for Better Solutions to Fight Wildfires and Forest Firefires

U.S. Pat. No. 8,273,813 assigned to BASF Aktiengesellshaft provides a comprehensive overview of the state of the art in 2012, of worldwide efforts to develop and deliver chemical solutions for preventing and fighting wildfires and forest fires around the world.

As disclosed, firefighters have long utilized solutions of inorganic salts, for example, alkali metal or alkaline earth metal salts of carbonic acid, phosphoric acid or boric acid. The salts augment the extinguishing action of water and are used as concentrated solutions. These salts are effective because they release inert gases, for example carbon dioxide from carbonates, or melt and so form an air-impervious layer on combustible materials. In either case, access of air to combustible material is controlled. The disadvantage with this approach is the formation of a coating which is later difficult to remove. They have no cooling effect and are barely able to extinguish burning matter, since the latter, like water as well, runs off very rapidly. Any protective effect is solely due to preceding and repeated spraying of objects. A salt solution does not adhere to smooth or waxy objects, such as leaves, planks or glass panes, to any significant extent, if at all.

The use of salts of organic carboxylic acids, for example oxalic acid, tartaric acid or citric acid, in firefighting has been known since the 1970s. In contradistinction to inorganic salts mentioned above, the coatings formed from the salts of organic carboxylic acids are easy to remove after the fire has been extinguished. Examples of the use of salts of organic carboxylic acids in firefighting are identified in the following patent documents: DE-C 13 02 520, DE-A 35 25 684, EP-A 059 178, EP-A 426 178, U.S. Pat. Nos. 1,278,718, 4,888,136, 5,945,025 and WO 88/00482. A brief overview of these prior art references will be useful at this juncture.

DE-C 13 02 520 discloses the use of alkali metal salts of oxy carboxylic acids in dry extinguishing powders.

DE-A 35 25 684 describes solutions consisting of citric acid/citrate, potassium hydroxide and water that are useful for firefighting and for impregnating combustible materials. More particularly, the solution is said to be capable of binding acidic gases generated in a fire.

EP-A 059 178 Describes the Use of Concentrated Solutions of Alkali Metal Salts of Citric Acid as Extinguishing Compositions.

EP-A 426 178 discloses fire-retardant asphalt compositions, the fire-retarding component comprising potassium citrate and a silicone polymer.

U.S. Pat. No. 1,278,718 discloses compositions consisting of concentrated solutions of alkali metal salt of citric acid and alkali metal bicarbonate, as filling for fire extinguishers.

U.S. Pat. No. 4,888,136 describes the use of aluminum salts of citric acid and of lactic acid for fire-retarding impregnations of cellulosic fibers.

U.S. Pat. No. 5,945,025 describes compositions of potassium citrate and sodium bicarbonate for firefighting.

WO 88/00482 discloses compositions of matter for firefighting and for producing fire-retarding coatings based on alkali metal salts of citric acid.

The compositions mentioned above can be applied as aqueous solutions and retain their fire-retarding effect even after drying, and therefore, have a pronounced long-term effect.

The use of hydrogels was proposed more than 35 years, for example in U.S. Pat. Nos. 3,229,769 and 5,849,210, for the purpose of cooling the source of the fire by retaining water close to the flame. These hydrogels are produced from a water-absorbing polymer and water. The hydrogel binds the water and so stops the water from flowing away from the source of the fire. Because hydrogels are capable of maintaining a large amount of water near the fire, hydrogels have a good immediate extinguishing effect. In contrast, the long-term effect of hydrogels is poor. Hydrogels can dry and thereby rapidly lose their effect. The remaining salt-like dried hydrogels have a very low fire-retarding effect.

U.S. Pat. No. 8,273,813 (assigned to BASF) proposed combining water-absorbing polymers with fire-retarding salts to form fire-retarding compositions having a good immediate extinguishing effect and a good long-term effect. This fire retarding chemical solution is schematically depicted in FIG. 3A.

As illustrated in FIG. 3B, Hartindo's aqueous-based anti-fire (AF) chemical solution AF31 employs as it active ingredient, Potassium Citrate, or TPC, dissolved in water, with minor amounts of a natural gum added to provide some cling. Tripotassium citrate (TPC) is considered Generally Recognized As Safe or "GRAS" by the United States Food and Drug Administration without restriction as to the quantity of use within good manufacturing practice.

Hartidino's AF31 chemical solution has been used by others in many diverse applications, namely: (i) preventing and suppressing peat fires in Malaysia, as disclosed on Hartindo's WWW site, (ii) treating wood to provide Class-A fire-protection as taught in U.S. patent Ser. No. 10/260,232 (Conboy); and (iii) proactively treating native fuel, ground cover and fixtures and buildings on real property, for the purpose of defending life and property against the threat of wildfires, as taught in U.S. patent Ser. No. 10/653,904 assigned to Applicant/Assignee (M-Fire Holdings, LLC) employing new and innovative technologies for proactively-protecting property and life against wildfires in the WUI region. These technologies include the use of a cloud-based GPS-tracking/mapping wildfire defense system network designed to support many different methods of proactively spraying equipment for efficient GPS-tracking and mapping of environmentally-clean wildfire inhibitor spraying operations, within a secure global database, to manage the strategic creation and maintenance of clean-chemistry wildfire breaks, created out in front of and around property and life to be proactively protected from wildfires.

Applicant/Assignee's methods operates in stark contrast to conventional methods of reactively-fighting wildfires by air-dropping tons of PhosChek® containing agricultural-grade fertilizer onto raging wild fires while brave fire fighters manually create wildfire breaks using picks, shovels and bulldozers, and are exposed to life threatening risks of fire, smoke and COVID-19 viral infection. Notably, Applicant's wildfire defense methods include the use of: GPS-guided, tracking and mapping spray drones; GPS-tracking mobile/backpack sprayers; GPS-tracking vehicle-supported high-pressure sprayers; mobile computing devices; data centers; wireless networking infrastructure; and the like. Each of these GPS-tracking mobile spraying systems is deployed on and supported by the GPS-tracking/mapping wild fire defense network illustrated in U.S. Pat. No. 10,260, 232.

Clearly, in these times of climate change and narrowing gaps between wildfire regions and urbanized areas, we must adapt to and defend against wildfires in new and better and smarter ways—that are more proactive and less reactive—because "an ounce of prevention is worth a pound of cure," as Benjamin Franklin taught the world over back in the mid-1750's.

Thus, there needs to be better, safer and more effective fire inhibiting chemical compositions, and methods and technology for applying the same to proactively defend property and life from wildfires in the rapidly expanding WUI region, and to do so, without creating risks of smoke and injury to firefighters, property owners, animals, and the human population at large, while overcoming the shortcomings and drawbacks of prior art compositions, apparatus and methodologies.

OBJECTS AND SUMMARY OF THE PRESENT INVENTION

Accordingly, a primary object of the present is to provide new and improved method of and system and network for managing the supply, delivery and spray-application of safer and more effective environmentally-clean anti-fire (AF)

biochemically-based liquid compositions and materials on private and public properties to reduce the risks of damage and/or destruction to property and life caused by wild fires, while overcoming the shortcomings and drawbacks of prior art methods and apparatus.

Another object of the present invention is to provide new and improved environmentally-clean aqueous-based wildfire inhibiting biochemical compositions in liquid phase over a broad ambient working temperature range, that can be atomized and sprayed as a fine mist over ground surfaces, native ground fuel, living plants, trees and shrubs and being an effective wildfire inhibitor, when dried forming a durable gas pervious coating having improved surface coverage.

Another object of the present invention is to provide new and improved environmentally-clean aqueous-based wildfire inhibitor biochemical compositions in liquid phase over its wide ambient working temperature ranges and pressure conditions.

Another object of the present invention is to provide new and improved wildfire inhibiting liquid biochemical compositions that allows its active fire inhibiting chemistry (e.g. potassium mineral salts) to efficiently penetrate into the combustible surfaces of natural fuels during atomization spraying and quick drying operations, in effort to improve the duration of fire protection offered by potassium mineral salts contained in the new and improved wildfire inhibitor compositions formed on the surfaces when dried, and when exposed to moisture and/or high levels of relative humidity.

Another object of the present invention is to provide a new and improved environmentally-clean wildfire inhibitor liquid biochemicals formulated by (i) dissolving in a quantity of water, a first quantity of tripotassium citrate (TPC) functioning as a fire inhibitor, with a second quantity of triethyl citrate (TEC) functioning as a coalescent agent, to form a clear wildfire inhibitor solution, and after spraying or otherwise applying the wildfire inhibitor solution to a surface to be protected against wildfire, (ii) allowing potassium cations dissolved in the solution to disperse and participate in the formation of thin relatively uniform potassium citrate salt crystal structures on the treated surface and functioning as an optically transparent wildfire inhibitor coating, which once dried, will absorb water at its surface without rapid dissolution, to improve the duration of fire protection offered by the wildfire inhibitor composition in the presence of rain and ambient moisture levels.

Another object of the present invention is to provide apparatus for spraying the new and improved wildfire inhibitor liquid having a coalescent agent that promotes the formation of ultra-thin potassium mineral salt crystal structures deposited onto the organic fuel surfaces to be protected against the threat of ignition by wildfire, providing optimized methods of wildfire inhibitor deposition in outdoor environments.

Another object of the present invention is to provide a fire extinguishing and/or fire inhibiting biochemical composition of matter, comprising: (a) a dispersing agent in the form of a quantity of water, for dispersing metal ions dissolved in water; (b) a fire inhibiting agent in the form of at least one alkali metal salt of a nonpolymeric saturated carboxylic acid, for providing metal ions dispersed in the water when the at least one alkali metal salt is dissolved in the water; and (c) a coalescing agent in the form of an organic compound containing three carboxylic acid groups, or salt/ester derivatives thereof, for dispersing and coalescing the metal ions when the fire inhibiting liquid composition is applied to a surface to be protected against fire, while water molecules in the water evaporate during drying, and the metal ions cooperate to form metal salt crystal structure on the surface.

Another object of the present invention is to provide such fire extinguishing and/or fire inhibiting biochemical compositions, wherein the alkali metal salt is a sodium or potassium salt, and wherein the alkali metal salt is tripotassium citrate.

Another object of the present invention is to provide such fire extinguishing and/or fire inhibiting biochemical compositions, wherein said coalescing agent is triethyl citrate, an ester of citric acid. such fire extinguishing and/or fire inhibiting biochemical compositions.

Another object of the present invention is to provide a new and improved fire extinguishing and/or fire inhibiting biochemical composition, wherein a building material is coated with the fire retarding biochemical composition.

Another object of the present invention is to provide a new and improved fire extinguishing and/or fire inhibiting biochemical composition, wherein the biochemical composition comprises a major amount of tripotassium citrate dissolved in a major quantity of water, along with a minor amount of a coalescing agent such as triethyl citrate, an ester of citric acid.

Another object of the present invention is to provide a new and improved fire extinguishing and/or fire inhibiting biochemical composition, wherein an article of manufacture contains the biochemical composition, and the article of manufacture is selected from the group consisting of an extinguisher, an extinguishing fitting, and an extinguishing system.

Another object of the present invention is to provide a new and improved method of proactively fighting a fire comprising the steps of applying improved liquid fire inhibiting biochemical composition to the surfaces to be proactively protected from a wildfire.

Another object of the present invention is to provide a new and improved method of proactively fighting a fire such as a forest fire, a tire warehouse fire, a landfill fire, a coal stack fire, an oil field fire, a mine fire, a battlefield fire, a battleship fire, a fuel truck accident fire, or oil spill fire.

Another object of the present invention is to provide a new and improved method of proactively imparting fire resistance to an article comprising: (a) applying a liquid biochemical composition to the article; and (b) allowing the applied biochemical composition to dry on the article and form a fire inhibiting metal salt crystal coating on the article, wherein the article is a textile material, a building material, a structural component, or property to be proactively defended from a wildfire.

Another object of the present invention is to provide a new and improved environmentally-clean aqueous-based fire inhibiting liquid biochemical composition comprising: a major amount of tripotassium citrate (TPC) and a minor amount of triethyl citrate (TEC) added to and mixed with a major amount of water functioning as a solvent, carrier and dispersant of potassium salt ions dissolved in the water with the tripotassium citrate.

Another object of the present invention is to provide a new and improved inhibiting biochemical composition kit comprising: a major amount of dry tripotassium citrate monohydrate (TPC) and a minor amount of triethyl citrate (TEC), as components for mixing with a predetermined major amount of water functioning as a solvent, carrier and dispersant, to make up a predetermined quantity of environmentally-clean liquid fire inhibiting biochemical composition for proactively protecting combustible property and wood products.

Another object of the present invention is to provide a new and improved environmentally-clean aqueous-based fire inhibiting liquid biochemical composition comprising: a major amount of tripotassium citrate (TPC), a minor amount of triethyl citrate monohydrate (TEC), and a minor amounts of biocidal agent), added to and mixed with a major amount of water functioning as a solvent, carrier and dispersant.

Another object of the present invention is to provide a new and improved fire inhibiting biochemical composition kit comprising: a major amount of dry tripotassium citrate (TPC), a minor amount of triethyl citrate (TEC), and a minor amount of biocidal agent, as components for mixing with a predetermined major amount of water functioning as a solvent, carrier and dispersant, to make up a predetermined quantity of environmentally-clean liquid fire inhibiting biochemical composition for proactively protecting combustible property and wood products.

Another object of the present invention is to provide a new and improved environmentally-clean aqueous-based fire inhibiting liquid biochemical composition comprising: a major amount of tripotassium citrate monohydrate (TPC), a minor amount of triethyl citrate (TEC), and a minor amount of citric acid (CA) for adding to and mixing with a major quantity of water functioning as a solvent, carrier and dispersant.

Another object of the present invention is to provide a new and improved fire inhibiting biochemical composition kit comprising: a major amount of dry tripotassium citrate (TPC), a minor amount of triethyl citrate (TEC), and a minor amount of citric acid (CA), as components for mixing with a predetermined major amount of water functioning as a solvent, carrier and dispersant, to make up a predetermined quantity of environmentally-clean liquid fire inhibiting biochemical composition for proactively protecting combustible property and wood products.

Another object of the present invention is to provide a new and improved environmentally-clean aqueous-based fire inhibiting biochemical composition for producing good immediate extinguishing effects when applied to extinguish a burning or smoldering fire, and very good long-term fire inhibiting effects when being proactively applied to protect combustible surfaces against the threat of fire, comprising: (a) a dispersing agent realized in the form of a quantity of water, for dispersing metal ions dissolved in water; (b) a fire inhibiting agent in the form of at least one alkali metal salt of a nonpolymeric saturated carboxylic acid, for providing metal ions dispersed in the water when the at least one alkali metal salt is dissolved in the water; (c) a coalescing agent in the form of an organic compound containing three carboxylic acid groups (or salt/ester derivatives thereof), such as triethyl citrate, an ester of citric acid, for dispersing and coalescing the metal ions when the fire inhibiting liquid composition is applied to a surface to be protected against fire, while water molecules in the water evaporate during drying, and the metal ions cooperate to form metal salt crystal structure on the surface; (d) if appropriate, at least one biocide (e.g. Polyphase® PW40 Biocide from Troy Corporation or citric acid) dissolved in water; and (e) if appropriate at least one colorant.

Another object of the present invention is to provide a new and improved environmentally-clean aqueous-based fire inhibiting biochemical composition, wherein the alkali metal salts of nonpolymeric saturated carboxylic acids for inclusion in the biochemical composition comprises: alkali metal salts of oxalic acid; alkali metal salts of gluconic acid; alkali metal salts of citric acid; and also alkali metal salts of tartaric acid.

Another object of the present invention is to provide a new and improved environmentally-clean aqueous-based fire inhibiting biochemical composition, wherein said alkali metal salts of nonpolymeric saturated carboxylic acids comprise potassium carboxylates.

Another object of the present invention is to provide a new and improved environmentally-clean aqueous-based fire inhibiting biochemical composition, wherein said alkali metal salts of nonpolymeric saturated carboxylic acids comprise tripotassium citrate monohydrate (TPC).

Another object of the present invention is to provide a new and improved fire inhibiting liquid biochemical composition comprising: (a) a dispersing agent realized in the form of a quantity of water, for dispersing metal ions dissolved in the water; (b) the fire inhibiting agent is realized in the form of an alkali metal salt of a nonpolymeric saturated carboxylic acid, specifically, tripotassium citrate, for providing metal potassium ions dispersed in the water when the at least one alkali metal salt is dissolved in the water; and (c) a coalescing agent realized the form of an organic compound containing three carboxylic acid groups or salt/ester derivatives thereof, specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form a thin potassium citrate salt crystal structure on the treated surface to be protected against ignition by fire.

Another object of the present invention is to provide a new and improved A fire inhibiting liquid biochemical composition comprising: (a) a dispersing agent realized in the form of a quantity of water, for dispersing metal ions dissolved in the water; (b) the fire inhibiting agent is realized in the form of an alkali metal salt of a nonpolymeric saturated carboxylic acid, specifically, tripotassium citrate, for providing metal (potassium) ions dispersed in the water when the at least one alkali metal salt is dissolved in the water; (c) a coalescing agent realized the form of an organic compound containing three carboxylic acid groups or salt/ester derivatives thereof, specifically triethyl citrate, an ester of citric acid, for dispersing and coalescing the metal potassium ions when the fire inhibiting liquid composition is applied to a surface(s) to be proactively protected against fire, and while water molecules in the water evaporate during drying, the metal potassium ions cooperate to form potassium citrate salt crystal structures on the treated surfaces; and (d) at least one biocide agent dissolved in the quantity of water.

Another object of the present invention is to provide a new and improved A fire inhibiting liquid biochemical composition comprising: (a) a dispersing agent realized in the form of a quantity of water, for dispersing metal ions dissolved in the water; (b) the fire inhibiting agent is realized in the form of an alkali metal salt of a nonpolymeric saturated carboxylic acid, specifically, tripotassium citrate, for providing metal (potassium) ions dispersed in the water when the at least one alkali metal salt is dissolved in the water; (c) a coalescing agent realized the form of an organic compound containing three carboxylic acid groups (or salt/ester derivatives thereof), specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form potassium citrate salt crystal structure on the treated surface; and (d) at least one biocide agent in the form of citric acid dissolved in the quantity of water.

Another object of the present invention is to provide a new and improved environmentally-clean aqueous-based fire inhibiting liquid biochemical composition of the present invention consisting of tripotassium citrate (TPC) and tri-ethyl citrate (TEC) formulated with water functioning as a solvent, carrier and dispersant in the biochemical composition.

Another object of the present invention is to provide a new and improved fire-extinguishing and/or fire-retarding biochemical composition produced by stirring components into water, in amounts substantially proportional to, the formulation comprising: 0.05 pounds by weight of triethyl citrate as coalescing agent, (20.3 milliliters by volume); 5.2 pounds by weight of tripotassium citrate (64 fluid ounces by volume); and 4.4 pounds by weight of water (64 fluid ounces by volume), to produce a resultant solution of total weight of 9.61 pounds having 128 ounces or 1 gallon of volume.

Another object of the present invention is to provide a new and improved fire-extinguishing and/or fire-retarding biochemical composition kit comprising components, in amounts substantially proportional to: 0.05 pounds by weight of triethyl citrate as coalescing agent, (20.3 milliliters by volume); 5.2 pounds by weight of tripotassium citrate (64 fluid ounces by volume). for blending and mixing together with 4.4 pounds by weight of water (64 fluid ounces by volume), to produce a resultant solution of total weight of 9.61 pounds having 128 ounces or 1 gallon of volume.

Another object of the present invention is to provide a new and improved fire-extinguishing and/or fire-retarding biochemical composition produced by stirring components into water, in amounts substantially proportional to, the formulation comprising: 0.05 pounds by weight of triethyl citrate as coalescing agent, (20.3 milliliters by volume); 5.2 pounds by weight of tripotassium citrate (64 fluid ounces by volume); 4.0 ounces by weight of a biocide (e.g. Poly-phase® PW40 by Troy Chemical); and 4.4 pounds by weight of water (64 fluid ounces by volume), to produce a resultant solution of total weight of 10.00 pounds having 128 ounces or 1 gallon of volume.

Another object of the present invention is to provide a new and improved fire-extinguishing and/or fire-retarding biochemical composition kit comprising components, in amounts substantially proportional to: 0.05 pounds by weight of triethyl citrate as coalescing agent, (20.3 milliliters by volume); 5.2 pounds by weight of tripotassium citrate (64 fluid ounces by volume); 4.0 ounces by weight of a biocide agent (e.g. Polyphase® PW40 by Troy Chemical), for blend-ing and mixing together with 4.4 pounds by weight of water (64 fluid ounces by volume), to produce a resultant solution of total weight of 10.0 pounds having 128 ounces or 1 gallon of volume.

Another object of the present invention is to provide a new and improved fire-extinguishing and/or fire-retarding biochemical composition produced by stirring components into water, in amounts substantially proportional to, the formulation comprising: 0.05 pounds by weight of triethyl citrate as coalescing agent, (20.3 milliliters by volume); 5.2 pounds by weight of tripotassium citrate (64 fluid ounces by volume); 4.0 ounces by weight of a biocide agent in the form of citric acid; and 4.4 pounds by weight of water (64 fluid ounces by volume), to produce a resultant solution of total weight of 10.00 pounds having 128 ounces or 1 gallon of volume.

Another object of the present invention is to provide a new and improved fire-extinguishing and/or fire-retarding biochemical composition kit comprising components, in amounts substantially proportional to: 0.05 pounds by weight of triethyl citrate as coalescing agent, (20.3 milliliters by volume); 5.2 pounds by weight of tripotassium citrate (64 fluid ounces by volume); and 4.0 ounces by weight of a biocide agent in the form of citric acid, for blending and mixing together with 4.4 pounds by weight of water (64 fluid ounces by volume), to produce a resultant solution of total weight of 10.0 pounds having 128 ounces or 1 gallon of volume.

Another object of the present invention is to provide a new and improved fire inhibiting biochemical composition comprising: a major amount from 1% to 65% by weight, preferably from 20% to 50% by weight and more preferably from 30% to 55% by weight, of at least one alkali metal salt of a nonpolymeric saturated carboxylic acid such as tripo-tassium citrate monohydrate; and a minor amount from 0.08% to 5% by weight, preferably from 0.5% to 2% by weight and more preferably from 0.1% to 1.0% by weight, of triethyl citrate, an ester of citrate acid; wherein the sum by % weight of the components above should not exceed 100% by weight.

Another object of the present invention is to provide a new and improved fire inhibiting biochemical composition, wherein the water content is present in a major amount and is typically not less than 30% by weight, preferably not less than 40% by weight, more preferably not less than 50% by weight and most preferably not less than 60% by weight and preferably not more than 60% by weight and more prefer-ably not more than 70% by weight, all based on the fire inhibiting biochemical composition.

Another object of the present invention is to provide a GPS-tracking, mapping and recording techniques that enable a population to know where environmentally-clean-wildfire chemistry-based wildfire breaks and zones have been formed by whom, and when using the principles of the present invention.

Another object of the present invention is to provide a wildfire defense network supporting integrated GPS-track-ing, mapping and recording techniques, that enable fire jurisdictions to plan and implement clean-chemistry wildfire breaks and zones (e.g. around telephone poles) to proac-tively protect property and life from raging wildfires—by effectively inhibiting specific regions of combustible fuel from ignition and flame spread, along the path towards targeted property and life to be protected from the incidence of wildfire.

Another object of the present invention is to provide a method of spraying an ultra-thin layer of wildfire inhibiting liquid biochemical compositions onto combustible ground cover and surfaces to be proactively protected against the presence of wildfire, so that when the water molecules in the wildfire inhibiting liquid chemicals evaporate during drying operations, ultra-thin potassium salt crystal structures form on the surfaces, to provide potassium cations available to inhibit the wildfire along one or more pathways including, for example, interruption of free radical chain reactions driving the combustible phase of wildfire, taking the energy out of the wildfire, reducing the production of smoke, and protecting property that has been treated in advance of a wildfire incidence.

Another object of the present invention is to provide a new and improved environmentally-clean wildfire inhibiting liquid biochemical compositions formulated so that, when applied in hot dry climates, conditioned by hot dry prevailing winds, the relative humidity will be expectedly low, and in the absence of rain, the all-natural wild fire inhibiting liquid of the present invention sprayed over wild fire break and zone regions, will last for durations into weeks and months in many situations.

Another object of the present invention is to provide wireless network for GPS-tracking when and where the new and improved environmentally-clean wildfire inhibiting liquid biochemical composition is spray applied, and documenting the same in a wireless network database, so that, whenever rain occurs, the wireless network can inform and advise fire departments and homeowners using mobile phones or computing systems that certain GPS-specified environmentally-clean wildfire breaks and zones require maintenance by an additional spraying of the wildfire inhibitor liquid, while GPS-tracking, mapping and recording the spraying operations on the wireless network, for management purposes.

Another object of the present invention is to provide a new and improved methods for spraying environmentally-clean wildfire inhibiting liquid biochemical compositions to form GPS-tracked clean chemistry wildfire breaks—well in advance of the incidence of wild fires moving in the direction of prevailing winds.

Another object of the present invention is to provide a novel method of proactive wildfire defense in the WUI region using natural safe potassium mineral salts that pose zero to little threat to our natural environments or human beings and animals living in these WUI regions, where homes and businesses exist.

Another object of the present invention is to provide a new and improved methods of spraying utility poles and infrastructure with new and improved environmentally-clean wildfire inhibiting liquid biochemical compositions and tracking and documenting the same on a GPS-based wireless system network so that fire jurisdictions can plan and implement clean-chemistry wildfire breaks and zones (e.g. around telephone poles) to proactively protect property and life from a raging wildfire seeking combustible fuel by interrupting the combustible phase of the wildfire, reducing the production of smoke, and protecting property that has been treated in advance of a wildfire incidence.

Another object of the present invention is to provide a new and improved method of and apparatus for GPS-tracking and mapping operations involving the spraying of an environmentally-clean aqueous-based wildfire inhibiting biochemicals on property surfaces having native fuel, and other combustible structures, including wood buildings, decks, fences, etc. prior to the arrival or outbreak of a wildfire.

Another object of the present is to provide method of reducing the risks of damage to private property due to wild fires by centrally managed application of wildfire inhibiting biochemical liquid spray to ground cover and building surfaces prior to arrival of the wild fires.

Another object of the present is to provide method of reducing the risks of damage to private property due to wild fires using a global positioning satellite (GPS) system and mobile communication messaging techniques, to help direct the application of AF chemical liquid prior to the arrival of wild fires.

Another object of the present invention is to provide a new and improved system for wild fire suppression and neighborhood and home defense comprising a platoon of small planes, all-terrain vehicles (ATVs) and other mobile systems adapted for spraying an environmentally-clean anti-fire (AF) chemical liquid that clings to the ground cover, and buildings, where applied in regions of high wild fire risk, that operates in both wet and dry states of application.

Another object of the present invention is to provide a new and improved system for wild fire suppression and home defense system comprising (i) a plurality of home wild-fire defense systems assigned to each home or building in the strategic area, for spraying the outside of their homes and surrounding ground cover with the environmentally-clean anti-fire biochemical spray liquid, (ii) a command center for managing wild fire pre-defense operations in the region, involving the spray application of the environmentally-clean anti-fire biochemical spray liquid to create and maintain strategic fire breaks in the region in advance of the outbreak of wild fires, and protection of homes and property in the region against wild fires breaking out in the region, and sending messages and instructions to home owners in the region as well as operators of the small planes and ATVs deployed in the system, and (iii) a mobile application installed on the mobile phone of each home owner in the strategic region, and configured for receiving email and/or SMS messages from a command center managing the system, and instructing home owners to pre-defend their homes using the environmentally-clean anti-fire biochemical spray liquid.

Another object of the present invention is to provide a new and improved system for wild fire suppression and home defense system, wherein each home defense spray system includes a GPS-tracking and radio-controlled circuit board to remotely monitor the location of each location-deployed home defense spray system and automatically monitor the anti-fire chemical liquid level in its storage tank, and automatically generate electronic refill orders sent to the command center, so that a third-party service can automatically replenish the tanks of such home-based systems with anti-fire biochemical liquid when the fluid level falls below a certain level in the GPS-tracked tank.

Another object of the present invention is to provide a new and improved system for wild fire suppression and home defense system, wherein the mobile application supporting the following functions: (i) sends automatic notifications from the command center to home owners with the mobile application, instructing them to spray their property and home at certain times with anti-fire chemical liquid in their tanks; (ii) the system will automatically monitor consumption of sprayed AF biochemical liquid and generate auto-replenish order via its onboard GSM-circuits so as to achieve compliance with the home spray-based wild-fire-defense program, and report anti-fire biochemical liquid levels in each home-owner tank; and (iii) show status of wild fire risk in the region, and actions to the taken before wild fire outbreak.

Another object of the present invention is to provide a GPS-guided method of suppressing a wild fire raging towards a target region of land in a direction determined by currently blowing winds and other environmental and weather factors.

Another object of the present invention is to provide a method of reducing the risks of damage to public property due to wild fires by managed application of anti-fire biochemical liquid spray to ground cover and building surfaces prior to arrival of the wild fires.

Another object of the present invention is to provide a wireless system for managing the supply, delivery and spray-application of environmentally-clean anti-fire biochemical liquid on private and public property to reduce the risks of damage and/or destruction caused by wild fires.

Another object of the present invention is to provide a new and improved system for spraying a defensive path around vulnerable neighborhoods out in front of wild fires to make sure that an environmentally-safe fire break, created by the spray application of anti-fire biochemical liquid, defends homes from the destructive forces of raging wild fires.

Another object of the present invention is to provide a new and improved system and method of mitigating the damaging effects of wild fires by spraying environmentally-clean anti-fire biochemical liquid in advance of wild fires, that do not depend on water to extinguish fire, such that, even after a month or two after spray application on dry brush around the neighborhood, the anti-fire chemical continues to work by stalling the ability of a fire to advance and consume homes.

Another object of the present invention is to provide new and improved methods of and apparatus for protecting wood-framed buildings from wild fires by automatically spraying water-based environmentally clean anti-fire chemical liquid over the exterior surfaces of the building, surrounding ground surfaces, shrubs, decking and the like, prior to wild fires reaching such buildings.

Another object of the present invention is to provide new and improved method of suppressing a wild fire raging across a region of land in the direction of the prevailing winds.

Another object of the present invention is to provide a method of and apparatus for applying fire and smoke inhibiting compositions on ground surfaces before the incidence of wild-fires, and also thereafter, upon smoldering ambers and ashes to reduce smoke and suppress fire re-ignition.

Another object of the present invention is to provide a method of and apparatus applying by an aqueous-based fire and smoke inhibiting slurry formulation that can hydraulically sprayed around whole neighborhoods to create strategic chemical-type fire breaks that remove wild fire energy before such wildfires arrive at the doors of homes and businesses.

Another object of the present invention is to provide a method of spraying a clean fire and smoke inhibiting slurry composition containing clean fire inhibiting chemicals, and cellulose or wood fiber, mixed with water and other additives, for application to ground surfaces in advance of wild fire, to blanket grounds from wildfire ignition, and also application over smoldering ambers and ashes to prevent resignation while saving millions of gallons of water, and producing considerable waste water and reducing toxic run off, while reducing toxic smoke.

Another object of the present invention is to provide equipment for applying such fire and smoke inhibiting slurry mixtures to ground surfaces, after the presence of wildfire, to prevent smoke smoldering and resignation of fires, without creating toxic water runoff which occurs using conventional methods based on the application of water by fire hoses.

Another object of the present is to provide a new and improved Class-A fire-protected oriented strand board (OSB) sheathing comprising a clean fire inhibiting biochemical coatings deposited on the surface of each OSB layer and sides of the core medium layer.

Another object of the present is to provide a method of producing Class-A fire-protected finger-jointed lumber from an automated factory having a production line with a plurality of stages.

Another object of the present is to provide an automated lumber production factory for producing Class-A fire-protected finger-jointed lumber pieces in a bundle.

Another object of the present is to provide such an automated lumber production factory, wherein Class-A fire-protected finger-jointed lumber pieces are produced for use in wood-framed building construction.

Another object of the present is to provide new and improved Class-A fire-protected oriented strand board (OSB) sheeting, spray-coated with clean fire inhibiting biochemical composition liquid.

Another object of the present is to provide new and improved Class-A fire-protected oriented strand board (OSB) i-joist spray-coated with clean fire inhibiting biochemical composition liquid.

These and other benefits and advantages to be gained by using the features of the present invention will become more apparent hereinafter and in the appended Claims to Invention.

BRIEF DESCRIPTION OF THE DRAWINGS

The following Objects of the Present Invention will become more fully understood when read in conjunction of the Detailed Description of the Illustrative Embodiments, and the appended Drawings, wherein:

FIG. 1 is a table listing conventional prior art methods for fighting and defending against wild fires including (i) aerial water drop methods using airplanes and helicopters, (ii) aerial fire retardant chemical (e.g. PhosChek® Fire Retardant) drop using airplanes and helicopters, (iii) physical fire breaks formed by bulldozing land and other landscaping methods to remove combustible vegetation from the land, (iv) physical fire breaks by pre-burning combustible material on the land, and (v) chemical fire break by fire retardant chemical drop;

FIG. 2B1 is a second image illustrating a prior art method of wild fire suppression involving an airplane dropping chemical fire retardant (e.g. PhosChek®) on a wild fire, from the sky;

FIG. 2B2 is third image showing a prior art ground-based tank containing the chemical fire retardant (e.g. PhosChek® fire retardant chemical) that is shown being contained in a storage tank in FIG. 2B2, and dropped from an airplane in FIG. 2B1;

FIG. 2B3 is a fourth image showing a prior art ground-based tank containing a supply of PhosChek® fire retardant chemical mixed in the tank shown in FIG. 2B3, and dropped from an airplane in FIG. 2B1;

FIG. 2B4 is a schematic representation illustrating the primary components of the PhosChek® fire retardant chemical, namely monoammonium phosphate (MAP), diammonium hydrogen phosphate (DAP) and water;

FIG. 6A1 is a schematic representation illustrating the primary components of a first environmentally-clean aqueous-based fire inhibiting liquid biochemical composition of the present invention consisting of major amounts of tripotassium citrate (TPC) and minor amounts of triethyl citrate (TEC) formulated with water functioning as a solvent, carrier and dispersant;

FIG. 6A2 is a schematic representation illustrating the primary components of a first fire inhibiting biochemical composition kit of the present invention, consisting of major amounts of dry tripotassium citrate monohydrate (TPC) and minor amounts of triethyl citrate (TEC), as components in a package prepared and ready for mixing with a predetermined quantity of water functioning as a solvent, carrier and dispersant, to make up a predetermined quantity of environmentally-clean liquid fire inhibiting biochemical composition for proactively treating and protecting wood products;

FIG. 6B1 is a schematic representation illustrating the primary components of a second environmentally-clean aqueous-based fire inhibiting liquid biochemical composition of the present invention consisting of major amounts of tripotassium citrate (TPC), minor amounts of triethyl citrate monohydrate (TEC), and minor amounts of biocidal agent (e.g. Polyphase® PW40 biocide), formulated with water functioning as a solvent, carrier and dispersant;

FIG. 6B2 is a schematic representation illustrating the primary components of the second fire inhibiting biochemical composition kit of the present invention, consisting of a major amount of dry tripotassium citrate (TPC), a minor amount of triethyl citrate (TEC), and a minor amount of biocidal agent (e.g. Polyphase® PW40 biocide), as components in a package prepared and ready for mixing with a predetermined quantity of water functioning as a solvent, carrier and dispersant, to make up a predetermined quantity of environmentally-clean liquid fire inhibiting biochemical composition for proactively treating and protecting wood products;

FIG. 6C1 is a schematic representation illustrating the primary components of a second environmentally-clean aqueous-based fire inhibiting liquid biochemical composition of the present invention consisting of a major amount of tripotassium citrate monohydrate (TPC), a minor amount of triethyl citrate (TEC), and a minor amount of citric acid (CA) formulated with water functioning as a solvent, carrier and dispersant;

FIG. 6C2 is a schematic representation illustrating the primary components of the second fire inhibiting biochemical composition kit of the present invention, consisting of a major amount of dry tripotassium citrate (TPC), a minor amount of triethyl citrate (TEC), and a minor amount of citric acid (CA), as components in a package prepared and ready for mixing with a predetermined quantity of water functioning as a solvent, carrier and dispersant, to make up a predetermined quantity of environmentally-clean liquid fire inhibiting biochemical composition for proactively treating and protecting wood products;

FIG. 10B is a schematic representation of the autonomously-driven or remotely-controlled aircraft system (i.e. drone) shown in FIG. 10A, comprising a GPS-tracked and remotely monitored AF chemical liquid spray control subsystem interfaced with a micro-computing platform for monitoring the spraying of AF chemical liquid from the aircraft when located at specific GPS-indexed location coordinates, and automatically logging and recording such AF spray application operations within the network database system;

FIG. 11B is a schematic representation of the GPS-tracked aircraft system (i.e. helicopter) shown in FIG. 11A, comprising a GPS-tracked and remotely monitored AF chemical liquid spray control subsystem interfaced with a micro-computing platform for monitoring the spraying of AF chemical liquid from the aircraft when located at specific GPS-indexed location coordinates, and automatically logging and recording such AF spray application operations within the network database system;

FIG. 12B is the GPS-tracked all-terrain vehicle (ATV) system shown in FIG. 12A, comprising a GPS-tracked and remotely-monitored AF chemical liquid spray control subsystem interfaced with a micro-computing platform for monitoring the spraying of AF chemical liquid from the system when located at specific GPS-indexed location coordinates, and automatically logging and recording such AF spray application operations within the network database system;

Figure 13C:
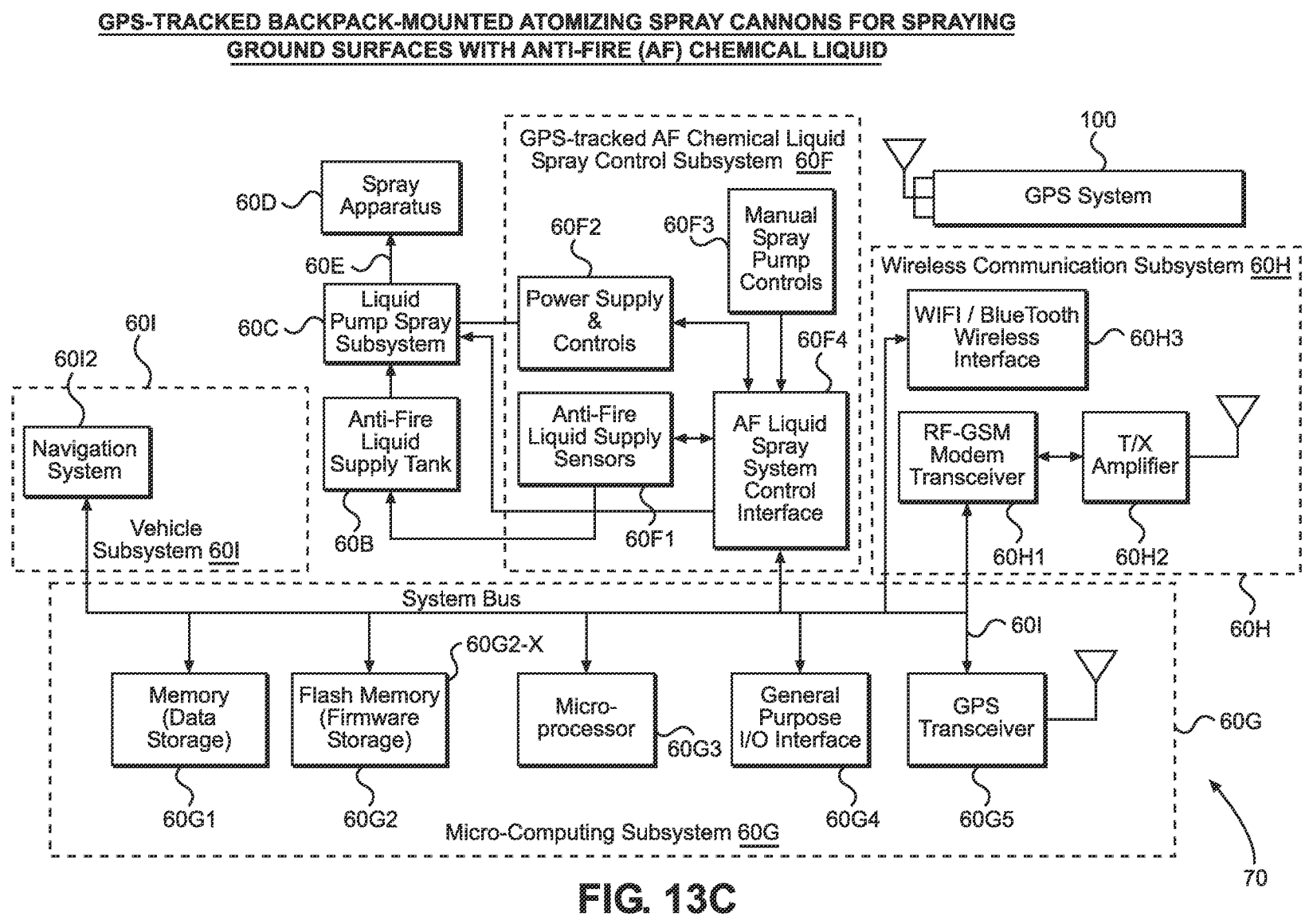

FIG. 13C is the GPS-tracked backpack mounted atomizing spray cannon system shown in FIG. 13A, comprising a GPS-tracked and remotely-monitored AF chemical liquid spray control subsystem interfaced with a micro-computing platform for monitoring the spraying of environmentally-clean AF chemical liquid from the system when located at specific GPS-indexed location coordinates, and automatically logging and recording such AF spray application operations within the network database system;

FIG. 14D is a schematic block diagram of the GPS-tracked spray cannon vehicle (ASPV) system shown in FIGS. 14A, 14B and 14C, comprising a GPS-tracked and remotely-monitored AF chemical liquid spray control subsystem interfaced with a micro-computing platform for monitoring the spraying of fire inhibiting biochemical liquid from the system when located at specific GPS-indexed location coordinates, and automatically logging and recording such AF spray application operations within the network database system;

FIG. 15B is the GPS-tracked portable wheel-mounted atomizing spray cannon system shown in FIG. 15A, comprising a GPS-tracked and remotely-monitored AF chemical liquid spray control subsystem interfaced with a micro-computing platform for monitoring the spraying of environmentally-clean biochemical liquid from the system when located at specific GPS-indexed location coordinates, and automatically logging and recording such AF spray application operations within the network database system;

Figure 16B:
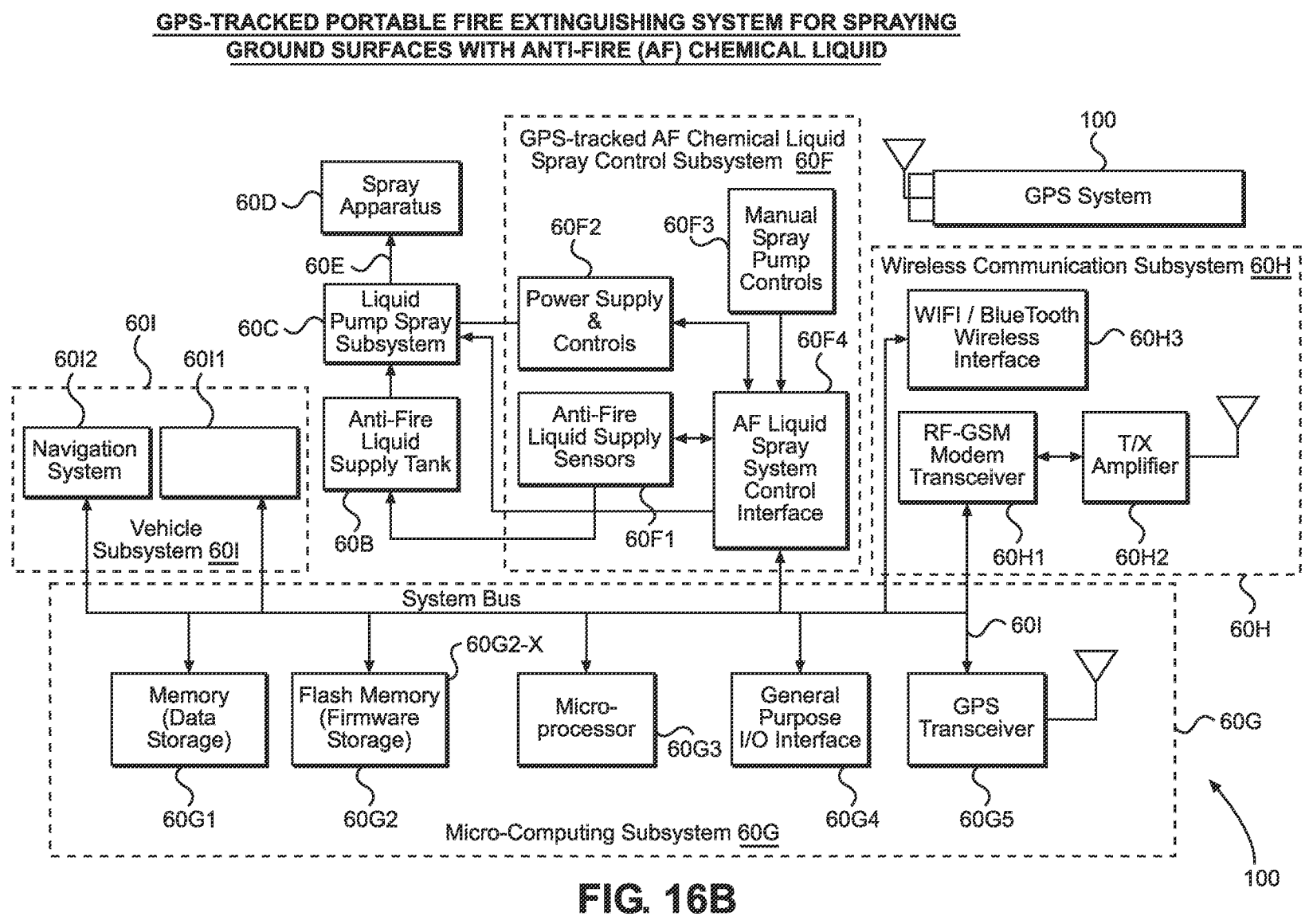

FIG. 16B is the GPS-tracked backpack-mounted atomizing spraying system shown in FIG. 13A, comprising a GPS-tracked and remotely-monitored AF chemical liquid spray control subsystem interfaced with a micro-computing platform for monitoring the spraying of environmentally-clean biochemical liquid from the system when located at specific GPS-indexed location coordinates, and automatically logging and recording such AF spray application operations within the network database system;

FIG. 17B is the GPS-tracked mobile remotely-controllable atomizing spray cannon system shown in FIG. 13A, comprising a GPS-tracked and remotely-monitored AF chemical liquid spray control subsystem interfaced with a micro-computing platform for monitoring the spraying of environmentally-clean AF chemical liquid from the system when located at specific GPS-indexed location coordinates, and automatically logging and recording such AF spray application operations within the network database system;

FIG. 19D is an exemplary wire-frame model of a graphical user interface supported by the mobile application showing a user requesting a refill supply of clean anti-fire biochemical liquid for supply to GPS-specified spray equipment registered on the system network;

FIG. 20A is an exemplary wire-frame model of a graphical user interface supported by the mobile application for use by command center administrators to issue wild-fire protection orders using the system network of the present invention;

FIG. 20C is an exemplary wire-frame models of a graphical user interface supported by the mobile application for use by command center administrators to order the creation and/or maintenance of a GPS-specified environmentally-clean biochemical firebreak on one or more public/private property parcels, using the methods of the present invention;

FIG. 20D is an exemplary wire-frame models of a graphical user interface for the mobile application used by command center administrators to receive messages from users including property owners and contractors requesting refills for clean anti-fire biochemical liquid for GPS-specified spray system equipment;

FIG. 23 is an exemplary anti-fire spray protection task report generated by the system of the present invention for state/county xxx on 15 Dec. 2017, indicating which properties on what streets, in what town, county, state, requires the reapplication of AF chemical liquid spray treatment in view of factors such as weather (e.g. rainfall, sunlight) and passage of time since last fire inhibiting biochemical spray application;

FIG. 24 is a schematic representation showing a plan view of a wild fire emerging from a forest region and approaching a neighboring town moving in the direction of prevailing winds;

FIG. 25 is a graphical representation illustrating a method of suppressing a wild fire raging across a region of land in the direction of the prevailing winds, by forming a multi-stage anti-fire biochemical fire-break system, by GPS-controlled application of anti-fire (AF) liquid mist and spray streams;

FIGS. 26A and 26B set forth a flow chart describing the high level steps of the method of suppressing a wild fire raging towards a target region of land in a direction determined by prevailing winds and other environmental and weather factors, as schematically illustrated in FIG. 25;

FIGS. 28A, 28B and 28C, taken together, set forth a flow chart describing the high level steps carried out by the method of reducing the risks of damage to private property due to wild fires by managed application of anti-fire biochemical liquid spray, using the system network and methods of the present invention, as illustrated in FIG. 27;

FIG. 29 is a graphical illustration showing a method of reducing the risks of damage to public property due to wild fires, by GPS-controlled application of anti-fire biochemical liquid spray over ground cover and building surfaces prior to the arrival of wild fires, using the system network and methods of the present invention;

FIGS. 30A, 30B and 30C, taken together, set forth a flow chart describing the high level steps carried out by the method of reducing the risks of damage to public property due to wild fires by GPS-controlled application of anti-fire biochemical liquid spray, using the system network and methods of the present invention, as illustrated in FIG. 29;

FIG. 31 is a graphical illustration showing a method of remotely managing the GPS-controlled application of environmentally-clean anti-fire biochemical liquid spray of the present invention to ground cover and buildings so as to reduce the risks of damage due to wild fires, using the system network and methods of the present invention;

FIGS. 32A and 32B, taken together, set forth a flow chart describing the high level steps carried out by the method of GPS-controlled application of anti-fire biochemical liquid spray to ground cover and buildings so as to reduce the risks of damage due to wild fires, using the system network and methods of the present invention;

FIG. 35 is a flow chart describing the method of applying fire and smoke inhibiting slurry compositions of the present invention on ground surfaces before the incidence of wildfires, and also thereafter, upon smoldering ambers and ashes to reduce smoke and suppress fire re-ignition;

FIG. 36 is a base hydraulic mulch loading chart for making the fire and smoke inhibiting slurry mixture of the present invention, using Profile® brand mulch fiber, for several different application rates measured in lbs./acre (e.g. 1500 lbs./acre, 2000 lb./acre, and 2500 lb./acre);

FIG. 38 is a schematic representation of a highway surrounded by a high-risk wildfire region on both sides, wherein a clean biochemical wild-fire break region is hydraulically sprayed on both sides of the highway using the clean fire and smoke inhibiting slurry composition of the present invention;

FIGS. 42F1 and 42F2 show side and front perspective views of 360 degree rotating sprinkler heads for mounting on building rooftops and integrated into the system of FIG.

Figure 2A:
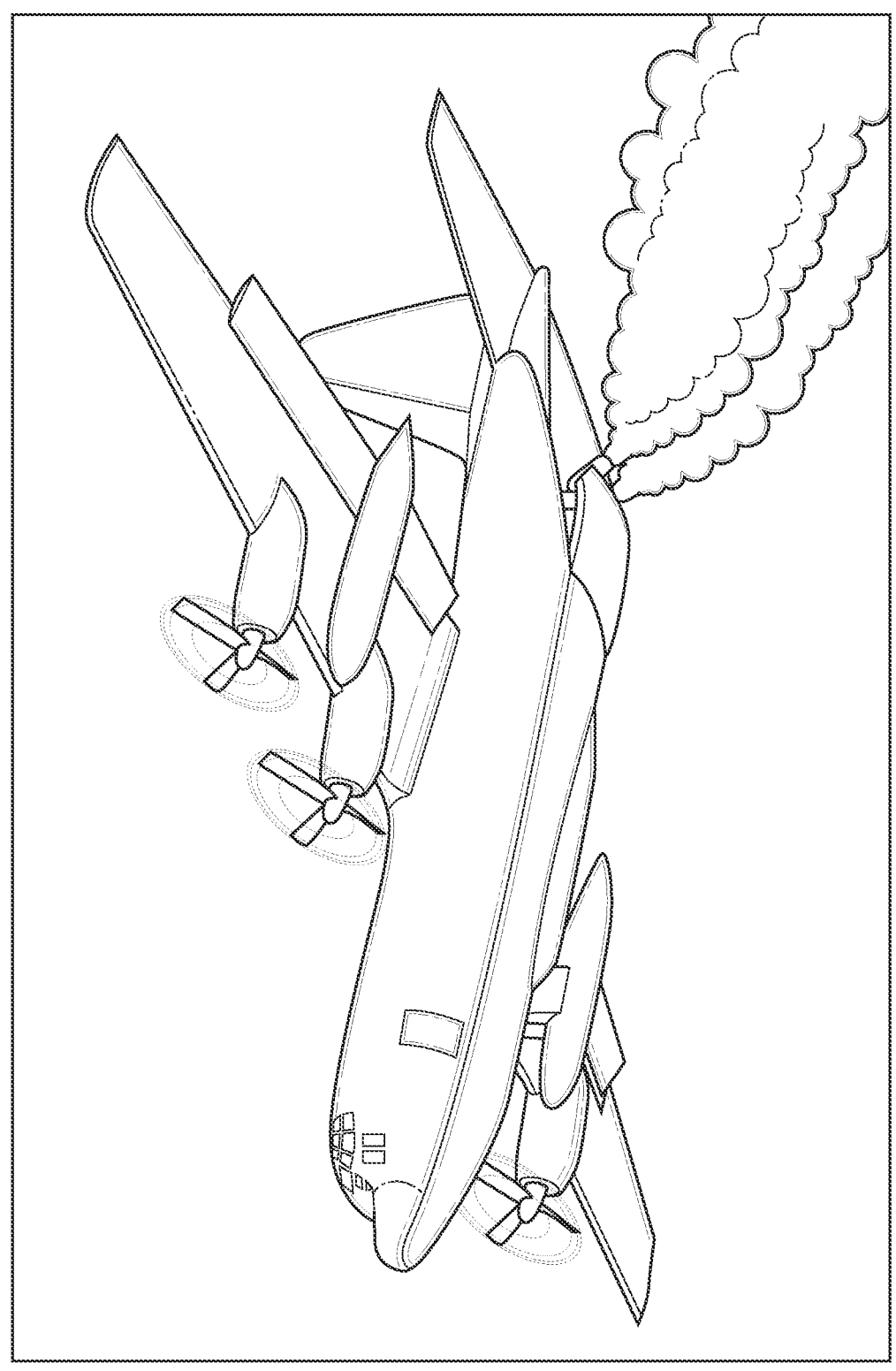
FIG. 2A is a first image illustrating a prior art method of wild fire suppression involving an airplane dropping water on a wild fire from the sky.
Figure 3A:
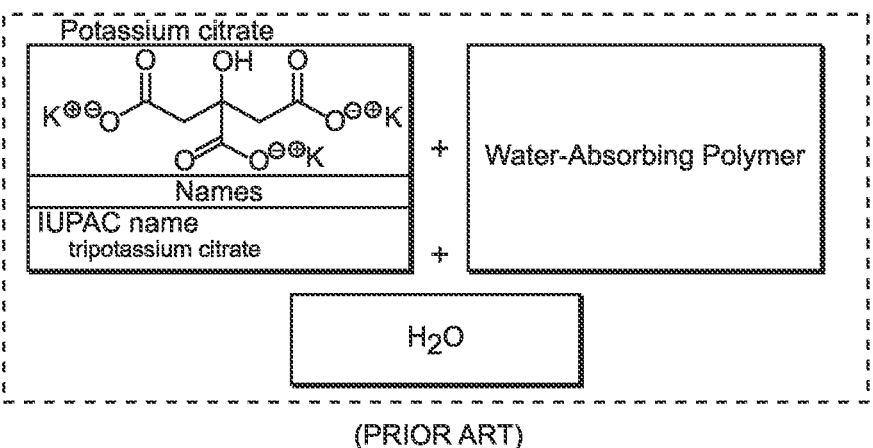
FIG. 3A is a schematic representation illustrating the primary active components of the fire retardant chemical disclosed and claimed in BASF's U.S. Pat. No. 8,273,813 to Beck et al., namely tripotassium citrate (TPC), and a water-absorbing polymer dissolved in water.
Figure 3B:
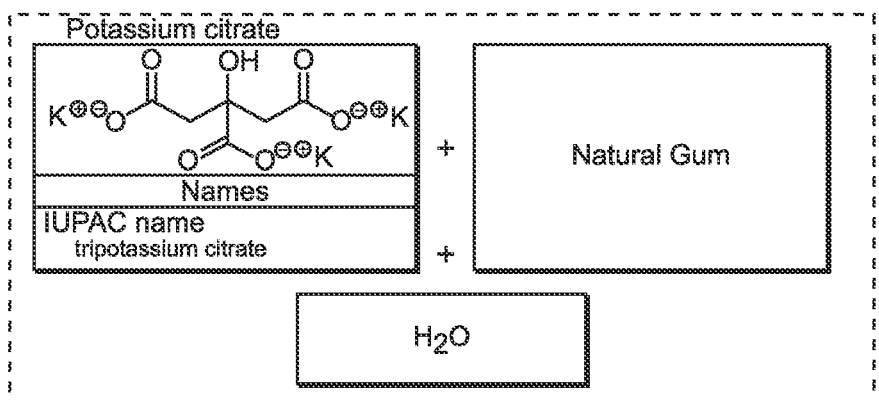
FIG. 3B is a schematic representation illustrating the primary components of Hartidino's AF-31 fire retardant chemical, namely, potassium citrate and, a natural gum dissolved in water as described in the Material Safety Data Sheet for Hartindo AF31 (Eco Fire Break) dated Feb. 4, 2013 (File No. DWMS2013)
Figure 42A:
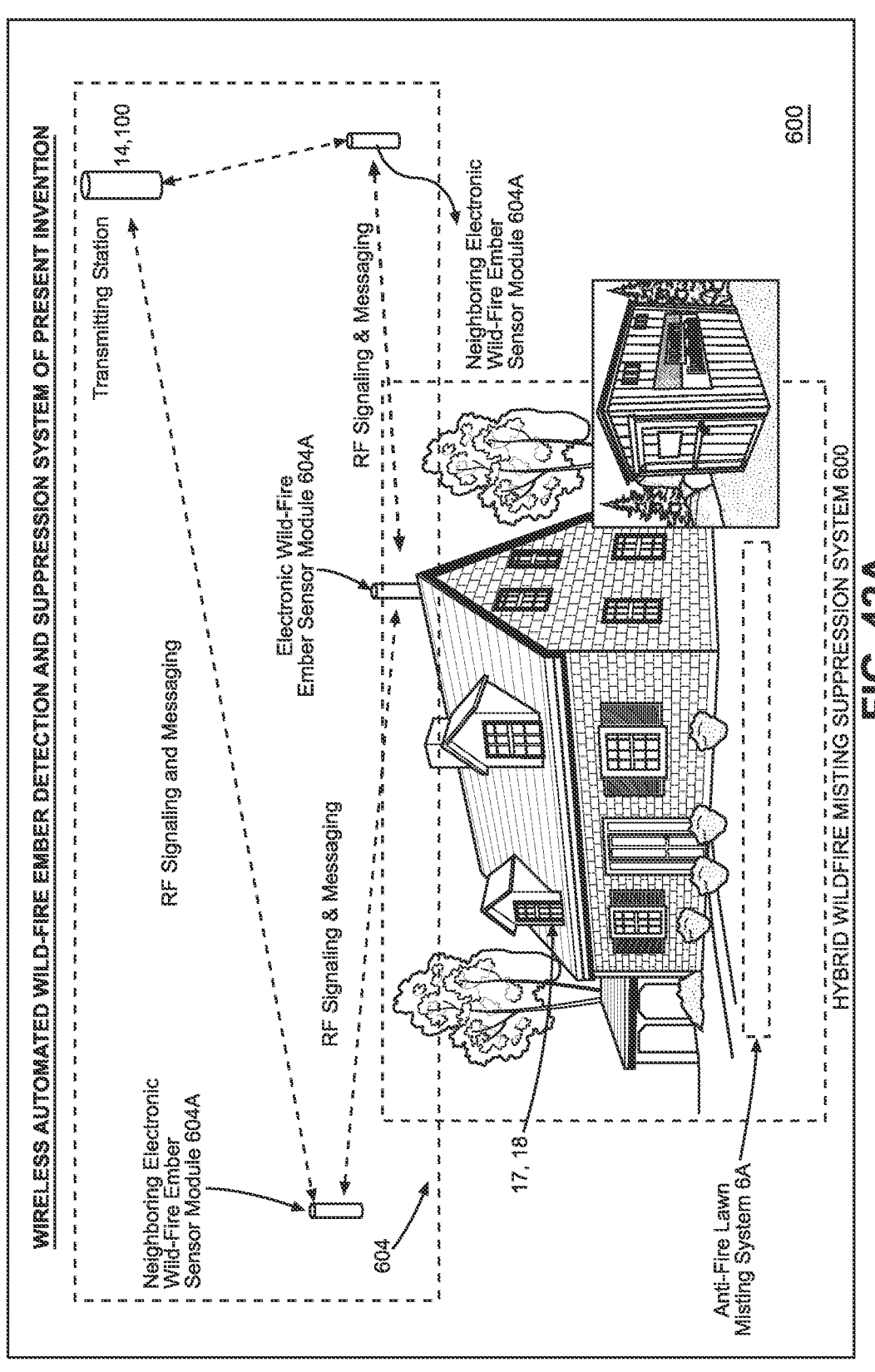
FIG. 42A is a schematic representation of an automated wireless wildfire ember detection and suppression system of present invention, showing a wildfire ember detection module mounted on the top of each building in the wireless network receiving wildfire alerts and messages from neighboring modules which can scout for wildfires and alert other modules in the network in terms of GPS coordinates so that the individual properties can timely prepare for any such wildfire outbreaks in the vicinity, using the hybrid wildfire misting system of the present invention shown in FIGS. 42C and 42D.
Figure 42B:
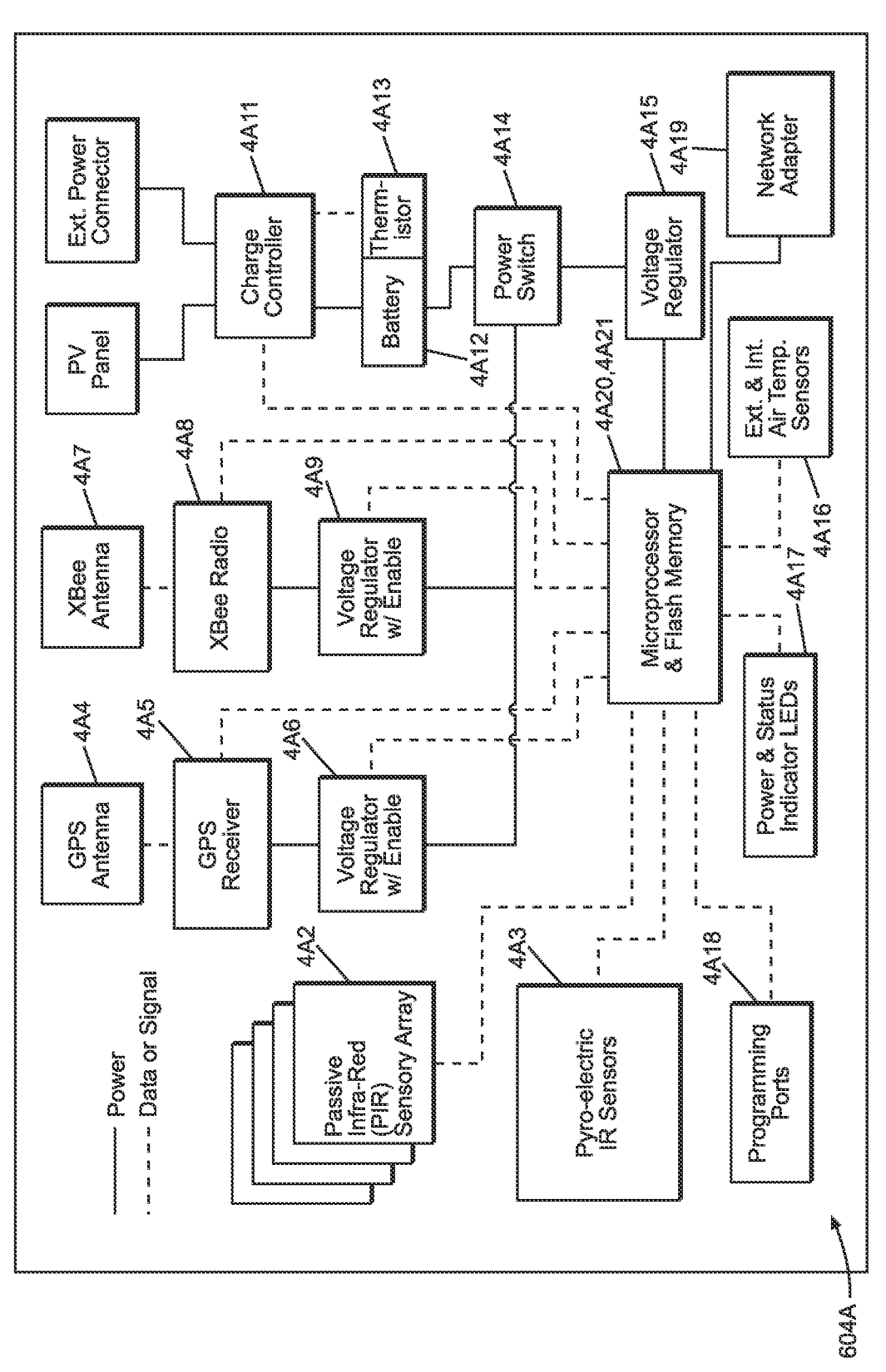
FIG. 42B is a schematic block diagram showing the components used to construct the wireless GPS-tracked wildfire ember detection module of the present invention, shown in FIG. 42A.
Figure 42C:
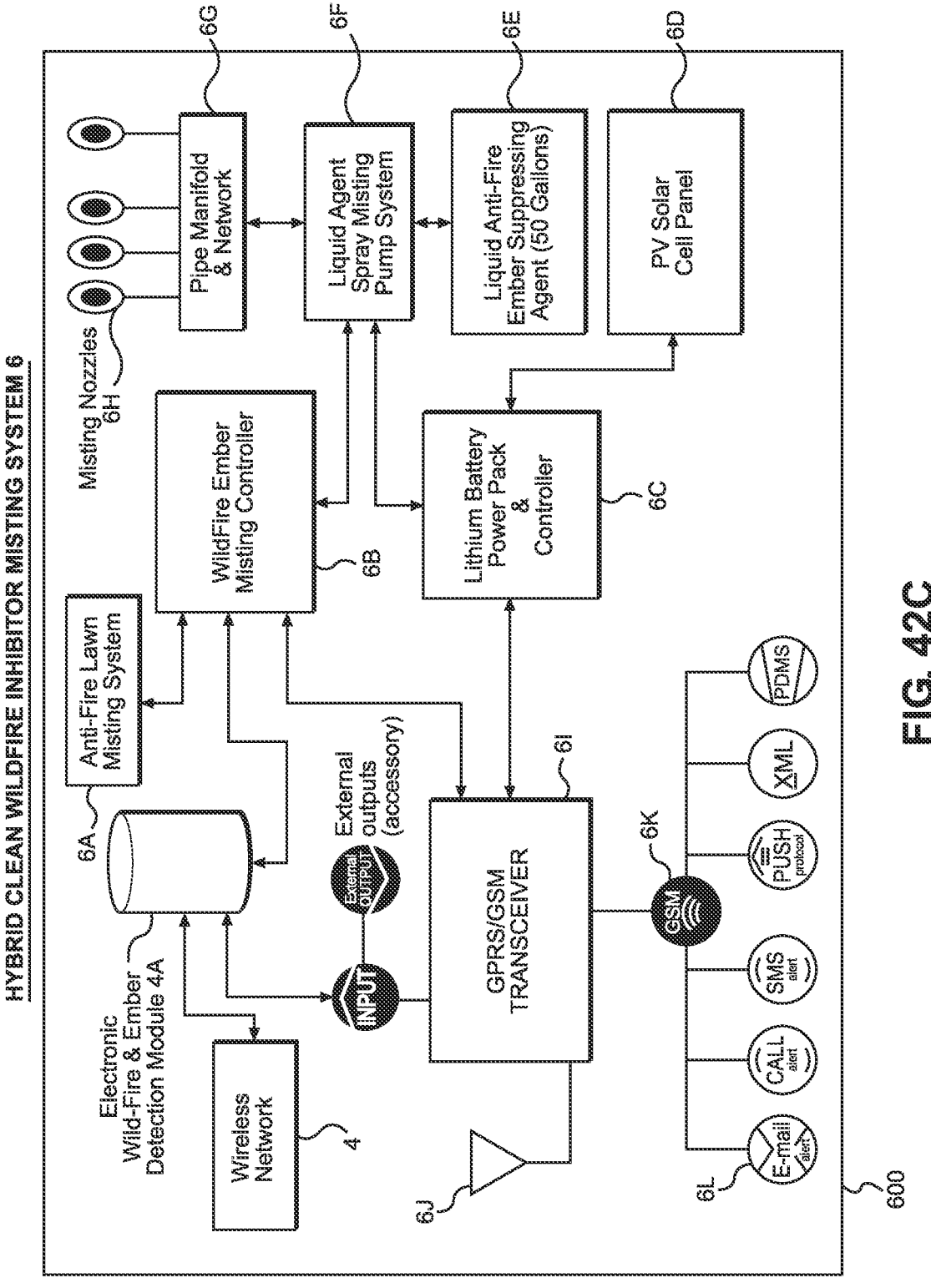
FIGS. 42CA and 42D, taken together, set forth a schematic diagram showing the automated hybrid clean wildfire inhibitor misting system of the present invention, providing both an anti-fire chemical misting system for suppressing wildfire embers impacting a building as shown in FIG. 42C and a lawn and ground fire-inhibiting biochemical liquid misting system impacting the law and ground around the building as shown in FIG. 42C, both automatically controlled by an automated wildfire ember detection and notification network shown in FIGS. 42A and 42B, all being integrated into the system network shown in FIGS. 4A and 4B.
Figure 42D:
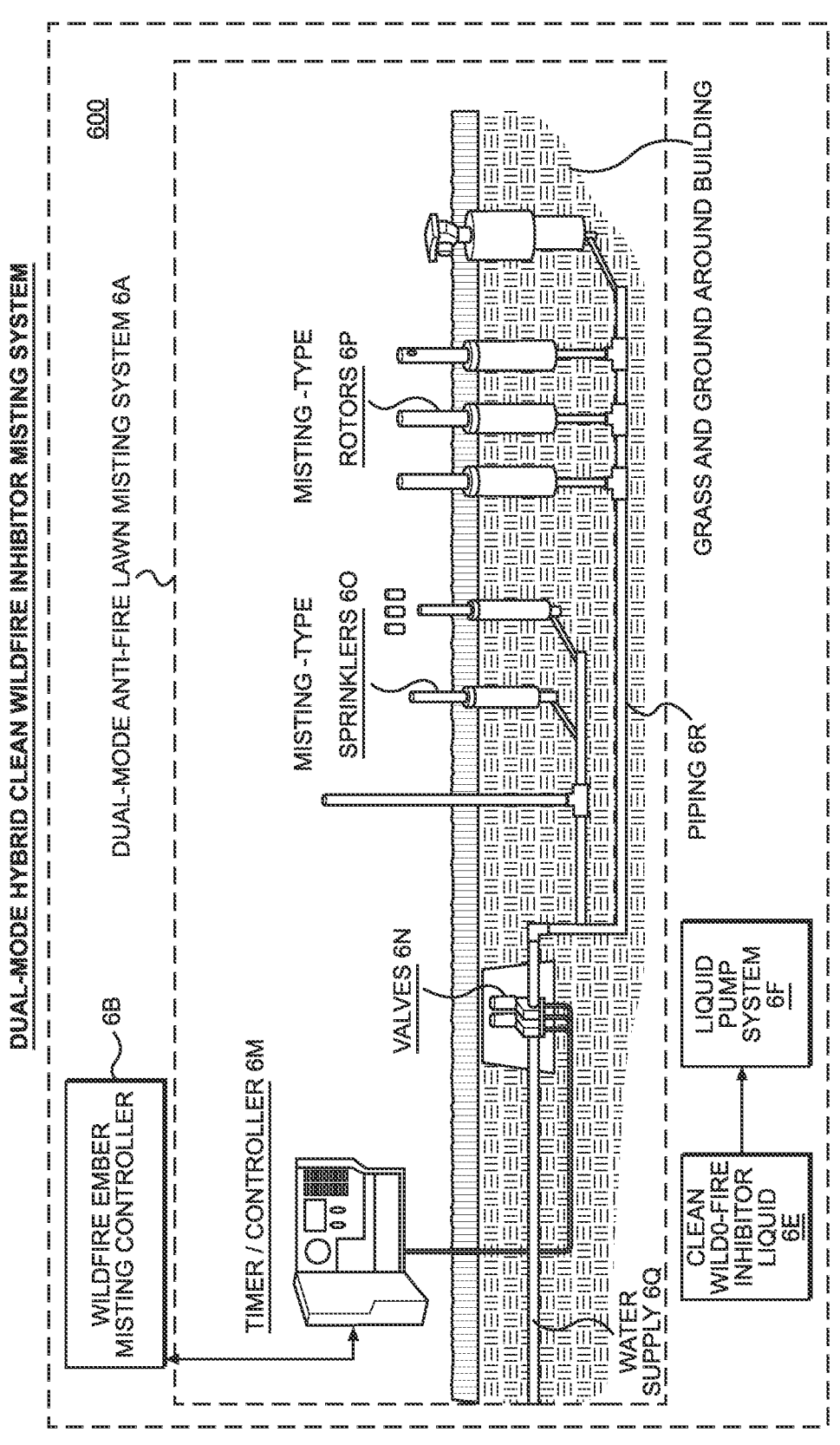
Figure 42E:
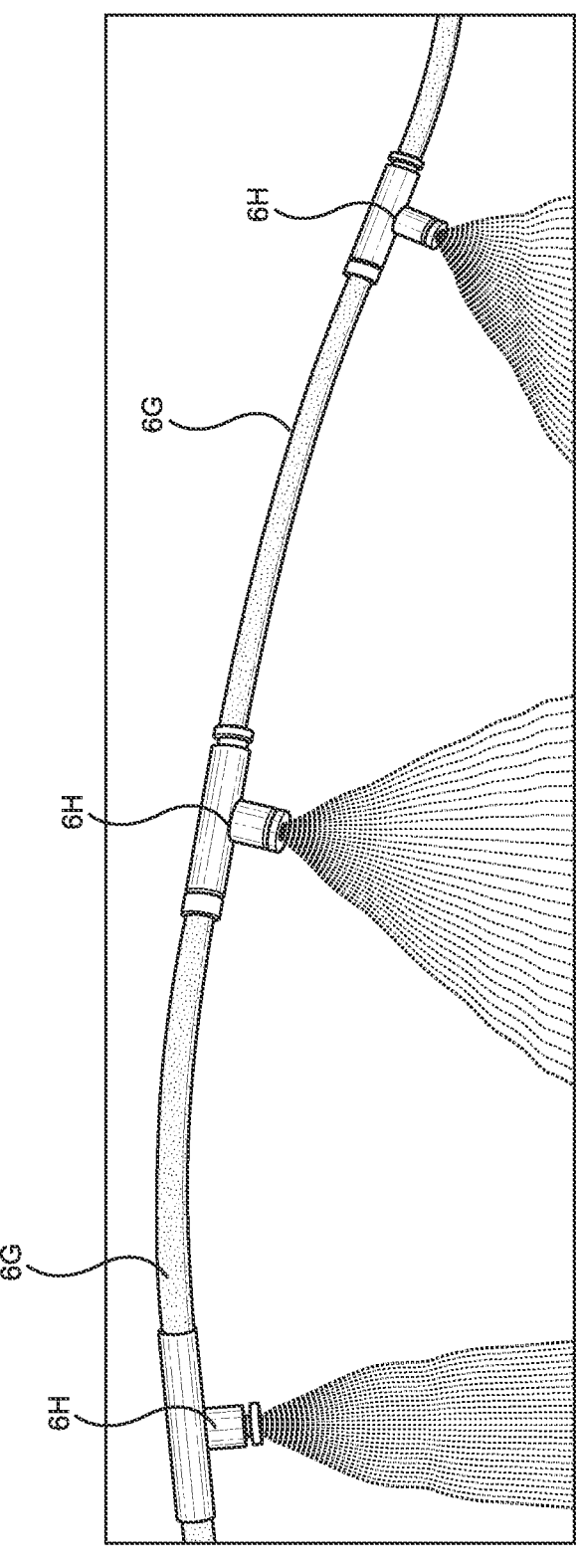
FIG. 42E shows several spray misting nozzles used in the system of the FIGS. 42A through 43D.
Figure 42G:
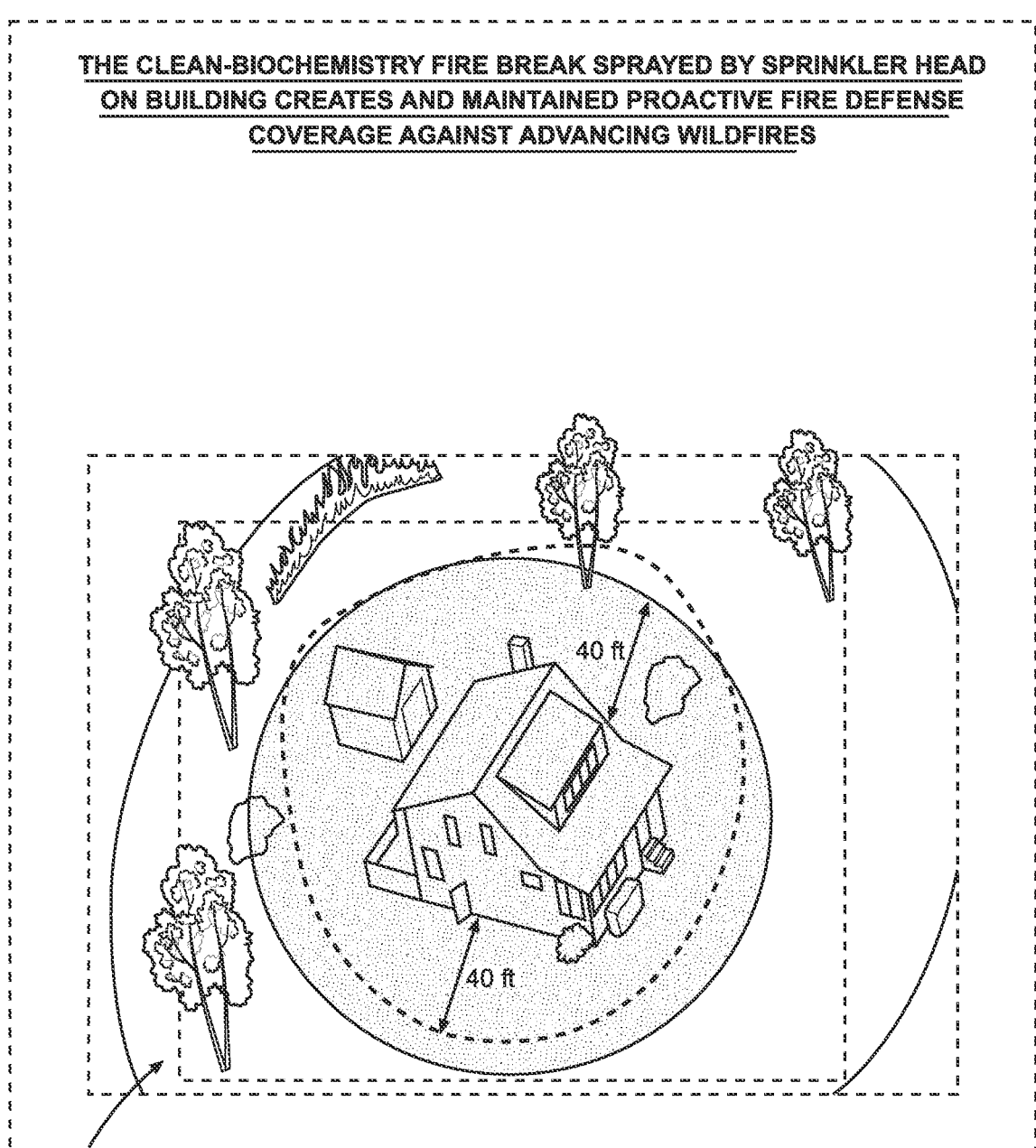
Figure 44A:
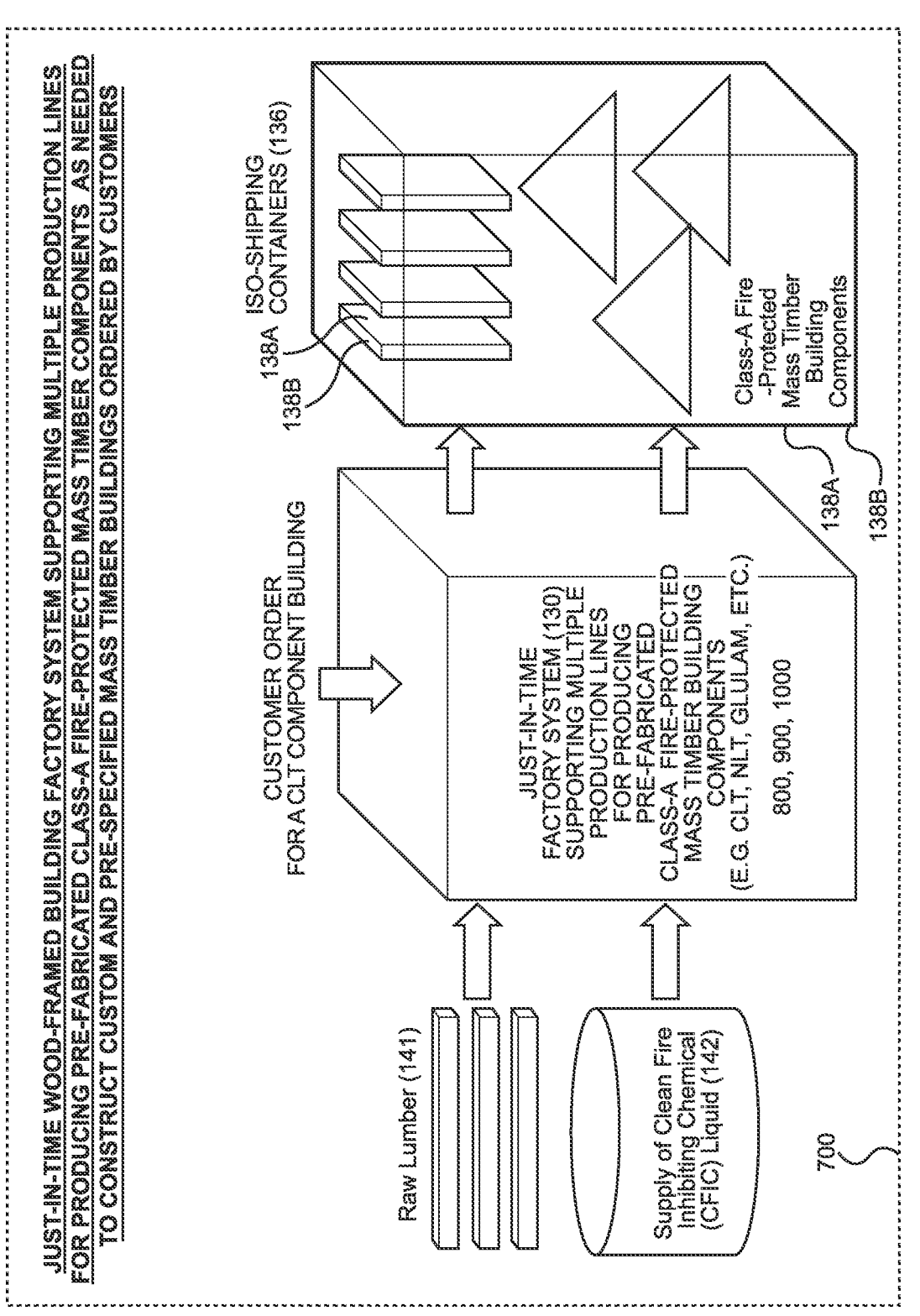
Figure 44B:
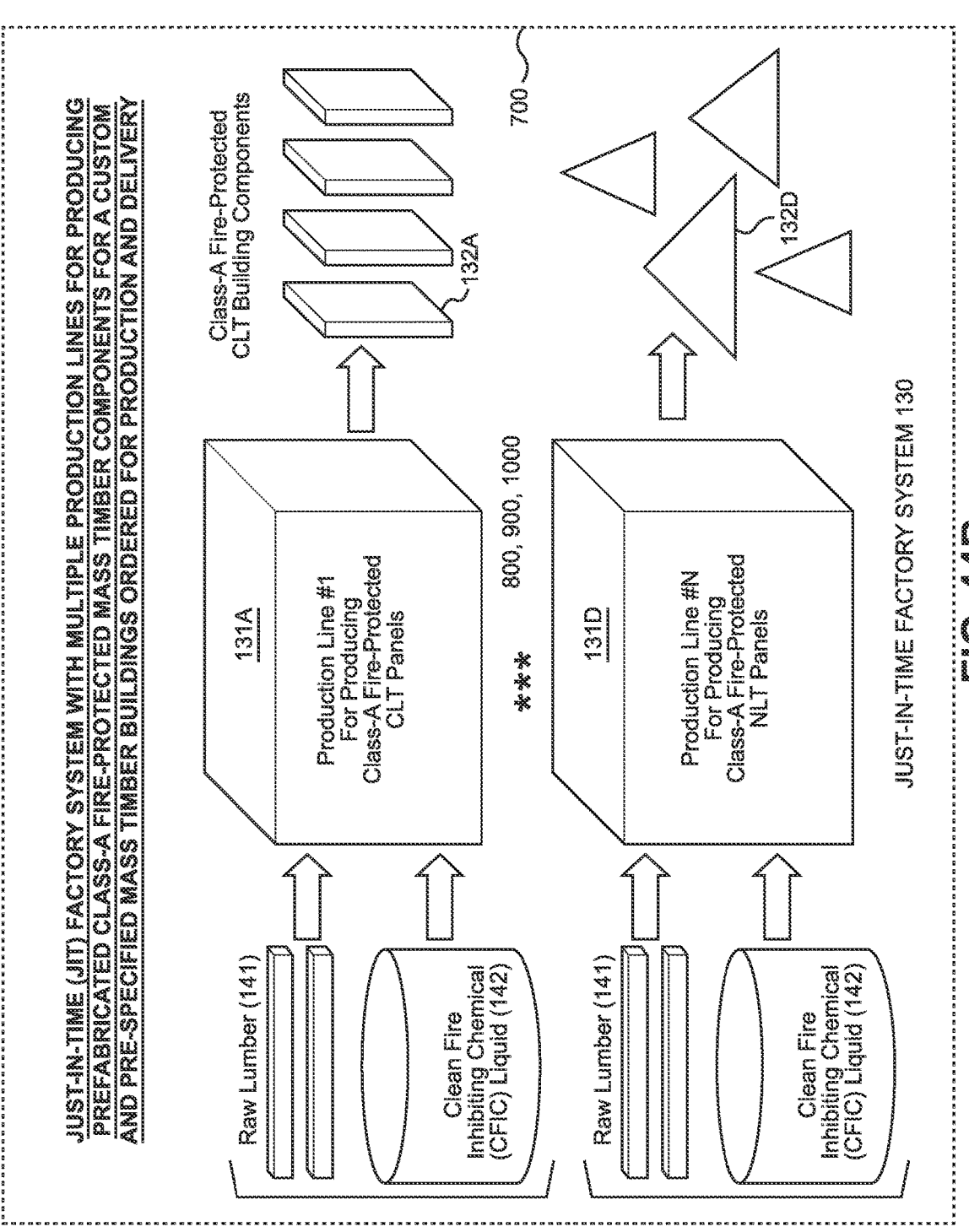
Figure 45:
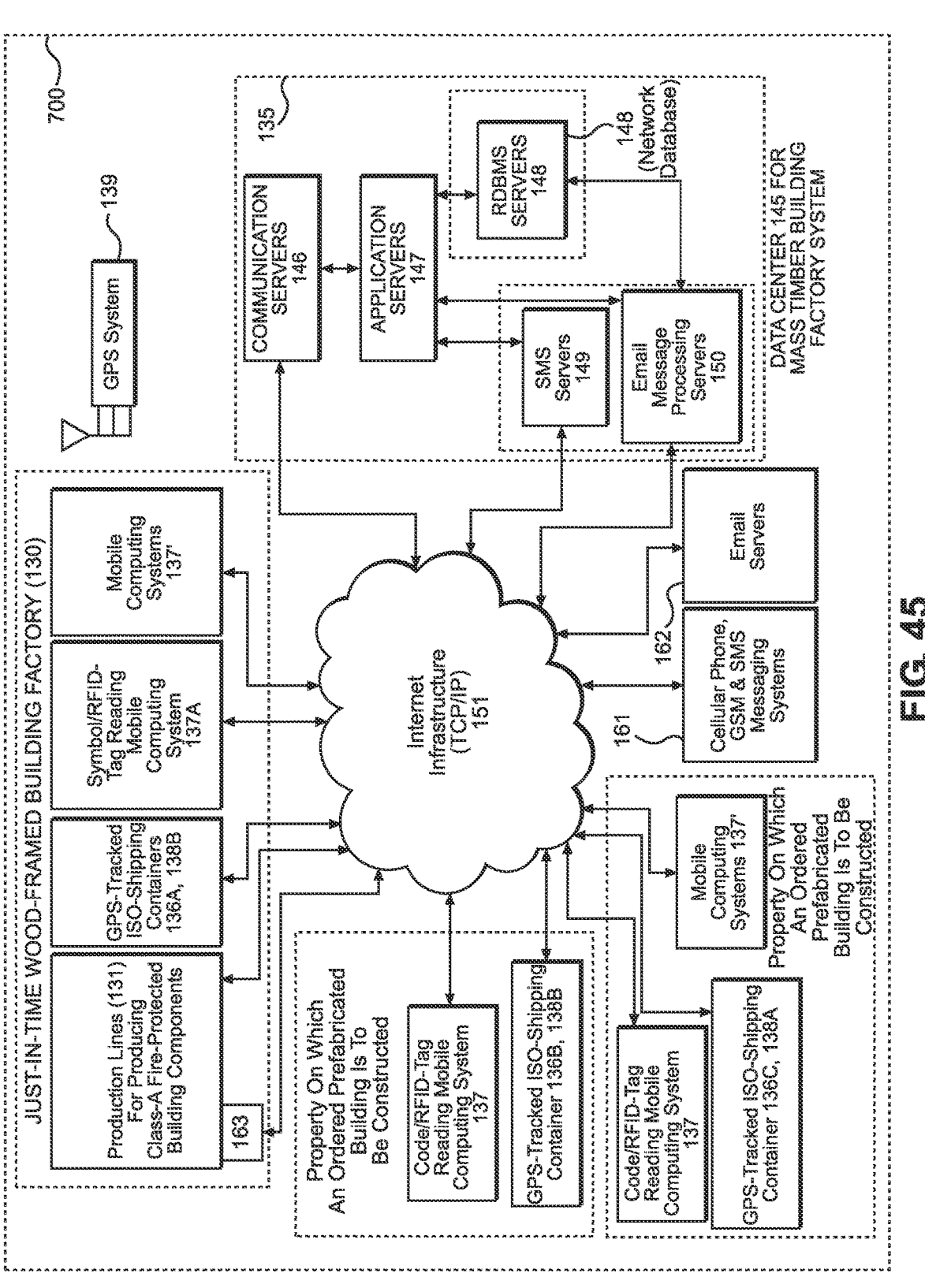
Figure 47:
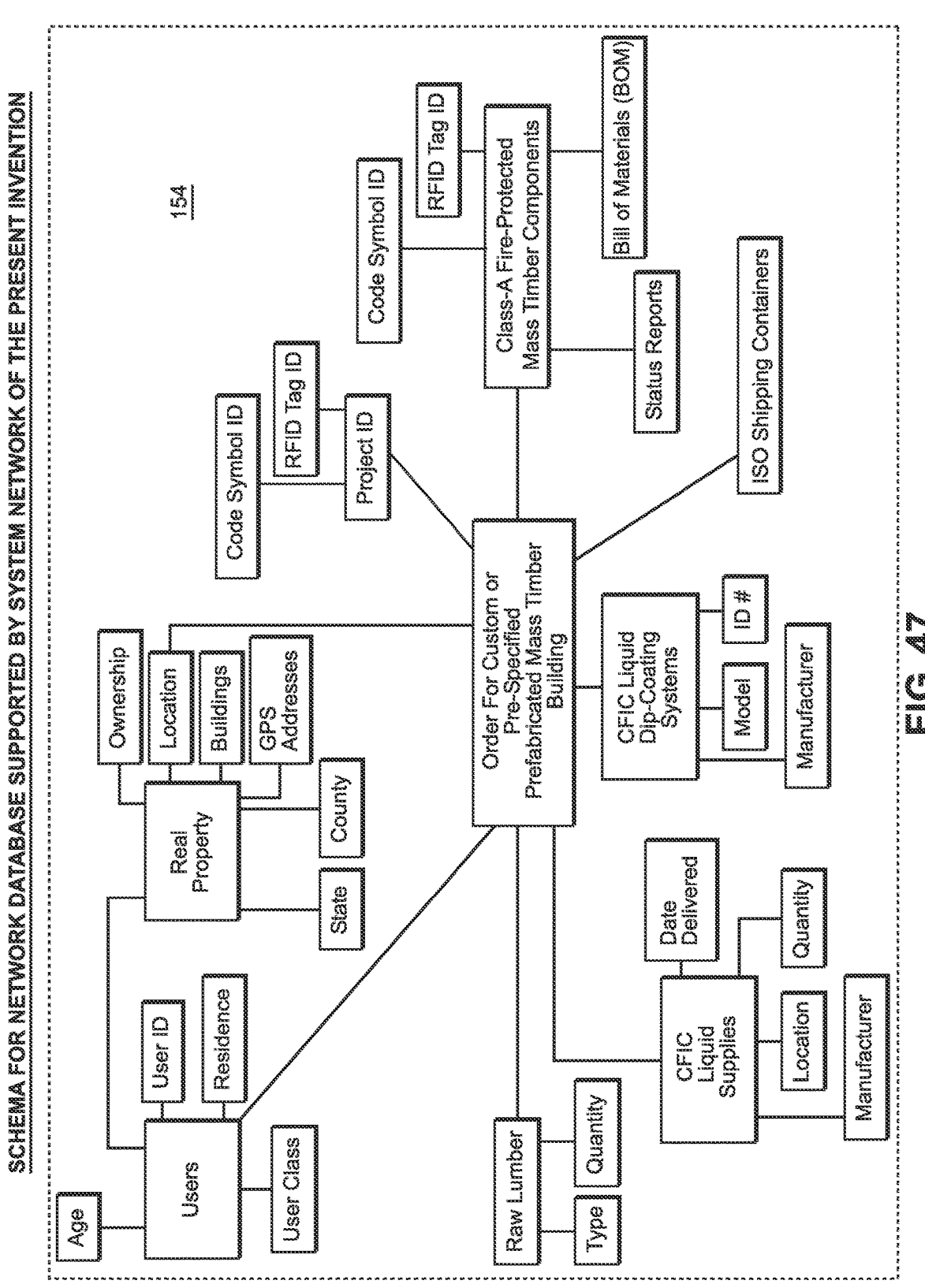
Figure 48:
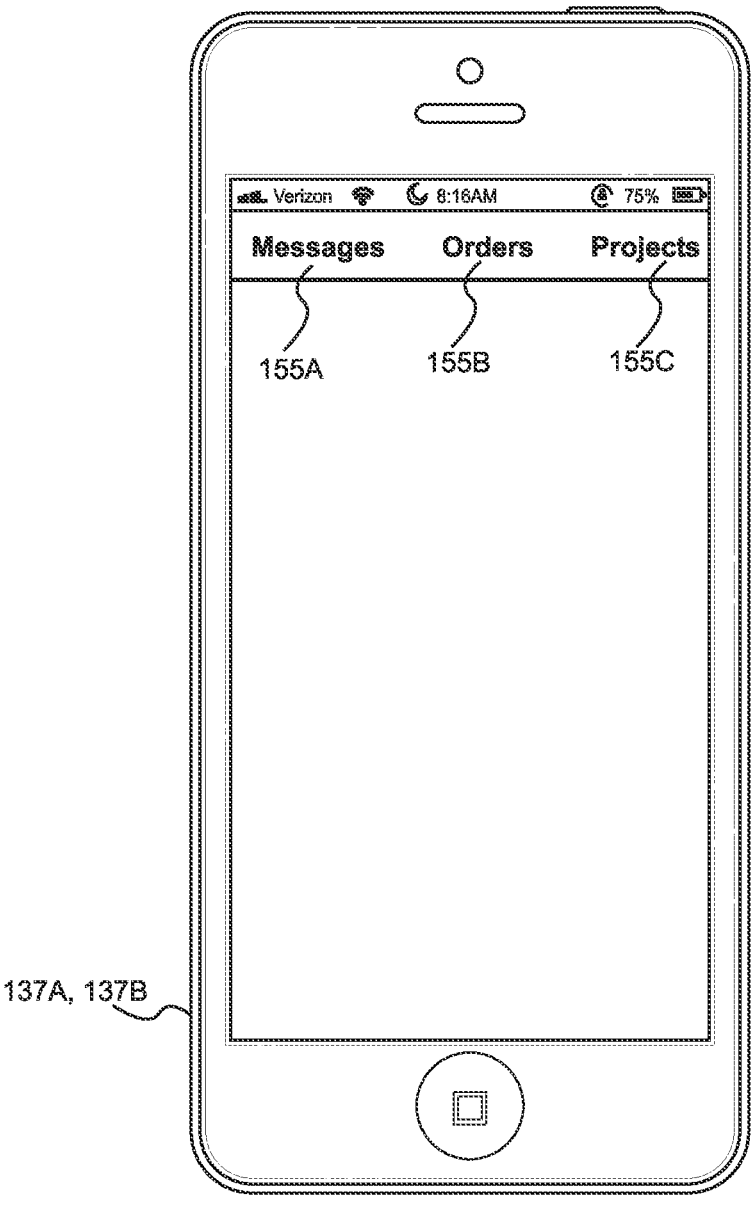
Figure 49:
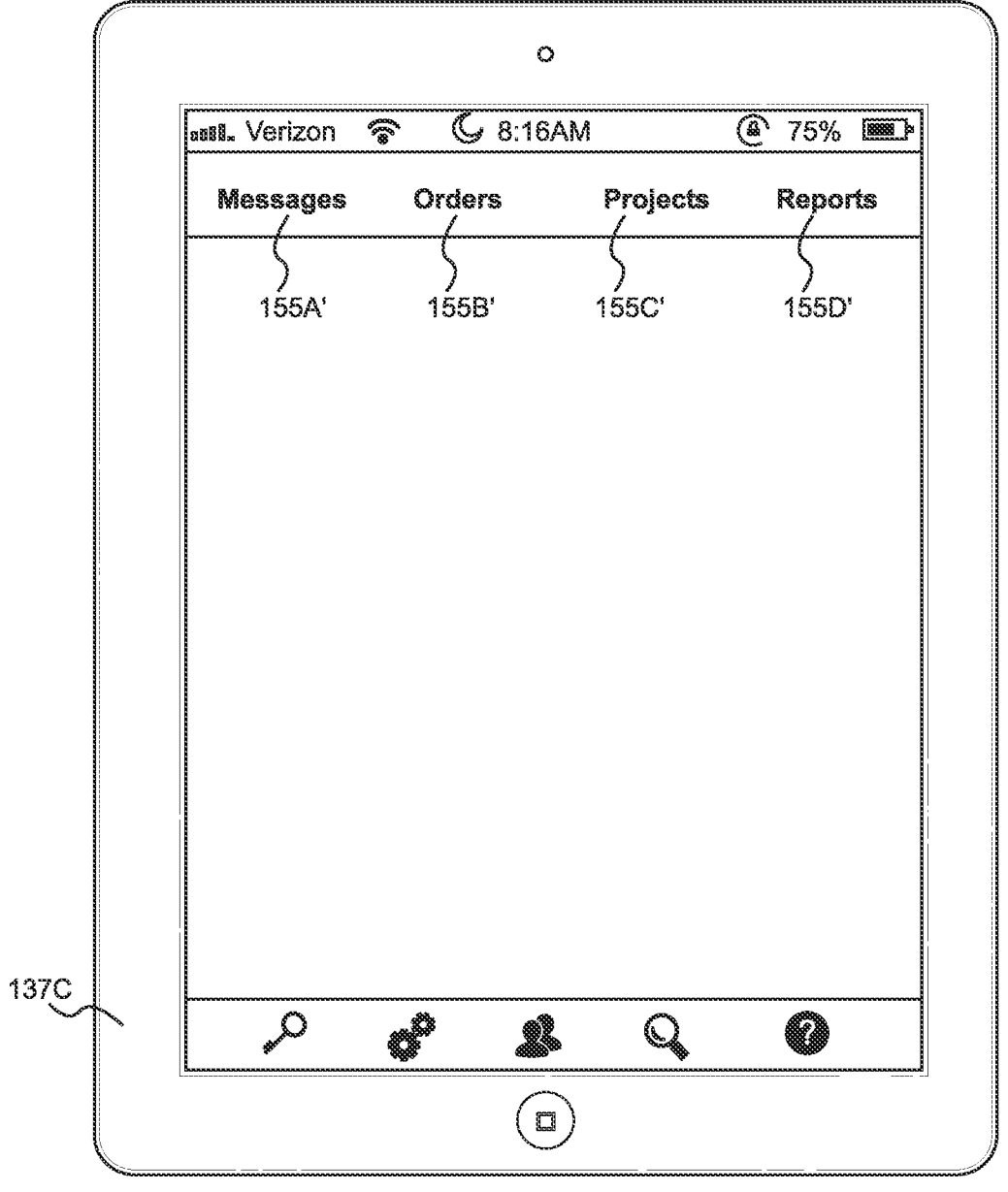
Figure 50:
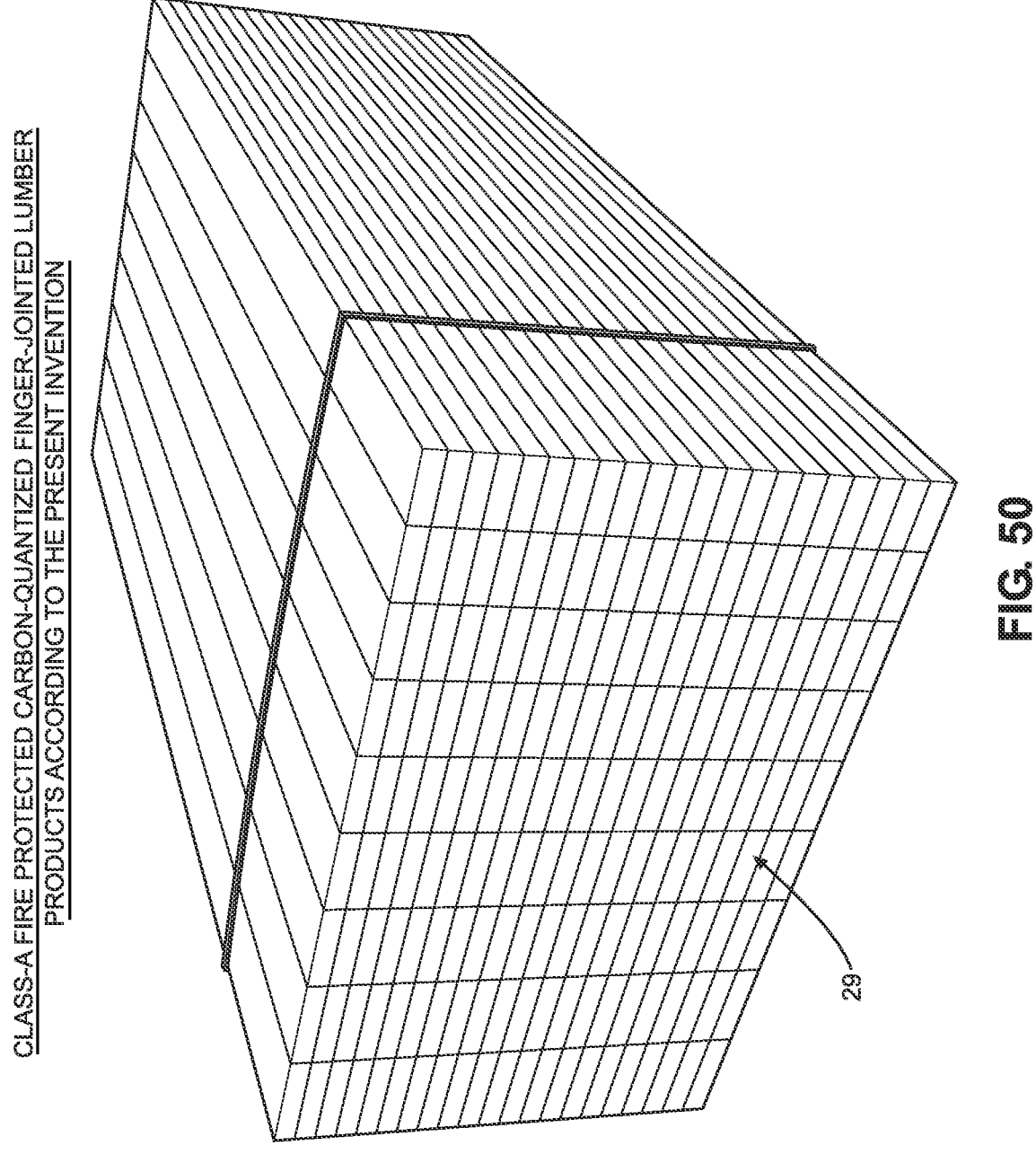
Figure 51B:
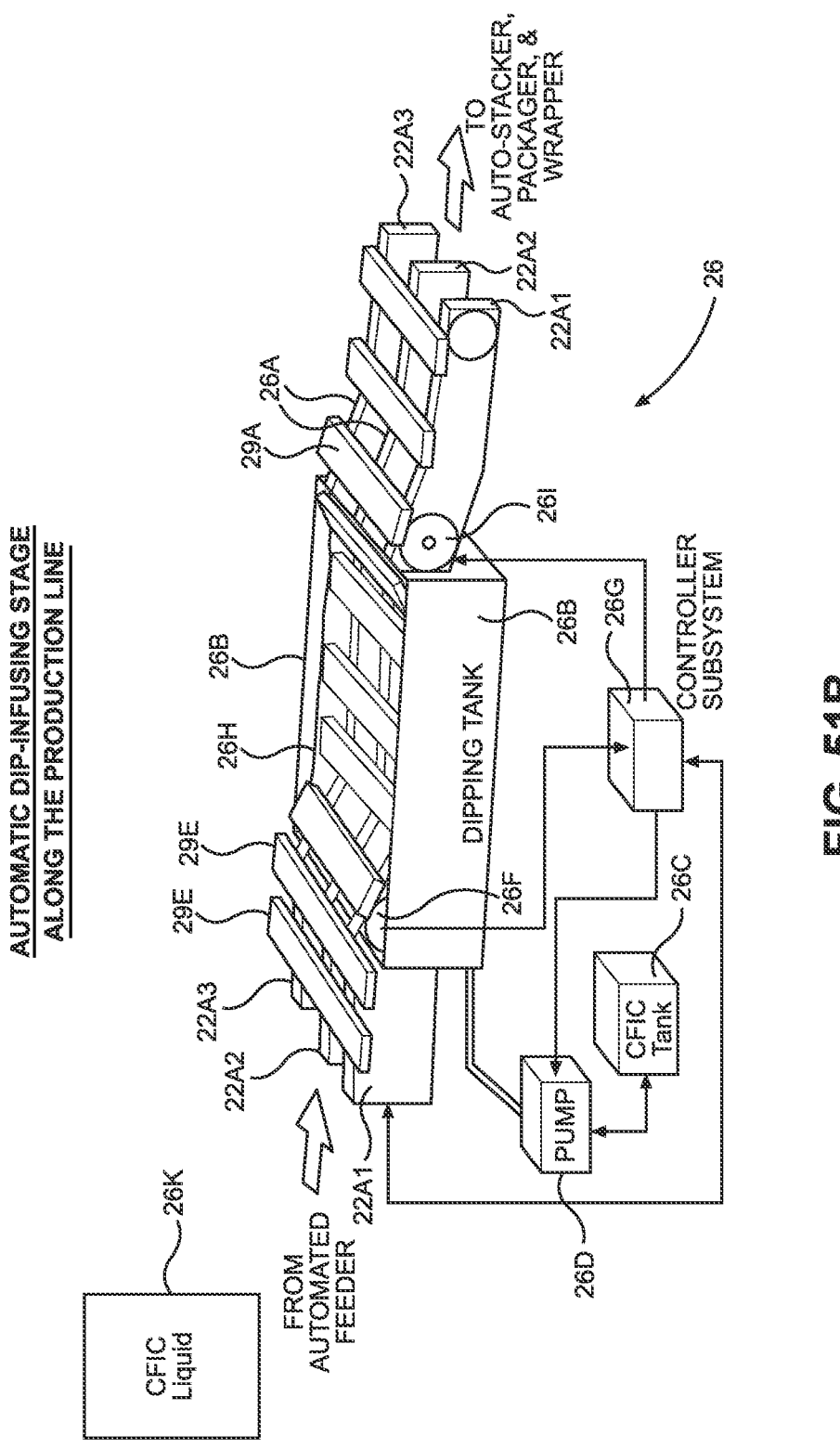
Figure 53:
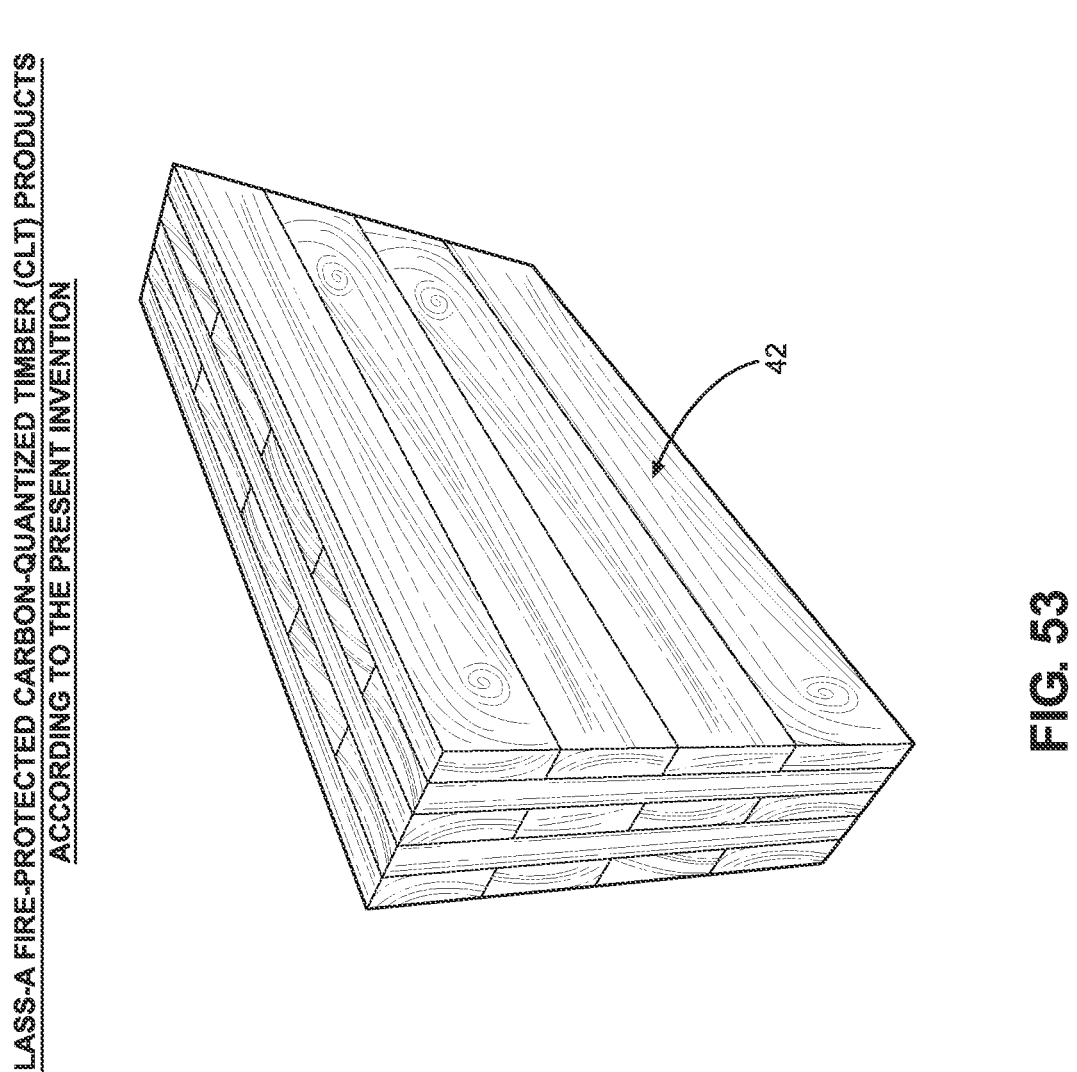
Figure 54A:
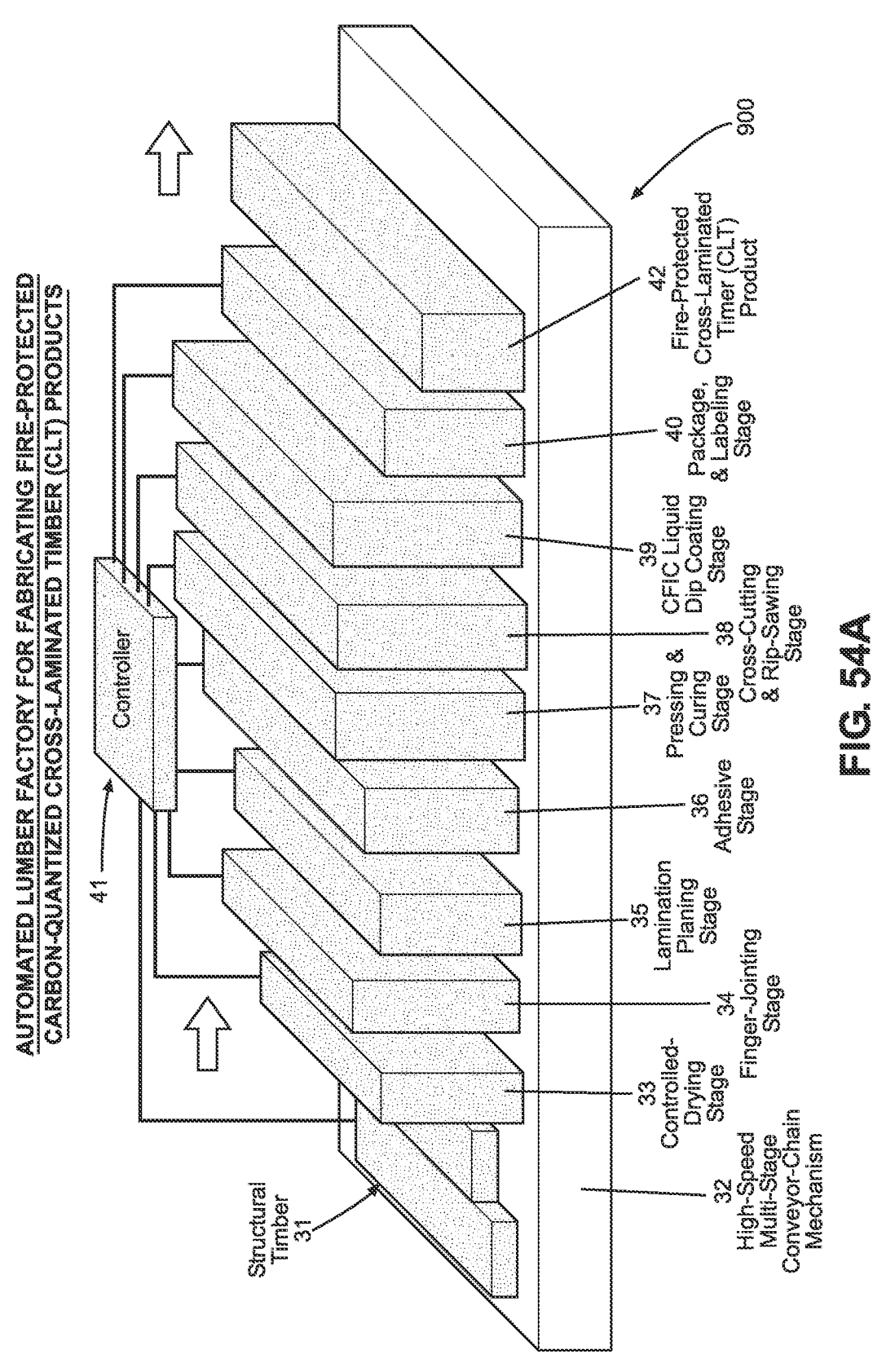
Figure 54B:
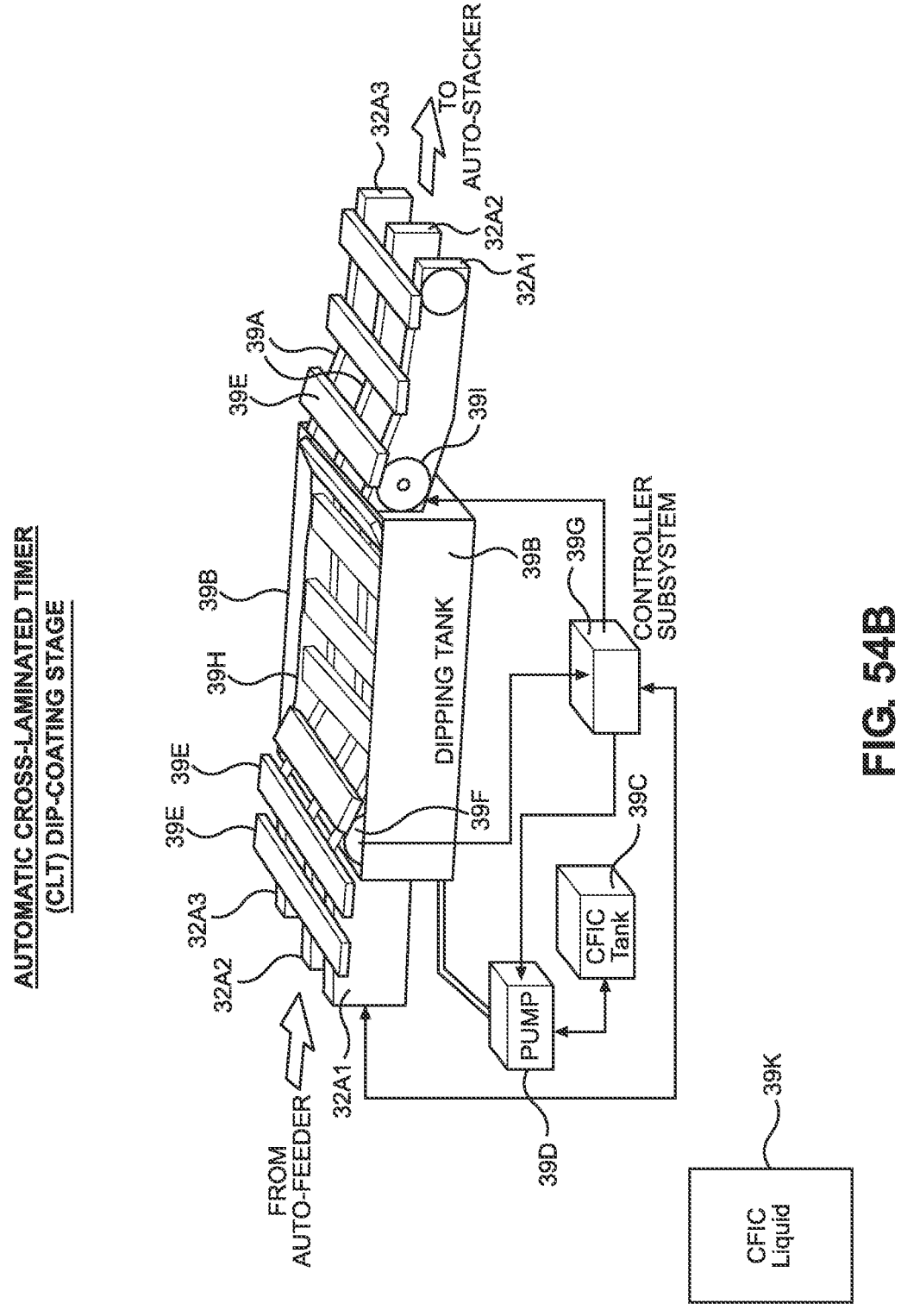
Figure 55B:
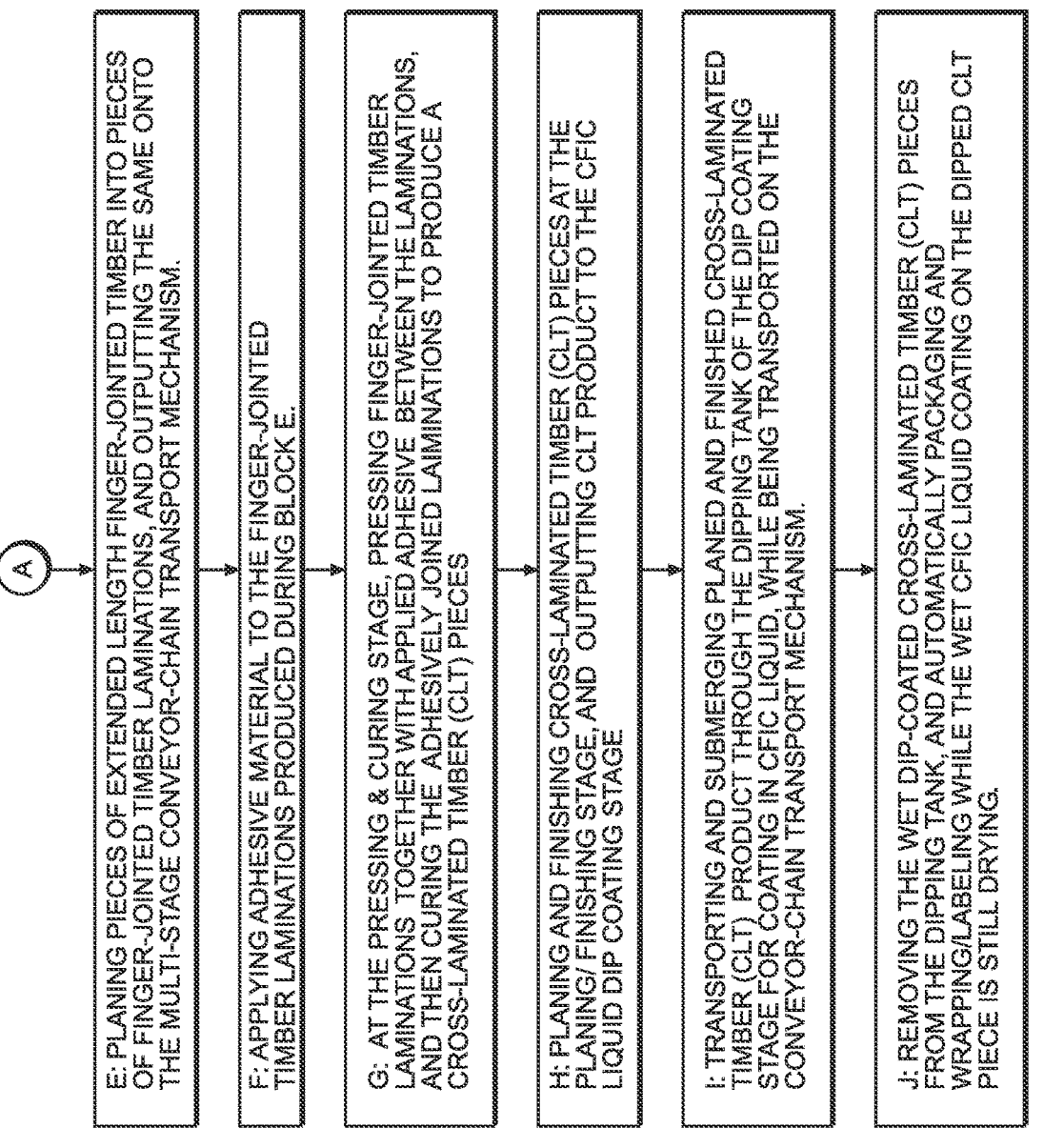
Figure 58B:
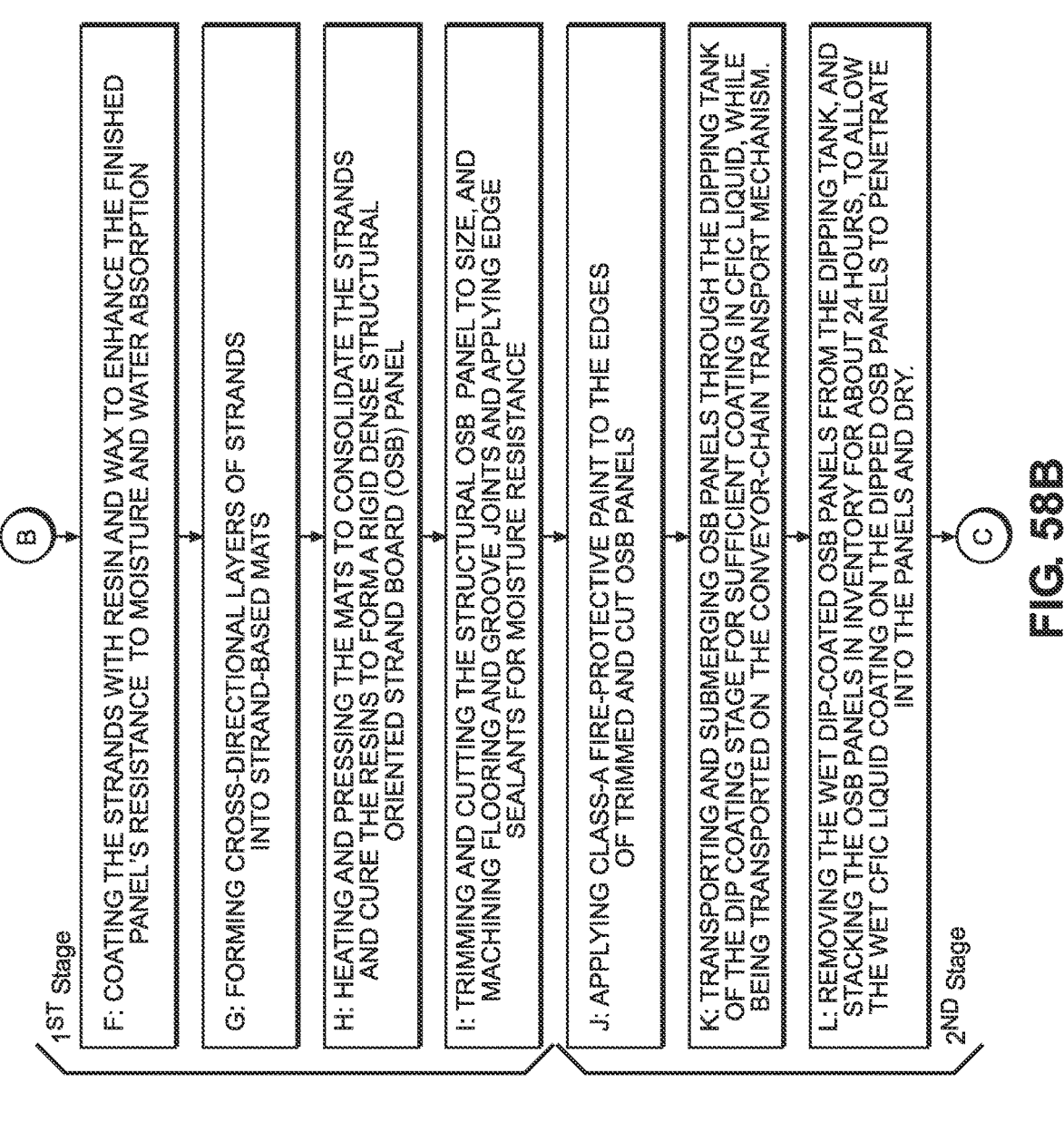
Figure 59A:
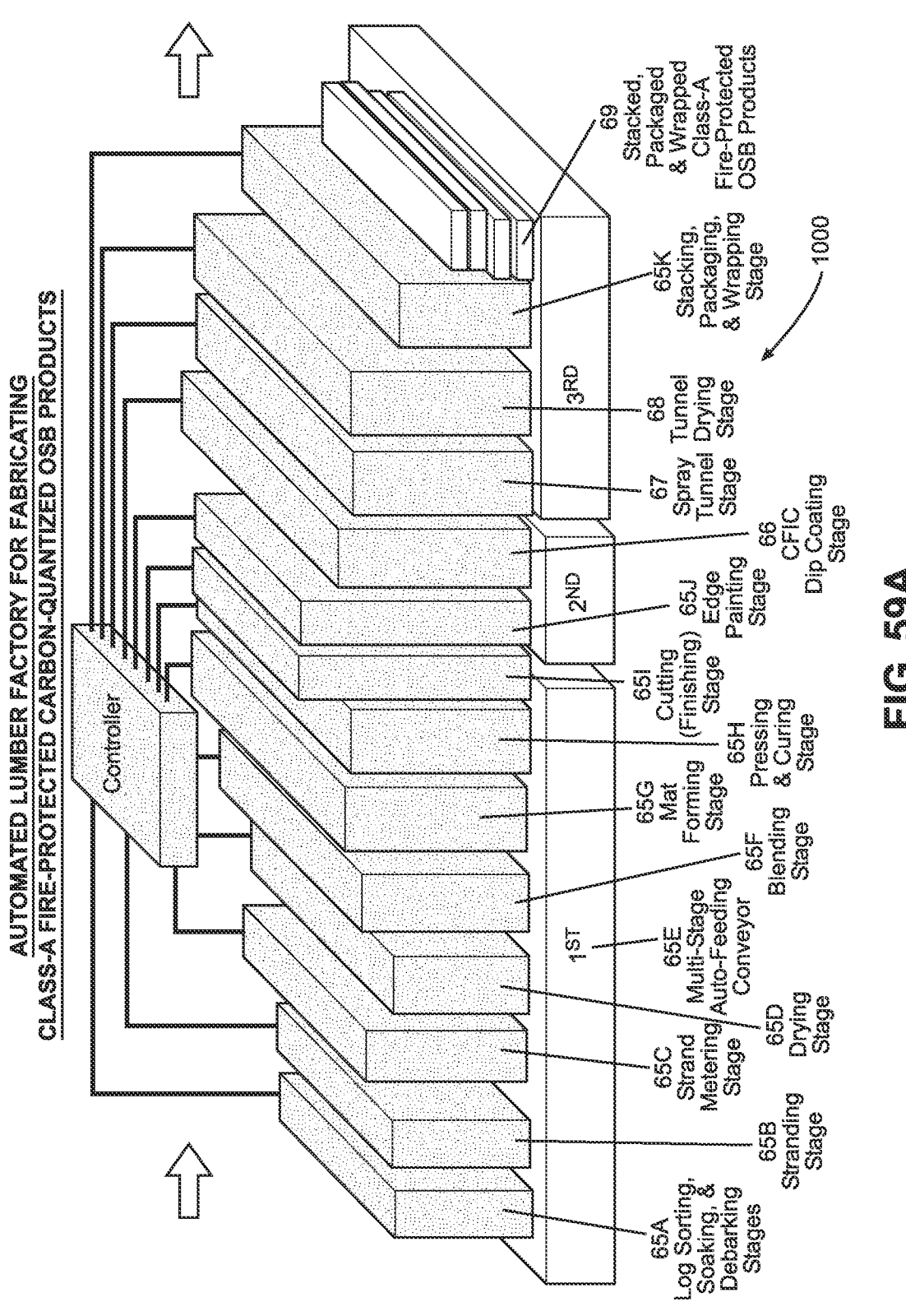
Figure 59B:
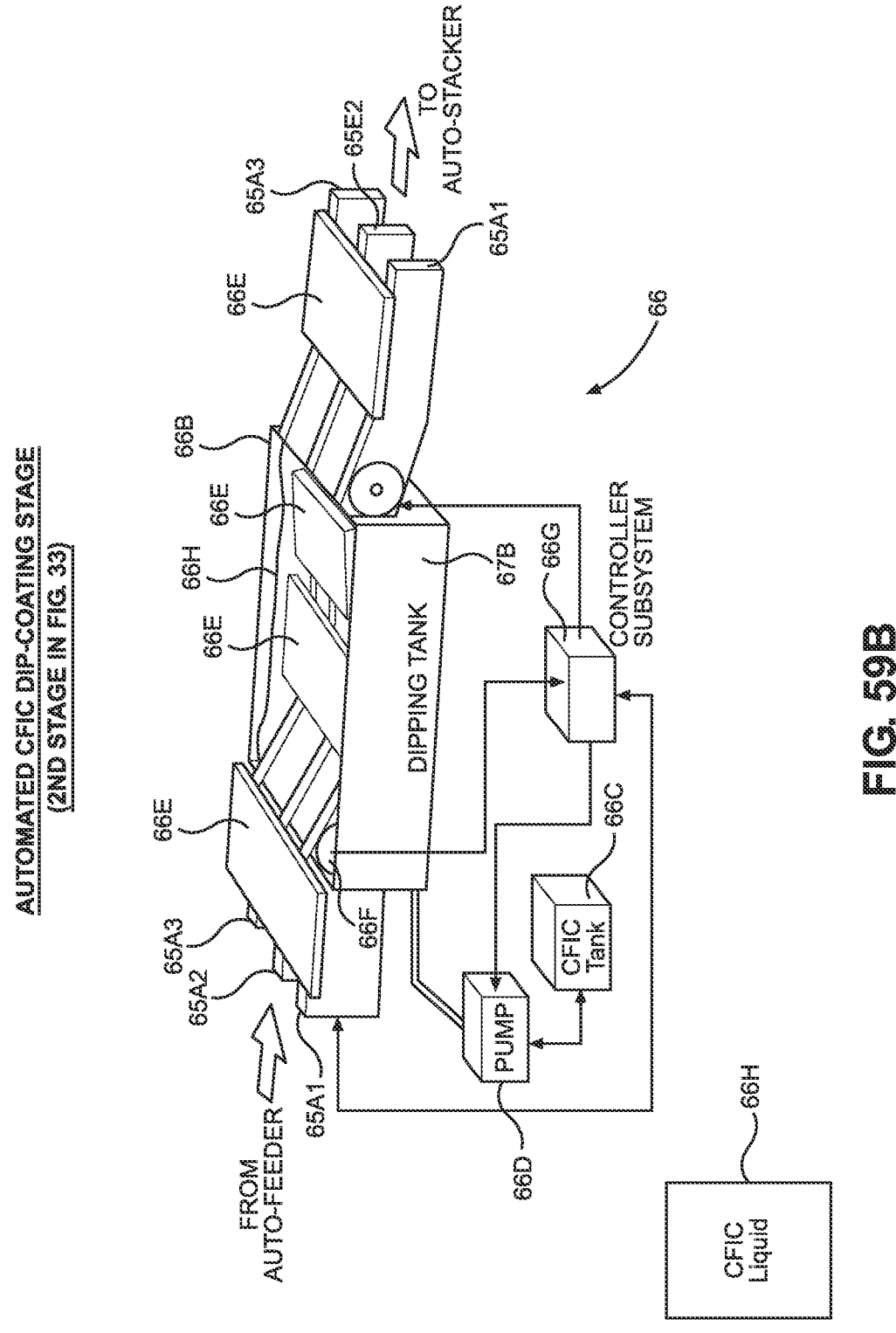
Figure 59C:
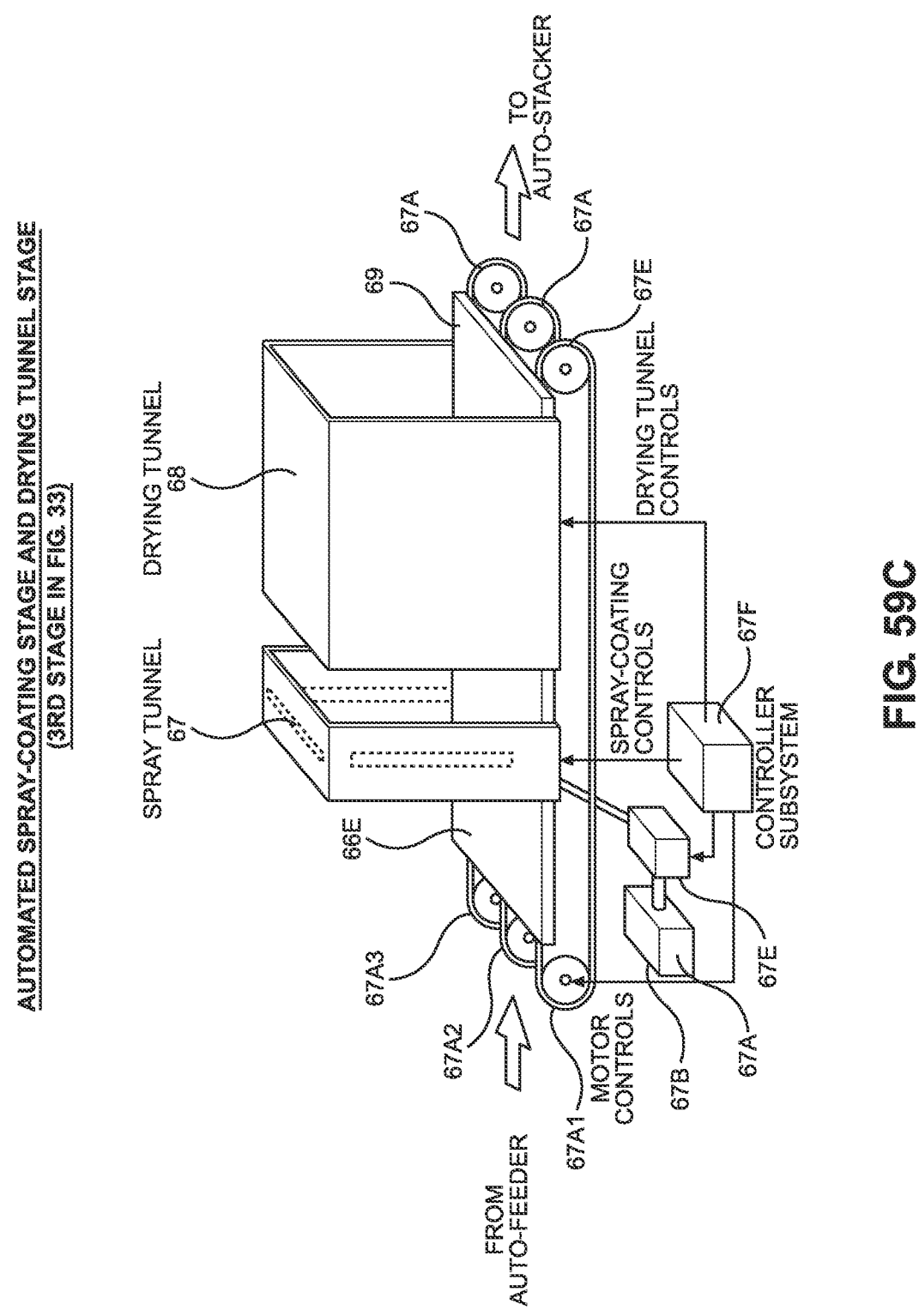

42A, to spray anti-fire biochemical liquid according to the present invention, and treated combustible surfaces before wildfire embers arrival;

FIG. 42G is a schematic representation illustrating that the clean-biochemistry fire break sprayed by sprinkler-type head(s) shown in FIGS. 42F1 and 42F2, mounted on home building rooftops and driven by automated pumps, automatically creates and maintains a proactive fire defense coverage against an advancing wildfire, so as to help reduce risk of destruction of property and life by wildfire;

FIG. 43 is a perspective view of an exemplary mobile computing device deployed on the system network of the present invention, supporting (i) the mobile anti-fire biochemical spray management application of the present invention deployed as a component of the system network of the present invention, as well as (ii) conventional wildfire alert and notification systems, as shown in FIGS. 42A through 42D;

FIG. 44A is a schematic representation of a just-in-time wood-framed building factory system supporting multiple production lines for producing pre-fabricated Class-A fire-protected wood-framed components as needed to construct custom and pre-specified wood-framed buildings ordered by customers;

FIG. 44B is a schematic representation of a just-in-time (JIT) factory system with multiple production lines for producing prefabricated Class-A fire-protected wood-framed components (e.g. wood-framed walls, staircases, roof trusses, floor trusses, etc.) for use in constructing custom and pre-specified wood-framed buildings ordered by customers for production and delivery;

FIG. 45 is a schematic system network representation of the just-in-time factory system shown in FIGS. 44A and 44B, shown comprising (i) a just-in-time wood-framed building factory with multiple production lines for producing Class-A fire-protected building components, (ii) GPS-tracked ISO-shipping containers and code symbol/RFID tag reading mobile computing system, and (iii) a data center for factory system and supporting a network of mobile computing devices running a mobile application adapted to help track and manage orders, projects and supplies for prefabricating Class-A fire-protected wood-framed buildings, and Class-A fire-protected wood-framed building components for use in constructing the same;

FIG. 46 is a perspective view of a mobile computing system used in the system shown in FIG. 45, supporting a mobile application installed on the mobile computing system for the purpose of tracking and managing projects involving just-in-time fabrication of Class-A fire-protected wood-framed building components for ordered prefabricated wood-framed buildings in accordance with the principles of the present invention;

FIG. 47 is a schematic representation of an exemplary schema for the network database supported by the system the present invention shown in FIG. 45, wherein each primary enterprise object is schematically represented as an object in the schema and represented in the data records created and maintained in the network database;

FIG. 48 is an exemplary wire frame model of a graphical user interface of a mobile application of the present invention configured used by customers who place orders for prefabricated Class-A fire-protected wood-framed buildings, supported by the system of the present invention;

FIG. 49 is an exemplary wire frame model for a graphical user interface of a mobile application configured for use by project administrators, managers, fabricators and technicians showing a high-level menu of services supported by the system network of the present invention, shown in FIGS. 44A, 44B and 45;

FIG. 50 is a perspective view of a bundle of Class-A fire-protected finger-jointed lumber produced along the production line in the automated fire-treated lumber factory illustrated in FIGS. 51A, and 51B;

FIG. 51A is a perspective view of an automated lumber factory supporting an automated process for continuously fabricating Class-A fire-protected finger-jointed lumber products which, after the planning and dimensioning stage, are automatically dip-coated in a bath or reservoir of clean fire inhibiting biochemical liquid of the present invention, and then automatically packaged, stack-dried and wrapped in a high-speed and economical manner;

FIG. 51B is a perspective view of the high-speed CFIC dip-coating stage depicted in FIG. 49A, showing the various components used to implement this subsystem along the production line of the automated lumber factory;

FIGS. 52A and 52B, taken together, set forth a flow chart describing the high level steps carried out when practicing the method of producing Class-A fire-protected finger-jointed lumber pieces (e.g. studs or beams) in the automated fire-treated lumber factory shown in FIGS. 44A, 44B, and 45;

FIG. 53 is a perspective view of a Class-A fire-protected cross-laminated-timber (CLT) product (e.g. panel, stud, beam, etc.) fabricated along the production line of the automated lumber fabrication factory shown in FIGS. 44A and 44B;

FIG. 54A is a perspective view of an automated lumber fabrication factory supporting an automated process for continuously fabricating cross-laminated timber (CLT) products which, after the planning and dimensioning stage, are automatically dip-coated in a bath of clean fire inhibiting chemical (CFIC) liquid, and then stacked, packaged and wrapped in a high-speed manner to produce Class-A fire-protected CLT products;

FIG. 54B is a perspective view of the automatic cross-laminated timber (CLT) dip-coating stage deployed along the production line of the automated lumber fabrication factory shown in FIGS. 44A, 44B and 45;

FIGS. 55A and 55B, taken together, set forth a flow chart describing the high level steps carried out when practicing the method of producing Class-A fire-protected cross-laminated timber (CLT) products in the automated fire-treated lumber factory illustrated in FIGS. 44A, 44B and 45;

FIG. 56 is a perspective of a cut-away portion of a piece of Class-A fire-protected oriented strand board (OSB) sheathing produced using the method described in FIGS. 58A, 58B and 58C in the automated factory shown in FIGS. 44A and 44B;

FIG. 57 is a cross-sectional schematic diagram of a section of the Class-A fire-protected OSB sheathing shown in FIG. 56;

FIGS. 58A, 58B and 58C, taken together, set forth a flow chart describing the high level steps carried out when practicing the method of producing clean Class-A fire-protected OSB sheathing in accordance with the present invention, as illustrated in FIGS. 56 and 57;

FIG. 59A is a schematic representation of the automated factory configured for producing Class-A fire-protected OSB sheathing in accordance with the principles of the present invention as described in FIGS. 58A, 58B and 58C;

FIG. 59B is a perspective view of the automatic OSB sheathing dip-coating stage deployed along the production line of the automated lumber fabrication factory shown in FIGS. 44A, 44B and 45; and FIG. 59C is a perspective view of the automatic OSB sheathing spray-coating tunnel stage and drying tunnel stage deployed along the production line of the automated lumber fabrication factory shown in FIGS. 44A, 44B and 45.

DETAILED DESCRIPTION OF THE ILLUSTRATIVE EMBODIMENTS OF THE PRESENT INVENTION

Referring to the accompanying Drawings, like structures and elements shown throughout the figures thereof shall be indicated with like reference numerals.

Figure 4A:
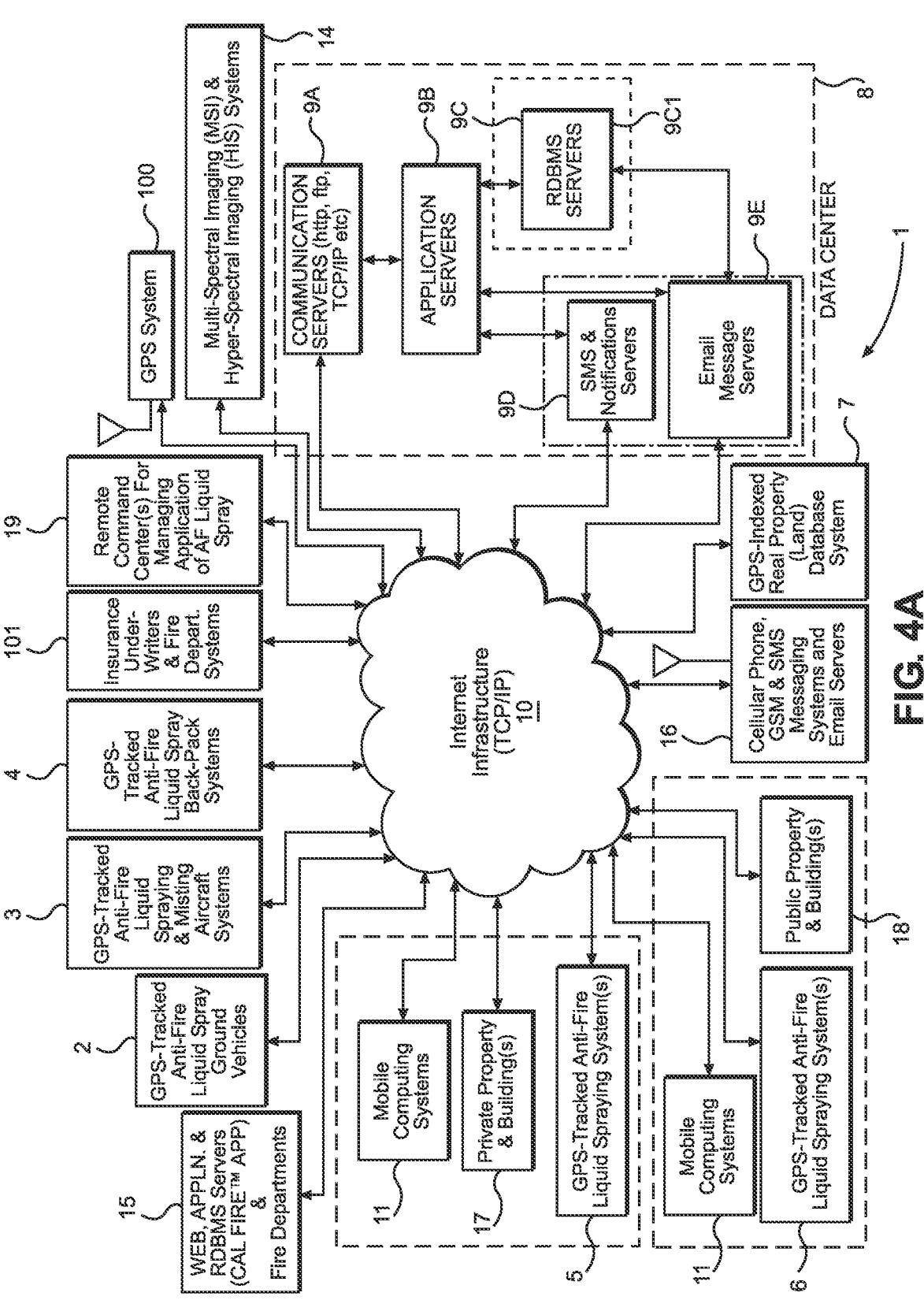
FIG. 4A is schematic representation of the wireless system network of the present invention designed for managing the supply, delivery and spray-application of the environmentally-clean anti-fire (AF) liquid composition of the present invention, on private and public property to reduce the risks of property damage and/or destruction and harm to life caused by wild fires, and shown comprising GPS-tracked anti-fire (AF) liquid spray ground vehicles, GPS-tracked anti-fire liquid spray air vehicles, GPS-tracked anti-fire liquid spray backpack systems for spraying houses and surrounding properties, GPS-tracked anti-fire liquid spraying systems for spraying private real property and buildings, GPS-tracked liquid spraying systems for spraying public real property and buildings, mobile computing systems running the mobile application of the present invention and used by property owners, residents, fire departments, insurance underwriters, government officials, medical personal and others, remote data sensing and capturing systems for remotely monitoring land and wild fires wherever they may break out, a GPS system for providing GPS-location services to each and every system components in the system network, and one or more data center containing clusters of web, application and database servers for supporting wire wild alert and notification systems, and microservices configured for monitoring and managing the system and network of GPS-tracking anti-fire liquid spraying systems and mobile computing and communication devices configured in accordance with the principles of the present invention.

Wireless System Network for Managing the Supply, Delivery and Spray-Application of Environmentally-Clean Anti-Fire/Fire-Inhibiting Biochemical Liquid on Private and Public Property to Reduce the Risks of Damage and/or Destruction Caused by Wild Fires FIG. 4A shows the wireless system network of the present invention 1 designed for managing the supply, delivery and spray-application of environmentally-clean anti-fire (AF) biochemical liquid composition of the present invention, on private and public property to reduce the risks of damage and/or destruction caused by wild fires.

As shown, the wireless system network 1 comprises a distribution of system components, namely: GPS-tracked anti-fire (AF) liquid spray ground vehicles 2 (e.g. all-terrain vehicles or ATVs), as shown in FIGS. 9A, 9B, 12A, 12B, 14A, 14B, 14C, 14D, 15A, 15B, 17A and 17B, for applying AF chemical liquid spray fire inhibitor chemical, formulated according to the present invention, to ground surfaces, brush surfaces, and the surfaces of other forms of organic combustible material on property; GPS-tracked anti-fire liquid spray air-based vehicles 3, as shown in FIGS. 10A, 10B, 11A, and 11B, for applying AF chemical liquid spray of the present invention (formulated as illustrated in FIGS. 6 and 7 and specified herein) from the air to ground surfaces, brush, bushes and other forms of organic material; GPS-tracked mobile anti-fire liquid back-pack spraying systems 4 (e.g. including wheel supported, and backpack-carried systems), as shown in FIGS. 8A, 8B, 13A, 13B, 16A and 16B, for applying AF chemical liquid spray to combustible ground surfaces, brush, bushes, decks, houses, buildings, and other forms of organic material and property surrounding houses; GPS-tracked/GSM-linked anti-fire liquid spraying systems 5, as shown in FIGS. 8A through 17B, for applying AF chemical liquid spray to combustible surfaces on private real property, buildings and surrounding areas; GPS-tracked/GSM-linked liquid spraying systems 6, as shown in FIGS. 8A through 17B, for applying AF chemical liquid spray to combustible surfaces on public real property and buildings and surrounding properties; a GPS-indexed real-property (land) database system 7 for storing the GPS coordinates of the vertices and maps of all land parcels, including private property and building 17 and public property and building 18, situated in every town, county and state in the region over which the system network 1 is used to manage wild fires as they may occur; a cellular phone, GSM, and SMS messaging systems and email servers, collectively 16; and one or more data centers 8 for monitoring and managing GPS-tracking/GSM-linked anti-fire (AF) liquid supply and spray systems, including web servers 9A, application servers 9B and database servers 9C (e.g. RDBMS) operably connected to the TCP/IP infrastructure of the Internet 10, and including a network database 9C1, for monitoring and managing the system and network of GPS-tracking anti-fire liquid spraying systems and various functions supported by the command center 19, including the management of wild fire suppression and the GPS-guided application of anti-fire (AF) chemical liquid over public and private property, as will be described in greater technical detail hereinafter. As shown, each data center 8 also includes an SMS server 9D and an email message server 9E for communicating with registered users on the system network 1 who use a mobile computing device (e.g. an Apple® iPhone or iPad tablet) 11 with the mobile application 12 installed thereon and configured for the purposes described herein. Such communication services will include SMS/text, email and push-notification services known in the mobile communications arts.

As shown in FIG. 4A, the GPS-indexed real-property (land) database system 7 will store the GPS coordinates of the vertices and maps of all land parcels contained in every town, county and state of the region over which the system network is deployed and used to manage wild fires as they may occur. Typically, databases and data processing methods, equipment and services known in the GPS mapping art, will be used to construct and maintain such GPS-indexed databases 7 for use by the system network of the present invention, when managing GPS-controlled application of clean anti-fire (AF) chemical liquid spray and mist over GPS-specified parcels of land, at any given time and date, under the management of the system network of the present invention. Examples of such GPS-indexed maps of land parcels are reflected by the task report shown in FIG. 23, and examples of GPS-indexed maps are shown in the schematic illustrations depicted in FIGS. 18, 20, 22 and 24.

As shown in FIG. 4A, the system network 1 also includes a GPS system 100 for transmitting GPS reference signals transmitted from a constellation of GPS satellites deployed in orbit around the Earth, to GPS transceivers installed aboard each GPS-tracking ground-based or air-based anti-fire (AF) liquid misting/spraying system of the present invention, shown in FIGS. 6A through 10B, as part of the illustrative embodiments. From the GPS signals it receives, each GPS transceiver aboard such AF liquid spraying/misting systems is capable of computing in real-time the GPS location of its host system, in terms of longitude and latitude. In the case of the Empire State Building in NYC, NY, its GPS location is specified as: N40° 44.9064', W073° 59.0735'; and in number only format, as: 40.748440, −73.984559, with the first number indicating latitude, and the second number representing longitude (the minus sign indicates "west").

Figure 4B:
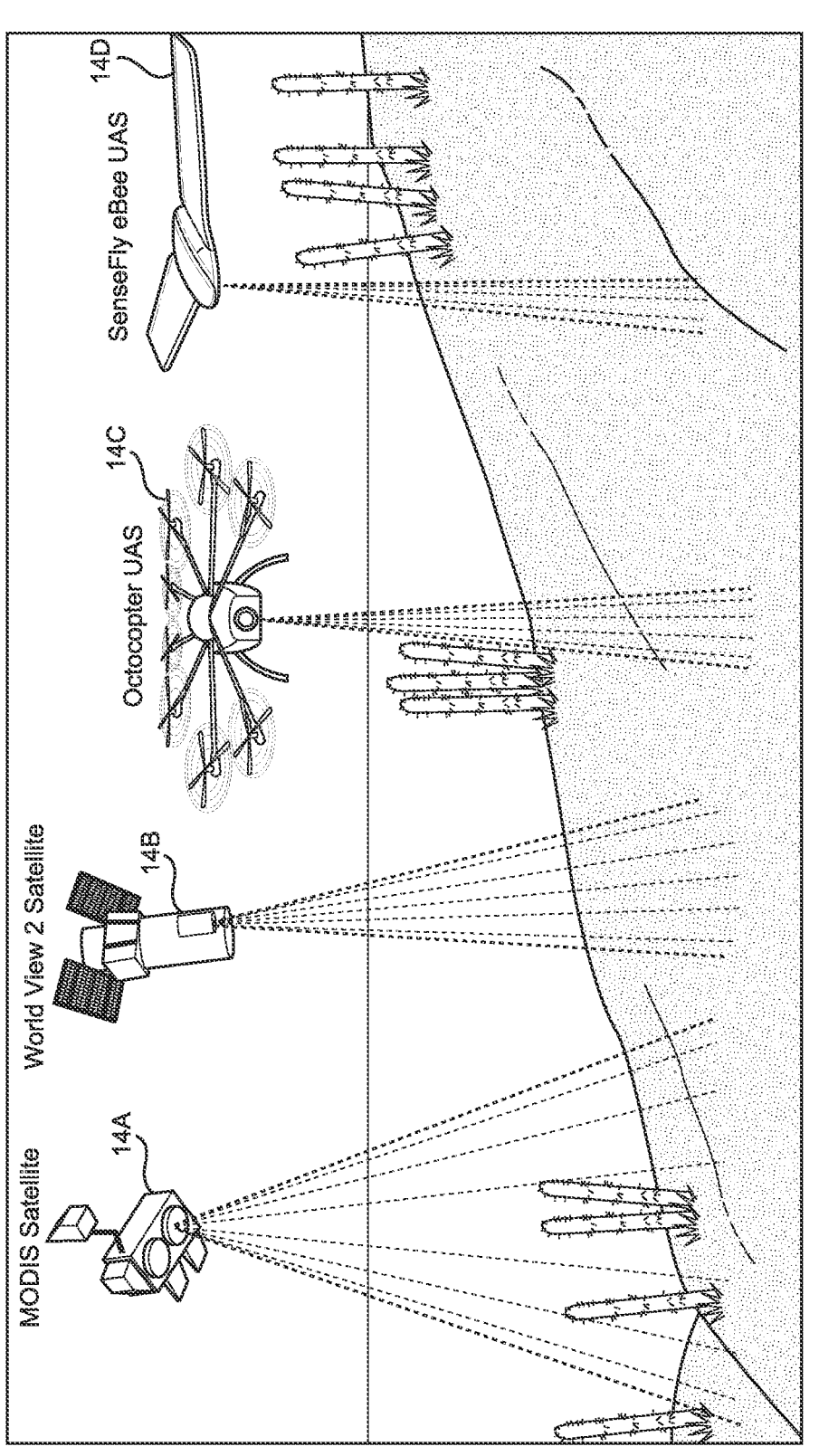
FIG. 4B is a schematic representation illustrating exemplary multi-spectral imaging (MSI) and hyper-spectral imaging (HSI) based remote sensing technology platforms supported by the US Geological Survey (USGS) Agency including, for example, the MODIS (Moderate Resolution Imaging Spectroradiometer) satellite system, the World View 2 Satellite System, the Octocopter unmanned airborne system (UAS) (e.g. OnyxStar Hydra-12 heavy-lifting drone), and the SenseFly eBee SQ UAS, for use in supporting and practicing the system network of the present invention.

As shown in FIG. 4B, the system network 1 further includes multi-spectral imaging (MSI) systems and/or hyper-spectral-imaging (HSI) systems 14 for remotely data sensing and gathering data about wild fires and their progress. Such MSI and HSI systems may be space/satellite-based and/or drone-based (supported on an unmanned airborne vehicle or UAV). Drone-based systems can be remotely-controlled by a human operator, or guided under an artificial intelligence (AI) navigation system. Such AI-based navigation systems may be deployed anywhere, provided access is given to such remote navigation system the system network and its various systems. Typically, the flight time will be limited to under 1 hour using currently available battery technology, so there will be a need to provide provisions for recharging the batteries of such drones/UASs in the field, necessitating the presence of human field personnel to support the flight and remote data sensing and mapping missions of each such deployed drone, flying about raging wild fires, in connection with the system network of the present invention.

During each wild fire data sensing and mapping mission, carried out by such UAS, a series of MSI images and HSI images can be captured during a wild fire, and mapped to GPS-specific coordinates, and this mapped data can be transmitted back to the system network for storage, analysis and generation of GPS-specified flight plans for anti-fire (AF) chemical liquid spray and misting operations carried out using the methods illustrated in FIGS. 24, 25, 26A and 26B seeking to stall and suppress such wild fires, and mitigate risk of damage to property and harm to human and animal life.

FIG. 4B shows a suite of MSI and HSI remote sensing and mapping instruments and technology 14 that is currently being used by the US Geological Survey (USGS) Agency to collect, monitor, analyze, and provide science about natural resource conditions, issues, and problems on Earth. It is an object of the present invention to exploit such instruments and technology when carrying out and practicing the various methods of the present invention disclosed herein. As shown in FIG. 4B, these MSI/HSI remote sensing technologies 14 include: MODIS (Moderate Resolution Imaging Spectro-radiometer) satellite system 14A for generating MODIS imagery subsets from MODIS direct readout data acquired by the USDA Forest Service Remote Sensing Applications Center, to produce satellite fire detection data maps and the like https://fsapps.nwcg.gov/afm/activefiremaps.php; the World View 2 Satellite System 14B manufacture from the Ball Aerospace & Technologies and operated by Digital-Globe, for providing commercially available panchromatic (B/W) imagery of 0.46 meter resolution, and eight-band multi-spectral imagery with 1.84 meter resolution; Octocop-ter UAS (e.g. OnyxStar Hyra-12 heavy lifting drone) 14C as shown in FIG. 4B supporting MSI and HSI camera systems for spectral imaging applications, http://www.onyxstar.net and http://www.genidrone.com; and SenseFly eBee SQ UAS 14D for capturing and mapping high-resolution aerial multi-spectral images https://www.sensefly.com/drones/ebee-sq.html.

Any one or more of these types of remote data sensing and capture instruments, tools and technologies can be inte-grated into and used by the system network 1 for the purpose of (i) determining GPS-specified flight/navigation plans for GPS-tracked anti-fire (AF) chemical liquid spraying and misting aircraft and ground-based vehicle systems, described above, and (ii) practicing the various GPS-guided methods of wild fire suppression illustrated in FIGS. 24 through 32B, and described in detail herein.
Specification of the Network Architecture of the System Network of the Present Invention FIG. 4A illustrates the network architecture of the system network 1 implemented as a stand-alone platform deployed on the Internet. As shown, the Internet-based system net-work comprises: cellular phone and SMS messaging sys-tems and email servers 16 operably connected to the TCP/IP infrastructure of the Internet 10; a network of mobile com-puting systems 11 running enterprise-level mobile applica-tion software 12, operably connected to the TCP/IP infra-structure of the Internet 10; an array of mobile GPS-tracked anti-fire (AF) liquid spraying systems (20, 30, 40, 50), each provided with GPS-tracking and having wireless internet connectivity with the TCP/IP infrastructure of the Internet 10, using various communication technologies (e.g. GSM, Bluetooth, WIFI, and other wireless networking protocols well known in the wireless communications arts); and one or more industrial-strength data center(s) 8, preferably mir-rored with each other and running Border Gateway Protocol (BGP) between its router gateways, and operably connected to the TCP/IP infrastructure of the Internet 10.

As shown in FIG. 4A, each data center 8 comprises: the cluster of communication servers 9A for supporting http and other TCP/IP based communication protocols on the Internet (and hosting Web sites); a cluster of application servers 9B; the cluster of RDBMS servers 9C configured within a distributed file storage and retrieval ecosystem/system, and interfaced around the TCP/IP infrastructure of the Internet well known in the art; the SMS gateway server 9D support-ing integrated email and SMS messaging, handling and processing services that enable flexible messaging across the system network, supporting push notifications; and the clus-ter of email processing servers 9E.

Referring to FIG. 4A, the cluster of communication servers 9A is accessed by web-enabled mobile computing clients 11 (e.g. smart phones, wireless tablet computers, desktop computers, computer workstations, etc.) used by many stakeholders accessing services supported by the system network 1. The cluster of application servers 9A implement many core and compositional object-oriented software modules supporting the system network 1. Typi-cally, the cluster of RDBMS servers 9C use SQL to query and manage datasets residing in its distributed data storage environment, although non-relational data storage methods and technologies such as Apache's Hadoop non-relational distributed data storage system may be used as well.

Figure 19:
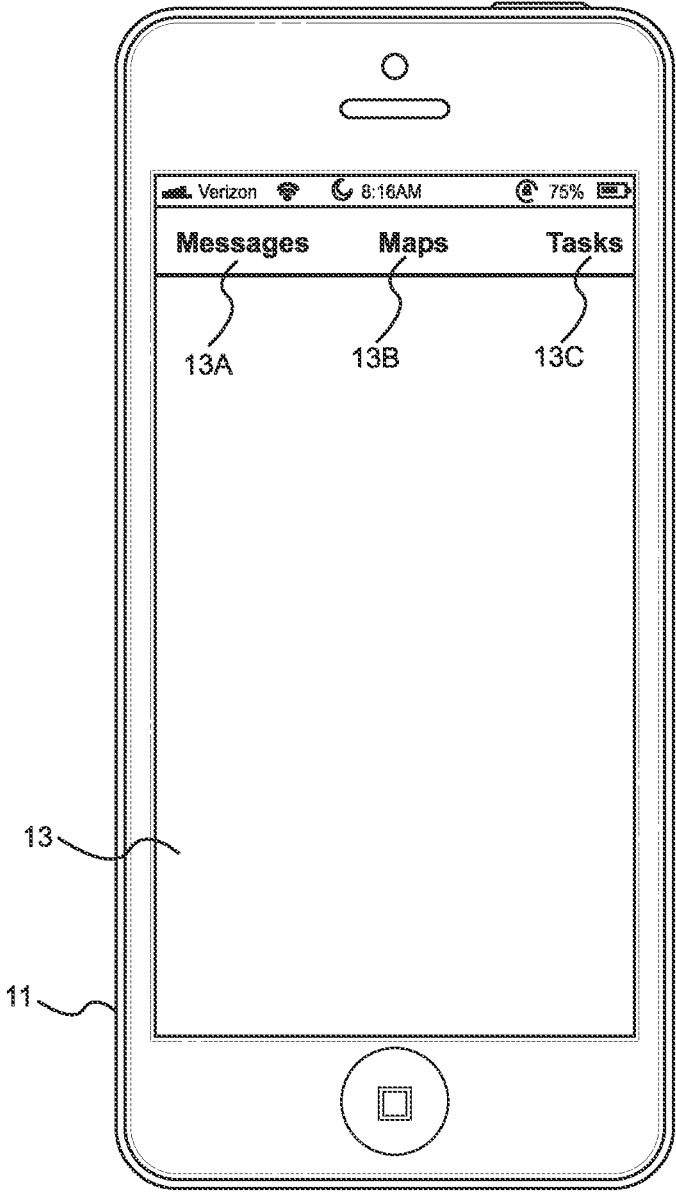
FIG. 19 is an exemplary wire-frame model of a graphical user interface supported by mobile application configured for use by a first specific class of registered users (e.g. property parcel owners, contractors and/or agents, residents, government officials, and others) to request and receive services, including notices and orders, supported by the system network of the present invention.

As shown in FIG. 4A, the system network architecture shows many different kinds of users supported by mobile computing devices 11 running the mobile application 12 of the present invention, namely: the plurality of mobile com-puting devices 11 running the mobile application 12, used by fire departments and firemen to access services supported by the system network 1; the plurality of mobile computing systems 11 running mobile application 12, used by insurance underwriters and agents to access services on the system network 1; the plurality of mobile computing systems 11 running mobile application 12, used by building architects and their firms to access the services supported by the system network 1; the plurality of mobile client systems 11 (e.g. mobile computers such as iPad, and other Internet-enabled computing devices with graphics display capabili-ties, etc.) used by spray-project technicians and administra-tors, and running a native mobile application 12 supported by server-side modules, and the various illustrative GUIs shown in FIGS. 19 through 19D, supporting client-side and server-side processes on the system network of the present invention; and a GPS-tracked anti-fire (AF) liquid spraying systems 20, 30, 40 and 50 for spraying buildings and ground cover to provide protection and defense against wild-fires.

In general, the system network 1 will be realized as an industrial-strength, carrier-class Internet-based network of object-oriented system design, deployed over a global data packet-switched communication network comprising numerous computing systems and networking components, as shown. As such, the information network of the present invention is often referred to herein as the "system" or "system network". The Internet-based system network can be implemented using any object-oriented integrated devel-opment environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably con-figured development and deployment environment well known in the art. Preferably, although not necessary, the entire system of the present invention would be designed according to object-oriented systems engineering (OOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubemetes, an open-source software container/cluster management/orchestration system, for automating deployment, scaling, and management of containerized software applications, such as the mobile enterprise-level application 12 of the present invention, described above.

Figure 5A:
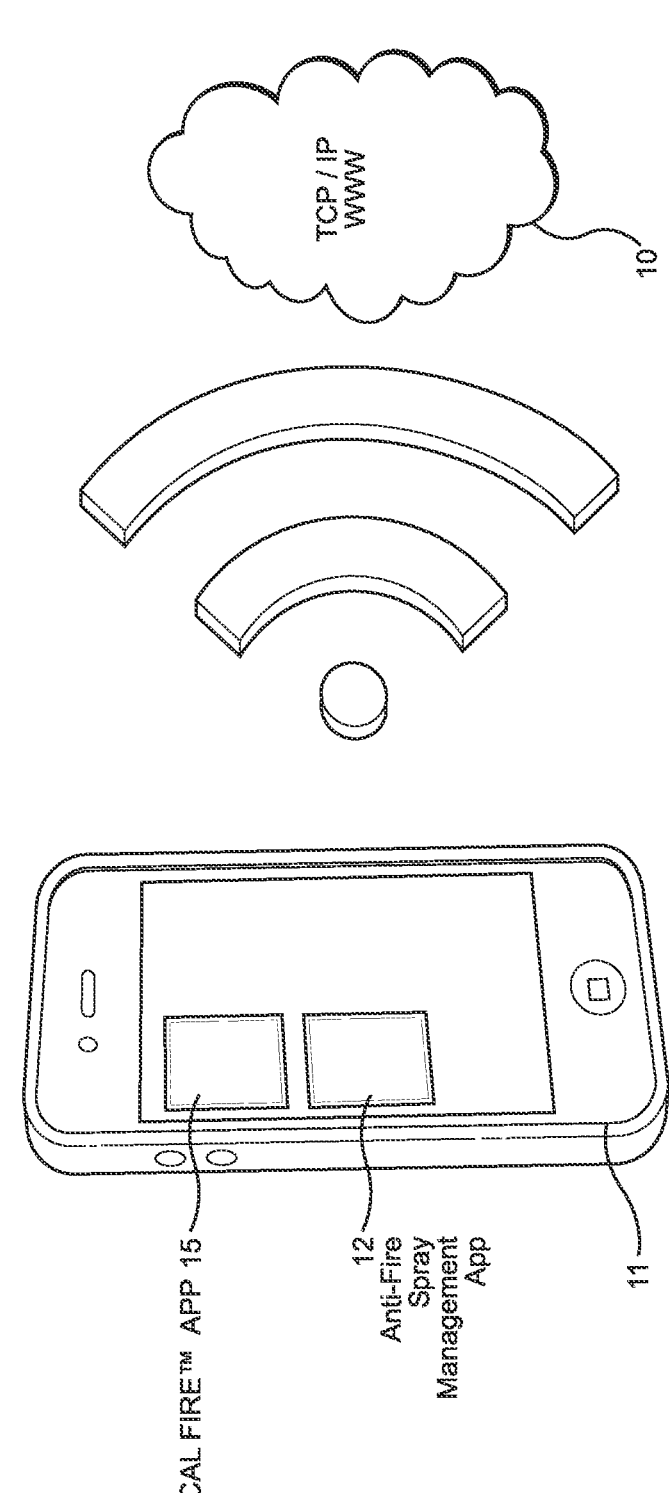
FIG. 5A is a perspective view of an exemplary mobile computing device deployed on the system network of the present invention, supporting (i) the mobile anti-fire spray management application of the present invention deployed as a component of the system network of the present invention as shown in FIGS. 4A and 4B, as well as (ii) conventional wildfire alert and notification systems as shown in FIGS. 3A through 3E.

Specification of System Architecture of an Exemplary Mobile Smartphone System Deployed on the System Network of the Present Invention FIG. 5A shows an exemplary mobile computing device 11 deployed on the system network of the present invention, supporting conventional wildfire alert and notification systems (e.g. CAL FIRE® wild fire notification system 14), as well as the mobile anti-fire spray management application 12 of the present invention, that is deployed as a component of the system network 1.

Figure 5B:
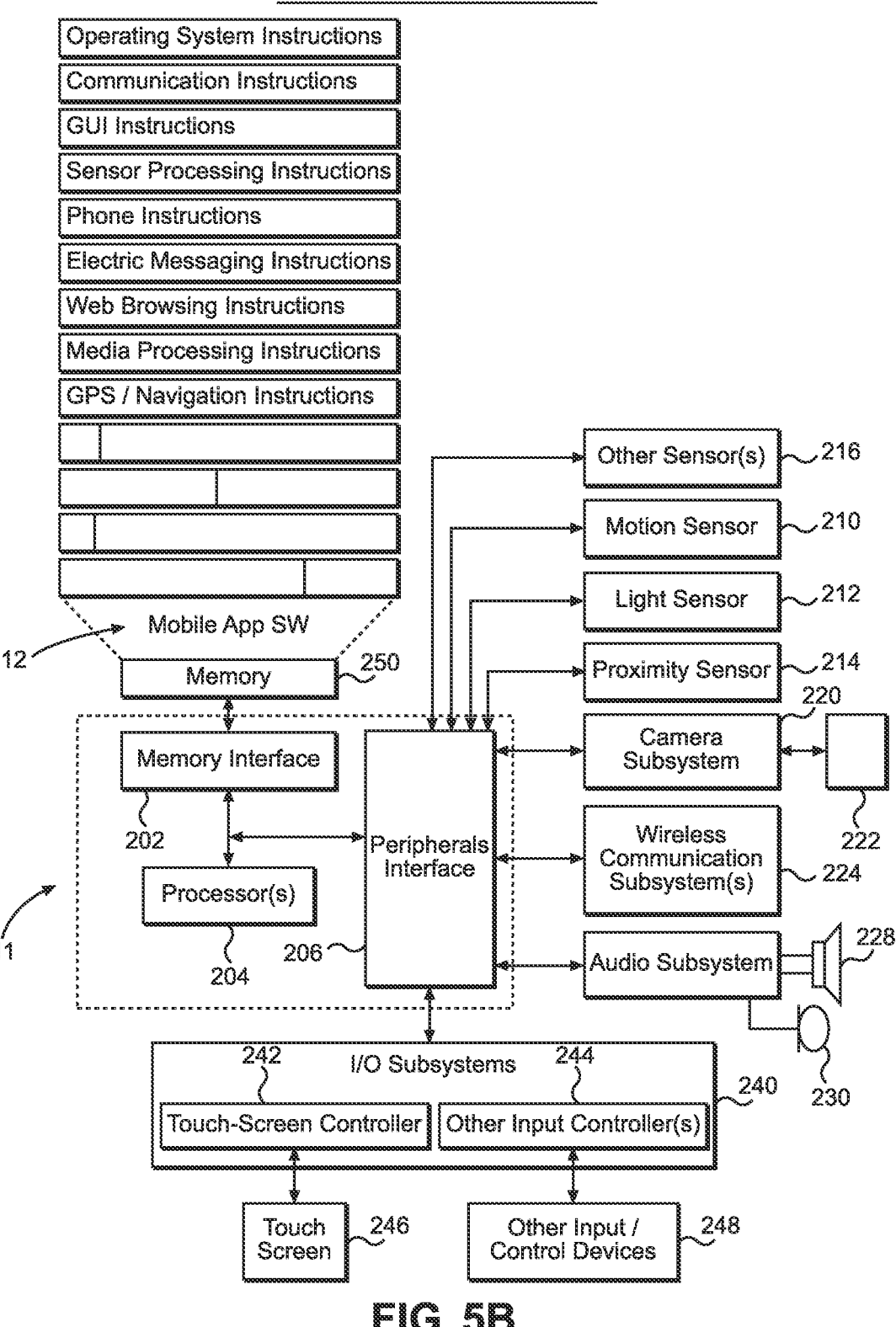
FIG. 5B shows a system diagram for an exemplary mobile client computer system deployed on the system network of the present invention.

FIG. 5B shows the system architecture of an exemplary mobile client computing system 11 that is deployed on the system network 1 and supporting the many services offered by system network servers 9A, 9B, 9C, 9D, 9E. As shown, the mobile smartphone device 11 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 11 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 11 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 11 can be found in U.S. Pat. No. 8,631,358 incorporated herein by reference in its entirety.

Different Ways of Implementing the Mobile Client Machines and Devices on the System Network of the Present Invention In one illustrative embodiment, the enterprise-level system network is realized as a robust suite of hosted services delivered to Web-based client subsystems 1 using an application service provider (ASP) model. In this embodiment, the Web-enabled mobile application 12 can be realized using a web-browser application running on the operating system (OS) (e.g. Linux, Application IOS, etc.) of a mobile computing device 11 to support online modes of system operation, only. However, it is understood that some or all of the services provided by the system network 1 can be accessed using Java clients, or a native client application, running on the operating system of a client computing device, to support both online and limited off-line modes of system operation. In such embodiments, the native mobile application 12 would have access to local memory (e.g. a local RDBMS) on the client device 11, accessible during off-line modes of operation to enable consumers to use certain or many of the system functions supported by the system network during off-line/off-network modes of operation. It is also possible to store in the local RDBMS of the mobile computing device 11 most if not all relevant data collected by the mobile application for any particular fire-protection spray project, and to automatically synchronize the dataset for user's projects against the master datasets maintained in the system network database 9C1, within the data center 8 shown in FIG. 4A. This way, when using a native application, during off-line modes of operation, the user will be able to access and review relevant information regarding any building spray project, and make necessary decisions, even while off-line (i.e. not having access to the system network).

As shown and described herein, the system network 1 has been designed for several different kinds of user roles including, for example, but not limited to: (i) public and private property owners, residents, fire departments, local, county, state and federal officials; and (ii) wild fire suppression administrators, contractors, technicians et al registered on the system network. Depending on which role, for which the user requests registration, the system network will request different sets of registration information, including name of user, address, contact information, etc. In the case of a web-based responsive application on the mobile computing device 11, once a user has successfully registered with the system network, the system network will automatically serve a native client GUI, or an HTML5 GUI, adapted for the registered user. Thereafter, when the user logs into the system network, using his/her account name and password, the system network will automatically generate and serve GUI screens described below for the role that the user has been registered with the system network.

In the illustrative embodiment, the client-side of the system network 1 can be realized as mobile web-browser application, or as a native application, each having a "responsive-design" and adapted to run on any client computing device (e.g. iPhone, iPad, Android or other Web-enabled computing device) 11 and designed for use by anyone interested in managing, monitoring and working to defend against the threat of wild fires.

Specification of Environmentally-Clean Aqueous-Based Liquid Fire Inhibiting Bio-Chemical Compositions and Formulations, and Methods of Making the Same in Accordance with the Principles of the Present Invention Another object of the present invention is to provide new and improved environmentally-clean aqueous-based fire inhibiting biochemical solutions (i.e. wet liquid compositions and dry powder composition formulation kits) for producing biochemical products that demonstrate good immediate extinguishing effects when applied to extinguish a burning or smoldering fire, and very good long-term fire inhibiting effects when being proactively applied to protect combustible surfaces against the threat of fire.

In general, the novel fire inhibiting liquid biochemical compositions of the present invention comprise: (a) a dispersing agent in the form of a quantity of water, for dispersing metal ions dissolved in water; (b) a fire inhibiting agent in the form of at least one alkali metal salt of a nonpolymeric saturated carboxylic acid, for providing metal ions dispersed in the water when the at least one alkali metal salt is dissolved in the water; (c) a coalescing agent in the form of an organic compound containing three carboxylic acid groups (or salt/ester derivatives thereof), such as triethyl citrate, an ester of citric acid, for dispersing and coalescing the metal ions when the fire inhibiting liquid composition is applied to a surface to be protected against fire, while water molecules in the water evaporate during drying, and the metal ions cooperate to form metal salt crystal structure on the surface; (d) if appropriate, at least one biocide (e.g. Polyphase® PW40 Biocide from Troy Corporation or citric acid) dissolved in water; (e) if appropriate, at least one colorant; and (f) if appropriate, an adhesive agent (e.g. natural gum) for adding cling factor or adhesion properties to the biochemical liquid composition when applied to a surface to be protected against fire.

Useful alkali metal salts of nonpolymeric saturated carboxylic acids for inclusion in the compositions of the present invention preferably comprise: alkali metal salts of oxalic acid; alkali metal salts of gluconic acid; alkali metal salts of citric acid; and also alkali metal salts of tartaric acid. Alkali metal salts of citric acid are particularly preferred, as will be further explained hereinafter.

Notably, while the efficacy of the alkali metal salts increases in the order of lithium, sodium, potassium, cesium and rubidium, the salts of sodium and salts of potassium are preferred for cost of manufacturing reasons. Potassium carboxylates are very particularly preferred, but tripotassium citrate monohydrate (TPC) is the preferred alkali metal salt for use in formulating the environmentally-clean fire inhibiting biochemical compositions of the present invention.

While it is understood that other alkali metal salts are available to practice the biochemical compositions of the present invention, it should be noted that the selection of tripotassium citrate as the preferred alkali metal salt, includes the follow considerations: (i) the atomic ratio of carbon to potassium (the metal) in the utilized alkali metal salt (i.e. tripotassium citrate); (ii) that tripotassium citrate is relatively stable at transport and operating temperatures; (iii) tripotassium citrate is expected to be fully dissociated to citrate and potassium when dissolved in water, and that the dissociation constant is not relevant for the potassium ions, while citric acid/citrate has three ionizable carboxylic acid groups, for which pKa values of 3.13, 4.76 and 6.4 at 25° C. are reliably reported the European Chemicals Agency (ECHA) handbook; and (iv) that tripotassium citrate produces low carbon dioxide levels when dissolved in water.

Tripotassium citrate is an alkali metal salt of citric acid (a weak organic acid) that has the molecular formula $C_6H_8O_7$. While citric acid occurs naturally in citrus fruit, in the world of biochemistry, citric acid is an intermediate in the celebrated "Citric Acid cycle, also known as the Krebs Cycle (and the Tricarboxylic Acid Cycle), which occurs in the metabolism of all aerobic organisms. The role that citric acid plays in the practice of the biochemical compositions of the present invention will be described in greater detail hereinafter.

Preferably, the water soluble coalescing agent should have a melting point at least 32 F (0 C) or lower in temperature, and be soluble in water. Triethyl citrate (TEC) is a preferred coalescing agent when used in combination with tripotassium citrate (TPC) having excellent compatibility given that both chemical compounds are derived from citric acid.

Ideally, the biocidal agent should help increase stability in storage, especially of the aqueous preparations, and also prevent or inhibit growth of mildew, mold and fungus when the biochemical liquid compositions are sprayed or otherwise applied to the surfaces of wood products that to be treated therewith, to produce Class-A fire-protected wood products with resistance to mold, mildew and fungus growth. This is important when wood products are shipped and stored in lumber yard and allowed to be exposed to the natural elements for months on a construction site, where moisture is present and conditions are excellent for such microbial growth. Mold, mildew and fungus growth not only detracts from the appearance of the wood product, but also can adversely decrease wood fiber strength and other mechanical properties for which wood products are used in specific construction applications.

In some applications, the use of colorants may be advantageous with or without opacifying assistants, to the fire inhibiting biochemical liquid compositions of the present invention. Opacifying assistants make the fire-retarding biochemical composition cloudy and prevent any interaction between the color of the added colorant used and the background color.

The preferred colorant is mica, especially natural mica. Mica also acts as an opacifying assistant, so that a separate opacifying assistant can be omitted. Areas which have already been treated are easier to identify, for example from the air. In addition, mica is capable of reflecting direct thermal radiation.

The concentration of the dye in the fire-retarding biochemical composition is preferably in the range from 0.005% to 10% by weight, more preferably in the range from 0.01% to 5% by weight and most preferably in the range from 0.015% to 2% by weight.

Of particular advantage are dyes, food dyes for example, which fade as the fire-retarding composition dries and gradually decompose or are otherwise easily removable, for example by flushing with water.

Also, if appropriate for any particular fire inhibiting application at hand, an adhesion agent can be added to the biochemical composition, and realized in the form of a natural gum or starch in minor amounts to promote cling factor or adhesion properties between the metal salt crystal structures formed within liquid biochemical and the surface to which it has been applied, preferably by spraying, for proactive fire protection. Preferably, the concentration of the adhesion agent in the fire-retarding biochemical composition is preferably in the range from 0.005% to 10% by weight, more preferably in the range from 0.01% to 5% by weight and most preferably in the range from 0.015% to 2% by weight.

The fire inhibiting liquid biochemical compositions of the present invention are producible and prepared by mixing the components in specified amounts with water to produce the fire inhibiting composition. The order of mixing is discretionary. It is advantageous to produce aqueous preparations by mixing the components other than water, into water.

The fire-retarding biochemical compositions of the present invention have a good fire inhibiting effect and, a good immediate fire extinguishing effect. This mixing of the constituent biochemical compounds can take place before or during their use. For example, an aqueous preparation may be set and kept in readiness for fire inhibiting use. However, it is also possible for the aqueous preparation not to be produced until it is produced, by diluting with water, during a fire defense deployment application.

The compositions of the present invention are also useful as a fire extinguishing agent for fighting fires of Class A, B, C and D. For example, an aqueous biochemical solution of the present invention may be prepared and deployed for firefighting uses in diverse applications. However, it is also possible for the aqueous biochemical composition to not to be produced until it is needed, and when so, by diluting and dissolving its components with a prespecified quantity of water, during firefighting deployments.

Specification of Preferred Embodiments of Aqueous-Based Fire Inhibiting Biochemical Compositions of Matter In the first preferred embodiment of the fire inhibiting liquid biochemical composition of the present invention, the components are realized as follows: (a) the dispersing agent is realized in the form of a quantity of water, for dispersing metal ions dissolved in the water; (b) the fire inhibiting agent is realized in the form of an alkali metal salt of a nonpolymeric saturated carboxylic acid, specifically, tripotassium citrate, for providing metal (potassium) ions dispersed in the water when the at least one alkali metal salt is dissolved in the water; and (c) a coalescing agent realized the form of an organic compound containing three carboxylic acid groups (or salt/ester derivatives thereof), specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form potassium citrate salt crystal structure on the treated surface.

In the second preferred embodiment of the fire inhibiting liquid biochemical composition of the present invention, the components are realized as follows: (a) the dispersing agent is realized in the form of a quantity of water, for dispersing metal ions dissolved in the water; (b) the fire inhibiting agent is realized in the form of an alkali metal salt of a nonpolymeric saturated carboxylic acid, specifically, tripotassium citrate, for providing metal (potassium) ions dispersed in the water when the at least one alkali metal salt is dissolved in the water; (c) a coalescing agent realized the form of an organic compound containing three carboxylic acid groups (or salt/ester derivatives thereof), specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form potassium citrate salt crystal structure on the treated surface; and (d) at least one biocide agent dissolved in the quantity of water.

In the third preferred embodiment of the fire inhibiting liquid biochemical composition of the present invention, the components are realized as follows: (a) the dispersing agent is realized in the form of a quantity of water, for dispersing metal ions dissolved in the water; (b) the fire inhibiting agent is realized in the form of an alkali metal salt of a nonpolymeric saturated carboxylic acid, specifically, tripotassium citrate, for providing metal (potassium) ions dispersed in the water when the at least one alkali metal salt is dissolved in the water; (c) a coalescing agent realized the form of an organic compound containing three carboxylic acid groups (or salt/ester derivatives thereof), specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form potassium citrate salt crystal structure on the treated surface; and (d) at least one biocide agent in the form of citric acid dissolved in the quantity of water.

In the fourth preferred embodiment of the fire inhibiting liquid biochemical composition of the present invention, the components are realized as follows: (a) the dispersing agent is realized in the form of a quantity of water, for dispersing metal ions dissolved in the water; (b) the fire inhibiting agent is realized in the form of an alkali metal salt of a nonpolymeric saturated carboxylic acid, specifically, tripotassium citrate, for providing metal (potassium) ions dispersed in the water when the at least one alkali metal salt is dissolved in the water; (c) a coalescing agent realized the form of an organic compound containing three carboxylic acid groups (or salt/ester derivatives thereof), specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form potassium citrate salt crystal structure on the treated surface; (d) at least one biocide agent dissolved in the quantity of water; and (e) at least one colorant.

Once prepared using any of formulations specified above, the liquid biochemical composition is then stored in a container, bottle or tote (i.e. its package) suitable for the end user application in mind. Then, the filled package should be sealed with appropriate sealing technology and immediately labeled with a specification of (i) its biochemical components, with weight percent measures where appropriate, and the date and time of manufacture, printed and recorded in accordance with good quality control (QC) practices well known in the art. Where necessary or desired, barcode symbols and/or barcode/RFID identification tags and labels can be produced and applied to the sealed package to efficiently track each barcoded package containing a specified quantity of clean fire inhibiting biochemical composition. All product and QC information should be recorded in a globally accessible network database, for use in tracking the movement of the package as it moves along the supply chain from its source of manufacture, toward it end use at a GPS specified location.

Specification of Preferred Embodiments of the Dry Fire Inhibiting Biochemical Compositions of Matter Assembled as a Fire Inhibiting Biochemical Composition Kit for Use with Specified Quantities of Water In the fifth preferred embodiment of the fire inhibiting liquid biochemical composition of the present invention, the components are realized as follows: (a) the fire inhibiting agent is realized in the form of an alkali metal salt of a nonpolymeric saturated carboxylic acid, specifically, tripotassium citrate, for providing metal potassium ions to be dissolved and dispersed in a quantity of water; (b) a coalescing agent realized the form of an organic compound containing three carboxylic acid groups (or salt/ester derivatives thereof), specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form potassium citrate salt crystal structure on the treated surface; (c) if appropriate, at least one biocide in the form of citric acid, dissolved in the quantity of water; and (d) if appropriate, at least one colorant.

In the sixth preferred embodiment of the fire inhibiting liquid biochemical composition of the present invention, the components are realized as follows: (a) the fire inhibiting agent is realized in the form of an alkali metal salt of a nonpolymeric saturated carboxylic acid, specifically, tripotassium citrate, for providing metal potassium ions to be dissolved and dispersed in a quantity of water; (b) a coalescing agent realized the form of an organic compound containing three carboxylic acid groups (or salt/ester derivatives thereof), specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form potassium citrate salt crystal structure on the treated surface; (c) at least one biocide in the form of citric acid, dissolved in the quantity of water; and (d) if appropriate, at least one colorant.

Selecting Tripotassium Citrate (TCP) as a Preferred Fire Inhibiting Agent for Use in the Fire Inhibiting Biochemical Compositions of the Present Invention In the preferred embodiments of the present invention, tripotassium citrate (TPC) is selected as active fire inhibiting chemical component in fire inhibiting biochemical composition. In dry form, TPC is known as tripotassium citrate monohydrate ($C_6H5K_3O_7 \cdot H_2O$) which is the common tribasic potassium salt of citric acid, also known as potassium citrate. It is produced by complete neutralization of citric acid with a high purity potassium source, and subsequent crystallization. Tripotassium citrate occurs as transparent crystals or a white, granular powder. It is an odorless substance with a cooling, salty taste. It is slightly deliquescent when exposed to moist air, freely soluble in water and almost insoluble in ethanol (96%).

Tripotassium citrate is a non-toxic, slightly alkaline salt with low reactivity. It is chemically stable if stored at ambient temperatures. In its monohydrate form, TPC is very hygroscopic and must be protected from exposure to humidity. Care should be taken not to expose tripotassium citrate monohydrate to high pressure during transport and storage as this may result in caking. Tripotassium citrate monohydrate is considered "GRAS" (Generally Recognized As Safe) by the United States Food and Drug Administration without restriction as to the quantity of use within good manufacturing practice. CAS Registry Number:[6100-05-6]. E-Number: E332.

Tripotassium citrate monohydrate (TPC) is a non-toxic, slightly alkaline salt with low reactivity. It is a hygroscopic and deliquescent material. It is chemically stable if stored at ambient temperatures. In its monohydrate form, it is very hygroscopic and must be protected from exposure to humidity. Its properties are:

Monohydrate

White granular powder

Cooling, salty taste profile, less bitter compared to other potassium salts

Odorless

Very soluble in water

Potassium content of 36%

Slightly alkaline salt with low reactivity

Hygroscopic

Chemically and microbiologically stable

Fully biodegradable

Allergen and GMO free

Jungbunzlauer (JBL), a leading Swiss manufacturer of biochemicals, manufactures and distributes TPC for food-grade, healthcare, pharmaceutical and over the counter (OTC) applications around the world. As disclosed in JBL's product documents, TPC is an organic mineral salt which is so safe to use around children and adults alike. Food scientists worldwide have added TPC to (i) baby/infant formula powder to improve the taste profile, (ii) pharmaceuticals/OTC products as a potassium source, and (iii) soft drinks as a soluble buffering salt for sodium-free pH control in beverages, improving stability of beverages during processing, heat treatment and storage.

Selecting Triethyl Citrate (TEC) as a Preferred Coalescing Agent with Surface Tension Reducing and Surfactant Properties for Use in the Fire Inhibiting Biochemical Compositions of the Present Invention In the preferred illustrative embodiments of the present invention, the coalescing agent used in the fire inhibitor biochemical compositions of the present invention is realized as a food-grade additive component, namely, triethyl citrate (TEC) which functions as a coalescing agent with surface tension reducing properties and surfactant properties as well. Triethyl citrate belongs to the family of tricarboxylic acids (TCAs) and derivatives, organic compounds containing three carboxylic acid groups (or salt/ester derivatives thereof).

In the aqueous-based fire inhibiting liquid composition, the coalescing agent functions as temporary dispersing agent for dispersing the metal ions dissolved and disassociated in aqueous solution. As water molecules evaporate from a coating of the biochemical composition, typically spray/atomized applied to a surface to be protected from fire, the coalescing agent allows the formation of thin metal (e.g. potassium citrate) salt crystal structure/films at ambient response temperature conditions of coating application. The coalescent agent promotes rapid metal salt crystal structure formation on surfaces to be protected against wildfire, and have a hardness evolution that promotes durability against rain and ambient moisture, while apparently allowing vital oxygen and CO2 gas transport to occur, without causing detrimental effects to the vitality of living plant tissue surfaces sought to be protected against wildfire.

A relatively minor quantity of triethyl citrate (TEC) liquid is blended with a major quantity of TCP powder in specific quantities by weight and dissolved in a major quantity of water to produce a clear, completely-dissolved liquid biochemical formulation consisting of food-grade biochemicals mixed with water and having highly effective fire inhibiting properties, as proven by testing. The resulting aqueous biochemical solution remains stable without the formation of solids at expected operating temperatures (e.g. 34 F to 120 F).

Jungbunzlauer (JBL) also manufactures and distributes its CITROFOL® A1 branded bio-based citrate esters for food-grade, healthcare, pharmaceutical and over the counter (OTC) applications around the world. CITROFOL® A1 triethyl citrate (TEC) esters have an excellent toxicological and eco-toxicological profile, and provide good versatility and compatibility with the tripotassium citrate (TPC) component of the biochemical compositions of the present invention. CITROFOL® A1 branded citrate esters are particularly characterized by highly efficient solvation, low migration and non-VOC (volatile organic compound) attributes. As an ester of citric acid, triethyl citrate is a colorless, odorless liquid which historically has found use as a food additive (E number E1505) to stabilize foams, especially as a whipping aid for egg whites.

Broadly described, the fire inhibiting biochemical liquid coatings of the present invention consist of an aqueous dispersion medium such as water which carries dissolved metal salt cations that eventually form a thin metal salt crystalline structure layer on the surface substrate to be protected from ignition of fire. The aqueous dispersion medium may be an organic solvent, although the preferred option is water when practicing the present invention. After the application of a coating onto the combustible surface to be protected against fire ignition and flame spread and smoke development, the aqueous dispersion medium evaporates, causing the metal salt (i.e. potassium salt) cations to draw together. When these metal salt particles come into contact, the coalescing agent, triethyl citrate, takes effect, uniformly dispersing the same while reducing liquid surface tension, and giving rise to the formation of a relatively homogeneous metal salt crystalline structure layer over the surface. In practice, this interaction is more complex and is influenced by various factors, in particular, the molecular interaction of the potassium salt cations and the coalescing agent, triethyl citrate, as the water molecules are evaporating during the drying process.

While offering some surface tension reducing effects, the main function of the coalescing agent in the biochemical composition of the present invention is to ensure a relatively uniform and optimal formation of the salt crystalline structure layers on the combustible surfaces to be protected, as well as desired mechanical performance (e.g. offering scrub resistance and crystal coating hardness) and aesthetic values (e.g. gloss and haze effects).

The fact that CITROFOL® A1 triethyl citrate (TEC) esters are bio-based, odorless, biodegradable and label-free, represents a great advantage over most other coalescing agents, and fully satisfies the toxicological and environmental safety requirements desired when practicing the biochemical compositions of the present invention.

In the preferred embodiments of the present invention, the use of CITROFOL® A1 triethyl citrate (TEC) esters with tripotassium citrate monohydrate (TPC) dissolved in water as a dispersion solvent, produce fire inhibiting biochemical formulations that demonstrate excellent adhesion, gloss and hardness properties. The chemical and colloidal nature of potassium salt ions (which are mineral salt dispersions) present in TPC dissolved in water, is highly compatible with the CITROFOL® A1 triethyl citrate (TEC) ester used as the coalescing agent in the preferred embodiments of the present invention. Also, CITROFOL® A1 triethyl citrate esters are REACH registered and are safe, if not ideal, for use in environmentally sensitive products such as fire and wildfire inhibitors which must not adversely impact human, animal and plant life, ecological systems, or the natural environment.

CITROFOL® triethyl citrate esters were selected because they are biodegradable, and exhibit an excellent toxicological and eco-toxicological profile for the applications of the present invention. These esters are also versatile and demonstrate very good compatibility with the TPC solution, and are characterized by a high solvating efficiency.

Selecting Citric Acid as a Natural and Safe Biocidal Agent for Use in the Fire Inhibiting Biochemical Compositions of the Present Invention Polyphase® PW40 water-based biocidal agent from Troy Chemical can be added to the biochemical compositions of the present invention, as described and specified herein, to control and inhibit the growth of mold, mildew and fungus on wood products treated with the biochemical of the present invention. This biocidal agent (i.e. biocide) has shown to be effective in the applications described herein. However, the water-based Polyphase® PW40 biocide includes compounds (i.e. $C_8H_{12}INO_2$ or IPBC) as active ingredients that have been shown to have a toxicity profile that is not as safe as common organic acids such as citric acid, which is ubiquitous in nature and all of nature's life processes. Thus, it would be highly desirable to use organic food grade compounds to provide effective biocidal properties to the biochemical compositions of the present invention, to control and inhibit the growth of mold, mildew and fungus on wood surfaces that are (i) proactively treated with the biochemical compositions of the present invention, and (ii) later exposed to rain, moisture and natural elements while in storage at lumber yards, and/or on wet damp building construction sites where projects may last for at least 3-6 or more months before the buildings under construction are closed in and protected from the natural elements.

As an alternative biocidal agent, an object of the present invention is to add a minor amount of citric acid to the biochemical compositions of the present invention to effectively realize a natural and safe biocidal agent in the fire inhibitor biochemical compositions of the present invention, based on i a food-grade additive component, namely, citric acid, which functions to control and inhibit the growth of mold, mildew and fungus on the surface coated with the fire inhibiting biochemical composition of the present invention.

It is well known that citric acid also belongs to the family of tricarboxylic acids (TCA) and derivatives, organic compounds containing three carboxylic acid groups (or salt/ester derivatives thereof). Citric acid is a weak organic acid found in citrus fruits. In biochemistry, citric acid is important as an intermediate in the citric acid cycle (i.e. tricarboxylic acid (TCA) cycle), and therefore occurs in the metabolism of almost all living things. The tricarboxylic acid (TCA) cycle is also called the Krebs cycle which functions in the second stage of cellular respiration, a three-stage process by which living cells break down organic fuel molecules in the presence of oxygen to harvest the energy they need to grow and divide and maintain cellular vitality. TCA cycle is the predominant source in all aerobic organisms to generate NADH and FADH2 from acetyl CoA, a product obtained by the decarboxylation of pyruvate. In addition, TCA cycle is also a major pathway for interconversion of metabolites and provides substrates for amino acid synthesis by transamination as well as for fatty acid synthesis and gluconeogenesis. The cycle starts with the condensation of acetyl-CoA with oxaloacetate to form citrate, a reaction catalyzed by citrate synthase. The entire cycle can be divided into two stages: (a) a decarboxylating stage involving conversion of citrate to succinyl-CoA; and (b) a reductive stage involving successive oxidation of succinate to fumarate, fumarate to malate, and then malate to oxaloacetate.

Through control of PH and oxidation in the biochemical compositions of the present invention, the citric acid is used in minor amounts in these biochemical compositions of matter for the purpose of controlling, inhibiting and preventing the grow of mold, mildew and fungus without the use of toxic chemical compounds known to pose health effects to humans and animals alike.

Specification of Preferred Formulations for the Fire Inhibiting Biochemical Compositions of Matter According to the Present Invention

Example #1: Liquid-Based Fire Inhibiting Biochemical Composition

FIG. 6A1 illustrates the primary components of a first environmentally-clean aqueous-based fire inhibiting liquid biochemical composition of the present invention consisting of tripotassium citrate (TPC) and triethyl citrate (TEC) formulated with water functioning as a solvent, carrier and dispersant in the biochemical composition.

Example 1: Schematically illustrated in FIG. 6A1: A fire-extinguishing and/or fire-retarding biochemical composition was produced by stirring the components into water. The composition comprising: 0.05 pounds by weight of triethyl citrate as coalescing agent, (20.3 milliliters by volume); 5.2 pounds by weight of tripotassium citrate (64 fluid ounces by volume); and 4.4 pounds by weight of water (64 fluid ounces by volume), to produce a resultant solution of total weight of 9.61 pounds having 128 ounces or 1 gallon of volume.

Example #2: Dry-Powder Fire Inhibiting Biochemical Composition

FIG. 6A2 illustrates the primary components of a first fire inhibiting biochemical composition kit of the present invention, consisting of dry tripotassium citrate (TPC) and triethyl citrate (TEC) components for mixing with a predetermined quantity of water functioning as a solvent, carrier and dispersant, to make up a predetermined quantity of environmentally-clean liquid fire inhibiting biochemical composition for proactively protecting wood products.

Example 2: Schematically Illustrated in FIG. 6A2: A fire-extinguishing and/or fire-retarding biochemical composition was produced by blending the following components, in amounts proportional to the formulation comprising: 0.05 pounds by weight of triethyl citrate as coalescing agent, (20.3 milliliters by volume); 5.2 pounds by weight of tripotassium citrate (64 fluid ounces by volume); packaging the blended components together in a container or package for mixing with 4.4 pounds by weight of water (64 fluid ounces by volume), to produce a resultant solution of total weight of 9.61 pounds having 128 ounces or 1 gallon of volume.

Example #3: Liquid-Based Fire Inhibiting Biochemical Composition with Mold/Mildew/Fungus-Resistance FIG. 6B1 illustrates the primary components of a second environmentally-clean aqueous-based fire inhibiting liquid biochemical composition of the present invention consisting of tripotassium citrate (TPC), triethyl citrate (TEC) and citric acid (CA) formulated with water functioning as a solvent, carrier and dispersant in the biochemical composition.

Example 3: Schematically Illustrated in FIG. 6B1: A fire-extinguishing and/or fire-retarding biochemical composition was produced by stirring the components into water. The composition comprising: 0.05 pounds by weight of triethyl citrate as coalescing agent, (20.3 milliliters by volume); 5.2 pounds by weight of tripotassium citrate (64 fluid ounces by volume); 4.0 ounces by weight of a biocide (e.g. Polyphase® PW40 by Troy Chemical); and 4.4 pounds by weight of water (64 fluid ounces by volume), to produce a resultant solution of total weight of 10.00 pounds having 128 ounces or 1 gallon of volume.

Example #4: Dry-Powder Fire Inhibiting Biochemical Composition with Mold/Mildew/Fungus-Resistance FIG. 6B2 illustrates the primary components of the second fire inhibiting biochemical composition kit of the present invention, consisting of dry tripotassium citrate (TPC), triethyl citrate (TEC) and citric acid (CA) components for mixing with a predetermined quantity of water functioning as a solvent, carrier and dispersant, to make up a predetermined quantity of environmentally-clean liquid fire inhibiting biochemical composition for proactively protecting wood products.

Example 4: Schematically Illustrated in FIG. 6B2: A fire-extinguishing and/or fire-retarding biochemical composition was produced by blending the following components in amounts proportional to the formulation comprising: 0.05 pounds by weight of triethyl citrate as coalescing agent, (20.3 milliliters by volume); 5.2 pounds by weight of tripotassium citrate (64 fluid ounces by volume); 4.0 ounces by weight of a biocide agent (e.g. Polyphase® PW40 by Troy Chemical); packaging the blended components together in a container or package for mixing with 4.4 pounds by weight of water (64 fluid ounces by volume), to produce a resultant solution of total weight of 10.0 pounds having 128 ounces or 1 gallon of volume.

Example #5: Liquid-Based Fire Inhibiting Biochemical Composition with Mold/Mildew/Fungus-Resistance FIG. 6C1 illustrates the primary components of a second environmentally-clean aqueous-based fire inhibiting liquid biochemical composition of the present invention consisting of tripotassium citrate (TPC), triethyl citrate (TEC) and citric acid (CA) formulated with water functioning as a solvent, carrier and dispersant in the biochemical composition.

Example 5: Schematically Illustrated in FIG. 6C1: A fire-extinguishing and/or fire-retarding biochemical composition was produced by stirring the components into water. The composition comprising: 0.05 pounds by weight of triethyl citrate as coalescing agent, (20.3 milliliters by volume); 5.2 pounds by weight of tripotassium citrate (64 fluid ounces by volume); 4.0 ounces by weight of a biocide agent (e.g. citric acid); and 4.4 pounds by weight of water (64 fluid ounces by volume), to produce a resultant solution of total weight of 10.00 pounds having 128 ounces or 1 gallon of volume.

Example #6: Dry-Powder Fire Inhibiting Biochemical Composition with Mold/Mildew/Fungus-Resistance FIG. 6C2 illustrates the primary components of the second fire inhibiting biochemical composition kit of the present invention, consisting of dry tripotassium citrate (TPC), triethyl citrate (TEC) and citric acid (CA) components for mixing with a predetermined quantity of water functioning as a solvent, carrier and dispersant, to make up a predetermined quantity of environmentally-clean liquid fire inhibiting biochemical composition for proactively protecting wood products.

Example 6: Schematically Illustrated in FIG. 6C2: A fire-extinguishing and/or fire-retarding biochemical composition was produced by blending the following components in amounts proportional to the formulation comprising: 0.05 pounds by weight of triethyl citrate as coalescing agent, (20.3 milliliters by volume); 5.2 pounds by weight of tripotassium citrate (64 fluid ounces by volume); 4.0 ounces by weight of a biocide agent (e.g. citric acid); packaging the blended components together in a container or package for mixing with 4.4 pounds by weight of water (64 fluid ounces by volume), to produce a resultant solution of total weight of 10.0 pounds having 128 ounces or 1 gallon of volume. Preferred Weights Percentages of the Components of the Fire Inhibiting Biochemical Formulation of the Present Invention In the biochemical compositions of the present invention The ratio of the ester of citrate (e.g. triethyl citrate) to the alkali metal salt of a nonpolymeric carboxylic acid (e.g. tripotassium citrate) may be major amount between 1:100: to 1:1000 and is typically in the range from 1:1 to 1:100, preferably in the range from 1:2 to 1:50, more preferably in the range from 1:4 to 1:25 and most preferably in the range from 1:8 to 1:15.

A preferred biochemical composition according to the present invention comprises: a major amount from 1% to 65% by weight, preferably from 20% to 50% by weight and more preferably from 30% to 55% by weight, of at least one alkali metal salt of a nonpolymeric saturated carboxylic acid (e.g. tripotassium citrate monohydrate or TPC); and minor amount from 0.08% to 5% by weight, preferably from 0.5% to 2% by weight and more preferably from 0.1% to 1.0% by weight, of triethyl citrate (an ester of citrate acid); wherein the sum by % weight of the components (a) and (b) should not exceed 100% by weight.

In a preferred embodiment, the fire inhibiting composition further comprises water. The water content is present in a major amount and is typically not less than 30% by weight, preferably not less than 40% by weight, more preferably not less than 50% by weight and most preferably not less than 60% by weight and preferably not more than 60% by weight and more preferably not more than 70% by weight, all based on the fire inhibiting biochemical composition.

The viscosity of the aqueous preparation is preferably at least 5 [mPas](millipascal-seconds, in SI units, defined as the internal friction of a liquid to the application of pressure or shearing stress determined using a rotary viscometer), and preferably not more than 50 [mPas], or 50 centipois) [cps], for most applications.

Figure 7A:
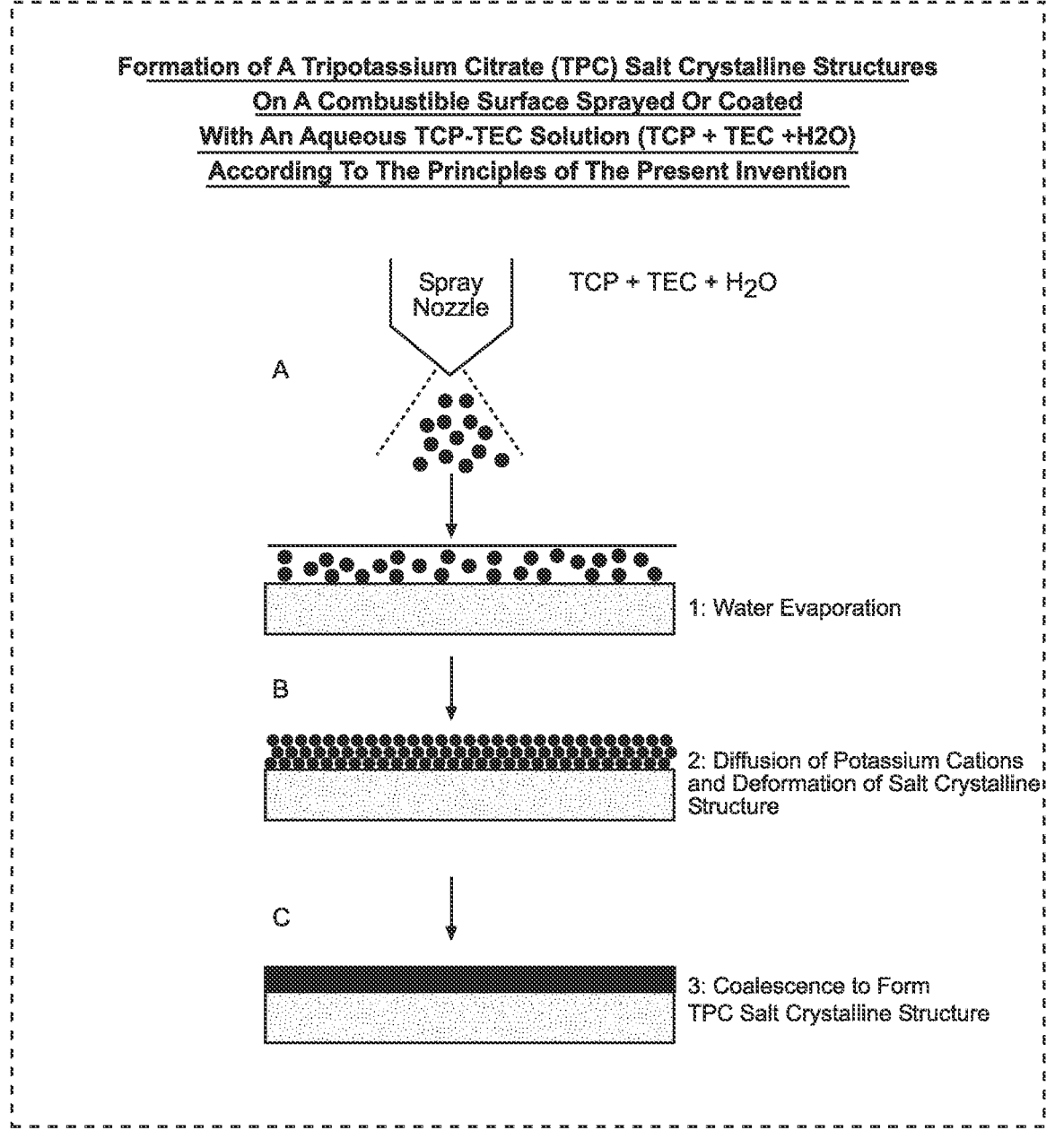
FIG. 7A is a schematic representation illustrating a process of forming a tripotassium citrate (TPC) crystalline structures on combustible surfaces, such as ground cover, native fuel, lumber, living plant tissue, tree bark, and other combustible tissue and like materials that are sprayed with atomized sprays, or otherwise coated, with the chemical material comprising the aqueous-based fire inhibiting solutions of the present invention.
Figure 7B:
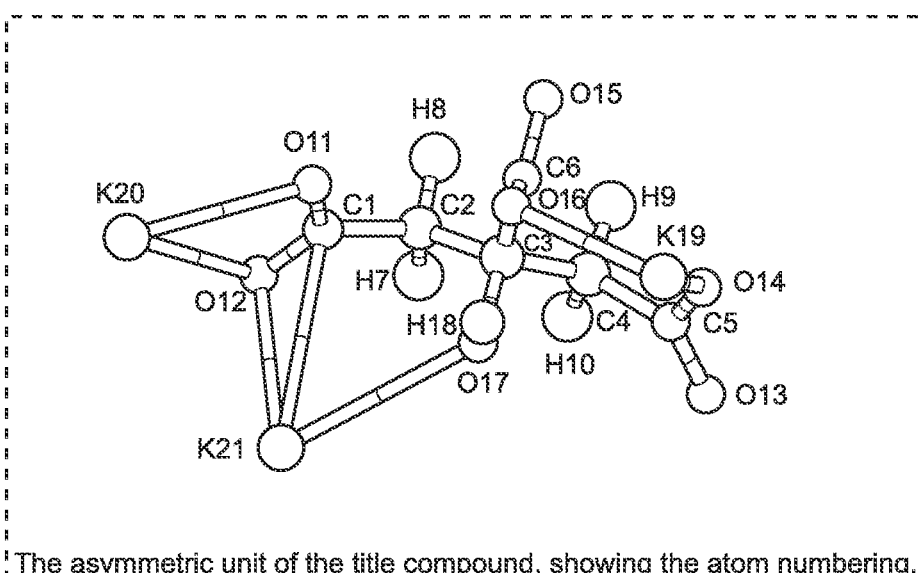
FIG. 7B is a schematic representation illustrating the atoms and atom numbering in the crystal structure of the compound, tripotassium citrate (K3C6H5O7) formed on treated surfaces in accordance with the principles of the present invention.
Figure 7C:
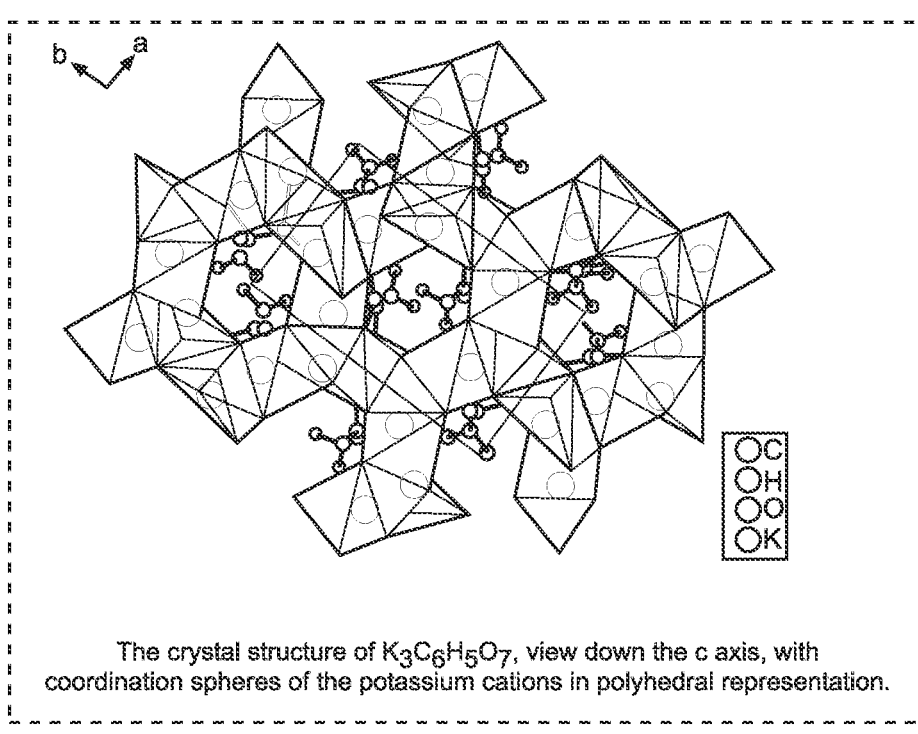
FIG. 7C is a schematic representation of the atomic crystal structure of a small piece of the crystalline structure of tripotassium citrate (K3C6H5O7) salt structure formed on a substrate to be protected against fire by way of application of the fire inhibiting chemical solution of the present invention, graphically illustrated the stage C illustration of FIG. 7A when water molecules mixed therein have evaporated to the ambient environment during air-drying.

Physical Examination and Fire-Performance Testing of the Thin Metal Salt Crystalline Structures Formed Using the Biochemical Compositions and Methods and Apparatus of the Present Invention One method of viewing the resulting metal salt crystal structures formed upon a surface substrate to be protected against fire, as illustrated in FIG. 7A, would be by using atomic force microscope to form atomic force microscopy (AFM) images of the biochemical coatings applied in accordance with the principles of the present invention. Another method of viewing the resulting metal salt crystal structures would be to use a scanning electron microscope to form scanning electron microscopy (SEM) images. Expectedly, using either instrument, such images of metal salt crystal structures formed using a greater wt % of coalescent agent (e.g. triethyl citrate dissolved in water with tripotassium citrate) will show that the coalescent agent resulted in metal salt crystal structures that are more coalesced and smoother, and demonstrating higher hardness evolution and better water repulsion, than when the metal salt crystal structures are formed using a lower wt % coalescent agent in the aqueous-based fire inhibiting liquid composition.

FIG. 7A illustrates the primary steps involved during the formation of tripotassium citrate salt crystalline structure coatings on spray treated surfaces to be proactively protected against ignition and flame spread of incident fire.

At Step A, a spray nozzle is used to spray a liquid coating of a biochemical composition of the present invention, and once applied, the water molecules being to evaporate at a rate determined by ambient temperature and wind currents, if any. When the minimum film formation temperature (MFT) is reached for the biochemical composition, the potassium cations can inter diffuse within the triethyl citrate (TEC) coalescent agent and water molecule matrix that is supported on the surface that has been sprayed and to be proactively treated with fire inhibiting properties by virtue of a thin film deposition of tripotassium salt crystalline structure, modeled and illustrated in FIGS. 7B and 7C.

At Step B, potassium cations diffuse and the TPC crystalline structure deforms. During the coalescence of potassium cations, interparticle potassium cation diffusion (PCD) occurs within the TEC coalescing agent to produce a semi-homogenous tripotassium citrate salt crystalline structure.

At Step C, coalescence occurs to form the TPC salt crystalline structure. The mechanical properties of tripotassium citrate crystalline structures are highly dependent on the extent of PCD within the TEC coalescent agent.

Upon complete evaporation of water molecules from the biochemical liquid coating, the resulting fire inhibiting coating that is believed to be formed on the sprayed and dried surface comprises a thin film of tripotassium citrate salt crystalline structures formed on the structure, with substantially no water molecules present. The nature and character of such tripotassium citrate salt crystalline structures are believed to be reflected in models provided in FIGS. 7B and 7C, which were first reported in 2016 in a published research paper by Alagappa Rammahon and James A. Kaduk, titled "Crystal Structure of Anhydrous Tripotassium Citrate From Laboratory X-Ray Diffraction Data and DFT Comparison" cited in ACTA CRYSTL (2016) Vol. E72, Pages 1159-1162, and published by Crystallographic Communications.

To determine and confirm that the fire inhibiting liquid compositions of the present invention produce potassium citrate salt crystalline structures on treated surfaces that have attained certain standards of fire inhibiting protection, it is necessary to test such treated surface specimens according to specific fire protection standards. In the USA, ASTM E84 Flame Spread and Smoke Development Testing can be used to test how well surfaces made of wood, cellulose and other combustible materials perform during E84 testing, and then compared against industry benchmarks. The environmentally-clean fire inhibiting chemical liquid solutions disclosed herein are currently being tested according to ASTM E84 testing standards and procedures, and it is expected that these ASTM test will show that fire-protected surfaces made of Douglas Fir (DF) will demonstrate Flame Spread Indices and Smoke Development Index to qualify for Class-A fire protected certification, when treated by the fire inhibiting biochemical compositions of the present invention disclosed and taught herein.

Methods of Blending, Making and Producing the Biochemical Liquid Formulations

The fire inhibiting liquid chemical compositions illustrated in FIGS. 6A1, 6A2, 6B1, 6B2, 6C1 and 6C2 are reproducible by mixing the components described above. The order of mixing is discretionary. However, it is advantageous to produce aqueous preparations by mixing the components other than water, into the quantity of water.

Specification of the Methods of Preparing and Applying the Fire Inhibiting Biochemical Compositions of the Present Invention Once the fire inhibiting biochemical compositions are prepared in accordance with the formations described above, the mixture is then stirred for several minutes at room temperature, and subsequently, the mixture is then packaged, barcoded with chain of custody information and then either stored, or shipped to its intended destination for use and application in accordance with present invention. As described herein, preferred method of surface coating application is using, for example, an atomizing sprayer having a backpack form factor suitable and adapted for rapidly spraying the fire inhibiting biochemical compositions on property surfaces as shown in FIGS. 13A and 13B, and form ultra-thin potassium salt crystal structure coatings to treated surfaces of combustible material on a specific parcels of property. Any of the other methods of and apparatus for spraying and GPS-tracking of fire inhibiting biochemicals of the present invention taught herein, as shown in FIGS. 8A through 17B, can be used with excellent results.

During examination and testing protocols, all fire inhibiting biochemical formulations of the present invention are proactively applied to combustible wood surfaces, allowed to dry, and are then analyzed tested for hardness, gloss and adhesion properties in a conventional manner, as well as subjected to strict ASTM E84 fire protection testing to ensure the fire inhibiting metal salt crystal coatings meet Class A Fire Protection Standards.

Useful Applications for the Fire Inhibiting Biochemical Liquid Compositions of the Present Invention As disclosed, the fire inhibiting biochemical compositions of the present invention are very useful in two ways: (i) producing fire inhibiting (i.e. retarding) coatings formed by ultra-thin alkali metal (potassium citrate) salt crystal structures on surfaces to be protected against fire as illustrated in FIGS. 8A, 8B, 9A, 9B, 10A, 10B, 11A, 11B, 12A, 12B, 13A, 13B, 14A, 14B, 14C, 14D, 15A, 15B, 16A, 16B, 17A and 17B; and (ii) extinguishing active fires by application of the fire inhibiting biochemical composition of the present invention onto the fire to suppress and extinguish the fire, as illustrated in FIGS. 16A and 16B.

The biochemical compositions of the present invention can be used for example for firefighting in forests, tire warehouses, landfill sites, coal stocks, oil fields, timberyards and mines, for proactively fighting wildfires from the air, by airplanes and helicopters and drone, as illustrated in FIGS. 10A, 10B, 11A and 11B.

The biochemical compositions of the present invention can be used as an fire extinguishing agent dispensed from a hand-held device or automated dispensing system under real-time sensor control. For example, an aqueous solution may be prepared and filled in a hand-operated fire extinguisher, and configured for readiness during firefighting use. However, the aqueous composition of the present invention need not be prepared in aqueous solution until it is produced by diluting with water, during a firefighting deployment operation.

The fire inhibiting biochemical compositions of the present invention can be used to treat and protect combustible wood building materials and/or structural components, such as wood products and engineered wood products (EWPs) including panels and structural members, using the fire inhibiting biochemical compositions of the present invention as disclosed and taught herein, and as illustrated in FIGS. 50 through 59C.

When coated with the biochemical liquid compositions of the present invention, and allowed to dry and form ultra-thin fire inhibiting potassium salt crystal coatings over treated wood surfaces, these wood products remarkably demonstrate Class-A fire protection characteristics that can be reliably proven using the ASTM E84 Testing Standards, having ultra-low flame spread and smoke development indices, as illustrated in FIGS. 50 through 59C.

The fire inhibiting biochemical compositions of the present invention are effective even in the dry state (long-term action) in giving a distinctly delayed ignition on the surface of a flammable material (ignition time), an appreciably reduced smoke evolution and development, and almost no afterglow (anti-smoldering effect).

The fire inhibiting biochemical compositions of the present invention are useful in extinguishing Class A, B, C and D fires. Also, an aqueous preparation of the biochemical composition may be prepared and stationed as ready for firefighting use when the occasion calls. However, it is also possible for the aqueous preparation not to be produced until it is needed, and then by diluting and dissolving the biochemical components in water, during a firefighting deployment.

The fire inhibiting biochemical compositions of the present invention are further useful as an extinguishing agent in fire extinguishers and/or fire extinguishing systems, and also via existing fire extinguishing pumps and fittings. Such fire extinguishers include, for example, portable and/or mobile fire extinguishers, as well as fixed installations, such as sprinkler systems disclosed in Applicant's US Patent Application Publication No. US2019/168047, incorporated herein by reference.

The fire inhibiting liquid biochemical compositions of the present invention can be used to produce an aqueous-based fire and smoke inhibiting slurry mixture that can sprayed on ground cover surfaces and allowed to dry to form Class-A fire-protected wildfire protected mulch to form wildfire breaks, barriers and protective zones around property, buildings and like structures, as illustrated in FIGS. 33A through 41.

In the preferred embodiments of the biochemical compositions of the present invention, potassium citrate salts are utilized in the biochemical formulations and are very readily biodegradable without harm or impact to the natural environment. This is highly advantageous especially in relation to the proactive defense of towns, communities, home owner associations (HOAs), homes, business buildings and other forms of public and private property, from the destructive impact of raging wildfires, using the systematic and organized application, tracking and mapping of fire inhibiting biochemical compositions of the present invention, over large property.

In such planned deployments of the present invention involving the proactive defense of a state, towns, communities and homes and property against the destructive effects of wildfires, as disclosed in FIGS. 9 through 32B, and FIGS. 33A through 43, various methods and apparatus will be used to proactively spray and GPS-track and map, the formation of ultra-thin coatings of potassium citrate salt crystal structures on treated surfaces of property (e.g. in the form of clean chemistry wildfire breaks and barriers) to be proactively protected against wildfires whenever they break out and arrive at and threaten a state, town, county, community, and/or homes and businesses. At the same time, these potassium citrate salt crystal structures of the present invention favorably allow and support the transport of oxygen and CO2 gases across the fire protected surfaces (e.g. which may include living plant tissue on leaves of trees in orchard and on vines in vineyards), without adversely affecting the vitality of such living plant tissue present and covering the ground of property. Also, the clean wildfire chemistry of the present invention can be used around animal such as horses, dogs, cats and other pets without posing any health risk to such creatures, while mitigating the risks that raging wildfires will present to their lives.

Also, and most significantly, the fire inhibiting biochemical compositions of the present invention are substantially free of the many disadvantages and dangers associated with the use of ammonium-based compounds historically used in forest fire fighting, and which may at the same time have an adverse effect as fertilizers in watercourses.

Furthermore, the biochemical compositions of the present invention are very resistant to freezing when used or applied in sub-zero temperatures (e.g. less than 32 F). Thus, it is possible to obtain an aqueous biochemical composition according to the present invention which is still sprayable at temperatures below 0 C.

Notably, the biochemical compositions of the present invention are non-corrosive, especially not with regard to aluminum and other metals that may be used as containers for the biochemical solutions of the present invention, especially during mixing, storage and application operations. This features is of particular importance in relation to the proactive defense of wild fires from both the ground using GPS-tracked ground based spraying vehicles of the present invention, and from the air using GPS-tracked aircraft-based spraying vehicles of the present invention, as disclosed in FIGS. 8 through 32B.

The biochemical compositions of the present invention can be used for proactively firefighting wildfires and fires that may break out in many places including, but not limited to, forests, WUI regions, tire warehouses, landfill sites, coal stocks, timberyards and even mines, as illustrated in FIGS. 24 through 32B.

The biochemical compositions of the present invention can also be used to proactively fight wildfire fires from the air, for example by airplanes and helicopters and drones, applying and GPS-tracking the spray application of environmentally-clean fire inhibiting biochemical liquid over ground and property surfaces to create and maintain clean-chemistry fire breaks and barriers where wildfire are not to be permitted to targeted property to be protected, in accordance with the principles of the present invention.

The biochemical compositions of the present invention can also be used to proactively protect, in factory environments, carbon-storing building materials and/or structural components, such wood panel and engineering wood products (EWPs), from fire outbreaks caused by nature, accident, arson or terrorism, by applying Class-A fire-protected metal salt crystalline coatings using the biochemical compositions and methods of the present invention, as illustrated in FIGS. 50 through 59C. The building materials and/or structural components coated with the biochemical compositions of the present invention are distinctly less flammable than uncoated building materials and/or structural components.

The biochemical liquid compositions of the present invention will also be useful as a rapid fire extinguishing agent, an illustrated in FIGS. 16A and 16B, showing GPS-tracking apparatus for hand spraying atomized clouds of the solution to rapidly extinguish, preferably, fires of classes A, B, C and D, more preferably for fires of classes A, B and C and most preferably for fires of classes A and B. For example, an aqueous preparation may be set and kept in readiness for firefighting use. However, it is also possible for the aqueous preparation not to be produced until it is produced, by diluting with water, during a firefighting deployment.

The fire-extinguishing and/or fire-retarding composition of the present invention are further useful as an extinguishant in extinguishers and/or extinguishing systems and also via existing fire extinguishing pumps and fittings. Extinguishers are for example portable and/or mobile fire extinguishers. Extinguishing systems are fixed installations, such as sprinkler systems, as illustrated in FIGS. 16A through 16B, and in other building misting systems illustrated in Applicant's US Patent Application Publication No. US2019/168047, incorporated herein by reference.

The biochemical compositions of the present invention are effective even in the dry state (long-term action) in giving a distinctly delayed ignition on the surface of a flammable material (ignition time), an appreciably reduced smoke evolution (light absorption) and almost no afterglow (anti-smoldering effect), as illustrated in FIGS. 33A through 41.

Figure 8A:
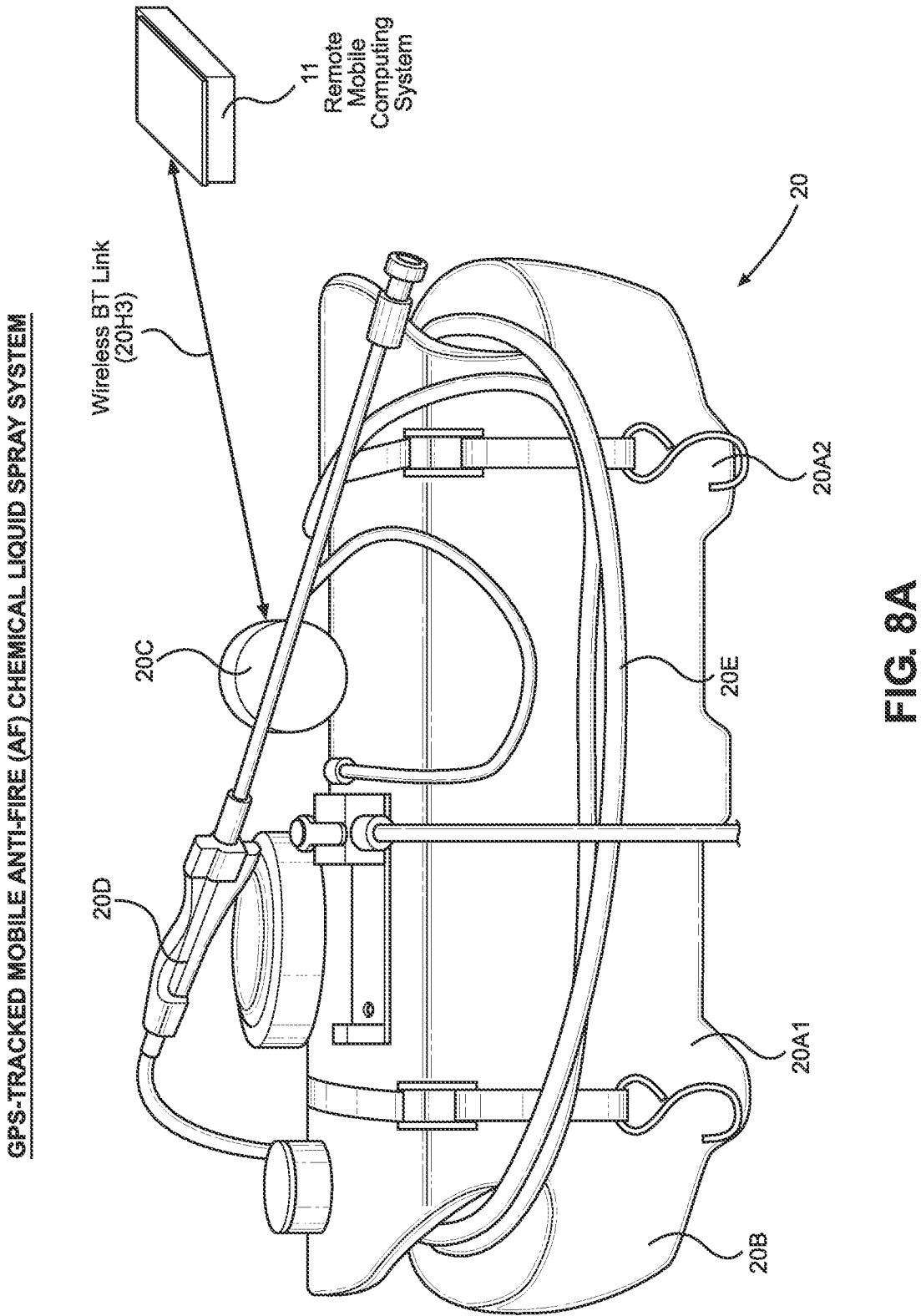
FIG. 8A is a perspective view of a mobile GPS-tracked anti-fire (AF) liquid spraying system supported on a set of wheels (or supported on a back-rack), with integrated supply tank and rechargeable-battery operated electric spray pump, for deployment at private and public properties having building structures, for spraying the same with environmentally-clean anti-fire (AF) liquid in accordance with the principles of the present invention.

Specification of the Mobile GPS-Tracked Anti-Fire (AF) Liquid Spraying System of the Present Invention FIG. 8A shows a mobile GPS-tracked anti-fire (AF) liquid spraying system 20 supported on a set of wheels 20A, having an integrated supply tank 20B and rechargeable-battery operated electric spray pump 20C with portable battery module (20C), for deployment at private and public properties having building structures, for spraying the same with environmentally-clean anti-fire (AF) liquid using a spray nozzle assembly 20D connected to the spray pump 20C by way of a flexible 20E.

Figure 8B:
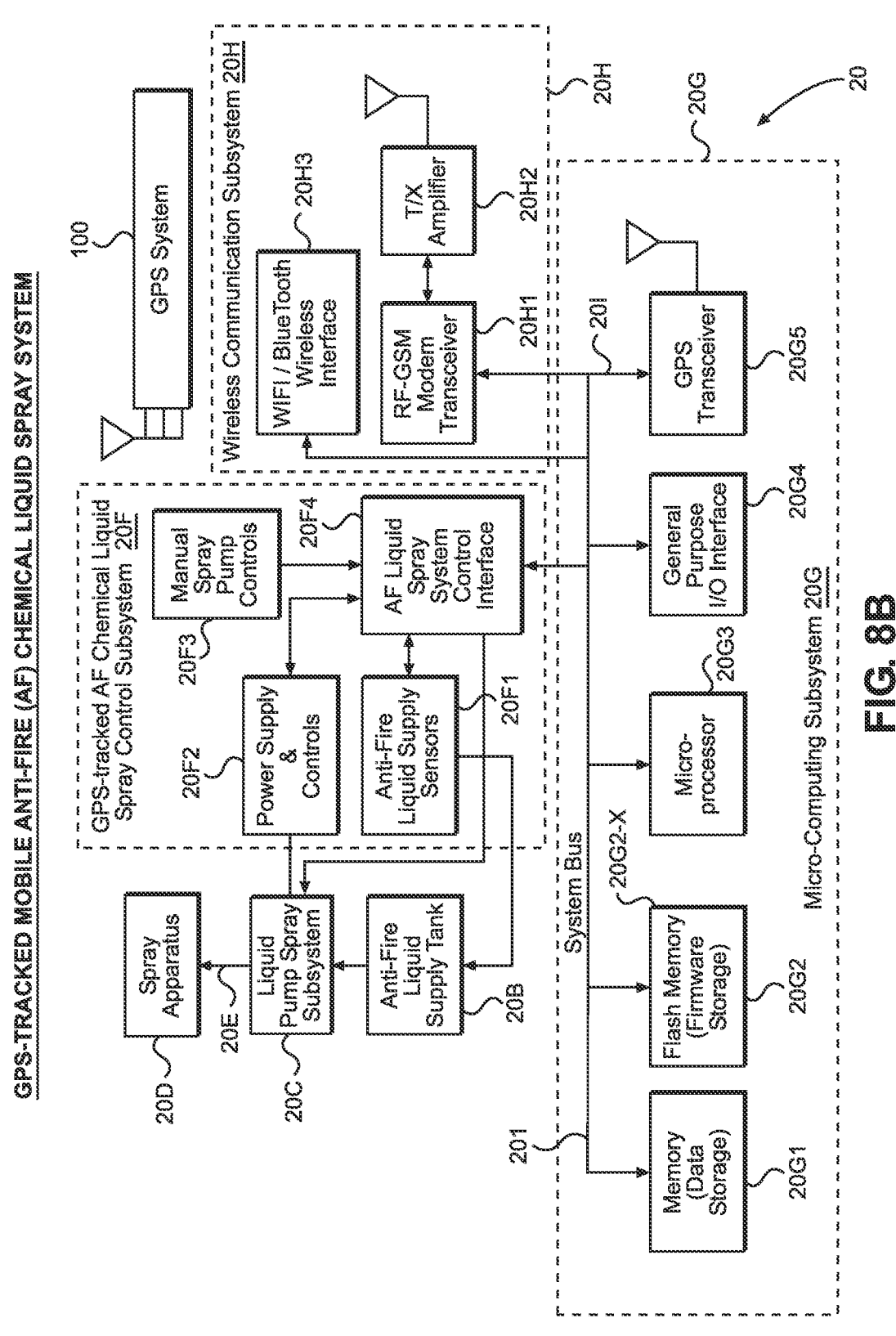
FIG. 8B is a schematic representation of the GPS-tracked mobile anti-fire (AF) chemical liquid spraying system shown in FIG. 8A, comprising a GPS-tracked and remotely-monitored AF chemical liquid spray control subsystem interfaced with a micro-computing platform for monitoring the spraying of AF chemical liquid from the system when located at specific GPS-indexed location coordinates, and automatically logging and recording such AF spray application operations within the network database system.

FIG. 8B shows the GPS-tracked mobile anti-fire liquid spraying system 20 of FIG. 6A as comprising a number of subcomponents, namely: a GPS-tracked and remotely-monitored AF chemical liquid spray control subsystem 20F; a micro-computing platform or subsystem 20G interfaced with the GPS-tracked and remotely-monitored AF chemical liquid spray control subsystem 20F by way of a system bus 201; and a wireless communication subsystem 20H interfaced to the micro-computing platform 20G via the system bus 201. As configured, the GPS-tracked mobile anti-fire liquid spraying system 20 enables and supports (i) the remote monitoring of the spraying of anti-fire (AF) chemical liquid from the system 20 when located at specific GPS-indexed location coordinates, and (ii) the logging of all such GPS-indexed spray application operations, and recording the data transactions thereof within a local database maintained within the micro-computing platform 20G, as well as in the remote network database 9C1 maintained at the data center 8 of the system network 1.

As shown in FIG. 8B, the micro-computing platform 20G comprises: data storage memory 20G1; flash memory (firmware storage) 20G2; a programmable microprocessor 20G3; a general purpose I/O (GPIO) interface 20G4; a GPS transceiver circuit/chip with matched antenna structure 20G5; and the system bus 201 which interfaces these components together and provides the necessary addressing, data and control signal pathways supported within the system 20.

As shown in FIG. 8B, the wireless communication subsystem 20H comprises: an RF-GSM modem transceiver 20H1; a T/X amplifier 20H2 interfaced with the RF-GSM modem transceiver 20H1; and a WIFI and Bluetooth wireless interfaces 20H3.

As shown in FIG. 8B, the GPS-tracked and remotely-controllable anti-fire (AF) chemical liquid spray control subsystem 20F comprises: anti-fire chemical liquid supply sensor(s) 20F1 installed in or on the anti-fire chemical liquid supply tank 20B to produce an electrical signal indicative of the volume or percentage of the AF liquid supply tank containing AF chemical liquid at any instant in time, and providing such signals to the AF liquid spraying system control interface 20F4; a power supply and controls 20F2 interfaced with the liquid pump spray subsystem 20C, and also the AF liquid spraying system control interface 20F4; manually-operated spray pump controls interface 20F3, interfaced with the AF liquid spraying system control interface 20F4; and the AF liquid spraying system control interface 20F4 interfaced with the micro-computing subsystem 20G, via the system bus 201. The flash memory storage 20G2 contains microcode that represents a control program that runs on the microprocessor 20G3 and realizes the various GPS-specified AF chemical liquid spray control, monitoring, data logging and management functions supported by the system 20.

In the preferred embodiment, the environmentally-clean anti-fire (AF) chemical liquid is the fire inhibiting biochemical compositions described and taught herein with respect to FIGS. 6A through 7A. When so treated, combustible products will prevent flames from spreading, and confine fire to the ignition source which can be readily extinguished, or go out by itself. In the presence of a flame, the chemical molecules in both dry and wet coatings, formed with the biochemical liquid of the present invention, and inhibiting fire by one or more pathways including interfering with the free radicals (H+, OH−, O) involved in the free-radical chemical reactions within the combustion phase of a fire, and breaking free-radical chemical reactions and extinguishing the fire's flames.

Figure 9A:
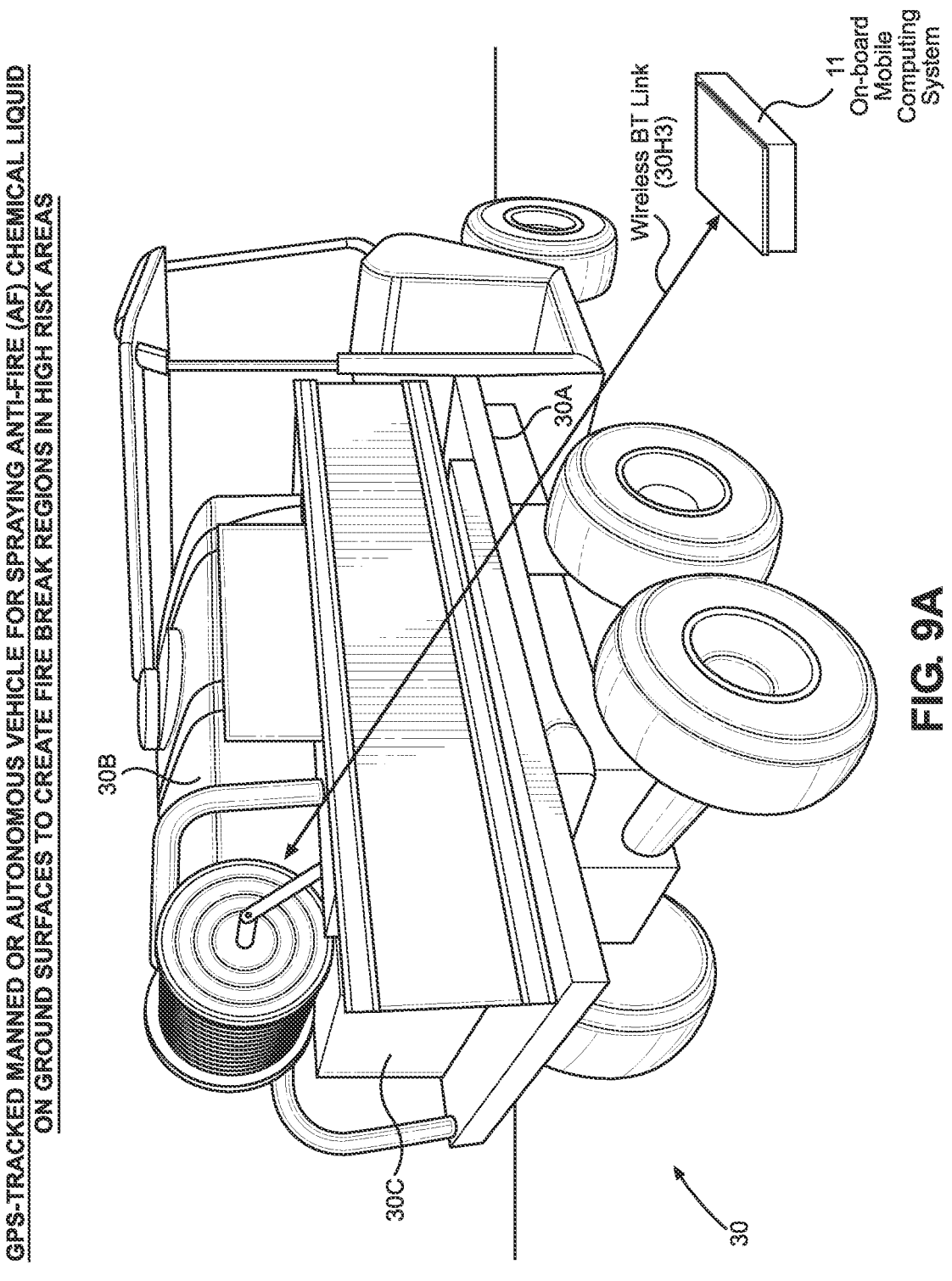
FIG. 9A is a perspective view of a GPS-tracked manned or autonomous vehicle system for spraying AF chemical liquid on building and ground surfaces with environmentally-clean anti-fire (AF) chemical liquid in accordance with the principles of the present invention.

Specification of GPS-Tracked Manned or Autonomous Vehicle for Spraying Anti-Fire (AF) Liquid on Building and Ground Surfaces FIG. 9A shows a mobile GPS-tracked manned or autonomous vehicle anti-fire (AF) liquid spray vehicle system 30 for spraying environmentally-clean anti-fire (AF) chemical liquid on exterior building surfaces and ground surfaces in accordance with the principles of the present invention. As shown, the vehicle system 30 is supported on a set of wheels 30A driven by a propulsion drive subsystem 30 and navigated by GPS-guided navigation subsystem 301, and carrying an integrated supply tank 30B with either rechargeable-battery-operated electric-motor driven spray pump, or gasoline/diesel or propane operated motor-driven spray pump, 30C, for deployment on private and public property parcels having building structures, for spraying the same with environmentally-clean anti-fire (AF) liquid using a spray nozzle assembly 30D connected to the spray pump 30C by way of a flexible hose 30E.

Figure 9B:
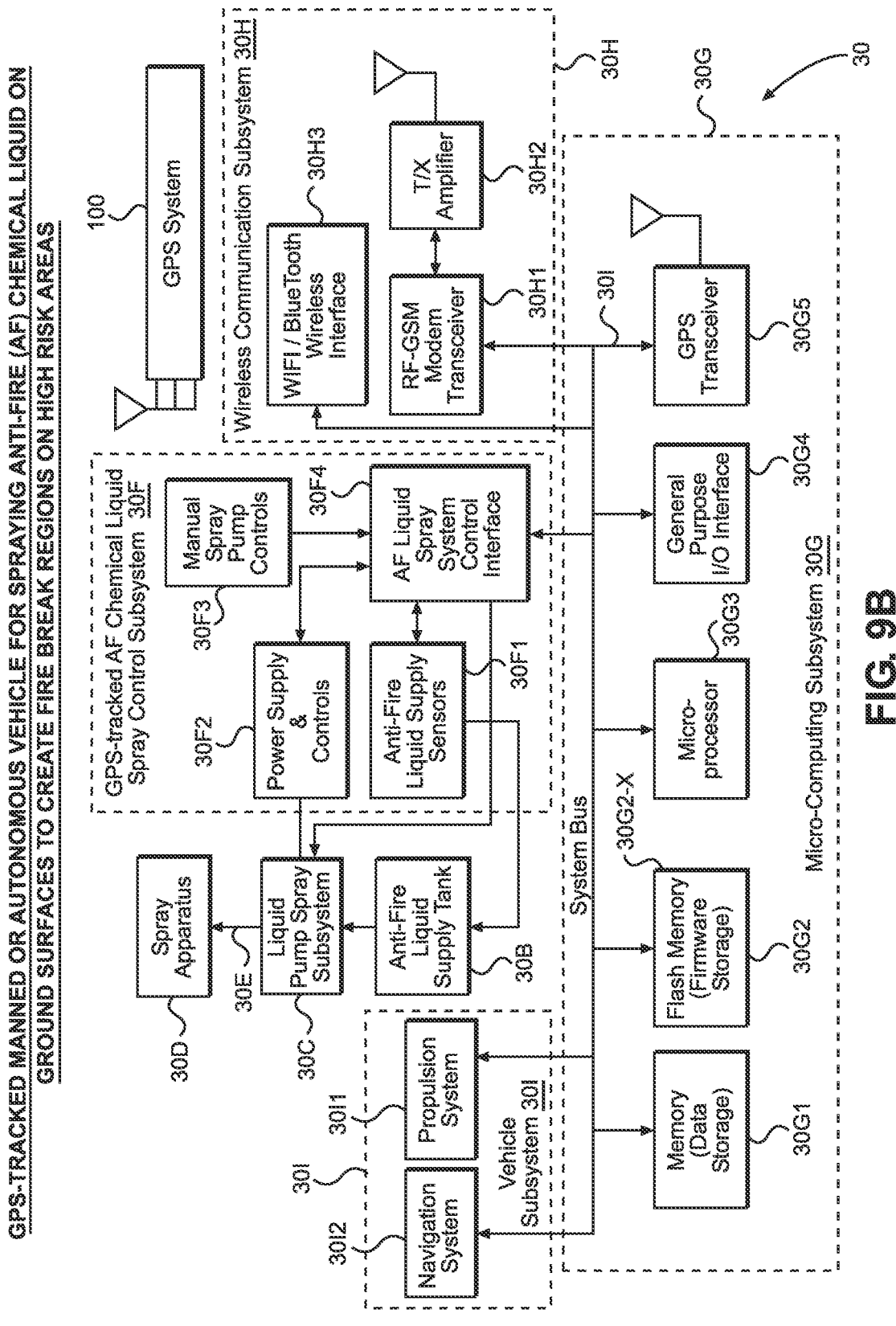
FIG. 9B is a schematic representation of the manned or autonomously-driven vehicle system shown in FIG. 9A, comprising a GPS-tracked and remotely-monitored AF chemical liquid spray control subsystem interfaced with a micro-computing platform for monitoring the spraying of AF chemical liquid from the vehicle when located at any specific GPS-indexed location coordinates, and automatically logging and recording such AF spray application operations within the network database system.

FIG. 9B shows the GPS-tracked mobile anti-fire liquid spraying system 30 of FIG. 7A as comprising a number of subcomponents, namely: a GPS-tracked and remotely-monitored AF chemical liquid spray control subsystem 30F; a micro-computing platform or subsystem 30G interfaced with the GPS-tracked and remotely-monitored AF chemical liquid spray control subsystem 30F by way of a system bus 301; a wireless communication subsystem 30H interfaced to the micro-computing platform 30G via the system bus 301; and a vehicular propulsion and navigation subsystem 301 employing a propulsion subsystem 3011 and AI-driven or manually-driven navigation subsystem 3012.

As configured in the illustrative embodiment, the GPS-tracked mobile anti-fire liquid spraying system 30 enables and supports (i) the remote monitoring of the spraying of anti-fire (AF) chemical liquid from the system 30 when located at specific GPS-indexed location coordinates, and (ii) the logging of all such GPS-indexed spray application operations, and recording the data transactions thereof within a local database maintained within the micro-computing platform 30G, as well as in the remote network database 9C1 maintained at the data center 8 of the system network 1.

As shown in FIG. 9B, the micro-computing platform 30G comprises: data storage memory 30G1; flash memory (firmware storage) 30G2; a programmable microprocessor 30G3; a general purpose I/O (GPIO) interface 30G4; a GPS transceiver circuit/chip with matched antenna structure 30G5; and the system bus 301 which interfaces these components together and provides the necessary addressing, data and control signal pathways supported within the system 30. As such, the micro-computing platform 30G is suitably configured to support and run a local control program 30G2-X on microprocessor 30G3 and memory architecture 30G1, 30G2 which is required and supported by the enterprise-level mobile application 12 and the suite of services supported by the system network 1 of the present invention.

As shown in FIG. 9B, the wireless communication subsystem 30H comprises: an RF-GSM modem transceiver 30H1; a T/X amplifier 30H2 interfaced with the RF-GSM modem transceiver 30H1; and a WIFI interface and a Bluetooth wireless interface 30H3 for interfacing with WIFI and Bluetooth data communication networks, respectively, in a manner known in the communication and computer networking art.

As shown in FIG. 9B, the GPS-tracked and remotely-controllable anti-fire (AF) chemical liquid spray control subsystem 30F comprises: anti-fire chemical liquid supply sensor(s) 30F1 installed in or on the anti-fire chemical liquid supply tank 30B to produce an electrical signal indicative of the volume or percentage of the AF liquid supply tank containing AF chemical liquid at any instant in time, and providing such signals to the AF liquid spraying system control interface 30F4; a power supply and controls 30F2 interfaced with the liquid pump spray subsystem 30C, and also the AF liquid spraying system control interface 30F4; manually-operated spray pump controls interface 30F3, interfaced with the AF liquid spraying system control interface 30F4; and the AF liquid spraying system control interface 30F4 interfaced with the micro-computing subsystem 30G, via the system bus 301. The flash memory storage 30G2 contains microcode for a control program that runs on the microprocessor 20G3 and realizes the various GPS-specified AF chemical liquid spray control, monitoring, data logging and management functions supported by the system 30.

Notably, because the chemical components of wildfire inhibiting biochemical solution of the present invention completely dissolve in water, without crystal formation in solution, it's possible to spray the biochemical liquid using atomization and/or misting spray techniques so that very fine liquid droplets of micron dimensions can be formed and projected over long throw distances—during spraying operations. This pure-liquid property of the fire inhibiting biochemical composition (i) allows its active fire inhibiting chemistry (e.g. potassium mineral salts) to efficiently cling onto combustible surfaces of natural fuels distributed widely across ground surfaces in the rapidly expanding WUI region, and (ii) promotes surface infusion of the potassium mineral salts within the microstructure of the sprayed surfaces during atomization spraying and quick drying operations. This promotes the formation of ultra-thin potassium salt crystal coatings that offer improved duration of fire protection of TPC-based potassium mineral salts contained in the wildfire inhibitor, when exposed to moisture and/or high levels of relative humidity.

Deposition of potassium mineral salt crystal coatings within the molecular surface structure surfaces being treated with the biochemical solution of the present invention using atomization-based spraying techniques, preferably at elevated spraying temperatures under the arid hot Sun, the wildfire inhibiting potassium salt coating, once dried, can be made either insensitive or less sensitive to water exposure, a property which will improve the wildfire inhibitor's duration of fire protection in the presence of rain and ambient moisture levels. Also, it is believed that better surface deposition of the biochemical composition of the present invention can be achieved by reducing the size of the spray or misting droplets of the wildfire inhibitor as small as possible using, for example, atomization-based spraying/misting techniques applied at elevated spraying temperatures. Such techniques will promote water molecules to be rapidly evaporated during spray application, and promote deposition and bonding of potassium mineral salts within surface molecules of the sprayed surface substrate, as they are deposited onto the organic fuel surfaces to be protected against the threat of ignition by wildfire. Such insights and practices inform and support optimized methods of wildfire inhibitor deposition in outdoor environments.

Using GPS-Tracking, Mapping and Recording Techniques to Know where Clean-Chemistry Wild Fire Breaks and Zones where Formed by Whom, and when Using the cloud-based wildfire defense network's integrated GPS-tracking, mapping and recording techniques, as illustrated in FIGS. 8 through 32B, fire jurisdictions can plan and implement clean-chemistry wildfire breaks and zones (e.g. around telephone poles) to proactively protect property and life from raging wildfires—by effectively inhibiting specific regions of combustible fuel from ignition, along the path towards targeted property and life to be protected from the incidence of wildfire. Proactive wildfire protection according to the principles of the present invention is simple. Wherever combustible ground cover is sprayed/misted with the fire inhibiting biochemical composition of the present invention, illustrated in FIGS. 6A through 7A, the free radical chain reactions driving the combustible phase of wildfire will be interrupted, taking the energy out of a raging wildfire, reducing the production of smoke, and protecting property that has been treated in advance of a wildfire incidence.

In hot dry climates, conditioned by hot dry prevailing winds, the relative humidity will be expectedly low, and in the absence of rain, the all-natural (clear) wild fire inhibiting sprayed over wild fire break and zone regions, will last for durations into weeks and months in many situations. However, whenever rain occurs, the Network will know and advise fire departments and homeowner alike that clean-chemistry wildfire breaks and zones need to be maintained by an additional spraying of wildfire inhibiting biochemical liquid, while GPS-tracked, mapped and recorded for management purposes.

Figure 10A:
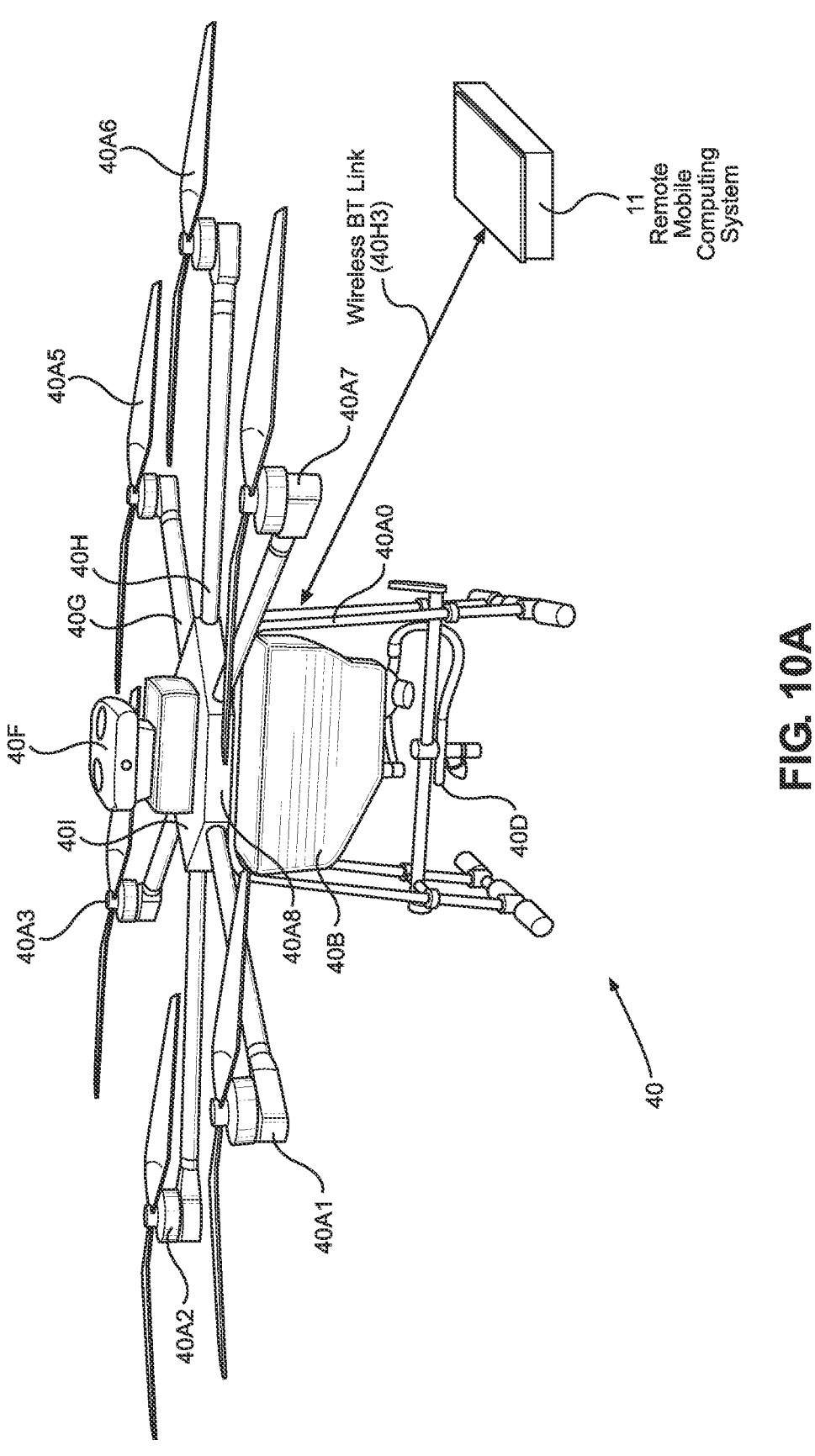
FIG. 10A is a perspective view of an autonomously-driven or remotely-controlled unmanned airborne system (i.e. UAS or "drone") adapted for spraying AF chemical liquid on building and ground surfaces for spraying the same with environmentally-clean anti-fire (AF) liquid in accordance with the principles of the present invention.

Specification of GPS-Tracked Autonomously-Driven Drone System Adapted for Spraying Anti-Fire (AF) Liquid on Buildings and Ground Surfaces FIG. 10A shows a mobile GPS-tracked unmanned airborne system (UAS) or drone 40 adapted for misting and spraying environmentally-clean anti-fire (AF) chemical liquid of the present invention on exterior building surfaces and ground surfaces in accordance with the principles of the present invention.

As shown, the drone vehicle system 40 comprises: a lightweight airframe 40A0 supporting a propulsion subsystem 401 provided with a set of eight (8) electric-motor driven propellers 40A1-40A8, driven by electrical power supplied by a rechargeable battery module 409, and controlled and navigated by a GPS-guided navigation subsystem 4012; an integrated supply tank 40B supported on the airframe 40A0, and connected to either rechargeable-battery-operated electric-motor driven spray pump, or gasoline/diesel or propane operated motor-driven spray pump, 40C, for deployment on private and public property parcels having building structures; a spray nozzle assembly 40D connected to the spray pump 40C by way of a flexible hose 40E, for misting and spraying the same with environmentally-clean anti-fire (AF) liquid under the control of GPS-specified coordinates defining its programmed flight path when operating to suppress or otherwise fight wild fires.

FIG. 10B shows the GPS-tracked anti-fire liquid spraying system 40 of FIG. 8A as comprising a number of subcomponents, namely: a GPS-tracked and remotely-monitored AF chemical liquid spray control subsystem 40F; a micro-computing platform or subsystem 40G interfaced with the GPS-tracked and remotely-monitored AF chemical liquid spray control subsystem 40F by way of a system bus 401; a wireless communication subsystem 40H interfaced to the micro-computing platform 40G via the system bus 401; and a vehicular propulsion and navigation subsystem 401 employing propulsion subsystem 4011, and AI-driven or manually-driven navigation subsystem 4012.

As configured in the illustrative embodiment, the GPS-tracked anti-fire liquid spraying system 40 enables and supports (i) the remote monitoring of the spraying of anti-fire (AF) chemical liquid from the system 40 when located at specific GPS-indexed location coordinates, and (ii) the logging of all such GPS-indexed spray application operations, and recording the data transactions thereof within a local database maintained within the micro-computing platform 40G, as well as in the remote network database 9C1 maintained at the data center 8 of the system network 1.

As shown in FIG. 10B, the micro-computing platform 40G comprises: data storage memory 40G1; flash memory (firmware storage) 40G2; a programmable microprocessor 40G3; a general purpose I/O (GPIO) interface 40G4; a GPS transceiver circuit/chip with matched antenna structure 40G5; and the system bus 401 which interfaces these components together and provides the necessary addressing, data and control signal pathways supported within the system 40. As such, the micro-computing platform 40G is suitably configured to support and run a local control program 40G2-X on microprocessor 40G3 and memory architecture 40G1, 40G2 which is required and supported by the enterprise-level mobile application 12 and the suite of services supported by the system network 1 of the present invention.

As shown in FIG. 10B, the wireless communication subsystem 30H comprises: an RF-GSM modem transceiver 40H1; a T/X amplifier 40H2 interfaced with the RF-GSM modem transceiver 40H1; and a WIFI interface and a Bluetooth wireless interface 40H3 for interfacing with WIFI and Bluetooth data communication networks, respectively, in a manner known in the communication and computer networking art.

As shown in FIG. 10B, the GPS-tracked and remotely-controllable anti-fire (AF) chemical liquid spray control subsystem 40F comprises: anti-fire chemical liquid supply sensor(s) 40F1 installed in or on the anti-fire chemical liquid supply tank 30B to produce an electrical signal indicative of the volume or percentage of the AF liquid supply tank containing AF chemical liquid at any instant in time, and providing such signals to the AF liquid spraying system control interface 40F4; a power supply and controls 40F2 interfaced with the liquid pump spray subsystem 40C, and also the AF liquid spraying system control interface 40F4; manually-operated spray pump controls interface 40F3, interfaced with the AF liquid spraying system control interface 30F4; and the AF liquid spraying system control interface 40F4 interfaced with the micro-computing subsystem 40G, via the system bus 401. The flash memory storage 40G2 contains microcode for a control program that runs on the microprocessor 40G3 and realizes the various GPS-specified AF chemical liquid spray control, monitoring, data logging and management functions supported by the system 40.

Figure 11A:
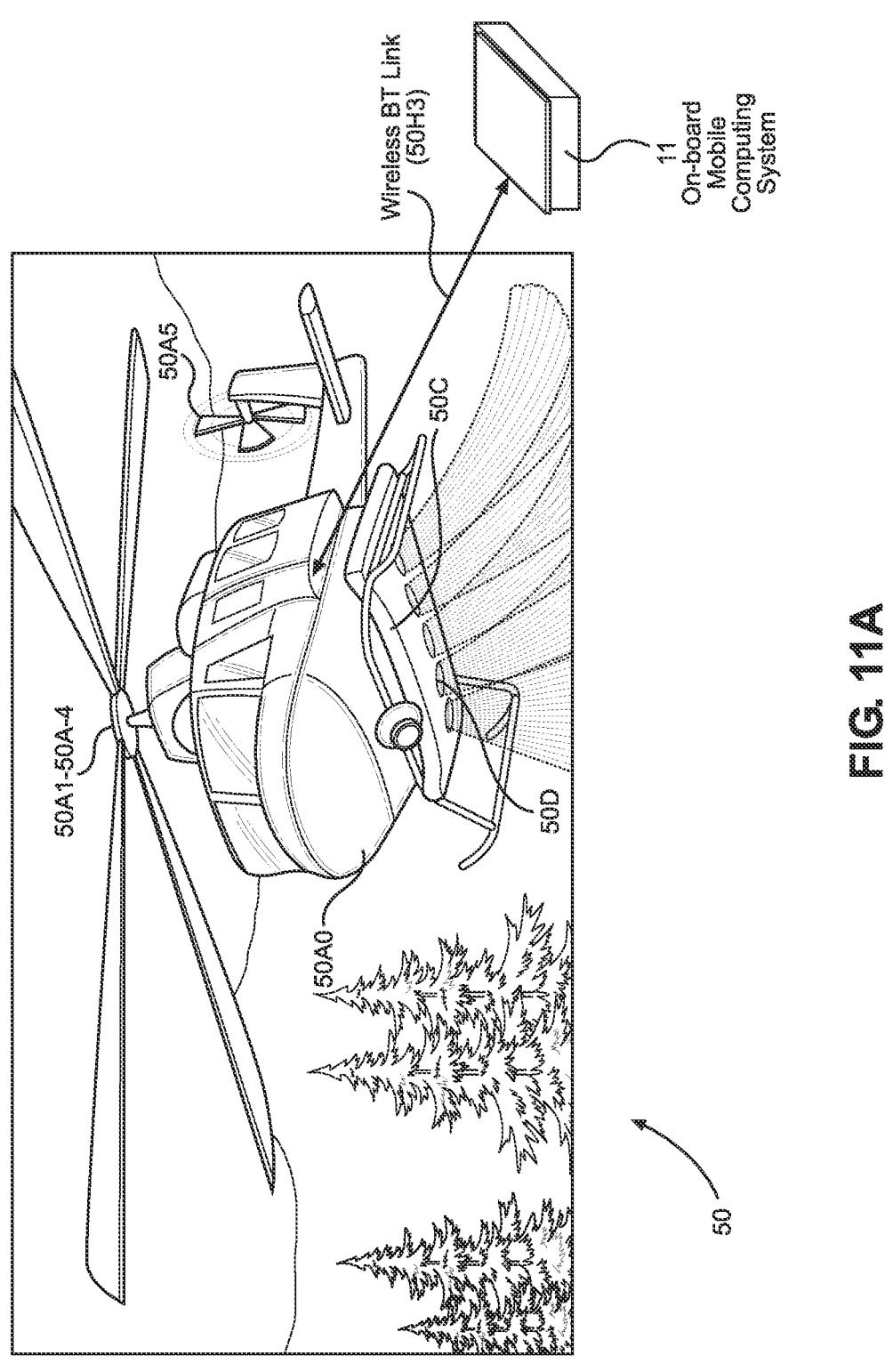
FIG. 11A is a perspective view of a GPS-tracked aircraft system (i.e. helicopter) adapted for spraying an environmentally-clean anti-fire biochemical liquid of the present invention, from the air onto ground and property surfaces in accordance with the principles of the present invention.

Specification of GPS-Tracked Aircraft (i.e. Helicopter) for Spraying Anti-Fire (AF) Liquid on Ground Surfaces FIG. 11A shows a mobile GPS-tracked manned aircraft (i.e. helicopter) system 50 adapted for misting and spraying environmentally-clean anti-fire (AF) chemical liquid of the present invention on ground surfaces and over buildings in accordance with the principles of the present invention.

As shown, the aircraft system 50 comprises: a lightweight airframe 50A0 supporting a propulsion subsystem 50I provided with a set of axially-mounted helicopter blades 50A1-50A2 and 50A5, driven by combustion-engine and controlled and navigated by a GPS-guided navigation subsystem 50I2; an integrated supply tank 50B supported on the airframe 50A0, and connected to a gasoline/diesel operated motor-driven spray pump, 50C, for deployment on private and public property parcels having building structures; a spray nozzle assembly 50D connected to the spray pump 50C by way of a hose 50E, for misting and/or spraying the same with environmentally-clean anti-fire (AF) liquid under the control of GPS-specified coordinates defining its programmed flight path when operating to suppress or otherwise fight wild fires.

FIG. 11B shows the GPS-tracked anti-fire liquid spraying system 50 of FIG. 9A as comprising a number of subcomponents, namely: a GPS-tracked and remotely-monitored AF chemical liquid spray control subsystem 50F; a micro-computing platform or subsystem 50G interfaced with the GPS-tracked and remotely-monitored AF chemical liquid spray control subsystem 50F by way of a system bus 50I; a wireless communication subsystem 50H interfaced to the micro-computing platform 50G via the system bus 50I; and a vehicular propulsion and navigation subsystem 50I employing propulsion subsystem 50I1, and AI-driven or manually-driven navigation subsystem 50I2.

As configured in the illustrative embodiment, the GPS-tracked anti-fire liquid spraying system 50 enables and supports (i) the remote monitoring of the spraying of anti-fire (AF) chemical liquid from the system 50 when located at specific GPS-indexed location coordinates, and (ii) the logging of all such GPS-indexed spray application operations, and recording the data transactions thereof within a local database maintained within the micro-computing platform 50G, as well as in the remote network database 9C1 maintained at the data center 8 of the system network 1.

As shown in FIG. 9B, the micro-computing platform 50G comprises: data storage memory 50G1; flash memory (firmware storage) 50G2; a programmable microprocessor 50G3; a general purpose I/O (GPIO) interface 50G4; a GPS transceiver circuit/chip with matched antenna structure 50G5; and the system bus 401 which interfaces these components together and provides the necessary addressing, data and control signal pathways supported within the system 50. As such, the micro-computing platform 50G is suitably configured to support and run a local control program 50G2-X on microprocessor 50G3 and memory architecture 50G1, 40G2 which is required and supported by the enterprise-level mobile application 12 and the suite of services supported by the system network 1 of the present invention.

As shown in FIG. 111B, the wireless communication subsystem 50H comprises: an RF-GSM modem transceiver 50H1; a T/X amplifier 50H2 interfaced with the RF-GSM modem transceiver 50H1; and a WIFI interface and a Bluetooth wireless interface 50H3 for interfacing with WIFI and Bluetooth data communication networks, respectively, in a manner known in the communication and computer networking art.

As shown in FIG. 11B, the GPS-tracked and remotely-controllable anti-fire (AF) chemical liquid spray control subsystem 50F comprises: anti-fire chemical liquid supply sensor(s) 50F1 installed in or on the anti-fire chemical liquid supply tank 50B to produce an electrical signal indicative of the volume or percentage of the AF liquid supply tank containing AF chemical liquid at any instant in time, and providing such signals to the AF liquid spraying system control interface 50F4; a power supply and controls 50F2 interfaced with the liquid pump spray subsystem 50C, and also the AF liquid spraying system control interface 50F4; manually-operated spray pump controls interface 50F3, interfaced with the AF liquid spraying system control interface 50F4; and the AF liquid spraying system control interface 50F4 interfaced with the micro-computing subsystem 50G, via the system bus 50I. The flash memory storage 50G2 contains microcode for a control program that runs on the microprocessor 50G3 and realizes the various GPS-specified AF chemical liquid spray control, monitoring, data logging and management functions supported by the system 50.

Figure 12A:
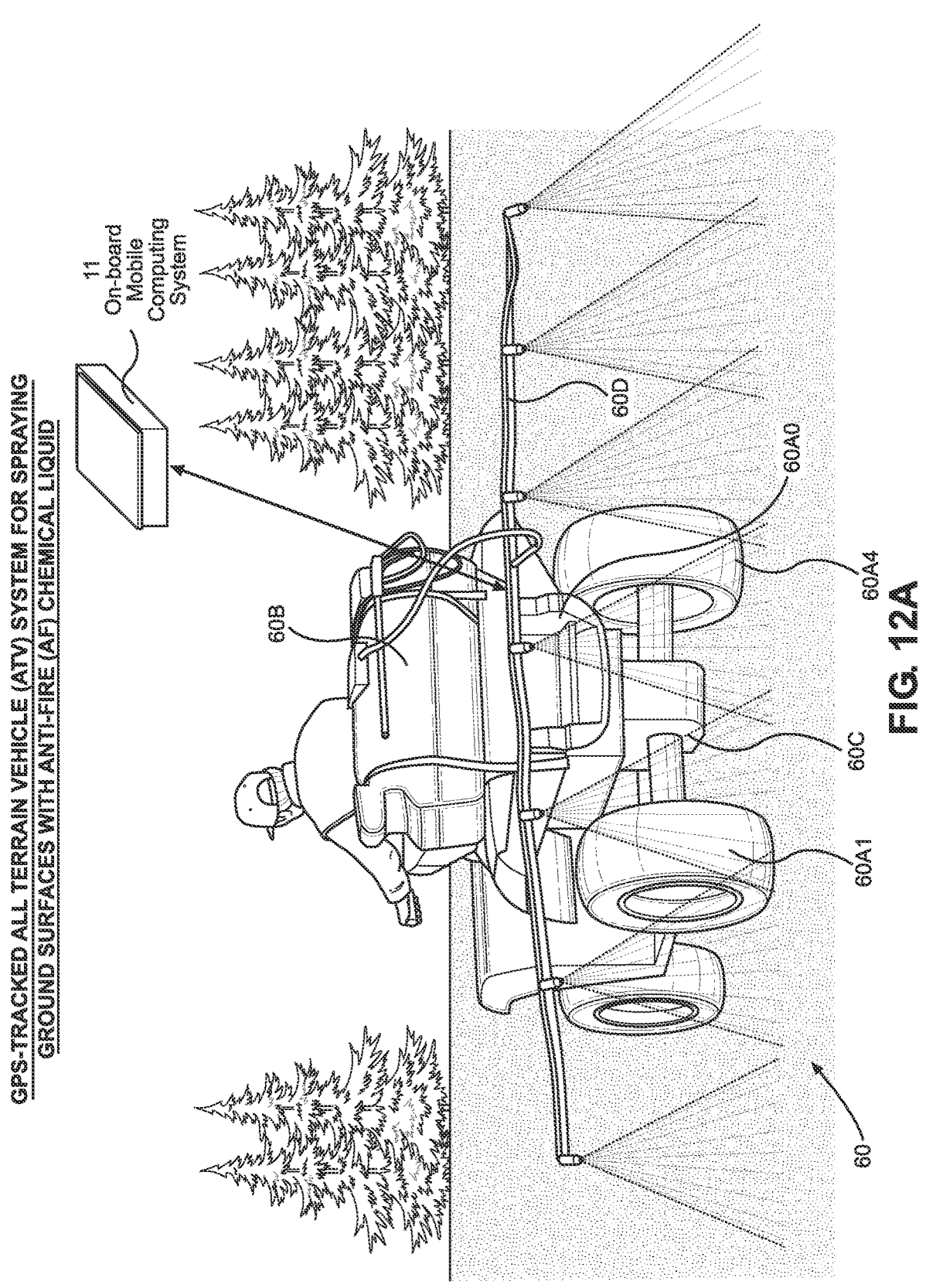
FIG. 12A is a GPS-tracked all-terrain vehicle (ATV) system adapted for spraying ground surfaces with environmentally-clean anti-fire (AF) liquid in accordance with the principles of the present invention.
Figure 13A:
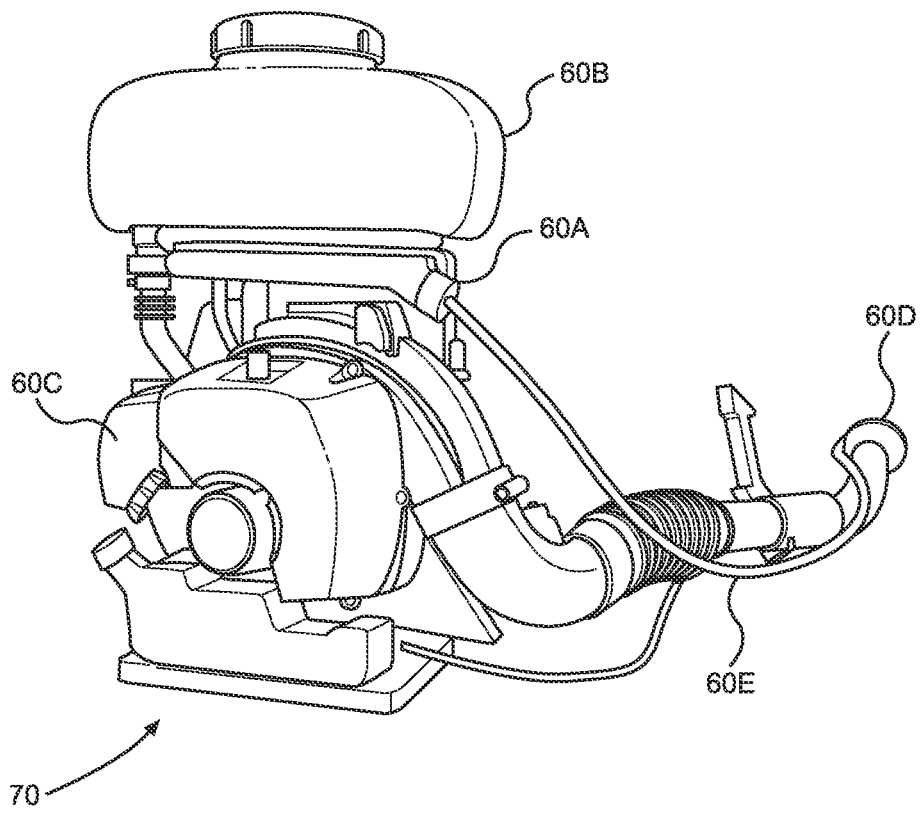
FIG. 13A is a GPS-tracked portable backpack-mounted atomizing spray "cannon" system adapted for spraying ground and building surfaces with an environmentally-clean anti-fire (AF) liquid formulated in accordance with the principles of the present invention.
Figure 13B:
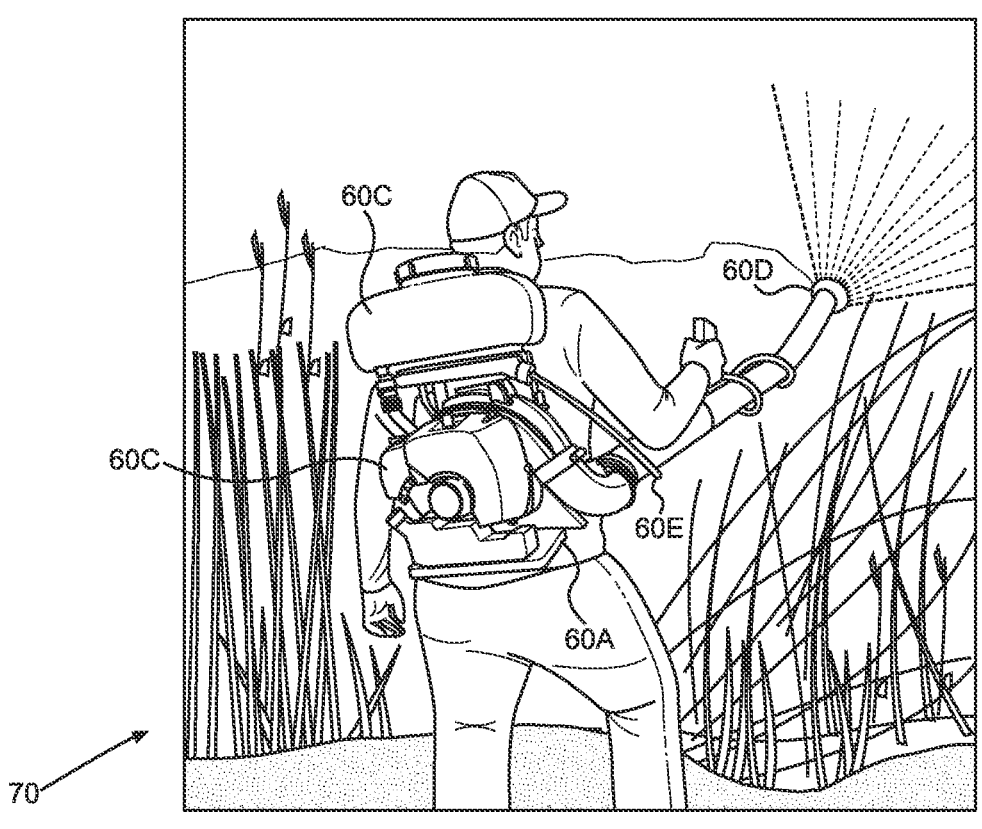
FIG. 13B shows the GPS-tracked portable backpack-mounted atomizing spray "cannon" system of FIG. 13A being worn by a person who is using it with the system network GPS-track and record the spraying of ground and building surfaces with the environmentally-clean anti-fire (AF) liquid biochemical composition formulated in accordance with the principles of the present invention.

Specification of GPS-Tracked Autonomously-Driven Aircraft for Spraying Anti-Fire (AF) Liquid on Building and Ground Surfaces FIG. 12A shows a mobile GPS-tracked manned all-terrain vehicle (ATV) system 60 adapted for misting and spraying environmentally-clean anti-fire (AF) chemical liquid of the present invention on ground surfaces in accordance with the principles of the present invention.

As shown, the aircraft system 60 comprises: a lightweight frame/chassis 60A0 supporting a propulsion subsystem 601 provided with a set of wheels 60A1-60A4, driven by combustion-engine, and controlled and navigated by a GPS-guided navigation subsystem 6012; an integrated supply tank 60B supported on the frame 60A0, and connected to a gasoline/diesel operated motor-driven spray pump, 60C, for deployment on private and public property parcels; a spray nozzle assembly 60D connected to the spray pump 60C by way of a hose 60E, for misting and/or spraying the same with environmentally-clean anti-fire (AF) liquid under the control of GPS-specified coordinates defining its programmed flight path when operating to suppress or otherwise fight wild fires.

Figure 12B:
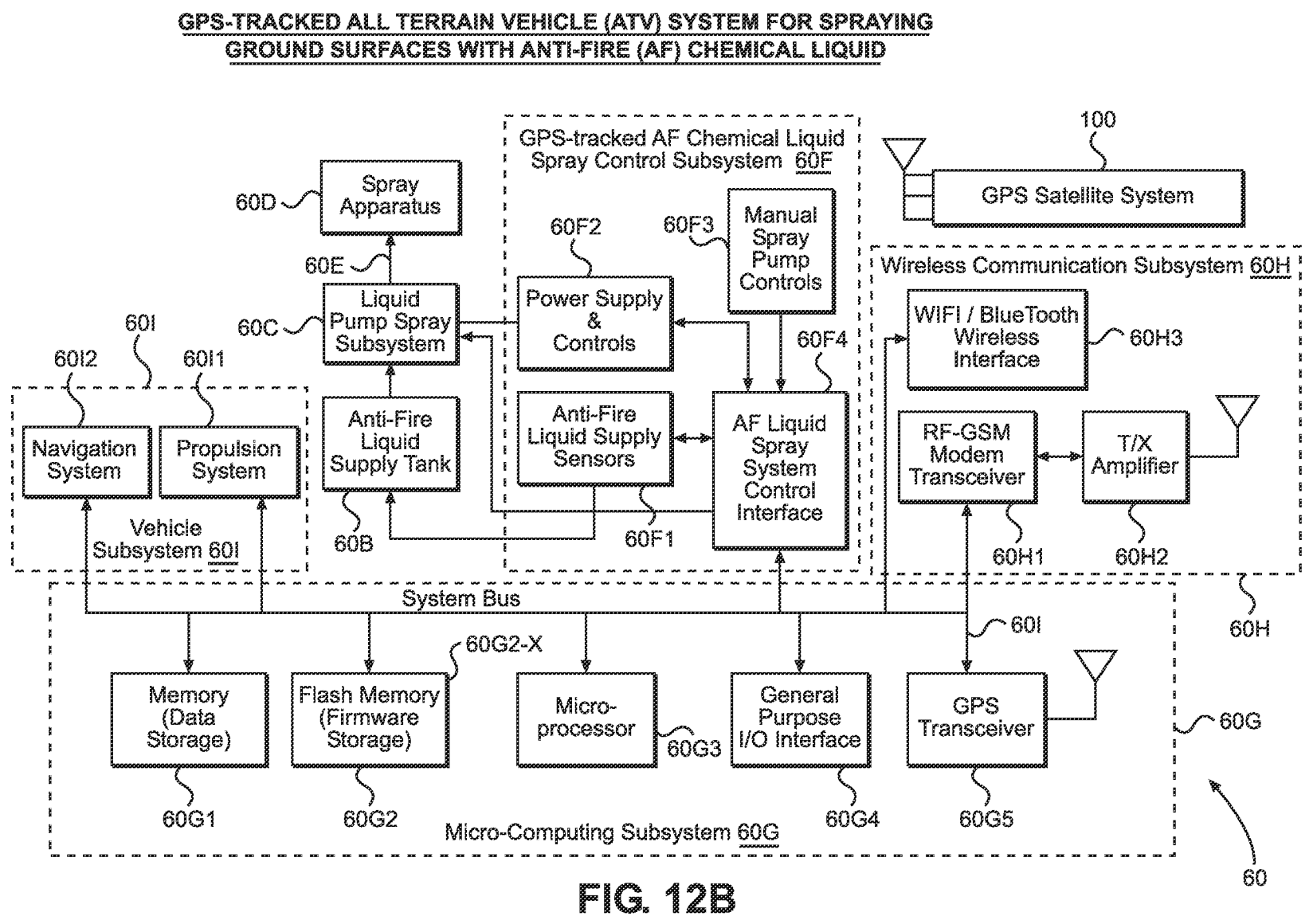

FIG. 12B shows the GPS-tracked anti-fire liquid spraying system 60 of FIG. 10A as comprising a number of subcomponents, namely: a GPS-tracked and remotely-monitored AF chemical liquid spray control subsystem 60F; a micro-computing platform or subsystem 60G interfaced with the GPS-tracked and remotely-monitored AF chemical liquid spray control subsystem 60F by way of a system bus 601; a wireless communication subsystem 60H interfaced to the micro-computing platform 60G via the system bus 50I; and a vehicular propulsion and navigation subsystem 601 employing propulsion subsystem 6011, and AI-driven or manually-driven navigation subsystem 6012.

As configured in the illustrative embodiment, the GPS-tracked anti-fire liquid spraying system 60 enables and supports (i) the remote monitoring of the spraying of anti-fire (AF) chemical liquid from the system 60 when located at specific GPS-indexed location coordinates, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 12B, the micro-computing platform 60G comprises: data storage memory 60G1; flash memory (firmware storage) 60G2; a programmable microprocessor 60G3; a general purpose I/O (GPIO) interface 60G4; a GPS transceiver circuit/chip with matched antenna structure 60G5; and the system bus 601 which interfaces these components together and provides the necessary addressing, data and control signal pathways supported within the system 60. As such, the micro-computing platform 60G is suitably configured to support and run a local control program 60G2-X on microprocessor 60G3 and memory architecture 60G1, 60G2 which is required and supported by the enterprise-level mobile application 12 and the suite of services supported by the system network 1 of the present invention.

As shown in FIG. 12B, the wireless communication subsystem 50H comprises: an RF-GSM modem transceiver 60H1; a T/X amplifier 60H2 interfaced with the RF-GSM modem transceiver 60H1; and a WIFI interface and a Bluetooth wireless interface 60H3 for interfacing with WIFI and Bluetooth data communication networks, respectively, in a manner known in the communication and computer networking art.

As shown in FIG. 12B, the GPS-tracked and remotely-controllable anti-fire (AF) chemical liquid spray control subsystem 60F comprises: anti-fire chemical liquid supply sensor(s) 60F1 installed in or on the anti-fire chemical liquid supply tank 60B to produce an electrical signal indicative of the volume or percentage of the AF liquid supply tank containing AF chemical liquid at any instant in time, and providing such signals to the AF liquid spraying system control interface 60F4; a power supply and controls 60F2 interfaced with the liquid pump spray subsystem 60C, and also the AF liquid spraying system control interface 60F4; manually-operated spray pump controls interface 60F3, interfaced with the AF liquid spraying system control interface 60F4; and the AF liquid spraying system control interface 60F4 interfaced with the micro-computing subsystem 60G, via the system bus 601. The flash memory storage 60G2 contains microcode for a control program that runs on the microprocessor 60G3 and realizes the various GPS-specified AF chemical liquid spray control, monitoring, data logging and management functions supported by the system 60.

Specification of GPS-Tracking Backpack-Mounted Atomizing Spray Cannon System for Spraying Environmentally-Clean Anti-Fire/Fire Inhibiting Liquid Biochemical Composition on the Surfaces of Buildings and Property Ground Surfaces FIG. 13A shows a mobile GPS-tracked backpack-mounted atomizing spray cannon (ASC) system 70 adapted for misting and spraying environmentally-clean anti-fire (AF) chemical liquid on ground surfaces in accordance with the principles of the present invention.

As shown, the GPS-tracked spray cannon system 70 comprises: a lightweight frame/chassis 60A a GPS-guided navigation subsystem 6012 for providing the user with navigation control during GPS-tracked and mapped spraying operations; an integrated supply tank 60B supported on the frame 60A0, and connected to a gasoline/diesel or battery-powered operated motor-driven spray pump, 60C, for deployment on private and public property parcels; a spray nozzle assembly 60D connected to the spray pump 60C by way of a hose 60E, for misting and/or spraying the same with environmentally-clean anti-fire (AF) liquid under the control of GPS-specified coordinates defining its programmed flight path when operating to suppress or otherwise fight wild fires.

FIG. 13B shows the GPS-tracked anti-fire liquid spraying system 70 of FIG. 13A as comprising a number of subcomponents, namely: a GPS-tracked and remotely-monitored AF chemical liquid spray control subsystem 60F; a micro-computing platform or subsystem 60G interfaced with the GPS-tracked and remotely-monitored AF chemical liquid spray control subsystem 60F by way of a system bus 601; a wireless communication subsystem 60H interfaced to the micro-computing platform 60G via the system bus 50I; and a vehicular propulsion and navigation subsystem 601 employing propulsion subsystem 6011, and AI-driven or manually-driven navigation subsystem 6012.

As configured in the illustrative embodiment, the GPS-tracked anti-fire liquid spraying system 70 enables and supports (i) the remote monitoring of the spraying of anti-fire (AF) chemical liquid from the system 70 when located at specific GPS-indexed location coordinates, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 13B, the micro-computing platform 60G comprises: data storage memory 60G1; flash memory (firmware storage) 60G2; a programmable microprocessor 60G3; a general purpose I/O (GPIO) interface 60G4; a GPS transceiver circuit/chip with matched antenna structure 60G5; and the system bus 601 which interfaces these components together and provides the necessary addressing, data and control signal pathways supported within the system 70. As such, the micro-computing platform 60G is suitably configured to support and run a local control program 60G2-X on microprocessor 60G3 and memory architecture 60G1, 60G2 which is required and supported by the enterprise-level mobile application 12 and the suite of services supported by the system network 1 of the present invention.

As shown in FIG. 13B, the wireless communication subsystem 50H comprises: an RF-GSM modem transceiver 60H1; a T/X amplifier 60H2 interfaced with the RF-GSM modem transceiver 60H1; and a WIFI interface and a Bluetooth wireless interface 60H3 for interfacing with WIFI and Bluetooth data communication networks, respectively, in a manner known in the communication and computer networking art.

As shown in FIG. 13B, the GPS-tracked and remotely-controllable anti-fire (AF) chemical liquid spray control subsystem 60F comprises: anti-fire chemical liquid supply sensor(s) 60F1 installed in or on the anti-fire chemical liquid supply tank 60B to produce an electrical signal indicative of the volume or percentage of the AF liquid supply tank containing AF chemical liquid at any instant in time, and providing such signals to the AF liquid spraying system control interface 60F4; a power supply and controls 60F2 interfaced with the liquid pump spray subsystem 60C, and also the AF liquid spraying system control interface 60F4; manually-operated spray pump controls interface 60F3, interfaced with the AF liquid spraying system control interface 60F4; and the AF liquid spraying system control interface 60F4 interfaced with the micro-computing subsystem 60G, via the system bus 601. The flash memory storage 60G2 contains microcode for a control program that runs on the microprocessor 60G3 and realizes the various GPS-specified AF chemical liquid spray control, monitoring, data logging and management functions supported by the system network of the present invention.

Figure 14A:
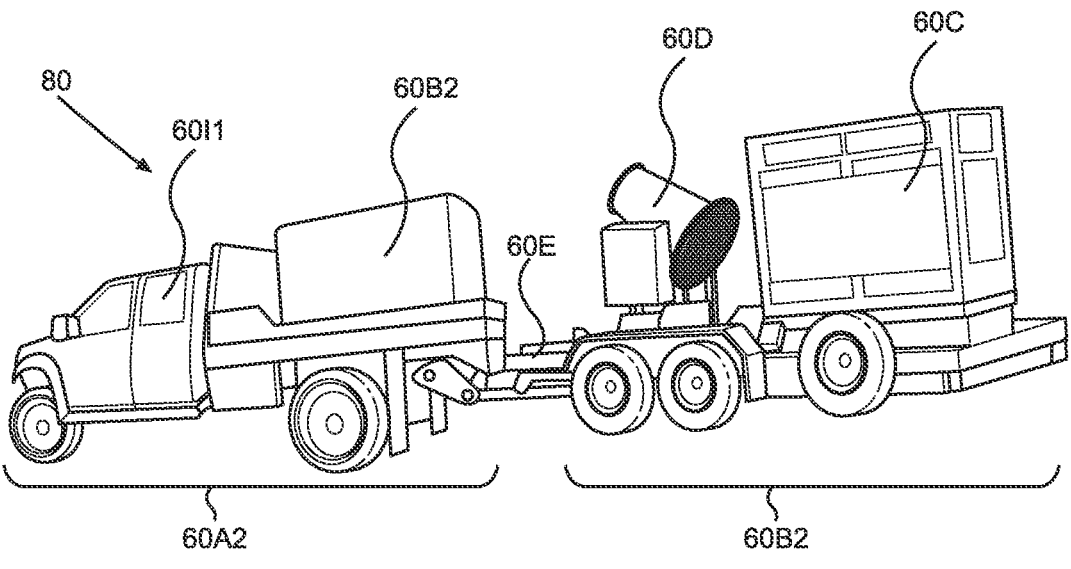
FIG. 14A is a perspective view of a GPS-tracked mobile atomizing spray cannon vehicle (SCV) system adapted for spraying ground surfaces with environmentally-clean anti-fire (AF) biochemical liquid in accordance with the principles of the present invention.

Specification of GPS-Tracked Mobile Atomizing Spray Cannon System for Spraying Environmentally-Clean Anti-Fire Biochemical Liquid on Buildings and Ground Surfaces FIG. 14A shows a mobile GPS-tracked backpack-mounted atomizing spray cannon (ASC) system 80 adapted for misting and spraying environmentally-clean anti-fire/fire-inhibiting biochemical liquid on ground surfaces in accordance with the principles of the present invention.

As shown, the GPS-tracked system 80 comprises: a lightweight frame/chassis 60A provided with a set of wheels mounted on a trailer 60B2 that is pulled by tracktor 60A2 driven by combustion-engine or electric battery-powered motor, that is controlled and navigated by a GPS-guided navigation subsystem 6012; an integrated supply tank 60B supported on the frame 60A3, and connected to a gasoline/diesel operated motor-driven spray pump, 60C, for deployment on private and public property parcels; an atomizing spray nozzle assembly 60D comprising a ring a atomizing spray nozzles mounted about the aperture of a cannon-like air-blowing engine, powered by a turbine fan blower unit, and connected to the spray pump 60C by way of a hose 60E, for producing a forceful airstream enriched with atomized mist developed from a supply of the environmentally-clean fire inhibiting (i.e. anti-fire) biochemical liquid of the present invention, under the control of GPS-specified coordinates defining its programmed path or course when operating to suppress or otherwise fight wild fires.

Figure 14B:
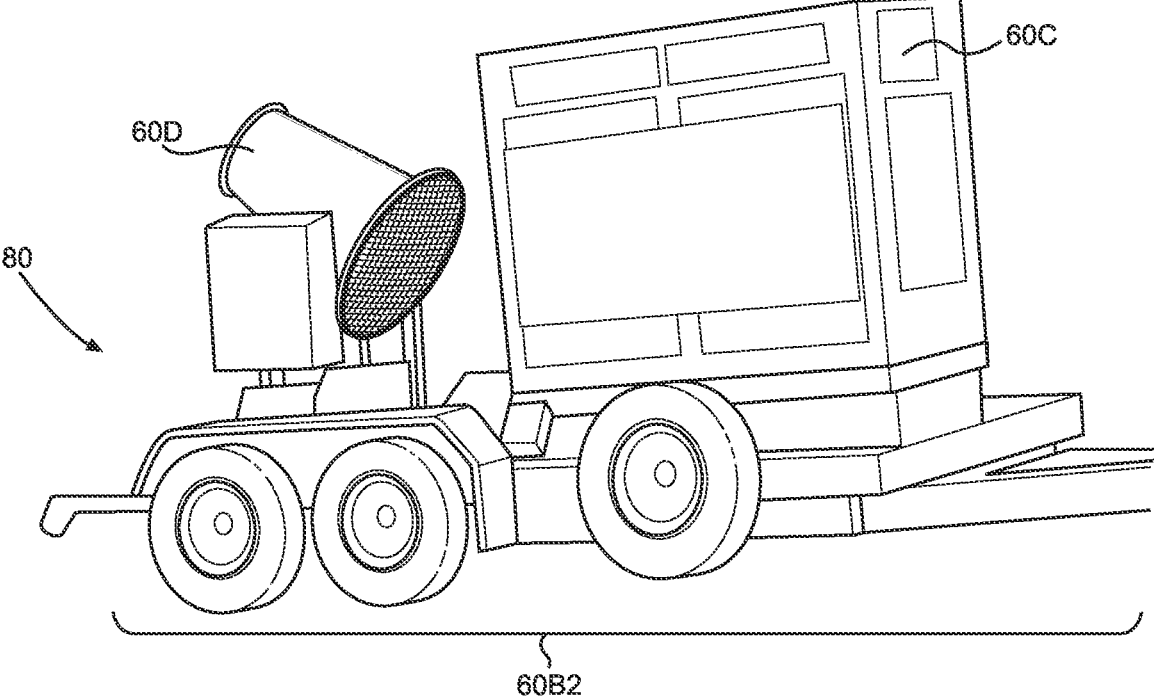
FIG. 14B is perspective view of the GPS-tracked spray cannon vehicle (SPV) system shown in FIG. 14A, adapted for spraying ground surfaces with anti-fire (AF) biochemical liquid in accordance with the principles of the present invention.
Figure 14C:
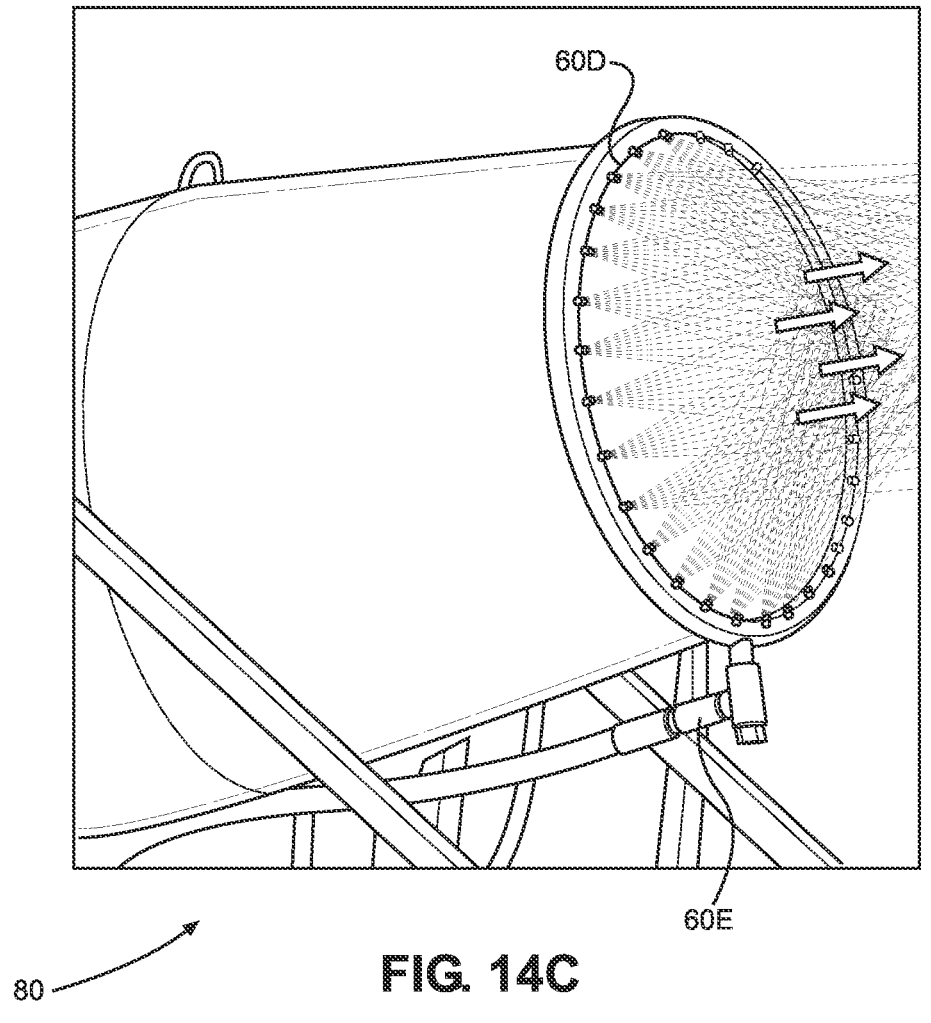
FIG. 14C is a perspective view of the atomizing spray cannon component of the GPS-tracked spray cannon vehicle (SPV) system shown in FIGS. 14A and 14B, showing a ring of atomizing spray nozzles mounted in a ring disposed about the inner aperture of the spray cannon, through is driven high velocity air streaming past the nozzles during spray atomizing operations using the environmentally-clean anti-fire biochemical liquid of the present invention.
Figure 14D:
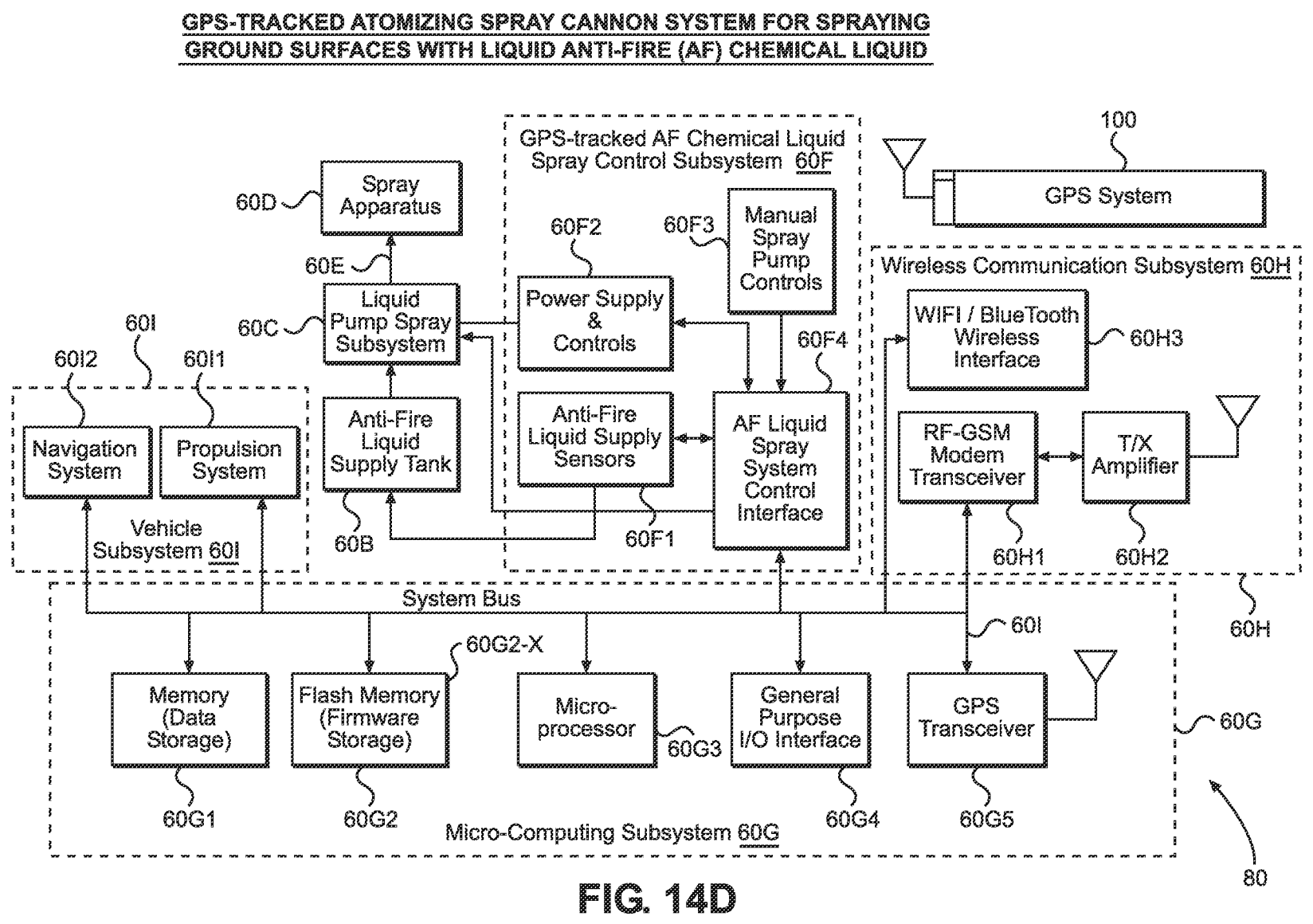

FIG. 14B shows the GPS-tracked anti-fire liquid spraying system cannon 80 of FIG. 14A as comprising a number of subcomponents, namely: a GPS-tracked and remotely-monitored AF chemical liquid spray control subsystem 60F; a micro-computing platform or subsystem 60G interfaced with the GPS-tracked and remotely-monitored AF chemical liquid spray control subsystem 60F by way of a system bus 601; a wireless communication subsystem 60H interfaced to the micro-computing platform 60G via the system bus 50I; and a vehicular propulsion and navigation subsystem 601 employing propulsion subsystem 6011, and AI-driven or manually-driven navigation subsystem 6012.

As configured in the illustrative embodiment, the GPS-tracked anti-fire liquid spraying system 80 enables and supports (i) the remote monitoring of the spraying of anti-fire (AF) chemical liquid from the system 80 when located at specific GPS-indexed location coordinates, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 14B, the micro-computing platform 60G comprises: data storage memory 60G1; flash memory (firmware storage) 60G2; a programmable microprocessor 60G3; a general purpose I/O (GPIO) interface 60G4; a GPS transceiver circuit/chip with matched antenna structure 60G5; and the system bus 601 which interfaces these components together and provides the necessary addressing, data and control signal pathways supported within the system 80. As such, the micro-computing platform 60G is suitably configured to support and run a local control program 60G2-X on microprocessor 60G3 and memory architecture 60G1, 60G2 which is required and supported by the enterprise-level mobile application 12 and the suite of services supported by the system network 1 of the present invention.

As shown in FIG. 14B, the wireless communication subsystem 50H comprises: an RF-GSM modem transceiver 60H1; a T/X amplifier 60H2 interfaced with the RF-GSM modem transceiver 60H1; and a WIFI interface and a Bluetooth wireless interface 60H3 for interfacing with WIFI and Bluetooth data communication networks, respectively, in a manner known in the communication and computer networking art.

As shown in FIG. 14B, the GPS-tracked and remotely-controllable anti-fire (AF) chemical liquid spray control subsystem 60F comprises: anti-fire chemical liquid supply sensor(s) 60F1 installed in or on the anti-fire chemical liquid supply tank 60B to produce an electrical signal indicative of the volume or percentage of the AF liquid supply tank containing AF chemical liquid at any instant in time, and providing such signals to the AF liquid spraying system control interface 60F4; a power supply and controls 60F2 interfaced with the liquid pump spray subsystem 60C, and also the AF liquid spraying system control interface 60F4; manually-operated spray pump controls interface 60F3, interfaced with the AF liquid spraying system control interface 60F4; and the AF liquid spraying system control interface 60F4 interfaced with the micro-computing subsystem 60G, via the system bus 601. The flash memory storage 60G2 contains microcode for a control program that runs on the microprocessor 60G3 and realizes the various GPS-specified AF chemical liquid spray control, monitoring, data logging and management functions supported by the system network of the present invention.

Figure 15A:
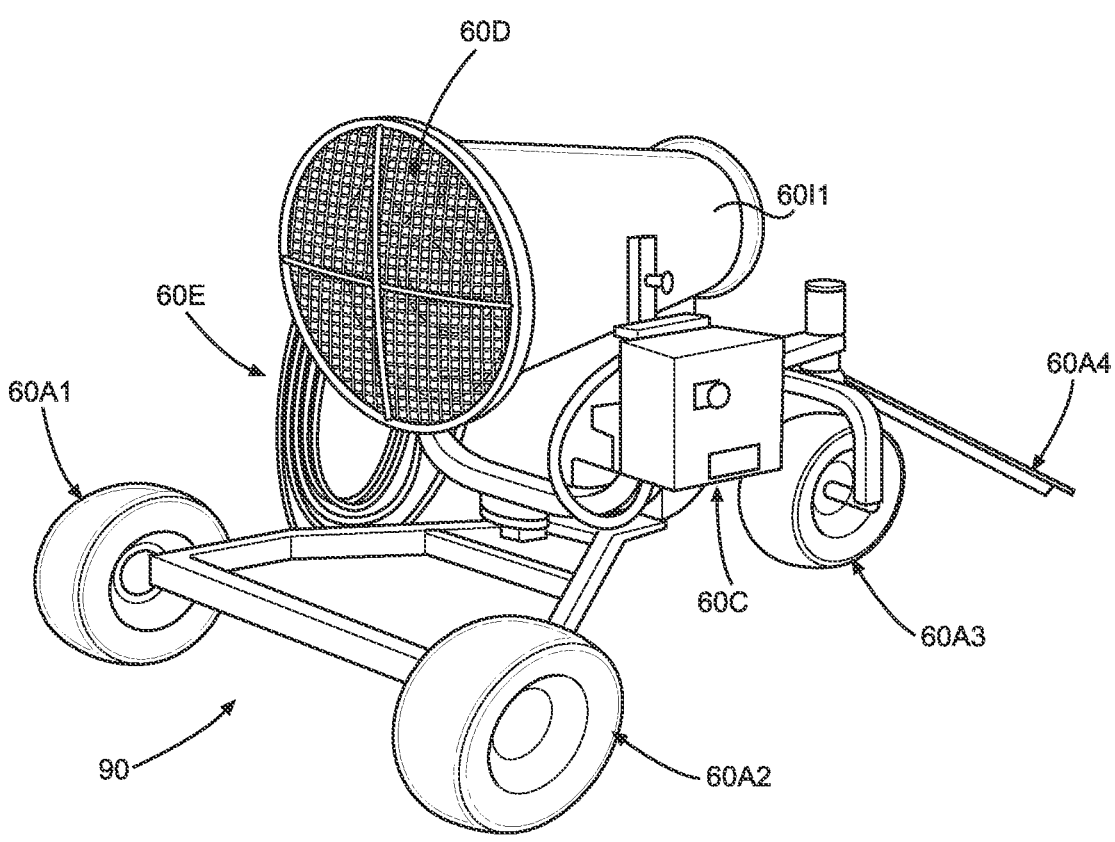
FIG. 15A is a GPS-tracked portable wheel-mounted atomizing spray "cannon" system, configured as a trailer and adapted for towing behind a powered vehicle (e.g. truck), and supporting atomization spraying of ground and property surfaces with an environmentally-clean anti-fire biochemical liquid formulated in accordance with the principles of the present invention.
Figure 16A:
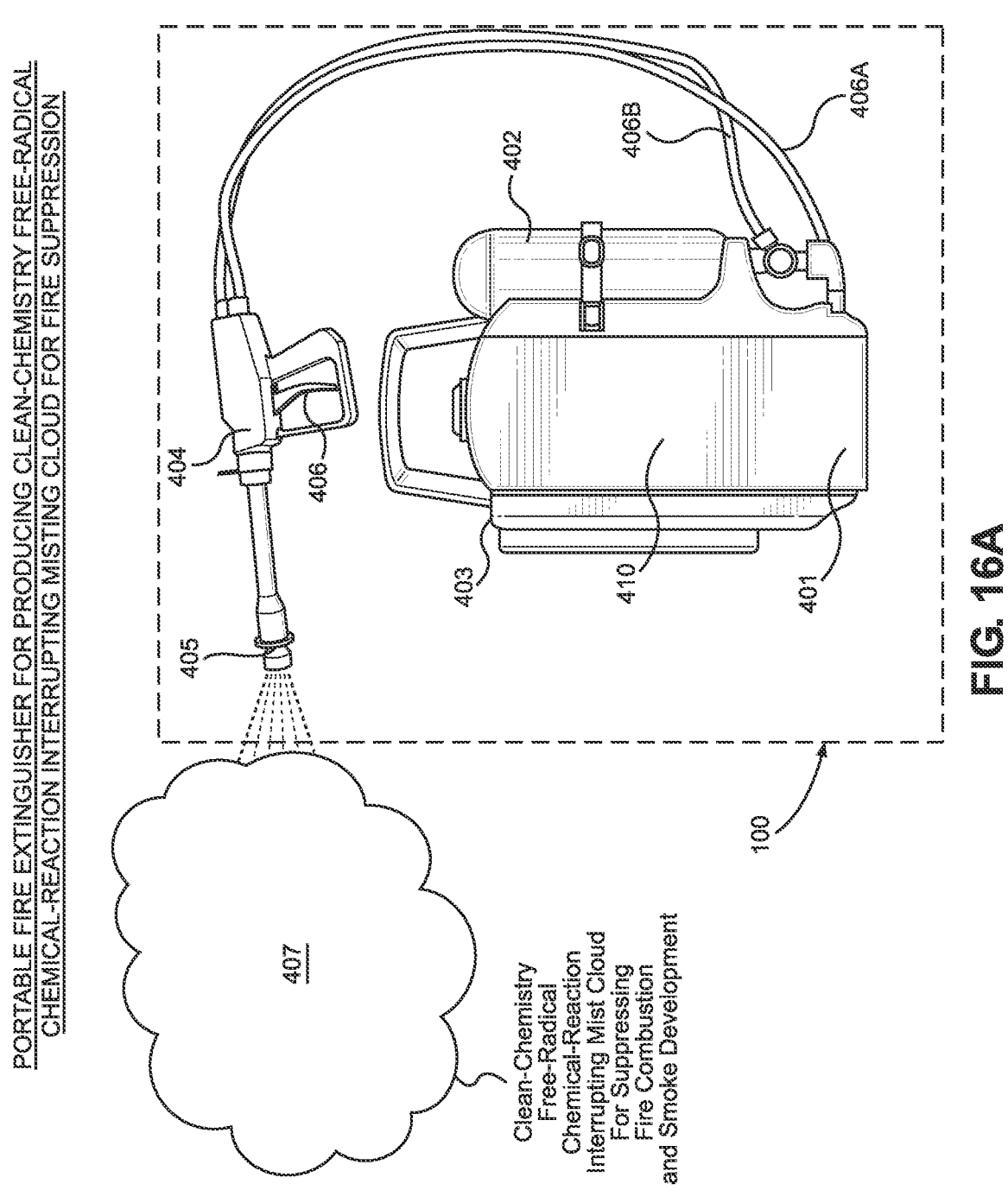
FIG. 16A is a GPS-tracked portable backpack-mounted atomizing spraying system adapted for spraying ground surfaces with environmentally-clean anti-fire biochemical liquid in accordance with the principles of the present invention.

Specification of GPS-Tracking Mobile Atomizing Spray Cannon System for Spraying Environmentally-Clean Anti-Fire Biochemical Liquid on Buildings and Ground Surfaces FIG. 15A shows a mobile GPS-tracked mobile atomizing spray cannon (ASC) system 90 capable of being towed along a course or desired pathway, and specially adapted for misting and spraying environmentally-clean fire inhibiting biochemical liquid composition of the present invention on ground and other property surfaces in accordance with the principles of the present invention.

As shown in FIG. 15A, the GPS-tracked cannon-type spraying system 90 comprises: a lightweight frame/chassis 60A0 supporting a propulsion subsystem 601 provided with a set of wheels 60A1-60A3, and tow bar 60A4; an integrated supply tank 60B supported on the vehicle towing the spray cannon system 90, and connected to a gasoline/diesel or electric-motor operated motor-driven spray pump, 60C, for deployment on private and public property parcels; an electric turbine fan 6011 for producing forced air stream through the cylindrical cannon or barrel like structure as shown; an atomizing spray nozzle assembly 60D connected to the spray pump 60C by way of a hose 60E, for misting and/or spraying the same with environmentally-clean anti-fire (AF) biochemical liquid of the present invention under the control of GPS-specified coordinates defining its programmed path or course when operating to suppress or otherwise fight wild fires.

FIG. 15B shows the GPS-tracked anti-fire liquid spraying system 90 of FIG. 15A as comprising a number of subcomponents, namely: a GPS-tracked and remotely-monitored AF chemical liquid spray control subsystem 60F; a micro-computing platform or subsystem 60G interfaced with the GPS-tracked and remotely-monitored AF chemical liquid spray control subsystem 60F by way of a system bus 601; a wireless communication subsystem 60H interfaced to the micro-computing platform 60G via the system bus 50I; and a vehicular propulsion and navigation subsystem 601, and AI-driven or manually-driven navigation subsystem 6012.

As configured in the illustrative embodiment, the GPS-tracked anti-fire liquid spraying system 90 enables and supports (i) the remote monitoring of the spraying of anti-fire (AF) chemical liquid from the system 90 when located at specific GPS-indexed location coordinates, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 15B, the micro-computing platform 60G comprises: data storage memory 60G1; flash memory (firmware storage) 60G2; a programmable microprocessor 60G3; a general purpose I/O (GPIO) interface 60G4; a GPS transceiver circuit/chip with matched antenna structure 60G5; and the system bus 601 which interfaces these components together and provides the necessary addressing, data and control signal pathways supported within the system 90. As such, the micro-computing platform 60G is suitably configured to support and run a local control program 60G2-X on microprocessor 60G3 and memory architecture 60G1, 60G2 which is required and supported by the enterprise-level mobile application 12 and the suite of services supported by the system network 1 of the present invention.

As shown in FIG. 15B, the wireless communication subsystem 50H comprises: an RF-GSM modem transceiver 60H1; a T/X amplifier 60H2 interfaced with the RF-GSM modem transceiver 60H1; and a WIFI interface and a Bluetooth wireless interface 60H3 for interfacing with WIFI and Bluetooth data communication networks, respectively, in a manner known in the communication and computer networking art.

As shown in FIG. 15B, the GPS-tracked and remotely-controllable anti-fire (AF) chemical liquid spray control subsystem 60F comprises: anti-fire chemical liquid supply sensor(s) 60F1 installed in or on the anti-fire chemical liquid supply tank 60B to produce an electrical signal indicative of the volume or percentage of the AF liquid supply tank containing AF biochemical liquid at any instant in time, and providing such signals to the AF liquid spraying system control interface 60F4; a power supply and controls 60F2 interfaced with the liquid pump spray subsystem 60C, and also the AF liquid spraying system control interface 60F4; manually-operated spray pump controls interface 60F3, interfaced with the AF liquid spraying system control interface 60F4; and the AF liquid spraying system control interface 60F4 interfaced with the micro-computing subsystem 60G, via the system bus 601. The flash memory storage 60G2 contains microcode for a control program that runs on the microprocessor 60G3 and realizes the various GPS-specified AF chemical liquid spray control, monitoring, data logging and management functions supported by the system network of the present invention.

Specification Of GPS-Tracking Back-Pack Atomizing-Spray Fire Extinguishing System For Spraying Environmentally-Clean Fire-Inhibiting Biochemical Liquid Compositions On Active Fires, And Also On Surfaces of Buildings And Ground Surfaces To Be Protectively Protected Against Fire FIG. 16A shows a mobile GPS-tracked backpack-mounted atomizing fire extinguishing system 100 adapted for spraying clouds of environmentally-clean anti-fire (AF) biochemical liquid mist onto fire outbreaks (e.g. all Classes of fire A, B, C and D) wherever they may exit, to quickly extinguish the same in accordance with the principles of the present invention. The system can also be used to apply clean fire protective coatings as well using atomizing sprays of clean biochemical liquid compositions of the present invention, disclosed herein.

As shown, the backpack-mounted fire extinguishing system 100 comprises: a liquid storage tank 401 containing 5 gallons of environmentally-clean water-based free-radical chemical-reaction interrupting liquid of the present invention, charged with 100 [PSIG] pressure from a small pressurized air or CO2 tank 402 integrated with the housing 403. The hand-activated gun-style misting head (i.e. spray misting gun) 404 is provided with a stainless-steel misting nozzle 45 that is connected to two flexible hoses 406A and 406B. Hose 406A is connected to the water tank 41 and hose 406B is connected to the pressurized air tank 402. The hand-held gun-style misting head 404 with misting nozzle 405 is manually activated by the user depressing a finger-activated trigger 406 to discharge clean-chemistry water-based chemical-reaction interrupting mist clouds 407 from the nozzle 405 onto a fire for quick suppression and extinguishment. The portable system can be either back-mounted, or carried in one hand while the other hand is used to hold and operate the spray-misting gun 404. Fire Inhibitor chemical liquid 410 has the required free-radical chemical reaction interrupting chemistry of the present invention, such that the chemical molecules in chemical liquid will interfere with the free radicals generated during the combustion phase of a fire, and interrupt these free-radical chemical reactions within the combustion phase, to suppress and extinguish the fire. Specifically, the biochemical liquid has the required metal ions to interrupt free-radical chemical reaction interrupting chemistry of the present invention, such that chemical molecules in the chemical liquid, when transformed into a clean-chemistry-water-based mist, provides a countless supply of water-based micro-droplets, each containing dissolved ions (i.e. electrically-charged atoms or molecules) supplying free-electrons that pair with and stabilize the free-radicals (H+, OH−, O) before any other molecules in the combustion phase can do so to sustain the chemical-reactions (i.e. free-electrons that reduce and stabilize the free-radicals before rapidly-oxidizing molecules within the combustion phase of the fire to sustain the chemical-reactions), and thereby quickly suppressing and extinguishing the fire.

The superior performance of system 400 over conventional portable water mist systems can be attributed to the fact that the micro-droplets of the clean-chemistry water mist 407 will vaporize when absorbing the radiant heat energy of the hot fire, rapidly expanding into a vapor, cooling down the fire, and displacing oxygen. Also the chemical molecules in the micro-droplets will interfere with the free radicals (H+, OH−, O) and interrupt these free-radical chemical reactions within the combustion phase of a fire, and extinguishing the fire.

FIG. 16B shows the GPS-tracked mobile fire extinguishing system 100 of FIG. 16A as comprising a number of subcomponents, namely: a GPS-tracked and remotely-monitored AF chemical liquid spray control subsystem 60F; a micro-computing platform or subsystem 60G interfaced with the GPS-tracked and remotely-monitored AF chemical liquid spray control subsystem 60F by way of a system bus 601; a wireless communication subsystem 60H interfaced to the micro-computing platform 60G via the system bus 50I.

As configured in the illustrative embodiment, the GPS-tracked anti-fire liquid spraying system 100 enables and supports (i) the remote monitoring of the spraying of anti-fire (AF) biochemical liquid from the system 100 when located at specific GPS-indexed location coordinates, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 16B, the micro-computing platform 60G comprises: data storage memory 60G1; flash memory (firmware storage) 60G2; a programmable microprocessor 60G3; a general purpose I/O (GPIO) interface 60G4; a GPS transceiver circuit/chip with matched antenna structure 60G5; and the system bus 601 which interfaces these components together and provides the necessary addressing, data and control signal pathways supported within the system 100. As such, the micro-computing platform 60G is suitably configured to support and run a local control program 60G2-X on microprocessor 60G3 and memory architecture 60G1, 60G2 which is required and supported by the enterprise-level mobile application 12 and the suite of services supported by the system network 1 of the present invention.

As shown in FIG. 16B, the wireless communication subsystem 50H comprises: an RF-GSM modem transceiver 60H1; a T/X amplifier 60H2 interfaced with the RF-GSM modem transceiver 60H1; and a WIFI interface and a Bluetooth wireless interface 60H3 for interfacing with WIFI and Bluetooth data communication networks, respectively, in a manner known in the communication and computer networking art.

As shown in FIG. 16B, the GPS-tracked and remotely-controllable anti-fire (AF) chemical liquid spray control subsystem 60F comprises: anti-fire chemical liquid supply sensor(s) 60F1 installed in or on the anti-fire chemical liquid supply tank 60B to produce an electrical signal indicative of the volume or percentage of the AF liquid supply tank containing AF biochemical liquid of the present invention at any instant in time, and providing such signals to the AF liquid spraying system control interface 60F4; a power supply and controls 60F2 interfaced with the liquid pump spray subsystem 60C controlling the mixing of gas source 402 with biochemical liquid source 410, and also the AF liquid spraying system control interface 60F4; manually-operated trigger 404 controlled spray pump controls interface 60F3, is interfaced with the AF liquid spraying system control interface 60F4; and the AF liquid spraying system control interface 60F4 is interfaced with the micro-computing subsystem 60G, via the system bus 601. The flash memory storage 60G2 contains microcode for a control program that runs on the microprocessor 60G3 and realizes the various GPS-specified AF biochemical liquid spray control, monitoring, data logging and management functions supported by the system network of the present invention.

Figure 17A:
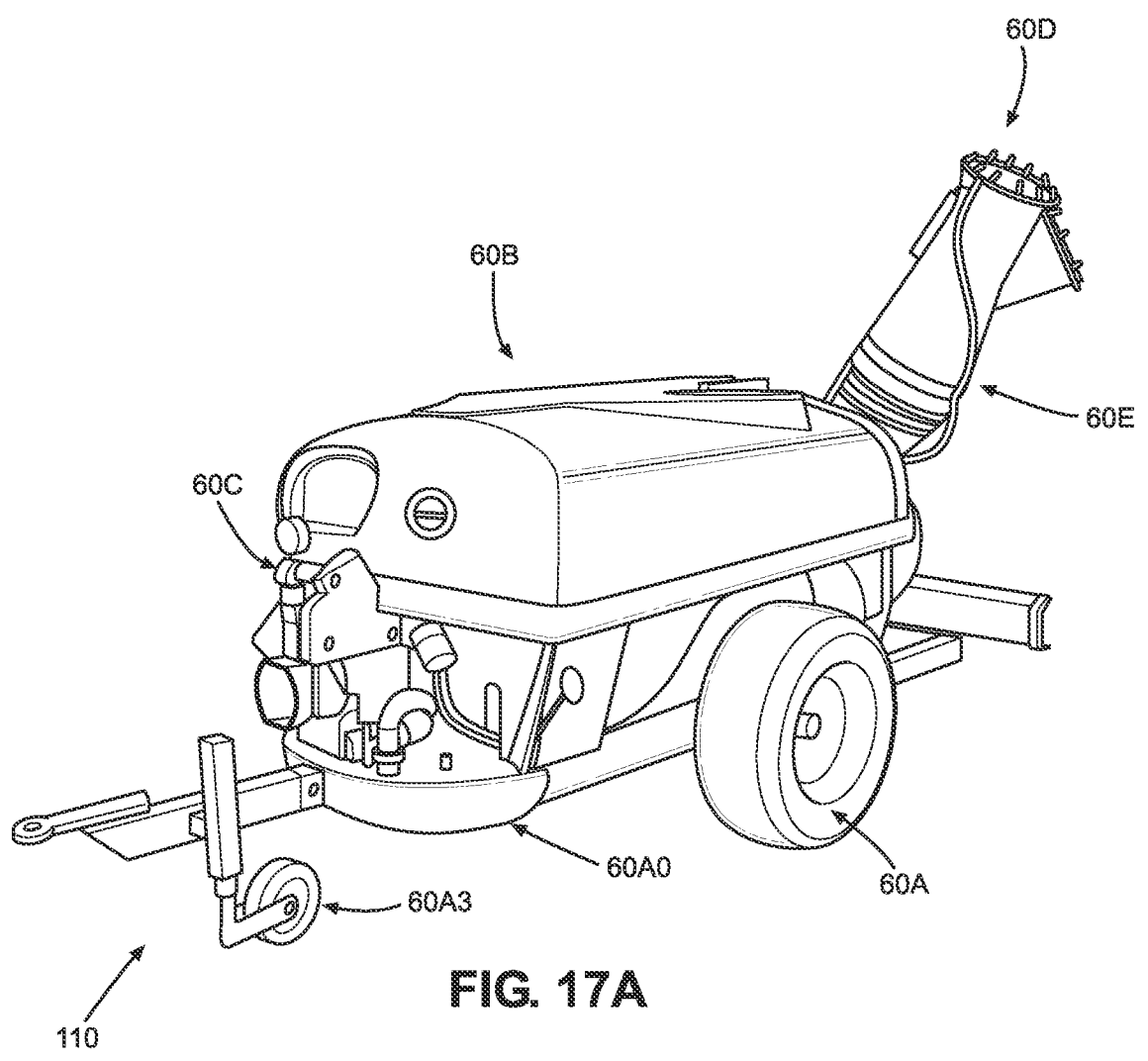
FIG. 17A is a GPS-traced mobile remotely-controllable atomizing spray "cannon" system adapted for spraying ground surfaces with environmentally-clean anti-fire (AF) liquid in accordance with the principles of the present invention.

Specification of GPS-Tracking Mobile Remotely-Controllable Atomizing Spray Cannon System for Spraying Environmentally-Clean Anti-Fire (AF) Liquid on Buildings and Ground Surfaces FIG. 17A shows a mobile GPS-tracked backpack-mounted atomizing spray cannon (ASC) system 110 adapted for misting and spraying environmentally-clean anti-fire (AF) biochemical liquid on ground surfaces in accordance with the principles of the present invention.

As shown in FIG. 17A, the GPS-tracked mobile spraying cannon system 110 comprises: a lightweight frame/chassis 60A0 supporting a propulsion subsystem 601 provided with a set of wheels 60A1-60A4, driven by combustion-engine, and controlled and navigated by a GPS-guided navigation subsystem 6012; an integrated supply tank 60B supported on the frame 60A0, and connected to a gasoline/diesel operated motor-driven spray pump, 60C, for deployment on private and public property parcels; a spray nozzle assembly 60D connected to the spray pump 60C by way of a hose 60E, for misting and/or spraying the same with environmentally-clean anti-fire (AF) liquid under the control of GPS-specified coordinates defining its programmed path when operating to suppress or otherwise fight wild fires.

FIG. 17B shows the GPS-tracked anti-fire liquid spraying system 110 of FIG. 17A as comprising a number of subcomponents, namely: a GPS-tracked and remotely-monitored AF chemical liquid spray control subsystem 60F; a micro-computing platform or subsystem 60G interfaced with the GPS-tracked and remotely-monitored AF chemical liquid spray control subsystem 60F by way of a system bus 601; a wireless communication subsystem 60H interfaced to the micro-computing platform 60G via the system bus 50I; and AI-driven or manually-driven navigation subsystem 6012.

As configured in the illustrative embodiment, the GPS-tracked anti-fire liquid spraying cannon system 110 enables and supports (i) the remote monitoring of the spraying of anti-fire (AF) chemical liquid from the system 110 when located at specific GPS-indexed location coordinates, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 17B, the micro-computing platform 60G comprises: data storage memory 60G1; flash memory (firmware storage) 60G2; a programmable microprocessor 60G3; a general purpose I/O (GPIO) interface 60G4; a GPS transceiver circuit/chip with matched antenna structure 60G5; and the system bus 601 which interfaces these components together and provides the necessary addressing, data and control signal pathways supported within the system 110. As such, the micro-computing platform 60G is suitably configured to support and run a local control program 60G2-X on microprocessor 60G3 and memory architecture 60G1, 60G2 which is required and supported by the enterprise-level mobile application 12 and the suite of services supported by the system network 1 of the present invention.

As shown in FIG. 17B, the wireless communication subsystem 50H comprises: an RF-GSM modem transceiver 60H1; a T/X amplifier 60H2 interfaced with the RF-GSM modem transceiver 60H1; and a WIFI interface and a Bluetooth wireless interface 60H3 for interfacing with WIFI and Bluetooth data communication networks, respectively, in a manner known in the communication and computer networking art.

As shown in FIG. 17B, the GPS-tracked and remotely-controllable anti-fire (AF) chemical liquid spray control subsystem 60F comprises: anti-fire chemical liquid supply sensor(s) 60F1 installed in or on the anti-fire chemical liquid supply tank 60B to produce an electrical signal indicative of the volume or percentage of the AF liquid supply tank containing AF chemical liquid at any instant in time, and providing such signals to the AF liquid spraying system control interface 60F4; a power supply and controls 60F2 interfaced with the liquid pump spray subsystem 60C, and also the AF liquid spraying system control interface 60F4; manually-operated spray pump controls interface 60F3, interfaced with the AF liquid spraying system control interface 60F4; and the AF liquid spraying system control interface 60F4 interfaced with the micro-computing subsystem 60G, via the system bus 601. The flash memory storage 60G2 contains microcode for a control program that runs on the microprocessor 60G3 and realizes the various GPS-specified AF chemical liquid spray control, monitoring, data logging and management functions supported by the system network of the present invention.

Figure 18:
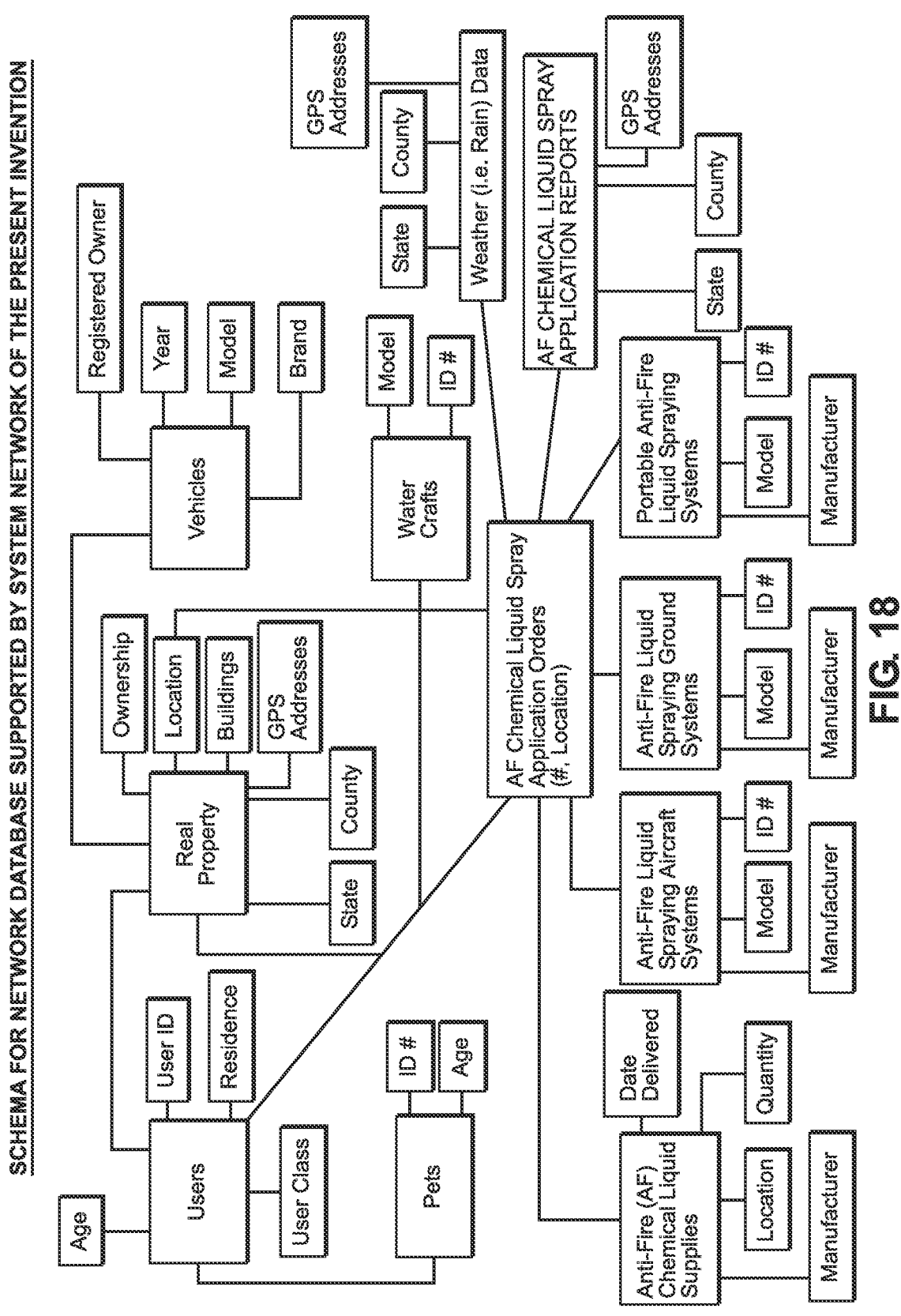
FIG. 18 is a schematic representation of a schema for the network database (RDBMS) supported by the system network of the present invention, showing the primary enterprise level objects supported in the database tables created in the network database using the schema, and the relationships that are specified or indicated, to support all of the enterprise-level objects defined and managed on the system network.

Specification Of An Exemplary Network Database Schema For Supporting The System Network Of The Present Invention And GPS-Specified Operations Involving The Spraying Of Anti-Fire (AF) Liquid On GPS-Specified Ground, Property And Building Surfaces In Regions At Risk Prior To And During The Outbreak Of Wild Fires FIG. 18 shows an exemplary schema for the network database (RDBMS) 9C1 supported by the system network of the present invention, showing the primary enterprise level objects supported in the database tables created in the network database 9C using the schema, and the relationships that are specified or indicated. This exemplary database schema is for supporting the system network of the present invention and GPS-specified operations involving the spraying of anti-fire (AF) liquid on GPS-specified ground, property and building surfaces in regions at risk prior to and during the outbreak of wild fires.

As shown in FIG. 18, the exemplary database schema for the system network 1 includes a number of high-level enterprise objects such as, for example: Users, with properties including User ID, Residence, Age, User Class (e.g. Wild Fire Management Administrator, Wild Fire Spray Applicator, Real Property Owner, Home Owner, Business Owner, Property Owner, Resident, etc.), and Pets; Real Property, with properties including Ownership/Lease, Location, Buildings, GPS Addresses, County, State; Vehicles, with properties such as Model, Year, Brand, Registered Owner; Water Crafts, with properties Model, ID #etc.; Anti-Fire Chemical Liquid Supplies, with properties Manufacturer, Location, Quantity, Date Delivered; Anti-Fire (AF) Liquid Spraying Aircraft Systems, with properties Manufacturer, Model, ID #; Anti-Fire Liquid Spraying Ground Systems, including Manufacturer, Model, ID #; Portable Anti-Fire Liquid Spraying Systems; Anti-Fire (AF) Chemical Liquid Spray Application Orders, including Location, ID #; Anti-Fire Chemical Liquid Spray Application Reports, with properties such as State, County, GPS Addresses; and Weather Data, with properties State, County, and GPS Addresses.

Specification of Exemplary Graphical User Interfaces Supported on the Mobile Application Deployed on System Network of the Present Invention, for the Purpose of Delivering the Various Services Supported on the System Network FIG. 19 illustrates an exemplary wire-frame model of a graphical user interface (GUI) 13 of the mobile application 120 for use by registered users (e.g. property parcel owners, contractors and/or agents, and other stakeholders on the system network) to request and receive services supported by the system network of the present invention. As shown in this exemplary GUI screen 13, supports a number of pull-down menus under the titles: messages 13A, where the user can view messages sent via messaging services supported by the application; maps 13B, where wild fires have been identified and mapped, tracked and ranked in terms of risk to the user and associated property; and tasks 13C, where AF liquid spray tasks have been scheduled, have been completed, or are in progress, by the user.

Figure 19A:
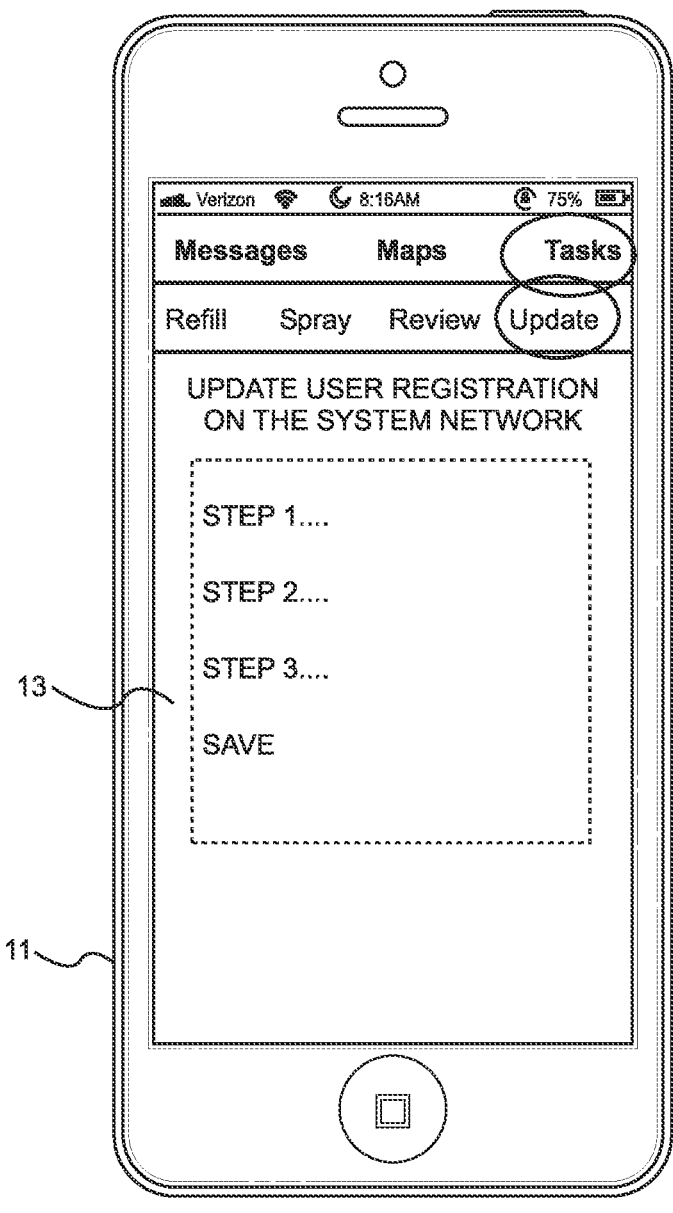
FIG. 19A is an exemplary wire-frame model of a graphical user interface supported by the mobile application showing a user updating the registration profile as a task on the system network.

FIG. 19A shows an exemplary graphical user interface supported by the mobile application 12 showing a user updating the registration profile as a task on the system network. The GUI screen is accessed and delivered to LCD screen of the mobile computing device 11 when the user selects the Tasks menu to display a menu of commands, and then selects the Update command from the command menu. During this service, the user can update various information items relating to the user profile, such as, name and address, contact information (e.g. email and SMS number), property parcel linked to one's profile, and GPS-tracked spray system deployed or assigned to the user and/or property parcel(s).

Figure 19B:
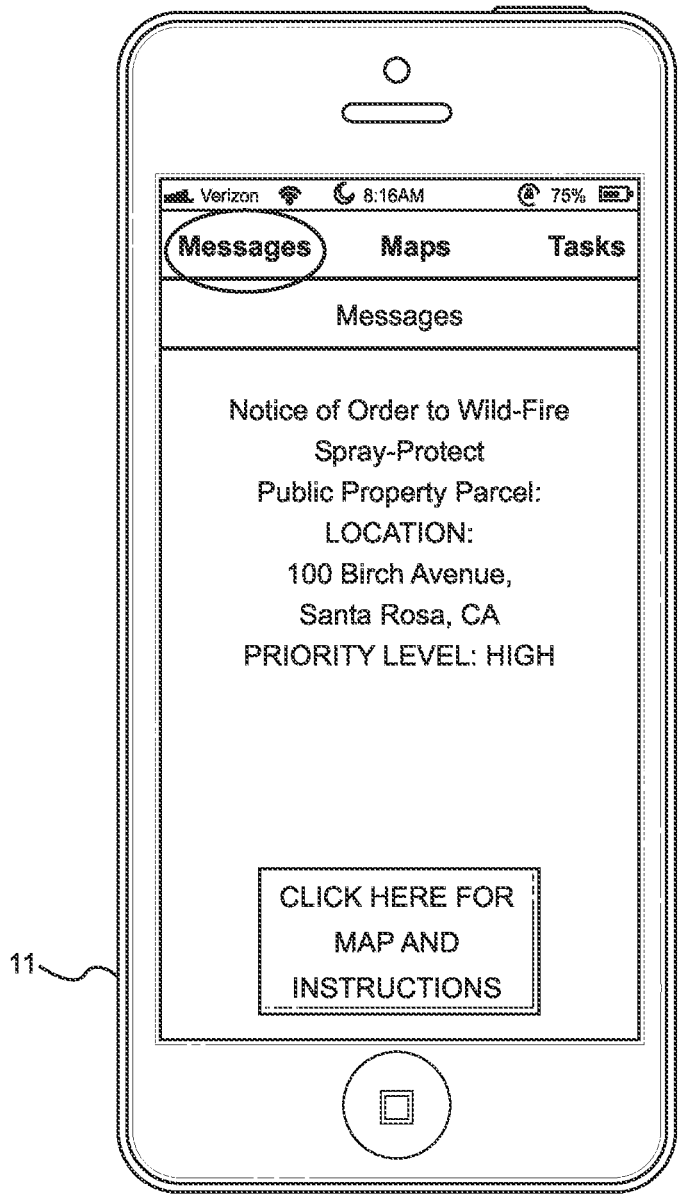
FIG. 19B is an exemplary wire-frame model of a graphical user interface supported by the mobile application showing a user receiving a message request (via email, SMS messaging and/or push-notifications) issued from the command center to spray GPS-specified private property parcel(s) with clean anti-fire biochemical liquid and registered equipment.

FIG. 19B shows an exemplary graphical user interface supported by the mobile application 12 showing a user receiving a message "notice of request to wild-fire spray protect a property parcel" (via email, SMS messaging and/or push-notifications) issued from the command center 19 to spray GPS-specified private property parcel(s) with clean anti-fire (AF) chemical liquid and registered GPS-tracked spray equipment.

Figure 19C:
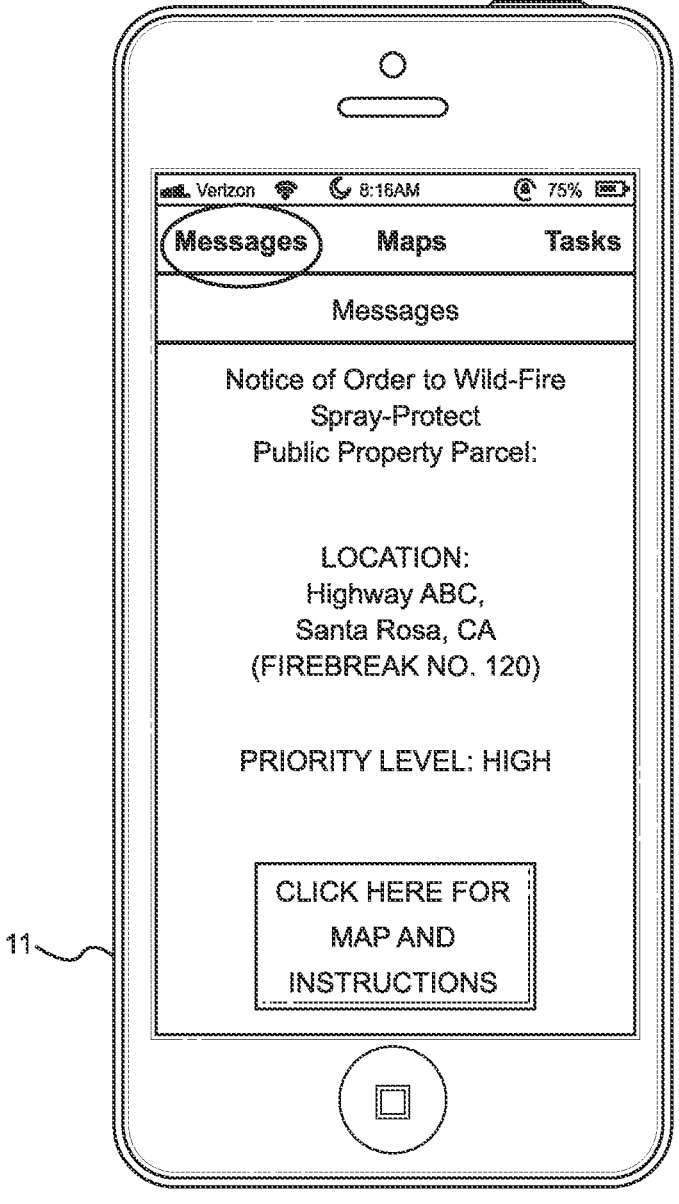
FIG. 19C is an exemplary wire-frame model of a graphical user interface supported by the mobile application showing a user receiving a request/notice of order (via email, SMS messaging and/or push-notifications) to wild-fire spray-protect GPS-specified public property parcel(s) with clean anti-fire biochemical liquid to create and maintain a GPS-specified public firebreak, maintained on public property.

FIG. 19C shows an exemplary graphical user interface supported by the mobile application 12 showing a user receiving a notice of order (via email, SMS messaging and/or push-notifications) to wild-fire spray-protect GPS-specified public property parcel(s) with clean anti-fire (AF) liquid to create and maintain a GPS-specified public firebreak (e.g. Firebreak No. 120).

FIG. 19D shows an exemplary graphical user interface supported by the mobile application showing a user requesting a refill of clean anti-fire (AF) chemical liquid for supply to GPS-specified spray equipment registered on the system network. The user selects the Tasks menu to display a set of commands, and then selects the Refill command from the displayed command menu. The user confirms the refill order and when ready selects the Send Request command from the display screen, sending the command to the command center 19 and related data center 8 for processing and fulfillment. All operations are logged and tracked in the system network database 9C1 shown in FIG. 4A.

In the illustrative embodiment, the mobile application 12 on mobile computing device 11 supports many functions to provide many services: (i) sends automatic notifications from the command center 19 to home/business owners with the mobile application 12, instructing them to spray their real property and home/building at certain times with anti-fire (AF) liquid contained in the tanks of GPS-tracked AF liquid spraying systems 20, 30, 40, 40, 50 and 60; (ii) automatically monitors consumption of sprayed AF-liquid and generate auto-replenish order (via its onboard GSM-circuits) so as to achieve compliance with the home/neighborhood spray defense program, and report AF chemical liquid levels in each home-owner tank; and (iii) shows status of wild fire risk in the region, and actions to the taken before wild fire outbreak.

Figure 20:
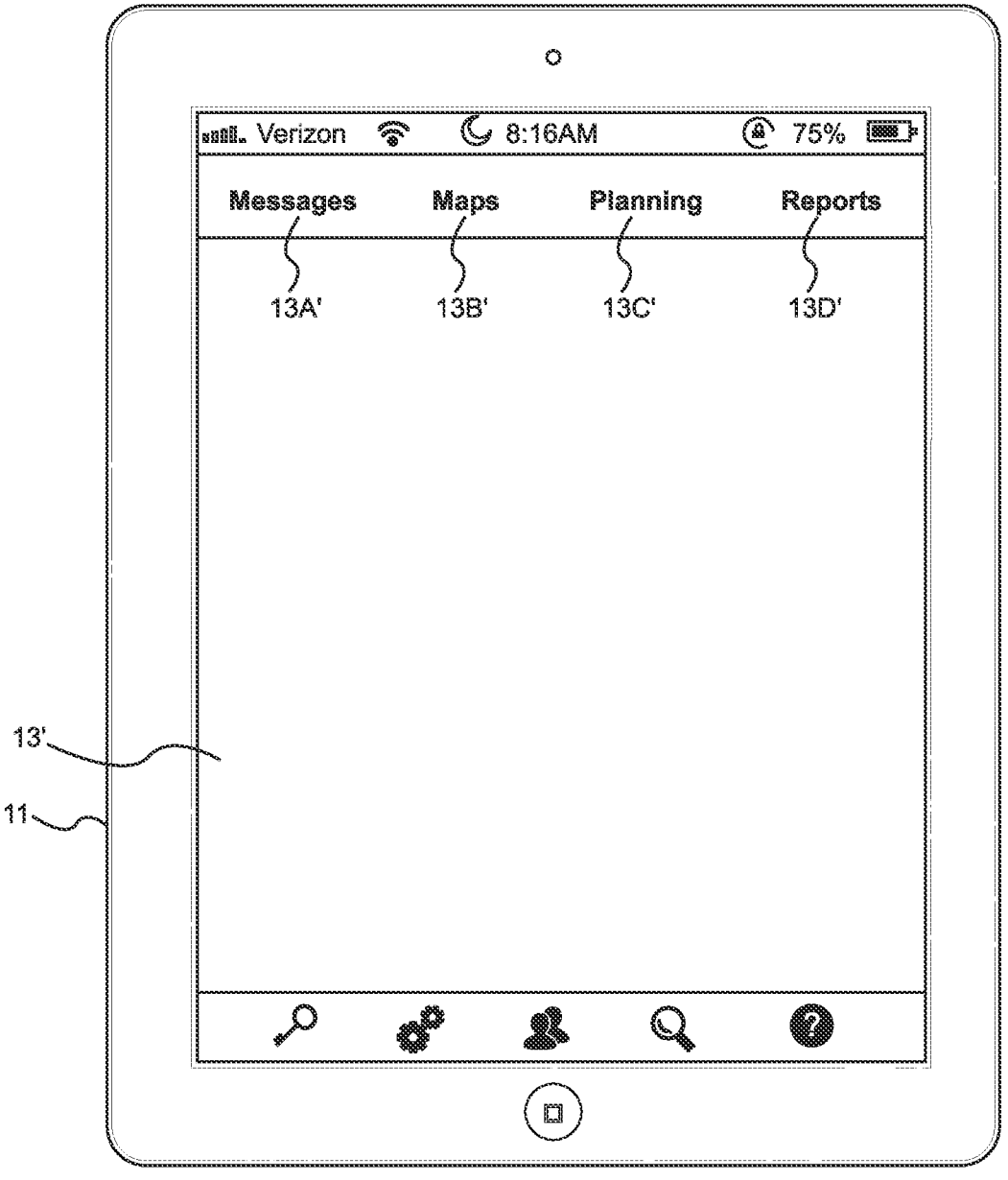
FIG. 20 is an exemplary wire-frame model of a graphical user interface supported by the mobile application configured for second specific class of registered users, namely, command center administrators, enabling such users to issue wild-fire protection orders, plan wild-fire protection tasks, generate wild-fire and protection reports, and send and receive messages to users on the system network.

FIG. 20 shows an exemplary graphical user interface 13' supported by the mobile application 12 configured for use by command center administrators to issue wild-fire protection orders, plan wild-fire protection tasks, generate wild-fire and protection reports, and send and receive messages to users on the system network, to carry out a wild fire suppression and management program in the region where the system network is deployed. As shown, GUI screen 13' supports a number of pull-down menus under the titles: Messages 13A', where project administrator and spray technicians can view messages sent via messaging services supported by the application; Maps 13B', where wild fires have been identified, tracked, and ranked in terms of risk to certain regions at a given moment in time; Planning 13C', wherein plans have been have been made to fight wild fires using the methods described in FIGS. 24 through 32B, status of specific plans, which one are in progress; and Reports 13D', where reports are issued to the mobile application 12 running on mobile client systems 11 in operable communication with the web, application and database servers 9A, 9B and 9C at the data center 8, supported by the system network 1.

FIG. 20A shows an exemplary graphical user interface supported by the mobile application configured for use by command center administrators to issue wild-fire protection orders using the system network of the present invention. As shown, the user selects the Planning menu and displays a set of planning commands, and then selects the Property command, where the user is then giving to choice to select one or more parcels of property in a given region, and then select an Action (e.g. Wild Fire Spray Protect). The users selects the property parcel(s), and then the required Action (i.e. Wild Fire Spray Protect), and Order is set up for the command center action. When the command center selects execute from the menu, the system network issues the order and sends notice of orders to all property parcel owners or agents to oversee the immediate spraying of the GPS-specified property parcels with clean anti-fire (AF) chemical liquid supply to the property owners or agents as the case may be.

Figure 20B:
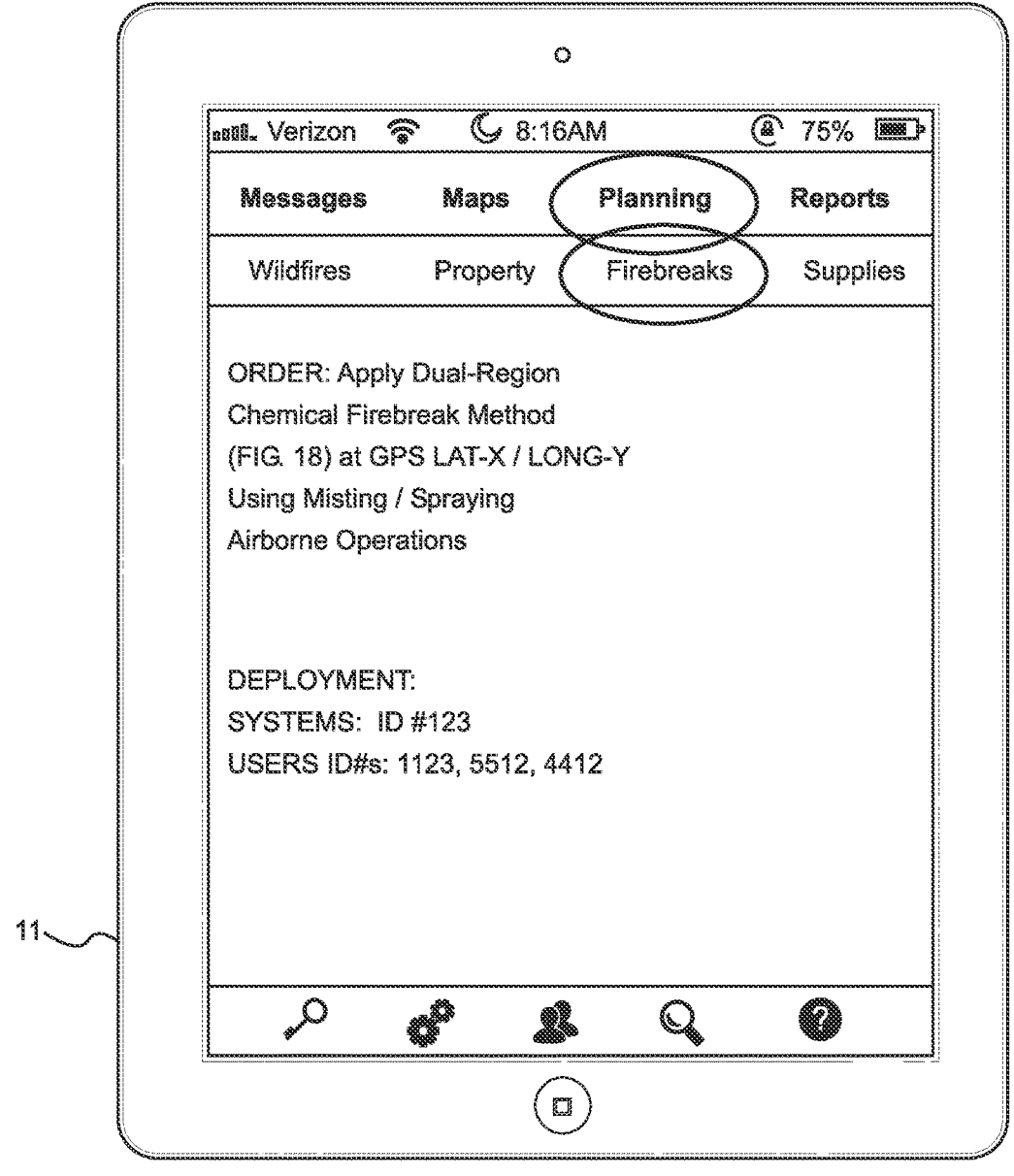
FIG. 20B exemplary wire-frame model of a graphical user interface supported by the mobile application for use by command center administrators to issue wild-fire protection orders involving the creation and maintenance of a clean biochemical firebreak using the methods of the present invention, as illustrated in FIGS. 24 through 32B.

FIG. 20B shows an exemplary graphical user interface supported by the mobile application 12 configured for use by command center administrators to issue wild-fire protection orders involving the creation and maintenance of a clean AF-based chemical firebreak, as illustrated in FIG. 25, for example, using the methods of the present invention described herein. As shown, the administrator selects the Planning menu, and displays a menu of Planning commands, from which the user selects Firebreaks. In the case example shown in FIG. 20B, the administrator issues an Order to apply or rather practice the dual-region clean AF chemical firebreak method illustrated in FIG. 25, at GPS-specified coordinates GPS LAT-X/LONG-Y using AF chemical liquid misting and spraying airborne operations. As shown the order will specify the deployment of specific GPS-tracked AF spray vehicle systems, and identify them by system ID #. The order may also identify or request users (e.g. pilots) assigned to the AF chemical firebreak project/task.

FIG. 20C shows an exemplary graphical user interface supported by mobile application 12 configured for use by command center administrators to order the creation and/or maintenance of a GPS-specified clean AF-based chemical firebreak on one or more public/private property parcels. As shown, the administrator selects the Planning menu, and displays a menu of Planning commands, from which the user selects Firebreaks. In the case example shown in FIG. 13C, the administrator issues an Order to practice the Wild Fire Spray Protect Method alongside one or more parcels of public property, which may be a long strip of land/brush alongside or near a highway. The method may be the AF chemical firebreak method as illustrated in the FIG. 25 and described in FIGS. 26A, 26B and 26C, at GPS-specified coordinates GPS LAT-X/LONG-Y using ground-based AF chemical liquid spraying operations. As shown, the order will specify the deployment of specific GPS-tracked AF spray vehicle systems, and identify them by system ID #. The order may also identify or request users (e.g. drivers) assigned to the AF chemical firebreak project/task. Alternatively, the method disclosed in FIGS. 28A through 28C can be used to construct the clean biochemistry fire break shown in FIG. 27, and the method disclosed in FIGS. 30A, 30B and 30C can be used to construct the clean chemistry wildfire break shown in FIG. 29.

FIG. 20D shows an exemplary graphical user interface for mobile application configured used by command center administrators to receive messages from users including property owners and contractors, requesting refills for clean anti-fire (AF) chemical liquid for GPS-specified spray system equipment.

Figure 21:
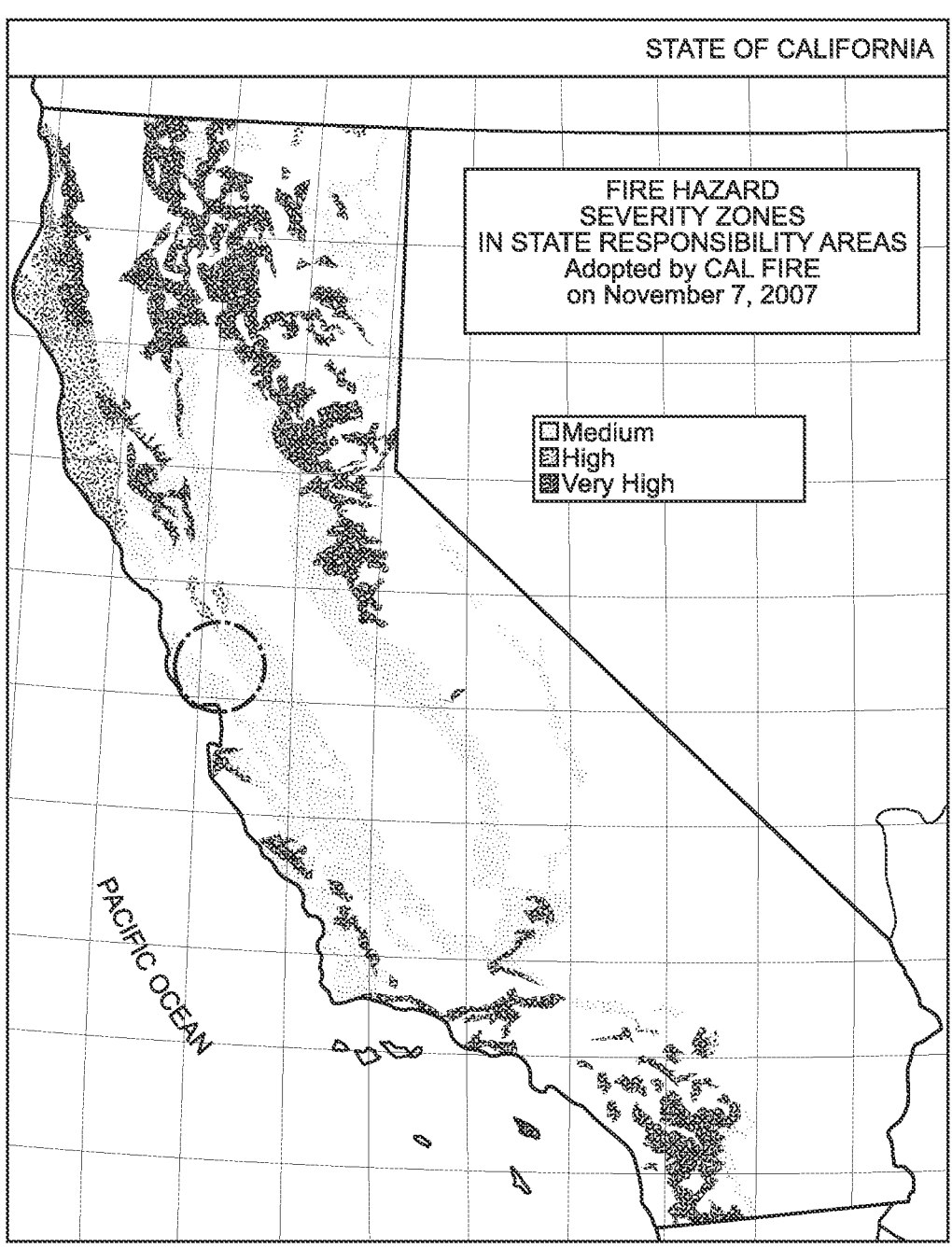
FIG. 21 is a graphical representation of an exemplary fire hazard severity zone (FHSZ) map generated by the CAL FIRE™ System in state responsibility areas of the State of California, and accessible through the mobile application, for use while informing the strategic application of environmentally-clean anti-fire biochemical liquid spray onto specified regions of property prior to the arrival of wild fires, using the system network of the present invention.

FIG. 21 shows an exemplary fire hazard severity zone (FHSZ) map generated by the CAL FIRE® System in state responsibility areas of the State of California. Such maps can be used by the system network 1 to inform the strategic application of environmentally-clean anti-fire (AF) liquid spray using the system network of the present invention. Such maps also can be displayed on the mobile application 12 to provide greater awareness of risks created by wild fires in a specific region, at certain moments in time.

Figure 22:
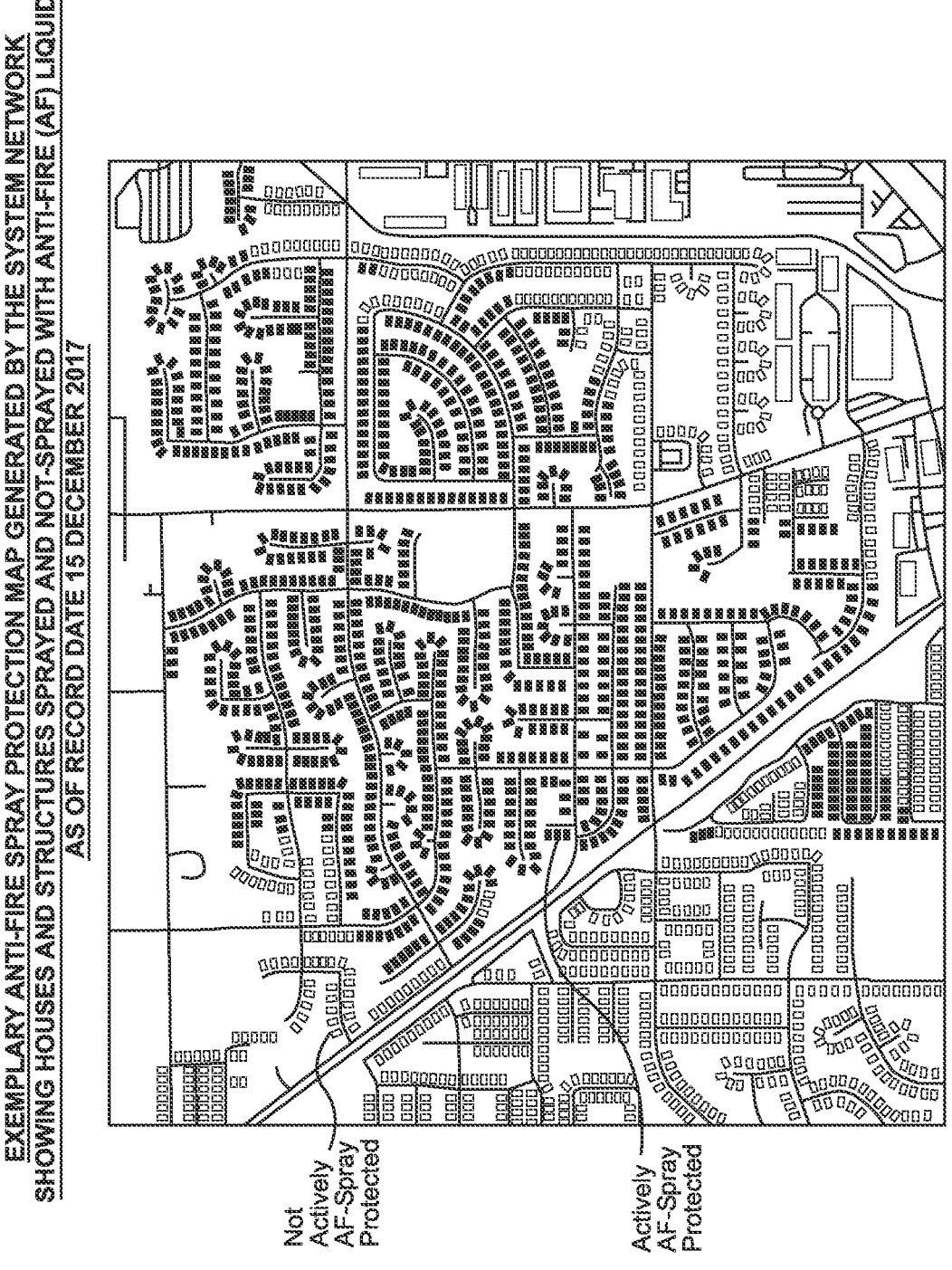
FIG. 22 is an exemplary anti-fire (AF) spray protection map generated by the system network of the present invention, showing houses and buildings that have been sprayed, and not-sprayed, with state/county-issued clean anti-fire biochemical liquid as of the report date 15 Dec. 2017.

Specification of an Exemplary Anti-Fire (AF) Spray Protection Map Generated by the System Network of the Present Invention FIG. 22 shows an exemplary GPS-specified anti-fire (AF) biochemical liquid spray protection map generated by the system network 1, showing properties, houses and buildings that were sprayed, and not-sprayed, with state/county-issued anti-fire liquid as of report date, 15 Dec. 2017. The system network will periodically update these AF chemical liquid spray protection maps (e.g. every 5 minutes or less) for display to users and neighbors to see whose property/land parcels and homes/building have been spray protected with anti-fire (AF) biochemical liquid of the present invention, and whose parcels and home/buildings have not been AF-spray protected against wild fires, so that they can or may volunteer to lend a helping hand in spray protecting their neighbors properties as time and anti-fire chemical supplies allow, to provide a stronger defense against one or more wild fires raging towards their neighborhood.

In accordance with the principles of the present invention, the application servers 9B supported by the system network 1 will automatically generate anti-fire (AF) chemical liquid spray-protection task reports, as illustrated in FIG. 23, based on the analysis of spray-protection maps as shown in FIG. 22, and based on many other kinds of intelligence collected by the system, and analyzed by human analysts, as well as artificial intelligence (AI) expert systems. Based on such automated intelligence efforts, the application servers 9B will generate periodically, and as needed, AF chemical liquid (AFCL) Spray Command Program files containing GPS/Time-Frame-indexed commands and instructions that are wirelessly transmitted to assigned GPS-tracked anti-fire (AF) chemical liquid spraying systems 30, 40, 50, 60, 70, 80, 90, and 110 so that the operators of such GPS-tracked biochemical liquid spraying systems will know when and where to mist and/or spray AF biochemical liquid over and one certain GPS-specified properties, in their effort to defend against the threat of wild fires.

The AFCL Spray Command Program files, containing GPS-indexed commands and instructions, generated by the application servers 9B are transmitted over the system network 1 to the numerous deployed GPS-tracked AF liquid spraying systems 30, 40, 50, 60, 70, 80, 90, and 110 so as to orchestrate and choreograph the spray application of clean anti-fire (AF) chemical liquid over GPS-specified properties, before and during the presence of wild fires, so as to implement an orchestrated strategic and collective defense against wild fires that break out for various reasons, threatening states, counties, towns, neighborhoods homes, business, and human and animal life.

In some embodiments, the application servers 9B will generate and issue AFCL Spray Command Program files that are transmitted to specific GPS-tracked AF liquid spraying systems 30, 40, 50 60, 70, 80, 90, and 110 and containing automated instructions (i.e. commands) on when and where (i.e. in terms of time frame and GPS-specified coordinates) the GPS-tracked AF liquid spraying systems should automatically apply, via spraying operations, clean AF biochemical liquid on GPS-specified property during their course of movement over land. During such spraying operations, the system network 1 will automatically meter, dispense and log how much clean AF chemical liquid has been sprayed over and on certain GPS-specified properties. Real-time windspeed measurements can be made and used to compensate for spraying operations in real-time, as may be required under certain weather conditions.

In other embodiments, the application servers 9B will generate and issue AFCL Spray Command Program files that are transmitted to other GPS-tracked AF liquid spraying systems 30, 40, 50, 60, 70, 80, 90, and 110 providing automated instructions (i.e. commands) on when and where the GPS-tracked AF liquid spraying systems should spray-apply clean AF chemical liquid on GPS-specified property during course of movement over land, but allowing the human operator to override such spraying instructions, and compensate and ensure greater accuracy, using human operator skill and judgment during spraying operations. While such spraying operations, the system will automatically meter, log and record all dispensed AF biochemical liquid sprayed over and over certain GPS-specified properties under the supervision and control of the human operator.

Specification of an Exemplary Anti-Fire Spray Protection Task Report Generated by the System of the Present Invention FIG. 23 shows an exemplary GPS-specified anti-fire spray protection task report generated by the system network 1 for state/county xxx on 15 Dec. 2017, indicating which properties on what streets, in what town, county, state, requires the reapplication of AF chemical liquid spray treatment in view of factors such as weather (e.g. rainfall, sunlight) and passage of time since last spray application. Such task reports will be transmitted by the command center 19 to registered users, along with an SMS and/or email message to attend to the AF spray task, so the requested user will promptly spray protect their land parcels and home with clean AF chemical liquid, as conditions require or suggest, using the mobile/portable GPS-tracked AF liquid spraying system 20 assigned to the property owner, and deployed over the system network 1.

As contracted AF-spray operators, and home owners alike, protect properties and homes using the GPS-tracked AF liquid spraying systems (20, 30, 40, 50, 60 70, 80, 90, and 110) the system network 1 automatically receives GSM or other RF-based signals transmitted from the GPS-tracked anti-fire (AF) chemical liquid spraying systems, indicating that certain amounts of AF chemical liquid has been dispensed and sprayed from the system onto GPS-specified property. Notably, the amounts of AF chemical liquid dispensed and sprayed from the system over and onto GPS-specified property should closely match the amounts requested in the task report transmitted to the user, to achieve the AF spray protection task directed by AI-driven management processes supported by the wild fire suppression system network of the present invention.

Specification of New and Improved Wild Fire Suppression Methods in Accordance with Principles of the Present Invention Having described the various GPS-tracked anti-fire (AF) chemical liquid spraying systems of the illustrative embodiments 20, 30, 40, 50 60, 70, 80, 90, and 110 shown in the Figure Drawings, and the various functions supported by the mobile application 12 supported by the data center 8 of the system network 1, it is appropriate at this juncture to now described the various new and improved wild fire suppression methods in accordance with principles of the present invention, each involving GPS-guided spray application of clean anti-fire (AF) chemical liquid having a chemistry that works to break a wild fire by interfering with the free-radicals produced during the combustion phase of a ranging wild fire. The benefits and advantages provided by such new and improved methods will become apparent hereinafter.

Specification of a Method of Suppressing a Wild Fire Raging Across a Region of Land in the Direction of the Prevailing Winds FIG. 24 shows a plan view of a wild fire 70 emerging from a forest region 71A and approaching a neighboring town 72 surrounded by other forest regions 71B, 71B and 71C, and moving in the direction determined by prevailing winds, indicated by a pair of bold arrows. This example closely resembles the pathway of many wild fires recently destroying countless acres of land (i.e. real property) in the State of California in 2017.

FIG. 25 illustrates the various steps involved in carrying out the method of suppressing a wild fire raging across a region of land. Specifically, the method involves forming a multi-stage anti-fire chemical fire-break system illustrated in FIG. 25 using the remotely-managed GPS-controlled application of both anti-fire (AF) liquid mist streams and AF chemical liquid spray streams from ground and air based GPS-tracked anti-fire (AF) liquid spray vehicles, as illustrated for example in FIGS. 8A through 17B.

As illustrated in FIG. 25, the method generally involves: (a) applying, prior to the wild fire reaching the specified target region of land 74, a low-density anti-fire (AF) liquid mist stream in advance of the wild fire 75 so as to form a fire stall region 76, while providing a non-treated region 77 of sufficient size between the front of the wild fire 75 approaching the target region of land 73 and the fire stall region 76; and (b) applying a high-density anti-fire (AF) liquid spray stream in advance of the wild fire 75 to form a fire break region 74 beyond and contiguous with the fire stall region 76, and also continuous with the target region 73 to be protected from the wild fire.

As illustrated in FIG. 25, the fire stall region 76 is formed before the wild fire reaches the fire stall region 76. The fire stall region 76 operates to reduce the free-radical chemical reactions raging in the wild fire 75. This fire stall region 76 helps to reduce the destructive energy of the wild fire by the time the wild fire reaches the fire break region 74, and enabling the fire break region 74 to operate and significantly break the free radical chemical reactions in the wild fire 75 when the wild fire reaches the fire break region 74. This helps to suppress the wild fire 75 and protect the target region of land 73.

Figure 4C:
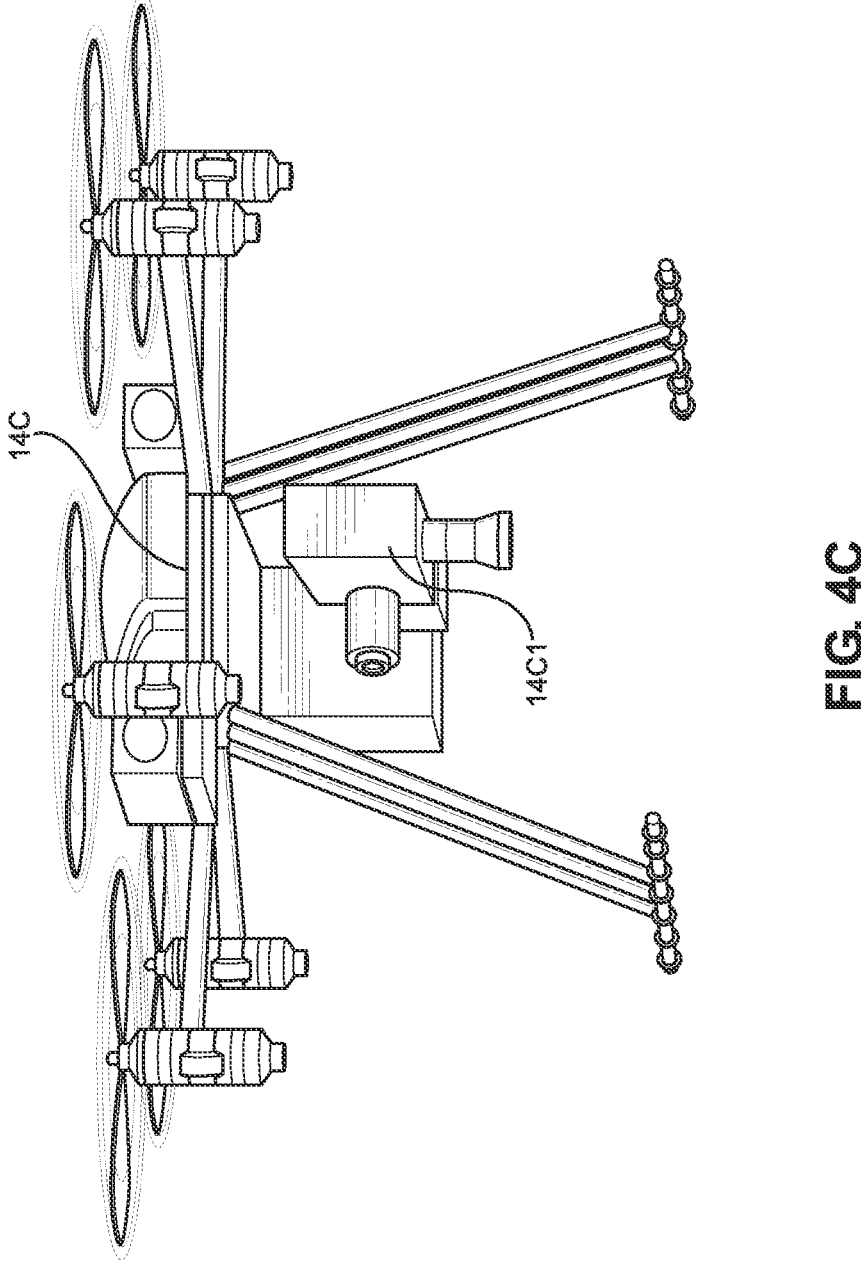
FIG. 4C is a perspective view of the OnyxStar Hyra-12 heavy lifter drone supporting MSI and HSI camera systems, and providing remove data sensing services that can be used to help carry out the GPS-directed methods of wild fire suppression disclosed herein in accordance with the principles of the present invention.

FIGS. 26A and 26B describe the method of suppressing a wild fire raging towards a target region of land 73 (and beyond) in a direction determined by prevailing winds and other environmental and weather factors, as illustrated in FIG. 25. Typically, the system used to practice this method of the present invention will employ a centralized GPS-indexed real-property/land database system 7 shown in FIG. 4 containing GPS-indexed maps of all land regions under management and fire-protection, developed using methods, equipment and services known in the GPS mapping art. Such GPS-indexed maps will contain the GPS coordinates for the vertices of each and every parcel in any given state, county and town in the country in which system is deployed. As shown in FIG. 4A, this central GPS-indexed real property database 7 will be operably connected to the TCP/IP infrastructure 10 of the Internet, and accessible by system network 1 of the present invention.

As indicated at Block A in FIG. 26A, prior to the wild fire reaching the specified target region of land, a GPS-tracked AF spray vehicle 50 as shown for example in FIG. 11A applies a low-density anti-fire (AF) liquid mist 80 in advance of the wild fire so as to form a fire stall region 76 while providing a non-treated region 77 of sufficient size between the front of the wild fire approaching the target region of land 73 and the fire stall region 76. The fire stall region 76 is formed by a first GPS-guided aircraft system flying over the fire stall region during multiple passes and applying the low-density AF chemical liquid mist 80 over the fire stall region 76. The non-treated region 77 is defined by a first set of GPS coordinates $\{GPS_1(x,y)\}$ and, the fire stall region 76 is defined by a second set of GPS coordinates $\{GPS_2(x,y)\}$. Each of these regions are mapped out using global positioning system (GPS) methods, the GPS-indexed land database system 7, drone-type aircraft systems 40 as shown in FIG. 10A, and space-based land-imaging satellites 14 having multi-spectral imaging capabilities, and operably connected to the infrastructure of the Internet. When used alone and/or together, these systems are capable of capturing real-time intelligence on the location and spread of a particular wild fire, its direction of propagation, intensity and other attributes. This captured data is provided to application servers in the data center 8 which, in turn, generate GPS coordinates determining the planned pathways of the GPS-traced AF chemical liquid spraying/misting aircraft systems, to provide the anti-fire protection over the GPS-indexed fire stall region 76 and GPS-specified non-treated region 75, as described in greater detail below.

As indicated at Block B in FIG. 26A, a second GPS-tracked AF spray vehicle 50 as shown in FIG. 11A, or other suitable spraying vehicle deployed on the system network, applies a high-density anti-fire (AF) liquid spray 81 over the land in advance of the wild fire to form a GPS-specified fire break region 74 beyond and contiguous with the GPS-specified fire stall region 76. The fire break region 74 is formed by the second GPS-guided aircraft flying over the fire break region 74 during multiple passes and applying the high-density AF chemical liquid spray 81 over the fire break region 74. The fire break region 74 is defined by a third set of GPS coordinates $\{GPS_3(x,y)\}$ mapped out using global positioning system (GPS) methods, the GPS-indexed land database system 7, drone-type aircraft systems as shown in FIG. 8A, and/or space-based land-imaging satellites 14 having multi-spectral imaging capabilities, and operably connected to the infrastructure of the Internet. When used alone and/or together, these systems are capable of capturing real-time intelligence on the location and spread of a particular wild fire, its direction of propagation, intensity and other attributes. This captured data is provided to application servers in the data center 8 which, in turn, generate GPS coordinates determining the planned pathways of the GPS-traced AF chemical liquid spraying/misting aircraft systems, to provide the anti-fire protection over GPS-specified fire break region 74, as described in greater detail below.

As indicated at Block C in FIG. 26B, the fire stall region 76 is formed before the wild fire 75 reaches the fire stall region 76, and operates to reduce the free-radical chemical reactions raging in the wild fire so as to reduce the destructive energy of the wild fire by the time the wild fire 75 reaches the fire break region 74, and enabling the fire break region 74 to operate and significantly break the free radical chemical reactions in the wild fire 75 when the wild fire reaches the fire break region 74, and thereby suppress the wild fire 75 and protect the target region of land 73 and beyond.

Figure 27:
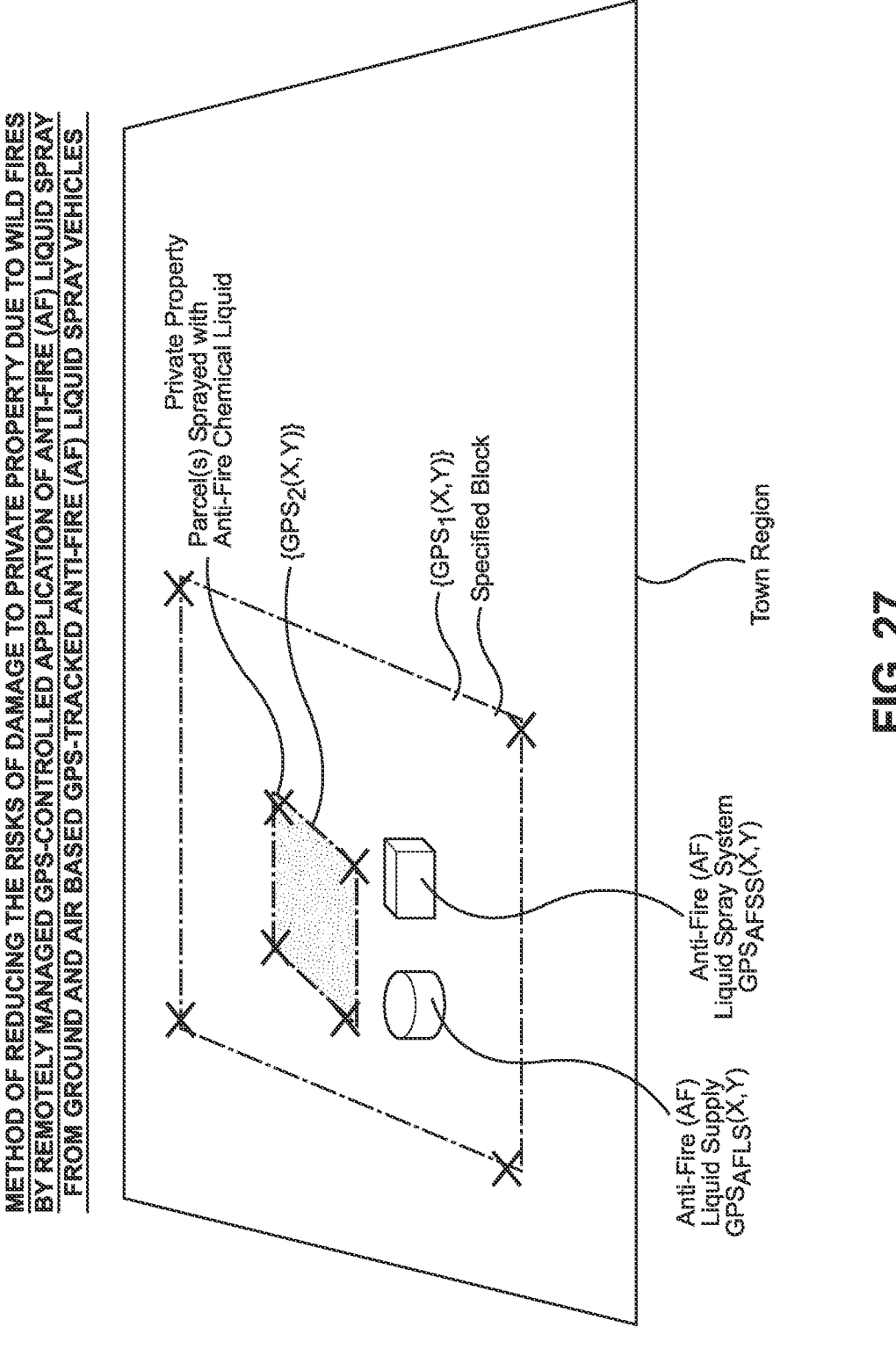
FIG. 27 is a graphical representation illustrating a method of reducing the risks of damage to private property due to wild fires by GPS-controlled application of anti-fire biochemical liquid spray, using the system network of the present invention.

Specification of a Method of Reducing the Risks of Damage to Private Property Due to Wild Fires by Managed Application of Anti-Fire (AF) Liquid Spray FIG. 27 illustrates a method of reducing the risks of damage to private property due to wild fires by managed application of anti-fire (AF) liquid spray. FIGS. 28A, 28B and 28C illustrates a method of reducing the risks of damage to private property due to wild fires by managed application of anti-fire (AF) liquid spray. Typically, this method is carried out using the system network of FIG. 4A and any one or more of the GPS-tracked anti-fire (AF) liquid spray vehicle systems 14A through 14D represented in FIG. 4A and illustrated in FIGS. 8A through 17B.

As indicated at Block A in FIG. 28A, the system registers each GPS-specified parcel of private real property in a specified County and State, which may or may not have buildings constructed thereon, and identifying the owner and tenants, as well as all pets, vehicles and watercrafts associated with the registered parcel of private property. Typically, the system will request the address of the property parcel, and will automatically determine its GPS coordinates that specify the vertices of the parcel using databases, and data processing methods, equipment and services, known in the GPS mapping art.

As indicated at Block B in FIG. 28A, the system collects intelligence relating to the County, risks of wild fires in the surrounding region, and historical data maintained in a network database, and generating GPS-specified anti-fire (AF) spray protection maps and task reports for execution.

As indicated at Block C in FIG. 28A, an AF chemical liquid spraying system is provided to a GPS-specified location for spraying one or more registered parcels of private property with AF chemical liquid spray.

As indicated at Block D in FIG. 28A, a supply of AF chemical liquid spray is provided to the GPS-specified location of the AF chemical liquid spraying system.

As Indicated at Block E in FIG. 28A, the AF Chemical Liquid Spraying System is Provided with the Supply of AF Chemical Liquid, As indicated at Block F in FIG. 28B, based on the GPS-specified anti-fire (AF) spray protection maps and task reports, the system issues orders to the private property owner, or its contractor, to apply AF chemical liquid spray on the private property using the AF chemical liquid spraying system.

As indicated at Block G in FIG. 28B, the private property owner executes the order and applies AF chemical liquid spray on the private property using the AF chemical liquid spraying system, and the system remotely monitors the consumption and application of AF chemical liquid at the private property on a given time and date, and automatically records the transaction in the network database 9C prior to the arrival and presence of wild fire in the region.

As indicated at Block H in FIG. 28B, the system updated the records in the network database associated with each application of AF chemical liquid spray on a GPS-specified parcel of private property.

As indicated at Block I in FIG. 28B, the system scheduled the next application of AF chemical liquid spray on the GPS-specified parcel of private property, factoring weather conditions and the passage of time.

As indicated at Block J in FIG. 28B, the system issues another order to the GPS-specified parcel of private property to re-apply AF chemical liquid spray on the private property to maintain active wild fire protection.

As indicated at Block K in FIG. 28C, the property owner executes (i.e. carries out) the order to reapply AF chemical liquid spray on the parcel of private property using the AF chemical liquid spraying system, and the system remotely monitors the application of AF chemical liquid at the private property on a given time and date, and records this transaction in the network database 9C.

As indicated at Block L in FIG. 28C, the system updates records on AF chemical liquid spray application in the network database 9C associated with reapplication of AF chemical liquid on the parcel of private property.

As indicated at Block M in FIG. 28C, the system schedules the next application of AF chemical liquid spray on the parcel of private property, factoring weather conditions and the passage of time.

Specification Of A Method Of Reducing The Risks Of Damage To Public Property Due To Wild Fires, By Managed Spray Application Of Fire Inhibiting Biochemical Liquid To Ground Cover And Building Surfaces Prior To The Arrival Of Wild Fires FIG. 29 illustrates a method of reducing the risks of damage to public property due to wild fires, by managed spray application of AF chemical liquid to ground cover and building surfaces prior to the arrival of wild fires. FIGS. 23A, 23B and 23C illustrate a method of reducing the risks of damage to public property due to wild fires by managed application of anti-fire (AF) liquid spray. Typically, this method is carried out using the system network of FIG. 4A and any one or more of the GPS-tracked anti-fire (AF) liquid spray vehicle systems 14A through 14D represented in FIG. 4A and shown in FIGS. 8A through 17B.

As indicated at Block A in FIG. 30A, each GPS-specified parcel of public real property in a specified County and State is registered with the system. Such parcels of property may or may not have buildings constructed thereon. As part of registration with the system network 1, supported by the network database 9C, it is necessary to identify the owner and tenants, as well as all pets, vehicles and watercrafts associated with the registered parcel of public property. Typically, the system will request the address of the property parcel, and will automatically determine its GPS coordinates that specify the vertices of the parcel using databases, and data processing methods, equipment and services, known in the GPS mapping art.

As indicated at Block B in FIG. 30A, the system collects various kinds of intelligence relating to the County, risks of wild fires in the surrounding region, and historical weather and related data maintained in a network database 9C, and generates GPS-specified anti-fire (AF) spray protection maps and task reports for review and execution, along with GPS-specified spray plans (e.g. flight plans) for GPS-tracked anti-fire (AF) liquid spray vehicle systems 30 and 60, and GPS-specified spray plans.

As indicated at Block C in FIG. 30A an AF chemical liquid spraying system is provided to a GPS-specified location for spraying one or more registered parcels of public property with AF chemical liquid spray.

As indicated at Block D in FIG. 30A, a supply of AF chemical liquid spray is provided to the registered location of the AF chemical liquid spraying system.

As indicated at Block E in FIG. 30A, the AF chemical liquid spraying system is filled with the provided supply of AF chemical liquid.

As indicated at Block F in FIG. 30, based on the anti-fire (AF) spray protection maps and task reports, the system issues orders to the public property owner, or its contractor, to apply AF chemical liquid spray on the public property using the AF chemical liquid spraying system 60.

As indicated at Block G in FIG. 30B, the public property owner executes the order and applies AF chemical liquid spray on the public property using the AF chemical liquid spraying system, and the system remotely monitors the consumption and application of AF chemical liquid at the public property on a given time and date, and automatically records the transaction in the network database prior to the presence of wild fire in the region.

As indicated at Block H in FIG. 30B, the system updates records in the network database 9C associated with each application of AF chemical liquid spray on a GPS-specified parcel of public property.

As indicated at Block I in FIG. 30B, the system schedules the next application of AF chemical liquid spray on the GPS-specified parcel of public property, factoring weather conditions and the passage of time.

As indicated at Block J in FIG. 30B, the system issues another order to the GPS-specified parcels of public property to re-apply AF chemical liquid spray on the public property to maintain active fire protection.

As indicated at Block K in FIG. 30C, the property owner executes the order to reapply AF chemical liquid spray on the GPS-specified parcels of public property using the AF chemical liquid spraying system, and the system remotely monitors the application of AF chemical liquid at the public property on a given time and date, and records this transaction in the network database 9C.

As indicated at Block L in FIG. 30C, the system updates records on AF chemical liquid spray application in the network database 9C associated with reapplication of AF chemical liquid on the GPS-specified parcels of public property.

As indicated at Block M in FIG. 30C, the system schedules the next application of AF chemical liquid spray on the GPS-specified parcels of public property, factoring weather conditions and the passage of time.

Specification Of A Method Of Remotely Managing The Application Of Anti-Fire (AF) Liquid Spray To Ground Cover And Buildings So As To Reduce The Risks Of Damage Due To Wild Fires FIG. 31 is a graphical illustration showing a method of remotely managing the application of anti-fire (AF) liquid spray to ground cover and buildings so as to reduce the risks of damage due to wild fires. FIGS. 32A and 32B describes the high level steps carried out by the method in FIG. 24 to reduce the risks of damage due to wild fires. Typically, this method is carried out using the system network of FIG. 4A and any one or more of the GPS-tracked anti-fire (AF) biochemical liquid spray vehicle systems 14A-14D represented in FIG. 4A and shown in FIGS. 8A, through 17B.

As indicated at Block A in FIG. 32A, the system registers each GPS-specified parcel of real property in a specified County and State, which may or may not have buildings constructed thereon, and identifying the owner and tenants, as well as all pets, vehicles and water crafts associated with the registered parcel of real property. Typically, the system will request the address of the property parcel, and will automatically determine (or estimate) its GPS coordinates that specify the vertices of the parcels using databases, and data processing methods, equipment and services, known in the GPS mapping art. The GPS address of each parcel will be stored in the centralized GPS-indexed land database system 7 shown in FIG. 4

As indicated at Block B in FIG. 32A, the system collects intelligence relating to the County, risks of wild fires in the surrounding region, and historical data maintained in a network database, and generates GPS-specified anti-fire (AF) spray protection maps and task reports for execution.

As indicated at Block C in FIG. 32A, an AF chemical liquid spraying system is provided to a GPS-specified location for spraying the GPS-specified parcels of real property with AF chemical liquid spray.

As indicated at Block D in FIG. 32A, a supply of AF chemical liquid spray is provided to the GPS-specified location of the AF chemical liquid spraying system.

As indicated at Block E in FIG. 32A, the AF chemical liquid spraying system is filled with the provided supply of AF chemical liquid.

As indicated at Block F in FIG. 32B, prior to the arrival of a wild fire to the region, and based on the anti-fire (AF) spray protection maps generated by the system, the system issues a request to property owners, or their registered contractors, to apply AF chemical liquid spray on GPS-specified properties using deployed AF chemical liquid spraying systems.

As indicated at Block G in FIG. 32B, in response to the issued request, the property owner or contractor thereof applies AF chemical liquid spray on the real property using the AF chemical liquid spraying system, and the system remotely monitors the consumption and application of the AF biochemical liquid on the property on a given date, and automatically records the transaction in the network database.

As indicated at Block H in FIG. 32B, the system updates records in the network database associated with each application of AF chemical liquid spray on one or more GPS-specified parcels of real property.

In the illustrative embodiment, the fire inhibiting biochemical liquid of the present invention is used when practicing the present invention. A liquid dye of a preferred color can be added to biochemical liquid to help visually track where AF chemical liquid has been sprayed during the method of wild fire suppression. However, in some applications, it may be desired to maintain the AF biochemical liquid in a clear state, and not employ a colorant.

Figure 33A:
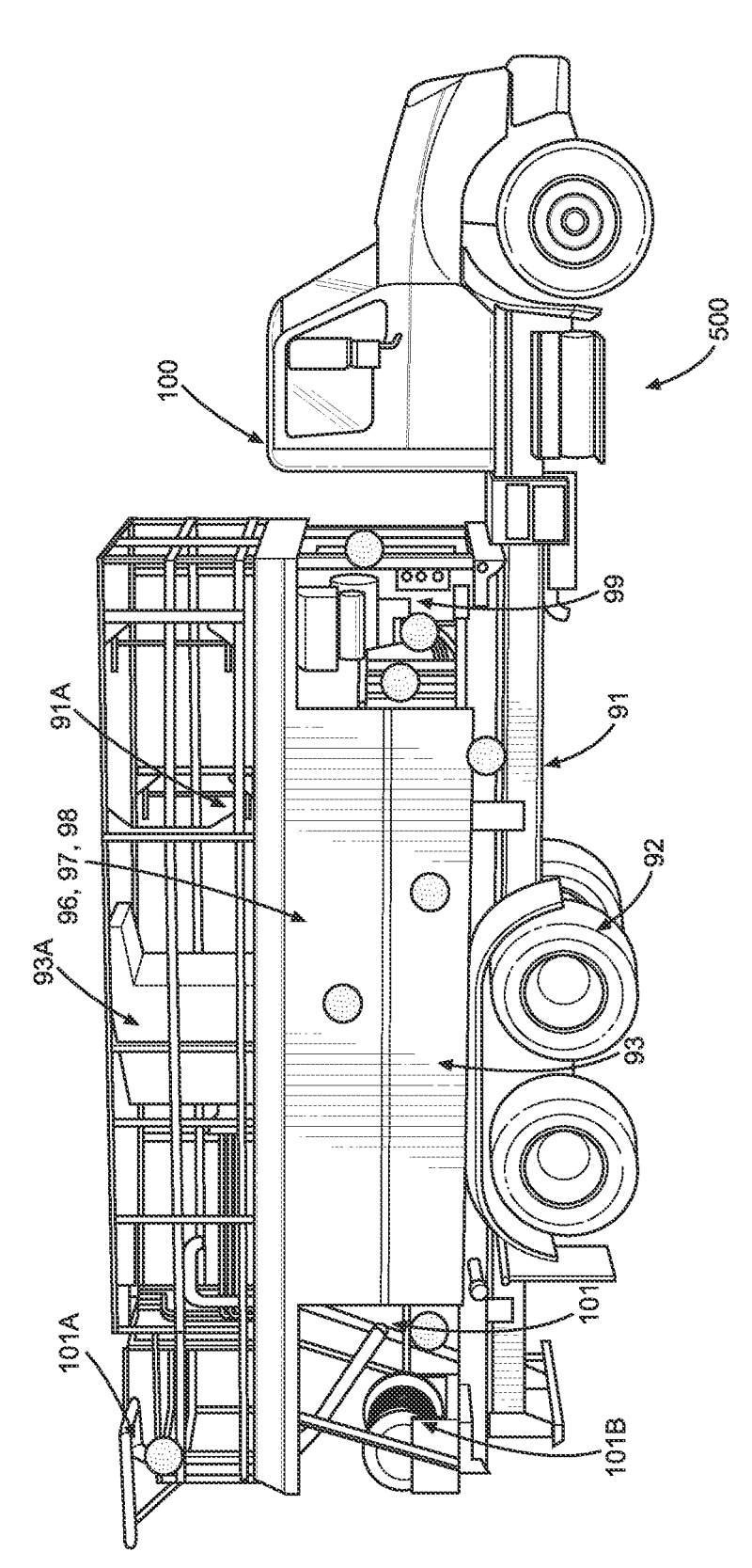
FIG. 33A is a perspective view of the clean fire and smoke inhibiting slurry spray application vehicle of the present invention carrying a high-capacity (e.g. 3000 gallon) stainless steel mixing tank with an integrated agitator mechanism (e.g. motor driven mixing paddles) for mixing the fire and smoke inhibiting slurry spray mixture of the present invention, and a hydraulic pumping apparatus and spray nozzle for spraying the clean aqueous-based clean fire and smoke inhibiting slurry of the present invention, on ground surfaces to create clean biochemical fire breaks around regions to be protected from wildfires, and also to cover smoldering ambers and ash after the present of wildfires to reduce toxic waste water runoff and smoke production.
Figures 33B, 33C:
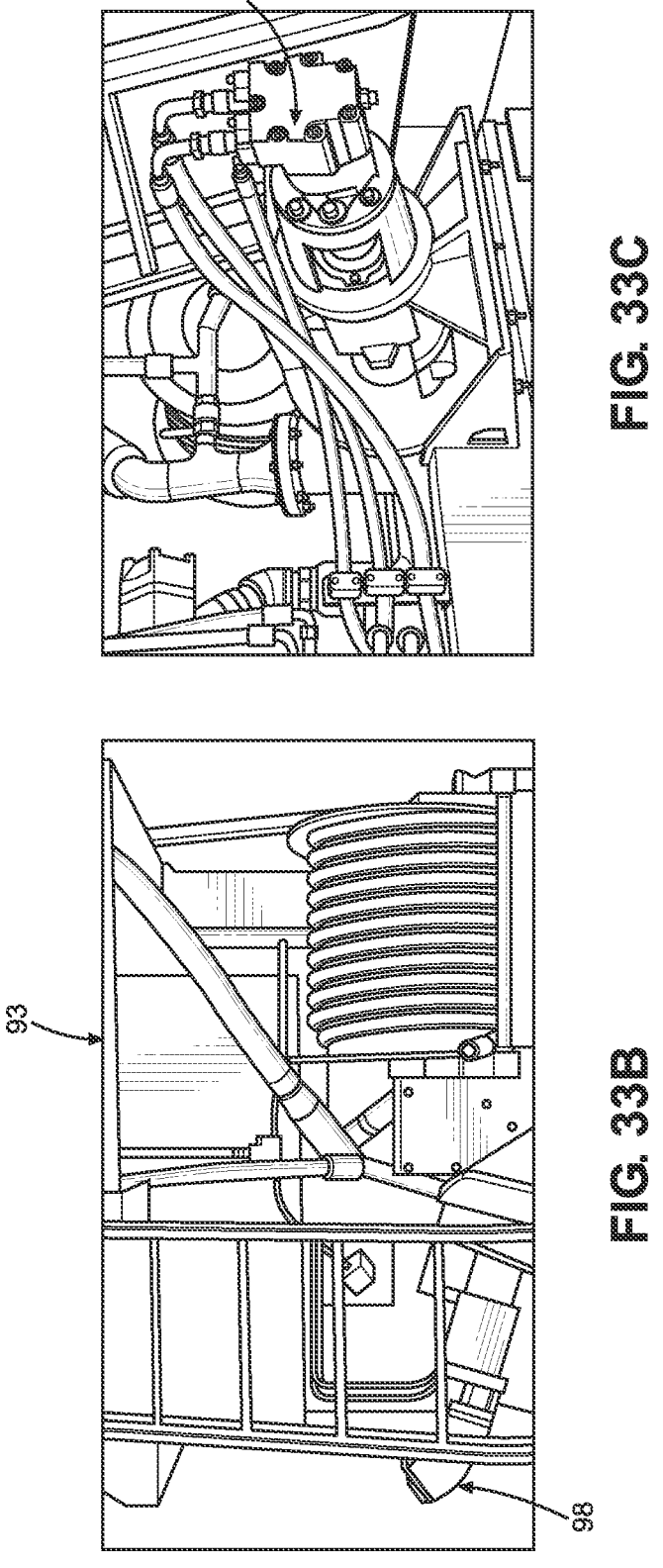
FIG. 33B is a rear view of the vehicle shown in in FIG. 33A.
FIG. 33C is a side view of the vehicle shown in FIG. 33A.
Figure 40:
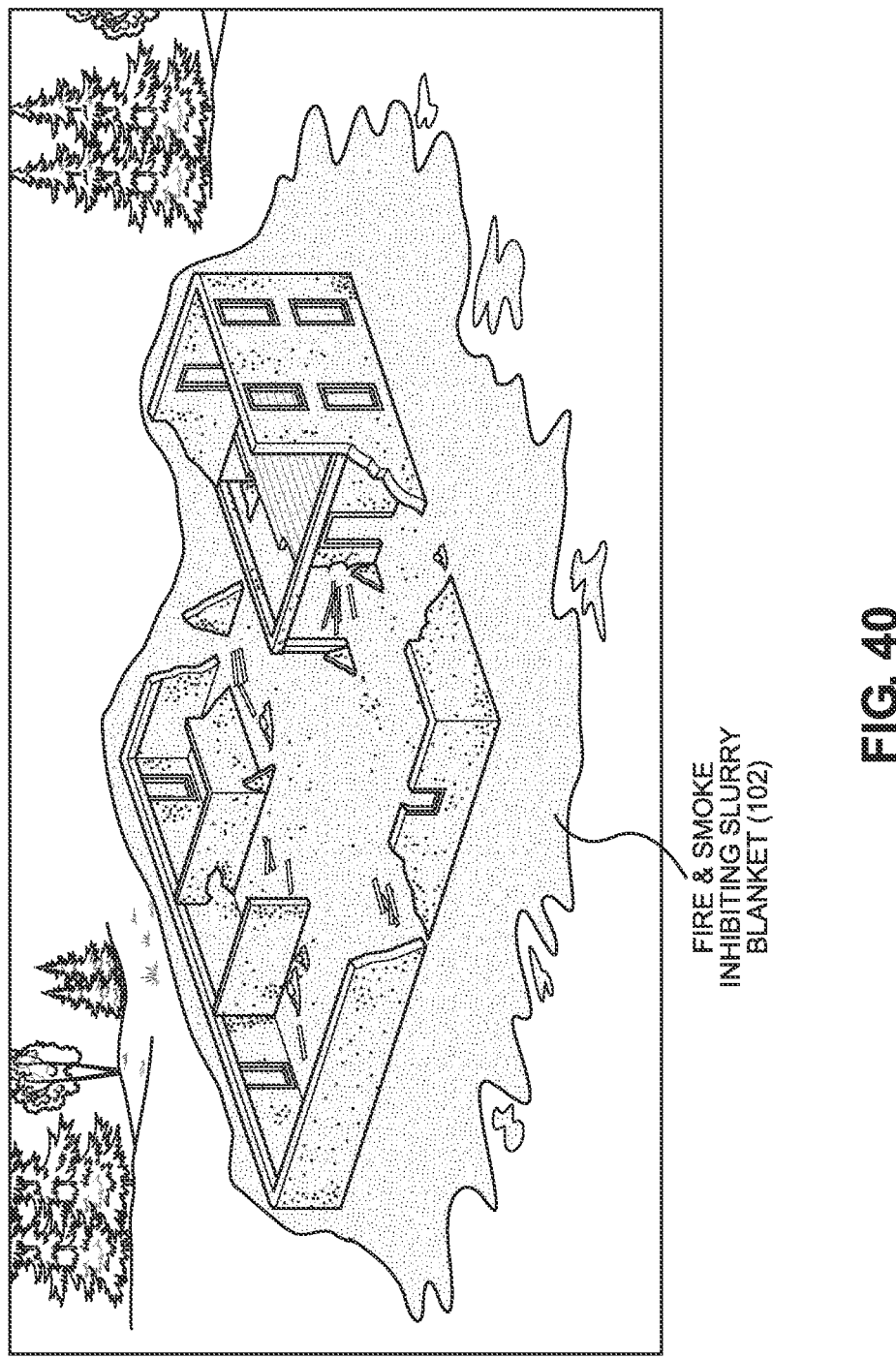
FIG. 40 is a schematic representation of a wood-framed or mass timber building that just burned to the ground after a wildfire passed through an unprotected neighborhood, wherein the clean fire and smoke inhibiting slurry composition is hydraulically sprayed over the glowing ambers and fire ash to suppress and prevent reignition of the fire, and reduce the production of smoke and creation of toxic water runoff during post fire management operations.
Figure 41:
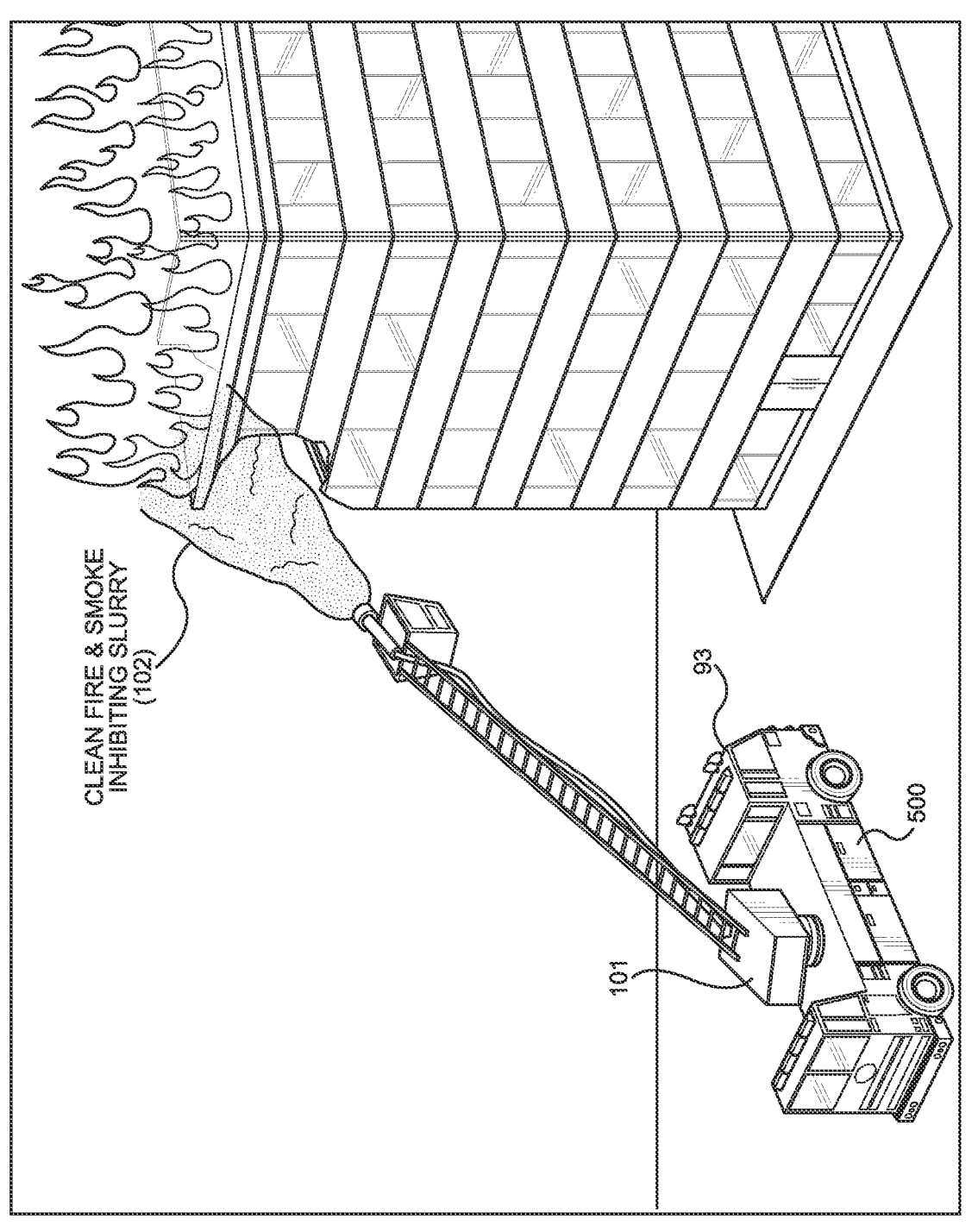
FIG. 41 is a schematic representation of a wood-framed or mass timber building that is burning due to a fire within the building, wherein the wet fire and smoke inhibiting slurry composition of the present invention is hydraulically sprayed on and over the fire to suppress it, while reducing the production of smoke during the fire suppression process.

Method of and Apparatus for Applying Fire and Smoke Inhibiting Slurry Compositions on Ground Surfaces Before the Incidence of Wild-Fires, and Also Thereafter, Upon Smoldering Ambers and Ashes to Reduce Smoke and Suppress Fire Re-Ignition FIGS. 33A, 33B and 33C show the clean fire and smoke inhibiting slurry spray application vehicle 500 carrying a high-capacity (e.g. 3000 gallon) stainless steel mixing tank 93 with an integrated agitator mechanism (e.g. motor driven mixing paddles) 94, and a hydraulic pumping apparatus and spray nozzle 101 for mixing and spraying the environmentally-clean aqueous-based clean fire and smoke inhibiting slurry 102 (i) on ground surfaces to create CFIC-based fire breaks (105) around regions to be protected from wildfires as illustrated in FIGS. 30 and 31, (ii) to cover smoldering ambers and ash after the present of wildfires to reduce toxic waste water runoff and smoke production as shown in FIG. 40, and (iii) on burning fires destroying buildings as well as outdoor combustion material as shown in FIG. 41.

Figure 34:
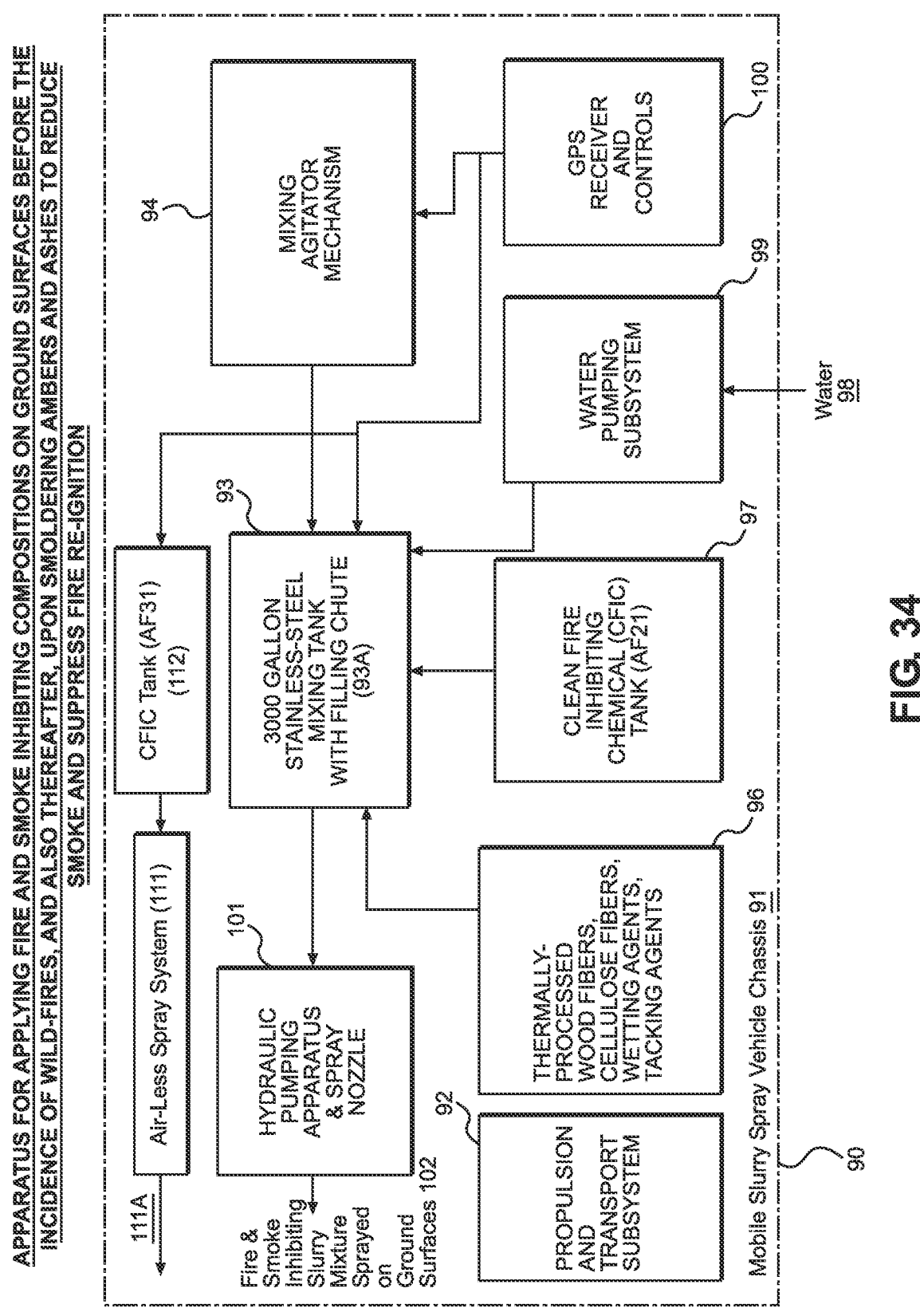
FIG. 34 is a schematic system block diagram of the fire and smoke inhibiting slurry spray vehicle system shown in FIGS. 33A, 33B and 33C.

FIG. 34 shows the clan fire and smoke inhibiting slurry spray application vehicle 500 comprising: a mobile slurry mixing and spray vehicle chassis 91 having a propulsion and transport subsystem 92, with a vehicle chassis supporting a high-capacity (e.g. 3000 gallon) stainless steel mixing tank 93, with an integrated agitator mechanism (e.g. motor driven mixing paddles) 94, and having a filling chute 93A through which slurry ingredients (e.g. thermally processed wood fibers, cellulose fibers, wetting agents, tacking agents 96, and a supply of clean fire inhibiting biochemical liquid 97 of the present invention as taught herein; a water pumping subsystem 99 for pumping water 98 from an external source into the mixing tank 93 to blend with the chemicals and fiber material 96 and CFIC material 97, and produce an environmentally-clean fire and smoke inhibiting mixture 102; a hydraulic pumping apparatus and spray nozzle 101, for mixing and spraying the clean aqueous-based clean fire and smoke inhibiting slurry mixture 102 (i) on ground surfaces to create CFIC-based fire breaks around regions to be protected from wildfires, (ii) over smoldering ambers and ash after the present of wildfires to reduce toxic waste water runoff and smoke production, and (iii) on active burning fires in buildings and/or burning land and brush. As shown, the vehicle system 500 includes A GPS receiver and controls 100 for controlling apparatus specified by 91, 92, 93, 94, 98, and 101.

The system 500 also includes a second CFIC liquid tank 112 for storing a secondary CFIC liquid 113, and supplying an air-less spray system 111 for spraying CFIC liquid 113 using a spray nozzle applicator 111A. The spray applicator 112 can be mounted on the vehicle 90, alongside or in tandem with primary slurry spray nozzle 101A, or it can be via connected to a reel of hose for application of CFIC liquid 113 to the surface of the slurry coating 102 after it has been applied to the ground surface. Preferably, biochemical liquid spray 113 will be provided with a colored dye to assist in spray application over the fire and smoke inhibiting slurry 102. By providing a vehicle 90 with two tanks, one tank 93 containing the slurry mixture 102, and the other tank 112 containing a CFIC liquid 113, the system 90 has an added capacity to suppress fire and smoke created by wildfires, and other sources of fire.

FIG. 35 describes the method of applying fire and smoke inhibiting slurry compositions of the present invention on ground surfaces before the incidence of wild-fires, and also thereafter, upon smoldering ambers and ashes to reduce smoke and suppress fire re-ignition.

As indicated at Block A in FIG. 35, the first of the method involves measuring and staking out area using GPS coordinates to ensure proper application rates.

As indicated at Block B in FIG. 35, the processed wood fibers, cellulose fiber, wetting agents, tackling agents 96, and clean fire inhibiting biochemicals (CFIC) 97 are blended with a supply of water 98 to make up a fire and smoke inhibiting slurry composition 102.

In the illustrative embodiment, the processed wood fibers, cellulose fiber, wetting agents, tackling agents 96 can be provided in a number of different ways and formulations. For example, one can use Hydro-Blanket® Bonded Fiber Matrix(BFM) from Profile Products, which combines Profile Product's Thermally Refined® wood fiber and multi-dimensional pacifiers for greater water-holding capacity. This BFM anchors intimately to the soil through proprietary cross-linked, hydro-colloidal pacifiers and activators and is completely biodegradable and non-toxic. When Hydro-Blanket® Bonded Fiber Matrix is blended and mixed with CFIC 97, and water 98, the slurry compositing 102 sprays on as mulch, but dries to form a breathable blanket that bonds more completely with the soil. Thermally Refined® wood fiber starts with 100% recycled wood chips which are thermally processes to create fine, long and highly absorbent fibers, engineered fibers are the source for Profile's superior: yield and coverage; water-holding capacity; growth establishment; wet-bond strength; and erosion control performance. Profile Products offers other brands of wood, cellulose, wood-cellulose blended hydraulically-applied mulches which are preblended with one or more performance enhancing additions.

Because paper does not hold as much moisture, and does not prevent erosion nearly as well as thermally refined wood fiber mulch, many states and provinces have prohibited the use of paper mulch. Large-scale independent testing has shown that paper mulch is only 25% effective at preventing erosion, whereas wood fiber mulch with no performance enhancing additives is 45% effective at preventing erosion. ASTM standard testing methods also indicate that wood fiber mulches are superior to paper at promoting vegetation establishment. In addition, where steeper or longer slopes exist, and where greater erosion protection is required (greater than 50% effective), there are advanced technologies, beyond basic paper and wood fiber mulches, that are indicated to ensure erosion prevention and vegetation establishment.

Examples of preblended mulch materials from Profile Products which may be used to practice the manufacture of the fire and smoke inhibiting slurry mixtures of the present invention 102, include the following wood-based and paper-based mulches described below. The Base Hydraulic Mulch Loading Chart shown in FIG. 36 can be used to estimate how much Profile(R) brand mulch fiber products (e.g. packaged in 50 lb. bales) will be required to make a fire and smoke inhibiting slurry 102 of the present invention for use on particular incline ground surfaces, of particular slope lengths, over particular surface areas (e.g. in acres). The Hydraulic Loading Chart shown in FIG. 36 for Profile(R) mulch fiber products provides the required hydraulic loading for specified application rates required by specific Profile(R) brand mulch fiber materials used on particular slopes, and provided for three specific application rates, namely 1500 lb./acre, 2000 lb./acre, and 2500 lb./acre.

Wood Fiber Mulch

Materials: 100% wood fiber, made from thermally processed (within a pressurized vessel) wood fiber heated to a temperature greater than 380 degrees Fahrenheit (193 degrees Celsius) for 15 minutes at a pressure greater than 80 psi (552 kPa) and dark green marker dye.

Moisture Content: 12% +/−3%

Water-Holding Capacity: 1,100% minimum

Approved Large-Scale Erosion Control Effectiveness: 45% minimum.

When comparing the four base paper and wood mulches listed below, the key items to note are the differences in the maximum slope inclinations, slope lengths and the erosion prevention capabilities.

Cellulose (Paper) Fiber Mulch

Maximum slope inclination: 4:1

Appl. rate on maximum slope: 1,500-2,000 pounds/acre

Maximum slope length*: 18 feet

Functional longevity: up to 3 months

Erosion control effectiveness: 25%

Cellulose (Paper) Fiber Mulch with Tackifier

Maximum slope inclination: 4:1

Appl. rate on maximum slope: 1,500-2,000 pounds/acre

Maximum slope length*: 20 feet

Functional longevity: up to 3 months

Erosion control effectiveness: 30%

Wood Fiber Mulch

Maximum slope inclination: 2:1

Appl. rate on maximum slope: 3,000 pounds/acre

Maximum slope length*: 28 feet

Functional longevity: up to 3 months

Erosion control effectiveness: 45%

Wood Fiber Mulch with Tackifier

Maximum slope inclination: 2:1

Appl. rate on maximum slope: 3,000 pounds/acre

Maximum slope length*: 30 feet

Functional longevity: up to 3 months

Erosion control effectiveness: 50%

*Maximum slope length is based on a 4H:1V slope. For applications on steeper slopes, the maximum slope length may need to be reduced based on actual site conditions.

If greater than 50% erosion prevention effectiveness is desired, then the technologies should be specified and not the four base mulch products listed above.

Stabilized Mulch Matrix (SMM)

Maximum slope inclination: 2:1

Appl. rate on maximum slope: 3,500 pounds/acre

Maximum slope length**: 50 feet

Minimum cure time: 24 hours

Functional longevity: 3 to 6 months

Erosion control effectiveness: 90%

Bonded Fiber Matrix (BFM)

Maximum slope inclination: 1:1

Appl. rate on maximum slope: 4,000 pounds/acre

Maximum slope length**: 75 feet

Minimum cure time: 24 hours

Functional longevity: 6 to 12 months

Erosion control effectiveness: 95%

Engineered Fiber Matrix™ (EFM)

Maximum slope inclination: >2:1

Appl. rate on maximum slope: 3,500 pounds/acre

Maximum slope length**: 50 feet

Minimum cure time: 24-48 hours

Functional longevity: Up to 12 months

Erosion control effectiveness: >95%

High Performance-Flexible Growth Medium™ (HP-FGM™)

Maximum slope inclination: >1:1

Appl. rate on maximum slope: 4,500 pounds/acre

Maximum slope length**: 100 feet

Minimum cure time: 2 hours*

Functional longevity: 12 to 18 months

Erosion control effectiveness: 99.9%

Extended-Term Flexible Growth Medium (ET-FGM)

Maximum slope inclination: >1:1

Appl. rate on maximum slope: 4,500 pounds/acre

Maximum slope length**: 125 feet

Minimum cure time: 2 hours*

Functional longevity: 18 to 24 months

Erosion control effectiveness: 99.95%

Profile Product's HP-FGM and ET-FGM mulches have very short cure times, and therefore, fire and smoke inhibiting slurry mixtures, employing these mulches, can be applied onto wet soils and during a light rainfall. Maximum slope length is based on a 3H:1V slope. For applications on steeper slopes, the maximum slope length may need to be reduced based on actual site conditions.

In applications where the fire and smoke inhibiting slurry 102 is applied onto smoldering ashes and ambers of houses destroyed by wildfires, there slope will be generally zero. However, alongside roads and embankments, where wildfires may travel, following specified application rates for specified ground slopes should be followed for optimal performance and results.

In the illustrative embodiments, the CFIC liquid component 97, added to the fire and smoke inhibiting slurry mixture 102, will be realized using biochemical clean anti-fire inhibiting biochemical liquid compositions specified in FIGS. 6A1 through 6C2, and described in detail above.

When blending the fire inhibiting biochemical liquid composition 97 with Profile's hydraulic mulch fiber products in the mixing tank 93, the following mixture ratio should be used for biochemical liquid 97: about 1 gallon of biochemical liquid composition per 10 gallons of water added to the mixing tank 93 during the blending and mixing of the fire and smoke inhibiting slurry 102. So, as shown in FIG. 30, when mixing 2800 gallons of water to 1450 lbs. of mulch fiber (29×50 lb Profile® mulch fiber bales) to make a batch of fire and smoke inhibiting slurry 102, at least 280 gallons of biochemical liquid 97 will be added to the mixing tank 93 and mixed well with the 2800 gallons water and 1450 lbs. of mulch fiber, preferably from Profile Products, LLC of Buffalo Grove, Illinois, when using the 1500 lb./acre application rate.

However, additional amounts of biochemical liquid 97 can be added to the 2800 gallons of water so as to increase the amount of fire inhibiting biochemical liquid that infuses into the surface of the mulch fibers when being mixed within the mixing tank 93 during the blending and mixing steps of the process. Notably, a large percentage of the water in the mixing tank 93 will function as a hydraulic carrier fluid when spraying biochemical liquid infused mulch fibers in the slurry mixture to the ground surface being coated during spray applications, and thereafter, this water will quickly dry off when curing under the hot Sun, leaving behind infused fire inhibiting biochemicals (e.g. potassium citrate salt crystal structures) embodied within the mulch fibers to provide during proactive fire protection.

As indicated at Block C in FIG. 35, the blended fire and smoke inhibiting slurry mixture is mixed in the mixing tank 93 on the mobile vehicle 500 supporting hydraulic spray equipment 101.

As indicated at Block D in FIG. 35, the mixed fire and smoke inhibiting slurry mixture 102 is then hydraulically sprayed on the specific ground surface using hydraulic spray equipment 101 supported on the mobile spray vehicle 500 The slurry spray process can be guided by GPS coordinates of the staked out ground surface regions, using GPS receiver and controls 100.

As indicated at Block E in FIG. 35, a secondary biochemical liquid 113 is sprayed over the fire and smoke inhibiting slurry coating 102 after it has been hydraulically sprayed onto the ground. Once the slurry coating 102 has dried, and adheres to the ground surface, it will provide erosion control, as well as fire protection and smoke reduction in the presence of a wildfire in accordance with the scope and spirit of the present invention.

Figure 37:
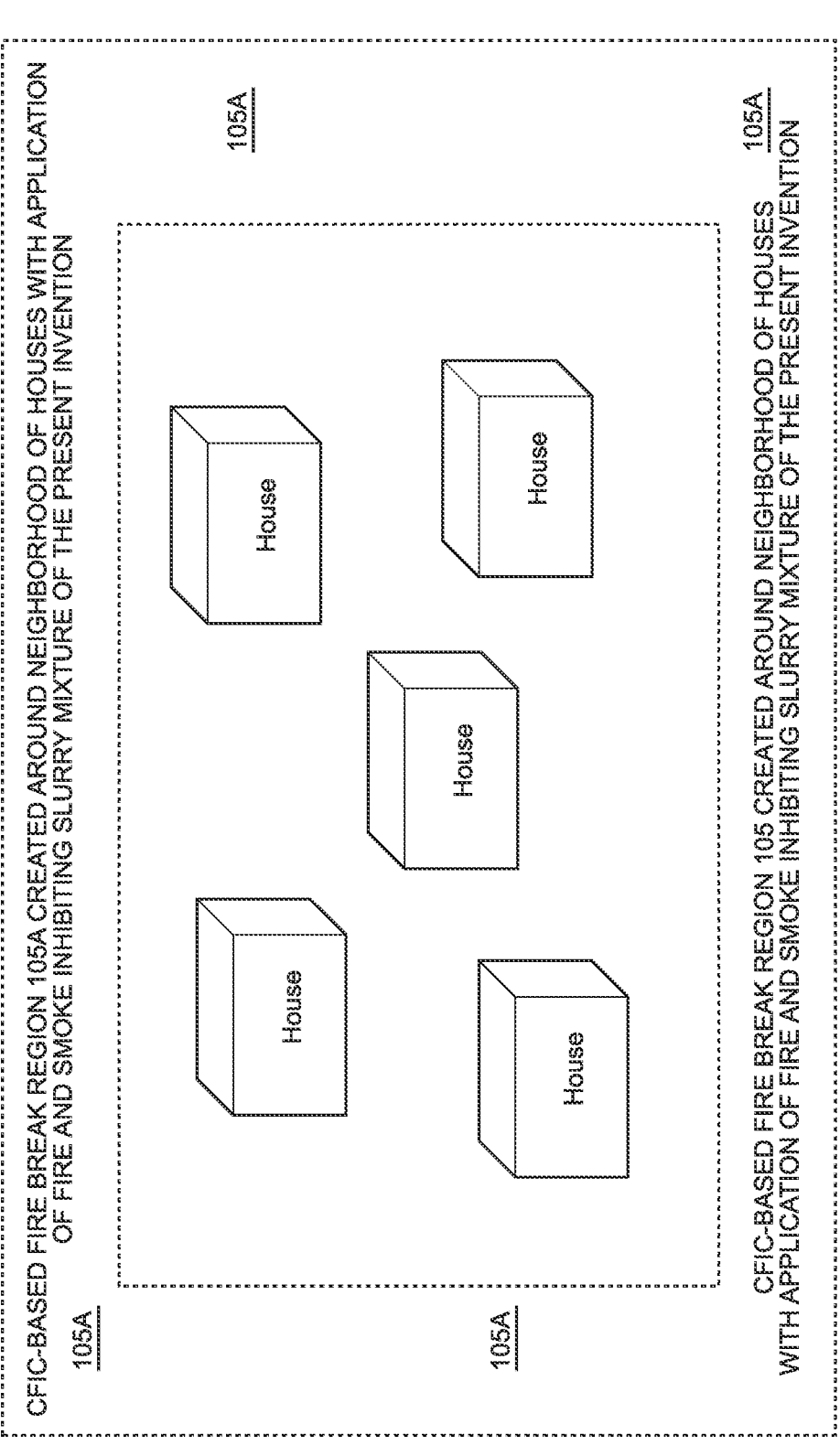
FIG. 37 is a schematic representation of a neighborhood of houses surrounded by a high-risk wildfire region, wherein a clean biochemical wild-fire break region is hydraulically sprayed on the ground surface region all around the houses using the clean fire and smoke inhibiting slurry composition of the present invention.
Figure 39:
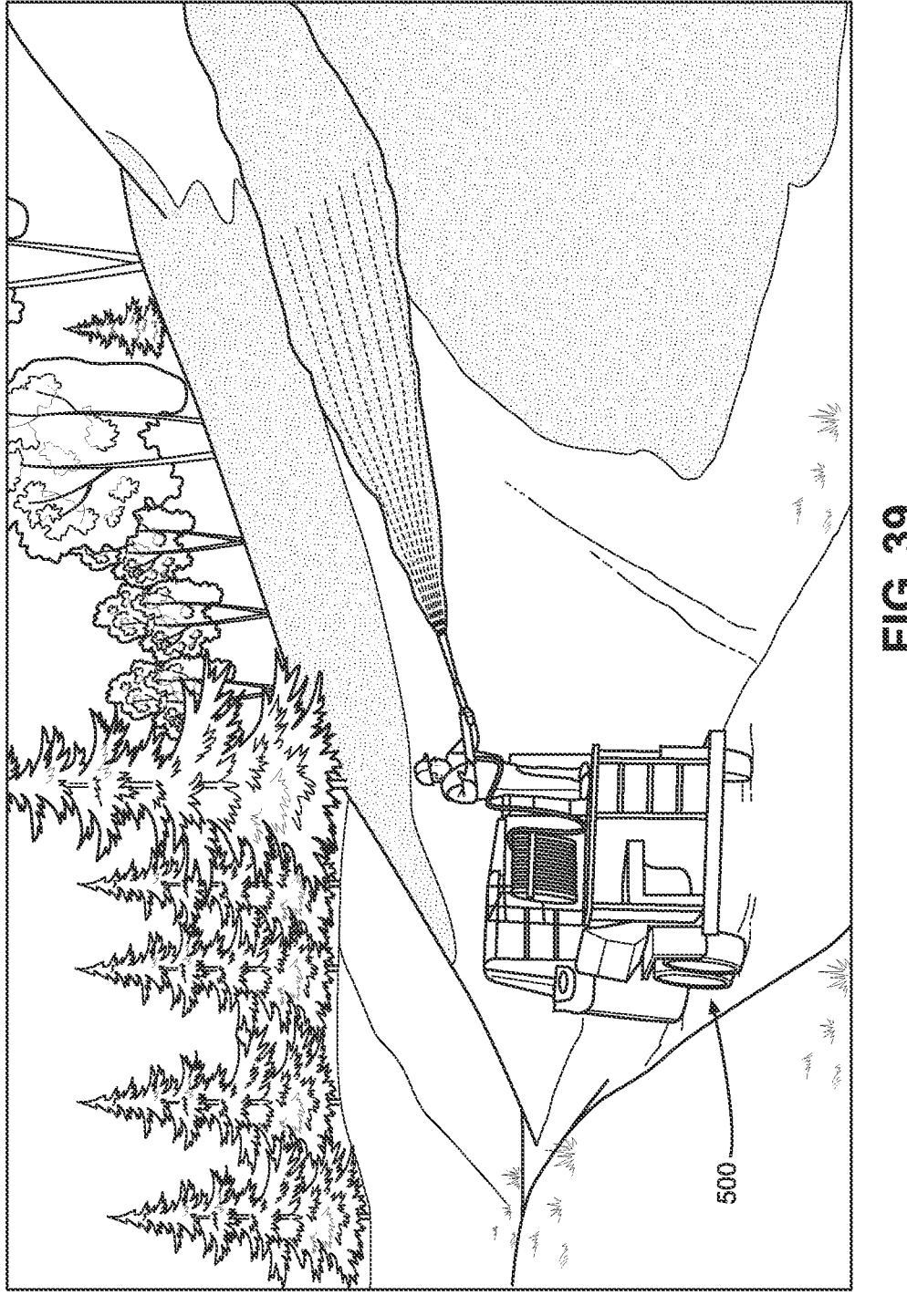
FIG. 39 is a schematic representation of a highway off ramp that has been sprayed with the clean fire and smoke inhibiting slurry composition of the present invention, to provide a safe way to exit a wildfire burning region, while suppressing and preventing reignition of the fire, and reducing the production of smoke and creation of toxic water runoff during post fire management operations.

FIG. 37 shows a neighborhood of houses surrounded by a high-risk wildfire region. As shown, a wild-fire break region 105A is sprayed on the ground surface region all around a neighborhood of houses, using the clean fire and smoke inhibiting slurry composition of the present invention 102 hydraulically sprayed onto the ground surface.

FIG. 38 shows a highway surrounded by high-risk wildfire regions on both sides of the highway. As shown, the wild-fire break regions 105A on both sides of the highway are sprayed using the clean fire and smoke inhibiting slurry composition 102 hydraulically sprayed from the vehicle 500 onto the ground surface. Spray operators can stand on top of the platform above the mixing tank 93 and use the mounted spray gun to coat the ground surface with the wet slurry mixture 102. Fire inhibiting biochemical liquid of the present invention 113 can then be sprayed upon the surface of the slurry coating 102 on the ground, if and as desired by the application at hand. By applying the clean fire and smoke inhibiting slurry composition 102 over a smoldering fire, followed with an biochemical spray coating, this double coating functions like a blanket for chemically breaking the combustion phase of a traveling wildfire and reducing smoke, and the need for water reduced to prevent reignition to neighboring areas.

FIG. 40 shows a house that just burned to the ground after a wildfire passed through an unprotected neighborhood. As shown, the clean fire and smoke inhibiting slurry composition 102 is sprayed over the glowing ambers and fire ash to suppress and prevent re-ignition of the fire, and reduce the production of smoke and creation of toxic water runoff during post fire management operations. Spray operators can stand on top of the platform above the mixing tank 93 and use the mounted spray gun to coat the ground surface with the wet slurry mixture 102. The biochemical liquid 113 can then be sprayed upon the surface of the slurry coating 102 on hot glowing ambers and ashes. By applying the clean fire and smoke inhibiting slurry composition 102 over a smoldering fire, followed with a biochemical spray coating, this double coating functions like a blanket for chemically breaking the combustion phase of a traveling wildfire and reducing smoke and the need for water to prevent reignition to neighboring areas.

FIG. 41 shows a house or building that is burning due to a fire within the building. As shown, the wet fire and smoke inhibiting slurry composition of the present invention 102 is hydraulically sprayed on and over the fire in effort to suppress the fire and reduce the production of smoke. In some applications, this method may be effective in fire and smoke suppression using a minimal amount of water.

Specification of the Automated Wildfire Ember Detection and Suppression System/Module of Present Invention FIG. 42A shows a wildfire ember detection module 604A mounted on the top of each building 300. Each wildfire ember detection module 604A is configured in the wireless wildfire ember detection and notification network 600, for (i) receiving wildfire alerts and messages from neighboring modules 604A, (ii) sensing and processing IR thermal images for automated detection of wildfires and wildfire embers in the field of views (FOVs) of the module, (iii) sending and recording the CO2 levels in the ambient air, (iv) measuring and recording the relative humidity (%) in the ambient air, (v) measuring and recording the temperature of the ambient air, and measuring and recording other parameters relating to the ambient environment which may be helpful in automated detection of wildfires and wildfire ember storms, so the anti-fire misting systems installed on property can be timely triggered to protect the building and property when a wildfire storm rages across the property. The advantage of being part of this network is that each module 4A can scout for wildfires and alert other modules in the network in terms of GPS coordinates so that the specific properties can timely prepare for any such wildfire outbreaks in the vicinity.

Specification of the Wireless GPS-Tracked Wildfire Ember Detection and Notification Network Employing the Wildfire Ember Detection and Suppression Systems of the Present Invention FIG. 42A shows the wireless GPS-tracked Wildfire ember detection and notification network 604 employing with the Wildfire ember detection and suppression systems 4A. Each wireless GPS-tracked wildfire ember detection module 4A, deployed in the wireless Wildfire ember detection and notification network 604 comprises: a fire-protective housing cover 4A1; and various sensors and signal and data processing and storage components 4A2 through 4A19, shown in schematic block diagram of FIG. 42B.

As shown in FIG. 42B, the sensors and signal and data processing and storage components arranged and configured about a microprocessor 4A20 and flash memory (i.e. control subsystem) 4A21 include: one or more passive infra-red (PIR) thermal-imaging sensors 4A2 connected together with suitable IR optics to project IR signal reception field of view (FOV) before the IR receiving array; multiple pyrometric sensors 4A3 for detecting the spectral radiation of burning, organic substances such as wood, natural gas, gasoline and various plastics; a GPS antenna 4A4; a GPS signal receiver 4A5; voltage regulator 4A6; an Xbee antenna 4A7; an Xbee radio transceiver 4A8; a voltage regulator 4A9; an external power connector 4A10; a charge controller 4A11; a battery 4A12; thermistors 4A13; a power switch 4A14; a voltage regulator 4A15; external and internal temperature sensors 4A16; power and status indicator LEDs 4A17; programming ports 4A18; a digital/video camera 4A19; and other environment sensors adapted for collecting and assessing building intelligence, in accordance with the spirit of the present invention. Alternatively, the wildfire detection module 4A and wireless wildfire intelligence network 4 can be realized using the technical disclosure of U.S. Pat. No. 8,907,799, incorporated herein by reference.

In the illustrative embodiment, the wildfire ember detection system 604A supports a computing platform, network-connectivity (i.e. IP Address), and is provided with native application software installed on the system as client application software designed to communicate over the system network and cooperate with application server software running on the application servers of the system network, thereby fully enabling the functions and services supported by the system, as described above. In the illustrative embodiment, a wireless mess network is implemented using conventional IEEE 802.15.4-based networking technologies to interconnect these wireless subsystems into subnetworks and connect these subnetworks to the internet infrastructure of the system of the present invention.

Preferably, the optical bandwidth of the IR sensing arrays 4A2 used in the thermal sensors will be adequate to perform 360 degrees thermal-activity analysis operations, and automated detection of wildfire and wildfire embers. Specifically, thermal sensing in the range of the sensor can be similar to the array sensors installed in forward-looking infrared (FLIR) cameras, as well as those of other thermal imaging cameras, use detection of infrared radiation, typically emitted from a heat source (thermal radiation) such as fire, to create an image assembled for video output and other image processing operations to generate signals for use in early fire detection and elimination system of the present invention.

Pixel processing algorithms known to those skilled in the art will be used to automatically process captured and buffered pixels from different color channels and automatically determine the presence of fire, wildfire and flying embers within the field of view (FOV) of the wildfire ember detection module 604A. Reference can be made to "Automatic Fire Pixel Detection Using Image Processing: A Comparative Analysis of Rule-based and Machine Learning Methods" by Tom Loulouse et al, 2015, University of *Corsica*, France; and "Fast Detection of Deflagrations Using Image Processing" by Thomas Schroeder et al, Helmut Schmidt University, Hamburg, Germany, 2014.

The pyroelectric detectors 4A3 detect the typical spectral radiation of burning, organic substances such as wood, natural gas, gasoline and various plastics. To distinguish a flame from the sun or other intense light source such as light emissions from arc welding, and thus exclude a false alarm, the following independent criteria are considered: a typical flame has a flicker frequency of (1 . . . 5) Hz; a hydrocarbon flame produces the combustion gases carbon monoxide (CO) and carbon dioxide ($CO_2$); and in addition, burning produces water which can also be detected in the infrared range. Each pyroelectric detector 4A3 is an infrared sensitive optoelectronic component specifically used for detecting electromagnetic radiation in a wavelength range from (2 to 14) μm. A receiver chip of a pyroelectric infrared detector consists of single-crystalline lithium tantalite. On the upper electrode of the crystal, an absorbing layer (black layer) is applied. When this layer interacts with infrared radiation, the pyroelectric layer heats up and surface charge arises. If the radiation is switched off, a charge of the opposite polarity originates. However, the charge is very low. Before the finite internal resistance of the crystal can equalize the charges, extremely low-noise and low leakage current field-effect transistors (JFET) or operational amplifier (Pomp) convert the charges into a signal voltage.

In general, most streams of digital intelligence captured by the wireless network 604 will be time and data stamped, as well as GPS-indexed by a local GPS receiver within the sensing module, so that the time and source of origin of each data package is recorded within the system database. The GPS referencing system supporting the system transmits GPS signals from satellites to the Earth's surface, and local GPS receivers located on each networked device or machine on the system network receive the GPS signals and compute locally GPS coordinates indicating the location of the networked device within the GPS referencing system.

When practicing the wireless network of the present invention, any low power wireless networking protocol of sufficient bandwidth can be used. In one illustrative embodiment, a Zigbee® wireless network would be deployed inside the wood-framed or mass timber building under construction, so as to build a wireless internetwork of a set of wireless PIR thermal-imaging fire outbreak detection systems deployed as a wireless subnetwork deployed within the building under construction. While Zigbee® technology, using the IEEE 802.15.1 standard, is illustrated in this schematic drawing, it is understood that any variety of wireless networking protocols including Zigbee®, WIFI and other wireless protocols can be used to practice various aspects of the present invention. Notably, Zigbee® offers low-power, redundancy and low cost which will be preferred in many, but certainly not all applications of the present invention. In connection therewith, it is understood that those skilled in the art will know how to make use of various conventional networking technologies to interconnect the various wireless subsystems and systems of the present invention, with the internet infrastructure employed by the system of the present invention.

The Automated Hybrid Clean Wildfire Inhibitor Misting and Sprinkler System Of The Present Invention, Controlled By The Wireless Automated Wildfire Ember Detection and Notification Network As disclosed in Applicant's prior US Patent Applications, when treating combustible organic materials so they will not burn in the presence of a wildfire, it will be helpful in many instances to spray clean anti-fire chemical liquid over the target surfaces so that the droplets are relatively large and an adequate coating of anti-fire chemical dries over the treated surface. This way, when the chemically treated organic material is exposed to fire, the treated surface has adequate chemicals to break the free-radical chain reactions of the fire and thereby quickly suppress and/or extinguish the fire.

However, during wildfire storms, producing burning wildfire embers flying through dried heated air, driven by strong prevailing winds, it has been discovered that clean aqueous-based anti-fire biochemical liquid of the present invention will perform as a more effective fire suppressant if provided to the burning fire in the form of a mist cloud, so that it can work on a wildfire and its embers, as described in the wildfire ember suppression process described herein.

While most mist producing apparatus disclosed herein operates on the principle of transmitting an anti-fire chemical liquid through a misting nozzle under low, medium or high hydraulic pressure, it is understood that when spraying anti-fire chemical liquids over the surfaces of organic material during fire-protection treating operations, then spray-type nozzles will be often used as provided on the mobile spraying apparatus 5 shown herein. Using spray-type nozzles, it is possible to quickly deposit and form sufficient coatings of anti-fire chemical material on the treated surfaces, because spray-type nozzles produce liquid drops substantially larger in size than microscopic droplets formed by misting nozzles during misting operations, illustrated herein.

FIGS. 42C and 42D shows automated hybrid clean wildfire inhibitor misting system of the present invention 600, providing both an anti-fire chemical misting system for suppressing wildfire embers impacting a building as shown in FIG. 42C and a lawn and ground anti-fire chemical liquid misting system impacting the law and ground around the building as shown in FIG. 42C, both automatically controlled by an automated wildfire ember detection and notification network shown in FIGS. 42A and 42B. All of these system components are integrated into the system network shown in FIG. 4A.

FIG. 42A shows a piping manifold 6G, a network of piping, and a set of misting nozzles 6H used to supply and produce anti-fire chemical misting droplets from the automated hybrid clean wildfire misting system 6 shown in FIGS. 13A and 13B.

As shown in FIG. 13A, automated multi-mode hybrid clean wildfire inhibitor misting system 600 comprises: an dual-mode anti-fire lawn and ground misting system 6A shown in FIG. 13B for either misting water from a main water supply, or misting environmentally-clean anti-fire chemical liquid of the present invention over lawns (e.g. dried out grass) and ground surfaces covered with organic material; a wildfire ember misting controller 6B (e.g. programmable microcontroller supported by a memory architecture) for controlling the various modes of the system 6; lithium battery pack and controller 6C for supplying electrical power to the electronic components in the system 6 including the DC or AC electric motor of hydraulic (e.g. diaphragm-type) liquid pumping system 6F; a photovoltaic solar cell panel 6D for recharging the lithium-ion battery back 6C while collecting sunlight with the PV solar panel 6D as solar conditions allow; a supply tank containing an adequate supply (e.g. 100 gallons) of a liquid anti-fire chemical liquid realizable using anti-fire biochemical liquid of the present invention; a liquid spray misting pump system 6F (e.g. self-priming DC or AC electrical-motor powered diaphragm liquid pump) for hydraulically pumping the anti-fire chemical liquid 6E from its supply tank (e.g. 50-100 gallons) to a plurality of misting nozzles 6H mounted all around a building being protected, and connected through adequate heat-resistant piping (e.g. ⅛", ¼" or ½" metal tubing, or high-heat resistant plastic tubing such as PET) extending over relatively short distances under adequate hydraulic pressure, to support sufficient flow rates of anti-fire chemical liquid during a wildfire ember storm, determined in a manner well known in the fluid hydraulic arts; a piping manifold 6G and piping network including a set of misting nozzles 6H for producing clean anti-fire (AF) chemical mist; a GPRS/GSM transceiver 61 with suitable antennas 6J, connected to the controller 6B, and adapted for transmitting and receiving digital data packets using GPRS and GSM communication protocols, over the system network 1, to support a suite of digital communication services and protocols specified herein; a suite of communication services and protocols 6L (e.g. email, SMS alert, PUSH protocol, XML, PDMS, and CALL alert) supported by GSM, for sending and receiving messages; and at least one electronic Wildfire ember detection module 4A, with 360 degrees of sensing and associated field of views (FOVs), and in wireless communication with the wireless wildfire ember detection and notification network 4 of the present invention.

As shown in FIG. 42D, the lawn misting system 6A comprises: a water supply 6Q connected to a network of underground piping 6R; misting-type sprinklers 6O (e.g. misting nozzles) connected to the underground piping 6R; misting-type rotors 6P connected to the piping 6R; valves 6N connected to the underground piping 6R, the local water supply 6Q, and the liquid pumping system 6F, which is operably connected to the supply of clean wildfire inhibitor liquid 6E using piping; and a timer/controller 6M connected to the controllable valves 6N, and controlled by the wildfire ember misting controller 6B, which is managed by the automated wildfire ember detection and notification network 604, shown in FIG. 13A.

The dual-mode lawn misting system 6A shown in FIG. 43D has two modes of operation. During its first mode of operation, when no wildfire storm is detected, the lawn misting system 6A automatically mists the lawn with water supplied from the local water supply 6Q. During its second mode, when a wildfire storm is detected, the law misting system 6A automatically mists the lawn with an environmentally anti-fire (AF) liquid 6E supplied from a local supply of anti-fire (AF) liquid pumped from a pumping system 6F.

In the preferred embodiment the hybrid wildfire misting system 600 also has at least two modes operation: (i) a manual mode where a building/home owner or manager can manually activate and operate the anti-fire chemical liquid misting system 600 to protect either the building 17 and/or the lawn and ground surfaces around the building 17, as desired or required, based on intelligence in the possession of the human operator or manager; and (ii) an automated mode where the wildfire ember misting controller 6B, in cooperation with the local electronic wildfire and ember detection module 604A and associated wireless wildfire detection network 4, automatically activate and operate the anti-fire chemical liquid misting system 600 to protect both the building 17 and/or the lawn and ground surfaces around the building 17, as required, based on intelligence automatically collected by the wireless wildfire detection and notification network.

Preferably, modules 61, 6K, 6B, 6C, 6E and 6F shown in FIG. 42C will be mounted and safely protected in the wildfire-protected shed or closet structure 50, disclosed in great technical detail in Applicant's published U.S. patent application Ser. No. 15/925,796, incorporated herein by reference. In the manual mode, a touch-screen or touch-type control panel associated with the controller 6B is used by the operator to simply operate the system 6 in its manual mode, or automatically arm the system 600 to operate in its automated, artificial intelligence (AI) mode of operation.

The system 600 will be remotely controllable by the building manger/home-owner using a mobile computing system 11 running the mobile application 12, as shown and described in FIG. 43. Suitable graphical user interfaces (GUIs) will be supported on the mobile application 12 to enable the user to monitor and control the system 600 locally, or from a remote location, in real-time, provided the wireless communication infrastructure is not disrupted by a wildfire. In the case of active wildfires, the wildfire detection and notification network 4 should be accessible by a remote user provided with the mobile application 12. As the system will continuously collect, record and monitor intelligence about specific regions of land and any wildfires detected in such regions, and advise any specific home/building owner of the status of any specific building before, during and after a wildfire.

The system 600 will include and supported automated mechanisms for remotely monitoring and reporting the amount of anti-fire chemical liquid 6E available and remaining for use in supporting anti-fire misting operations, during an automatically detected wildfire ember storm. Preferably, adequate reserves of anti-fire chemical liquid 6E will be stored on each property before any given wildfire strike, to support several hours of wildfire ember suppression misting operations, which is typically expected during a wildfire storm before passes through and consumes the organic material that is desperately seeks to fuel its combustion process.

As shown in FIG. 42G, the sprinkler-type head(s) shown in FIGS. 42F1 and 42F2, mounted on home building rooftops and driven by automated pumps, automatically create and maintain a clean-biochemistry fire break all around the home's property area, to maintain a proactive fire defense coverage against an advancing wildfire, so as to help reduce risk of destruction of property and life by wildfire. Preferably, wildfire fire defense system is provided with a mode of operation in the system 600 is locked and loaded, with a full supply of clean fire inhibiting liquid biochemical composition of the present invention stored in a storage tank, and connected to a battery-powered pump, connected to the sprinkler and misting heads installed on and around the property, and on the home building roof structure, equipped and ready to automatically spray the predetermined amount of fire inhibiting liquid biochemical from the sprinklers 60 and misting nozzles 64 over all the property surfaces, so as to create a proactive zone of fire protection from potassium citrate salt crystalline structures formed and dried on all combustible property surfaces, and effective against hot embers and fire from an wildfire advancing toward the proactively protected property.

Typically, the locked and loaded home wildfire defense system will be manually triggered by the owners several hours and just before the owners are required to evacuate their homes and property for safety reasons, by authorities such as the local fire chief and deputies. Alternatively, the wildfire home defense system can also be remotely triggered using a mobile smartphone, if required, with the property owners not home to manually triggering the spraying defense mode of the system.

To provide adequate protection against flying wildfire embers combusting in a low humidity environment, the misting nozzles 64 will be mounted about the building 17 so as to provide adequate coverage over all air-inlet vents provided on the specific building being equipment with the wildfire misting/sprinkler system of the present invention, as well as on wood and other organic surfaces that might be vulnerable to hot wildfire embers during a wildfire ember storm, as illustrated in FIG. 42A. The liquid spraying pattern of each misting nozzle 6H and sprinkler 60 being used in the misting system 600 will be considered and exploited to provide the adequate misting protection required by the wildfire protection application at hand. Computer software tools may be developed and distributed to installers to assist in the design and installation of a hybrid wildfire misting system in accordance with the principles of the present invention.

In the illustrative embodiment, the clean anti-fire biochemical liquid to be used for wildfire ember misting operations disclosed herein. It is expected that service-oriented businesses will support the rapid design, installation and installation of the automated wildfire detection and misting suppression systems of the present invention, as well as the supplying and replenishing of clean anti-fire chemical liquid on each GPS—indexed property. It is expected that this can occur with the efficiency currently provided by conventional liquid propane supply companies around the country. Because of the reduced risk of loss of wood-framed or other buildings to wildfire, which the systems and method of the present invention will provide, while advancing the best practices for home and building property protection against wildfires, it is expected that fire insurance companies will embrace the best practices represented by the present invention, for reason of the great benefits such inventions will provide, predicted by Benjamin Franklin's time-honored principle of fire protection: "An ounce of prevention is worth a pound of cure."

When encountering the cloud of anti-fire liquid droplets, combustible wildfire embers will be suppressed or readily extinguished. The chemical molecules in the droplets formed with fire inhibiting biochemical liquid of the present invention will interfere with the free radicals (H+, OH−, O) involved in the free-radical chemical reactions within the combustion phase of a fire, or wildfire embers, breaking these free-radical chemical reactions and extinguishing the fire's flames. Also, the droplets will vaporize when absorbing the radiant heat energy of the hot wildfire ember(s), rapidly expanding into a vapor, cooling down the embers, and displaying oxygen, causing the combustion phase of the embers to be suppressed if not extinguished.

Just-In-Time Wood-Framed Building Factory Method, System And Network Supporting Multiple Production Lines For Producing Pre-Fabricated Class-A Fire-Protected Wood-Framed Components As Needed To Construct Custom And Pre-Specified Wood-Framed Buildings Ordered By Customers FIG. 44A shows a just-in-time wood-framed building factory system 700 supporting multiple production lines 131A, 131B, 131C, etc. for producing pre-fabricated Class-A fire-protected wood-framed components as needed to construct custom and pre-specified wood-framed buildings ordered by customers, as the case may be, from anywhere around the globe. In accordance with the principles of the present invention, each production line includes a conveyor for conveying wood components (e.g. raw lumber, finger-jointed lumber, CLT components and/or LVL components) along at least a portion of the production line and through, into and out of a dipping tank, as described herein, filled with clean fire inhibiting biochemical liquid, and allowed to dry and attain Class-A fire-protection properties during the wood-framed component fabrication process.

FIG. 44B shows the just-in-time (JIT) factory system 700 with production lines shown for producing various kinds of prefabricated Class-A fire-protected wood-framed components (e.g. wood-framed walls, staircases, roof trusses, floor trusses, etc.) 132A, 132B, and 132C which are used in constructing custom and pre-specified wood-framed buildings ordered by customers for production and delivery. As shown, each production line 131 requires inputs such as (i) an order for a customer or pre-specified wood-framed building; (ii) raw lumber 141 of a certain type and in a certain quantity to build the ordered custom or prespecified wood-framed building; as well as (iii) CFIC liquid 142 in sufficient supply to render the raw lumber Class-A fire-protected in accordance with the principles of the present invention disclosed herein. As shown, the outputs from the factory system 130 are Class-A fire-protected wood-framed building components such as (i) wall panels 132A, (ii) floor panels 132B, (iii) floor trusses 132C, (iv) roof trusses 132D, and (v) stair panels 132E, manufactured using the dip-coating methods disclosed herein, for use in constructing custom and specified wood-framed buildings.

FIG. 45 shows the just-in-time factory system network 700 shown in FIGS. 44A and 44B, shown comprising: (i) the just-in-time wood-framed building factory 130, with multiple production lines 131A through 131D for producing Class-A fire-protected building components as illustrated in FIG. 44A; (ii) RFID-tagged/coded ISO-shipping containers 136 shown in FIG. 44A, and mobile code symbol/RFID tag reading mobile computing systems 137 for reading optical code symbols (e.g. PDF 417, etc.) 138A and RFID tags 138B well known in the shipment tracking art; a (iii) a data center 145, operably connected to the TCP/IP internet infrastructure 151 for supporting enterprise resource planning (ERP) related operations within the wood-framed building factory system 130 shown in FIGS. 44A and 44B, and supporting a network of mobile computing devices 137 shown in FIG. 64, each running a mobile application 153 adapted to help track and manage (i) orders placed by customers for prefabricated Class-A fire-protected wood-framed buildings, and (ii) projects within the factory system involving the placed customer orders. As shown, the data center 145 comprises: web (http and ftp) communication servers 146; application servers 147; database servers (RDBMS) 148; SMS servers 149; and email message servers 150, well known in the art.

As shown in FIG. 45, the system also includes a GPS system 139 for transmitting GPS reference signals transmitted from a constellation of GPS satellites deployed in orbit around the Earth, to GPS transceivers installed aboard each GPS-tracking ISO-shipping containers 136A, 136B, as part of the illustrative embodiments. From the GPS signals it receives, each GPS transceiver is capable of computing in real-time the GPS location of its host system, in terms of longitude and latitude. In the case of the Empire State Building in NYC, NY, its GPS location is specified as: N40° 44.9064', W073° 59.0735'; and in number only format, as: 40.748440, −73.984559, with the first number indicating latitude, and the second number representing longitude (the minus sign indicates "west").

FIG. 46 shows the mobile client computing system(s) 137, 137' used in the system network 135 supporting mobile application 153 installed on each registered mobile computing system 137, 137'. The purpose of the mobile application 153 is to provide a convenient tool for tracking and managing projects involving factory-applied clean fire inhibiting chemical (CFIC) liquid dip-coating treatment of wood pieces during the prefabrication of Class-A fire-protected wood-framed buildings. In the event that CFIC liquid solution is mixed on site by adding water to preblended dry powder chemicals at a toll blender, the mobile application can be used to track chain of custody from our toll blender to the factory site where the toted power mixture is added to water to produce an aqueous-based CFIC liquid solution, for high-speed dip-coating 100% of all wood/lumber used to fabricate Class-A fire-protected wood-framed building components along production lines inside the factory 130.

Specification of the Network Architecture of The System Network Of The Present Invention FIG. 45 illustrates the network architecture of the system network of the present invention 700 for the case where the system of the present invention is implemented as a stand-alone platform deployed on the Internet.

As shown in FIG. 45, the Internet-based system network 700 comprises: cellular phone and SMS messaging systems 161; email servers 1162; a network of mobile computing systems 136 (136A, 136B) running enterprise-level mobile application software; and one or more industrial-strength data center(s) 145, preferably mirrored with each other and running Border Gateway Protocol (BGP) between its router gateways.

As shown in FIG. 45, each data center 145 comprises: a cluster of communication servers 146 for supporting http and other TCP/IP based communication protocols on the Internet (and hosting Web sites); a cluster of application servers 147; a cluster of RDBMS servers 148 configured within a distributed file storage and retrieval ecosystem/ system, and interfaced around the TCP/IP infrastructure of the Internet well known in the art; an SMS gateway server 149 supporting integrated email and SMS messaging, handling and processing services that enable flexible messaging across the system network 700, supporting push notifications; and a cluster of email processing servers 150.

Referring to FIG. 45, the cluster of communication servers 146 is accessed by web-enabled clients (e.g. smart phones, wireless tablet computers, desktop computers, computer workstations, etc.) 137 (137A, 137B) used by stakeholders accessing services supported by the system network. The cluster of application servers 147 implement many core and compositional object-oriented software modules supporting the system network 145. The cluster of RDBMS servers 148 use SQL to query and manage datasets residing in its distributed data storage environment.

As shown in FIG. 45, the system network architecture 700 further comprises many different kinds of users supported by mobile computing devices 137 running the mobile application 153 of the present invention, namely: a plurality of mobile computing devices 137 running the mobile application 153, and used by fire departments to access services supported by the system network 145; a plurality of mobile computing systems 137 running mobile application 153 and used by insurance underwriters to access services on the system network 145; a plurality of mobile computing systems 137 running mobile application 153 and used by architects and their firms to access the services supported by the system network 145 of the present invention; a plurality of mobile client machines 137 (e.g. mobile computers such as iPad, and other Internet-enabled computing devices with graphics display capabilities, etc.) for use by spray-project technicians and administrators, and running a native mobile application 137 supported by server-side modules, and the various illustrative GUIs shown in FIGS. 69 through 70J, supporting client-side and server-side processes on the system network of the present invention; and a GPS-tracked GSM-linked digital camera 163 installed over each CFIC liquid dip-coating tank, installed along a production line 131, for capturing digital images and video recordings of the CFIC liquid dip-coating process, along the production line, where wood pieces are dip-coated and Class-A fire-protected prior art to use in fabricating Class-A fire-protected wood-framed building components.

In general, the system network 135 will be realized as an industrial-strength, carrier-class Internet-based network 700 of object-oriented system design, deployed over a global data packet-switched communication network comprising numerous computing systems and networking components, as shown. As such, the information network of the present invention is often referred to herein as the "system" or "system network". The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (OOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application 153 of the present invention, described above.

Specification of System Architecture of an Exemplary Mobile Smartphone System Deployed on the System Network of the Present Invention FIG. 46 shows an exemplary mobile the mobile client computing system (e.g. client device) 137 that is deployed on the system network 135 and supporting the many services offered by system network servers of the present invention. As shown in FIG. 47, the mobile computing device 137 (137') can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 137 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 137 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 137 can be found in U.S. Pat. No. 8,631,358 incorporated herein by reference in its entirety.

Different Ways of Implementing the Mobile Client Machines and Devices on the System Network of the Present Invention In one illustrative embodiment, the enterprise-level system network 700 is realized as a robust suite of hosted services delivered to Web-based client subsystems 137 using an application service provider (ASP) model. In this embodiment, the Web-enabled mobile application 153 can be realized using a web-browser application running on the operating system (OS) (e.g. Linux, Application IOS, etc.) of a mobile computing device 137 to support online modes of system operation, only. However, it is understood that some or all of the services provided by the system network 135 can be accessed using Java clients, or a native client application, running on the operating system of a client computing device, to support both online and limited off-line modes of system operation. In such embodiments, the native mobile application 153 would have access to local memory (e.g. a local RDBMS) on the client device 137, accessible during off-line modes of operation to enable consumers to use certain or many of the system functions supported by the system network during off-line/off-network modes of operation. It is also possible to store in the local RDBMS of the mobile computing device 137 most if not all relevant data collected by the mobile application for any particular fire-protection spray project, and to automatically synchronize the dataset for user's projects against the master datasets maintained in the system network database 148A, within the data center 145 shown in FIG. 66. This way, when using a native application, during off-line modes of operation, the user will be able to access and review relevant information regarding any building spray project, and make necessary decisions, even while off-line (i.e. not having access to the system network).

As shown and described herein, the system network 700 of the present invention has been designed for several different kinds of user roles including, for example, but not limited to: (i) building purchasers, builders, and architects who might or will have the authority to place or make purchase orders online to commence a Class-A fire-protected wood-framed building project; and (ii) prefabrication building project administrators and technicians registered on the system network. Depending on which role, for which the user requests registration, the system network will request different sets of registration information, including name of user, address, contact information, information about wood-framed buildings, builders, architects, etc. In the case of a web-based responsive application on the mobile computing device 137, once a user has successfully registered with the system network, the system network will automatically serve a native client GUI, or an HTML5 GUI, adapted for the registered user. Thereafter, when the user logs into the system network, using his/her account name and password, the system network will automatically generate and serve GUI screens described below for the role that the user has been registered with the system network.

In the illustrative embodiment, the client-side of the system network 700 can be realized as mobile web-browser application, or as a native application, each having a "responsive-design" and adapted to run on any client computing device (e.g. iPhone, iPad, Android or other Web-enabled computing device) 137 and designed for use by anyone interested in managing, overseeing and/or monitoring on-site CFIC liquid spray projects involving owners of specific wood-framed buildings seeking Class-A fire-protection.

Specification of Database Schema for System Network Database Supported on the System Network of the Present Invention As shown in FIG. 47, the schema 154 includes objects such as, for example: users of the system (e.g. property owners, builders, insurance companies, etc.); real property on which the building will be constructed (if known at the time of ordering); orders for custom or pre-specified prefabricated wood-framed building; and construction project. Each of these objects have further attributes specified by other sub-objects, including, for example: project ID; raw lumber; CFIC liquid; CFIC liquid dip coating systems; Class-A fire-protected wood-framed components; and ISO-shipping containers.

Specifications of Services Supported by the Graphical User Interfaces Supported on System Network of the Present Invention for Building Purchasers, Builders, Architects, Property Insurers and Other Stakeholders FIG. 48 illustrates an exemplary graphical user interface (GUI) 155 of the mobile application 153 used by customers who place orders for prefabricated Class-A fire-protected wood-framed buildings, supported by the system of the present invention. As shown in this exemplary GUI screen, a number of pull-down menus are supported under the titles: Messages 155A, where the user can view messages sent via messaging services supported by the application; Orders 155B, where orders for prefabricated buildings have been placed and scheduled, have been completed, or are in progress; and Projects 155C, which have been have been scheduled, have been completed, or are in progress, and where uploaded authenticated certifications can be reviewed, downloaded and forwarded as needed by authorized stakeholders, to the appropriate parties and authorities.

Notably, the GUIs will designed and configured for use by the prefabricated building administrators and technicians who will be responsible for (i) taking orders for prefabricated Class-A fire-protected wood buildings, and (ii) managing each prefabricated fire-protected building project, from start to finish, so that building owners, builders, architects, property insurance agents and financial institutions (e.g. banks) may rely on the prefabrication company managing each and every step of each project using the system network 700. Exemplary GUIs supporting these functions are shown and described in Applicant's granted U.S. Pat. No. 10,332,222 which is incorporated herein by reference in its entirety.

Specification Of Services Supported By The Graphical User Interfaces Supported On System Network Of The Present Invention For Use By Fabricators, Administrators and Technicians Involved in The Production Of Prefabricated Class-A Fire-Protected Wood-Framed Buildings And Components FIG. 49 shows an exemplary graphical user interface 156 for the mobile application 153 configured for use by JIT wood-framed building administrators and supervisors supported by the system network 700. As shown in this exemplary GUI screen 156, supports a number of pull-down menus under the titles: Messages 156A, where project administrators and supervisors can view messages sent via messaging services supported by the application; Orders 156B, where orders for prefabricated wood-framed buildings have been placed and/or scheduled, have been completed, or are in progress, with status notes, terms, conditions and other considerations made of record; Projects 156C, which have been have been scheduled, have been completed, or are in progress; and Reports 156D, which are generated for Orders, Projects and Supplies, on prefabricated wood-framed building projects are managed by the mobile application 153 running on the mobile client system 137C in operable communication with web, application and database servers 146, 147, 148 at the JIT factory data center 145.

Notably, the GUIs will be designed and configured for use by the prefabricated building administrators and technicians who will be responsible for (i) taking orders for a prefabricated Class-A fire-protected wood-framed building, (ii) managing the entire prefabricated fire-protected building project, from start to finish, so that building owners, builders, architects, property insurance agents and financial institutions (e.g. banks), as well as local, state and federal authorities, may rely on their services and work product of the prefabrication company managing each and every step of project using the system network 135. Exemplary GUIs supporting these functions are shown and described in Applicant's granted U.S. Pat. No. 10,332,222 which is incorporated herein by reference in its entirety.

In one illustrative embodiment, the mobile application 153 and/or digital camera systems can be used to review digital images and audio-video (AV) recordings taken of CFIC liquid dipped-coated wood pieces along the production line, relating to prefabricated wood-framed building components being fabricated, and uploaded to the system network database 148A under the project ID # of the prefabricated building project. All captured documents and evidence of CFIC liquid dip-coated wood can be uploaded, logged and time/date-stamped and stored into the project-specific document folder maintained on the system network database 148A of the system network 700 using document capture, time/date-stamping and cataloguing capabilities.

Alternatively, Class-A fire-protected lumber, and/or engineered wood products (EWPs), that are dip-coated in CFIC liquid, will be used to construct prefabricated Class-A fire-protected wood-framed building components (e.g. wall panels, roof trusses, floor trusses, roofing systems, flooring systems, and stair assemblies). Once constructed in the factory on the production line, a barcoded/RFID-tagged inspection label 400 is applied to each and every prefabricated Class-A fire-protected wood-framed building component produced on the production line 131. Each barcoded/RFID-tagged inspection label 400 will include a bar code symbol and RFID tag that has a unique building-component identifier (e.g. an alphanumeric character string) encoded into the symbology used in the barcode symbol and RFID tag identifier, and this building-component identifier will be used to identify subfolders or subdirectories where collection data, information and documents are stored in a building-component subfolder (indexed with the building-component identifier), in the building-project folder on the network database 113A, maintained on the system network 700. The building-component identifier will be read during each scan/read of the barcoded/RFID-tag label 400, and used by the mobile application 153 to access the appropriate building-component subfolder in the building project folder where all such certifications of dip-coating, inspection and oversight, and photos, and videos are stored and archived for posterity.

The mobile application 153 has access to all services supported in the mobile computing device 137 (e.g. Apple iPhone or iPad) as the case may be, for verifying and documenting the CFIC liquid spray treatment of each and every completed Class-A fire-protected wood-framed building fabricated in the factory. Such documentation should include capturing and uploading digital images and AV-recordings of certificates of CFIC liquid dip-coating stamped and verified along the production line involved the fabrication process.

In the event the purchaser of the prefabricated wood-framed building requested on-site application of Class-A fire-protection spray treatment, using CFIC biochemical liquid, a professional fire-protection spray treatment (provider) team will use the system network 100 to apply, certify, verify and document the Class-A fire protection liquid spray process as described in detail above, in synchronism with the prefabricated builder's schedule. As each predesignated section of the wood-framed building is constructed by assembling pre-fabricated Class-A fire-protected wood-framed building components (e.g. wall panels, floor and roof truss panels, stair components, etc.), the spray technicians will spray treat all exposed interior surface of the completed section of the wood-framed building, and certify, verify and document the spray treatment using the mobile application 153 using mobile computing devices 137 and services supported by the system network 700. Once completed, the prefabricated Class-A fire-protected wood-framed building will be double-protected with Class-A fire-protection, providing the building owner with many benefits, including potentially lower property insurance premiums, in view of the fact that significant risk of total destruction by fire has been significantly reduced or otherwise minimized.

By virtue of the JIT factory system 130, it is now possible to produce, as needed, a custom or pre-specified wood-framed building made from Class-A fire-protected wood-framed building components, thereby minimizing inventory and cost of manufacture, and improving the quality and precision of prefabricated Class-A fire-protected prefabricated wood-framed buildings.

Specification of the Method of and Apparatus for Producing a Bundle of Class-A Fire-Protected Lumber Produced in Accordance with the Principles of the Present Invention While most fires start small, they often spread rapidly onto surrounding flammable surfaces. Before long, the phenomenon of flash over occurs, where superheated gases cause a whole room to erupt into flame within minutes. Class-A fire-protected lumber of the present invention, as shown in FIG. 50, bears a clear or transparent surface coating formed by dip-coating lumber pieces in clean fire inhibiting chemical (CFIC) liquid of the present invention. When so treated, Class-A fire-protected lumber products will prevent flames from spreading, and confine fire to the ignition source which can be readily extinguished, or go out by itself.

FIG. 50 shows a bundle of Class-A fire-protected finger-jointed lumber 29 produced using the method of and apparatus of the present invention. FIG. 19 shows an automated lumber factory system 20 for continuously fabricating wrapped and packaged bundles of Class-A fire-protected finger-jointed lumber product 29 in a high-speed manner, in accordance with the principles of the present invention. However, it is understood that this automated factory and production methods can be used to treat and protect solid wood and timber products, as well, so as to produce Class-A fire-protected solid wood products (e.g. studs, beams, boards, etc.), as well as engineered wood products.

As shown in FIG. 51A, the factory 800 comprises a number of automated industrial stages integrated together under automation and control of controller 28, namely: a high-speed multi-stage lumber piece conveyor-chain mechanism 22 having 6 primary stages in the illustrative embodiment shown in FIGS. 51A and 51B; a kiln-drying stage 23 receiving short pieces of lumber 21 from a supply warehouse maintained in or around the factory; a finger-jointing lumber processing stage 24, for processing short-length pieces of kiln-dried lumber and automatically fabricating extended-length finger-jointed pieces of lumber 29, as output from this stage; a lumber planing and dimensioning stage 25 for planing and dimensioning elongated pieces of finger-jointed lumber into lumber pieces having lengths and dimensions for the product application at hand (e.g. studs); an in-line high-speed continuous CFIC liquid dip-coating stage 26, as further detailed in FIG. 51A; an automated stacking, packaging, wrapping and banding/strapping stage 27, from which bundles of packaged, wrapped and strapped Class-A fire-protected lumber product are produced in a high-speed automated manner.

In general, the kiln-drying stage 23 can be implemented in different ways. One way is providing a drying room with heaters that can be driven by electricity, natural or propane gas, and/or other combustible fuels which release heat energy required to dry short-length lumber pieces prior to the finger-joint wood processing stage. Batches of wood to be treated are loaded into the drying room and treated with heat energy over time to reduce the moisture content of the wood to a predetermined level (e.g. 19% moisture). In alternative embodiments, the kiln-drying stage 23 might be installed an elongated tunnel on the front end of the production line, having input and output ports, with one stage of the conveyor-chain mechanism 22 passing through the heating chamber, from its input port to output port, allowing short-length lumber to be kiln-dried as it passes through the chamber along its conveyor mechanism, in a speed-controlled and temperature-controlled manner. Other methods and apparatus can be used to realize this stage along the lumber production line, provided that the desired degree of moisture within the wood is removed at this stage of the process.

As illustrated in FIG. 51A, the finger-jointing lumber processing stage 24 can be configured as generally disclosed in US Patent Application Publication Nos. US20070220825A1 and US20170138049A1, incorporated herein by reference. In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 24 of the present invention may be the CRP 2500, CRP 2750 or CRP 3000 Finger Jointing System from Conception R.P., Inc., Quebec, Canada http://www.conceptionrp.com/finger-jointing-systems.

As illustrated in FIG. 51A, the lumber planing and dimensioning stage 25 includes wood planing equipment, such industrial band or rotary saws designed to cut and dimension finger-jointed lumber pieces produced from the finger-jointing lumber processing stage 24, into lumber boards of a specified dimension and thickness, in a highly programmed and automated manner.

As shown in FIG. 51B, the dip-coating stage 26 of the factory system 800 comprises a number of components integrated together on the production line with suitable automation and controls, namely: a multi-stage chain-driven conveyor subsystem 22, supporting several parallel sets of chain-driven transport rails 22A1, 22A2 and 22A3, as shown, extending from the planing and dimensioning stage 25 towards the dipping tank 26B, and then running inside and along the bottom of the dipping tank 26B, and then running out thereof towards the stacking, packing, wrapping and banding/strapping stage 27, as shown, and having the capacity of transporting extend-length finger-jointed lumber pieces (i.e. boards) having a length as long as 30 or so feet; a dipping reservoir 26B having a width dimension to accommodate the width of the chain-driven conveyor rails 22A1, 22A2 and 22A3 mounted and running outside of and also within the dipping tank 26B, as shown, to transport up planed and dimensioned finger-jointed lumber pieces 29A supported upon the chain-driven rails 22A1, 22A2 and 22A3, while the boards are fully immersed and submerged at least 6 inches deep in CFIC liquid 26H contained in the dipping tank 26B, while moving at high speed, such as 300 feet/minute through the dipping tank 26B during the CFIC dip-coating process of the present invention; electrically-powered driven motors 261 for driving the chain-driven conveyors 22A1, 22A2 and 22A3 under computer control to transport finger-jointed pieces of lumber from stage to stage along the lumber production line; a level sensor 26F for sensing the level of CFIC liquid 26B in the dipping tank at any moment in time during production line operation; a reservoir tank 26C for containing a large volume or supply of CFIC liquid solution 26K; a computer controller 26G for controlling the conveyor subsystem 22, and an electric pump 26D for pumping CFIC liquid into the dipping tank 26B to maintain a constant supply level during system operation in response to the liquid level measured by the level sensor 26F.

The high-speed CFIC liquid dip-coating subsystem 26 shown in FIG. 51B may also include additional apparatus including, for example, liquid heaters, circulation pumps and controls for (i) maintaining the temperature of CFIC liquid solution in the dipping tank 26B, and (ii) controlling the circulation of CFIC liquid around submerged pieces of finger-jointed lumber 29A being transported through the dipping tank 26B in a submerged manner during a CFIC coating process. Controlling such dip-coating parameters may be used to control the amount and degree of absorption of CFIC liquid within the surface fibers of the finger-jointed lumber 29A as it is rapidly transported through the dipping tank 26B between the lumber planing and dimensioning stage 25 and the lumber stacking, packaging, wrapping and banding/strapping stage 27 of the lumber production line. Notably, the dip coating process of the present invention allows for the rapid formation a surface coating, or surface barrier, on the surface of each piece of dipped lumber, and in the presence of the surfactant in the CFIC liquid in the dipping tank, shallow impregnation of CFIC liquid 26H to occur into the surface fibers of each piece of lumber 29A near atmospheric pressure (i.e. below 6 inches of liquid CFIC in the dipping tank) during the dip-coated process according to the principles of the present invention. It is understood that drip pans may also be provided beyond the dipping tank 26B, installed beneath the chain-driven conveyor subsystem arranged between the dripping tank 26B and the stacking, packaging, wrapping and banding/strapping stage 27, to recover excess CFIC liquid dripping from the dip-coated lumber pieces 29A and returning this recovered CFIC liquid to the dipping tank 26B after appropriate filtering of the CFIC liquid if and as necessary.

As illustrated in FIG. 51A, the stacking, packaging, wrapping and banding stage 27 includes equipment designed to automatically receive CFIC-coated finger-jointed lumber pieces 29A while still dripping and wet from CFIC liquid 26H, and wet stacking a predetermined number of lumber pieces into a package, and then wrapping the package of lumber with a sheet of wrapping material (e.g. TVEK or like material) that covers the top portion and at least half way down each side of the lumber package, and then banding or strapping the wrapped package with fiberglass or steel banding, well known in the art. The wrapping will typically be preprinted with trademarks and logos of the lumber manufacturer's brand. Finally, the ends of the lumber pieces in the strapped, wrapped lumber package are painted with a fire-protective paint also containing CFIC liquid in amounts to be effective in Class-A fire suppression.

FIGS. 52A and 52B describe the high level steps carried out when practicing the method of producing bundles of Class-A fire-protected finger-jointed lumber 29 for use in fire-protected building construction.

As indicated at Block A in FIG. 52A, in an automated lumber factory, a high-speed Class-A fire-protected lumber production line is installed and operated, with a reservoir tank 26C containing a large supply of clean fire inhibiting chemical (CFIC) liquid 26K that is supplied to the automated CFIC liquid dip-coating stage 26 of the lumber factory 20, installed between (i) the lumber planing/dimensioning stage 25, and (ii) an automated stacking, packaging, wrapping and banding stage 27 in the lumber factory 20.

As indicated at Block B in FIG. 52A, a supply of untreated short-length lumber is loaded onto the high-speed conveyor-chain transport mechanism 22 and auto-feeder installed along and between the stages of the lumber production line.

As indicated at Block C in FIG. 52A, the untreated short-length lumber is loaded into the controlled-drying stage 23 of the fire-protected lumber production line so to produce suitably dried short-pieces of lumber for supply to the finger-jointing processing stage 24. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a tunnel-like drying room or chamber, through which chain-driven conveyor mechanism 22 passes, like other stages along the lumber production line, while the temperature and humidity of the environment is controlled using electric-driven or gas-combusting heaters under computer control in a manner well known in the art.

As indicated at Block D in FIG. 52A, the controllably-dried short-length lumber is continuously supplied into the finger-jointing lumber processing stage 24, for producing pieces of extended-length finger-jointed lumber in a highly automated manner.

As indicated at Block E in FIG. 52B, produced pieces of extended-length finger-jointed lumber are automatically transported to the planing/dimensioning stage 25 so that the finger-jointed lumber can be planed/dimensioned into pieces of dimensioned finger-jointed lumber 29A, and outputted onto the multi-stage conveyor-chain transport mechanism 22.

As indicated at Block F in FIG. 52B, the dimensioned finger-jointed lumber pieces 29A are continuously transported and submerged through an automated dipping tank 26B for sufficient coating in CFIC liquid while being transported on the conveyor-chain transport mechanism 22.

As indicated at Block G in FIG. 52B, the wet dip-coated pieces of dimensioned finger-jointed lumber are continuously removed from the dipping tank 26B, and automatically wet-stacking, packing, wrapping and banding the wet dip-coated pieces into a packaged bundle of Class-A fire-protected finger-jointed lumber.

As indicated at Block H in FIG. 52B, the packaged bundle of Class-A fire-protected finger-jointed lumber is removed from the stacking, packaging, wrapping and banding stage 27 and stored in a storage location in the factory. The strapping the bundle material used may be made of high-strength fiberglass plastic or metal banding material.

As indicated at Block I in FIG. 52B, the ends of each packaged bundle of fire-protected dimensioned finger-jointed lumber 29, produced from the production line, are painted using a Class-A fire-protected paint containing clean fire-inhibited chemicals (CFIC) (e.g. 25% fire inhibiting biochemical liquid of the present invention, 75% liquid polymer binder, and black liquid pigment) and applying trademarks and logos to the wrapped package of Class-A fire-protected finger-jointed lumber.

In the illustrative embodiment, fire inhibitor biochemical liquid is used as the CFIC liquid 26H that is deposited as a CFIC surface coating during the dip-coating of wood/lumber products on the production line of the present invention described above. The surfactants in biochemical formulation break the surface tension and allow its chemical molecules to impregnate ever so slightly the surface of the treated wood. This way, in the presence of a flame, the chemical molecules in the CFIC-coating on the surface of the fire-protected lumber, interferes with the free radicals (H+, OH−, O−) produced during the combustion phase of a fire, and breaks the fire's chemical reaction and extinguishes its flame. This is a primary fire suppression mechanism implemented by the CFIC-coatings deposited on wood surfaces in accordance with the various principles of invention disclosed and taught herein.

Expectedly, the flame spread and smoke development indices of fire-protected lumber 29 produced using the method of the illustrative embodiment, using biochemical liquid of the present invention as a CFIC liquid dip coating material, described in FIGS. 52A and 52B, should meet or exceed the standards of ASTM E84 Testing for proactively treated wood to be deeded Class-A fire-protected wood product under the ASTM Standards.

Specification of the Method of and Apparatus for Producing Class-A Fire-Protected Cross-Laminated Timber (CLT) Panels in Accordance with the Principles of the Present Invention FIG. 53 shows a bundle of fire-protected cross-laminated timber (CLT) products (e.g. panels 42) produced using the method and apparatus of the present invention. The Class-A fire-protected cross-laminated timber (CLT) of the present invention 42 bears a surface coating of clean fire inhibiting chemical (CFIC) liquid. This CFIC coating prevents flames from spreading by breaking the free radical chemical reaction within the combustion phase of fire, and confining the fire to the ignition source which can be readily extinguished, or go out by itself. When practicing the present invention, it is important that other fungicides, biocides, wood preservatives, and/or mildew agents are not added to the CFIC solution 39H in the CFIC dip coating tank 32B because it has been discovered that such agents will chemically interfere with and adversely affect the fire-inhibiting properties and characteristics of the fire-inhibiting biochemicals.

FIG. 54A shows an automated factory system 900 for producing Class-A fire-protected cross-laminated timber (CLT) panels, beams, and other products 42 in a high volume manner. As shown in FIG. 54A, the factory 900 comprises a number of automated stages integrated together under automation and control, namely: a multi-stage conveyor-chain mechanism 32 having numerous primary stages in the illustrative embodiment shown in FIGS. 55A and 55B; a controlled-drying stage 33 receiving short pieces of lumber from a supply warehouse maintained in or around the factory and drying them in a controlled manner well known in the art; a finger-jointing stage 34, for processing short-length pieces of dried timber (i.e. lumber) and automatically fabricating extended-length finger-jointed pieces of timber, as output from this stage; a lamination planing stage 35 for planing finger-jointed pieces of timber to produce finger-jointed timber laminations; an automated adhesive stage 36 for applying adhesive to the finger-jointed timer laminations; a pressing and curing stage 37 where the finger-jointed laminations with adhesive are stacked in a cross-directional manner and then placed in pressing machine where the adhesive is cured under pressure to produce a cross-laminated timber (CLT) panel, beam or other product; cross-cutting and rip-sawing stage 38 for cutting and ripping cross-laminated timber (CLT) panels into CLT products 42A; a chain-driven conveyor 32 for conveying the CLT product 42A along the next few stages of the production line; an in-line CFIC liquid dip-coating stage 39, as further detailed in FIG. 54A, supporting an elongated dipping tank 39B through which the chain-driven conveyor 32 transports CLT product into the dipping tank 39H and along its length while submerged under CFIC liquid 39H during dip-coating operations, to form a CFIC coating on the surfaces of the CLT product, and removing the CFIC-coated CLT product from the dipping tank and transport it to the next stage along the production line; a packaging and wrapping/labeling stage 40 for packaging and wrapping/labeling CLT product 42A either after it has dried, or while the CFIC-coated CLT product is still wet and allowed to dry in its wrapping.

In general, the controlled-drying stage 33 will include drying room with heaters that can be driven by electricity, natural or propane gas, or other combustible fuels which produce heat energy required to dry short-length lumber prior to the finger-joint wood processing stage. Some alternative embodiments, the controlled-drying stage 33 might be installed on the front end of the production line, and having input and output ports, with one stage of the conveyor-chain mechanism 32 passing through the heating chamber, from its input port to output port, allowing short-length lumber to be kiln-dried as it passes through the chamber along its conveyor mechanism. Other methods and apparatus can be used to realize this stage of the lumber production line of the present invention, provided that the desired degree of moisture within the wood is removed with heat or radiant energy at this stage of the process.

As illustrated in FIG. 54A, the finger-jointing lumber processing stage 34 can be configured as generally disclosed in US Patent Application Publication Nos. US20070220825A1 and US20170138049A1, incorporated herein by reference. In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 34 of the present invention may be the CRP 2500, CRP 2750 or CRP 3000 Finger Jointing System from Conception R.P., Inc., Quebec, Canada http://www.conceptionrp.com/finger-jointing-systems.

As illustrated in FIG. 54A, the laminating planing stage 35 includes wood lamination planing equipment, such industrial band or rotary saws designed to cut, plane and dimension finger-jointed lumber pieces produced from the finger-jointing stage 34, into finger-jointed timber laminations of a specified dimension and thickness.

As illustrated in FIG. 54A, the lamination planing stage 35 can be realized using a band or radial saw as may be required to produce finger-jointed laminations.

As illustrated in FIG. 54A, the adhesive application stage 36 can be realized using automated adhesive applicators well known in the art to apply a predetermined controlled amount of adhesive to each finger-jointed timber lamination during the automated finger-jointing process.

As illustrated in FIG. 54A, the pressing and curing stage 37 can be realized using an automated pressing and curing machine well known in the art to apply a predetermined controlled amount of pressure to the timber laminations after they have been cross-configured, and placed into the machine for pressing and subsequent curing operations.

LEDINEK Engineering, do.o.o, of Hoce, Slovenia, offers complete turnkey CLT production lines for high-volume automated production of cross-laminated timber (CLT) panels. Such systems comprise: lamination planers; finger jointing machines; presses & curing machines; and automation and controllers. Such technologies and machines can be used to implement many of the stages described above in the CLT panel production line of the present invention. https://www.ledinek.com/engineered-timber As shown in FIG. 54B, the in-line high-speed continuous CFIC liquid dip-coating stage 39 of the production line comprises a number of components integrated together, with suitable automation and controls, namely: a multi-stage lumber board chain-driven conveyor subsystem 32, supporting several parallel sets of chain-driven transport rails 32A1, 32A2 and 32A3, as shown, extending from the pressing and curing stage 39 towards a dipping tank 39B, and then running inside and along the bottom of the dipping tank 39B, and then running out thereof, towards the packing and wrapping stage 40, as shown, and having the capacity of transporting CLT panels and boards having a length up to 30 or so feet.

In the illustrative embodiment, the dipping tank 39B has a width dimension of 32 or so feet to accommodate the width of the CLT product being transported on chain-driven conveyor rails 32A1, 32A2 and 32A3 mounted and running outside of and also within the dipping tank 39B, as shown. As shown, the CLT products 42A are supported upon the chain driven rails 32A1, 32A2 and 32A3 while the CLT products are transported through the dipping tank 39B while fully immersed and submerged at least 6 inches deep in CFIC liquid 39H contained in the dipping tank 39B, moving lumber in and out of the dipping tank 39B in just a few seconds during the CFIC dip-coating process of the present invention. Electrically-powered driven motors 391 are provided for the purpose of driving the chain-driven conveyors 32A1, 32A2 and 32A3 under computer control to transport CLT products 39E from stage to stage along the production line. A level sensor 39F is used for real-time sensing and control of the liquid level of CFIC liquid 39H in the dipping tank 39B at any moment in time during production line operation. A reservoir tank 39C is provided for containing a large volume or supply of made up CFIC liquid solution. Also, a computer controller 39G is used for controlling the conveyor subsystem 32, and an electric pump 39D for pumping CFIC liquid into the dipping tank 39B to maintain a constant supply level during system operation in response to the liquid level measured by the level sensor 39F and supplied to the control computer 39G.

The high-speed dip-coating subsystem 39 may also include additional apparatus including, for example, liquid heaters, circulation pumps and controls for (i) maintaining the temperature of CFIC liquid solution in the dipping tank 39B, and (ii) controlling the circulation of CFIC liquid around submerged CLT product 39E being transported through the dipping tank in a submerged manner during a CFIC coating process. Controlling such dip coating parameters may be used to control the amount and degree of absorption of CFIC liquid within the surface fibers of the CLT product, as it is rapidly transported through the dipping tank 39B. Notably, the dip coating process allows for the rapid formation a surface coating, or surface barrier, on the surface of each piece of dipped CLT product 39E, and in the presence of a surfactant in the CFIC liquid in the dipping tank 39B, shallow impregnation of CFIC liquid 39H can occur into the surface fibers of each CLT piece 42A near atmospheric pressure (i.e. below 6 inches of liquid CFIC in the dipping tank). It is understood that drip pans may also be provided beyond the dipping tank 39B, installed beneath the chain-driven conveyor subsystem 32 arranged between the dripping tank 39B and the packaging and wrapping stage 40, so as to recover excess CFIC liquid dripping from the dip-coated lumber pieces and returning this recovered CFIC liquid to the dipping tank 39B after appropriate filtering of the CFIC liquid if and as necessary.

As illustrated in FIG. 54A, the packaging and wrapping stage 40 includes equipment designed to receive CFIC-coated CLT product while still dripping and wet from CFIC liquid, and wrapping the CLT product 42A with a sheet of wrapping material (e.g. TVEK or like material) that covers the top portion and at least half way down each side of the CLT product, and then banding or strapping the wrapped package 42 with fiberglass or steel banding, well known in the art. The wrapping will typically be preprinted with trademarks and logos of the lumber manufacturer's brand. Finally, the ends of the lumber pieces in the strapped, wrapped lumber package 42 are painted with a fire-protective paint also containing CFIC liquid material, in amounts to be effective in fire suppression.

FIGS. 55A and 55B describe the high level steps carried out when practicing the method of producing bundles of Class-A fire-protected cross-laminated timber (CLT) 42 for use in fire-protected building construction.

As indicated at Block A in FIG. 55A, in an automated lumber factory 900, a high-speed Class-A fire-protected lumber production line is installed and operated, with a reservoir tank 39B containing a large supply of clean fire inhibiting chemical (CFIC) liquid 39H that is continuously supplied to the automated high-speed CFIC liquid dip-coating stage 39 of the lumber factory 900, installed between (i) a cross-cutting and rip-sawing stage 38, and (ii) an automated stacking, packaging, wrapping and banding/strapping stage 40 installed at the end of the production line in the factory 900.

As indicated at Block B in FIG. 55A, a supply of untreated short-length lumber is loaded onto the conveyor-chain transport mechanism 32 installed along and between the stages of the production line.

As indicated at Block C in FIG. 55A, the untreated short-length lumber is loaded into the controlled-drying stage of the production line so to produce suitably dried short-length lumber for supply to the finger-jointing processing stage 34. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a tunnel-like drying room or chamber, through which chain-driven conveyor mechanism 32 passes, like other stages along the lumber production line of the present invention, while the temperature and humidity of the environment is controlled using electric-driven or gas-combusting space heaters under computer control in a manner well known in the art.

As indicated at Block D in FIG. 55A, the controllably-dried short-length lumber is continuously supplied into the finger-jointing stage 34, for producing pieces of extended-length finger-jointed timber (lumber) in a highly automated manner.

As indicated at Block E in FIG. 55B, pieces of extended length finger-jointed timber are planed and dimensioned into pieces of finger-jointed timber laminations, and outputting the same onto the conveyor-chain transport mechanism 32.

As indicated at Block F in FIG. 55B, adhesive material is applied to the finger-jointed timber laminations produced during Block E.

As indicated at Block G in FIG. 55B, at the pressing & curing stage 37, pressing a plurality of finger-jointed timber laminations together with applied adhesive between the laminations, and then curing the adhesively joined laminations to produce a cross-laminated timber (CLT) pieces.

As indicated at Block H in FIG. 55B, cross-laminated timber (CLT) pieces are planed and finished at the cross-cutting and rip-sawing stage 38, and outputting finished CLT product to the CFIC liquid dip coating stage 39.

As indicated at Block I in FIG. 55B, the finished CLT products are continuously transported and submerged through the dipping tank 39B of the dip coating stage 39 for sufficient coating in CFIC liquid 39H, while being transported on the conveyor-chain transport mechanism 32.

As indicated at Block I in FIG. 55B, continuously removing the wet dip-coated cross-laminated timber (CLT) pieces are continuously removed from the dipping tank 39B, and automatically stacked, packaged and wrapped/labeled while wet with CFIC liquid coating, and allowed to dry within the package wrapping.

In the illustrative embodiment, CFIC biochemical liquid 34H of the present invention is used to form the CFIC surface coating onto treated wood/lumber products produced on the production line of the factory 900 described above. The potassium citrate salt crystalline structures in the resultant fire inhibiting coating (i.e. CFIC surface) will cling to the surface of the CFIC-coated wood, while surfactants properties in its coalescing agent help to break the surface tension and allow potassium salt ions to penetrate ever so slightly the surface of the treated wood. This way, in the presence of a flame, the potassium citrate salt crystalline structures in the CFIC-coating on the surface of the fire-protected lumber, are present to interrupt the combustion phase of fire by one or more pathways including interferes with the free radicals (H+, OH−, O−) of the chemical reaction produced within the combustion phase of a fire, and breaking the fire's chemical reaction and extinguishes its flame.

Specification of Method of Producing Clean Fire-Protected Oriented Strand Board (OSB) Sheathing Constructed in Accordance with the Principles of the Present Invention FIGS. 56 and 57 show a piece of Class-A fire-protected oriented strand board (OSB) sheathing 60 constructed in accordance with the principles of the present invention. This Class-A fire-protected OSB sheathing is provided with a moisture, fire and UV protection coating 64 that supports weather during building construction when roof, wall and floor sheeting gets hammered by the natural environment until the building is "dried in." The coating 64 also protects the CFIC dip-coatings 63A and 63B and paint coating 63C from getting washed out by the weather during the construction phase, as otherwise occurs with most conventional pressure-treated lumber products.

As shown, the Class-A fire-protective OSB sheathing 60 comprises: a core medium layer 61 made of wood pump, binder and/or adhesive materials; OSB sheathing layers 62A and 62B bonded to the core medium layer 61; a clean fire inhibiting chemical (CFIC) coating 63C painted onto the edge surfaces of the core medium layer 61, using a Class-A fire-protective paint containing a CFIC liquid, realized using a fire inhibiting biochemical liquid composition of the present invention illustrated in FIGS. 6A1 through 6C2; CFIC coatings 63A and 63B applied to the surface of OSB sheathing layers 62A and 62B respectively, by dipping the OSB sheathing 66 into a CFIC liquid 66H contained in a dipping tank 66B, and allowing shallow surface absorption or impregnation into the OSB sheathing layers 62A and 62B at atmospheric pressure; and a moisture/fire/UV protective coating 64 spray-coated over the CFIC coatings 63A, 63B and 63C applied to protect these underlying CFIC coatings from outdoor weather conditions such as rain, snow and UV radiation from Sunlight.

In the illustrative embodiment, CFIC biochemical liquid 66H is used to form the CFIC surface coatings 63A, 63B and 63C over the surfaces of the OSB product (e.g. sheet) 66. The clinging agent in the CFIC liquid 66H enables its chemical molecules to cling to the surface of the CFIC-coated OSB product, while its surfactants help to break the surface tension and allow chemical molecules to impregnate ever so slightly the surface of the treated wood. The CFIC paint coating 63A can be formulated by adding the bio-chemical liquid, 25-30% by volume, to a water-based paint containing liquid polymer binder.

In the illustrative embodiment, the moisture/fire/UV protection liquid 68A comprises a formulation comprising: 99% by volume, the biochemical liquid composition of the present invention; and ceramic microsphere dust, 1.0-0.75 [cups/gallon] (e.g. ThermaCels™ insulating ceramic microsphere dust by Hy-Tech Thermal Solutions, LLC, of Melbourne, FL).

FIG. 59A shows an automated factory system 1000 for producing Class-A fire-protected laminated OSB products in a high volume manner in accordance with the principles of the present invention. As shown in FIG. 59A, the factory 1000 comprises a number of automated stages integrated together under automation and control, namely: a conveyor-chain mechanism 65E having numerous primary stages in the illustrative embodiment shown in the process of FIGS. 58A, 58B and 58C.

As shown in FIG. 59A, the OSB production line comprises an arrangement of stages for high-volume automated production of OSB products. Such systems comprise:

presses & curing machines; automation and controllers. Such technologies and machines can be used to implement many of the stages described above in the OSB product production line of the present invention. Suzhou CMT Engineering Company Limited offers complete turnkey OSB production lines.

As shown in FIG. 59B, the dip-coating stage 66 comprises a chain-driven conveyor subsystem 65E, supporting several parallel sets of chain-driven transport rails 65E1, 65E2 and 65E3 as shown, extending from the pressing and curing stage 65H towards a dipping tank 54B, and then running inside and along the bottom of the dipping tank 66B, and then running out thereof towards the stacking, packing and wrapping stage 65K, as shown.

In the illustrative embodiment, the dipping tank 66B has a width dimension to accommodate the width of the OSB product 66E being transported on chain-driven conveyor rails 65E1, 65E2 and 65E3 mounted and running outside of and also within the dipping tank 66B, as shown, and allowing sufficient dwell time in the CFIC liquid 66H during the dip-coating process. As shown, the OSB products are supported upon the chain driven rails 65E1, 65E2 and 65E3 while the OSB products 66E are transported through the dipping tank 66B while fully immersed and submerged at least 6 inches deep in CFIC liquid 66H contained in the dipping tank 66B, moving at the linear rate of 300 feet/minute through the dipping tank 66B during the CFIC dip-coating process of the present invention. Electrically-powered driven motors are provided for the purpose of driving the chain-driven conveyors under computer control to transport OSB products 66E from stage to stage along the production line. A level sensor 66F is used for sensing the level of CFIC liquid 66H (i.e. biochemical liquid composition of the present invention—illustrated FIG. 6A1-6C2) in the dipping tank at any moment in time during production line operation. A reservoir tank 66C is provided for containing a large volume or supply of CFIC liquid 66H. Also, a computer controller 66G is used for controlling the conveyor subsystem, and an electric pump 66D is provided for pumping CFIC liquid 66H into the dipping tank 66B to maintain a constant supply level during system operation in response to the liquid level measured by the level sensor 66F and controlled by the controller 66G.

The high-speed dip-coating stage 66 may also include additional apparatus including, for example, liquid heaters, circulation pumps and controls for (i) maintaining the temperature of CFIC liquid solution in the dipping tank 66B, and (ii) controlling the circulation of CFIC liquid around submerged OSB product 66E being transported through the dipping tank in a submerged manner during the CFIC dip-coating process. Controlling such dip coating parameters may be used to control the amount and degree of absorption of CFIC liquid within the surface fibers of the OSB product 66E as it is rapidly transported through the dipping tank 66B between the cross-cutting and rip-sawing stage 651 and the lumber packaging and wrapping stage 65K of the production line. Notably, the dip coating process allows for the rapid formation a surface coating, or surface barrier, on the surface of each piece of dipped OSB product, or in the presence of a surfactant added to the CFIC liquid in the dipping tank 66B, shallow impregnation of CFIC liquid 66H to occur into the surface fibers of each OSB sheet 66E near atmospheric pressure (i.e. below 6 inches of liquid CFIC in the dipping tank) during the dip-coated process. It is understood that drip pans may also be provided beyond the dipping tank 66B, installed beneath the chain-driven conveyor subsystem arranged between the dripping tank 66B and the packaging and wrapping stage 65K so as to recover excess CFIC liquid dripping from the dip-coated lumber pieces and returning this recovered CFIC liquid to the dipping tank after appropriate filtering of the CFIC liquid if and as necessary.

As shown in FIG. 59B, the moisture, fire and UV protection is provided using the spray tunnel stage 67 deployed immediately after the CFIC-liquid dip-coating stage 66. As shown, the spray tunnel stage 67 comprises: a storage tank 67A for storing a large supply of moisture/fire/UV-protective liquid chemical 67B; a spray tunnel 67C for supporting an array of spray nozzles 67D arranged about the conveyor rails 67A1, 67A2 and 67A3, operably connected to a liquid pump 67E connected to the storage tank 67A under controller 67F, to provide a 360 degrees of spray coverage in the tunnel 67, for spray-coating dip-coated OSB sheets 66E within a controlled plane of moisture/fire/UV-protection liquid 67B sprayed to cover 100% of surfaces of such OSB sheets 66E as they are being transported through the spray tunnel 67 at high-speed; and a drying tunnel stage 56 installed after the spray tunnel stage 67, for quick drying of spray-coated Class-A fire-protected OSB sheet 66E, as they move through the drying tunnel 68 towards the automated stacking, packaging and wrapping stage 65K, under the control of the subsystem controller 58. In the preferred embodiment, the moisture/fire/UV protection liquid 67B sprayed in the spray tunnel 67 is formulated as follows: 99% by volume, the biochemical liquid of the present invention; and 0.75 [cups/gallon] of Hy-Tech ceramic microsphere dust, as an additive.

As illustrated in FIG. 59A, the automated stacking, packaging and wrapping stage 65K includes equipment designed to receive Class-A fire-protected OSB sheets 66E, automatically stacking the fire-protected OSB sheets, packaging and wrapping the sheets with wrapping material (e.g. plastic, TVEK or other wrapping material) that covers the top portion and at least half way down each side of the stacked OSB sheets, and then banding or strapping the wrapped package with fiberglass or steel banding, well known in the art. The wrapping will typically be preprinted with trademarks and logos of the lumber manufacturer's brand. Finally, the ends of the OSB lumber sheets 69 in the strapped, wrapped lumber package 69 are painted with a fire-protective paint also containing CFIC liquid material (e.g. 25% by volume, fire inhibiting biochemical liquid composition of the present invention) to be effective in achieving Class-A fire-protection.

FIGS. 58A, 58B and 58C describe the high-level steps of the process carried out when producing Class-A fire-protected OSB sheathing 69 in the automated factory 1000 shown in FIGS. 44A, 44B and 45, in accordance with the method and principles of the present invention.

Provided with this innovative two-coating system of UV/moisture/fire-protection, in the presence of a flame, the chemical molecules in both the moisture/fire/UV-protective coating 64 and CFIC-coatings (e.g. potassium citrate crystalline structures) 63A, 63B capture the free radicals (H+, OH−, O) produced during a fire, and break the fire's chemical reaction and extinguish its flame. This is a primary fire suppression mechanism deployed or rather implemented by the CFIC-coatings deposited on wood surfaces in accordance with the various principles of invention, disclosed and taught herein.

As indicated at Block A in FIG. 58A, in an automated factory 1000 configured for automated production of Class-A fire-protected OSB sheeting, an edge painting stage 65J, an CFIC liquid dip coating stage 67, a spray tunnel stage 67, and a drying tunnel stage 68 are installed between the finishing stage 651 and automated packaging and wrapping stage 65K along the lumber production line.

As indicated at Block B in FIG. 58A, logs are sorted, soaked and debarked at stage 65A to prepare for the logs for the stranding stage 65B.

As indicated at Block C in FIG. 58A, the debarked logs are processed at the stranding stage 65B to produce strands of wood having specific length, width and thickness.

As indicated at Block D in FIG. 58A, at the strand metering stage 65C, the strands are collected in large storage binds that allow for precise metering into the dryers.

As indicated at Block E in FIG. 58A, the strands are dried at the drying stage 65D to a target moisture content and screening them to remove small particles for recycling.

As indicated at Block F in FIG. 58B, the strands are coated with resin and wax at the blending 65F to enhance the finished panel's resistance to moisture and water absorption.

As indicated at Block G in FIG. 58B, cross-directional layers of strands are formed into strand-based mats at the mat forming stage 65G.

As indicated at Block H in FIG. 58B, the mats are heated and pressed at the pressing and curing stage 65H to consolidate the strands and cure the resins and form a rigid dense structural oriented strand board (OSB) panel.

As indicated at Block I in FIG. 58B, at the finishing stage 651, the structural OSB panel is trimmed and cut to size, and groove joints machined and edge sealants applied for moisture resistance.

As indicated at Block J in FIG. 58B, Class-A fire-protective paint (containing CFIC liquid, 25% by volume) is applied to the edges of the trimmed and cut OSB panels, at the edge painting stage 65J.

As indicated at Block K in FIG. 58B, OSB panels are transported and submerged through the dipping tank 66B of the dip coating stage 66 for sufficient coating in CFIC liquid 66H, while being transported on the conveyor-chain transport mechanism 65E.

As indicated at Block L in FIG. 58B, the wet dip-coated OSB panels are removed from the dipping tank 66B, and wet stacked and set aside for about 24 hours or so, to allow the wet CFIC liquid coating on the dipped OSB panels 66E to penetrate into the panels 69 as the coating dries.

As indicated at Block M in FIG. 58C, a stack of air-dried dip-coated OSB panels 66E is loaded to the auto-feeder of the second stage of the production line, shown in FIG. 33B.

As indicated at Block N in FIG. 58C, the dip-coated OSB panels 66E are spray-coated with a moisture, fire and UV protection coating 64 that supports weather during building construction, to produce Class-A fire-protected OSB panels 69.

As indicated at Block O in FIG. 58C, spray-coated dipped OSB sheets 69 are transported through a drying tunnel at stage 68.

As indicated at Block P in FIG. 58C, dried spray-coated/dipped OSB panels 69 are stacked, packaged and wrapped into a bundle of Class-A fire-protected OSB panels at the stacking, packaging and wrapping stage 65K.

As shown and described above, the lumber factory 1000 is configured for producing Class-A fire-protected OSB sheathing 69 fabricated in accordance with the principles of the present invention.

Best Practices on when to Spray and Respray the Fire Inhibiting Biochemical Compositions of the Present Invention on Dry Native Vegetation, Decks, Fences, Patio Covers and Vertical Framing for Best Early Fire Elimination Results Below are some best practices on when to spray and respray the fire inhibiting biochemical compositions of the present invention on dry native vegetation, decks, fences, patio covers and vertical framing, to get the best early fire elimination results.

When vegetation is bright green, it will not support easy ember ignition and fire advance the way it will when vegetation starts to dry out and turn brown and gold in color. When proactively spraying the biochemical compositions of the present invention, its best to spray using spray equipment during dry conditions when lumber and vegetation are bone dry. Also, after wood or dry vegetation has been sprayed with the biochemical compositions, one needs to consider any reduction in early proactive fire defense that may have resulted to sprayed fire-protective salt crystal structure coatings that may have been exposed to heavy water sprays from rain, garden sprinklers and/or a hose. After any type of heavy watering or rain to treated surfaces, it is advised to respray to surfaces to be re-protected and insure that the best proactive fire defense has been provided to such surfaces. When property owners or contractors are proactive spraying the biochemical compositions for wildfire defense, best results can be obtained using the GPS-tracking back-pack atomizing spray cannon system shown in FIGS. 13A through 13C. When spraying framing lumber on a construction site or elsewhere, the best results can be achieved using an airless paint sprayer provided with a #25 tip. In both applications, for best results, vegetation and lumber should be dry, with less than 19% moisture content.

Modifications to the Present Invention which Readily Come to Mind

The illustrative embodiments disclose the formulation, application and use of environmentally clean fire inhibiting or anti-fire (AF) biochemical compositions of matter. Such biochemical compositions, methods and apparatus are disclosed and taught herein for use in proactively coating the surfaces of wood, lumber, and timber, and other combustible matter, wherever wild fires may travel. However, it is understood that alternative clean anti-fire chemical liquids may be used to practice the various wild fire suppression methods according to the principles of the present invention, including fire extinguishing methods required when fire outbreaks without time for proactive defense to have been timely applied.

These and other variations and modifications will come to mind in view of the present invention disclosure.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. An environmentally-clean fire inhibiting liquid biochemical composition for application on combustible surfaces to inhibit fire ignition and flame spread in the presence of fire, said environmentally-clean fire inhibiting liquid biochemical composition comprising:

a dispersing agent realized in the form of a quantity of water, for dispersing metal ions dissolved in water;

a fire inhibiting agent in the form of at least one alkali metal salt of a nonpolymeric saturated carboxylic acid, for providing metal ions dispersed in the water when said alkali metal salt of a nonpolymeric saturated carboxylic acid is dissolved in the quantity of water; and a coalescing agent in the form of an organic compound containing three carboxylic acid groups, or salt/ester derivatives thereof, specifically triethyl citrate (TEC), an ester of citric acid, for dispersing and coalescing the metal ions when the fire inhibiting liquid composition is applied to combustible surfaces to be protected against fire, while water molecules in the water evaporate to the environment during drying, and the metal ions cooperate to form thin alkali metal salt crystalline coatings on the combustible surfaces.

2. The environmentally-clean fire inhibiting liquid biochemical composition of claim 1, wherein said at least one alkali metal salt of nonpolymeric saturated carboxylic acid comprises one or more of the following biochemicals selected from the group consisting of: alkali metal salts of citric acid; alkali metal salts of oxalic acid; alkali metal salts of gluconic acid; and alkali metal salts of tartaric acid.

3. The environmentally-clean fire inhibiting liquid biochemical composition of claim 2, wherein the said alkali metal salt of nonpolymeric saturated carboxylic acid is selected from the group consisting of alkali salt of lithium, alkali salt of sodium, alkali salt of potassium, alkali salt of cesium and alkali salt of rubidium.

4. The environmentally-clean fire inhibiting liquid biochemical composition of claim 1, wherein said alkali metal salt of nonpolymeric saturated carboxylic acid is an alkali salt of potassium, namely potassium citrate.

5. The environmentally-clean fire inhibiting liquid biochemical composition of claim 3, wherein said alkali metal salt of nonpolymeric saturated carboxylic acid is an alkali salt of potassium, namely tripotassium citrate (TPC).

6. A property ground cover material including vegetation coated with the environmentally-clean fire inhibiting liquid biochemical composition according to claim 1.

7. A building material coated with the environmentally-clean fire inhibiting liquid biochemical composition according to claim 1.

8. A ground surface material coated with the environmentally-clean fire inhibiting liquid biochemical composition according to claim 1.

9. An article of manufacture comprising the environmentally-clean fire inhibiting liquid biochemical composition according to claim 1, wherein the article is a textile material, a building material, a structural component, or property to be proactively defended from fire.

10. A building surface material coated with the environmentally-clean fire inhibiting liquid biochemical composition according to claim 1.

11. A method of proactively fighting a fire comprising the steps of applying environmentally-clean fire inhibiting liquid biochemical composition of claim 1 to the surfaces to be proactively protected from said fire.

12. The method of claim 11, wherein said fire is selected from the group consisting of a forest fire, a tire warehouse fire, a landfill fire, a coal stack fire, an oil field, and a mine fire.

13. An environmentally-clean fire inhibiting liquid biochemical composition for application on combustible surfaces to inhibit fire ignition and flame spread in the presence of fire, said environmentally-clean fire inhibiting liquid biochemical composition comprising:

a major amount of a dispersing agent realized in the form of a quantity of water, for dispersing metal ions dissolved in water;

a major amount of a fire inhibiting agent in the form of at least one alkali metal salt of a nonpolymeric saturated carboxylic acid, for providing metal ions dispersed in the water when said alkali metal salt of a nonpolymeric saturated carboxylic acid is dissolved in the quantity of water; and a minor amount of a coalescing agent in the form of an organic compound containing three carboxylic acid groups, or salt/ester derivatives thereof, specifically triethyl citrate (TEC), an ester of citric acid, for dispersing and coalescing the metal ions when the fire inhibiting liquid composition is applied to a combustible surfaces to be protected against fire, while water molecules in the water evaporate to the environment during drying, and the metal ions cooperate to form thin alkali metal salt crystalline coatings on the combustible surfaces.

14. The environmentally-clean fire inhibiting liquid biochemical composition of claim 13, wherein said at least one alkali metal salt of nonpolymeric saturated carboxylic acid comprises one or more of the following biochemicals selected from the group consisting of: alkali metal salts of citric acid; alkali metal salts of oxalic acid; alkali metal salts of gluconic acid; and alkali metal salts of tartaric acid.

15. The environmentally-clean fire inhibiting liquid biochemical composition of claim 14, wherein the said alkali metal salt of nonpolymeric saturated carboxylic acid is selected from the group consisting of alkali salt of lithium, alkali salt of sodium, alkali salt of potassium, alkali salt of cesium and alkali salt of rubidium.

16. The environmentally-clean fire inhibiting liquid biochemical composition of claim 13, wherein said alkali metal salt of nonpolymeric saturated carboxylic acid is an alkali salt of potassium, namely potassium citrate.

17. The environmentally-clean fire inhibiting liquid biochemical composition of claim 13, wherein said alkali metal salt of nonpolymeric saturated carboxylic acid is an alkali salt of potassium, namely tripotassium citrate (TPC).

18. A property ground cover material including vegetation coated with the environmentally-clean fire inhibiting liquid biochemical composition according to claim 13.

19. A building material coated with the environmentally-clean fire inhibiting liquid biochemical composition according to claim 13.

20. A ground surface material coated with the environmentally-clean fire inhibiting liquid biochemical composition according to claim 13.

21. An article of manufacture comprising the environmentally-clean fire inhibiting liquid biochemical composition according to claim 13, wherein the article is a textile material, a building material, a structural component, or property to be proactively defended from fire.

22. A building surface material coated with the environmentally-clean fire inhibiting liquid biochemical composition according to claim 13.

23. A method of proactively fighting a fire comprising the steps of applying environmentally-clean fire inhibiting liquid biochemical composition of claim 13 to the surfaces to be proactively protected from said fire.

24. The method of claim 23, wherein said fire is selected from the group consisting of a forest fire, a tire warehouse fire, a landfill fire, a coal stack fire, an oil field, and a mine fire.

* * * * *